(12) United States Patent
LaRocque et al.

(10) Patent No.: US 11,352,267 B2
(45) Date of Patent: *Jun. 7, 2022

(54) WATER DISTILLATION APPARATUS, METHOD AND SYSTEM

(71) Applicant: DEKA Products Limited Partnership, Manchester, NH (US)

(72) Inventors: Ryan K. LaRocque, Manchester, NH (US); John M. Kerwin, Manchester, NH (US); Michael A. Baker, Manchester, NH (US); Aaditya Ravindran, Manchester, NH (US); Prashant Bhat, Bedford, NH (US); Sean T. McCauley, Canterbury, NH (US); Benjamin E. Colburn, Deerfield, NH (US); Shannon Prescott, Loudon, NH (US); Brian Gray, Manchester, NH (US)

(73) Assignee: DEKA Products Limited Partnership, Manchester, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/370,212

(22) Filed: Mar. 29, 2019

(65) Prior Publication Data

US 2019/0225505 A1 Jul. 25, 2019

Related U.S. Application Data

(60) Continuation-in-part of application No. 15/468,870, filed on Mar. 24, 2017, now Pat. No. 10,759,676,
(Continued)

(51) Int. Cl.
*C02F 1/04* (2006.01)
*B01D 1/28* (2006.01)
(Continued)

(52) U.S. Cl.
CPC ............ *C02F 1/041* (2013.01); *B01D 1/0058* (2013.01); *B01D 1/2896* (2013.01); *B01D 3/007* (2013.01);
(Continued)

(58) Field of Classification Search
CPC ...................................................... B01D 1/007
See application file for complete search history.

(56) References Cited

U.S. PATENT DOCUMENTS

| | | |
|---|---|---|
| 1,971,816 A | 8/1934 | Max et al. |
| 2,481,469 A | 9/1949 | Brown |

(Continued)

FOREIGN PATENT DOCUMENTS

| | | |
|---|---|---|
| DE | 103 25 230 | 12/2004 |
| FR | 1 089 403 | 3/1955 |

(Continued)

OTHER PUBLICATIONS

Invitation to Pay Additional Fees and, Where Applicable, Protest Fee for International Application No. PCl/LlS19/24935 (Z37W0), dated Jul. 15, 2019.

(Continued)

*Primary Examiner* — Matthew D Krcha
(74) *Attorney, Agent, or Firm* — Michael George Norris

(57) ABSTRACT

A water vapor distillation system. The system includes a water vapor distillation device configured to receive a volume of source water from a fluid source and produce distillate, the device comprising: a concentrate flow path comprising a concentrate output; a distillate flow path comprising a distillate output; at least one source proportioning valve; a first heat exchanger comprising at least a portion of the distillate flow path; a second heat exchanger including at least a portion of the concentrate flow path, wherein the first heat exchanger and the second heat exchanger in fluid flow (Continued)

communication with the fluid source; a distillate sensor assembly in communication with the distillate flow path and located downstream the first heat exchanger, the distillate sensor assembly configured to generate a distillate temperature measurement; and a controller configured to control the source proportioning valves, the controller configured to: receive the distillate temperature measurement; determine the difference between a first target temperature and the distillate temperature measurement; and split the source water from the fluid source between the first heat exchanger and the second heat exchanger based on the difference between the first target temperature and the distillate temperature measurement.

24 Claims, 118 Drawing Sheets

Related U.S. Application Data which is a division of application No. 13/952,263, filed on Jul. 26, 2013, now Pat. No. 9,604,858, and a continuation-in-part of application No. 13/982,022, filed as application No. PCT/US2012/046740 on Jul. 13, 2012, now Pat. No. 9,610,518, which is a continuation-in-part of application No. 13/184,169, filed on Jul. 15, 2011, now Pat. No. 8,505,323.

(60) Provisional application No. 62/745,748, filed on Oct. 15, 2018, provisional application No. 61/819,919, filed on May 6, 2013, provisional application No. 61/676,597, filed on Jul. 27, 2012.

(51) Int. Cl.
  *C02F 1/00* (2006.01)
  *C02F 1/16* (2006.01)
  *B01D 3/00* (2006.01)
  *B01D 3/42* (2006.01)
  *B01D 1/00* (2006.01)

(52) U.S. Cl.
  CPC ............. *B01D 3/42* (2013.01); *C02F 1/008* (2013.01); *C02F 1/043* (2013.01); *C02F 1/048* (2013.01); *C02F 1/16* (2013.01); *C02F 2209/005* (2013.01); *C02F 2209/02* (2013.01); *C02F 2209/05* (2013.01); *Y02W 10/37* (2015.05)

(56) References Cited

U.S. PATENT DOCUMENTS

| | | | |
|---|---|---|---|
| 3,094,133 A | 6/1963 | Treanor | |
| 3,956,072 A | 5/1976 | Huse | |
| 4,428,328 A | 1/1984 | Ratliff | |
| 4,893,672 A | 1/1990 | Bader | |
| 4,894,123 A | 1/1990 | Helmich | |
| 4,947,983 A * | 8/1990 | Jost | D06F 43/081 202/163 |
| 4,975,154 A * | 12/1990 | Palmer | B01D 1/0082 137/392 |
| 5,207,869 A * | 5/1993 | Harmoning | B01D 1/0082 159/16.1 |
| 5,645,694 A | 7/1997 | Stewart et al. | |
| 5,729,987 A | 3/1998 | Miller | |
| 5,932,073 A | 8/1999 | Land | |
| 5,932,074 A * | 8/1999 | Hoiss | B01D 1/0047 203/10 |
| 5,951,825 A | 9/1999 | Land | |
| 5,960,563 A | 10/1999 | Kuboyama | |
| 6,290,819 B1 | 9/2001 | Land | |
| 6,375,805 B1 | 4/2002 | Dableh | |
| 6,402,897 B1 | 6/2002 | Gunn | |
| 6,655,322 B1 | 12/2003 | Godwin et al. | |
| 6,830,661 B1 | 12/2004 | Land | |
| 2003/0226794 A1 | 12/2003 | Coke | |
| 2004/0099521 A1 | 5/2004 | Demers et al. | |
| 2005/0016828 A1 * | 1/2005 | Bednarek | B01D 5/0003 203/1 |
| 2005/0183832 A1 | 8/2005 | Owens | |
| 2007/0012556 A1 | 1/2007 | Lum | |
| 2007/0017192 A1 | 1/2007 | Bednarek et al. | |
| 2009/0050467 A1 * | 2/2009 | Fickenscher | C02F 1/048 202/185.1 |
| 2009/0082906 A1 * | 3/2009 | Sanderson | B01D 1/16 700/271 |
| 2009/0230039 A1 * | 9/2009 | Hoenig | B01D 3/346 210/150 |
| 2011/0147194 A1 * | 6/2011 | Kamen | B01D 1/02 202/185.1 |
| 2014/0183025 A1 * | 7/2014 | Kamen | C02F 1/008 202/185.1 |
| 2015/0075967 A1 | 3/2015 | Zebuhr | |

FOREIGN PATENT DOCUMENTS

| | | |
|---|---|---|
| FR | 1 089 403 | 3/1995 |
| GB | 707 887 | 4/1954 |
| GB | 779 088 | 7/1957 |
| WO | WO 1997020606 | 6/1997 |
| WO | WO 1999061125 | 12/1999 |
| WO | WO 2005105254 | 11/2005 |
| WO | WO 2006029540 | 3/2006 |
| WO | WO 2008154435 | 12/2008 |
| WO | WO 2012024764 | 3/2012 |

OTHER PUBLICATIONS

International Search Report and Written Opinion for International Application No. PCT/US19/24935 (Z37W0), dated Sep. 30, 2019.
International Preliminary Report on Patentability for International Application No. PCT/US19/24935 (Z37W0), dated Apr. 14, 2021.
European Search Report, Application No. 12163481.0 dated Jun. 20, 2012 (J83EP) 6 pgs.
XP-002676348, "Regenerative Blowers" Apr. 2000 Product News, http://www.pneumaticsonline.com/Articles/pzregenblowers.html, pp. 1-2.
International Search Report and Written Opinion for International Application No. PCT/US12/046740 (I83WO), dated Jan. 3, 2013.
International Preliminary Report on Patentability for International Application No. PCT/US12/46740 (I83WO), dated Jan. 21, 2014.
Invitation to Pay Additional Fees and, Where Applicable, Protest Fee for International Application No. PCT/US13/35483 (K43W0), dated Oct. 29, 2013.
International Search Report and Written Opinion for International Application No. PCT/US13/035483 (K43W0), dated Jan. 10, 2014.
International Preliminary Report on Patentability for International Application No. PCT/US13/035483 (K43W0), dated Oct. 7, 2014.
International Search Report and Written Opinion for International Application No. PCT/US13/052335 (K79W0), dated Jan. 3, 2014.
International Preliminary Report on Patentability for International Application No. PCT/US13/052335 (K79W0), dated Jan. 27, 2015.
U.S. Appl. No. 12/135,035, filed Jun. 6, 2008.
U.S. Appl. No. 12/134,986, filed Jun. 6, 2008.
U.S. Appl. No. 10/713,617, filed Nov. 13, 2003.
U.S. Appl. No. 10/713,591, filed Nov. 13, 2003.
U.S. Appl. No. 11/480,294, filed Jun. 30, 2006.
U.S. Appl. No. 11/927,812, filed Oct. 30, 2007.
U.S. Appl. No. 11/927,823, filed Oct. 30, 2007.
U.S. Appl. No. 11/927,879, filed Oct. 30, 2007.
U.S. Appl. No. 11/927,907, filed Oct. 30, 2007.
U.S. Appl. No. 11/926,922, filed Oct. 29, 2007.
U.S. Appl. No. 11/926,680, filed Oct. 29, 2007.

* cited by examiner

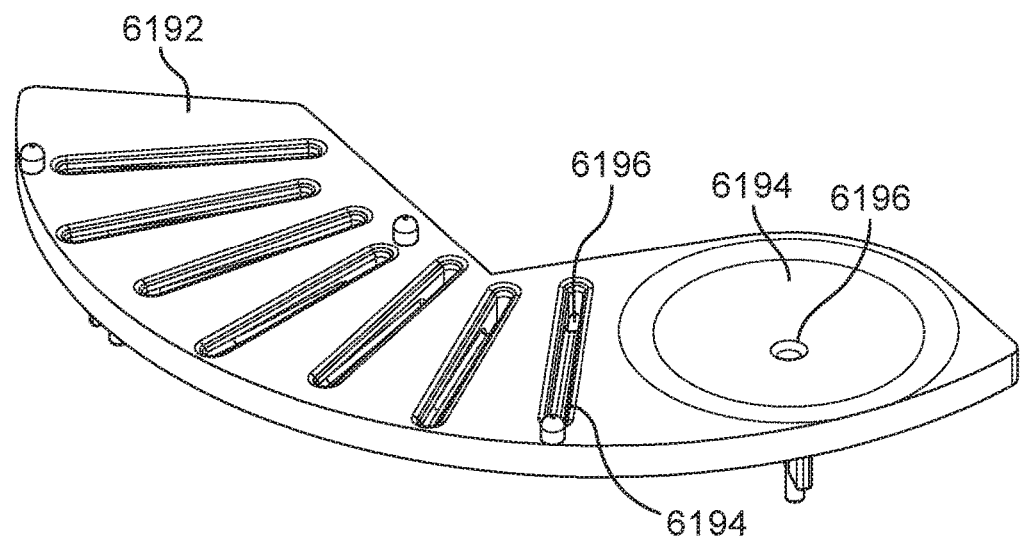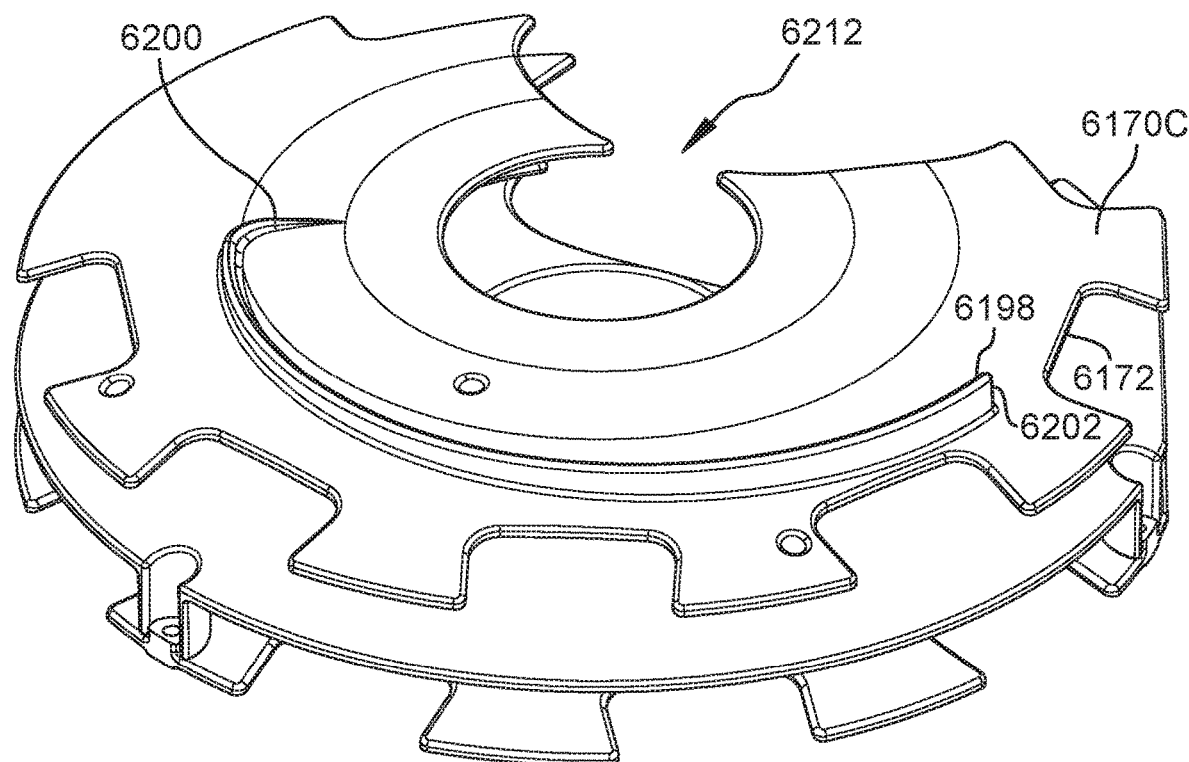
FIG. 22

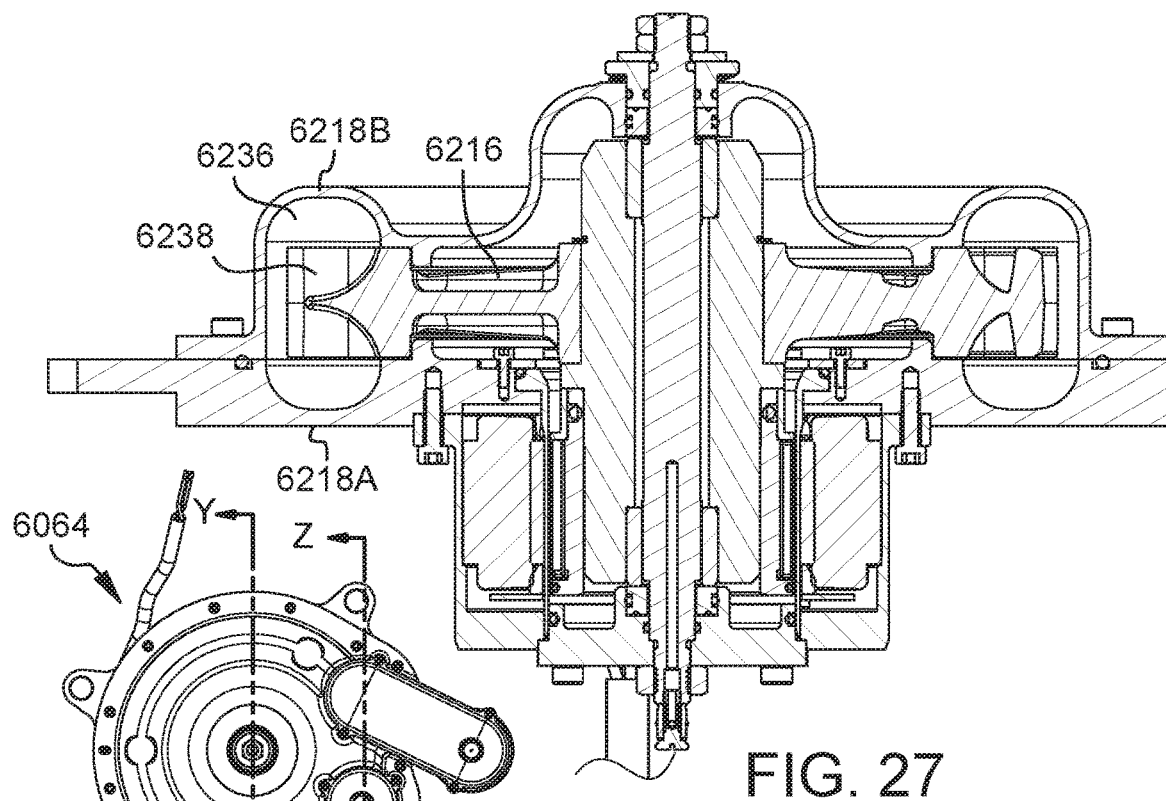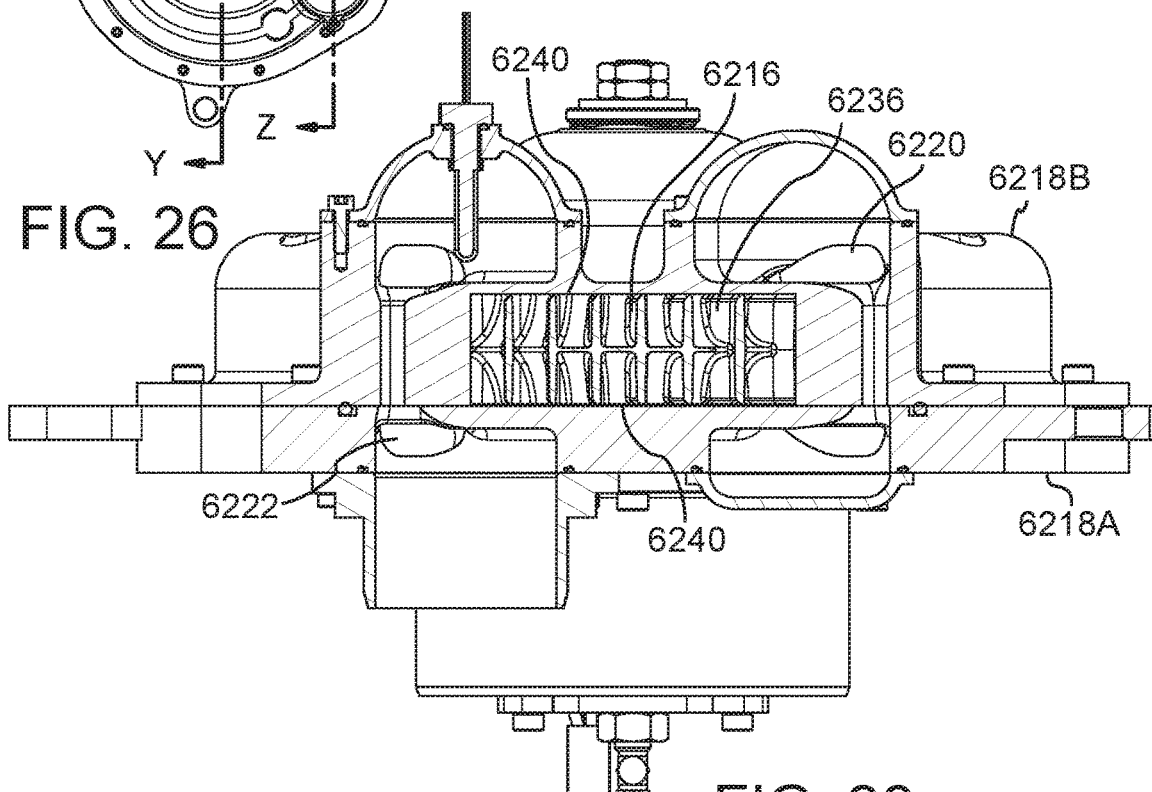

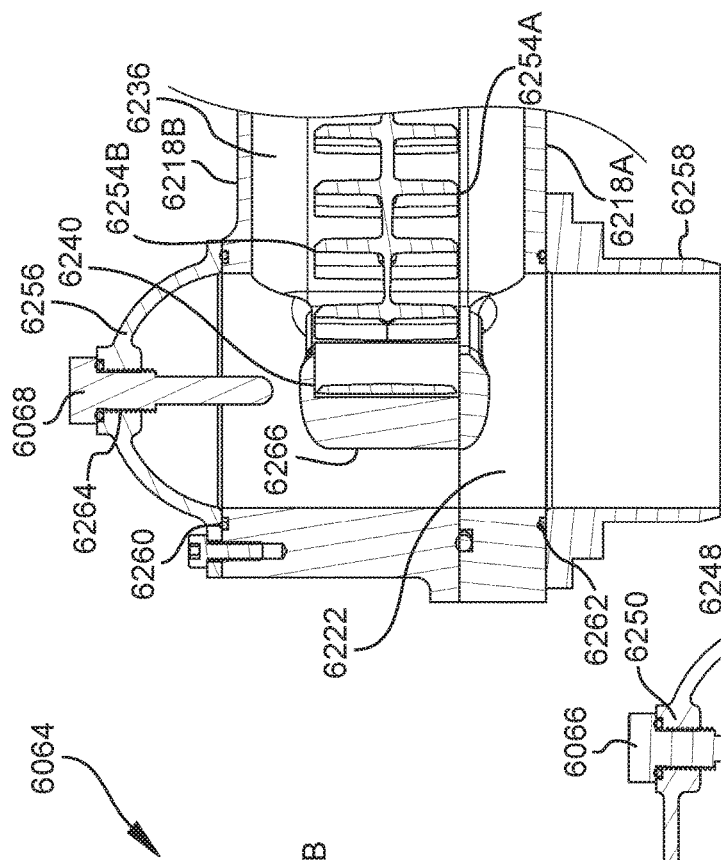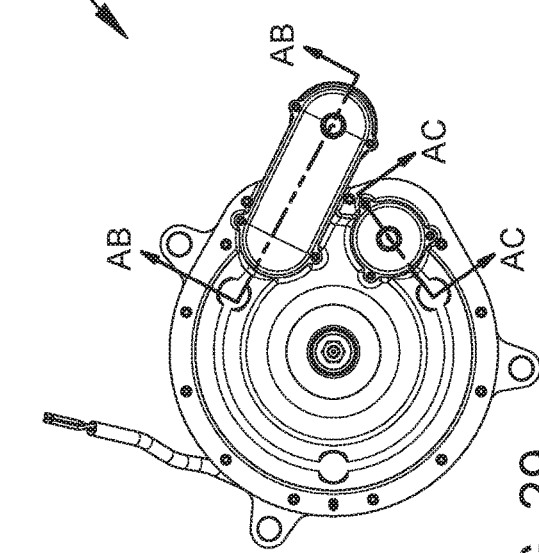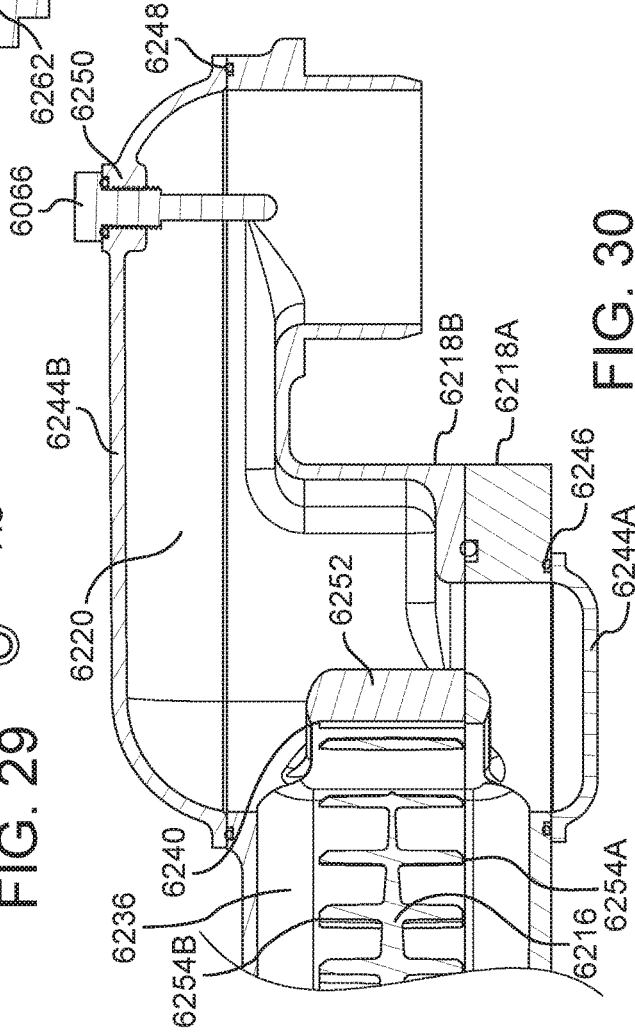

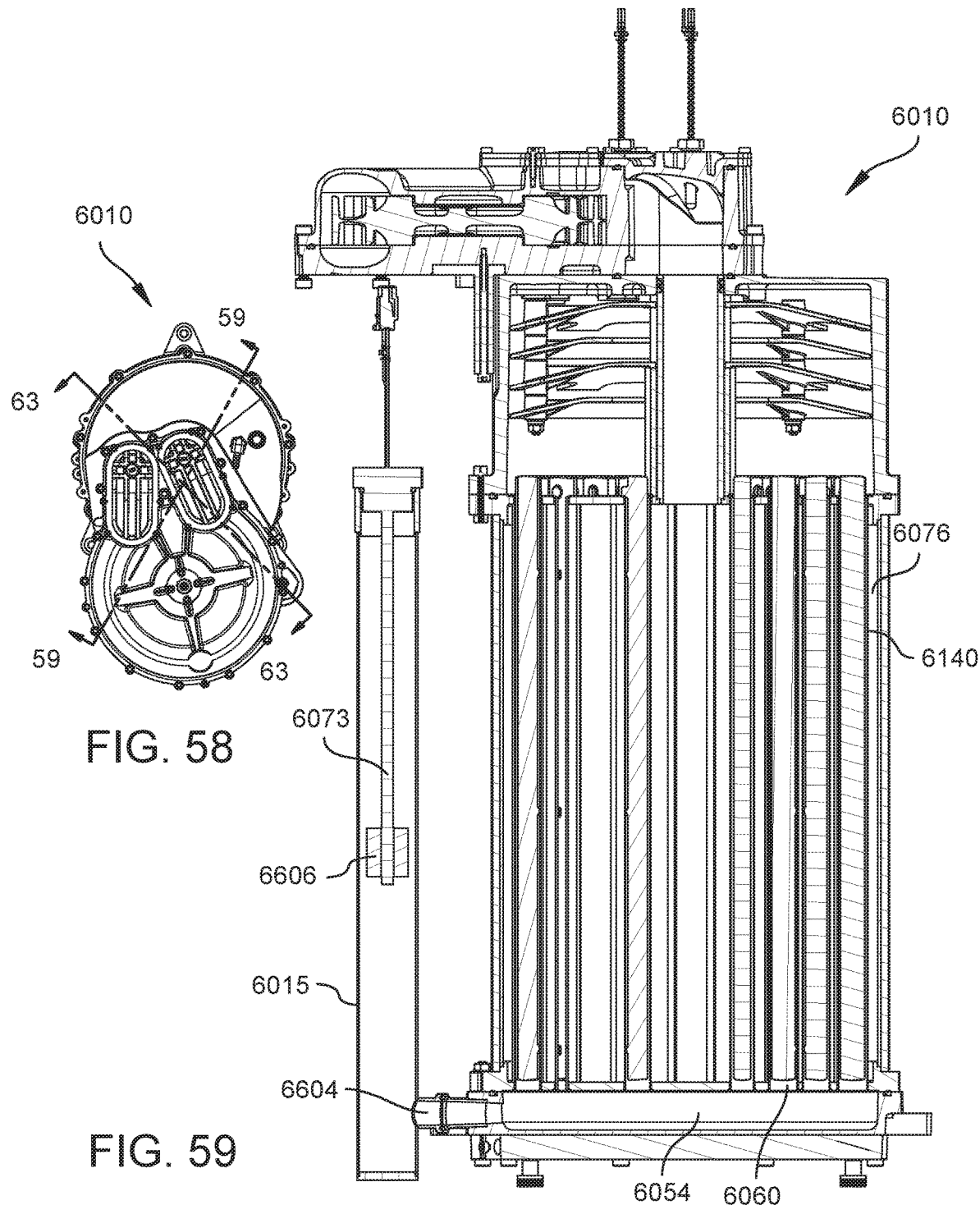

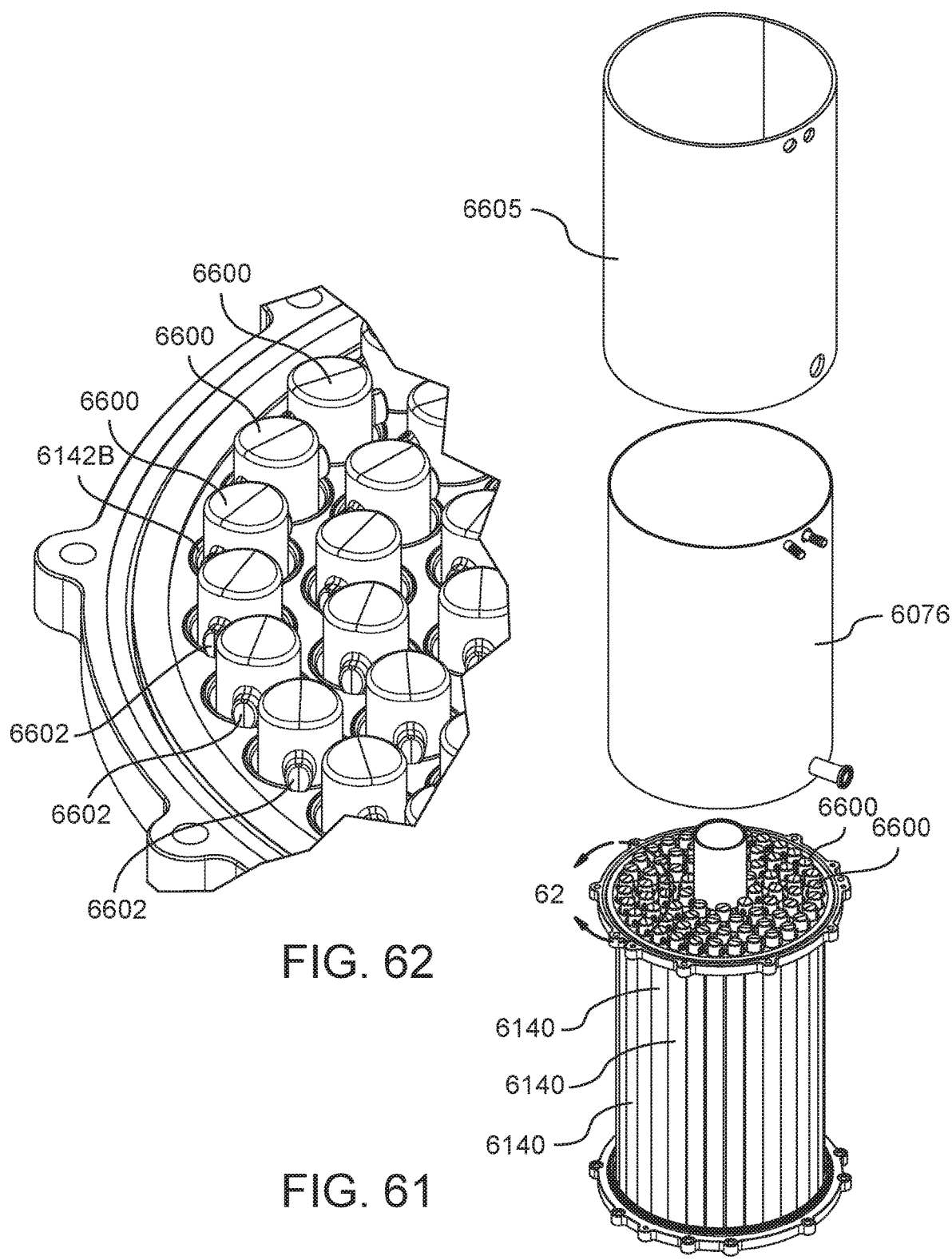

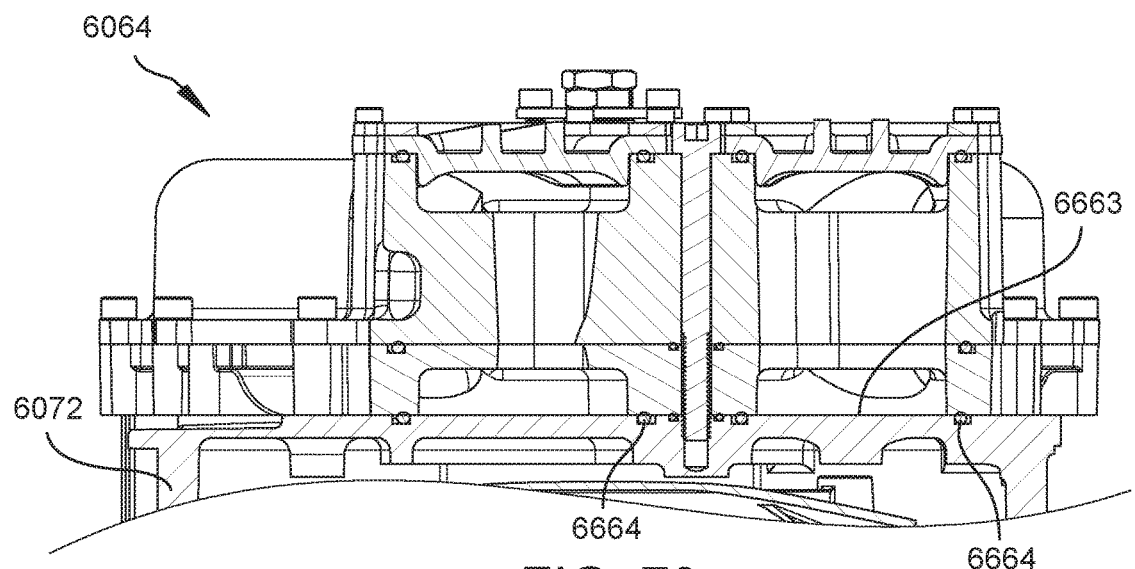
FIG. 73
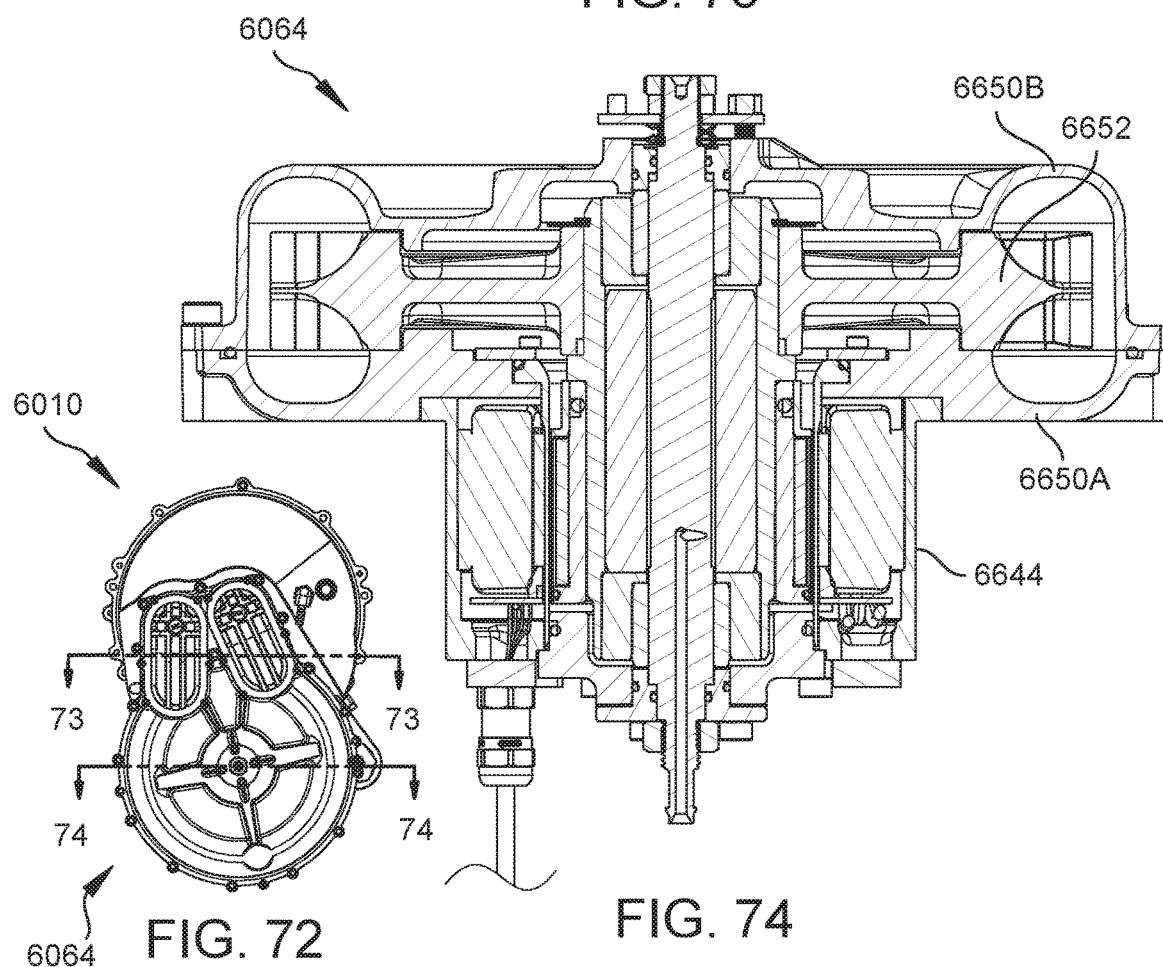
FIG. 72
FIG. 74

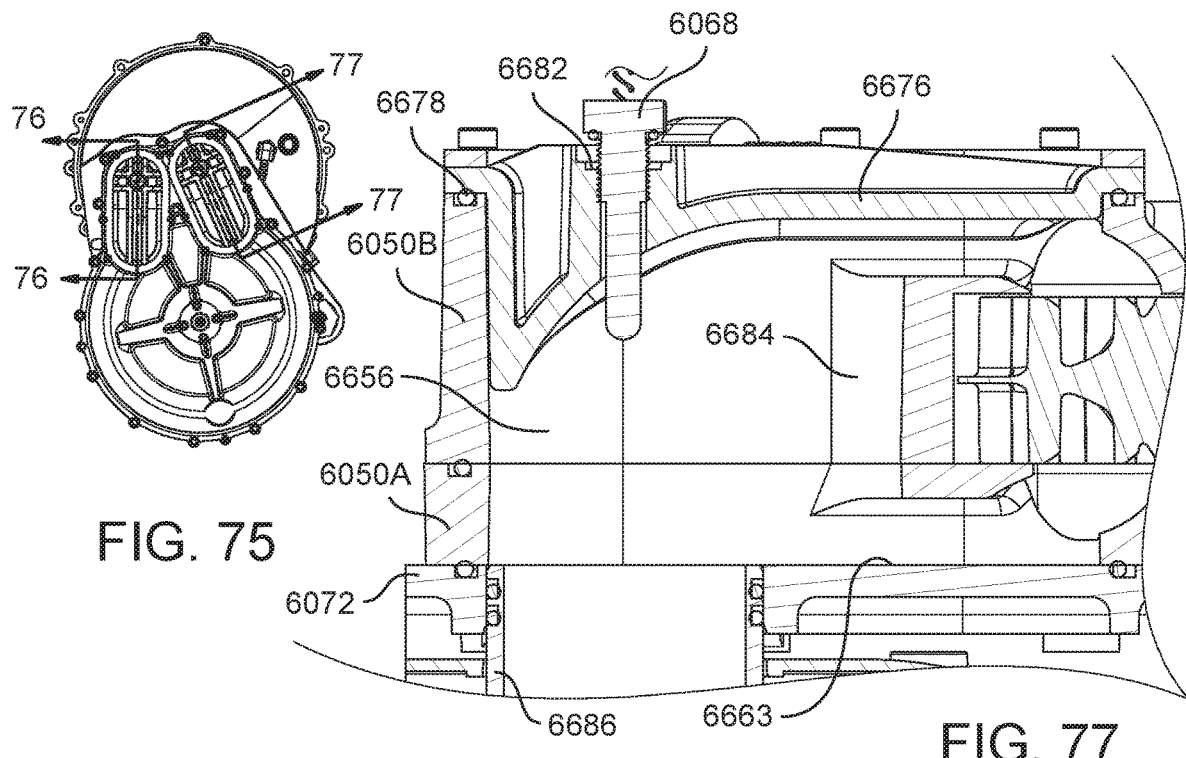
FIG. 75
FIG. 77
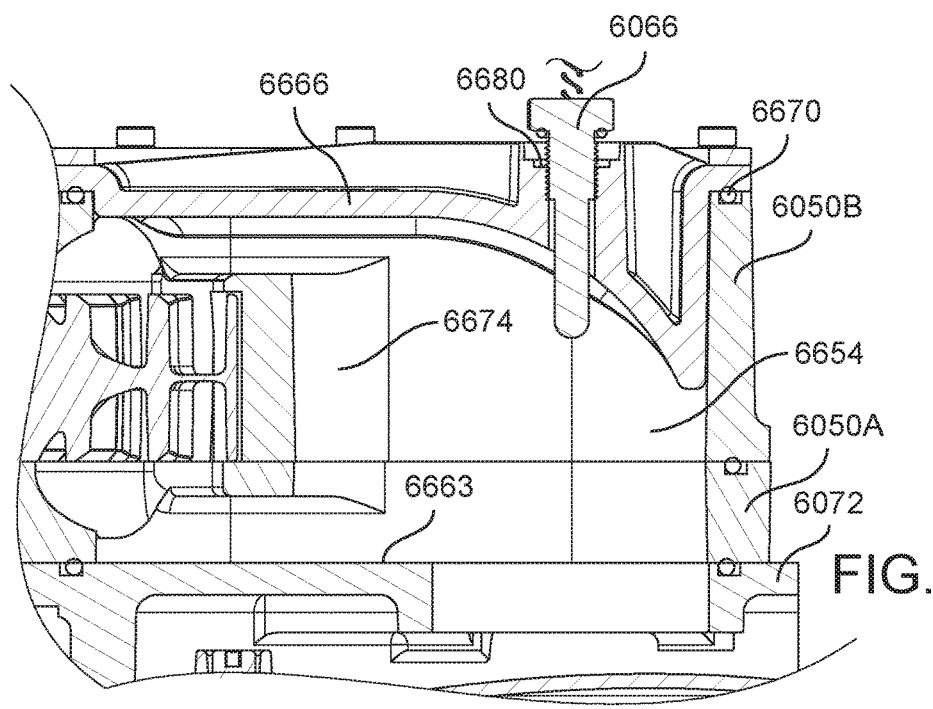
FIG. 76

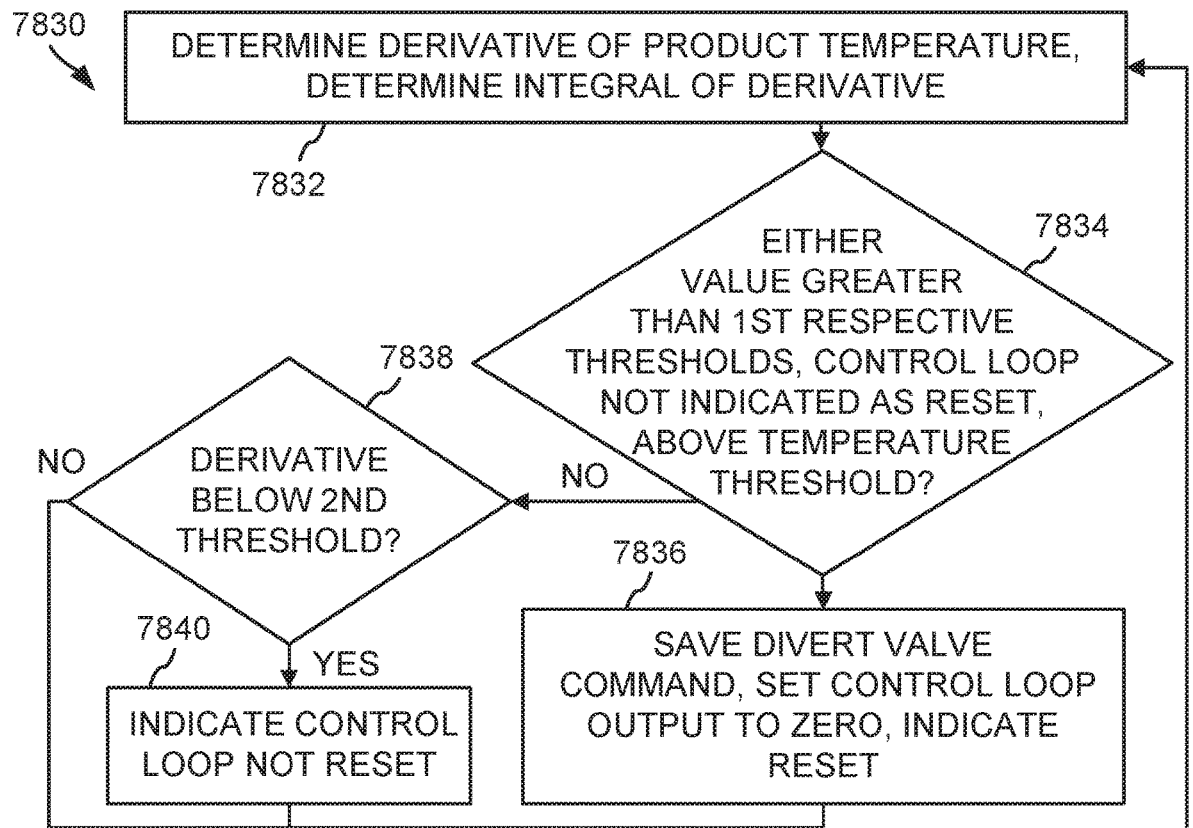
FIG. 125
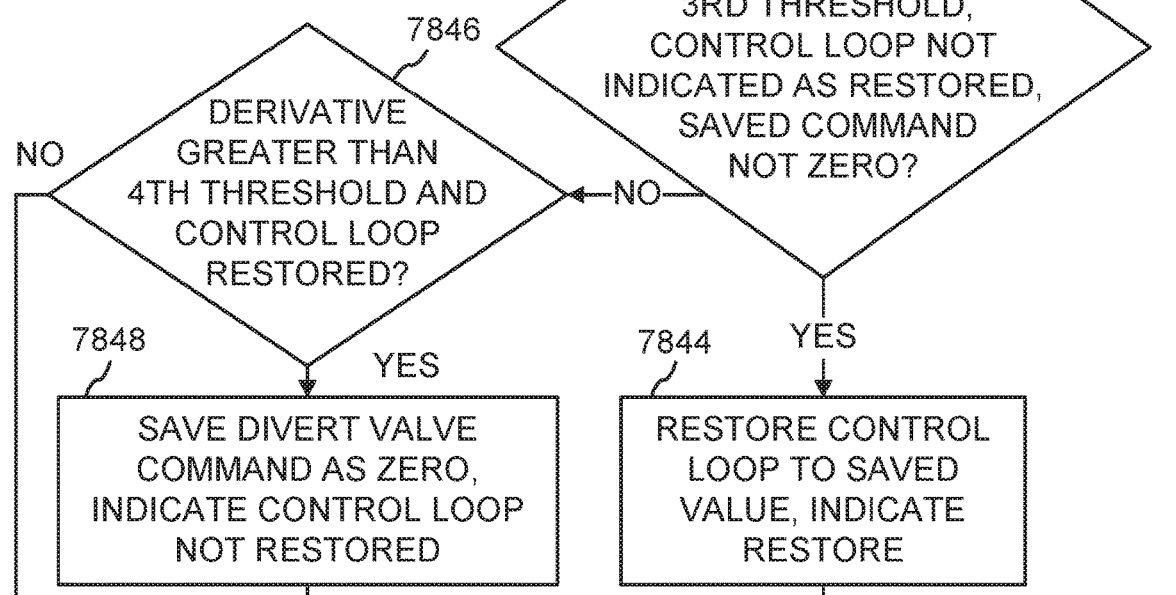

WATER DISTILLATION APPARATUS, METHOD AND SYSTEM

CROSS REFERENCE TO RELATED APPLICATIONS

The present application is a Non-Provisional application which claims priority from U.S. Provisional Patent Application Ser. No. 62/745,748 filed Oct. 15, 2018 and entitled System and Water Distillation Apparatus and System, which is hereby incorporated herein by reference in its entirety.

This application is also a Continuation-in-Part of U.S. patent application Ser. No. 15/468,870, filed Mar. 24, 2017, now U.S. Published Application No. US-2017-0197844-A1, published Jul. 13, 2017, entitled Water Vapor Distillation Apparatus, Method and System, which is a Continuation of U.S. patent application Ser. No. 13/952,263, filed Jul. 26, 2013 and entitled Water Vapor Distillation Apparatus, Method and System, now U.S. Pat. No. 9,604,858 issued Mar. 28, 2017, which is a U.S. National Stage Application under 35 USC 371 of PCT Application Serial No. PCT/US12/46740, filed Jul. 13, 2012 and entitled Water Vapor Distillation Apparatus, Method and System, which claims priority to U.S. patent application Ser. No. 13/184,169, filed Jul. 15, 2011 and entitled Water Vapor Distillation Apparatus, Method and System now U.S. Pat. No. 8,505,323, issued Aug. 13, 2013, each of which is hereby incorporated herein by reference in its entirety.

U.S. patent application Ser. No. 13/952,263, filed Jul. 26, 2013 and entitled Water Vapor Distillation Apparatus, Method and System, now U.S. Pat. No. 9,604,858 issued Mar. 28, 2017, also claims priority from U.S. Provisional Patent Application Ser. No. 61/819,919, filed May 6, 2013 and entitled Water Vapor Distillation Apparatus, Method and System, and U.S. Provisional Patent Application Ser. No. 61/676,597, filed Jul. 27, 2012 and entitled Water Vapor Distillation Apparatus, Method and System, both of which are hereby incorporated herein by reference in their entireties.

U.S. patent application Ser. No. 15/468,870, filed Mar. 24, 2017, now U.S. Published Application No. US-2017-0197844-A1, published Jul. 13, 2017, entitled Water Vapor Distillation Apparatus, Method and System, is a Continuation-in-Part of U.S. patent application Ser. No. 13/982,022, filed Jan. 9, 2014 and entitled Water Vapor Distillation Apparatus, Method and System, now U.S. Publication No. 2014-0326592-A1 issued Nov. 6, 2014, which is a U.S. National Stage Application under 35 USC 371 of PCT Application Serial No. PCT/US12/46740, filed Jul. 13, 2012 and entitled Water Vapor Distillation Apparatus, Method and System, which claims priority to U.S. patent application Ser. No. 13/184,169, filed Jul. 15, 2011 and entitled Water Vapor Distillation Apparatus, Method and System, each of which is hereby incorporated herein by reference in their entireties.

TECHNICAL FIELD

The present invention relates to water distillation and more particularly, to a water vapor distillation apparatus, method, and system.

BACKGROUND INFORMATION

A dependable source of clean water eludes vast segments of humanity. For example, the Canadian International Development Agency reports that about 1.2 billion people lack access to safe drinking water. Published reports attribute millions and millions of deaths per year, mostly children, to water related diseases. Many water purification techniques are well known, including carbon filters, chlorination, pasteurization, and reverse osmosis. Many of these techniques are significantly affected by variations in the water quality and do not address a wide variety of common contaminants, such as bacteria, viruses, organics, arsenic, lead, mercury, and pesticides that may be found in water supplies in the developing world and elsewhere. Some of these systems require access to a supply of consumables, such as filters or chemicals. Moreover, some of these techniques are only well suited to centralized, large-scale water systems that require both a significant infrastructure and highly trained operators. The ability to produce reliable clean water without regard to the water source, on a smaller, decentralized scale, without the need for consumables and constant maintenance is very desirable, particularly in the developing world.

The use of vapor compression distillation to purify water is well known and may address many of these concerns. However, the poor financial resources, limited technical assets, and low population density that does not make it feasible to build centralized, large-scale water systems in much of the developing world, also limits the availability of adequate, affordable, and reliable power to operate vapor compression distillation systems, as well as hindering the ability to properly maintain such systems. In such circumstances, an improved vapor compression distillation system and associated components that increases efficiency and production capability, while decreasing the necessary power budget for system operation and the amount of system maintenance required may provide a solution.

SUMMARY

In accordance with an embodiment of the present disclosure, a water vapor distillation system for providing distillate at a controlled temperature is disclosed. The water vapor distillation system includes a water vapor distillation device configured to receive a volume of source water from a fluid source and produce distillate, the device comprising: a concentrate flow path comprising a concentrate output; a distillate flow path comprising a distillate output; at least one source proportioning valve; a first heat exchanger comprising at least a portion of the distillate flow path; a second heat exchanger including at least a portion of the concentrate flow path, wherein the first heat exchanger and the second heat exchanger in fluid flow communication with the fluid source; a distillate sensor assembly in communication with the distillate flow path and located downstream the first heat exchanger, the distillate sensor assembly configured to generate a distillate temperature measurement; a control system for controlling said fluid vapor distillation system comprising: a blow down controller programmed to control a blow down valve; a source flow controller programmed to control a source flow valve; and a blow down level sensor in communication with a blow down controller and a source flow controller, said blow down level sensor sends signals related to said blow down level to said blow down controller and said source flow controller indicative of said blow down level, wherein said source flow controller programmed to actuate said source flow valve based at least on said blow down level sensor signals, and wherein said blow down controller programmed to actuate said blow down valve based at least on said blow down level sensor signals, whereby said blow down level and said source flow level are maintained using said blow down level sensor signals as input; and a controller configured to control the source proportioning valves, the controller configured to: receive the distillate temperature measurement; determine the difference between a first target temperature and the distillate temperature measurement; and split the source water from the fluid source between the first heat exchanger and the second heat exchanger based on the difference between the first target temperature and the distillate temperature measurement.

In accordance with an embodiment of the present disclosure, a water purification system for outputting distillate at a controlled temperature may comprise a distillation device in selective fluid communication with a fluid source via a set of source proportioning valves. The distillation device may having a concentrate output and distillate output respectively coupled to a concentrate flow path and a distillate flow path. The system may further comprise a first heat exchanger including a portion of the distillate flow path and a second heat exchanger including a portion of the concentrate flow path. A flow path from the fluid source may be in heat exchange relationship with each of the first and second heat exchanger. The system may further comprise a distillate sensor assembly in communication with the distillate flow path downstream of the portion of the distillate flow path included in the first heat exchanger. The distillate sensor assembly may be configured to generate a distillate temperature measurement. The system may further comprise a controller configured to govern operation of the source proportioning valves in a first operating mode to split incoming flow from the fluid source between the first and second heat exchanger based on a delta between a first target temperature and the distillate temperature measurement.

In some embodiments, the controller may be configured to determine a total source proportioning valve duty cycle which dictates the amount of incoming flow from the fluid source. In some embodiments, the system may further comprise a concentrate reservoir and a concentrate level sensor. The controller may be configured to determine the total source proportioning valve duty cycle based on a concentrate accumulation rate calculated from a level measurement output of the concentrate level sensor and a target concentrate accumulation rate. In some embodiments, the controller may be configured to govern operation of the source proportioning valves in a second operating mode to allocate the entire total source proportioning valve duty cycle to a source proportioning valve gating source flow to the second heat exchanger and open a source proportioning valve gating source flow to the first heat exchanger at added duty cycle which is no greater than a predefined limit. In some embodiments, the predefined limit may be selected from a list consisting of 5%, 2%, less than 2%, and zero. In some embodiments, the first operating mode may be a low temperature distillate production state and the second operating mode may be a hot temperature distillate production state. In some embodiments, the controller may be configured to open a source proportioning valve gating source flow to the first heat exchanger based upon a second target temperature and a delta between the second target temperature and the current concentrate temperature in the second operating state. In some embodiments, the second target temperature may be at least 65° C. hotter than the first target temperature. In some embodiments, the second target temperature may be at least 50° C. hotter than the first target temperature. In some embodiments, the second target temperature, may be greater than 95° C. and less than 100° C. In some embodiments, the second target temperature may be 96° C. In some embodiments, the second target temperature may be at least double the first target temperature. In some embodiments, the second target temperature may be at least 2.5 times the first target temperature. In some embodiments, the second target temperature may be at least 3.5 times the first target temperature. In some embodiments, the system may further comprise an evaporator level sensor disposed in an evaporator reservoir in fluid communication with an evaporator of the distillation device. The controller may be configured to, in the second mode, determine the total source proportioning valve duty cycle at least in part based on an evaporator level data signal indicative of a level of a water column in the evaporator reservoir. In some embodiments, the first target temperature may be at least 20° C., but no greater than 25° C. In some embodiments, the system may further comprise a source fluid temperature sensor. The controller may be configured to determine the first target temperature based at least in part on a source fluid temperature measurement received from the source fluid temperature sensor. In some embodiments, the system may further comprise a concentrate sensor assembly in communication with the concentrate flow path downstream of the portion of the concentrate flow path included in the second heat exchanger. The concentrate sensor assembly may be configured to generate a concentrate temperature measurement. In some embodiments, the controller is configured to open a source proportioning valve gating source flow to the second heat exchanger based at least in part upon a delta between a third target temperature and the concentrate temperature measurement. In some embodiments, the third target temperature may be a historic average of the concentrate temperature. In some embodiments, the controller may be configured to open a source proportioning valve gating source flow to the second heat exchanger based at least in part upon a minimum limit. In some embodiments, the minimum limit may be the greater of a predefined duty cycle or a predefined percentage of the combined duty cycle for all of the source proportioning valves. In some embodiments, the predefined duty cycle may be 5%. In some embodiments, the predefined percentage may be 10%. In some embodiments, the controller may be disposed in an electronics box in heat transfer relationship the flow path from the fluid source leading to the second heat exchange. In some embodiments, the controller may be configured to determine an electronics box cooling duty cycle command and open a source proportioning valve gating source flow to the second heat exchanger based at least in part upon a the electronics box cooling duty cycle command. In some embodiments, the electronics box cooling duty cycle may be determined based at least in part on a delta between a target electronics box temperature and an electronics box temperature measurement collected from an electronics box temperature sensor configured to measure temperature of the electronics box and in data communication with the controller. In some embodiments, the distillate sensor assembly may include redundant temperature sensors. In some embodiments, the distillate sensor assembly may include redundant temperature sensors and redundant conductivity sensors. In some embodiments, the first and second heat exchanger may be helical and formed by winding the heat exchangers around the exterior of the distillation device.

In accordance with an embodiment of the present disclosure a fluid distillation apparatus may comprise at least one controller and a source inlet in selective fluid communication with a fluid source via at least one valve. The fluid vapor distillation apparatus may further comprise an evaporator in fluid communication with the source inlet. The fluid vapor distillation apparatus may further comprise a steam chest coupled to the evaporator and in fluid communication with a compressor. The fluid vapor distillation apparatus may further comprise a concentrate reservoir attached to the steam chest via an inflow path. The concentrate reservoir may be disposed laterally to the steam chest such that at least a portion of the concentrate reservoir is at even height with the steam chest. The fluid vapor distillation apparatus may further comprise a condenser in fluid communication with an outlet of the compressor via a straight line flow path. The straight line flow path may include a condenser inlet having a fenestrated segment with a plurality of fenestrations. The fenestrations may establish a flow path from the condenser inlet to the condenser. The fluid vapor distillation apparatus may further comprise a product process stream reservoir coupled to the condenser by a product reservoir inlet. The product process stream reservoir may be disposed laterally to the condenser such that at least a portion of the product process stream reservoir is at even height with the condenser.

In some embodiments, the inflow path may include an obstruction. In some embodiments, the obstruction may include a plate. The plate may have a segment which extends into the concentrate reservoir at an angle substantially perpendicular to the inflow path. In some embodiments, the obstruction may extend into the concentrate reservoir and divide the concentrate reservoir into a first portion and a second, sheltered portion. In some embodiments, the fluid vapor distillation apparatus may further comprise a venting pathway extending from the concentrate reservoir to the steam chest. In some embodiments, the venting pathway may extend substantially parallel to and above the inflow path with respect to gravity. In some embodiments, the product reservoir inlet may be adjacent a product accumulation surface of the condenser. In some embodiments, the compressor may be driven by a motor mounted in a receiving well recessed into the side of the steam chest. In some embodiments, the compressor may include an impeller which rotates about an axis which passes through at least a portion of the steam chest and is off-center, but parallel with respect to a longitudinal axis of the steam chest.

In accordance with another embodiment of the present disclosure a water vapor distillation apparatus may comprise a sump and an evaporator having a first side in communication with the sump. The evaporator may have a second side in fluid communication with a steam chest. The water vapor distillation apparatus may further comprise a concentrate reservoir attached to the steam chest via an inflow path having a first portion and second portion. The second portion may be at least in part by an obstruction. The obstruction may extend into the concentrate reservoir in a direction transverse to the first portion and may divide the concentrate reservoir into an unsheltered section and a sheltered section. The water vapor distillation apparatus may further comprise a float assembly disposed in the sheltered section. The float assembly may be displaceable over a displacement range inclusive of points at even height with all steam chest liquid levels in an expected range of steam chest liquid levels. The water vapor distillation apparatus may further comprise a sensor configured monitor a position of the float assembly and output a data signal indicative of a liquid level in the steam chest based on the position of the float assembly. The water vapor distillation apparatus may further comprise a compressor having an inlet establishing fluid communication with the steam chest and an outlet establishing fluid communication with a condenser.

In some embodiments, the sensor may be an encoder. In some embodiments, the float assembly may include at least one magnet. In some embodiments, the sensor may be a hall effect sensor. In some embodiments, the float assembly may be attached to a pivot. In some embodiments, the float assembly may be displaceable about the pivot. In some embodiments, the obstruction may extend into the concentrate reservoir at an angle substantially perpendicular to the first portion of the inflow path. In some embodiments, the water vapor distillation apparatus may further comprise a venting pathway extending from the concentrate reservoir to the steam chest. In some embodiments, the venting pathway may extend parallel to and above the first portion of the inflow path. In some embodiments, the venting pathway may have a smaller cross-sectional area than that of the first portion of the inflow path.

In accordance with another embodiment of the present disclosure a water vapor distillation apparatus may comprise a sump having a source fluid input. The water vapor distillation apparatus may further comprise an evaporator having a first side in fluid communication with the source fluid input via the sump and a second side in fluid communication with a steam chest. The evaporator may be configured to transform source fluid from the source fluid input to low pressure vapor and concentrate as source fluid travels toward the steam chest. The water vapor distillation apparatus may further comprise a concentrate reservoir attached and disposed laterally to the steam chest. The concentrate reservoir may include a concentrate level sensor configured to monitor the level of concentrate in the steam chest and generate a data signal indicative of the level of concentrate. The water vapor distillation apparatus may further comprise a compressor having a low pressure vapor inlet establishing fluid communication with the steam chest and a high pressure vapor outlet establishing fluid communication with a condenser via a condenser inlet. The water vapor distillation apparatus may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The condenser may include a condensing portion and a condensate accumulation or storage portion. The water vapor distillation apparatus may further comprise an auxiliary condensate reservoir in fluid communication with the condensate accumulation portion. The auxiliary condensate reservoir may be attached to the condenser adjacent an accumulation surface of the accumulation portion. The auxiliary condensate reservoir may include a condensate level sensor configured monitor a level of condensate in the accumulation portion and generate a data signal indicative of a percentage which the accumulation portion is filled with condensate.

In some embodiments, the accumulation portion may have a volume less than ten liters. In some embodiments, the plurality of exterior surfaces may be exterior surfaces of a plurality of evaporator tubes included in the evaporator. In some embodiments, the plurality of exterior surfaces may be exterior surfaces of between 90-100 evaporator tubes included in the evaporator. In some embodiments, the plurality of exterior surfaces may be exterior surfaces of between 70-80 evaporator tubes included in the evaporator. In some embodiments, the condensate level sensor may include a float assembly attached to a pivot. In some embodiments, the float assembly may be displaceable about the pivot over a displacement range inclusive of points at even height with a range of levels defined by the accumulation portion. In some embodiments, the concentrate level sensor may include a float assembly disposed in a sheltered section of the concentrate reservoir separated from an unsheltered portion of the concentrate reservoir by a barrier. In some embodiments, the float assembly may be attached to a pivot and may be displaceable about the pivot over a displacement range inclusive of points at even height with all steam chest concentrate levels in an expected range of steam chest liquid levels. In some embodiments, the concentrate level sensor may be disposed within a sleeve which forms the barrier.

In accordance with another embodiment of the present disclosure, a concentrate level control system for a fluid vapor distillation apparatus may comprise a source fluid input in selective fluid communication with a source fluid reservoir via at least one input valve. The concentrate level control system may further comprise an evaporator in fluid communication with the source input and in fluid communication with a steam chest. The evaporator may be configured to transform source fluid from the source fluid input into a vapor stream and a concentrate stream as the source fluid travels toward the steam chest. The concentrate level control system may further comprise a concentrate reservoir attached and disposed lateral to the steam chest via an inflow path and including an outlet in selective communication with a concentrate destination via an outlet valve. The concentrate level control system may further comprise a concentrate level sensor configured to generate a data signal indicative of a concentrate level in the steam chest. The concentrate level control system may further comprise a controller configured to deliberately alter the concentrate level in a predetermined pattern by governing actuation of the at least one inlet valve via a fluid input control loop as well as analyzing the data signal. The controller may be further configured to actuate the outlet valve to a closed state when the data signal indicates the concentrate level is below a first threshold and actuate outlet valve to an open state when the concentrate level is above a second threshold.

In some embodiments, the predetermined pattern may create a sawtooth waveform when concentrate level is plotted over time. In some embodiments, wherein the period of the sawtooth waveform may be dependent at least in part upon a fluid input command from the fluid input control loop. In some embodiments, the fluid input command may be determined based on a predetermined target concentrate production rate. In some embodiments, the controller may be configured to operate in a plurality of operational states and the predetermined target concentrate production rate may be state specific. In some embodiments, the controller may analyze the data signal on a predetermined basis. In some embodiments, wherein the concentrate level may be assigned a predefined expected range and the first threshold may be less than or equal to 50% of a maximum level of the expected range. In some embodiments, the first threshold may be between 40% and 50% of the maximum level of the expected range. In some embodiments, the concentrate level may be assigned a predefined expected range and the second threshold may be greater than or equal to 50% of a maximum level of the expected range. In some embodiments, the second threshold may be between 50% and 60% of the maximum level of the expected range. In some embodiments, wherein the concentrate level may be assigned a predefined expected range and the first threshold may be less than or equal to 40% of a maximum level of the expected range. In some embodiments, the first threshold may be between 40% and 30% of the maximum level of the expected range. In some embodiments, the concentrate level may be assigned a predefined expected range and the second threshold may be greater than or equal to 45% of a maximum level of the expected range. In some embodiments, the second threshold may be between 45% and 55% of the maximum level of the expected range. In some embodiments, the concentrate level may be assigned a predefined expected range and the first and second thresholds may be defined as a percentage of a maximum level of the expected range. The second threshold may be between 4 and 20 percentage points greater than the first threshold. In some embodiments, the concentrate destination is a mixing can.

In accordance with another embodiment of the present disclosure a method for controlling a level of concentrate in a distillation device and verifying fluid flow within the distillation device may comprise inputting a source fluid to the distillation device though at least one inlet valve. The method may further comprise evaporating at least a portion of the source fluid to generate a vapor and a concentrate as the source fluid travels toward a steam chest. The method may further comprise collecting concentrate in a concentrate reservoir attached and disposed lateral to the steam chest via an inflow path. The method may further comprise providing a data signal indicative of a concentrate level in the steam chest from a concentrate level sensor disposed in the concentrate reservoir. The method may further comprise altering, with a controller, the concentrate level in a predetermined pattern by governing actuation of the at least one inlet valve via a fluid input control loop as well as analyzing the data signal and actuating an outlet valve of the concentrate reservoir to a closed state when the data signal indicates the concentrate level is below a first threshold and to an open state when the concentrate level is above a second threshold.

In some embodiments, altering the concentrate level may comprise altering the concentrate level to create a sawtooth waveform when concentrate level is plotted over time. In some embodiments, analyzing the data signal may comprise analyzing the data signal on a predetermined basis. In some embodiments, the method may further comprise assigning a predefined expected range to the concentrate level and setting the first threshold at less than or equal to 50% of a maximum level of the expected range. In some embodiments, setting the first threshold may comprise setting the threshold to between 40% and 50% of the maximum level of the expected range. In some embodiments, the method may further comprise assigning a predefined expected range of the concentrate level and setting the second threshold at greater than or equal to 50% of a maximum level of the expected range. In some embodiments, setting the second threshold comprising setting the second threshold between 50% and 60% of the maximum level of the expected range. In some embodiments, the method may further comprise assigning a predefined expected range to the concentrate level and setting the first threshold at less than or equal to 40% of a maximum level of the expected range. In some embodiments, setting the first threshold may comprise setting the threshold to between 40% and 30% of the maximum level of the expected range. In some embodiments, the method may further comprise assigning a predefined expected range of the concentrate level and setting the second threshold at greater than or equal to 45% of a maximum level of the expected range. In some embodiments, setting the second threshold comprising setting the second threshold between 45% and 55% of the maximum level of the expected range. In some embodiments, the method may further comprise assigning the concentrate level a predefined expected range and setting the first and second thresholds as a percentage of a maximum level of the expected range, the second threshold being between 4 and 20 percentage points greater than the first threshold.

In accordance with another embodiment of the present disclosure a temperature control system for controlling temperature of a product process stream of a distillation device to a request temperature may comprise a source fluid input in selective fluid communication with a source fluid reservoir via a set of fluid input valves. The system may further comprise an evaporator in fluid communication with the source input and in fluid communication with a compressor. The evaporator may be configured to transform source fluid from the source fluid input into a vapor stream and a concentrate stream as the source fluid travels toward the compressor. The system may further comprise a condenser in fluid communication with the compressor configured to transform pressurized vapor from the compressor into condensate. The system may further comprise a condensate flow path and a concentrate flow path including respective first and second heat exchangers. The first and second heat exchangers may each include a heat exchanging portion of a source fluid flow path from the source fluid reservoir. The heat exchanging portion may be downstream the source fluid input valves. The system may further comprise a condensate temperature sensor configured to generate a data signal indicative of a condensate temperature. The condensate temperature sensor may be disposed on the condensate flow path downstream the first heat exchanger. The system may further comprise a controller configured to actuate the set of input source valves based on a first control loop which governs a total open state time for all input source valves of the set of input source valves and a second control loop which receives the data signal and the requested temperature and divides the total open state time between all of the input source valves to adjust the condensate temperature to the requested temperature.

In some embodiments, the heat exchanging portions of the source fluid flow paths within the first and second heat exchanger may be disposed countercurrent to their respective condensate and concentrate flow paths. In some embodiments, the system may further comprise a destination device in fluid communication with the condensate flow path via a point of use valve. In some embodiments, the requested temperature may be generated by the destination device. In some embodiments, the destination device may be a medical system. In some embodiments, the medical system may be configured to mix at least one dialysate solution. In some embodiments, the destination device may be a dialysis machine. In some embodiments, the destination device may be a hemodialysis machine. In some embodiments, at least one of the first and second control loop may be a PID control loop. In some embodiments, the gain of at least one of the terms of the PID control loop may be zero. In some embodiments, a feed forward term may be combined with the output of the second control loop. In some embodiments, the feed forward term may be based off an estimated division of total open state time. In some embodiments, the system may further comprise a concentrate level sensor configured to output a concentrate level data signal indicative of a concentrate level within the distillation device. The first control loop may be configured to receive a target concentrate level and the current concentrate level data signal and as inputs to the first control loop. In some embodiments, the controller may be further configured to adjust a heater duty cycle based at least in part on the total open state time for all input source valves of the set of input source valves. In some embodiments, the controller may be configured to increase the heater duty cycle when the open state time for all of the input source valves of the set of input source valves is increased.

In accordance with another embodiment of the present disclosure a method for controlling the temperature of a product process stream of a distillation device to a requested temperature may comprise governing a flow of source fluid input to the distillation device by actuation, with a controller, a set of source fluid valves. The method may further comprise converting, in an evaporator, at least a portion of the source fluid input into a vapor and a concentrate. The method may further comprise condensing, in a condenser, the vapor into a condensate. The method may further comprise removing at least a portion of the condensate and the concentrate from the distillation device through respective condensate and concentrate flow paths. The method may further comprise exchanging heat, in a first heat exchanger, between the flow of source fluid and the condensate flow path and exchanging heat, in a second heat exchanger, between the flow of source fluid and the concentrate flow path. The method may further comprise providing a condensate temperature data signal to the controller from a temperature sensor on the condensate flow path located downstream the first heat exchanger. The method may further comprise determining, with a controller, a total open state time for the set of fluid input valves between set of fluid input valves based on a first control loop and dividing the total open state time between the set of fluid input valves based on a second control loop which receives the temperature data signal and a requested temperature.

In some embodiments, the method may further comprise flowing the condensate and concentrate through the condensate and concentrate flow paths in a direction countercurrent to the flow of the source fluid. In some embodiments, the method may further comprise providing the condensate to a destination device by actuating a point of use valve downstream the temperature sensor. In some embodiments, the requested temperature may be generated by the destination device. In some embodiments, the destination device may be a medical system. In some embodiments, the method may further comprise mixing a dialysate using the condensate. In some embodiments, the destination device may be a dialysis machine. In some embodiments, the destination device may be a hemodialysis machine. In some embodiments, at least one of the first and second control loop may be a PID control loop. In some embodiments, the method may further comprise setting at least one of the gains of the PID control loop to zero. In some embodiments, wherein the method may further comprise combining a feed forward term with the output of the second control loop. In some embodiments, the method may further comprise determining the feed forward term based off an estimated division of total open state time. In some embodiments, wherein the method further comprises inputting a current concentrate level provided by a concentrate level sensor and a target concentrate level to the first control loop. In some embodiments, the method may further comprise adjusting a heater duty cycle based at least in part on the total open state time for all input source valves of the set of input source valves. In some embodiments, adjusting the heater duty cycle may comprise increasing the heater duty cycle when the open state time for all of the input source valves of the set of input source valves is increased.

In accordance with another embodiment of the present disclosure a temperature control system for controlling the temperature of a product process stream of a distillation device to a requested temperature may comprise a first source fluid input and a second fluid source input in selective fluid communication with source fluid reservoirs respectively via a first set of fluid input valves and a second set of fluid input valves. The system may further comprise an evaporator in fluid communication with the first and second source fluid input and in fluid communication with a compressor. The evaporator may have a heating element to transform source fluid from the first and second source fluid inputs into a vapor stream and a concentrate stream as the source fluid travels toward the compressor. The system may further comprise a condenser in fluid communication with the compressor. The condenser may be configured to transform pressurized vapor from the compressor into condensate. The system may further comprise a condensate flow path and a concentrate flow path including respective first and second heat exchangers. The first and second heat exchangers may each include a heat exchanging portion of a source fluid flow path from the source fluid reservoirs, the heat exchanging portion being downstream the sets of source fluid input valves. The system may further comprise a condensate temperature sensor configured to generate a data signal indicative of a condensate temperature. The condensate temperature sensor may be disposed on the condensate flow path downstream the first heat exchanger. The system may further comprise a controller configured to actuate the first set of input source valves based on a first control loop which governs a total open state time for all input source valves of the first set of input source valves and a second control loop which receives the data signal and the requested temperature and divides the total open state time between all of the input source valves of the first set of input source valves to adjust the condensate temperature to the requested temperature. The controller may be configured to monitor at least one process variable and to actuate the second set of input source valves when one of the at least one process variable is outside of a predefined threshold.

In some embodiments the first set of fluid input valves may include at least one valve not included in the second set of fluid input valves. In some embodiments, one of the first and second source fluid inputs may be temperature controlled. In some embodiments, the second source fluid input may be temperature controlled. In some embodiments, the second source fluid input may be a hot fluid input. In some embodiments, the at least one process variable monitored by the controller may be a heating element duty cycle. In some embodiments, the at least one process variable monitored by the controller may be an output of the first control loop. In some embodiments, the at least one process variable may be a compressor speed. In some embodiments, the heat exchanging portion of the source fluid flow path may be a common flow path for fluid from the first and second source fluid input.

In accordance with another embodiment of the present disclosure a temperature controls system for controlling the temperature of a product process stream of a distillation device to a request temperature may comprise a source fluid input in selective fluid communication with a source fluid reservoir via a set of fluid input valves. The system may further comprise an evaporator in selective fluid communication with the source fluid input via a bypass valve and in fluid communication with a compressor. The evaporator may be configured to transform source fluid from the source fluid input into a vapor stream and a concentrate stream as the source fluid travels toward the compressor. The system may further comprise a condenser in fluid communication with the compressor configured to transform pressurized vapor from the compressor into condensate. The system may further comprise a condensate flow path and a concentrate flow path including respective first and second heat exchangers. The first and second heat exchangers may each include a heat exchanging portion of a source fluid flow path from the source fluid reservoir, the heat exchanging portion being downstream the source fluid input valves. The system may further comprise a condensate temperature sensor configured to generate a data signal indicative of a condensate temperature. The condensate temperature sensor may be disposed on the condensate flow path downstream the first heat exchanger. The system may further comprise a controller configured to actuate the set of input source valves based on a first control loop which governs a total open state time for all input source valves of the set of input source valves and a second control loop which receives the data signal and the requested temperature and divides the total open state time between all of the input source valves to adjust the condensate temperature to the requested temperature. The bypass valve may be disposed in the source fluid flow path downstream of the heat exchanging portion of the source fluid flow path. The bypass valve may have a divert valve state which directs fluid from the source reservoir to a drain destination. The controller may be configured to actuate the bypass valve to the divert valve state when the controller determines at least one process variable is outside of a predetermined threshold.

In some embodiments the at least one process variable may be a relationship between the condensate temperature and a source fluid temperature provided by a source fluid temperature sensor. In some embodiments, the at least one process variable may be a source fluid temperature sensed by a source fluid temperature sensor. In some embodiments, the at least one process variable may be defined at least in part by the condensate temperature and a source fluid temperature sensed by a source fluid temperature sensor. In some embodiments, the controller may alter the duty cycle of at least one of the input source valves when the bypass valve is in the divert valve state. In some embodiments, the controller may increase the duty cycle of at least one of the input source valves when the bypass valve is in the divert valve state. In some embodiments, the controller may alter the duty cycle of at least one of the input source valves to 90-100% when the bypass valve is in the divert valve state. In some embodiments, one of the at least one of the input source valves may be a valve controlling flow of source fluid through the heat exchanging portion of the first heat exchanger.

In accordance with another embodiment of the present disclosure a temperature controls system for controlling the temperature of a product process stream of a distillation system to a requested temperature may comprise a source fluid input in selective fluid communication with a source fluid reservoir via a set of fluid input valves. The system may further comprise a distillation device configured to generate a concentrate stream and a condensate stream. The system may further comprise a condensate flow path and a concentrate flow path including respective first and second heat exchangers. The first and second heat exchangers may each include a heat exchanging portion of a source fluid flow path from the source fluid reservoir, the heat exchanging portion being downstream the source fluid input valves. The system may further comprise a condensate temperature sensor configured to generate a data signal indicative of a condensate temperature. The condensate temperature sensor may be disposed on the condensate flow path downstream the first heat exchanger. The system may further comprise a point of use device in selective communication with the condensate flow path. The point of use device may have an outlet fluid path for output fluid generated by the point of use device. The output fluid path may have a third heat exchanger including a heat exchanging portion of a branch of the source fluid flow path. The system may further comprise a controller configured to actuate the set of input source valves based on a first control loop and a second control loop which govern the fluid of source fluid through the heat exchanging portions of the first and second heat exchangers and based on at least one process variable. The controller may actuate a branch valve to the branch of the source fluid flow path when the at least one process variable is outside a predetermined threshold.

In some embodiments, the at least one process variable may a relationship between the condensate temperature and a source fluid temperature provided by a source fluid temperature sensor. In some embodiments, the at least one process variable may a source fluid temperature sensed by a source fluid temperature sensor. In some embodiments, the at least one process variable may be defined at least in part by the condensate temperature and a source fluid temperature sensed by a source fluid temperature sensor. In some embodiments, the point of use device may be a medical device. In some embodiments, the point of use device is a dialysis machine. In some embodiments, the point of use device is a hemodialysis machine or a peritoneal dialysis machine. In some embodiments, the point of use device may be a dialysate admixing device. In some embodiments, the branch of the source fluid flow path may be disposed upstream of the heat exchanging portion of the source fluid flow path in the first and second heat exchangers. In some embodiments, the output fluid may be a dialysate effluent.

In accordance with another embodiment of the present disclosure a condensate accumulation rate control system for controlling a rate of condensate accumulation within a distillation device may comprise a source fluid input in selective fluid communication with a source fluid reservoir via a set of fluid input valves. The system may further comprise an evaporator in fluid communication with the source input and in fluid communication with a compressor having an impeller operatively coupled to an impeller motor. The evaporator may be configured to transform source fluid from the source fluid input into a vapor stream and a concentrate stream as the source fluid travels toward the compressor. The system may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The system may further comprise a condensate levels sensor configured to sense a current level of condensate in the condenser. The system may further comprise at least one controller configured to govern a rotation speed of the impeller by periodically generating an impeller motor command based on a last motor speed command, a motor speed goal, and a speed command increment limit. The motor speed goal may be calculated by a control loop which receives the current condensate level and a desired condensate level as control loop inputs.

In some embodiments, the speed command increment limit may be ≤10 rpm/sec. In some embodiments, wherein the speed command increment limit may be ≤5 rpm/sec. In some embodiments, the controller may be configured to compare the impeller motor command to a minimum command speed threshold and maximum command speed threshold and adjust the impeller motor command to a modified impeller motor command equal to the minimum command speed threshold when the impeller motor command is below the minimum command speed threshold and equal to the maximum command speed threshold when the impeller motor command is above the maximum command speed threshold. In some embodiments, the minimum command speed threshold is between 1500-2500 rpm. In some embodiments, the maximum command speed threshold is calculated each time the motor speed command is generated. In some embodiments, the maximum command speed threshold may be calculated based on at least one motor parameter. In some embodiments, the system may further comprise a motor temperature sensor configured to output a temperature data signal indicative of a temperature of the impeller motor and a power factor correction current monitoring circuit configured to output a PFC data signal indicative of a current power factor correction current, the maximum command speed threshold being calculated based on a the temperature data signal and the PFC data signal. In some embodiments, the maximum command speed may be capped a predetermined value. In some embodiments, wherein the predetermined value may be between 4500-6500 rpm. In some embodiments, the predetermined value may be 5000 rpm. In some embodiments, the predetermined value may be about 2.5 times larger than the minimum command speed threshold.

In accordance with another embodiment of the present disclosure a method for controlling a rate of condensate accumulation within a distillation device may comprise providing a source fluid input to the distillation device. The method may further comprise evaporating, in an evaporator, at least a portion of the source fluid input into a low pressure vapor. The method may further comprise compressing, via an impeller, the low pressure vapor into a high pressure vapor. The method may further comprise condensing, in a condenser, the high pressure vapor into a condensate and transferring heat from the high pressure vapor to the evaporator. The method may further comprise providing a level of condensate within the condenser sensed by a condensate level sensor to a controller. The method may further comprise calculating, with the controller, a motor speed goal based on the level of condensate and a desired condensate level. The method may further comprise governing, with a controller, a rotation speed of the impeller by periodically generating an impeller motor command based on a last motor speed command, a motor speed goal, an a speed command increment limit.

In some embodiments, the speed command increment limit is ≤10 rpm/sec. In some embodiments, the speed command increment limit is ≤5 rpm/sec. In some embodiments, the method may further comprise comparing, with the controller, the impeller motor command to a minimum command speed threshold and maximum command speed threshold and adjusting the impeller motor command to a modified impeller motor command equal to the minimum command speed threshold when the impeller motor command is below the minimum command speed threshold and equal to the maximum command speed threshold when the impeller motor command is above the maximum command speed threshold. In some embodiments, the minimum command speed threshold may be between 1500-2500 rpm. In some embodiments, the minimum command speed threshold may be 2000 rpm. In some embodiments, the method may further comprise calculating the maximum command speed threshold each time the motor speed command is generated. In some embodiments, calculating the maximum command speed threshold may comprise calculating the maximum command speed threshold based on at least one motor parameter. In some embodiments, the method may further comprise providing a temperature data signal indicative of a temperature of the motor from a motor temperature sensor to the controller and providing a power factor correction data signal indicative of a current power factor correction current from a monitoring circuit to the controller. In some embodiments, the method may further comprise calculating the maximum command speed threshold based on the temperature data signal and the power factor correction data signal. In some embodiments, the method may further comprise capping the maximum command speed threshold at a predetermined value. In some embodiments, the predetermined value may be between 4500-6500 rpm. In some embodiments, the predetermined value may be 5000 rpm. In some embodiments, the predetermined value may be or may be about 2.5 times larger than the minimum command speed threshold.

In accordance with an embodiment of the present disclosure a fluid vapor distillation apparatus having first and second separable sections may comprising; a source inlet in selective fluid communication with a fluid source via at least one valve. The apparatus may further comprise a sump downstream the source inlet. The apparatus may further comprise an evaporator having a plurality of tubes in fluid communication with the sump. The apparatus may further comprise a steam chest coupled to the evaporator and in fluid communication with a compressor. The apparatus may further comprise a condenser in fluid communication with an outlet of the compressor. The condenser may surround the plurality of tubes. The apparatus may further comprise a support plate rotatably coupled to a pivot and attached to the first section. The apparatus may further comprise a housing coupled to the second section via at least one mount. The first and second section may be held together in a first state via one or more fastener and disconnected from one another in the second state in which the first section rotatable about the pivot.

In some embodiments, the at least one mount may be an isolation mount. In some embodiments, the first section may include the sump, evaporator, and condenser. In some embodiments, the second section may include the steam chest and condenser. In some embodiments, the pivot may include a bias member. In some embodiments, the bias member may be in a relaxed state when the first and second section are in the first state and may be in a compressed state when the first and second section are in the second state. In some embodiments, the bias member may have a relaxed state and an energy storing state. The support plate may have a displacement path between a first position when the bias member is in the relax state and a second position when the bias member is in the energy storing state. In some embodiments, the displacement path may be a linear displacement path. In some embodiments, the displacement path may be parallel to an axis of the pivot. In some embodiments, the bias member may be a gas spring.

In accordance with another embodiment of the present disclosure a distillation device may comprise a source fluid input in selective fluid communication with a source fluid reservoir via a set of fluid input valves. The device may further comprise an evaporator in fluid communication with the source input and in fluid communication with a compressor. The evaporator may be configured to transform source fluid from the source fluid input into a vapor stream and a concentrate stream as the source fluid travels toward the compressor. The device may further comprise a condenser in fluid communication with the compressor configured to transform pressurized vapor from the compressor into condensate. The device may further comprise a condensate flow path and a concentrate flow path including respective first and second heat exchangers. The first and second heat exchangers may each include a heat exchanging portion of a source fluid flow path from the source fluid reservoir. The heat exchanging portion may be downstream the source fluid input valves. The device may further comprise a condensate temperature sensor configured to generate a data signal indicative of a condensate temperature. The condensate temperature sensor may be disposed on the condensate flow path downstream the first heat exchanger. The device may further comprise a controller configured to actuate the set of input source valves based on a first multimodal control loop which generates a number of provisional total open state commands for all input source valves of the set of input source valves. The controller may be configured to actuate the set of input source valves based on a slider which generates a single total open state command from the number of provisional commands. The controller may be configured to actuate the set of input source valves based on a second control loop which receives the data signal and a temperature set point and allocates the total open state command between all of the input source valves to adjust the condensate temperature to the temperature set point.

In some embodiments, the heat exchanging portions of the source fluid flow paths within the first and second heat exchanger may be disposed countercurrent to their respective condensate and concentrate flow paths. In some embodiments, the controller may be configured to operate in a plurality of operational states and the temperature set point may be dependent upon the state. In some embodiments, the device further comprises a destination device in fluid communication with the condensate flow path via a point of use valve. In some embodiments, the destination device may be a medical system. In some embodiments, the medical system may be configured to mix at least one dialysate solution. In some embodiments, the destination device may be a dialysis machine. In some embodiments, the destination device may be a hemodialysis machine. In some embodiments, at least one of the first multimodal controls loop and second control loop may include a PID control loop. In some embodiments, the gain of at least one of the terms of the PID control loop may be zero. In some embodiments, the number of provisional total open state commands may be adjusted by the output of at least one adjuster control loop. In some embodiments, the distillation device may further comprise a sump. The sump may be intermediate the source input and evaporator. One of the at least one adjuster control loop may be configured to produce an output based on a target sump temperature and current sump temperature measured by a sump temperature sensor configured to generate a data signal representative of a temperature of fluid in the sump. In some embodiments, one of the at least one adjuster control loop may be configured to produce an output based on a target vapor temperature and current vapor temperature measured by a vapor temperature sensor configured to generate a data signal representative of a temperature of the vapor stream. In some embodiments, the device may further comprise a concentrate level sensor configured to output a concentrate level data signal indicative of a concentrate level within the distillation device. The controller may be configured to determine a current blowdown rate from the concentrate level data signal. The first multimodal control loop may be configured to receive a target blowdown rate and the current blowdown rate data signal and as inputs. In some embodiments, at least one of the provisional total open state commands may be a first production temperature state command and at least one of the provisional total open state commands may be a second production temperature state command. In some embodiments, the device may further comprise an evaporator level sensor configured to output an evaporator data signal. The controller may be configured to generate at least one of the provisional total open state commands based at least in part on inputs of a target evaporator sensor level and the evaporator data signal. In some embodiments, the target evaporator sensor level and the evaporator data signal may be input into a derivative controller. In some embodiments, the derivative controller may be a PID controller having a D term gain at least one order of magnitude greater than the P and I term.

In accordance with another embodiment of the present disclosure, a water vapor distillation apparatus may comprise a sump having a source fluid input. The apparatus may further comprise an evaporator having a first side in fluid communication with the source fluid input via the sump and a second side in fluid communication with a steam chest. The evaporator may be configured to transform source fluid from the source fluid input to low pressure vapor and concentrate. There may be a non-uniform liquid level in the evaporator during operation. The apparatus may further comprise an evaporator reservoir disposed laterally to the evaporator and in fluid communication therewith via the sump. The evaporator reservoir may include a level sensor configured to monitor a level of a water column in the evaporator reservoir and generate a data signal indicative of the level of the water column. The apparatus may further comprise a compressor having a low pressure vapor inlet establishing fluid communication with the steam chest and a high pressure vapor outlet establishing fluid communication with a condenser via a condenser inlet. The apparatus may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The condenser may include a condensing portion and a condensate accumulation portion. The apparatus may further comprise a processor configured to actuate a set of input source valves to the source fluid input based in part on the data signal.

In some embodiments, the level sensor may include a displaceable member which is displaceable over a displacement range which is smaller than the height of the evaporator reservoir. In some embodiments, the level sensor may include a displaceable member which is displaceable over a displacement range extending from a first end portion of the evaporator reservoir to at least a midpoint of the evaporator reservoir. The displacement range may be a distance less than 70% of the height of the evaporator reservoir. In some embodiments, the first end may be an end of the evaporator reservoir most distal to the sump. In some embodiments, the evaporator reservoir may be in communication with the steam chest via a venting pathway extending from a first end portion of the evaporator reservoir. In some embodiments, the venting pathway may extend from the evaporator reservoir to a concentrate reservoir attached and disposed laterally to the steam chest. In some embodiments, the height of the evaporator reservoir may be greater than the height of the evaporator. In some embodiments, the processor may be configured to determine a total open state time for the set of input source valves based in part on a target water column level and a current water column level determined via analysis of the data signal. In some embodiments, the processor may be configured to determine the total open state time for the set of input source valves based in part on the output of a PID controller which receives the target water column level and the current water column level as inputs. In some embodiments, a gain for at least one of a P term, I term, and D term of the PID controller may be zero. In some embodiments, a gain for a D term of the PID controller may be at least one order of magnitude greater than a gain for a P term and an I term of the PID controller. In some embodiments, a gain for a D term of the PID controller may be more than two orders of magnitude greater than a gain for a P term and an I term of the PID controller. In some embodiments, the processor may be configured to determine the total open state time based in part on a target blowdown rate and a current blowdown rate as indicated from a blowdown level data signal produced by a blowdown level sensor in a blowdown reservoir attached to the steam chest. In some embodiments, the processor may be configured to determine a total open state command in part based on the output of at least one adjuster control loop. In some embodiments, one of the at least one adjuster control loop may be configured to produce an output based on a target sump temperature and current sump temperature measured by a sump temperature sensor configured to generate a data signal representative of a temperature of fluid in the sump. In some embodiments, one of the at least one adjuster control loop may be configured to produce an output based on a target vapor temperature and current vapor temperature measured by a vapor temperature sensor configured to generate a data signal representative of a temperature of the vapor stream. In some embodiments, the controller may be configured to alter a total open state command for the set of input source valves in response to a change in the water column level indicated by the data signal. In some embodiments, the controller may be configured to alter a total open state command for the set of input source valves in proportion to a rate of change in the water column as indicated by the data signal.

In accordance with another embodiment of the present disclosure a method of controlling flow of a source fluid into a distillation device may comprise establishing a non-uniform liquid level in an evaporator of the distillation device. The method may further comprise sensing, with a first level sensor, a liquid column level in an evaporator reservoir in fluid communication with the evaporator and disposed at even height with the evaporator. The method may further comprise sensing, with a second level sensor, a concentrate level in a concentrate reservoir in fluid communication with the evaporator. The method may further comprise generating, with a processor, a source inlet valve open time command based at least in part on the concentrate level and a target concentrate accumulation rate as well as a delta between the liquid column level and a target liquid column level. The method may further comprise commanding a number of source inlet valves to open based on the source inlet valve open time command.

In some embodiments, sensing the liquid column level may comprise displacing a displaceable member over a displacement range which is smaller than a height of the evaporator reservoir. In some embodiments, sensing the liquid column level may comprise displacing a displaceable member over a displacement range extending from a first end portion of the evaporator reservoir to at least a midpoint of the evaporator reservoir. The displacement range may be a distance less than 70% of a height of the evaporator reservoir. In some embodiments, the first end may be an end of the evaporator reservoir most distal to a sump of the distillation device. In some embodiments, the method may further comprise venting the evaporator reservoir, via a venting pathway, into a steam chest of the distillation device disposed superiorly to the evaporator. In some embodiments, the venting pathway may extend from the evaporator reservoir to a concentrate reservoir attached and disposed laterally to the steam chest. In some embodiments, generating the source inlet valve open time command may comprise inputting the delta to a PID controller. In some embodiments, a gain for at least one of a P term, I term, and D term of the PID controller may be zero. In some embodiments, a gain for a D term of the PID controller may be at least one order of magnitude greater than a gain for a P term and an I term of the PID controller. In some embodiments, a gain for a D term of the PID controller may be more than two orders of magnitude greater than a gain for a P term and an I term of the PID controller. In some embodiments, generating the source inlet valve open time command may comprise determining a current concentrate accumulation rate from the concentrate level and calculating a delta between a target concentrate rate and a current concentrate accumulation rate. In some embodiments, generating the source inlet valve open time command may comprise generating an output of at least one adjuster control loop. In some embodiments, the method may further comprise sensing a current sump temperature with a sump temperature sensor and generating the output of at least one adjuster control loop comprises producing the output based on a target sump temperature and current sump temperature. In some embodiments, the method may further comprise sensing a temperature of a vapor stream in the distillation device with a vapor temperature sensor. In some embodiments, generating the output of at least one adjuster controller may comprise producing the output based on a target vapor temperature and current vapor temperature. In some embodiments, the method may further comprise altering the source inlet valve open time command in response to a change in the liquid column level. In some embodiments, the method may further comprise altering the source inlet valve open time command in proportion to a rate of change in the liquid column level.

In accordance with another embodiment of the present disclosure a fluid vapor distillation apparatus may comprise at least one controller. The apparatus may further comprise a source inlet in selective fluid communication with a fluid source via at least one valve. The apparatus may further comprise an evaporator in fluid communication with the source inlet. The apparatus may further comprise a steam chest coupled to the evaporator and in fluid communication with a compressor. An exterior surface of the steam chest may form a portion of an inlet flow path to the compressor and a portion of an outlet flow path to an outlet of the compressor. The apparatus may further comprise a concentrate reservoir. The concentrate reservoir may be attached to the steam chest via an inflow path and disposed laterally to the steam chest such that at least a portion of the concentrate reservoir is at even height with the steam chest. The apparatus may further comprise a condenser in fluid communication with the outlet of the compressor via a straight line flow path. The straight line flow path may include a condenser inlet fixedly attached to a sheet having a first face defining a portion of the steam chest and an opposing face defining a portion of the condenser. The apparatus may further comprise a product process stream reservoir coupled to the condenser by a product reservoir inlet, and disposed laterally to the condenser such that at least a portion of the product process stream reservoir is at even height with the condenser.

In some embodiments, the inflow path may include an obstruction. In some embodiments, the obstruction may include a wall which extends into the concentrate reservoir at an angle substantially perpendicular to the inflow path. In some embodiments, the obstruction may extend into the concentrate reservoir and divide the concentrate reservoir into a first portion and a second, sheltered portion. In some embodiments, the obstruction may include at least one vent port. In some embodiments, the product reservoir inlet may be adjacent a product accumulation surface of the condenser. In some embodiments, the compressor may be driven by a motor partially disposed within a receiving well recessed into the side of the steam chest. In some embodiments, the compressor may include an impeller which rotates about an axis which extends lateral to the steam chest and is parallel with respect to a longitudinal axis of the steam chest.

In accordance with another embodiment of the present disclosure, a distillation device may comprise a source fluid input in selective fluid communication with a source via a set of fluid input valves. The device may further comprise an evaporator in fluid communication with the source input and in fluid communication with a compressor having an impeller operatively coupled to an impeller motor. The evaporator may be configured to transform source fluid from the source fluid input into a vapor stream and a concentrate stream as the source fluid travels toward the compressor. The device may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The device may further comprise a concentrate level sensor configured to sense a current level of concentrate in a concentrate reservoir having an inflow path disposed above the evaporator and having a long axis which extends alongside the evaporator. The device may further comprise at least one controller configured to govern a rotation speed of the impeller in a low temperature distillate production state and a high temperature distillate production state by periodically generating an impeller motor command based on a low temperature distillate production nominal speed command in the low temperature distillate production state and a high temperature distillate production nominal speed command in the high temperature distillate production state. The low temperature distillate production nominal speed command may be a faster motor speed command than the high temperature distillate production nominal speed command.

In some embodiments, an adjustment may be made to the impeller motor command based on a data signal from the concentrate level sensor indicative of a level of concentrate in the concentrate reservoir. In some embodiments, the adjustment may be limited by an impeller motor command increment limit. In some embodiments, the impeller motor command increment limit may ≤10 rpm/sec. In some embodiments, the impeller motor command increment limit may be ≤5 rpm/sec. In some embodiments, the impeller motor command may be decremented when the data signal indicates that the level of concentrate in the concentrate reservoir is greater than a first threshold. In some embodiments, the first threshold may be defined as the concentrate level at which the concentrate reservoir is at a predefined fill value between 65-80% full. In some embodiments, the impeller motor command may be held to no greater than a previously commanded impeller motor command value when the data signal indicates that the level of concentrate in the concentrate reservoir is greater than a first threshold. In some embodiments, the first threshold may be defined as the concentrate level at which the concentrate reservoir is at a predefined fill value between 65-80% full. In some embodiments, the impeller motor command may be incremented when the data signal indicates that the level of concentrate in the concentrate reservoir is greater than a second threshold. In some embodiments, the high temperature distillate production nominal speed command may a calibrated value defined during manufacture. In some embodiments, the high temperature distillate production nominal speed command may be less than 80% of the low temperature distillate production nominal speed command and more than 45% of the low temperature distillate production nominal speed command. In some embodiments, the low temperature distillate production nominal speed command may be 4500 rpm. In some embodiments, the low temperature distillate production nominal speed command may be 5000 rpm.

In accordance with another embodiment of the present disclosure a method of controlling a compressor of a distillation device may comprise opening at least one fluid input valve to deliver source fluid into a sump of the distillation device from a fluid source. The method may further comprise transforming source fluid into a concentrate stream and vapor stream in an evaporator. The method may further comprise determining, with a processor, a state specific compressor speed command. The compressor speed command may be based on a low temperature distillate production nominal speed command in a low temperature distillate production state and based on a high temperature distillate production nominal speed command in a high temperature distillate production state. The low temperature distillate production nominal speed command may be a faster motor speed command than the high temperature distillate production nominal speed command. The method may further comprise generating, with the processor, a final command speed based on the compressor speed command. The method may further comprise commanding, with the processor, rotation of an impeller of the compressor at the final command speed. The method may further comprise compressing the vapor stream via the compressor. The method may further comprise condensing the vapor stream into a condensate and transferring heat to the evaporator as the vapor stream condenses.

In some embodiments, the method may further comprise sensing, with a level sensor, a level of concentrate in a concentrate reservoir in fluid communication with the evaporator. In some embodiments, generating the final command speed may comprise determining an adjustment to the compressor speed command based on the level of concentrate. In some embodiments, determining the adjustment may comprise decrementing the compressor speed command when the level of concentrate is greater than a first threshold. In some embodiments, the first threshold may be defined as the concentrate level at which the concentrate reservoir is at a predefined fill value between 65-80% full. In some embodiments, determining the adjustment may comprise holding the final command speed to no greater than a previously commanded final command speed when the level of concentrate is greater than the first threshold. In some embodiments, determining the adjustment may comprise decrementing the compressor speed command when the level of concentrate is greater than a second threshold. In some embodiments, generating the final command speed may comprise determining an adjustment to the compressor speed command. In some embodiments, the adjustment may be limited by an increment limit. In some embodiments, the increment limit may be ≤10 rpm/sec. In some embodiments, the increment limit may be ≤5 rpm/sec. In some embodiments, the high temperature distillate production nominal speed command may be a calibrated value defined during manufacture. In some embodiments, the high temperature distillate production nominal speed command may be less than 80% of the low temperature distillate production nominal speed command and more than 70% of the low temperature distillate production nominal speed command. In some embodiments, the low temperature distillate production nominal speed command may be 4500 rpm.

In accordance with another embodiment of the present disclosure a distillation device may comprise a sump in selective fluid communication with a source via a set of fluid input valves. The device may further comprise at least one heating element and a least one sump temperature sensor in the sump. The sump temperature sensor may be configured to generate a sump temperature data signal. The device may further comprise an evaporator having a first side in fluid communication with the sump and a second side in fluid communication with a compressor having an impeller operatively coupled to an impeller motor. The evaporator may be configured to transform source fluid from the source fluid input to a vapor stream and concentrate. The device may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The device may further comprise a concentrate level sensor configured to sense a current level of concentrate in a concentrate reservoir having an inflow path disposed above the evaporator and having a long axis which extends alongside the evaporator. The device may further comprise a vapor temperature sensor disposed in a flow path of the vapor stream and configured to generate a vapor temperature data signal. The device may further comprise at least one controller configured to determine a duty cycle command for the at least one heating element. The duty cycle command may be based at least in part upon a target temperature of the vapor stream, the vapor temperature data signal, the sump temperature data signal and a total source open command for the set of fluid input valves. In some embodiments, the target temperature of the vapor stream may be 108° C. In some embodiments, the controller may be configured to adjust the duty cycle command to conform with at least one limit. In some embodiments, the limit may be a maximum power consumption limit. In some embodiments, the controller may be configured to adjust the duty cycle command based at least in part on a power consumption of the compressor. In some embodiments, the controller may be configured to calculate a limit for the duty cycle command by determining a power consumption of the compressor and subtracting the power consumption of the compressor from a predefined power value. In some embodiments, the predefined power value may be defined as a maximum total power for the system. In some embodiments, the duty cycle command may be limited to a predefined maximum duty cycle. In some embodiments, the predefined maximum duty cycle may not greater than a 90% duty cycle. In some embodiments, the target temperature of the vapor stream may be state specific. In some embodiments, the target temperature in a low temperature distillate production state may be higher than the target temperature in a high temperature distillate production state. In some embodiments, the target temperature of the vapor stream in a first state may be 108° C. and the target temperature of the vapor stream in a second state may be 104° C. In some embodiments, the target temperature in a first state may be 4° C. hotter than the target temperature in a second state. In some embodiments, the target temperature in a first state may be at least 95% of the target temperature in a second state, but less than the target temperature in the second state. In some embodiments, the controller may be configured to determine a feed forward term used to determine the duty cycle command based on the total source open command for the set of fluid input valves and at least one thermodynamic characteristic of the source fluid. In some embodiments, the thermodynamic characteristic may be a specific heat of the source fluid. In some embodiments, the target temperature of the vapor stream may be 111-112° C.

In accordance with an embodiment of the present disclosure a method of heating fluid in a distillation device may comprise opening at least one fluid input valve to deliver source fluid into a sump of the distillation device from a fluid source. The method may further comprise sensing a sump temperature of the source fluid in the sump via a temperature sensor. The method may further comprise sensing a vapor temperature of a vapor stream generated from the source fluid. The method may further comprise comparing, with a processor, the vapor temperature to a target vapor temperature. The method may further comprise inputting a delta between the vapor temperature and the target vapor temperature to a first controller and generating a first controller output. The method may further comprise providing an input based at least in part upon the first controller output and sump temperature to a second controller and generating a second controller output. The method may further comprise altering the second controller output into an altered second controller output based on a total open state time of the at least one fluid input valve. The method may further comprise commanding a duty cycle for a heating element in the sump based on the altered second controller output and at least one limit.

In some embodiments, the target vapor temperature may be in a range of 108° C.-112° C. In some embodiments, the at least one limit may include a maximum power consumption limit. In some embodiments, the at least one limit may include a limit based at least in part on a power consumption of a compressor in the distillation device. In some embodiments, the method may further comprise calculating a limit of the at least one limit by determining a power consumption of the compressor and subtracting the power consumption of the compressor from a predefined power value. In some embodiments, the predefined power value may be defined as a maximum total power for the system. In some embodiments, the at least one limit may include a predefined maximum duty cycle limit. In some embodiments, the predefined maximum duty cycle may not be greater than a 90% duty cycle. In some embodiments, the target vapor temperature of the vapor stream may be state specific. In some embodiments, target temperature in a low temperature distillate production state may be higher than the target temperature in a high temperature distillate production state. In some embodiments, the target temperature in a first state may be 4° C. hotter than the target temperature in a second state. In some embodiments, the target temperature in a first state may be at least 95% of the target temperature in a second state, but less than the target temperature in the second state. In some embodiments, the second controller output into an altered second controller output may comprise determining a feed forward term based on the total source open command of the at least one fluid input valve and at least one thermodynamic characteristic of the source fluid. In some embodiments, the thermodynamic characteristic may be a specific heat of the source fluid.

In accordance with an embodiment of the present disclosure, a water distillation device may comprise a sump in selective fluid communication with a fluid source via a set of source proportioning valves. The device may further comprise an evaporator in fluid communication with the sump. The device may further comprise a steam chest coupled to the evaporator and in fluid communication with a compressor. The device may further comprise a concentrate reservoir attached to the steam chest via an inflow path and having a concentrate level sensor configured to generate a concentrate level data signal indicative of fill percentage of the concentrate reservoir. The concentrate reservoir may be coupled to a concentrate flow path. The device may further comprise a condenser coupled to an outlet of the compressor and in fluid communication with a condensate flow path. The device may further comprise a first and second heat exchanger including a heat exchanging portion of a source fluid flow path from the fluid source. The heat exchanging portion of the first heat exchanger may be in heat exchange relationship with the condensate flow path and the heat exchanging portion of the second heat exchanger in heat exchange relationship the concentrate flow path. The heat exchanging portions of the source fluid flow path may be downstream the source proportioning valves. The device may further comprise at least one distillate sensor in communication with the condensate flow path at a point downstream the first heat exchanger. The device may further comprise a controller configured to determine a total open state time of the source proportioning valves based at least in part on the concentrate data signal and a target concentrate rate. The controller may be configured to allocate percentages of the total open state command to each of the source proportioning valves based on at least one distillate sensor data signal from the at least one distillate sensor.

In some embodiments, the condenser may include a condensing portion and a condensate accumulation portion. In some embodiments, the condenser may be in fluid communication with a condensate reservoir including a condensate level sensor configured to monitor a level of condensate in the condensate reservoir and generate a condensate data signal indicative of a fill percentage of the condensate accumulation portion. The condensate reservoir may be intermediate the condenser and concentrate flow path. In some embodiments, the controller may be configured to maintain a target fill percentage of the condensate accumulation portion based on the output of a PID control loop which uses as inputs the target fill percentage and a delta between the target fill percentage and the current fill percentage as indicated by the condensate data signal. In some embodiments, the target fill percentage may be equivalent to at least one liter and less than 2 liters. In some embodiments, the condenser may be in fluid communication with a condensate reservoir including a condensate level sensor configured to monitor a level of condensate in the condensate reservoir and generate a condensate data signal indicative of a fill percentage of the condensate reservoir. The condensate reservoir intermediate the condenser and concentrate flow path. In some embodiments, the at least one distillate sensor may include a temperature sensor. In some embodiments, the at least one distillate sensor data signal may be a temperature data signal indicative of a current condensate temperature after passing through the heat exchanger. In some embodiments, the controller may be configured to allocate the percentages of the total open state command to each of the source proportioning valves based on a control loop which uses a target condensate temperature and the current condensate temperature as inputs. In some embodiments, the target temperature may be at least 35° C., but no greater than 40° C. In some embodiments, the target temperature may be at least 20° C., but no greater than 30° C. In some embodiments, the target temperature may be at least 90° C., but less than 100° C. In some embodiments, the distillation device may further comprise a fluid source temperature sensor which generates a data signal indicative of the temperature of the source fluid and the target temperature may be determined by the controller based in part on the source temperature data signal. In some embodiments, the target temperature may be limited to a range of 20-25° C.

In accordance with another embodiment of the present disclosure, a distillation system may comprise a distillation device in selective fluid communication with a fluid source via a set of source proportioning valves. The distillation device may have a concentrate output coupled to a concentrate flow path and may have a condensate output coupled to a condensate flow path. The system may further comprise a first and second heat exchanger each including a heat exchanging portion of a source fluid flow path from the fluid source downstream of the source proportioning valves. The heat exchanging portion of the first heat exchanger may be in heat exchange relationship with the condensate flow path and the heat exchanging portion of the second heat exchanger may be in heat exchange relationship the concentrate flow path. There may be a dedicated source proportioning valve for each heat exchanger. The system may further comprise a condensate sensor assembly in communication with the condensate flow path at a point downstream of the first heat exchanger. The system may further comprise a controller configured to, in a first operating mode, split a commanded flow of source fluid from the fluid source between the source proportioning valves based on a delta between a first target temperature and a current concentrate temperature received by the controller from the condensate sensor assembly. In a second mode, the controller may be configured to allocate the entire commanded flow to the source proportioning valve dedicated to the second heat exchanger and open the source proportioning valve dedicated to the first heat exchanger at a duty cycle which may be no greater than a predefined limit.

In some embodiments, the predefined limit may be 5%. In some embodiments, the predefined limit may be 2%. In some embodiments, the predefined limit may be 0%. In some embodiments, the condensate sensor assembly may include redundant temperature sensors. In some embodiments, the first and second heat exchanger may be helical and formed by winding the heat exchanger around the exterior of the distillation device. In some embodiments, the first operating mode may be a low temperature distillate production state and the second operating mode may be a hot temperature distillate production state. In some embodiments, the first target temperature may be at least 35° C., but no greater than 40° C. In some embodiments, the first target temperature may be at least 20° C., but less than 25° C. In some embodiments, the controller may be configured to open the source proportioning valve dedicated to the first heat exchanger based upon a second target temperature and a delta between the second target temperature and the current concentrate temperature in the second operating mode. In some embodiments, the second target temperature may be at least 65° C. hotter than the first target temperature. In some embodiments, the second target temperature may be at least 50° C. hotter than the first target temperature. In some embodiments, the second target temperature may be greater than 95° C. and less than 100° C. in some embodiments, the second target temperature may be 96° C. In some embodiments, the second target temperature may be at least double the first target temperature. In some embodiments, the second target temperature may be at least 2.5 times the first target temperature. In some embodiments, the second target temperature may be at least 3.5 times the first target temperature. In some embodiments, the system may further comprise an evaporator level sensor disposed in an evaporator reservoir in fluid communication with an evaporator of the distillation device. The controller may be configured to, in the second operational state, determine the total flow command at least in part based on an evaporator level data signal indicative of a level of a water column in the evaporator reservoir. In some embodiments, the first target temperature may be at least 20° C., but no greater than 30° C. In some embodiments, the first target temperature is 25° C.

In accordance with another embodiment of the present disclosure a method of controlling and allocating a flow of source fluid into a distillation device may comprise sensing, with a concentrate level sensor, a concentrate level in a concentrate reservoir in fluid communication with an evaporator of the distillation device. The method may further comprise sensing a temperature of product fluid produced by the distillation device at a point downstream of a product heat exchanger which places product fluid in heat exchange relationship with incoming source fluid. The method may further comprise determining, with a processor, a concentrate accumulation rate based on the concentrate level. The method may further comprise calculating, with a processor, a first delta between the concentrate accumulation rate and a first target concentrate accumulation rate and a second delta between the concentrate accumulation rate and a second target concentrate accumulation rate. The method may further comprise determining, with a processor, a first provisional open state command and second provisional open state command for a first and second source inflow proportioning valve. The first provisional open state command may be based on the first delta and the second provisional open state command based on the second delta. The method may further comprise computing, with a processor, a final open state command from the provisional open state time commands. The method may further comprise dividing, with the processor in a first operational state, the final open state command between the first source inflow proportioning valve and second inflow proportioning valve. The first source inflow proportioning valve may lead to a product heat exchanger. The dividing may be based on a delta between a target product temperature and the temperature of the product fluid. The method may further comprise allocating, with the processor in a second operational state, an entirety of the final open state command to the second source inflow proportioning valve. The method may further comprise opening, via a command from the processor, the first source inflow proportioning valve at a duty cycle which is no greater than a predefined limit with the processor in the second operational state.

In some embodiments, the first target accumulation rate may be greater than the second target accumulation rate. In some embodiments, computing the final open state command may comprise inputting the first provisional open state command and second provisional open state command into a slider. In some embodiments, computing the final open state command may comprise generating a hybrid command from the first and second provisional source open state commands. In some embodiments, computing the final open state command may comprise determining a first state fraction and a second state fraction and multiplying the first provisional open state command by the first state fraction and multiplying the second provisional open state command by the second state fraction. In some embodiments, computing the final open state command comprises adjusting the command from predominately the first provisional open state command to predominately the second provisional open state command during a transition between the first operational state and the second operational state. In some embodiments, computing the final open state command may comprise adjusting the command from purely the first provisional open state command to purely the second provisional open state command during a transition between the first operational state and the second operational state. In some embodiments, the second operational state may be a hot distillate production state. In some embodiments, the dividing may comprise determining an open state command for the first source inflow proportioning valve based on a delta between a target product temperature and the temperature of the product fluid and determining an open state command for the second source inflow proportioning valve by subtracting the open state command from the first source inflow proportioning valve from the final open state command. In some embodiments, the predefined limit may be a limit of less than 5%. In some embodiments, the predefined limit may be a limit of less than 2%. In some embodiments, the predefined limit may be 0%. In some embodiments, the determining the second provisional open state command further may comprise sensing a level of a liquid column, with an evaporator level sensor, in an evaporator reservoir in fluid communication with the evaporator. The second provisional open state command may be based in part on a delta between the level of the liquid column and a target level of the liquid column. In some embodiments, the second provisional open state command may be based on a rate of change in the delta between the level of the liquid column and the target level of the liquid column.

In accordance with an embodiment of the present disclosure a medical system may comprise at least one concentrate fluid. The system may further comprise a distillation device having an evaporator, a condenser, and a purified product water heat exchanger having a source fluid flow path and a purified product water flow path in heat exchange relation with one another. The system may further comprise a medical treatment device the medical treatment device may include a treatment fluid preparation circuit in selective fluid communication, via a point of use valve, with the purified product water flow path. The medical treatment device may include a treatment device processor configured to command mixing of the at least one concentrate and purified water to generate a prescribed treatment fluid with the treatment fluid preparation circuit. The system may further comprise a communications link between the treatment device processor of the medical treatment device and a distillation device processor of the distillation device. The medical treatment device processor may be configured to transmit mode commands to the distillation device processor. The system may further comprise a sensor assembly in communication with the purified product water flow path. The system may further comprise a source valve intermediate a fluid source and the source fluid flow path. The distillation device processor may be configured to actuate the source valve based at least in part on the mode commands and data from the sensor assembly.

In some embodiments, the sensor assembly may include at least one temperature sensor and at least one conductivity sensor. In some embodiments, the distillation device processor may be configured to actuate the source valve based at least in part on the mode commands and temperature data from the sensor assembly. In some embodiments, the distillation device processor may be configured to actuate the source valve based at least in part on the mode commands and data from the sensor assembly and a target set point for purified water. In some embodiments, the target set point may be a temperature set point. In some embodiments, the target set point may be determined by the distillation device processor based on the mode commands. In some embodiments, the target set point may be based off a first mode command of the mode commands which may be in the range of 20-35° and a target set point based off a second mode command of the mode commands which may be greater than 90° C.

In some embodiments, the medical treatment device may be a dialysis machine. In some embodiments, the medical treatment device may be a hemodialysis device. In some embodiments, the treatment fluid may be a dialysis fluid. In some embodiments, the condenser may include a condensing section and a product storage section. The product storage portion may have a volume of at least one liter. In some embodiments, the distillation device processor may be further configured to govern operation of a compressor motor of the distillation device based at least in part on the mode commands. In some embodiments, the distillation device processor may be further configured to govern operation of a concentrate outlet valve of the distillation device based at least in part on the mode commands.

In accordance with an embodiment of the present disclosure a medical system may comprise a distillation device having and evaporator, a source inlet flow path to a source input in fluid communication with the evaporator, a condenser, a purified product water output flow path in fluid communication with the condenser. The system may further comprise a first and second filter in the source inlet flow path. The system may further comprise a plurality of pressure sensors including a first pressure sensor upstream the first filter and a second pressure sensor downstream the second filter. The system may further comprise a medical treatment device the medical treatment device including a treatment fluid preparation circuit in selective fluid communication, via a point of use valve, with the purified product water output flow path. The system may further comprise a communications link between a treatment device processor of the medical treatment device and a distillation device processor of the distillation device. The distillation device processor may be configured to conduct a first filter replacement check based on data from the plurality of pressure sensors and the treatment device processor may be configured to conduct a second filter replacement check and command the distillation device processor into a filter replacement mode, via the communications link, when either of the first or second filter replacement check fails.

In some embodiments, the second filter replacement check may include a check of a number of days elapsed since installation of the first and second filter against a limit. In some embodiments, the medical treatment device may include a graphical user interface. In some embodiments, the second filter replacement check may include a check of a user input on the graphical user interface against at least one predefined criteria. In some embodiments, the system may further comprise a sampling port disposed intermediate the first and second filter and the predefined criteria may be a water chemistry test strip criteria. In some embodiments, the water chemistry test strip criteria may be a chlorination level criterion. In some embodiments, the distillation device processor may be configured to command a flush of the first and second filter prior to at least one of the first filter replacement check or second filter replacement check. In some embodiments, the distillation device processor may be configured to conduct the first filter replacement check based on a filter output pressure data signal from the second pressure sensor. In some embodiments, the distillation device processor may be configured to indicate a failure of the first filter replacement check when the filter output pressure is below a threshold. In some embodiments, the distillation device processor may be configured to conduct the first filter replacement check based on a delta between a pressure upstream of the first and second filter as indicated by the first pressure sensor and a pressure downstream of the first and second filter as indicated by the second pressure sensor. In some embodiments, the distillation device processor may be configured to indicate a failure of the first filter replacement check when the delta is less than a threshold.

In accordance with another embodiment of the present disclosure A medical system may comprise a distillation device having a source water input and a fluid output flow path. The system may further comprise a medical treatment device including a plurality of fluid flow paths, a plurality of valves, at least one fluid pump, and a fluid inlet in selective fluid communication, via a point of use valve, with the fluid output flow path. The system may further comprise a communications link between the medical treatment device and distillation device. The system may further comprise a sensor assembly in communication with the fluid output flow path. The system may further comprise a treatment device processor configured to actuate the plurality of valves and the at least one fluid pump to pump a high temperature fluid through the plurality of fluid flow paths. The system may further comprise a distillation device processor configured to govern operation of the distillation device based on at least one data signal from the sensor assembly and a mode command sent over the communications link from a treatment device processor of the medical treatment device to produce and output the high temperature fluid to the fluid output flow path during a first period in which the point of use valve is commanded open by the distillation device processor and a second period in which the point of use valve is commanded closed by the distillation device processor and a valve to a flow path in fluid communication the fluid output flow path is commanded open.

In some embodiments, the source water input may be in fluid communication with a non-temperature controlled fluid source. In some embodiments, the medical treatment device may be a dialysis machine. In some embodiments, the medical treatment device may be a hemodialysis machine. In some embodiments, the plurality of fluid flow paths may include a first flow path and second flow path separated from one another by a semi-permeable membrane. In some embodiments, the plurality of fluid flow paths may be included in at least a blood pumping cassette and a dialysate pumping cassette. In some embodiments, the medical treatment device may include a fluid reservoir and the treatment device processor may be configured to send a signal to the distillation device processor to end the first period based on an amount high temperature fluid contained in the fluid reservoir. In some embodiments, the medical treatment device may include a heater. In some embodiments, the at least one data signal may include at least one temperature data signal. In some embodiments, the distillation device may include a compressor and the distillation device processor may be configured to govern operation of the compressor via a compressor speed command determined based in part on of the mode command. In some embodiments, the distillation device processor may be configured to govern operation of the distillation device based on the least one data signal and another mode command sent over the communications link from a treatment device processor to produce and output a medical treatment fluid component to the fluid output flow path. In some embodiments, the plurality of flow paths may comprise a medical treatment fluid mixing circuit and the treatment device processor may be configured to command operation of the at least one pump and plurality of valves to mix the medical treatment fluid component with at least one concentrate in fluid communication with the plurality of flow paths in accordance with a predetermined prescription.

In accordance with another embodiment of the present disclosure a water distillation apparatus may comprise a sump having a source fluid input. The apparatus may further comprise an evaporator in fluid communication with the source fluid input via the sump. The apparatus may further comprise a condenser including a condensing portion and a condensate accumulation portion. The apparatus may further comprise an auxiliary condensate reservoir in fluid communication with the condensate accumulation portion and attached to the condenser adjacent an accumulation surface of the accumulation portion. The auxiliary condensate reservoir may be fluidly coupled to a point of use device via a condensate flow path. The apparatus may further comprise a condensate level sensor configured to monitor a level of condensate in the accumulation portion and generate a data signal indicative of a fill level of the accumulation portion. The apparatus may further comprise a controller configured to govern operation of a diverting valve included in the condensate flow path based at least in part on the data signal and a target condensate level. The controller may further be configured to command the diverting valve to a closed state based on a derivative of the data signal.

In some embodiments, the accumulation portion may have a volume less than ten liters. In some embodiments, the condensate level sensor may include a float assembly attached to a pivot. The float assembly may be displaceable about the pivot over a displacement range inclusive of points at even height with a range of fill levels in the accumulation portion. In some embodiments, the condensate level sensor may include a float displaceable along a displacement axis over a displacement range inclusive of points at even height with a range of fill levels in the accumulation portion. In some embodiments, the condensate level sensor may include a float displaceable along a displacement path through a displacement range inclusive of points at even height with a range of fill levels in the accumulation portion. In some embodiments, the controller may be configured to command the diverting valve to a closed state based on the derivative of the data signal exceeding a predefined minimum threshold. In some embodiments, the controller may be configured to command the diverting valve to a closed state based on the derivative of the data signal having a negative value greater than a predefined magnitude. In some embodiments, the controller may be configured to command the diverting valve to a closed state based on the derivative of the data signal indicating the point of use device is consuming condensate from the distillation apparatus. In some embodiments, the apparatus may further comprise a heat exchanger including a portion of the condensate flow path and a portion of a source flow path coupled to a water source and the source fluid input. In some embodiments, the apparatus may further comprise a sensing assembly in communication with the condensate flow path downstream the portion of the condensate flow path included in the heat exchanger. The sensing assembly may be configured to output a temperature data signal. In some embodiments, the controller may be configured to command the diverting valve to a closed state based on a derivative of the temperature data signal. In some embodiments, the controller may be configured to command the diverting valve to a closed state based on a derivative of the temperatures data signal exceeding a predefined maximum threshold. In some embodiments, the controller may be configured to command the diverting valve to a closed state based on a derivative of the temperature data signal having a positive value greater than a predefined magnitude. In some embodiments, the controller may be configured to command the diverting valve to a closed state based on a derivative of the temperature data signal indicating the point of use device is consuming condensate from the distillation apparatus. In some embodiments, the controller may be configured to command the diverting valve to a closed state based on an integral of a derivative of the temperature data signal. In some embodiments, the controller may be configured to command the diverting valve to a closed state based on an integral of a derivative of the temperatures data signal exceeding a predefined maximum threshold. In some embodiments, the controller may be configured to command the diverting valve to a closed state based on an integral of a derivative of the temperature data signal having a positive value greater than a predefined magnitude. In some embodiments, the controller may be configured to command the diverting valve to a closed state based on an integral of a derivative of the temperature data signal indicating the point of use device is consuming condensate from the distillation apparatus.

In accordance with another embodiment of the present disclosure, a water distillation apparatus may comprise a sump having a source fluid input. The apparatus may further comprise an evaporator in fluid communication with the source fluid input via the sump. The apparatus may further comprise a condenser fluidly coupled to a point of use device via a condensate flow path. The apparatus may further comprise a condensate level sensor configured to generate a data signal indicative of a fill level of the condenser. The apparatus may further comprise a heat exchanger including a portion of the condensate flow path and a portion of a source flow path coupled to a water source and the source fluid input. The apparatus may further comprise a sensing assembly in communication with the condensate flow path downstream the portion of the condensate flow path included in the heat exchanger. The sensing assembly may be configured to output a sensor assembly data signal. The apparatus may further comprise a controller configured to govern operation of a diverting valve included in the condensate flow path based at least in part on the data signal and a target condensate level. The controller may further be configured to command the diverting valve to a closed state based on a derivative of the sensor assembly data signal.

In some embodiments, the controller may be configured to command the diverting valve to a closed state based on a derivative of the sensor assembly data signal. In some embodiments, the controller may be configured to command the diverting valve to a closed state based on a derivative of the sensor assembly data signal exceeding a predefined maximum threshold. In some embodiments, the controller may be configured to command the diverting valve to a closed state based on a derivative of the sensor assembly data signal having a positive value greater than a predefined magnitude. In some embodiments, the controller may be configured to command the diverting valve to a closed state based on a derivative of the sensor assembly data signal indicating the point of use device is consuming condensate from the distillation apparatus. In some embodiments, the controller may be configured to command the diverting valve to a closed state based on an integral calculated using the sensor assembly data signal. In some embodiments, the integral may be calculated from a derivative of the sensor assembly data signal. In some embodiments, the controller may be configured to command the diverting valve to a closed state based on the integral exceeding a predefined maximum threshold. In some embodiments, the controller may be configured to command the diverting valve to a closed state based on the integral having a positive value greater than a predefined magnitude. In some embodiments, the controller may be configured to command the diverting valve to a closed state based on the integral indicating the point of use device is consuming condensate from the distillation apparatus. In some embodiments, the sensor assembly data signal may be a temperature data signal.

In accordance with another embodiment of the present disclosure a water purification system for outputting a process stream at a controlled temperature may comprise a distillation device in selective fluid communication with a fluid source via a set of source proportioning valves. The distillation device may have a concentrate output and distillate output respectively coupled to a concentrate flow path and a distillate flow path. The system may further comprise a first heat exchanger including a portion of the distillate flow path and a second heat exchanger including a portion of the concentrate flow path. A flow path from the fluid source may be in heat exchange relationship with each of the first and second heat exchanger. The system may further comprise a distillate sensor assembly in communication with the distillate flow path downstream of the portion of the distillate flow path included in the first heat exchanger and configured to generate a distillate temperature measurement. The system may further comprise a controller configured to actuate the set of input source valves based on a first multimodal control loop which generates a number of provisional total open state commands for the source proportioning valves, a slider which generates a single total open state command from the number of provisional commands, a second control loop which receives the distillate temperature measurement, a first target temperature, and a second target temperature, and allocates the single total open state command between all of the input source valves to adjust the condensate temperature to a temperature set point.

In some embodiments, the system may further comprise an electronics box in thermal communication with the source fluid flow path. In some embodiments, the second control loop may allocate the total open state command at least in part by generating provisional allocating commands based at least in part on the first target temperature and second target temperature and inputting the provisional allocating commands into a second slider. In some embodiments, the controller may be configured to operate in a plurality of operational states and the temperature set point is dependent upon the state. In some embodiments, the controller may be configured to transition between a first state of the plurality of operational states and a second state of the plurality of operational states. In some embodiments, at least one of the first multimodal controls loop and second control loop may include one or more PID control loop. In some embodiments, the one or more PID control loop may include a feed forward term which alters the output of the one or more PID loop. In some embodiments, the number of provisional total open state commands may be adjusted by the output of at least one adjuster control loop. In some embodiments, one of the at least one adjuster control loop may be configured to produce an output based at least in part on a concentrate temperature. In some embodiments, at least one of the number of provisional total open state commands may be adjusted by a feed forward term. In some embodiments, at least one of the provisional total open state commands may be altered based on a pre-allocated source duty cycle command determined based at least in part on a concentrate temperature sensed by a concentrate sensor assembly in communication with the concentrate flow path downstream of the portion of the concentrate flow path included in the second heat exchanger. In some embodiments, the second control loop may be configured to generate its output based in part on a target electronics temperature and a current electronics temperature measured by an electronics temperature sensor. In some embodiments, the temperature set point may be adjusted by the controller based at least in part on a source fluid temperature data signal generated by a source fluid temperature sensor.

In accordance with another embodiment of the present disclosure a water purification system for outputting a process stream at a controlled temperature may comprise a distillation device in selective fluid communication with a fluid source via a set of source proportioning valves. The distillation device may have a concentrate output and distillate output respectively coupled to a concentrate flow path and a distillate flow path. The concentrate output may be disposed in a concentrate reservoir of the distillation device. The system may further comprise a first heat exchanger including a portion of the distillate flow path and a second heat exchanger including a portion of the concentrate flow path, a flow path from the fluid source in heat exchange relationship with each of the first and second heat exchanger. The system may further comprise a distillate sensor assembly in communication with the distillate flow path downstream of the portion of the distillate flow path included in the first heat exchanger and configured to generate a distillate temperature measurement. The system may further comprise a concentrate level sensor disposed within the concentrate reservoir and configured to output a concentrate data signal. The system may further comprise a controller configured to determine a total open state time of the source proportioning valves based at least in part on the concentrate data signal, a target concentrate rate, and a minimum open state time for at least one of the source proportioning valves. The controller may be configured to allocate percentages of the total open state command to each of the source proportioning valves based in part on the distillate temperature measurement and the minimum open state time.

In some embodiments, the system may further comprise at least one source sensor in communication with the source fluid flow path. In some embodiments, the controller may be configured to allocate percentages of the total open state command to each of the source proportioning valves based in part on a source sensor data signal. In some embodiments, the source sensor data signal may be a temperature data signal indicative of a current source fluid temperature. In some embodiments, the controller may be configured to allocate the percentages of the total open state command to each of the source proportioning valves based on a control loop which uses a target distillate temperature determined by the controller based on the current source fluid temperature. In some embodiments, the system may further comprise at least one concentrate temperature sensor in communication with the concentrate fluid flow path. In some embodiments, the controller may be configured to determine a total open state time of the source proportioning valves based at least in part on a concentrate temperature data signal generated by the at least one concentrate temperature sensor. In some embodiments, the controller may be configured to allocate the percentages of the total open state command to each of the source proportioning valves based on a control loop which uses a target concentrate temperature and the concentrate temperature data signal as inputs. In some embodiments, the controller may allocate a non-zero percentage of the total open state command to at least one of the set of source proportioning valves. In some embodiments, the controller may be configured to determine a total open state time of the source proportioning valves based at least in part on a feed forward term.

In accordance with another embodiment of the present disclosure a method of calibrating an operating speed set point of a impeller compressor disposed in a flow communication pathway between an evaporator and condenser of a vapor compression distillation device, the impeller compressor for compressing low pressure stream generated in the evaporator to a high pressure steam output to the condenser, may comprise driving the impeller rotation to a first speed based on a target low pressure steam temperature and a measured low pressure steam temperature from a low pressure steam temperature sensor. The method may further comprise executing a binary type search to determine the operating speed set point.

In some embodiments, executing the binary type search may comprise computing a speed command based on the target low pressure steam temperature and the measured low pressure steam temperature. In some embodiments, executing the binary type search may comprise calculating a delta between the speed command and a starting speed and comparing the delta to a range. In some embodiments, executing the binary type search may comprise shrinking the range when the delta is outside of the range and resetting the starting speed. In some embodiments, executing the binary type search may comprise entering a stabilization state for a period of time before resetting the starting speed. In some embodiments, executing the binary type search may comprise comparing the measured low pressure steam temperature to the target low pressure steam temperature. In some embodiments, executing the binary type search may comprise incrementing a timer when the measured low pressure steam temperature to the target low pressure steam temperature are within a predefined range of one another. In some embodiments, executing the binary type search may comprise saving a current speed command as the operating speed set point when the timer has incremented to a predetermine value.

In accordance with an embodiment of the present disclosure, a fluid distillation apparatus may comprise at least one controller and a source inlet in selective fluid communication with a fluid source via at least one valve. The fluid vapor distillation apparatus may further comprise an evaporator in fluid communication with the source inlet. The fluid vapor distillation apparatus may further comprise a steam chest coupled to the evaporator and in fluid communication with a compressor. The fluid vapor distillation apparatus may further comprise a concentrate reservoir attached to the steam chest via an inflow path. The concentrate reservoir may be disposed laterally to the steam chest such that at least a portion of the concentrate reservoir is at even height with the steam chest. The fluid vapor distillation apparatus may further comprise a condenser in fluid communication with an outlet of the compressor via a straight line flow path. The straight line flow path may include a condenser inlet having a fenestrated segment with a plurality of fenestrations. The fenestrations may establish a flow path from the condenser inlet to the condenser. The fluid vapor distillation apparatus may further comprise a product process stream reservoir coupled to the condenser by a product reservoir inlet. The product process stream reservoir may be disposed laterally to the condenser such that at least a portion of the product process stream reservoir is at even height with the condenser.

In some embodiments, the inflow path may include an obstruction. In some embodiments, the obstruction may include a plate. The plate may have a segment which extends into the concentrate reservoir at an angle substantially perpendicular to the inflow path. In some embodiments, the obstruction may extend into the concentrate reservoir and divide the concentrate reservoir into a first portion and a second, sheltered portion. In some embodiments, the fluid vapor distillation apparatus may further comprise a venting pathway extending from the concentrate reservoir to the steam chest. In some embodiments, the venting pathway may extend substantially parallel to and above the inflow path with respect to gravity. In some embodiments, the product reservoir inlet may be adjacent a product accumulation surface of the condenser. In some embodiments, the compressor may be driven by a motor mounted in a receiving well recessed into the side of the steam chest. In some embodiments, the compressor may include an impeller which rotates about an axis which passes through at least a portion of the steam chest and is off-center, but parallel with respect to a longitudinal axis of the steam chest.

In accordance with another embodiment of the present disclosure a water vapor distillation apparatus may comprise a sump and an evaporator having a first side in communication with the sump. The evaporator may have a second side in fluid communication with a steam chest. The water vapor distillation apparatus may further comprise a concentrate reservoir attached to the steam chest via an inflow path having a first portion and second portion. The second portion may be at least in part by an obstruction. The obstruction may extend into the concentrate reservoir in a direction transverse to the first portion and may divide the concentrate reservoir into an unsheltered section and a sheltered section. The water vapor distillation apparatus may further comprise a float assembly disposed in the sheltered section. The float assembly may be displaceable over a displacement range inclusive of points at even height with all steam chest liquid levels in an expected range of steam chest liquid levels. The water vapor distillation apparatus may further comprise a sensor configured monitor a position of the float assembly and output a data signal indicative of a liquid level in the steam chest based on the position of the float assembly. The water vapor distillation apparatus may further comprise a compressor having an inlet establishing fluid communication with the steam chest and an outlet establishing fluid communication with a condenser.

In some embodiments, the sensor may be an encoder. In some embodiments, the float assembly may include at least one magnet. In some embodiments, the sensor may be a hall effect sensor. In some embodiments, the float assembly may be attached to a pivot. In some embodiments, the float assembly may be displaceable about the pivot. In some embodiments, the obstruction may extend into the concentrate reservoir at an angle substantially perpendicular to the first portion of the inflow path. In some embodiments, the water vapor distillation apparatus may further comprise a venting pathway extending from the concentrate reservoir to the steam chest. In some embodiments, the venting pathway may extend parallel to and above the first portion of the inflow path. In some embodiments, the venting pathway may have a smaller cross-sectional area than that of the first portion of the inflow path.

In accordance with another embodiment of the present disclosure, a water vapor distillation apparatus may comprise a sump having a source fluid input. The water vapor distillation apparatus may further comprise an evaporator having a first side in fluid communication with the source fluid input via the sump and a second side in fluid communication with a steam chest. The evaporator may be configured to transform source fluid from the source fluid input to low pressure vapor and concentrate as source fluid travels toward the steam chest. The water vapor distillation apparatus may further comprise a concentrate reservoir attached and disposed laterally to the steam chest. The concentrate reservoir may include a concentrate level sensor configured to monitor the level of concentrate in the steam chest and generate a data signal indicative of the level of concentrate. The water vapor distillation apparatus may further comprise a compressor having a low pressure vapor inlet establishing fluid communication with the steam chest and a high pressure vapor outlet establishing fluid communication with a condenser via a condenser inlet. The water vapor distillation apparatus may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The condenser may include a condensing portion and a condensate accumulation or storage portion. The water vapor distillation apparatus may further comprise an auxiliary condensate reservoir in fluid communication with the condensate accumulation portion. The auxiliary condensate reservoir may be attached to the condenser adjacent an accumulation surface of the accumulation portion. The auxiliary condensate reservoir may include a condensate level sensor configured monitor a level of condensate in the accumulation portion and generate a data signal indicative of a percentage which the accumulation portion is filled with condensate.

In some embodiments, the accumulation portion may have a volume less than ten liters. In some embodiments, the plurality of exterior surfaces may be exterior surfaces of a plurality of evaporator tubes included in the evaporator. In some embodiments, the plurality of exterior surfaces may be exterior surfaces of between 90-100 evaporator tubes included in the evaporator. In some embodiments, the plurality of exterior surfaces may be exterior surfaces of between 70-80 evaporator tubes included in the evaporator. In some embodiments, the condensate level sensor may include a float assembly attached to a pivot. In some embodiments, the float assembly may be displaceable about the pivot over a displacement range inclusive of points at even height with a range of levels defined by the accumulation portion. In some embodiments, the concentrate level sensor may include a float assembly disposed in a sheltered section of the concentrate reservoir separated from an unsheltered portion of the concentrate reservoir by a barrier. In some embodiments, the float assembly may be attached to a pivot and may be displaceable about the pivot over a displacement range inclusive of points at even height with all steam chest concentrate levels in an expected range of steam chest liquid levels. In some embodiments, the concentrate level sensor may be disposed within a sleeve which forms the barrier.

In accordance with another embodiment of the present disclosure, a concentrate level control system for a fluid vapor distillation apparatus may comprise a source fluid input in selective fluid communication with a source fluid reservoir via at least one input valve. The concentrate level control system may further comprise an evaporator in fluid communication with the source input and in fluid communication with a steam chest. The evaporator may be configured to transform source fluid from the source fluid input into a vapor stream and a concentrate stream as the source fluid travels toward the steam chest. The concentrate level control system may further comprise a concentrate reservoir attached and disposed lateral to the steam chest via an inflow path and including an outlet in selective communication with a concentrate destination via an outlet valve. The concentrate level control system may further comprise a concentrate level sensor configured to generate a data signal indicative of a concentrate level in the steam chest. The concentrate level control system may further comprise a controller configured to deliberately alter the concentrate level in a predetermined pattern by governing actuation of the at least one inlet valve via a fluid input control loop as well as analyzing the data signal. The controller may be further configured to actuate the outlet valve to a closed state when the data signal indicates the concentrate level is below a first threshold and actuate outlet valve to an open state when the concentrate level is above a second threshold.

In some embodiments, the predetermined pattern may create a sawtooth waveform when concentrate level is plotted over time. In some embodiments, wherein the period of the sawtooth waveform may be dependent at least in part upon a fluid input command from the fluid input control loop. In some embodiments, the fluid input command may be determined based on a predetermined target concentrate production rate. In some embodiments, the controller may be configured to operate in a plurality of operational states and the predetermined target concentrate production rate may be state specific. In some embodiments, the controller may analyze the data signal on a predetermined basis. In some embodiments, wherein the concentrate level may be assigned a predefined expected range and the first threshold may be less than or equal to 50% of a maximum level of the expected range. In some embodiments, the first threshold may be between 40% and 50% of the maximum level of the expected range. In some embodiments, the concentrate level may be assigned a predefined expected range and the second threshold may be greater than or equal to 50% of a maximum level of the expected range. In some embodiments, the second threshold may be between 50% and 60% of the maximum level of the expected range. In some embodiments, wherein the concentrate level may be assigned a predefined expected range and the first threshold may be less than or equal to 40% of a maximum level of the expected range. In some embodiments, the first threshold may be between 40% and 30% of the maximum level of the expected range. In some embodiments, the concentrate level may be assigned a predefined expected range and the second threshold may be greater than or equal to 45% of a maximum level of the expected range. In some embodiments, the second threshold may be between 45% and 55% of the maximum level of the expected range. In some embodiments, the concentrate level may be assigned a predefined expected range and the first and second thresholds may be defined as a percentage of a maximum level of the expected range. The second threshold may be between 4 and 20 percentage points greater than the first threshold. In some embodiments, the concentrate destination is a mixing can.

In accordance with another embodiment of the present disclosure a method for controlling a level of concentrate in a distillation device and verifying fluid flow within the distillation device may comprise inputting a source fluid to the distillation device though at least one inlet valve. The method may further comprise evaporating at least a portion of the source fluid to generate a vapor and a concentrate as the source fluid travels toward a steam chest. The method may further comprise collecting concentrate in a concentrate reservoir attached and disposed lateral to the steam chest via an inflow path. The method may further comprise providing a data signal indicative of a concentrate level in the steam chest from a concentrate level sensor disposed in the concentrate reservoir. The method may further comprise altering, with a controller, the concentrate level in a predetermined pattern by governing actuation of the at least one inlet valve via a fluid input control loop as well as analyzing the data signal and actuating an outlet valve of the concentrate reservoir to a closed state when the data signal indicates the concentrate level is below a first threshold and to an open state when the concentrate level is above a second threshold.

In some embodiments, altering the concentrate level may comprise altering the concentrate level to create a sawtooth waveform when concentrate level is plotted over time. In some embodiments, analyzing the data signal may comprise analyzing the data signal on a predetermined basis. In some embodiments, the method may further comprise assigning a predefined expected range to the concentrate level and setting the first threshold at less than or equal to 50% of a maximum level of the expected range. In some embodiments, setting the first threshold may comprise setting the threshold to between 40% and 50% of the maximum level of the expected range. In some embodiments, the method may further comprise assigning a predefined expected range of the concentrate level and setting the second threshold at greater than or equal to 50% of a maximum level of the expected range. In some embodiments, setting the second threshold comprising setting the second threshold between 50% and 60% of the maximum level of the expected range. In some embodiments, the method may further comprise assigning a predefined expected range to the concentrate level and setting the first threshold at less than or equal to 40% of a maximum level of the expected range. In some embodiments, setting the first threshold may comprise setting the threshold to between 40% and 30% of the maximum level of the expected range. In some embodiments, the method may further comprise assigning a predefined expected range of the concentrate level and setting the second threshold at greater than or equal to 45% of a maximum level of the expected range. In some embodiments, setting the second threshold comprising setting the second threshold between 45% and 55% of the maximum level of the expected range. In some embodiments, the method may further comprise assigning the concentrate level a predefined expected range and setting the first and second thresholds as a percentage of a maximum level of the expected range, the second threshold being between 4 and 20 percentage points greater than the first threshold.

In accordance with another embodiment of the present disclosure a temperature control system for controlling temperature of a product process stream of a distillation device to a request temperature may comprise a source fluid input in selective fluid communication with a source fluid reservoir via a set of fluid input valves. The system may further comprise an evaporator in fluid communication with the source input and in fluid communication with a compressor. The evaporator may be configured to transform source fluid from the source fluid input into a vapor stream and a concentrate stream as the source fluid travels toward the compressor. The system may further comprise a condenser in fluid communication with the compressor configured to transform pressurized vapor from the compressor into condensate. The system may further comprise a condensate flow path and a concentrate flow path including respective first and second heat exchangers. The first and second heat exchangers may each include a heat exchanging portion of a source fluid flow path from the source fluid reservoir. The heat exchanging portion may be downstream the source fluid input valves. The system may further comprise a condensate temperature sensor configured to generate a data signal indicative of a condensate temperature. The condensate temperature sensor may be disposed on the condensate flow path downstream the first heat exchanger. The system may further comprise a controller configured to actuate the set of input source valves based on a first control loop which governs a total open state time for all input source valves of the set of input source valves and a second control loop which receives the data signal and the requested temperature and divides the total open state time between all of the input source valves to adjust the condensate temperature to the requested temperature.

In some embodiments, the heat exchanging portions of the source fluid flow paths within the first and second heat exchanger may be disposed countercurrent to their respective condensate and concentrate flow paths. In some embodiments, the system may further comprise a destination device in fluid communication with the condensate flow path via a point of use valve. In some embodiments, the requested temperature may be generated by the destination device. In some embodiments, the destination device may be a medical system. In some embodiments, the medical system may be configured to mix at least one dialysate solution. In some embodiments, the destination device may be a dialysis machine. In some embodiments, the destination device may be a hemodialysis machine. In some embodiments, at least one of the first and second control loop may be a PID control loop. In some embodiments, the gain of at least one of the terms of the PID control loop may be zero. In some embodiments, a feed forward term may be combined with the output of the second control loop. In some embodiments, the feed forward term may be based off an estimated division of total open state time. In some embodiments, the system may further comprise a concentrate level sensor configured to output a concentrate level data signal indicative of a concentrate level within the distillation device. The first control loop may be configured to receive a target concentrate level and the current concentrate level data signal and as inputs to the first control loop. In some embodiments, the controller may be further configured to adjust a heater duty cycle based at least in part on the total open state time for all input source valves of the set of input source valves. In some embodiments, the controller may be configured to increase the heater duty cycle when the open state time for all of the input source valves of the set of input source valves is increased.

In accordance with another embodiment of the present disclosure a method for controlling the temperature of a product process stream of a distillation device to a requested temperature may comprise governing a flow of source fluid input to the distillation device by actuation, with a controller, a set of source fluid valves. The method may further comprise converting, in an evaporator, at least a portion of the source fluid input into a vapor and a concentrate. The method may further comprise condensing, in a condenser, the vapor into a condensate. The method may further comprise removing at least a portion of the condensate and the concentrate from the distillation device through respective condensate and concentrate flow paths. The method may further comprise exchanging heat, in a first heat exchanger, between the flow of source fluid and the condensate flow path and exchanging heat, in a second heat exchanger, between the flow of source fluid and the concentrate flow path. The method may further comprise providing a condensate temperature data signal to the controller from a temperature sensor on the condensate flow path located downstream the first heat exchanger. The method may further comprise determining, with a controller, a total open state time for the set of fluid input valves between set of fluid input valves based on a first control loop and dividing the total open state time between the set of fluid input valves based on a second control loop which receives the temperature data signal and a requested temperature.

In some embodiments, the method may further comprise flowing the condensate and concentrate through the condensate and concentrate flow paths in a direction countercurrent to the flow of the source fluid. In some embodiments, the method may further comprise providing the condensate to a destination device by actuating a point of use valve downstream the temperature sensor. In some embodiments, the requested temperature may be generated by the destination device. In some embodiments, the destination device may be a medical system. In some embodiments, the method may further comprise mixing a dialysate using the condensate. In some embodiments, the destination device may be a dialysis machine. In some embodiments, the destination device may be a hemodialysis machine. In some embodiments, at least one of the first and second control loop may be a PID control loop. In some embodiments, the method may further comprise setting at least one of the gains of the PID control loop to zero. In some embodiments, wherein the method may further comprise combining a feed forward term with the output of the second control loop. In some embodiments, the method may further comprise determining the feed forward term based off an estimated division of total open state time. In some embodiments, wherein the method further comprises inputting a current concentrate level provided by a concentrate level sensor and a target concentrate level to the first control loop. In some embodiments, the method may further comprise adjusting a heater duty cycle based at least in part on the total open state time for all input source valves of the set of input source valves. In some embodiments, adjusting the heater duty cycle may comprise increasing the heater duty cycle when the open state time for all of the input source valves of the set of input source valves is increased.

In accordance with another embodiment of the present disclosure a temperature control system for controlling the temperature of a product process stream of a distillation device to a requested temperature may comprise a first source fluid input and a second fluid source input in selective fluid communication with source fluid reservoirs respectively via a first set of fluid input valves and a second set of fluid input valves. The system may further comprise an evaporator in fluid communication with the first and second source fluid input and in fluid communication with a compressor. The evaporator may have a heating element to transform source fluid from the first and second source fluid inputs into a vapor stream and a concentrate stream as the source fluid travels toward the compressor. The system may further comprise a condenser in fluid communication with the compressor. The condenser may be configured to transform pressurized vapor from the compressor into condensate. The system may further comprise a condensate flow path and a concentrate flow path including respective first and second heat exchangers. The first and second heat exchangers may each include a heat exchanging portion of a source fluid flow path from the source fluid reservoirs, the heat exchanging portion being downstream the sets of source fluid input valves. The system may further comprise a condensate temperature sensor configured to generate a data signal indicative of a condensate temperature. The condensate temperature sensor may be disposed on the condensate flow path downstream the first heat exchanger. The system may further comprise a controller configured to actuate the first set of input source valves based on a first control loop which governs a total open state time for all input source valves of the first set of input source valves and a second control loop which receives the data signal and the requested temperature and divides the total open state time between all of the input source valves of the first set of input source valves to adjust the condensate temperature to the requested temperature. The controller may be configured to monitor at least one process variable and to actuate the second set of input source valves when one of the at least one process variable is outside of a predefined threshold.

In some embodiments the first set of fluid input valves may include at least one valve not included in the second set of fluid input valves. In some embodiments, one of the first and second source fluid inputs may be temperature controlled. In some embodiments, the second source fluid input may be temperature controlled. In some embodiments, the second source fluid input may be a hot fluid input. In some embodiments, the at least one process variable monitored by the controller may be a heating element duty cycle. In some embodiments, the at least one process variable monitored by the controller may be an output of the first control loop. In some embodiments, the at least one process variable may be a compressor speed. In some embodiments, the heat exchanging portion of the source fluid flow path may be a common flow path for fluid from the first and second source fluid input.

In accordance with another embodiment of the present disclosure a temperature controls system for controlling the temperature of a product process stream of a distillation device to a request temperature may comprise a source fluid input in selective fluid communication with a source fluid reservoir via a set of fluid input valves. The system may further comprise an evaporator in selective fluid communication with the source fluid input via a bypass valve and in fluid communication with a compressor. The evaporator may be configured to transform source fluid from the source fluid input into a vapor stream and a concentrate stream as the source fluid travels toward the compressor. The system may further comprise a condenser in fluid communication with the compressor configured to transform pressurized vapor from the compressor into condensate. The system may further comprise a condensate flow path and a concentrate flow path including respective first and second heat exchangers. The first and second heat exchangers may each include a heat exchanging portion of a source fluid flow path from the source fluid reservoir, the heat exchanging portion being downstream the source fluid input valves. The system may further comprise a condensate temperature sensor configured to generate a data signal indicative of a condensate temperature. The condensate temperature sensor may be disposed on the condensate flow path downstream the first heat exchanger. The system may further comprise a controller configured to actuate the set of input source valves based on a first control loop which governs a total open state time for all input source valves of the set of input source valves and a second control loop which receives the data signal and the requested temperature and divides the total open state time between all of the input source valves to adjust the condensate temperature to the requested temperature. The bypass valve may be disposed in the source fluid flow path upstream of the heat exchanging portion of the source fluid flow path. The bypass valve may have a divert valve state which directs fluid from the source reservoir to a drain destination. The controller may be configured to actuate the bypass valve to the divert valve state when the controller determines at least one process variable is outside of a predetermined threshold.

In some embodiments the at least one process variable may be a relationship between the condensate temperature and a source fluid temperature provided by a source fluid temperature sensor. In some embodiments, the at least one process variable may be a source fluid temperature sensed by a source fluid temperature sensor. In some embodiments, the at least one process variable may be defined at least in part by the condensate temperature and a source fluid temperature sensed by a source fluid temperature sensor. In some embodiments, the controller may alter the duty cycle of at least one of the input source valves when the bypass valve is in the divert valve state. In some embodiments, the controller may increase the duty cycle of at least one of the input source valves when the bypass valve is in the divert valve state. In some embodiments, the controller may alter the duty cycle of at least one of the input source valves to 90-100% when the bypass valve is in the divert valve state. In some embodiments, one of the at least one of the input source valves may be a valve controlling flow of source fluid through the heat exchanging portion of the first heat exchanger.

In accordance with another embodiment of the present disclosure a temperature controls system for controlling the temperature of a product process stream of a distillation system to a requested temperature may comprise a source fluid input in selective fluid communication with a source fluid reservoir via a set of fluid input valves. The system may further comprise a distillation device configured to generate a concentrate stream and a condensate stream. The system may further comprise a condensate flow path and a concentrate flow path including respective first and second heat exchangers. The first and second heat exchangers may each include a heat exchanging portion of a source fluid flow path from the source fluid reservoir, the heat exchanging portion being downstream the source fluid input valves. The system may further comprise a condensate temperature sensor configured to generate a data signal indicative of a condensate temperature. The condensate temperature sensor may be disposed on the condensate flow path downstream the first heat exchanger. The system may further comprise a point of use device in selective communication with the condensate flow path. The point of use device may have an outlet fluid path for output fluid generated by the point of use device. The output fluid path may have a third heat exchanger including a heat exchanging portion of a branch of the source fluid flow path. The system may further comprise a controller configured to actuate the set of input source valves based on a first control loop and a second control loop which govern the fluid of source fluid through the heat exchanging portions of the first and second heat exchangers and based on at least one process variable. The controller may actuate a branch valve to the branch of the source fluid flow path when the at least one process variable is outside a predetermined threshold.

In some embodiments, the at least one process variable may a relationship between the condensate temperature and a source fluid temperature provided by a source fluid temperature sensor. In some embodiments, the at least one process variable may a source fluid temperature sensed by a source fluid temperature sensor. In some embodiments, the at least one process variable may be defined at least in part by the condensate temperature and a source fluid temperature sensed by a source fluid temperature sensor. In some embodiments, the point of use device may be a medical device. In some embodiments, the point of use device is a dialysis machine. In some embodiments, the point of use device is a hemodialysis machine or a peritoneal dialysis machine. In some embodiments, the point of use device may be a dialysate admixing device. In some embodiments, the branch of the source fluid flow path may be disposed upstream of the heat exchanging portion of the source fluid flow path in the first and second heat exchangers. In some embodiments, the output fluid may be a dialysate effluent.

In accordance with another embodiment of the present disclosure a condensate accumulation rate control system for controlling a rate of condensate accumulation within a distillation device may comprise a source fluid input in selective fluid communication with a source fluid reservoir via a set of fluid input valves. The system may further comprise an evaporator in fluid communication with the source input and in fluid communication with a compressor having an impeller operatively coupled to an impeller motor. The evaporator may be configured to transform source fluid from the source fluid input into a vapor stream and a concentrate stream as the source fluid travels toward the compressor. The system may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The system may further comprise a condensate levels sensor configured to sense a current level of condensate in the condenser. The system may further comprise at least one controller configured to govern a rotation speed of the impeller by periodically generating an impeller motor command based on a last motor speed command, a motor speed goal, and a speed command increment limit. The motor speed goal may be calculated by a control loop which receives the current condensate level and a desired condensate level as control loop inputs.

In some embodiments, the speed command increment limit may be ≤10 rpm/sec. In some embodiments, wherein the speed command increment limit may be ≤5 rpm/sec. In some embodiments, the controller may be configured to compare the impeller motor command to a minimum command speed threshold and maximum command speed threshold and adjust the impeller motor command to a modified impeller motor command equal to the minimum command speed threshold when the impeller motor command is below the minimum command speed threshold and equal to the maximum command speed threshold when the impeller motor command is above the maximum command speed threshold. In some embodiments, the minimum command speed threshold is between 1500-2500 rpm. In some embodiments, the maximum command speed threshold is calculated each time the motor speed command is generated. In some embodiments, the maximum command speed threshold may be calculated based on at least one motor parameter. In some embodiments, the system may further comprise a motor temperature sensor configured to output a temperature data signal indicative of a temperature of the impeller motor and a power factor correction current monitoring circuit configured to output a PFC data signal indicative of a current power factor correction current, the maximum command speed threshold being calculated based on a the temperature data signal and the PFC data signal. In some embodiments, the maximum command speed may be capped a predetermined value. In some embodiments, wherein the predetermined value may be between 4500-6500 rpm. In some embodiments, the predetermined value may be 5000 rpm. In some embodiments, the predetermined value may be about 2.5 times larger than the minimum command speed threshold.

In accordance with another embodiment of the present disclosure a method for controlling a rate of condensate accumulation within a distillation device may comprise providing a source fluid input to the distillation device. The method may further comprise evaporating, in an evaporator, at least a portion of the source fluid input into a low pressure vapor. The method may further comprise compressing, via an impeller, the low pressure vapor into a high pressure vapor. The method may further comprise condensing, in a condenser, the high pressure vapor into a condensate and transferring heat from the high pressure vapor to the evaporator. The method may further comprise providing a level of condensate within the condenser sensed by a condensate level sensor to a controller. The method may further comprise calculating, with the controller, a motor speed goal based on the level of condensate and a desired condensate level. The method may further comprise governing, with a controller, a rotation speed of the impeller by periodically generating an impeller motor command based on a last motor speed command, a motor speed goal, an a speed command increment limit.

In some embodiments, the speed command increment limit is ≤10 rpm/sec. In some embodiments, the speed command increment limit is ≤5 rpm/sec. In some embodiments, the method may further comprise comparing, with the controller, the impeller motor command to a minimum command speed threshold and maximum command speed threshold and adjusting the impeller motor command to a modified impeller motor command equal to the minimum command speed threshold when the impeller motor command is below the minimum command speed threshold and equal to the maximum command speed threshold when the impeller motor command is above the maximum command speed threshold. In some embodiments, the minimum command speed threshold may be between 1500-2500 rpm. In some embodiments, the minimum command speed threshold may be 2000 rpm. In some embodiments, the method may further comprise calculating the maximum command speed threshold each time the motor speed command is generated. In some embodiments, calculating the maximum command speed threshold may comprise calculating the maximum command speed threshold based on at least one motor parameter. In some embodiments, the method may further comprise providing a temperature data signal indicative of a temperature of the motor from a motor temperature sensor to the controller and providing a power factor correction data signal indicative of a current power factor correction current from a monitoring circuit to the controller. In some embodiments, the method may further comprise calculating the maximum command speed threshold based on the temperature data signal and the power factor correction data signal. In some embodiments, the method may further comprise capping the maximum command speed threshold at a predetermined value. In some embodiments, the predetermined value may be between 4500-6500 rpm. In some embodiments, the predetermined value may be 5000 rpm. In some embodiments, the predetermined value may be or may be about 2.5 times larger than the minimum command speed threshold.

In accordance with an embodiment of the present disclosure a fluid vapor distillation apparatus having first and second separable sections may comprising; a source inlet in selective fluid communication with a fluid source via at least one valve. The apparatus may further comprise a sump downstream the source inlet. The apparatus may further comprise an evaporator having a plurality of tubes in fluid communication with the sump. The apparatus may further comprise a steam chest coupled to the evaporator and in fluid communication with a compressor. The apparatus may further comprise a condenser in fluid communication with an outlet of the compressor. The condenser may surround the plurality of tubes. The apparatus may further comprise a support plate rotatably coupled to a pivot and attached to the first section. The apparatus may further comprise a housing coupled to the second section via at least one mount. The first and second section may be held together in a first state via one or more fastener and disconnected from one another in the second state in which the first section rotatable about the pivot.

In some embodiments, the at least one mount may be an isolation mount. In some embodiments, the first section may include the sump, evaporator, and condenser. In some embodiments, the second section may include the steam chest and condenser. In some embodiments, the pivot may include a bias member. In some embodiments, the bias member may be in a relaxed state when the first and second section are in the first state and may be in a compressed state when the first and second section are in the second state. In some embodiments, the bias member may have a relaxed state and an energy storing state. The support plate may have a displacement path between a first position when the bias member is in the relax state and a second position when the bias member is in the energy storing state. In some embodiments, the displacement path may be a linear displacement path. In some embodiments, the displacement path may be parallel to an axis of the pivot. In some embodiments, the bias member may be a gas spring.

In accordance with another embodiment of the present disclosure a distillation device may comprise a source fluid input in selective fluid communication with a source fluid reservoir via a set of fluid input valves. The device may further comprise an evaporator in fluid communication with the source input and in fluid communication with a compressor. The evaporator may be configured to transform source fluid from the source fluid input into a vapor stream and a concentrate stream as the source fluid travels toward the compressor. The device may further comprise a condenser in fluid communication with the compressor configured to transform pressurized vapor from the compressor into condensate. The device may further comprise a condensate flow path and a concentrate flow path including respective first and second heat exchangers. The first and second heat exchangers may each include a heat exchanging portion of a source fluid flow path from the source fluid reservoir. The heat exchanging portion may be downstream the source fluid input valves. The device may further comprise a condensate temperature sensor configured to generate a data signal indicative of a condensate temperature. The condensate temperature sensor may be disposed on the condensate flow path downstream the first heat exchanger. The device may further comprise an output to a destination device. The device may further comprise a controller configured to actuate the set of input source valves based on a first multimodal control loop which generates a number of provisional total open state commands for all input source valves of the set of input source valves. The controller may be configured to actuate the set of input source valves based on a slider which generates a single total open state command from the number of provisional commands. The controller may be configured to actuate the set of input source valves based on a a second control loop which receives the data signal and the requested temperature and allocates the total open state command between all of the input source valves to adjust the condensate temperature to a temperature set point.

In some embodiments, the heat exchanging portions of the source fluid flow paths within the first and second heat exchanger may be disposed countercurrent to their respective condensate and concentrate flow paths. In some embodiments, the controller may be configured to operate in a plurality of operational states and the temperature set point may be dependent upon the state. In some embodiments, the device further comprises a destination device in fluid communication with the condensate flow path via a point of use valve. In some embodiments, the destination device may be a medical system. In some embodiments, the medical system may be configured to mix at least one dialysate solution. In some embodiments, the destination device may be a dialysis machine. In some embodiments, the destination device may be a hemodialysis machine. In some embodiments, at least one of the first multimodal controls loop and second control loop may include a PID control loop. In some embodiments, the gain of at least one of the terms of the PID control loop may be zero. In some embodiments, the number of provisional total open state commands may be adjusted by the output of at least one adjuster control loop. In some embodiments, the distillation device may further comprise a sump. The sump may be intermediate the source input and evaporator. One of the at least one adjuster control loop may be configured to produce an output based on a target sump temperature and current sump temperature measured by a sump temperature sensor configured to generate a data signal representative of a temperature of fluid in the sump. In some embodiments, one of the at least one adjuster control loop may be configured to produce an output based on a target vapor temperature and current vapor temperature measured by a vapor temperature sensor configured to generate a data signal representative of a temperature of the vapor stream. In some embodiments, the device may further comprise a concentrate level sensor configured to output a concentrate level data signal indicative of a concentrate level within the distillation device. The controller may be configured to determine a current blowdown rate from the concentrate level data signal. The first multimodal control loop may be configured to receive a target blowdown rate and the current blowdown rate data signal and as inputs. In some embodiments, at least one of the provisional total open state commands may be a first production temperature state command and at least one of the provisional total open state commands may be a second production temperature state command. In some embodiments, the device may further comprise an evaporator level sensor configured to output an evaporator data signal. The controller may be configured to generate at least one of the provisional total open state commands based at least in part on inputs of a target evaporator sensor level and the evaporator data signal. In some embodiments, the target evaporator sensor level and the evaporator data signal may be input into a derivative controller. In some embodiments, the derivative controller may be a PID controller having a D term gain at least one order of magnitude greater than the P and I term.

In accordance with another embodiment of the present disclosure, a water vapor distillation apparatus may comprise a sump having a source fluid input. The apparatus may further comprise an evaporator having a first side in fluid communication with the source fluid input via the sump and a second side in fluid communication with a steam chest. The evaporator may be configured to transform source fluid from the source fluid input to low pressure vapor and concentrate as source fluid travels toward the steam chest. There may be a non-uniform liquid level in the evaporator during operation. The apparatus may further comprise an evaporator reservoir disposed laterally to the evaporator and in fluid communication therewith via the sump. The evaporator reservoir may include a level sensor configured to monitor a level of a water column in the evaporator reservoir and generate a data signal indicative of the level of the water column. The apparatus may further comprise a compressor having a low pressure vapor inlet establishing fluid communication with the steam chest and a high pressure vapor outlet establishing fluid communication with a condenser via a condenser inlet. The apparatus may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The condenser may include a condensing portion and a condensate accumulation portion. The apparatus may further comprise a processor configured to actuate a set of input source valves to the source fluid input based in part on the data signal.

In some embodiments, the level sensor may include a displaceable member which is displaceable over a displacement range which is smaller than the height of the evaporator reservoir. In some embodiments, the level sensor may include a displaceable member which is displaceable over a displacement range extending from a first end portion of the evaporator reservoir to at least a midpoint of the evaporator reservoir. The displacement range may be a distance less than 70% of the height of the evaporator reservoir. In some embodiments, the first end may be an end of the evaporator reservoir most distal to the sump. In some embodiments, the evaporator reservoir may be in communication with the steam chest via a venting pathway extending from a first end portion of the evaporator reservoir. In some embodiments, the venting pathway may extend from the evaporator reservoir to a concentrate reservoir attached and disposed laterally to the steam chest. In some embodiments, the height of the evaporator reservoir may be greater than the height of the evaporator. In some embodiments, the processor may be configured to determine a total open state time for the set of input source valves based in part on a target water column level and a current water column level determined via analysis of the data signal. In some embodiments, the processor may be configured to determine the total open state time for the set of input source valves based in part on the output of a PID controller which receives the target water column level and the current water column level as inputs. In some embodiments, a gain for at least one of a P term, I term, and D term of the PID controller may be zero. In some embodiments, a gain for a D term of the PID controller may be at least one order of magnitude greater than a gain for a P term and an I term of the PID controller. In some embodiments, a gain for a D term of the PID controller may be more than two orders of magnitude greater than a gain for a P term and an I term of the PID controller. In some embodiments, the processor may be configured to determine the total open state time based in part on a target blowdown rate and a current blowdown rate as indicated from a blowdown level data signal produced by a blowdown level sensor in a blowdown reservoir attached to the steam chest. In some embodiments, the processor may be configured to determine a total open state command in part based on the output of at least one adjuster control loop. In some embodiments, one of the at least one adjuster control loop may be configured to produce an output based on a target sump temperature and current sump temperature measured by a sump temperature sensor configured to generate a data signal representative of a temperature of fluid in the sump. In some embodiments, one of the at least one adjuster control loop may be configured to produce an output based on a target vapor temperature and current vapor temperature measured by a vapor temperature sensor configured to generate a data signal representative of a temperature of the vapor stream. In some embodiments, the controller may be configured to alter a total open state command for the set of input source valves in response to a change in the water column level indicated by the data signal. In some embodiments, the controller may be configured to alter a total open state command for the set of input source valves in proportion to a rate of change in the water column as indicated by the data signal.

In accordance with another embodiment of the present disclosure a method of controlling flow of a source fluid into a distillation device may comprise establishing a non-uniform liquid level in an evaporator of the distillation device by boiling liquid in the distillation device. The method may further comprise sensing, with a first level sensor, a liquid column level in an evaporator reservoir in fluid communication with the evaporator and disposed at even height with the evaporator. The method may further comprise sensing, with a second level sensor, a concentrate level in a concentrate reservoir in fluid communication with the evaporator. The method may further comprise generating, with a processor, a source inlet valve open time command based at least in part on the concentrate level and a target concentrate accumulation rate as well as a delta between the liquid column level and a target liquid column level. The method may further comprise commanding a number of source inlet valves to open based on the source inlet valve open time command.

In some embodiments, sensing the liquid column level may comprise displacing a displaceable member over a displacement range which is smaller than a height of the evaporator reservoir. In some embodiments, sensing the liquid column level may comprise displacing a displaceable member over a displacement range extending from a first end portion of the evaporator reservoir to at least a midpoint of the evaporator reservoir. The displacement range may be a distance less than 70% of a height of the evaporator reservoir. In some embodiments, the first end may be an end of the evaporator reservoir most distal to a sump of the distillation device. In some embodiments, the method may further comprise venting the evaporator reservoir, via a venting pathway, into a steam chest of the distillation device disposed superiorly to the evaporator. In some embodiments, the venting pathway may extend from the evaporator reservoir to a concentrate reservoir attached and disposed laterally to the steam chest. In some embodiments, generating the source inlet valve open time command may comprise inputting the delta to a PID controller. In some embodiments, a gain for at least one of a P term, I term, and D term of the PID controller may be zero. In some embodiments, a gain for a D term of the PID controller may be at least one order of magnitude greater than a gain for a P term and an I term of the PID controller. In some embodiments, a gain for a D term of the PID controller may be more than two orders of magnitude greater than a gain for a P term and an I term of the PID controller. In some embodiments, generating the source inlet valve open time command may comprise determining a current concentrate accumulation rate from the concentrate level and calculating a delta between a target concentrate rate and a current concentrate accumulation rate. In some embodiments, generating the source inlet valve open time command may comprise generating an output of at least one adjuster control loop. In some embodiments, the method may further comprise sensing a current sump temperature with a sump temperature sensor and generating the output of at least one adjuster control loop comprises producing the output based on a target sump temperature and current sump temperature. In some embodiments, the method may further comprise sensing a temperature of a vapor stream in the distillation device with a vapor temperature sensor. In some embodiments, generating the output of at least one adjuster controller may comprise producing the output based on a target vapor temperature and current vapor temperature. In some embodiments, the method may further comprise altering the source inlet valve open time command in response to a change in the liquid column level. In some embodiments, the method may further comprise altering the source inlet valve open time command in proportion to a rate of change in the liquid column level.

In accordance with another embodiment of the present disclosure a fluid vapor distillation apparatus may comprise at least one controller. The apparatus may further comprise a source inlet in selective fluid communication with a fluid source via at least one valve. The apparatus may further comprise an evaporator in fluid communication with the source inlet. The apparatus may further comprise a steam chest coupled to the evaporator and in fluid communication with a compressor. An exterior surface of the steam chest may form a portion of an inlet flow path to the compressor and a portion of an outlet flow path to an outlet of the compressor. The apparatus may further comprise a concentrate reservoir. The concentrate reservoir may be attached to the steam chest via an inflow path and disposed laterally to the steam chest such that at least a portion of the concentrate reservoir is at even height with the steam chest. The apparatus may further comprise a condenser in fluid communication with the outlet of the compressor via a straight line flow path. The straight line flow path may include a condenser inlet fixedly attached to a sheet having a first face defining a portion of the steam chest and an opposing face defining a portion of the condenser. The apparatus may further comprise a product process stream reservoir coupled to the condenser by a product reservoir inlet, and disposed laterally to the condenser such that at least a portion of the product process stream reservoir is at even height with the condenser.

In some embodiments, the inflow path may include an obstruction. In some embodiments, the obstruction may include a wall which extends into the concentrate reservoir at an angle substantially perpendicular to the inflow path. In some embodiments, the obstruction may extend into the concentrate reservoir and divide the concentrate reservoir into a first portion and a second, sheltered portion. In some embodiments, the obstruction may include at least one vent port. In some embodiments, the product reservoir inlet may be adjacent a product accumulation surface of the condenser. In some embodiments, the compressor may be driven by a motor partially disposed within a receiving well recessed into the side of the steam chest. In some embodiments, the compressor may include an impeller which rotates about an axis which extends lateral to the steam chest and is parallel with respect to a longitudinal axis of the steam chest.

In accordance with another embodiment of the present disclosure, a distillation device may comprise a source fluid input in selective fluid communication with a source via a set of fluid input valves. The device may further comprise an evaporator in fluid communication with the source input and in fluid communication with a compressor having an impeller operatively coupled to an impeller motor. The evaporator may be configured to transform source fluid from the source fluid input into a vapor stream and a concentrate stream as the source fluid travels toward the compressor. The device may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The device may further comprise a concentrate level sensor configured to sense a current level of concentrate in a concentrate reservoir having an inflow path disposed above the evaporator and having a long axis which extends alongside the evaporator. The device may further comprise at least one controller configured to govern a rotation speed of the impeller in a low temperature distillate production state and a high temperature distillate production state by periodically generating an impeller motor command based on a low temperature distillate production nominal speed command in the low temperature distillate production state and a high temperature distillate production nominal speed command in the high temperature distillate production state. The low temperature distillate production nominal speed command may be a faster motor speed command than the high temperature distillate production nominal speed command.

In some embodiments, an adjustment may be made to the impeller motor command based on a data signal from the concentrate level sensor indicative of a level of concentrate in the concentrate reservoir. In some embodiments, the adjustment may be limited by an impeller motor command increment limit. In some embodiments, the impeller motor command increment limit may ≤10 rpm/sec. In some embodiments, the impeller motor command increment limit may be ≤5 rpm/sec. In some embodiments, the impeller motor command may be decremented when the data signal indicates that the level of concentrate in the concentrate reservoir is greater than a first threshold. In some embodiments, the first threshold may be defined as the concentrate level at which the concentrate reservoir is between 65-80% full. In some embodiments, the impeller motor command may be held to no greater than a previously commanded impeller motor command value when the data signal indicates that the level of concentrate in the concentrate reservoir is greater than a first threshold. In some embodiments, the first threshold may be defined as the concentrate level at which the concentrate reservoir is between 65-80% full. In some embodiments, the impeller motor command may be incremented when the data signal indicates that the level of concentrate in the concentrate reservoir is greater than a second threshold. In some embodiments, the high temperature distillate production nominal speed command may a calibrated value defined during manufacture. In some embodiments, the high temperature distillate production nominal speed command may be less than 80% of the low temperature distillate production nominal speed command and more than 70% of the low temperature distillate production nominal speed command. In some embodiments, the low temperature distillate production nominal speed command may be 4500 rpm.

In accordance with another embodiment of the present disclosure a method of controlling a compressor of a distillation device may comprise opening at least one fluid input valve to deliver source fluid into a sump of the distillation device from a fluid source. The method may further comprise transforming source fluid into a concentrate stream and vapor stream in an evaporator. The method may further comprise determining, with a processor, a state specific compressor speed command. The compressor speed command may be based on a low temperature distillate production nominal speed command in a low temperature distillate production state and based on a high temperature distillate production nominal speed command in a high temperature distillate production state. The low temperature distillate production nominal speed command may be a faster motor speed command than the high temperature distillate production nominal speed command. The method may further comprise generating, with the processor, a final command speed based on the compressor speed command. The method may further comprise commanding, with the processor, rotation of an impeller of the compressor at the final command speed. The method may further comprise compressing the vapor stream via the compressor. The method may further comprise condensing the vapor stream into a condensate and transferring heat to the evaporator as the vapor stream condenses.

In some embodiments, the method may further comprise sensing, with a level sensor, a level of concentrate in a concentrate reservoir in fluid communication with the evaporator. In some embodiments, generating the final command speed may comprise determining an adjustment to the compressor speed command based on the level of concentrate. In some embodiments, determining the adjustment may comprise decrementing the compressor speed command when the level of concentrate is greater than a first threshold. In some embodiments, the first threshold may be defined as the concentrate level at which the concentrate reservoir is between 65-80% full. In some embodiments, determining the adjustment may comprise holding the final command speed to no greater than a previously commanded final command speed when the level of concentrate is greater than the first threshold. In some embodiments, determining the adjustment may comprise decrementing the compressor speed command when the level of concentrate is greater than a second threshold. In some embodiments, generating the final command speed may comprise determining an adjustment to the compressor speed command. In some embodiments, the adjustment may be limited by an increment limit. In some embodiments, the increment limit may be ≤10 rpm/sec. In some embodiments, the increment limit may be ≤5 rpm/sec. In some embodiments, the high temperature distillate production nominal speed command may be a calibrated value defined during manufacture. In some embodiments, the high temperature distillate production nominal speed command may be less than 80% of the low temperature distillate production nominal speed command and more than 70% of the low temperature distillate production nominal speed command. In some embodiments, the low temperature distillate production nominal speed command may be 4500 rpm.

In accordance with another embodiment of the present disclosure a distillation device may comprise a sump in selective fluid communication with a source via a set of fluid input valves. The device may further comprise at least one heating element and a least one sump temperature sensor in the sump. The sump temperature sensor may be configured to generate a sump temperature data signal. The device may further comprise an evaporator having a first side in fluid communication with the sump and a second side in fluid communication with a compressor having an impeller operatively coupled to an impeller motor. The evaporator may be configured to transform source fluid from the source fluid input to vapor stream and concentrate as source fluid travels toward the steam chest. The device may further comprise a condenser in heat transfer relationship with a plurality of exterior surfaces of the evaporator. The condenser may be configured to condense a high pressure vapor stream from the compressor by contacting the high pressure vapor stream with the plurality of exterior surfaces of the evaporator. The device may further comprise a concentrate level sensor configured to sense a current level of concentrate in a concentrate reservoir having an inflow path disposed above the evaporator and having a long axis which extends alongside the evaporator. The device may further comprise a vapor temperature sensor disposed in a flow path of the vapor stream and configured to generate a vapor temperature data signal. The device may further comprise at least one controller configured to determine a duty cycle command for the at least one heating element. The duty cycle command may be based at least in part upon a target temperature of the vapor stream, the vapor temperature data signal, the sump temperature data signal and a total source open command for the set of fluid input valves.

In some embodiments, the target temperature of the vapor stream may be 108° C. In some embodiments, the controller may be configured to adjust the duty cycle command to conform with at least one limit. In some embodiments, the limit may be a maximum power consumption limit. In some embodiments, the controller may be configured to adjust the duty cycle command based at least in part on a power consumption of the compressor. In some embodiments, the controller may be configured to calculate a limit for the duty cycle command by determining a power consumption of the compressor and subtracting the power consumption of the compressor from a predefined power value. In some embodiments, the predefined power value may be defined as a maximum total power for the system. In some embodiments, the duty cycle command may be limited to a predefined maximum duty cycle. In some embodiments, the predefined maximum duty cycle may not greater than a 90% duty cycle. In some embodiments, the target temperature of the vapor stream may be state specific. In some embodiments, the target temperature in a low temperature distillate production state may be higher than the target temperature in a high temperature distillate production state. In some embodiments, the target temperature of the vapor stream in a first state may be 108° C. and the target temperature of the vapor stream in a second state may be 104° C. In some embodiments, the target temperature in a first state may be 4° C. hotter than the target temperature in a second state. In some embodiments, the target temperature in a first state may be at least 95% of the target temperature in a second state, but less than the target temperature in the second state. In some embodiments, the controller may be configured to determine a feed forward term used to determine the duty cycle command based on the total source open command for the set of fluid input valves and at least one thermodynamic characteristic of the source fluid. In some embodiments, the thermodynamic characteristic may be a specific heat of the source fluid. In some embodiments, the target temperature of the vapor stream may be 111-112° C.

In accordance with an embodiment of the present disclosure a method of heating fluid in a distillation device may comprise opening at least one fluid input valve to deliver source fluid into a sump of the distillation device from a fluid source. The method may further comprise sensing a sump temperature of the source fluid in the sump via a temperature sensor. The method may further comprise sensing a vapor temperature of a vapor stream generated from the source fluid. The method may further comprise comparing, with a processor, the vapor temperature to a target vapor temperature. The method may further comprise inputting a delta between the vapor temperature and the target vapor temperature to a first controller and generating a first controller output. The method may further comprise providing an input based at least in part upon the first controller output and sump temperature to a second controller and generating a second controller output. The method may further comprise altering the second controller output into an altered second controller output based on a total open state time of the at least one fluid input valve. The method may further comprise commanding a duty cycle for a heating element in the sump based on the altered second controller output and at least one limit.

In some embodiments, the target vapor temperature may be in a range of 108° C.-112° C. In some embodiments, the at least one limit may include a maximum power consumption limit. In some embodiments, the at least one limit may include a limit based at least in part on a power consumption of a compressor in the distillation device. In some embodiments, the method may further comprise calculating a limit of the at least one limit by determining a power consumption of the compressor and subtracting the power consumption of the compressor from a predefined power value. In some embodiments, the predefined power value may be defined as a maximum total power for the system. In some embodiments, the at least one limit may include a predefined maximum duty cycle limit. In some embodiments, the predefined maximum duty cycle may not be greater than a 90% duty cycle. In some embodiments, the target vapor temperature of the vapor stream may be state specific. In some embodiments, target temperature in a low temperature distillate production state may be higher than the target temperature in a high temperature distillate production state. In some embodiments, the target temperature in a first state may be 4° C. hotter than the target temperature in a second state. In some embodiments, the target temperature in a first state may be at least 95% of the target temperature in a second state, but less than the target temperature in the second state. In some embodiments, the second controller output into an altered second controller output may comprise determining a feed forward term based on the total source open command of the at least one fluid input valve and at least one thermodynamic characteristic of the source fluid. In some embodiments, the thermodynamic characteristic may be a specific heat of the source fluid.

In accordance with an embodiment of the present disclosure, a water distillation device may comprise a sump in selective fluid communication with a fluid source via a set of source proportioning valves. The device may further comprise an evaporator in fluid communication with the sump. The device may further comprise a steam chest coupled to the evaporator and in fluid communication with a compressor. The device may further comprise a concentrate reservoir attached to the steam chest via an inflow path and having a concentrate level sensor configured to generate a concentrate level data signal indicative of fill percentage of the concentrate reservoir. The concentrate reservoir may be coupled to a concentrate flow path. The device may further comprise a condenser coupled to an outlet of the compressor and in fluid communication with a condensate flow path. The device may further comprise a first and second heat exchanger including a heat exchanging portion of a source fluid flow path from the fluid source. The heat exchanging portion of the first heat exchanger may be in heat exchange relationship with the condensate flow path and the heat exchanging portion of the second heat exchanger in heat exchange relationship the concentrate flow path. The heat exchanging portions of the source fluid flow path may be downstream the source proportioning valves. The device may further comprise at least one distillate sensor in communication with the condensate flow path at a point downstream the first heat exchanger. The device may further comprise a controller configured to determine a total open state time of the source proportioning valves based at least in part on the concentrate data signal and a target concentrate rate. The controller may be configured to allocate percentages of the total open state command to each of the source proportioning valves based on at least one distillate sensor data signal from the at least one distillate sensor.

In some embodiments, the condenser may include a condensing portion and a condensate accumulation portion. In some embodiments, the condenser may be in fluid communication with a condensate reservoir including a condensate level sensor configured to monitor a level of condensate in the condensate reservoir and generate a condensate data signal indicative of a fill percentage of the condensate accumulation portion. The condensate reservoir may be intermediate the condenser and concentrate flow path. In some embodiments, the controller may be configured to maintain a target fill percentage of the condensate accumulation portion based on the output of a PID control loop which uses as inputs the target fill percentage and a delta between the target fill percentage and the current fill percentage as indicated by the condensate data signal. In some embodiments, the target fill percentage may be equivalent to at least one liter and less than 2 liters. In some embodiments, the condenser may be in fluid communication with a condensate reservoir including a condensate level sensor configured to monitor a level of condensate in the condensate reservoir and generate a condensate data signal indicative of a fill percentage of the condensate reservoir. The condensate reservoir intermediate the condenser and concentrate flow path. In some embodiments, the at least one distillate sensor may include a temperature sensor. In some embodiments, the at least one distillate sensor data signal may be a temperature data signal indicative of a current condensate temperature after passing through the heat exchanger. In some embodiments, the controller may be configured to allocate the percentages of the total open state command to each of the source proportioning valves based on a control loop which uses a target condensate temperature and the current condensate temperature as inputs. In some embodiments, the target temperature may be at least 35° C., but no greater than 40° C. In some embodiments, the target temperature may be at least 20° C., but no greater than 30° C.

In accordance with another embodiment of the present disclosure, a distillation system may comprise a distillation device in selective fluid communication with a fluid source via a set of source proportioning valves. The distillation device may have a concentrate output coupled to a concentrate flow path and may have a condensate output coupled to a condensate flow path. The system may further comprise a first and second heat exchanger including a heat exchanging portion of a source fluid flow path from the fluid source downstream of the source proportioning valves. The heat exchanging portion of the first heat exchanger may be in heat exchange relationship with the condensate flow path and the heat exchanging portion of the second heat exchanger may be in heat exchange relationship the concentrate flow path. There may be a dedicated source proportioning valve for each heat exchanger. The system may further comprise a condensate sensor assembly in communication with the condensate flow path at a point downstream of the first heat exchanger. The system may further comprise a controller configured to, in a first operating state, split a commanded flow of source fluid from the fluid source between the source proportioning valves based on a first target temperature and a delta between the first target temperature and a current concentrate temperature received by the controller from the condensate sensor assembly. In a second mode, the controller may be configured to allocate the entire commanded flow to the source proportioning valve dedicated to the second heat exchanger and open the source proportioning valve dedicated to the first heat exchanger at a duty cycle which may be no greater than a predefined limit.

In some embodiments, the predefined limit may be 5%. In some embodiments, the predefined limit may be 2%. In some embodiments, the condensate sensor assembly may include redundant temperature sensors. In some embodiments, the first and second heat exchanger may be helical and formed by winding the heat exchanger around the exterior of the distillation device. In some embodiments, the first operating state may be a low temperature distillate production state and the second operating state may be a hot temperature distillate production state. In some embodiments, the first target temperature may be at least 35° C., but no greater than 40° C. In some embodiments, the controller may be configured to open the source proportioning valve dedicated to the first heat exchanger based upon a second target temperature and a delta between the second target temperature and the current concentrate temperature in the second operating state. In some embodiments, the second target temperature may be at least 65° C. hotter than the first target temperature. In some embodiments, the second target temperature may be at least 50° C. hotter than the first target temperature. In some embodiments, the second target temperature may be greater than 95° C. and less than 100° C. in some embodiments, the second target temperature may be 96° C. In some embodiments, the second target temperature may be at least double the first target temperature. In some embodiments, the second target temperature may be at least 2.5 times the first target temperature. In some embodiments, the second target temperature may be at least 3.5 times the first target temperature. In some embodiments, the system may further comprise an evaporator level sensor disposed in an evaporator reservoir in fluid communication with an evaporator of the distillation device. The controller may be configured to, in the second operational state, determine the total flow command at least in part based on an evaporator level data signal indicative of a level of a water column in the evaporator reservoir. In some embodiments, the first target temperature may be at least 20° C., but no greater than 30° C. In some embodiments, the first target temperature is 25° C.

In accordance with another embodiment of the present disclosure a method of controlling and allocating a flow of source fluid into a distillation device may comprise sensing, with a concentrate level sensor, a concentrate level in a concentrate reservoir in fluid communication with an evaporator of the distillation device. The method may further comprise sensing a temperature of product fluid produced by the distillation device at a point downstream of a product heat exchanger which places product fluid in heat exchange relationship with incoming source fluid. The method may further comprise determining, with a processor, a concentrate accumulation rate based on the concentrate level. The method may further comprise calculating, with a processor, a first delta between the concentrate accumulation rate and a first target concentrate accumulation rate and a second delta between the concentrate accumulation rate and a second target concentrate accumulation rate. The method may further comprise determining, with a processor, a first provisional open state command and second provisional open state command for a first and second source inflow proportioning valve. The first provisional open state command may be based on the first delta and the second provisional open state command based on the second delta. The method may further comprise computing, with a processor, a final open state command from the provisional open state time commands. The method may further comprise dividing, with the processor in a first operational state, the final open state command between the first source inflow proportioning valve and second inflow proportioning valve. The first source inflow proportioning valve may lead to a product heat exchanger. The dividing may be based on a delta between a target product temperature and the temperature of the product fluid. The method may further comprise allocating, with the processor in a second operational state, an entirety of the final open state command to the second source inflow proportioning valve. The method may further comprise opening, via a command from the processor, the first source inflow proportioning valve at a duty cycle which is no greater than a predefined limit with the processor in the second operational state.

In some embodiments, the first target accumulation rate may be greater than the second target accumulation rate. In some embodiments, computing the final open state command may comprise inputting the first provisional open state command and second provisional open state command into a slider. In some embodiments, computing the final open state command may comprise generating a hybrid command from the first and second provisional source open state commands. In some embodiments, computing the final open state command may comprise determining a first state fraction and a second state fraction and multiplying the first provisional open state command by the first state fraction and multiplying the second provisional open state command by the second state fraction. In some embodiments, computing the final open state command comprises adjusting the command from predominately the first provisional open state command to predominately the second provisional open state command during a transition between the first operational state and the second operational state. In some embodiments, computing the final open state command may comprise adjusting the command from purely the first provisional open state command to purely the second provisional open state command during a transition between the first operational state and the second operational state. In some embodiments, the second operational state may be a hot distillate production state. In some embodiments, the dividing may comprise determining an open state command for the first source inflow proportioning valve based on a delta between a target product temperature and the temperature of the product fluid and determining an open state command for the second source inflow proportioning valve by subtracting the open state command from the first source inflow proportioning valve from the final open state command. In some embodiments, the predefined limit may be a limit of less than 5%. In some embodiments, the predefined limit may be a limit of less than 2%. In some embodiments, the determining the second provisional open state command further may comprise sensing a level of a liquid column, with an evaporator level sensor, in an evaporator reservoir in fluid communication with the evaporator. The second provisional open state command may be based in part on a delta between the level of the liquid column and a target level of the liquid column. In some embodiments, the second provisional open state command may be based on a rate of change in the delta between the level of the liquid column and the target level of the liquid column.

In accordance with an embodiment of the present disclosure a medical system may comprise at least one concentrate fluid. The system may further comprise a distillation device having an evaporator, a condenser, and a purified product water heat exchanger having a source fluid flow path and a purified product water flow path in heat exchange relation with one another. The system may further comprise a medical treatment device the medical treatment device may include a treatment fluid preparation circuit in selective fluid communication, via a point of use valve, with the purified product water flow path. The medical treatment device may include a treatment device processor configured to command mixing of the at least one concentrate and purified water to generate a prescribed treatment fluid with the treatment fluid preparation circuit. The system may further comprise a communications link between the treatment device processor of the medical treatment device and a distillation device processor of the distillation device. The medical treatment device processor may be configured to transmit mode commands to the distillation device processor. The system may further comprise a sensor assembly in communication with the purified product water flow path. The system may further comprise a source valve intermediate a fluid source and the source fluid flow path. The distillation device processor may be configured to actuate the source valve based at least in part on the mode commands and data from the sensor assembly.

In some embodiments, the sensor assembly may include at least one temperature sensor and at least one conductivity sensor. In some embodiments, the distillation device processor may be configured to actuate the source valve based at least in part on the mode commands and temperature data from the sensor assembly. In some embodiments, the distillation device processor may be configured to actuate the source valve based at least in part on the mode commands and data from the sensor assembly and a target set point for purified water. In some embodiments, the target set point may be a temperature set point. In some embodiments, the target set point may be determined by the distillation device processor based on the mode commands. In some embodiments, the target set point may be based off a first mode command of the mode commands which may be in the range of 20–30° and a target set point based off a second mode command of the mode commands which may be greater than 90° C.

In some embodiments, the medical treatment device may be a dialysis machine. In some embodiments, the medical treatment device may be a hemodialysis device. In some embodiments, the treatment fluid may be a dialysis fluid. In some embodiments, the condenser may include a condensing section and a product storage section. The product storage portion may have a volume of at least one liter. In some embodiments, the distillation device processor may be further configured to govern operation of a compressor motor of the distillation device based at least in part on the mode commands. In some embodiments, the distillation device processor may be further configured to govern operation of a concentrate outlet valve of the distillation device based at least in part on the mode commands.

In accordance with an embodiment of the present disclosure a medical system may comprise a distillation device having and evaporator, a source inlet flow path to a source input in fluid communication with the evaporator, a condenser, a purified product water output flow path in fluid communication with the condenser. The system may further comprise a first and second filter in the source inlet flow path. The system may further comprise a plurality of pressure sensors including a first pressure sensor upstream the first filter and a second pressure sensor downstream the second filter. The system may further comprise a medical treatment device the medical treatment device including a treatment fluid preparation circuit in selective fluid communication, via a point of use valve, with the purified product water output flow path. The system may further comprise a communications link between a treatment device processor of the medical treatment device and a distillation device processor of the distillation device. The distillation device processor may be configured to conduct a first filter replacement check based on data from the plurality of pressure sensors and the treatment device processor may be configured to conduct a second filter replacement check and command the distillation device processor into a filter replacement mode, via the communications link, when either of the first or second filter replacement check fails.

In some embodiments, the second filter replacement check may include a check of a number of days elapsed since installation of the first and second filter against a limit. In some embodiments, the medical treatment device may include a graphical user interface. In some embodiments, the second filter replacement check may include a check of a user input on the graphical user interface against at least one predefined criteria. In some embodiments, the system may further comprise a sampling port disposed intermediate the first and second filter and the predefined criteria may be a water chemistry test strip criteria. In some embodiments, the water chemistry test strip criteria may be a chlorination level criterion. In some embodiments, the distillation device processor may be configured to command a flush of the first and second filter prior to at least one of the first filter replacement check or second filter replacement check. In some embodiments, the distillation device processor may be configured to conduct the first filter replacement check based on a filter output pressure data signal from the second pressure sensor. In some embodiments, the distillation device processor may be configured to indicate a failure of the first filter replacement check when the filter output pressure is below a threshold. In some embodiments, the distillation device processor may be configured to conduct the first filter replacement check based on a delta between a pressure upstream of the first and second filter as indicated by the first pressure sensor and a pressure downstream of the first and second filter as indicated by the second pressure sensor. In some embodiments, the distillation device processor may be configured to indicate a failure of the first filter replacement check when the delta is less than a threshold.

In accordance with another embodiment of the present disclosure A medical system may comprise a distillation device having a source water input and a fluid output flow path. The system may further comprise a medical treatment device including a plurality of fluid flow paths, a plurality of valves, at least one fluid pump, and a fluid inlet in selective fluid communication, via a point of use valve, with the fluid output flow path. The system may further comprise a communications link between the medical treatment device and distillation device. The system may further comprise a sensor assembly in communication with the fluid output flow path. The system may further comprise a treatment device processor configured to actuate the plurality of valves and the at least one fluid pump to pump a high temperature fluid through the plurality of fluid flow paths. The system may further comprise a distillation device processor configured to govern operation of the distillation device based on at least one data signal from the sensor assembly and a mode command sent over the communications link from a treatment device processor of the medical treatment device to produce and output the high temperature fluid to the fluid output flow path during a first period in which the point of use valve is commanded open by the distillation device processor and a second period in which the point of use valve is commanded closed by the distillation device processor and a valve to a flow path in fluid communication the fluid output flow path is commanded open.

In some embodiments, the source water input may be in fluid communication with a non-temperature controlled fluid source. In some embodiments, the medical treatment device may be a dialysis machine. In some embodiments, the medical treatment device may be a hemodialysis machine. In some embodiments, the plurality of fluid flow paths may include a first flow path and second flow path separated from one another by a semi-permeable membrane. In some embodiments, the plurality of fluid flow paths may be included in at least a blood pumping cassette and a dialysate pumping cassette. In some embodiments, the medical treatment device may include a fluid reservoir and the treatment device processor may be configured to send a signal to the distillation device processor to end the first period based on an amount high temperature fluid contained in the fluid reservoir. In some embodiments, the medical treatment device may include a heater. In some embodiments, the at least one data signal may include at least one temperature data signal. In some embodiments, the distillation device may include a compressor and the distillation device processor may be configured to govern operation of the compressor via a compressor speed command determined based in part on of the mode command. In some embodiments, the distillation device processor may be configured to govern operation of the distillation device based on the least one data signal and another mode command sent over the communications link from a treatment device processor to produce and output a medical treatment fluid component to the fluid output flow path. In some embodiments, the plurality of flow paths may comprise a medical treatment fluid mixing circuit and the treatment device processor may be configured to command operation of the at least one pump and plurality of valves to mix the medical treatment fluid component with at least one concentrate in fluid communication with the plurality of flow paths in accordance with a predetermined prescription.

The details of one or more embodiments are set forth in the accompanying drawings and the description below. Other features and advantages will become apparent from the description, the drawings, and the claims.

BRIEF DESCRIPTION OF THE DRAWINGS

These and other aspects will become more apparent from the following detailed description of the various embodiments of the present disclosure with reference to the drawings wherein:

FIG. 22 depicts an exploded view of a drip tray and mist eliminator;

FIG. 26 depicts a top down view of an example compressor;

FIGS. 27 and 28 depict cross sections taken at the indicated planes of FIG. 26;

FIG. 29 depicts another top down view of an example compressor;

FIGS. 30 and 31 depict cross sections taken at the indicated planes of FIG. 29;

FIG. 58 depicts a top down view of an example purifier;

FIG. 59 depicts a cross sectional view extending through a product reservoir and product reservoir level sensor of a purifier taken at the indicated plane of FIG. 58;

FIG. 61 depicts another exploded view of an example evaporator condenser of a purifier;

FIG. 62 depicts an enlarged detailed view of the indicated region of FIG. 61;

FIG. 72 depicts a top down view of an example compressor and steam chest;

FIG. 73 depicts a cross-sectional view taken at the indicated plane of FIG. 72;

FIG. 74 depicts a cross-sectional view taken at the indicated plane of FIG. 72;

FIG. 75 depicts a top down view of an example compressor and steam chest;

FIG. 76 depicts a cross-sectional view taken at the indicated plane of FIG. 75;

FIG. 77 depicts a cross-sectional view taken at the indicated plane of FIG. 75;

FIG. 125 depicts a flowchart detailing a number of example actions which may be used to adjust a product reservoir outlet valve duty cycle based on data from one or more product temperature sensor;

FIG. 128 depicts a flowchart detailing a number of example actions which may be used to control and electronics cooling valve of a system;

FIG. 129 depict a flowchart depicting a number of example actions which may be used to control cooling of an electronics housing of a system; and FIG. 130 depicts a flowchart depicting a number of example actions which may be executed to control the temperature of a blowdown process stream output from a heat exchanger.

Like reference symbols in the various drawings indicate like elements.

DETAILED DESCRIPTION OF EXEMPLARY EMBODIMENTS

Figure 1:
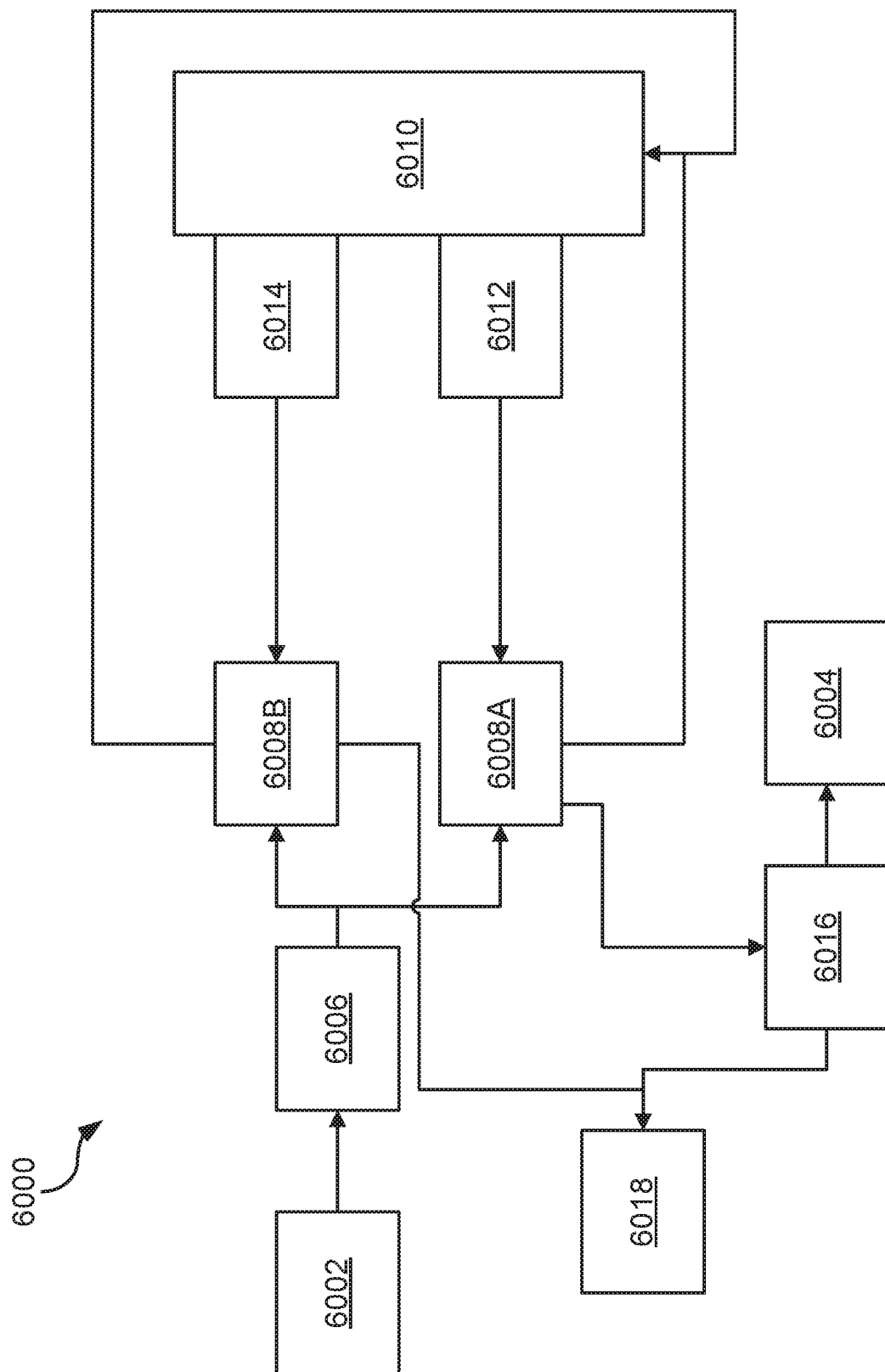
FIG. 1 depicts an example schematic diagram of a water purification system.

FIG. 1 depicts a schematic diagram of an exemplary water purification system 6000. The system 6000 may draw water from a source 6002 and purify the water to remove various contaminants making the water fit for consumption at a point of use. The point of use in the exemplary diagram is a medical system 6004. The purified output of the system 6000 may, in certain examples, be used as a component of a medical treatment fluid used by the medical system 6004. The system 6000 may, however, be used to provide water for drinking purposes or for other devices which require water meeting specific quality standards. Medical systems 6004 which may be used with the purification system 6000 may include various dialysis systems. The medical system 6004 may be a system for mixing therapeutic agents such as dialysate. The medical system 6004 may also orchestrate a dialysis (peritoneal or hemo) treatment for a patient. In specific examples, the medical system 6004 may be a peritoneal dialysate mixing system or may be a hemodialysis system such as those described in U.S. patent application Ser. No. 12/072,908 filed Feb. 27, 2008 and entitled Hemodialysis Systems and Methods, now U.S. Pat. No. 8,246,826, issued Aug. 21, 2012; U.S. patent application Ser. No. 12/199,055 filed Aug. 27, 2008 and entitled Enclosure for a Portable Hemodialysis System, now U.S. Pat. No. 8,393, 690, issued Mar. 12, 2013; and U.S. Non Provisional patent application filed Mar. 29, 2019 and entitled Liquid Pumping Cassettes and Associated Pressure Distribution Manifold and Related Methods, each of which is hereby incorporated herein by reference in its entirety.

Various systems, methods and apparatus described in U.S. patent application Ser. No. 13/952,263 filed Jul. 26, 2013 and entitled Water Vapor Distillation Apparatus, Method and System, now U.S. Pat. No. 9,604,858, issued Mar. 28, 2017 which is incorporated herein by reference in its entirety; and U.S. patent application Ser. No. 10/713,617 filed Nov. 13, 2003 and entitled Pressurized Vapor Cycle Liquid Distillation, now U.S. Pat. No. 7,597,784, issued Oct. 6, 2009 which is hereby incorporated herein by reference in its entirety, may be used together with any one or more embodiments of water distillation apparatus, methods and methods described herein. Therefore, additional embodiments are contemplated, some of which include one or more apparatus, systems and methods described in the above referenced documents.

As shown, water may travel from a source 6002 to at least one filter 6006. The source 6002, may be a source 6002 which would meet US EPA requirements for drinking water. The source 6002 may for example meet the requirements of the National Primary Drinking Water Regulations (40 CFR 141) which is hereby incorporated herein by reference in its entirety. It should be noted that this disclosure is not bound by any definitions provided in § 141.2 or in any other portion of the above incorporated by reference document. In specific embodiments, the source or source fluid reservoir 6002 may be a residential water line which dispenses water from a municipal water supply or private water supply. The at least one filter 6006 may be an activated charcoal filter. Other filter types which remove expected undesirable component(s) of the source 6002 water like oxidizers such as chlorine, chloramines, etc. may also be used. In certain embodiments, two redundant filters 6006 may be included in the system 6000. From the at least one filter 6006, the water may pass onto one or more heat exchangers 6008A, B.

In the example embodiment, a first heat exchanger 6008A and second heat exchanger 6008B are depicted. These heat exchangers 6008A, B may be countercurrent heat exchangers. Fluid entering each heat exchanger 6008A, B may be placed in a heat exchange relationship with at least one process stream from the water purifier 6010 of the system 6000. The at least one process stream in each heat exchanger 6008A, B may be different process streams, though the heat exchangers 6008A, B may each mutually carry at least one common process stream as well. Where multiple streams are carried by a single heat exchanger, the streams may be separated as described in relation to any heat exchangers described herein. In specific embodiments, one heat exchanger 6008A may carry a purified or product process stream, while the other may carry all other process streams from the water purifier 6010 (blowdown, retentate, vented gases, volatiles, or other discarded process streams). Such heat exchangers 6008A, B may respectively be referred to as a product heat exchanger and blowdown heat exchanger.

A valve or valves may be included to provide control over the proportions of filtered source water flowing to one heat exchanger 6008A, B versus the other. This may allow for water flowing from the at least one filter 6006 through each of the heat exchangers 6008A, B to be altered in temperature to a greater or lesser degree. Likewise, it may allow for the process streams traveling through the heat exchangers 6008A, B to be altered in temperature to a greater or lesser degree. In some embodiments, the total mass flow or total incoming fluid from the at least one filter 6006 through both of the heat exchangers 6008A, B may be generally constant or controlled by an otherwise unrelated control algorithm as the proportion of incoming fluid directed to each heat exchanger 6008A, B is manipulated. The total mass flow of fluid from the at least one filter 6006 through the heat exchangers 6008A, B may also fluctuate in tandem with this proportion.

From the heat exchangers 6008A, B the filtered source flow may recombine and enter the purifier 6010 for purification. The purifier 6010 may remove or reduce a concentration of at least one contaminant and likely multiple contaminants in the source water. The water purifier 6010 may be any of the water vapor distillation devices described herein though other distillation devices or water purification devices may also be used. In the example system 6000, the water purifier 6010 is capable of purifying water to quality standards sufficient to support usage of the purified water in the medical system 6004. The water may for example conform to quality standards issued by a government organization, standards organization, NGO, or other appropriate organization. Where the medical system 6004 is a dialysis system, the standards may, for example, be those in the USP Water for Hemodialysis Monograph which is hereby incorporated by reference herein in its entirety.

The water purifier 6010 may produce a number of process streams. The process streams may be fluid streams and may include, but are not limited to, a product water stream, a blowdown water stream, and a gaseous vented stream. Some of these streams may be contained in process stream reservoirs after being generated in the water purifier 6010. In the example illustration, a product water reservoir 6012 and blowdown reservoir 6014 are included. These reservoirs 6012, 6014 may include an interior volume sized to contain a volume of fluid from their respective process streams. Each reservoir 6012, 6014 may also include a level sensor to determine the volume of the respective process stream in each reservoir.

The process streams may exit the water purifier 6010 or reservoirs 6012, 6014 and proceed to the heat exchangers 6008A, B of the system 6000. As these streams pass through the heat exchangers 6008A, B heat transfer may occur between the process streams and the source water en route to the purifier 6010 from the at least one filter 6006. In general, the process streams may transfer heat to the source water thus cooling the process streams and elevating the temperature of the source water. Where a gaseous process stream passes through a heat exchanger 6008A, B the heat exchange may cause at least a portion of the gaseous process stream to condense.

As mentioned above, the mass proportion of source water transiting through each heat exchanger may be varied. The mass proportion may, for example, be controlled to bring the product stream temperature into conformance with a predetermined temperature range or threshold. This temperature requirement may be an acceptable usage temperature range or threshold for the medical system 6004. The medical system 6004 may accept water at temperatures below a certain threshold and/or within a certain range and the mass proportion of source water flow may be controlled to ensure the product stream is in conformance with any such criteria. Where the medical system 6004 is a hemodialysis system, the threshold may be around the average human body temperature (e.g. 37° C.+/−5° C.).

The system 6000 may additionally include at least one sensor assembly 6016. The at least one sensor assembly 6016 may monitor a characteristic of interest or multiple characteristics of interest of one or more of the process streams. Potential characteristics of interest may include, but are not limited to, temperature, concentrations of dissolved ions, conductivity, optical characteristics, turbidity, presence of particular compounds or elements and any other water quality characteristics described elsewhere herein. In some specific embodiments, a sensor assembly 6016 may monitor the quality of water exiting a first or product heat exchanger 6008A. Conductivity and temperature may, for example, be measured. Data from the at least one sensor assembly 6016 may provide feedback for a controller (e.g. P, PI, PID) which governs the mass proportion of source water flowing through each heat exchanger 6008A, B. Additionally, data from the at least one sensor assembly 6016 may inform operation of a divert valve allowing the product water stream to either proceed to the medical system 6004 or to a drain 6018 or discard location. If, for example, conductivity of the product water is greater than a predefined threshold, the divert valve may be actuated to divert the product water to the drain 6018 until the conductivity falls back to acceptable levels.

The drain 6018 may also be used to receive any product water which is generated in excess by the water purifier 6010. If the medical system 6004 does not require water and the product reservoir 6012 is full, product water may be diverted to the drain 6018. The drain 6018 may also receive other process streams from the water purifier 6010 such as the blowdown stream and any other waste streams. The drain 6018 may be any suitable destination such as a municipal drain or the like.

Figure 2:
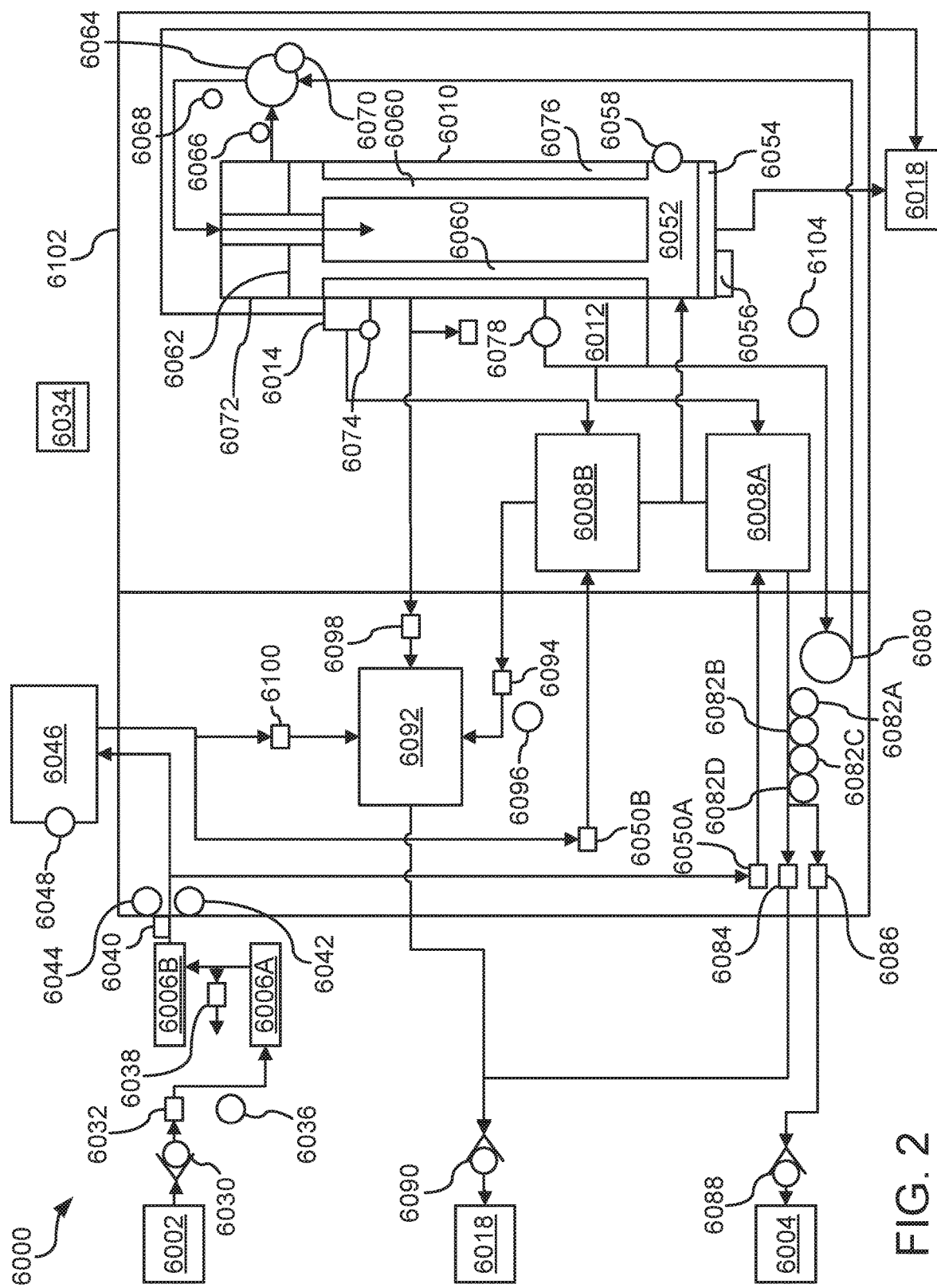
FIG. 2 depicts another example schematic diagram of a water purification system.

Referring now to FIG. 2, another representational block diagram of an example of system 6000 from FIG. 1 is shown. The example system 6000 includes a source check valve 6030 which allows one way flow from the source 6002 into the rest of the system 6000. Additionally, a shut off valve 6032 is included. This shut off valve 6032 may be mechanical (e.g. a ball valve) or may be operated by a controller 6034. The shut off valve 6032 may be actuated to prevent source fluid from entering the system in the event of a failure condition or in other undesirable situations. The example system 6000 also includes a pressure transducer 6036 which may be in data communication with the controller 6034 and sense the pressure of incoming source water.

The exemplary system 6000 includes a first filter 6006A and a second filter 6006B. An additional coarse filter (not shown) for preventing ingress of large sediment may be included upstream the first filter 6006A and second filter 6006B in some embodiments. The first filter and second filter 6006A, B may be activated charcoal filters (e.g. 5-6 L activated charcoal filters). These filters 6006A, B may serve as organic contaminant and/or oxidizer removal elements and may remove chemicals like chlorine, chloramines, and others from the source water.

In specific implementations, the first and second filter 6006A, B may be substantially identical redundant filters. The filters 6006A, B may be separated by a fluid flow pathway which includes a test or sampling port 6038. The sampling port 6038 may allow for a user to periodically (e.g. before each use or on another predetermined schedule) draw fluid filtered via the first filter 6006A for manual testing.

The sampling port 6038 may include a valve (e.g. manually operated valve) which, when actuated, allows a sample to be dispensed into a testing receptacle or the like. In some embodiments, the sampling port 6038 may be accompanied by a push button which mechanically opens a flow path for water to travel for dispensing through the sampling port 6038. A controller 6034 may also receive a signal upon depression of the push button. In certain embodiments, the sampling valve may be controller actuated and be commanded open by the controller 6034 upon receipt of a button depression signal by the controller 6034. The sampling port 6038 may be associated with a user interface, e.g. a graphical user interface and the button may be a soft button displayed on a touch screen. In other embodiments, the user interface may be simple and include one or more lights (e.g. LEDS) to convey status information (power, system state, sample ready, faults, etc.).

Manual testing may depend on the type of chemicals likely to be present in the source 6002 and may include free chlorine and/or total chlorine tests. In alternative embodiments, a meter for sensing concentrations of expected chemicals (e.g. chlorine meter) may be included instead of or in addition to the test port 6038. Such a meter may be in data communication with the controller 6034 which may analyze data generated via the meter. The test port 6038 and/or meter may allow for a user to determine when the filters 6006A, B need to be swapped out. In some embodiments, the system 6000 may prevent operation of the water purifier 6010 until the controller 6034 receives a signal indicative of an acceptable filtration of water exiting the first filter 6006A. Alternatively or additionally, the medical system 6004 may not accept water from the system 6000 unless a data signal indicative of an acceptable filtration from the first filter 6006A is received. Where testing is manually performed, the signal may be generated via a user input to a user interface of the system 6000 or via a user input to a user interface of the medical system 6004. The signal may also be generated by a test meter as well.

After passing through the second filter 6006B, the filtered source water may enter a valve manifold 6039. Upon entering the valve manifold 6039, the pressure of the water may be regulated to a predetermined pressure by a pressure regulator 6040. The predetermined pressure may be between 15-30 psig (e.g. 20 psig). The pressure and temperature of the water may be sensed by a pressure sensor 6044 and temperature sensor 6042 which are in data communication with the controller 6034. Filtered source water may then proceed to a blowdown heat exchanger 6008B and product water heat exchanger 6008A.

The flow path leading to the blowdown heat exchanger may extend to an electronics housing 6046 of the system 6000. As water travels to the blowdown heat exchange 6008B, the route of the flow path may establish a heat exchange relationship with the electronic components of the electronics housing 6046. Thus, the filtered source water may serve to cool the electronics in the electronics housing 6046 while en route to the blowdown heat exchanger 6008B. Alternatively or additionally, source water en route to the product heat exchanger 6008A may be routed into heat exchange relationship with the electronics of the electronics housing 6046. As shown, the electronics housing 6046 may be associated with an electronics temperature sensor 6048 which provides temperature data to the controller 6034. In certain embodiments, there may be a plurality of temperature sensors 6048 in the electronics housing 6046 for added redundancy and/or to monitor specific components (e.g. a power module).

Source proportioning control valves 6050A, B may be operated by the controller 6034 to govern the mass proportion of source water flowing through each of the blowdown and product heat exchangers 6008A, B. As mentioned above, the mass proportion may be chosen to achieve a desired temperature of one or more of the process streams from the water purifier 6010. It should be noted, however, that the mass proportion may also be controlled to ensure adequate cooling of the electronics housing 6046. In some embodiments, at least a predefined proportion of incoming source water may be provided to the blowdown heat exchanger 6008B to ensure adequate cooling. The controller 6034 may also alter the mass proportion for the heat exchangers 6008A, B in the event that temperature data from the electronics temperature sensor 6048 indicates the temperature of the electronics housing 6046 is above a threshold.

After passing through the blowdown and product heat exchangers 6008A, B the filtered source water streams may recombine and enter a sump 6052 of a water purifier 6052 through a source fluid input included in the sump 6052. The sump 6052 may includes at least one heating element 6054. The at least one heating element 6054 may be a resistive heater. A thermal fuse 6056 may also be included as a failsafe measure. The at least one heating element 6054 may heat the sump 6052 contents based on controller 6034 analysis of data from a sump temperature sensor 6058. Each heating element 6054 may be associated with a temperature sensor 6059 to provide data on the temperature at the heating element 6054. The at least one heating element 6054 may provide heat energy to incoming source water to aid in or cause evaporation of the source water within an evaporator 6060 of the water purifier 6010. The evaporator 6060 may be at least partially formed from a shell and tube type heat exchanger as described elsewhere in the specification. The top (with respect to the force of gravity) of the evaporator 6060 may include a steam chest 6072. The evaporator 6060 may transform source fluid from the source fluid input into a low pressure vapor and concentrate stream as source fluid travels toward the steam chest 6072

As the source water boils, vapor may rise from the now more concentrated source water and pass through a mist eliminator 6062 located in the steam chest 6072. The mist eliminator 6062 may inhibit water molecules still in liquid phase from exiting the evaporator 6060. The mist eliminator 6062 may, for example, be any of the exemplary mist eliminators described herein. After mist removal, the water vapor may travel to a compressor 6064. The compressor 6064 may be any suitable compressor such as any of those described herein. The compressor 6064 may compress the water vapor and in the process increase the temperature of the water vapor. The system 6000 may include a pre-compression temperature sensor 6066 and post compression temperature sensor 6068. Data from these temperature sensors 6066, 6068 may be provided to the controller 6034 and the controller 6034 may utilize this data to control the compressor 6064. A compressor temperature sensor 6070 (or redundant compressor temperature sensors) may further be included to provide the controller 6034 temperature data related to the compressor 6064.

In some embodiments, the controller 6034 may included a plurality of processors which may control different system 6000 components. In some embodiments, a main control processor and a peripheral control processor may be included in the controller 6034. The peripheral control processor may control the at least one heating element 6054 and the compressor 6064 while the main control processor receives sensor data and controls other components of the system 6000. The processors may exchange data to facilitate division of responsibilities. For example, sensor data and/or high level commands from the main control processor may be provided to the peripheral control processor. The peripheral control processor may provide its command outputs to the main control processor.

As pure vapor passes from the evaporator 6060 to the compressor 6064, impurities in the source water may be concentrated to form a blowdown process stream. In the example embodiment, the blowdown process stream may pass from the evaporator 6060 and into the blowdown reservoir 6014. The blowdown reservoir 6014 may be disposed lateral to the steam chest 6072 and in communication therewith. A blowdown level sensor 6074 may be included in association with the blowdown reservoir 6014 and be in data communication with the controller 6034. The blowdown level sensor 6074 may directly measure and generate a data signal indicative of a level of concentrate or blowdown in the steam chest 6072. Data from the blowdown level sensor 6074 may be used by the controller 6034 to ensure a sufficient amount of concentrate is maintained in the evaporator 6060 as well as to confirm a desired amount of blowdown flux is present. The blowdown reservoir 6014 as well as the sump 6052 may be in direct communication with a drain 6018 via fluid conduits in the event excess fluid needs to be drained out of the water purifier 6010.

A product water process stream may be formed by the condensing vapor passed from a high pressure vapor outlet of the compressor 6064 to the condenser 6076. At least a portion of this vapor may condense on a section of the evaporator 6060 which is in communication with the condenser 6076. In various embodiments, the condenser 6076 may be in a heat exchange relationship with a number of exterior surfaces of the evaporator 6060. The latent heat of condensation provided within the condenser 6076 from the condensing water may aid in the evaporation of the source water in the evaporator 6060.

As shown, a product reservoir 6012 may be attached to and in communication with the condenser 6076 volume. The product reservoir 6012 may include a product level sensor 6078 in data communication with the controller 6034. The product level sensor 6012 may be used to determine a volume of product water which is available for use and may also be used to confirm fluid is flowing from the product reservoir 6012. The product reservoir 6012 may be positioned such that it is at even height with a portion of the condenser 6076. Thus the product level sensor 6078 may measure both a level of water within the product reservoir 6012 as well as a level of water within the condenser 6076. From this, a total volume of available product water may be surmised. The product reservoir 6012 may be disposed such that the product level sensor 6078 may measure available product levels of up to 1-10 L (e.g. 1, 2, 5 or 6 L) though any volume range is possible. In this sense the product reservoir 6012 may serve as an auxiliary product reservoir.

Where the product level sensor 6078 measures the condensate level within the condenser 6076, the condenser may be divided into to two sections. The first section may be a condensing section. The second section may be a condensate accumulation section. The volume of the second section may be equal to the maximum available product level to be measured. When the second section is not full, the unfilled portion of the second section may act similarly to the first section and provide condensing surfaces for high pressure vapor to condense upon. The product reservoir 6012 may be fluidically connected to the condensate accumulation section adjacent a condensate accumulation surface where the condensate first begins to collect (e.g. the bottom of the condenser 6076). This may allow the product level sensor 6078 to begin measuring an accurate amount of available product water soon after the process stream starts accumulating.

The product reservoir 6012 may also be in communication with a feed pump 6080. The feed pump 6080 may pump fluid from the product reservoir to the compressor 6064. This fluid may act as a coolant for the compressor 6064 as well as a lubricating fluid for one or more bearing of the compressor 6064. As the bearing feed may be a source of purified water, a return path may not be included. Instead, the fluid may enter the compressor 6064 after usage and be returned to the condenser 6076 without compromising its purity. The pressure and temperature of the bearing feed fluid may be monitored by bearing feed pressure sensor 6081 and a bearing feed temperature sensor 6083 each in data communication with the controller 6034.

After exiting the reservoirs 6012, 6014 the blowdown and product process streams may flow to their respective heat exchangers 6008A, B. With respect to the product process stream, after passing through the product heat exchanger 6008A, the stream may pass a number of sensors 6082A-D downstream of the product heat exchanger 6008A. These sensors 6082A-D may sense various characteristics of interest of the product stream. The characteristics of interest may be any of those mentioned herein, however, in specific embodiments; the sensors 6082A-D may include first and second conductivity sensors and first and second temperature sensors. In some embodiments, one or more of the sensors 6082A-D may be included together as part of a sensor assembly. The controller 6034 may monitor data produced by the sensors 6082A-D to determine how to route the product stream. In the event that the product water meets quality requirements (e.g. in a predetermined temperature range and below a predetermined conductivity threshold) of the medical system 6004, a point of use valve 6086 may be actuated to allow the product stream to pass to the medical system 6004. A medical system check valve 6088 may be included to ensure that this flow is unidirectional.

If the product stream quality conflicts with at least one requirement of the medical system 6004, the controller 6034 may actuate a diverter valve 6084. When actuated, the diverter valve 6084 may establish a flow path to a drain 6018 destination where the process stream is discarded. A drain check valve 6090 may be included to ensure flow to the drain 6018 from the system 6000 is unidirectional.

The blowdown stream may also be directed to the drain 6018. Before reaching the drain 6018, however, the blowdown stream may pass to a mixing reservoir 6092 through a check valve 6097. As shown, a blowdown reservoir outlet valve 6094 may gate flow of cooled blowdown from the blowdown heat exchanger 6008B to the mixing reservoir 6092. A blowdown temperature sensor 6096, which may be in data communication with the controller 6034, may monitor the temperature of blowdown entering the mixing reservoir 6092. The mixing reservoir 6092 may also be in selective communication with the condenser 6076 via a controller 6034 actuated vent valve 6098. The vent valve 6098 may be periodically actuated to vent steam, volatiles, air, or other non condensable gases from the condenser 6076 to maintain optimal operation of the water purifier 6010. A vacuum break 6099 may be included on the vent line to avoid build up of a vacuum within the purifier 6010 as the purifier 6010 cools (e.g. after use) and its interior pressure decreases. Within the mixing reservoir 6092, the vented gases may combine with the relatively low temperature blowdown process stream to cool and condense the vented gases. Thus, hot gases may be safely vented from the condenser 6076 as needed.

If needed, a controller 6034 operated source divert valve 6100 may be opened to allow source water to enter the mixing reservoir 6092 to provide further cooling. Actuation of the source divert valve 6100 may be based at least in part on the temperature of the blowdown stream as determined from data provided by the blowdown temperature sensor 6096. Additionally or alternatively, actuation of the source divert valve 6100 may be based at least in part on the amount of venting or the duty cycle of the vent valve 6098 and/or the temperature of the electronics housing 6046. The source divert valve 6100 may also be actuated to an open state by the controller 6034 in the event the water purifier 6010 already has an adequate supply of source water. The source divert valve 6100 may also be used to flush the filter elements 6006A, B prior to a sample being taken. The source divert valve 6100 may also allow for rapid flow of source fluid to cool the electronics housing 6046 in the event that temperature sensor 6048 indicates the temperature of the electronics housing 6046 is in breach of predefined threshold criteria.

Components of the system 6000 which operate at high temperatures may be partitioned into a hot section housing 6102 of the system 6000. As mentioned elsewhere herein, this section may be insulated to increase the efficiency of the system 6000. A leak sensor 6104 may be included in the hot section 6102 to monitor the integrity of the system 6000 and provide data to the controller 6034. The leak sensor 6104 may include a conductivity sensor which monitors for the presence of liquid in the hot section 6102. Alternatively, the leak sensor may be an optical sensor monitoring a drip tray or similar reservoir.

Figure 3:
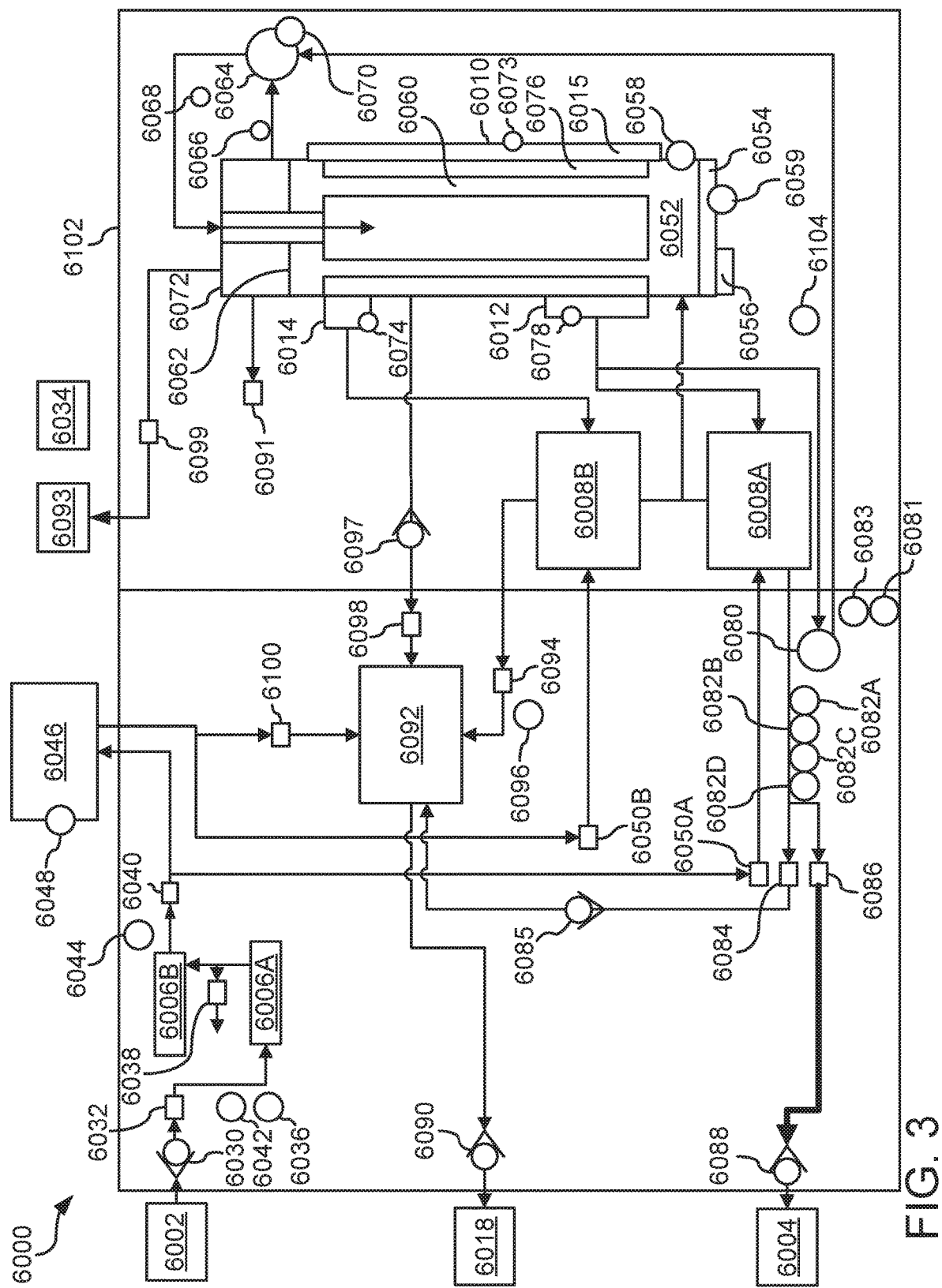
FIG. 3 depicts another example schematic diagram of a water purification system

Referring now to FIG. 3, an exemplary block diagram of a system 6000 is depicted. The system 6000 in FIG. 3 includes a number of differences in comparison to FIG. 2. As shown, the system 6000 in FIG. 3 includes an evaporator reservoir 6015 which is in fluid communication with the evaporator 6060 and disposed external to the evaporator 6060. The evaporate reservoir 6015 may include a evaporator level sensor 6073 in data communication with the controller 6034. The evaporator level sensor 6012 may be used to determine a volume of water contained within the evaporator and may be used to confirm fluid is flowing from the into the evaporator 6060. The evaporator reservoir 6015 may be positioned such that it is at even height with a portion of the evaporator 6060. Thus the evaporator level sensor 6073 may measure both a level of water within the evaporator reservoir 6015 as well as a level of water within the evaporator 6060. These values may be used to help inform filling of the evaporator 6060 during start-up or at other times which the water level has yet to reach the blowdown reservoir 6012. These values may also be used as input variables to various control loops for the purifier 6010 running on the controller 6034 during production of a product stream.

The system 6000 may also include an air filter 6093. The air filter may be a HEPA air filter or air filter with a pore size of 0.2 microns or less. The air filter may be in series with a check valve 6095 leading to the vacuum break 6099 for the purifier 6010. This filter may serve as a precaution against the ingress of detritus or micro-organisms during operation of the vacuum break 6099. The system 6000 may also include an over-pressure relief valve 6091 which may open to vent pressure from the purifier 6010 in the event that pressure in the purifier 6010 rises above a predefined value. The relief valve 6091 may be purely mechanical or under control of a controller 6034 depending on the embodiment.

The example system depicted in FIG. 3 also includes a single drain 6018. The diverter valve 6084 may gate a flow path leading to the mixing can 6092. When product water needs to be sent to drain 6018 (e.g. does not meet sensing criteria or too much product water has accumulated in the condenser 6076) the diverter valve 6084 may be actuated to open the flow path. In certain embodiments, the controller 6034 may control to a target product level in the product reservoir 6014 or condenser 6076. The discarded product may then flow through a check valve 6085 to the mixing can 6092. Once combined with all other waste or discard process streams the fluid in the mixing can 6092 may proceed onward to the drain 6018.

The line to the medical system 6004 may be insulated as shown by the heavier line weight. This may help to prevent and loss of heat as fluid travels from the sensors 6082A-D to the medical system 6004. In certain embodiments where the water may be provided to the medical system 6004 at high temperatures, the insulation may prevent a user from contacting a hot line. Any suitable insulation may be used.

Figure 4:
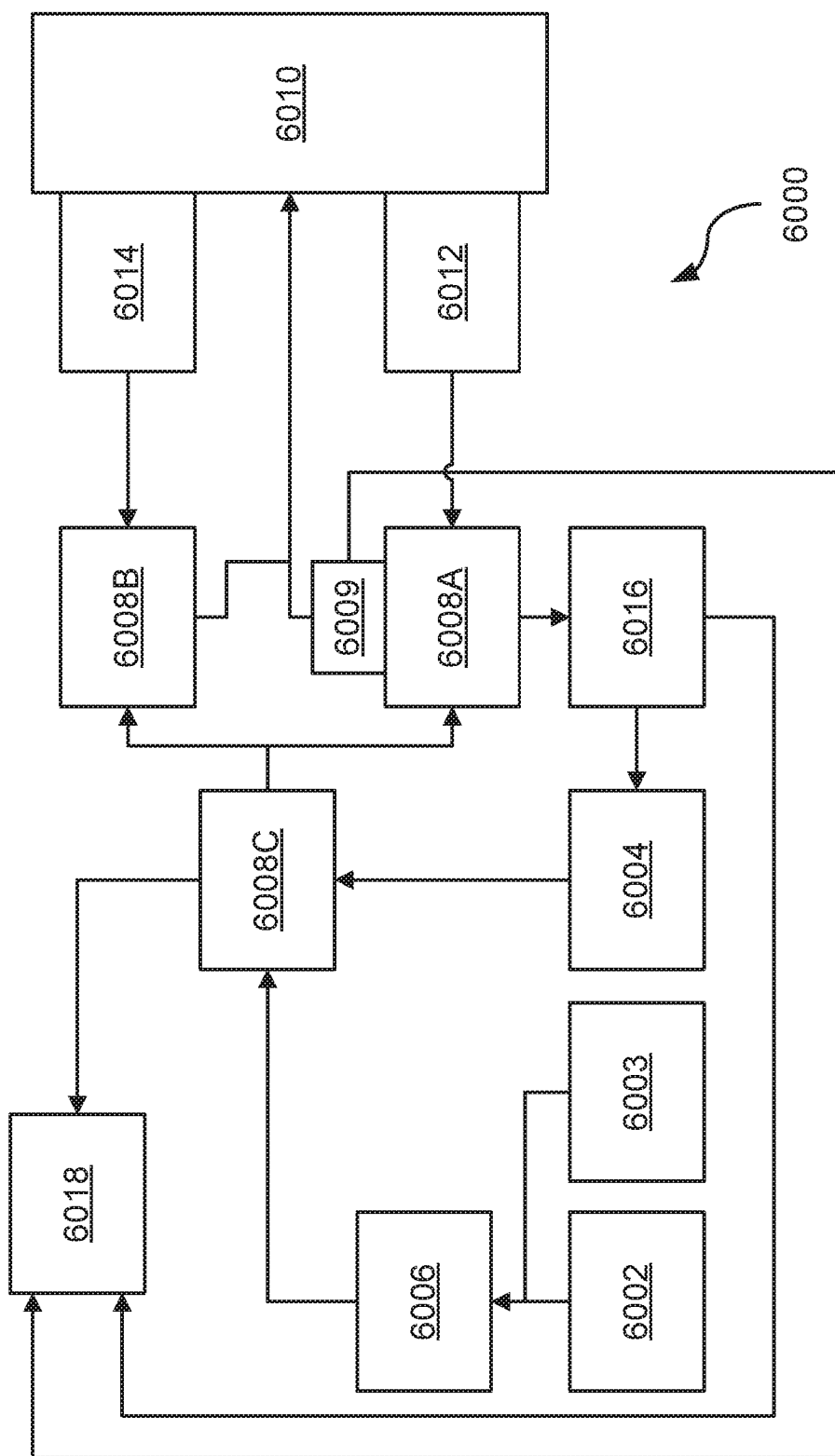
FIG. 4 depicts another example schematic diagram of a water purification system.

Referring now to FIG. 4, another exemplary block diagram of a system 6000 is depicted. In the example diagram, a third heat exchanger 6008C is depicted. This heat exchanger 6008C may be a countercurrent heat exchanger similar to other heat exchangers described herein. The exemplary third heat exchanger may exchange heat between a source fluid for the purifier and a hot output stream from the medical system 6004. The hot output stream from the medical system 6004 may be a discard stream from the medical system 6004 in some embodiments. For example, the third heat exchanger 6008C may receive spent dialysate or effluent from a hemodialysis or peritoneal dialysis device. Such a third heat exchanger 6008C may help to increase efficiency and facilitate temperature control of various process streams of the system 6000 where a hot output stream from the medical system 6004 is available.

The third heat exchanger 6008C is positioned intermediate the at least one filter 6006 and the first and second heat exchangers 6008A, B. Filtered source fluid exiting the at least one filter may pass through the third heat exchanger 6008C before passing onto the first and second heat exchangers 6008A, B. Alternatively, the third heat exchanger 6008C may be placed intermediate the at least one filter 6006 and only one of the first and second heat exchangers 6008A, B (e.g. the product water heat exchanger 6008A). The third heat exchanger 6008C may also be included as an optional fluid path for source fluid flowing through the system 6000. In such implementations, the system 6000 may include a branch fluid pathway which is gated by one or more branch valve. When desired, the one or more valve may be actuated so as to establish source fluid flow to the third heat exchanger 6008C or direct it through a separate fluid pathway to the first and second heat exchangers. A branch valve may, for example, be actuated based on a control loop to establish and break a flow path for the source fluid through the third heat exchanger 6008C. The third heat exchanger 6008C may also be disposed (with or without a valved branch fluid pathway) intermediate the product heat exchanger 6008A and the medical system 6004 or the sensor assembly 6016.

The third heat exchanger 6008C may be arranged to transfer heat from the hot output of the medical system 6004 to the source fluid en route to the purifier 6010. This may help to lower the added energy needed to cause phase change of the source fluid in examples where the purifier 6010 is a distillation device. Alternatively, where the third heat exchanger 6008C is intermediate the product heat exchanger 6008A and the sensor assembly 6016, the output of the medical system 6004 may aid in heating or cooling of the product process stream depending on the temperature differential between the two fluids. In the example shown, the hot output of the medical system 6004 is directed to a discard or drain destination 6018 in the example embodiment. In other embodiments, the third heat exchanger 6008C may also act as a cooler for the medical system 6004. The medical system 6004 may, in some embodiments, recirculate fluid through the third heat exchanger 6008C to exchange heat with a relatively cool source fluid flow. This may, for example, be desirable if the product process stream provided to the medical system 6004 is too warm for a particular operation. Whether the output from the medical system 6004 is recirculated to the medical system 6004 or dumped to the drain destination 6018 after heat transfer in the third heat exchanger 6008C may be controlled by one or more valves.

Still referring to FIG. 4, a bypass valve 6009 is included on one of the first and second heat exchangers 6008A, B. This bypass valve 6009 may be leveraged to provide additional cooling to one or more process stream from the purifier 6010 as it passes through the heat exchanger 6008A, B. In the example embodiment, the bypass valve 6009 is included on the source water output of the product heat exchanger 6008A. The bypass valve 6009 may allow for source fluid exiting the product heat exchanger 6008A to be diverted directly to a drain destination 6018 as shown. Such a bypass valve 6009 may be used when excess cooling of the product process stream may be needed. The bypass valve 6009 may be actuated to a divert state and the duty cycle of at least one of the valves controlling the flow of source water through the first and second heat exchangers 6008A, B may be altered (e.g. increased to 90-100%). Thus, relatively cool source water may be transferred through the product heat exchanger 6008A at a rapid rate to quickly draw in heat from the product process stream to aid in lowering the product process stream to a target temperature. This large volume of rapidly flowing source water may be dumped to the drain destination via the bypass valve 6009 if the source fluid volume is in excess of the demand from the purifier 6010. The bypass valve 6009 may be actuated to the divert state when a controller 6034 (see, e.g., FIG. 2) determines at least one process variable is outside of a predetermined threshold. The at least one process variable may be a relationship between or defined in part by a condensate temperature take downstream the condensate heat exchanger 6008A and the source fluid temperature.

On the other hand, if the temperature of a process stream exiting the first or second heat exchanger 6008A, B is too low, a controller 6034 (see, e.g., FIG. 2) of the system 6000 may command source fluid be drawn in, at least partially, from an alternative fluid source 6003. The alternative fluid source 6003 may be temperature controlled and may be a hot water source. The hot water source may be a domestic hot water heater or reservoir, a heated reservoir component of the system 6000, or any other suitable hot water source. In the example shown, only a first fluid source and the second, alternative fluid source are shown, however, in other embodiments, there may be more than one alternate fluid source 6003. The first fluid source may be associated with a first set of fluid input valves and the second fluid source may be associated with a second set of fluid input valves including at least one valve not in the first set of input valves.

By drawing the source fluid at least partially from the alternative fluid source 6003, the temperature drop of process streams from the purifier 6010 as they transit through the first and second heat exchanger 6008A, B may be decreased. Additionally, fluid may be drawn from the alternative fluid source 6003 in the event that a process variable is in breach of a predefined threshold. For example, fluid may be drawn from the alternative fluid source 6003 if the heating element 6054 duty cycle, source valve command duty cycle 6432 (see, e.g., FIGS. 100-101C), and/or compressor 6072 speed is above a predetermined threshold. This may help to allow the purifier 6010 to purify more fluid in the same amount of time or may help to minimize demand on various components of the purifier 6010 such as the heating element 6054 or the compressor 6072.

Figure 5:
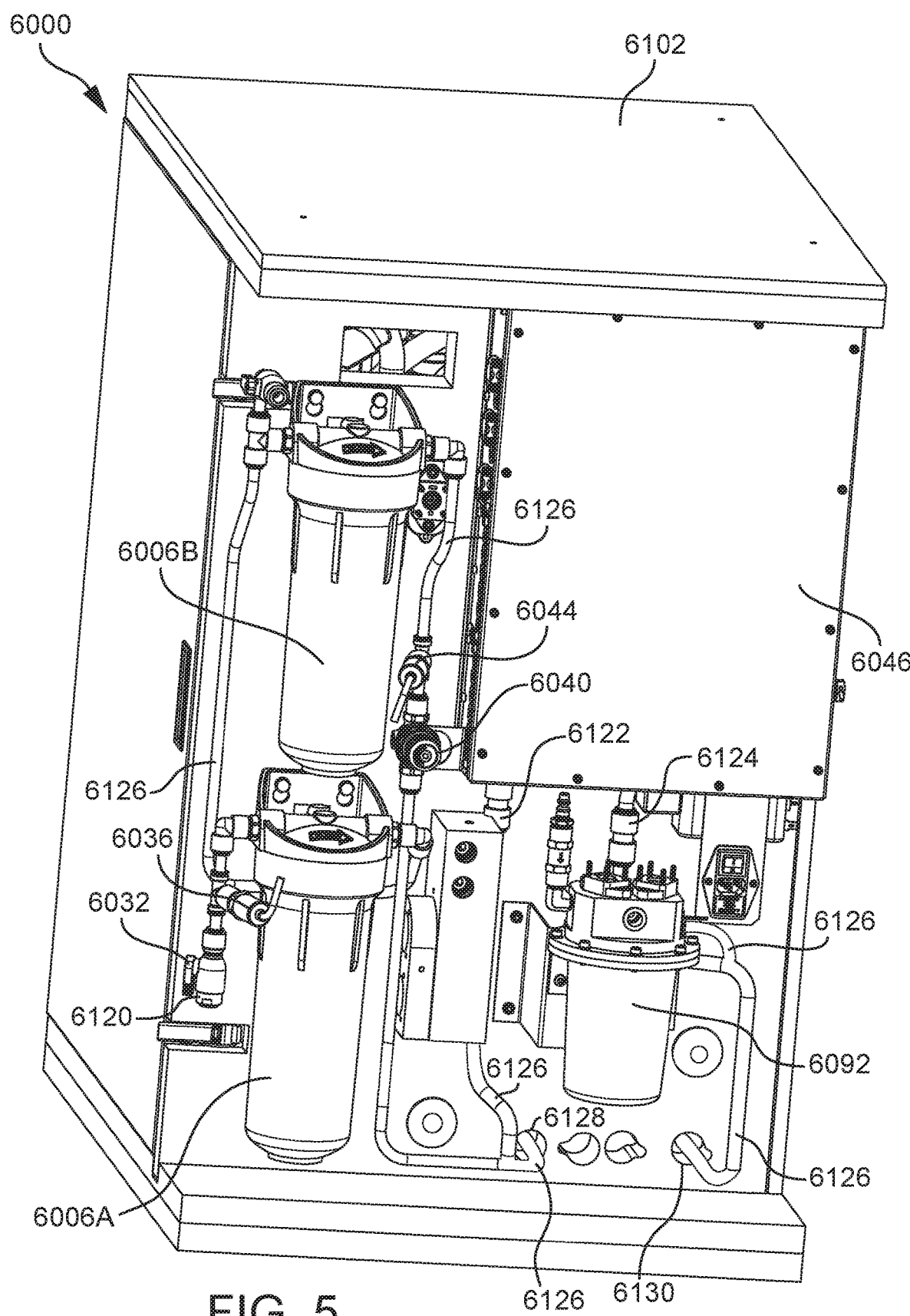
FIG. 5 depicts exemplary embodiment of the system shown in FIG. 1.

Referring now to FIG. 5, an exemplary embodiment of the system 6000 shown in FIG. 1 is depicted. For sake of clarity, only source water carrying fluid lines 6126 are shown in FIG. 5. Source water may enter the system 6000 at a connector 6120. A manual shutoff valve 6032 may be included to prevent flow of source water to the system 6000. The source water may flow through a number of filters 6006A, B. In the example shown, these filters may be 5 L activated carbon filters. A user operated sample port 6038 is included between the filters 6006A, B. The sample port 6038 in the example includes a manually actuated ball type valve. Pre and post filtration pressure transducers 6036, 6044 may also be included. The system 6000 includes a pressure regulator 6040 which may control the source water pressure to a predefined value (e.g. 20 psig).

The source water flow may be split so as to facilitate individually allocating the source water to the product and blowdown heat exchangers 6008A, B. En route to the blowdown heat exchanger 6008B, a source water fluid line 6126 may extend to an electronics heat exchanger inlet 6122. Source water may flow through a fluid conduit in the electronics housing 6046 and exit the electronics housing 6046 through an electronics heat exchanger outlet 6124. Thought not shown, the flow conduit in the electronics housing 6046 may be routed in a non straight line or meandering (e.g. switchbacked) pattern to help maximize heat transfer. A source water fluid line 6126 extending from the electronics heat exchanger outlet 6124 may provide a fluid path for the source water to the blowdown heat exchanger 6008B. A branch may be included on this section of source water fluid line 6126 allowing source water flow to be diverted to a mixing reservoir 6092 if desired. The source water fluid lines 6126 may enter the hot section housing 6102 via a product heat exchanger pass through 6128 and a blowdown heat exchanger pass through 6130 in the hot section housing 6102.

Figure 6:
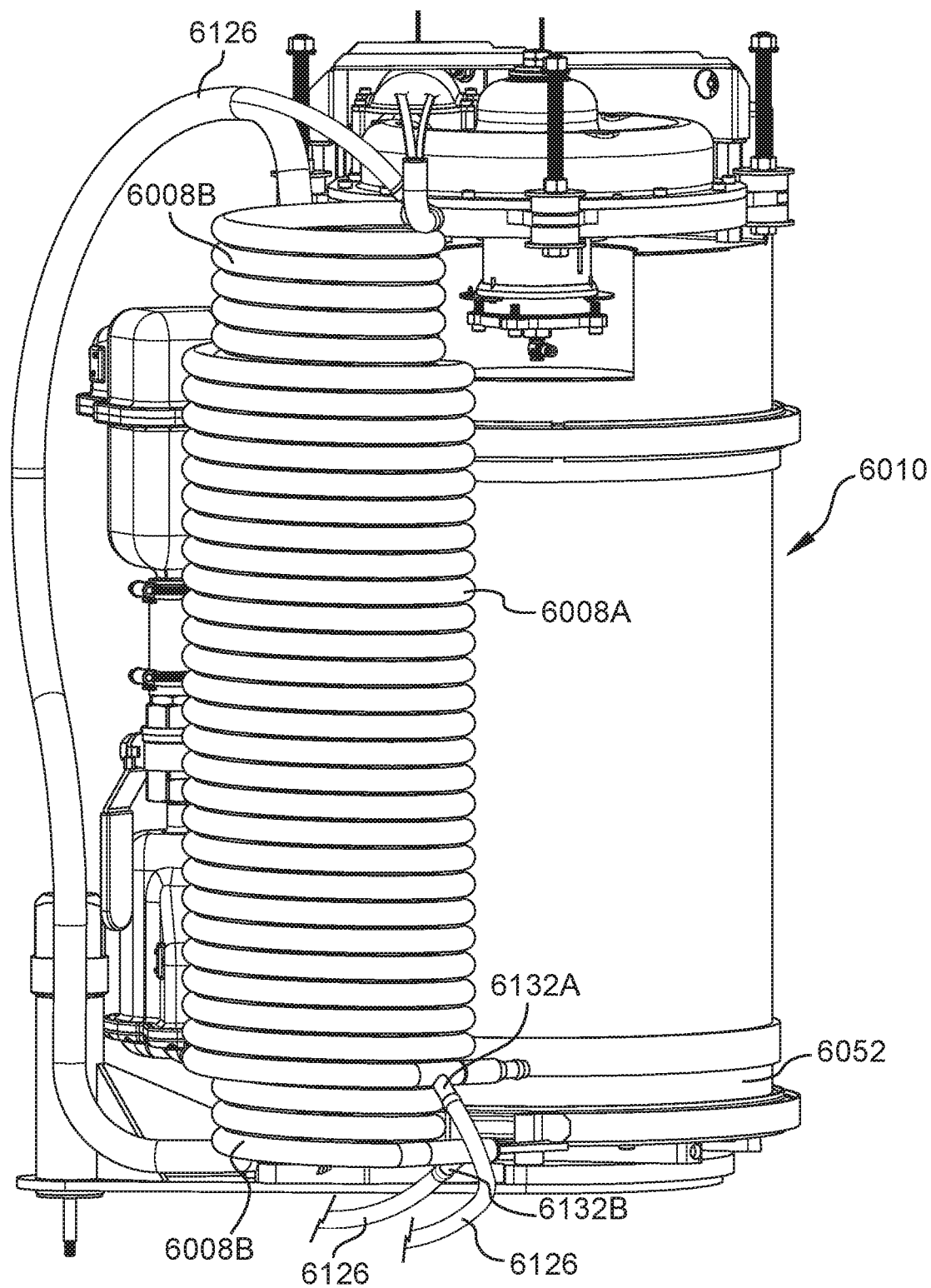
FIGS. 6-7 depict views of portions of a system with a hot section housing of the system removed.
Figure 7:
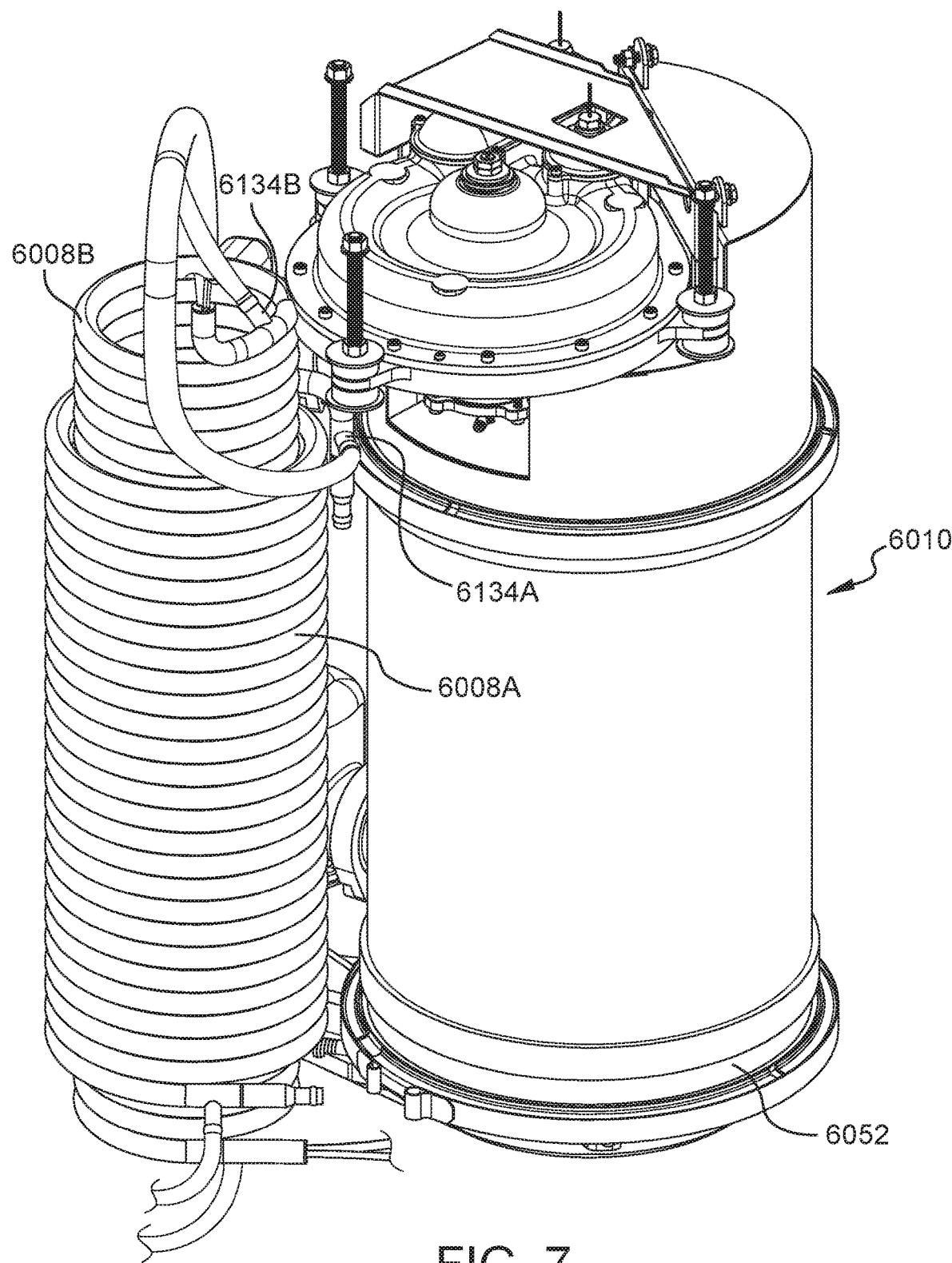

Referring now also to FIGS. 6-7, views of portions of the system 6000 are shown with the hot section housing 6102 removed. Again, for sake of clarity, only source water fluid lines 6126 and not those carrying various process streams are shown. The source water fluid lines 6126 may couple onto source water inlets 6132A, B of the respective heat exchangers 6008A, B. The source water may flow through the heat exchangers 6008A, B to respective source water outlets 6134A, B. After exiting the heat exchangers 6008A, B the source water streams may recombine and proceed through a source water line 6126 leading to the sump 6052 of the water purifier 6010.

Figure 8:
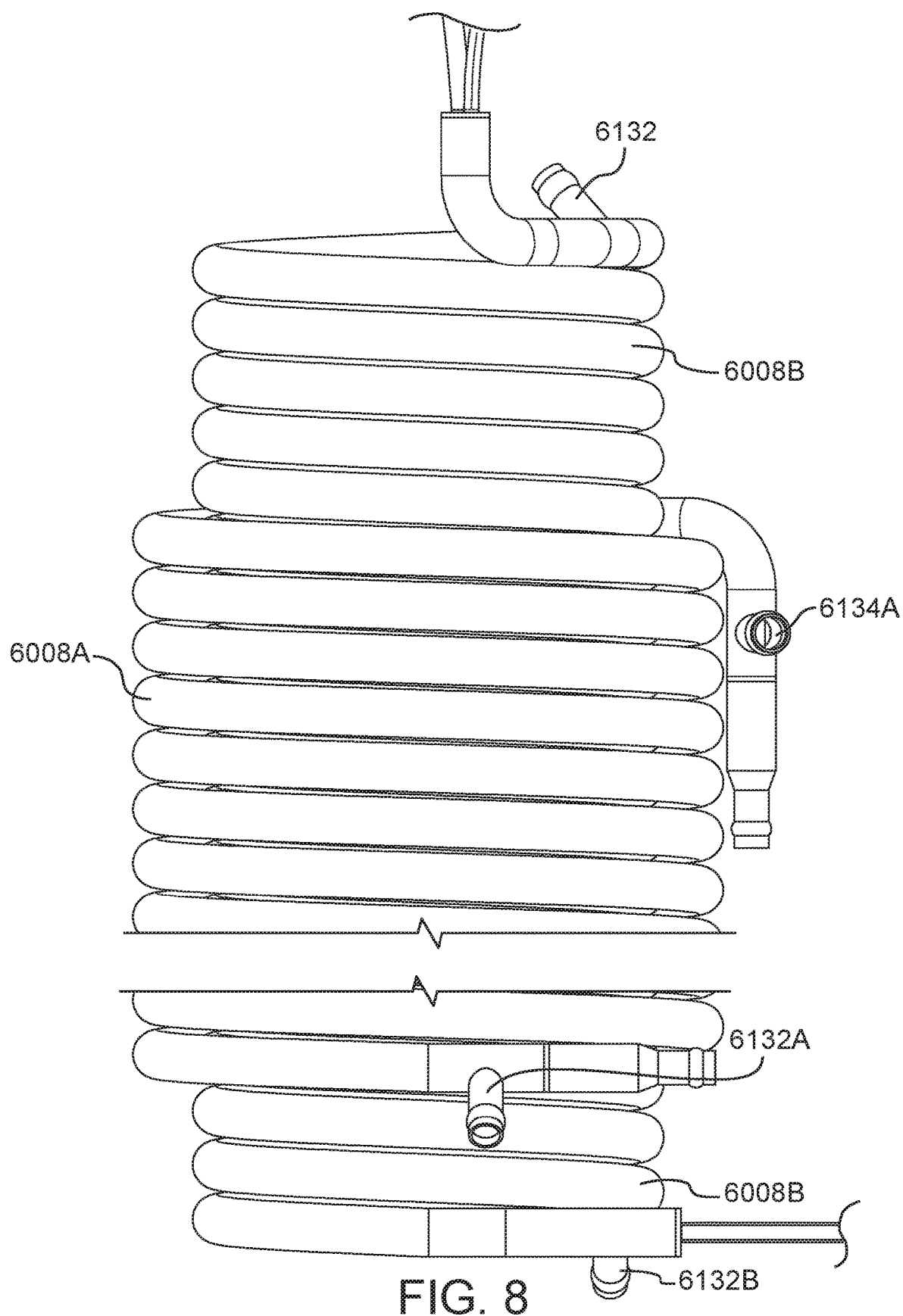
FIG. 8 depicts views of exemplary heat exchangers.

Referring now also to FIG. 8, a view of exemplary heat exchangers 6008A, B is shown. The heat exchangers 6008A, B may each be arranged as helices of tubing through which the source water and various process streams of the system 6000 may flow. The helices formed by each of the heat exchangers 6008A, B may have substantially constant radii and pitch. The heat exchangers 6008A, B may be arranged in concentric fashion with one of the heat exchangers 6008A, B having a smaller radius and being positioned inside of the other. In the exemplary embodiment depicted in FIG. 8, the blowdown heat exchanger 6008B is positioned inside the product heat exchanger 6008A. The length of the fluid pathways in the product and blowdown heat exchangers 6008A, B may be substantially equal. The pitch of each heat exchanger 6008A, B may be substantially equal. Consequentially, the interior or smaller radiused heat exchanger 6008B may be greater in height that the outer heat exchanger 6008A.

Figure 9:
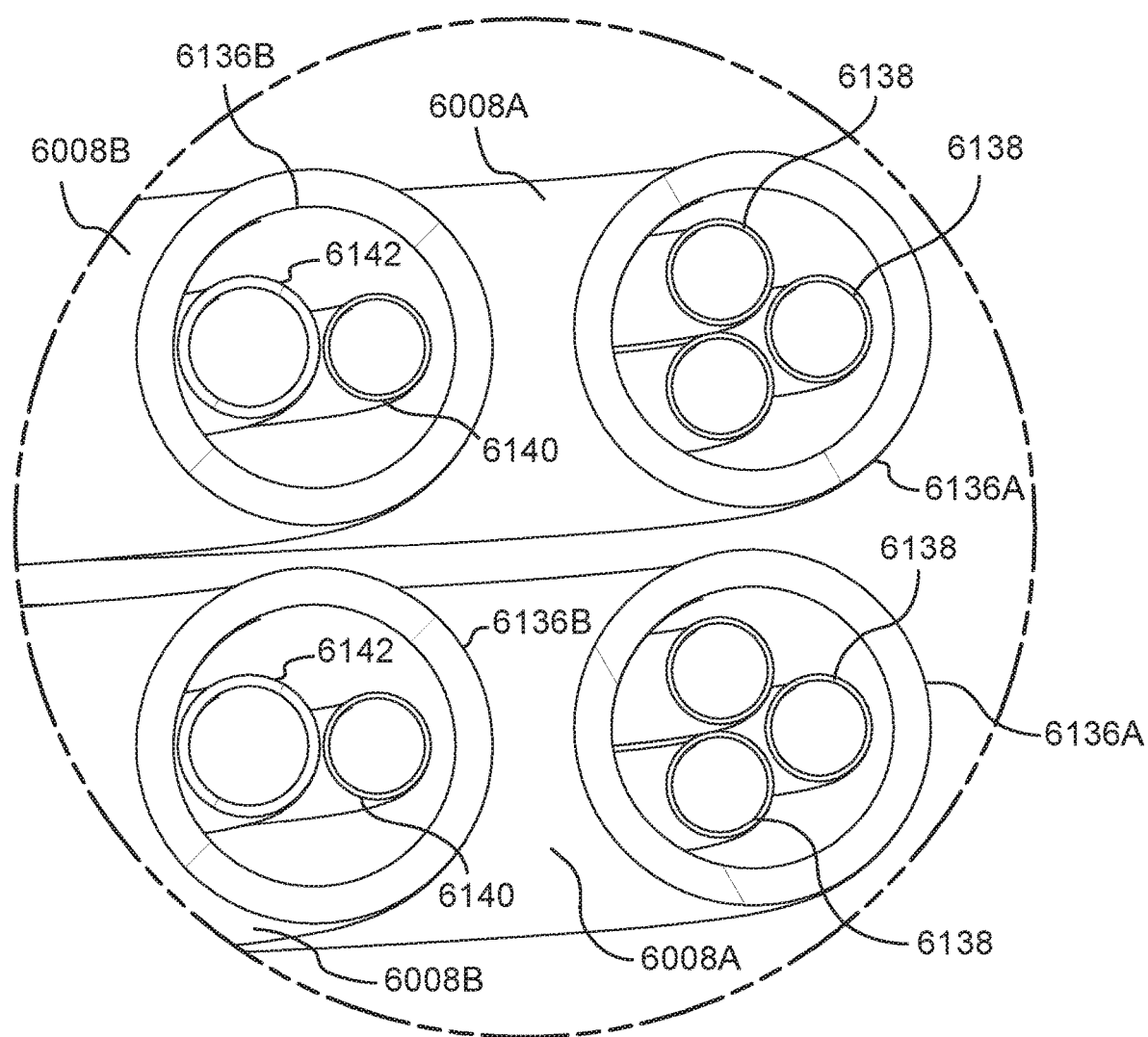
FIG. 9 depicts a cross-sectional view of a portion of the exemplary heat exchangers 6008 in FIG. 8.

A cross-sectional view of a portion of the exemplary heat exchangers 6008A, B is shown in FIG. 9. As shown, each heat exchanger 6008A, B includes a large diameter source flow conduit 6136A, B which forms the exterior surface of the heat exchangers 6008A, B. These source flow conduits 6136A, B are shown having substantially equal diameters, however, their diameters may differ with one being larger than the other in some examples.

Within the source flow conduits 6136A, B are conduits in which process streams from the water purifier 6010 are carried. The product water heat exchanger 6008A may include at least one product flow conduit 6138 positioned within its source flow conduit 6136A. Each of the at least one product flow conduit 6138 may be of equal diameter or may be of differing diameters. The blowdown heat exchanger 6008B includes a plurality of interior flow conduits. In the specific example in FIG. 9, the blowdown heat exchanger includes a blowdown flow conduit 6140 and a venting flow conduit 6142 within its source flow conduit 6136B. In some embodiments, additional flow conduits may be included therein. For example, multiple blowdown or venting conduits 6140, 6142 may be included within the source flow conduit 6136B. The blowdown flow conduit 6140 and venting flow conduit 6142 may be positioned side-by-side as shown or may be braided or interwoven together in some embodiments. The product flow conduits 6138 may be similarly braided or interwoven depending on the embodiment.

As best shown in FIG. 9, to maximize the compactness of the heat exchangers 6008A, B, the pitch of the heat exchanger 6008A, B helices may be relatively shallow. For example, the pitch may be between 5-40% greater than the outer diameter of the source flow conduits 6136A, B. In other embodiments, the pitch may be about equal to the outer diameter of the source flow conduit 6136A, B and each revolution of the helices may touch those adjacent to it. A pitch greater than the outer diameter of the source flow conduits 6136A, B may be desirable where the source flow conduits 6136A, B are constructed of a material which efficiently conducts heat such as stainless steel or another metal. Where the source flow conduits 6136A, B are made from high temperature silicon or a similar material, the gap between revolutions may be decreased or omitted. The gap may also be omitted if a material with high thermal conductivity is used.

Figure 10:
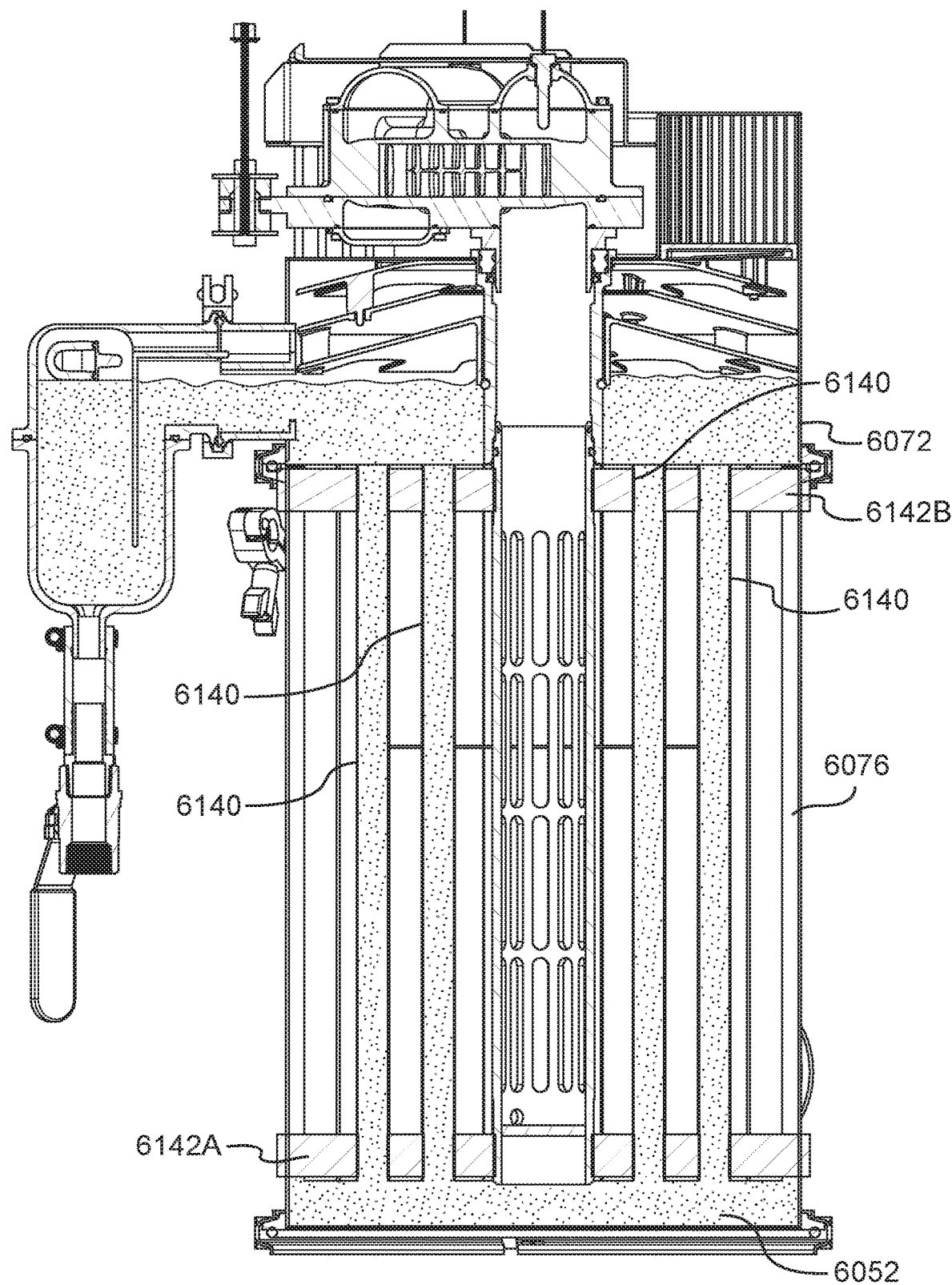
FIG. 10 depicts a cross sectional view of an example purifier filled with source fluid.
Figure 11:
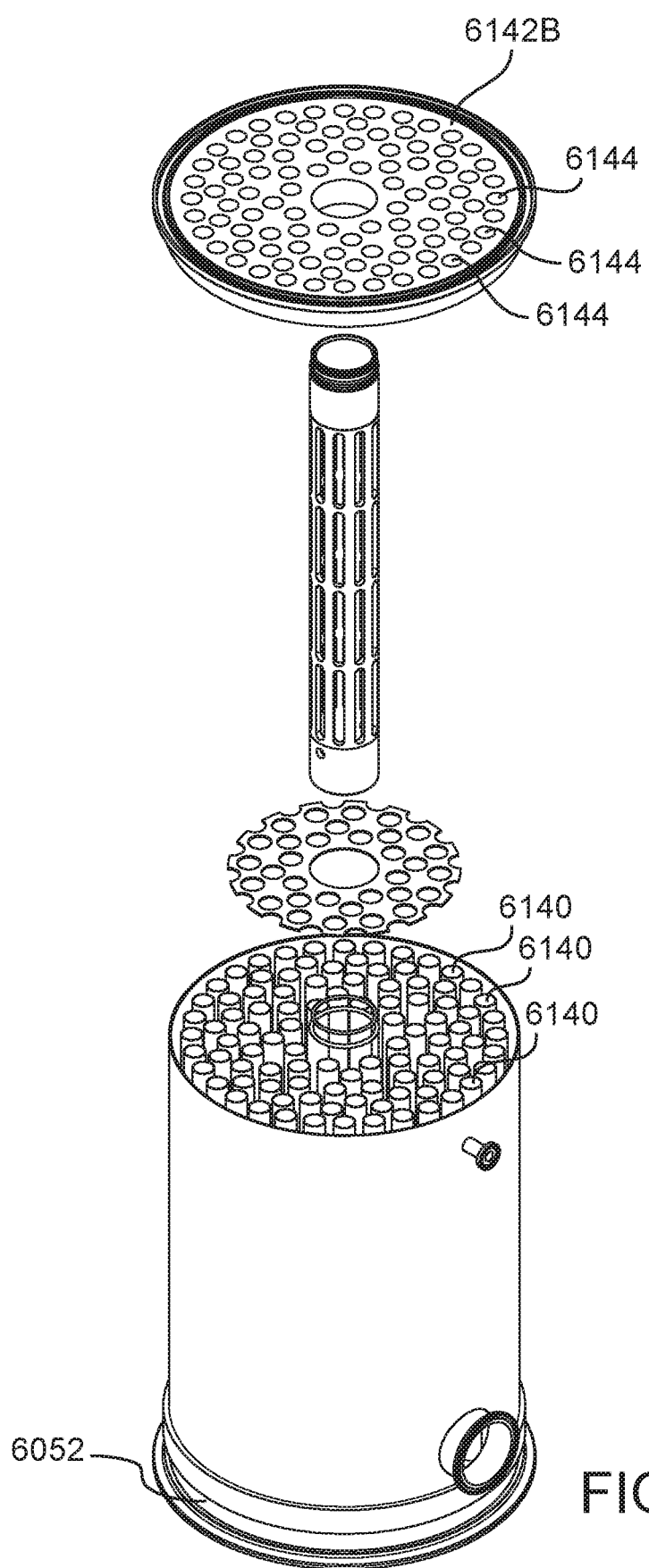
FIG. 11 depicts an exploded view of a portion of a purifier.
Figure 12:
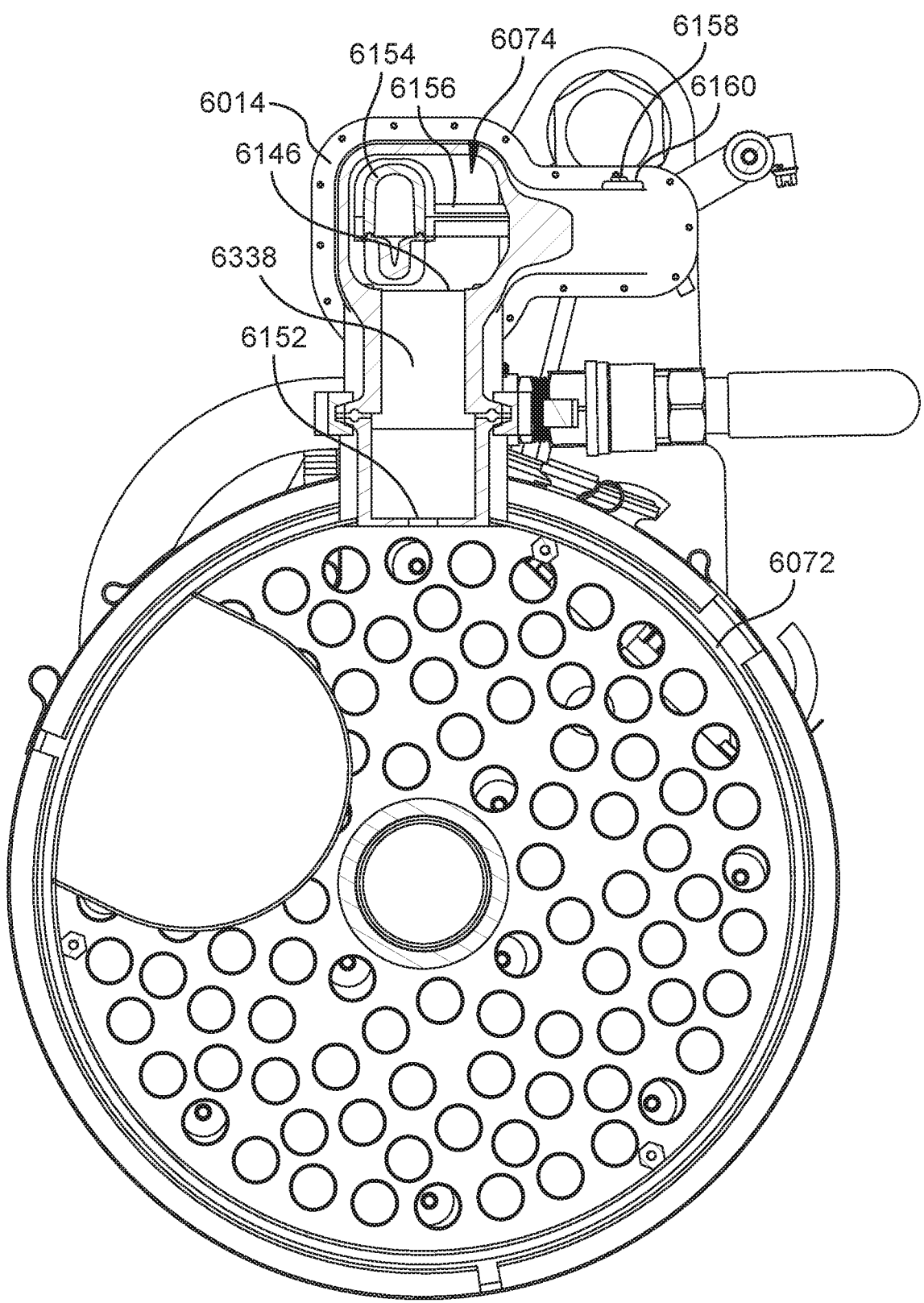
FIG. 12 depicts a top down view of a portion of a purifier with a portion of a concentrate reservoir cut away.
Figure 13:
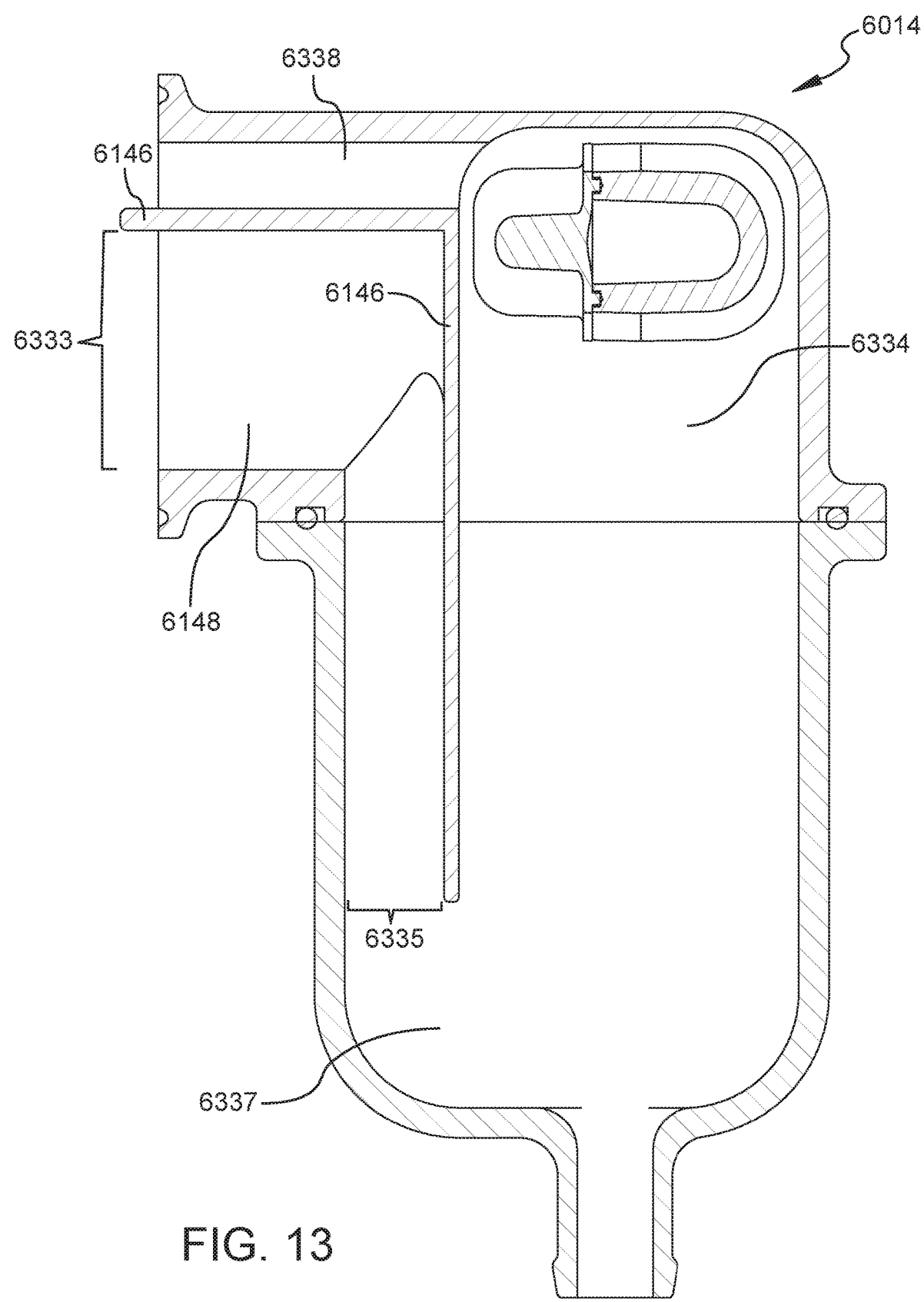
FIG. 13 depicts a cross sectional view of an example concentrate reservoir.
Figure 14:
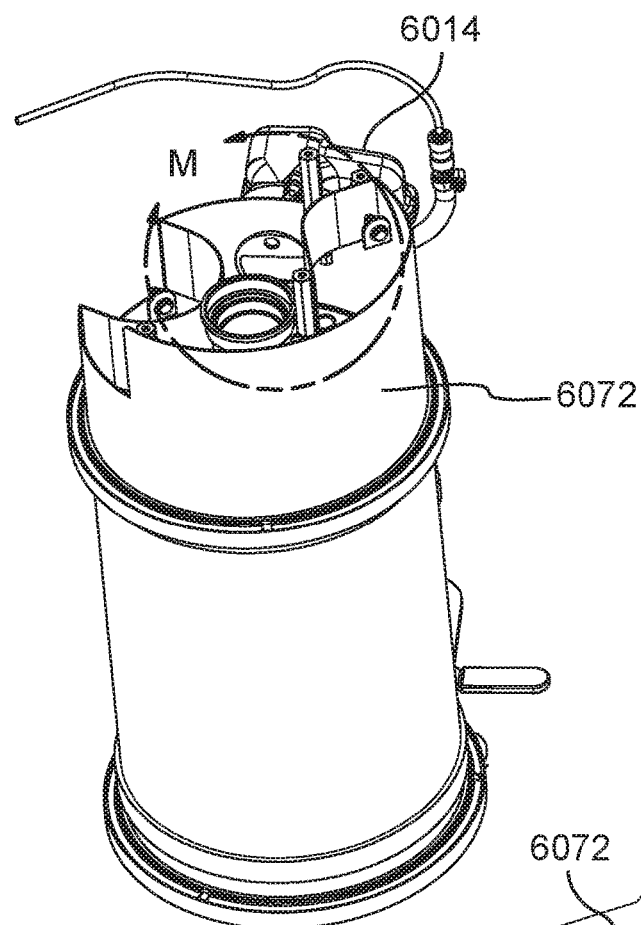
FIG. 14-15 depict a perspective view of an interior volume of an example steam chest.
Figure 15:
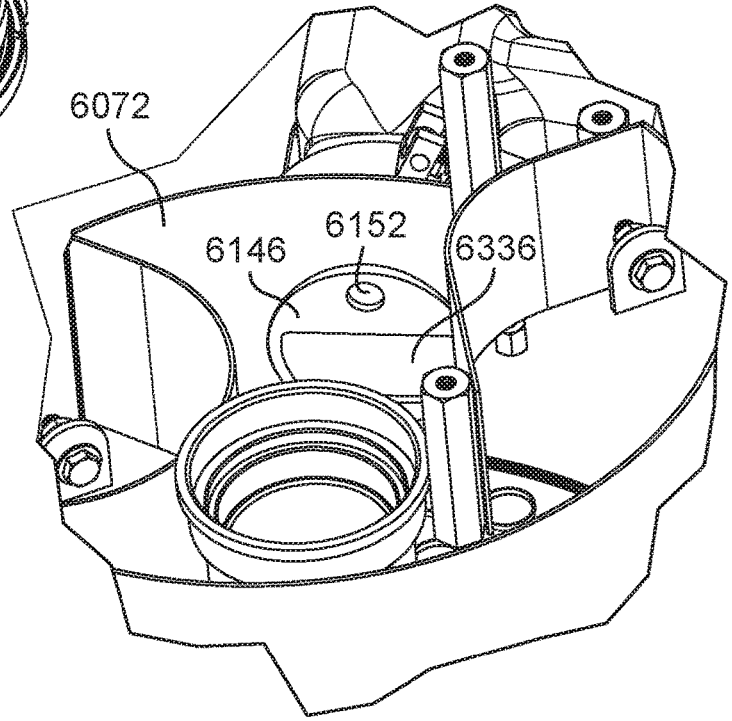
Figure 16:
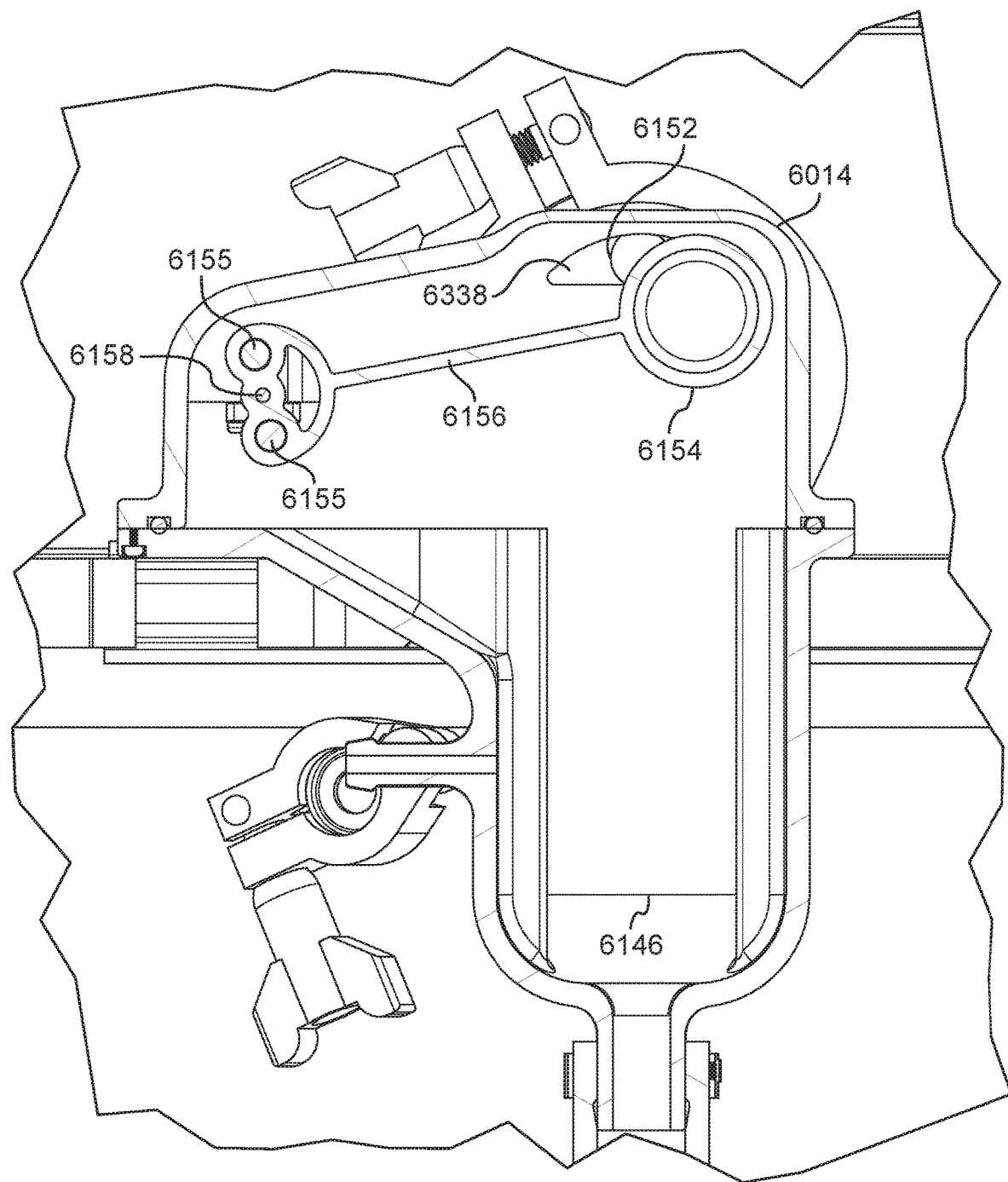
FIG. 16 depicts another cross sectional view of an example concentrate reservoir.

Referring now to FIGS. 10-11, additional views of an exemplary system 6000 are shown. After source water (shown as stippling in FIG. 10) passes into the sump 6052 the water may begin to fill a number of evaporator tubes 6140. The evaporator tubes 6140 may extend through the condenser 6076 from the sump 6052 volume to the steam chest 6072 volume. A first and second tube sheet 6142A, B may include receiving orifices 6144 for accepting the ends of each of the evaporator tubes 6140. The tube sheets 6142A, B may hold the evaporator tubes 6140 in a generally evenly spaced pattern within the condenser 6076 volume. The tube sheets 6142A, B may also form a seal or include gasket members which form a seal around the ends of the evaporator tubes 6140. This seal may prevent fluid communication between the evaporator tubes 6140 and the interior volume of the condenser 6076. At least one plate 6143 may also be included in the condenser 6076 to act as a baffle which directs incoming vapor to an exterior surface of the evaporator tubes 6140. The second tube sheet 6142B may form the bottom wall of the steam chest 6072. As source water enters the steam chest 6072 the water may pool within the bottom of the steam chest 6072 on top of the second tube sheet 6142B.

In the example embodiment, less than 100 (specifically 96) evaporator tubes 6140 are included. In other embodiments, a greater or lesser number of evaporator tubes 6140 may be included. Each evaporator tube 6140 may have a substantially equal diameter. The evaporator tube 6140 diameters may be between 5-10% (e.g. ~6%) of the diameter of the condenser 6072. In some embodiments, the evaporator tubes 6140 may not all be of equal diameter. At least one or more of the evaporator tubes 6140 may be of a different diameter.

In some embodiments, evaporator tubes 6140 may differ in diameter depending on their location. For example, evaporator tubes 6140 in a first section of the evaporator may be a first diameter, while those in a second section may be a second diameter, those in a third section may be a third diameter, and so on. In some embodiments, those extending through a central region of the condenser 6076 volume may be a first diameter and those in a region more distal to the central region may be a second diameter. The first diameter may be larger or smaller than the second diameter depending on the embodiment. In some embodiments, an evaporator tube 6140 diameter gradient may be established from evaporator tubes 6140 which extend through a central portion of the condenser 6076 volume and those located most distally to the evaporator tubes 6140 in the central portion. For example, progressively larger or smaller tubes may be included as distance from the central portion increases.

The evaporator tubes 6140 may take up between 25 and 50% (e.g. ~37%) of the interior volume of the condenser 6076. The material from which the evaporator tubes 6140 are constructed may vary depending on the embodiment; however, a material with a high thermal conductivity may be used. The material used may be any of those described elsewhere herein.

In some embodiments, the evaporator tubes 6140 may be made from a material which is the same as or similar to the material used to construct the tube sheets 6142A, B. Both the evaporator tubes 6140 and tube sheets 6142A, B may be a metal material with a high thermal conductivity. Stainless steel may be used in some examples. The evaporator tubes 6140 may be welded, braised, or otherwise joined to the tube sheets 6142A, B. This may allow for the total size of the purifier 6010 to be decreased when compared to an embodiment in which the tube sheets are constructed from an elastomeric material like ethylene propylene diene monomer (EPDM) rubber. Where welded, braised, or similarly attached, the joints between the tube sheets 6142A, B and the individual evaporator tubes 6140 may also form fluid tight seals. Thus the tube sheets 6142A, B may be thinned while still maintaining a robust seal between the condenser 6076 volume and the sump 6052/steam chest 6072.

Though not shown in this embodiment, the evaporator tubes 6140 may include a filler element (see, e.g., FIG. 62) such as a rod which fills a proportion of the cross sectional area of each of (or potentially only some) the evaporator tubes 6140. This may encourage a thin layer or film of source fluid to be present between exterior of the filler element and the interior surface of the evaporator tube 6140 within which the filler element is disposed.

Referring now to FIGS. 12-16, as heat from heating element 6054 (see, e.g., FIG. 2) and condensing vapor in the condenser 6076 evaporates the source water, a blowdown process stream or concentrate may be generated. The blowdown process stream may fill a portion of the steam chest 6072 volume. As shown, a blowdown or concentrate reservoir 6014 may be attached to the side of the steam chest 6072. An obstruction 6146 (best shown in FIG. 13) may be included in or define part of the inflow path 6148 from the steam chest 6072 to the blowdown reservoir 6014. For example, the inflow path 6148 may include a first portion 6333, and a second portion 6335. This second portion may be at least partially defined by the obstruction 6146. The obstruction 6146 may be a weir or similar barrier which shelters a portion of the blowdown reservoir 6014. The obstruction 6146 may substantially prevent splashing and other violent liquid motion due to boiling in the steam chest 6072 from upsetting liquid in the sheltered portion 6334. A portion of the inflow path 6148 may be disposed within the interior volume of the blowdown reservoir 6014.

The obstruction 6146 shown includes a plate which is integral with a wall of the inflow path 6148 and opposite an inflow port 6336 from the steam chest 6072. The plate also extends downward into the blowdown reservoir 6012 at an angle transverse to the first portion 6333 of the inflow path 6148. This segment may block splashing and other disturbances from passing into the sheltered portion 6334 from the unsheltered portion 6337. As shown, a venting pathway 6338 may also be included to allow gases displaced by incoming blowdown or generated due to evaporation to exit the blowdown reservoir 6012. The venting pathway 6338 may run substantially parallel to and above (with respect to the gravity) the first portion 6333 of the inflow path 6148. The venting pathway 6338 in the example embodiment may lead to the steam chest 6072. The venting pathway 6338 may have a smaller cross sectional area than the first portion 6333 of the inflow path 6148. A venting orifice 6152 may be included in the wall of the steam chest 6072 and establish fluid communication between the venting pathway 6338 and steam chest 6072. The venting orifice 6152 may be of smaller cross sectional area than the venting pathway 6338.

As mentioned above, liquid level within the blowdown reservoir 6014 may be sensed by a blowdown level sensor 6074. Any suitable sensor for measuring the liquid level within the blowdown reservoir 6014 may be used, however, a float-type sensor similar to those described elsewhere herein is depicted. The blowdown level sensor 6074 may include a float assembly including a float 6154 attached to an arm 6156. In the example, the float 6154 is depicted as a hollow structure attached to the end of the arm 6156. In other embodiments, the float 6154 may be solid and made of a buoyant material which is resistant to heat and corrosion.

The arm 6156 may be coupled to a pivot 6158. Preferably, the blowdown level sensor 6074 may be disposed in the sheltered portion 6334.

As the liquid level within the blowdown reservoir 6014 changes, the float 6154 position may rise and fall in kind across a float sweep range. As the float 6154 is attached to the arm 6156, the arm 6156 may pivot about the pivot 6158. The blowdown level sensor 6074 may include a hall effect sensor 6160 which, referring now primarily to FIG. 16, monitors the position of at least one magnet 6155 which displaces as the liquid level changes. The at least one magnet 6155 may be located on the float 6154 or the arm 6156 for example. In the example shown, two magnets 6155 may be mounted adjacent the pivot 6158. The blowdown reservoir 6014 may be disposed so as to allow the blowdown level sensor 6074 to directly measure the liquid level in the steam chest 6072 at least when the purifier 6010 is in certain states (e.g. start-up). The sweep range or displacement range of the float 6154 may be selected such that the float 6154 may rise along with the liquid level in the steam chest 6072. Though the example, embodiment is described having a hall effect sensor 6160 other types of sensors may also be used. For example, some embodiments may include a rotary encoder or potentiometer instead of or in addition to a hall effect sensor.

The sweep range of the float assembly may be selected such that the range is inclusive of points at even height with all steam chest liquid levels to be expected during at least certain purifier 6010 operational states (e.g. start up). Thus, the blowdown level sensor 6074 may be a direct level sensor which directly measures the level of concentrate (if in the expected range) within the steam chest 6072 to which the blowdown reservoir 6014 is attached.

In some embodiments, while purified liquid is being produced by the purifier 6010, the liquid level may be sensed less directly. For example, blowdown level sensor 6074 may have a sweep range inclusive of points above the expected range of liquid levels in the steam chest 6072. The turbulent boiling action occurring in the steam chest 6072 may occasionally splash liquid into the blowdown level sensor 6074 to fill the blowdown level sensor 6074. The controller 6034 (see, e.g., FIG. 2) may analyze the rate of blowdown accumulation to determine if the liquid level in the steam chest 6072 is in an expected range. In the event that the rate is outside of a defined range, it may be determined the liquid level in the steam chest 6072 is requires adjustment or is abnormal.

Figure 17:
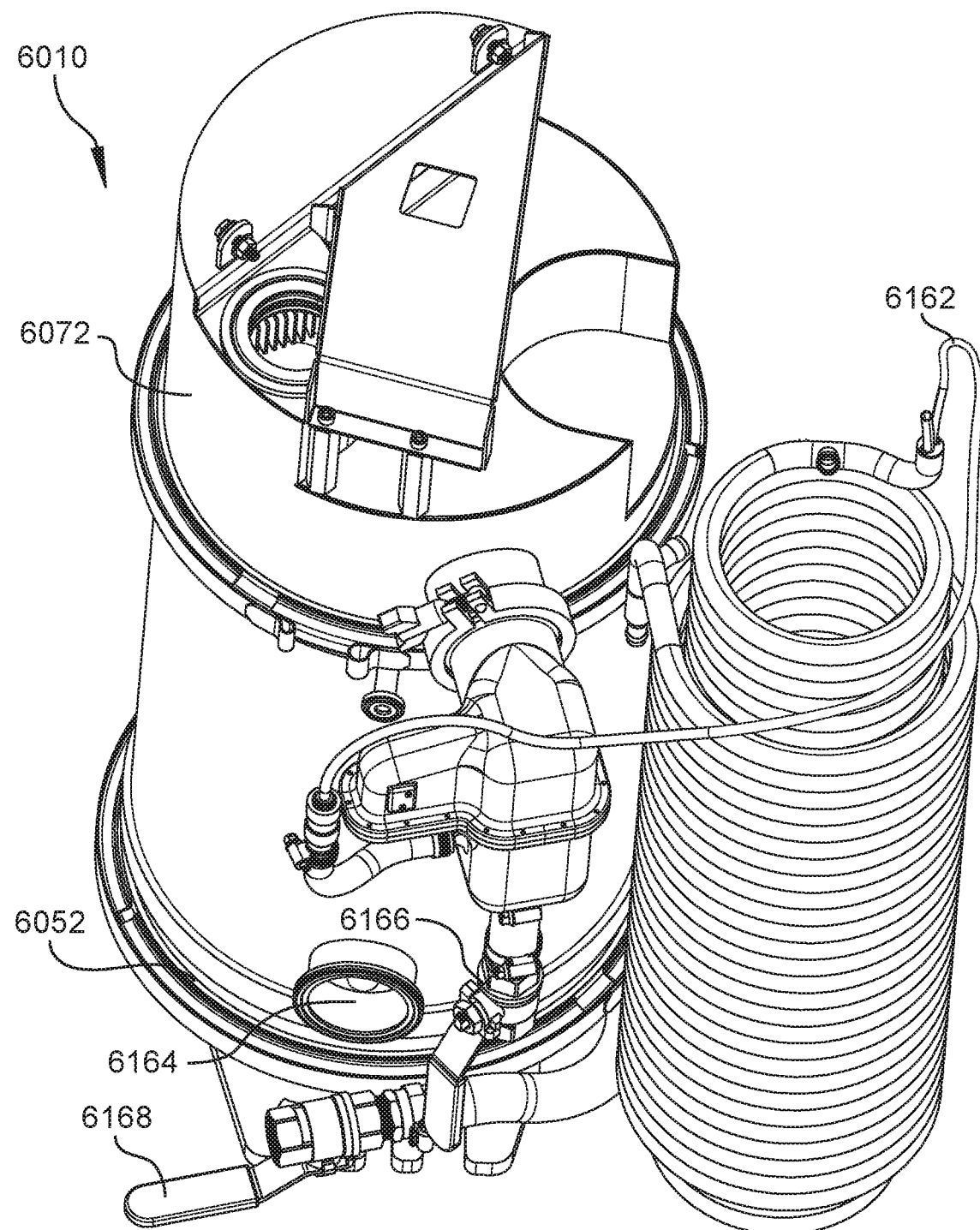
FIG. 17 depicts a perspective view of an example purifier and concentrate reservoir.

Referring now to FIG. 17, a perspective view of the purifier 6010 and blowdown reservoir 6014 is shown. Only blowdown flow conduits are shown in FIG. 17 for sake of clarity. As shown, the blowdown reservoir 6014 may be attached to a blowdown flow conduit 6162 which serves as an outlet to the blowdown reservoir. The outlet may establish a flow path from the blowdown reservoir 6014 to the blowdown heat exchanger 6008B. A blowdown reservoir valve 6356 (see, e.g. FIG. 42-43) may also be included to control the purging of the blowdown process stream from the purifier 6010. The blowdown reservoir valve 6356 may be operated by a controller 6034 (see, e.g., FIG. 2) to maintain the liquid level within the steam chest 6072 within a desired range. Data from the blowdown level sensor 6074 may be used to inform actuation of the blowdown reservoir valve 6356. As the level in the steam chest 6072 may be directly monitored via the blowdown level sensor 6074, the level of concentrate within the steam chest 6072 may be controlled to a known level via the blowdown reservoir valve 6356.

A number of manual drain valves 6166, 6168 may also be included. These manual drain valves 6166, 6168 may be used to empty the purifier 6010 during maintenance or other non use periods. In the example shown in FIG. 17, a manual drain valve 6166 is associated with the blowdown reservoir 6014. A manual drain valve 6168 is also associated with the sump 6052. These manual drain valves 6166, 6168 may be hand operated ball valves in specific implementations. Though these valves 6166, 6168 are described as manually operated, they may also be actuated by a controller 6034 in other embodiments.

Figure 18:
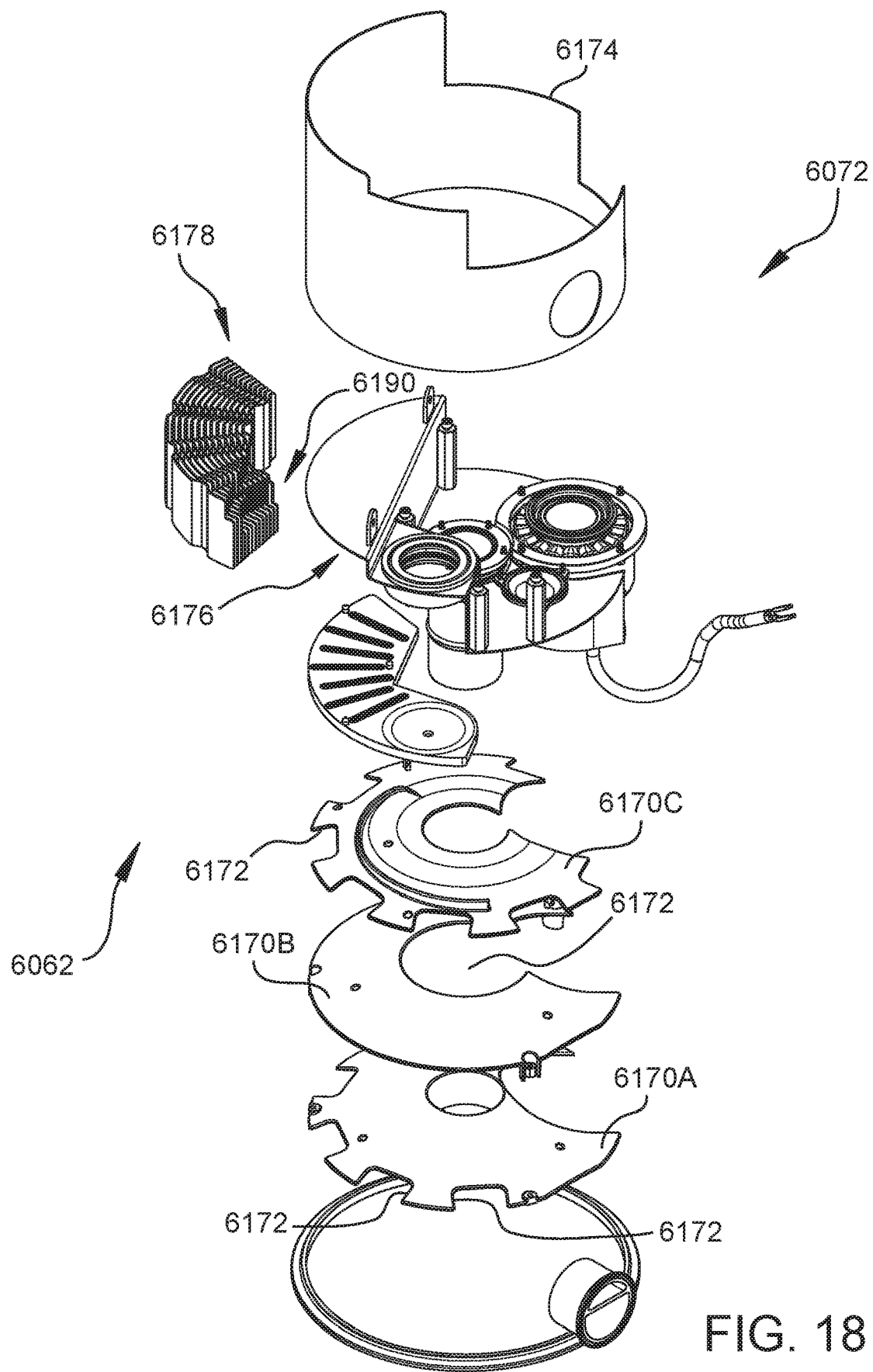
FIG. 18 depicts an exploded view of an example steam chest and mist eliminator.

Referring now to FIG. 18, an exploded view of an exemplary steam chest 6072 is shown. The steam chest 6072 may include a mist eliminator assembly 6062. The mist eliminator assembly 6062 may help to prevent liquid phase water from passing beyond the steam chest 6072 of the water purifier. The mist eliminator assembly 6062 may establish a tortuous path from boiling liquid in the bottom of the steam chest 6072 to a compressor 6064 of the system 6000. The tortuous path may make it difficult for any liquid phase water droplets entrained in the vapor to pass all the way through the mist eliminator assembly 6062.

In the example shown, the mist eliminator assembly 6062 includes a number of mist eliminating strata 6170A-C. The strata 6170A-C include a number of openings 6172 which are spaced to create a long, meandering travel pathway for the vapor. The first stratum 6170A includes openings 6172 around its periphery. These openings 6172 are spaced generally at regular angular intervals about the stratum 6170. The next stratum 6170B includes a single, central opening 6172. Thus the second stratum 6170B forces vapor to change direction and travel from the sides of the steam chest 6072 to the center of the steam chest 6072 in order to proceed to the next stratum 6170C. The third stratum 6170C includes openings disposed along its periphery similarly to the first stratum 6170A. Again, the vapor is forced to change direction and flow from the center of the steam chest 6072 to the sidewalls 6174 of the steam chest 6072. In other embodiments, the number of strata may differ.

Any liquid phase water droplets may tend to fall out of the vapor due to the directional changes and long travel path necessary to navigate the strata 6070A-C of the mist eliminator assembly 6062. Each stratum 6170A-C of the mist eliminator assembly 6062 may have a sloped surface which allows any liquid phase water to easily drain out of the mist eliminator assembly 6062. In the example embodiment, the strata 6070A-C are all shaped as conic frustums which slope downwards towards the sidewalls 6174 of the steam chest 6072. A small gap between the strata 6170A-C of the mist eliminator assembly 6062 and the sidewalls 6174 may exist to allow liquid phase water to fall back into the pool of liquid at the bottom of the steam chest 6062.

Figure 19:
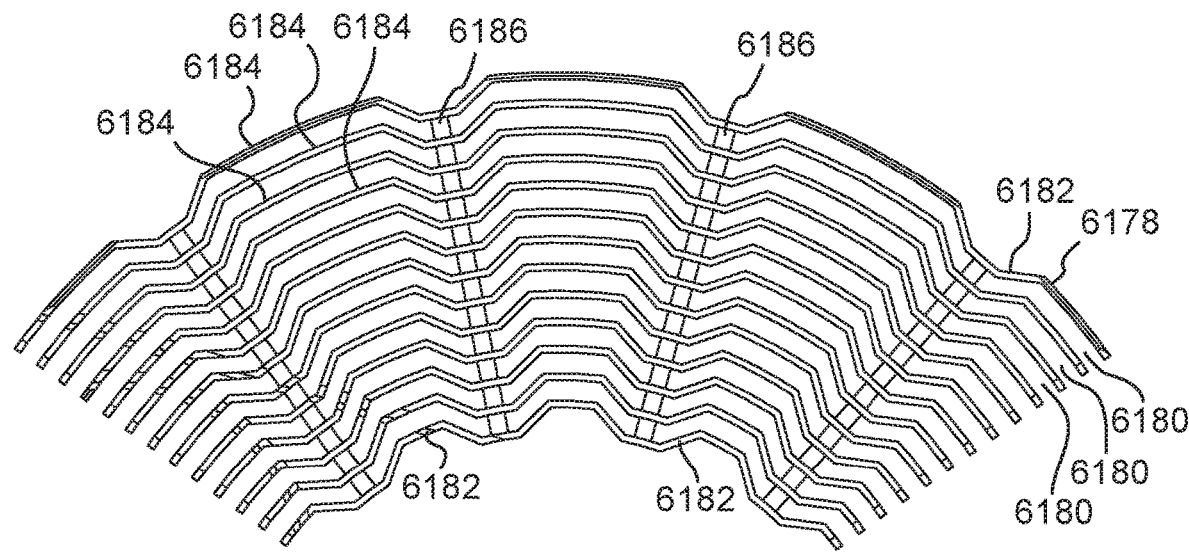
FIGS. 19-20 depict views of an example flow path convoluter.
Figure 20:
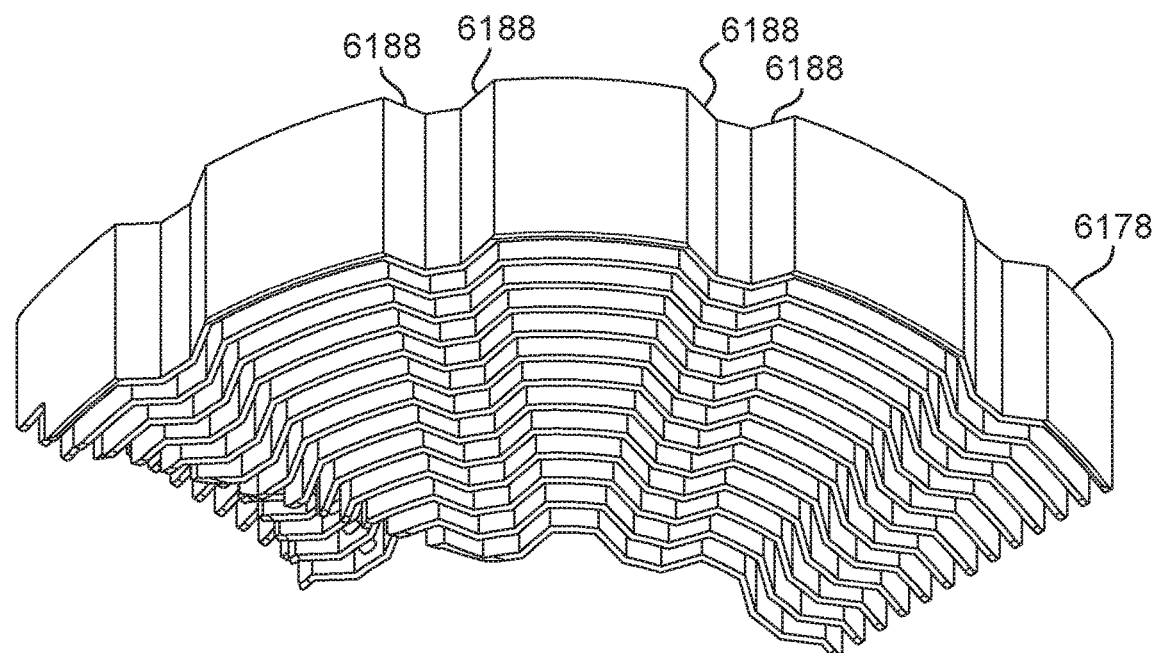
Figure 21:
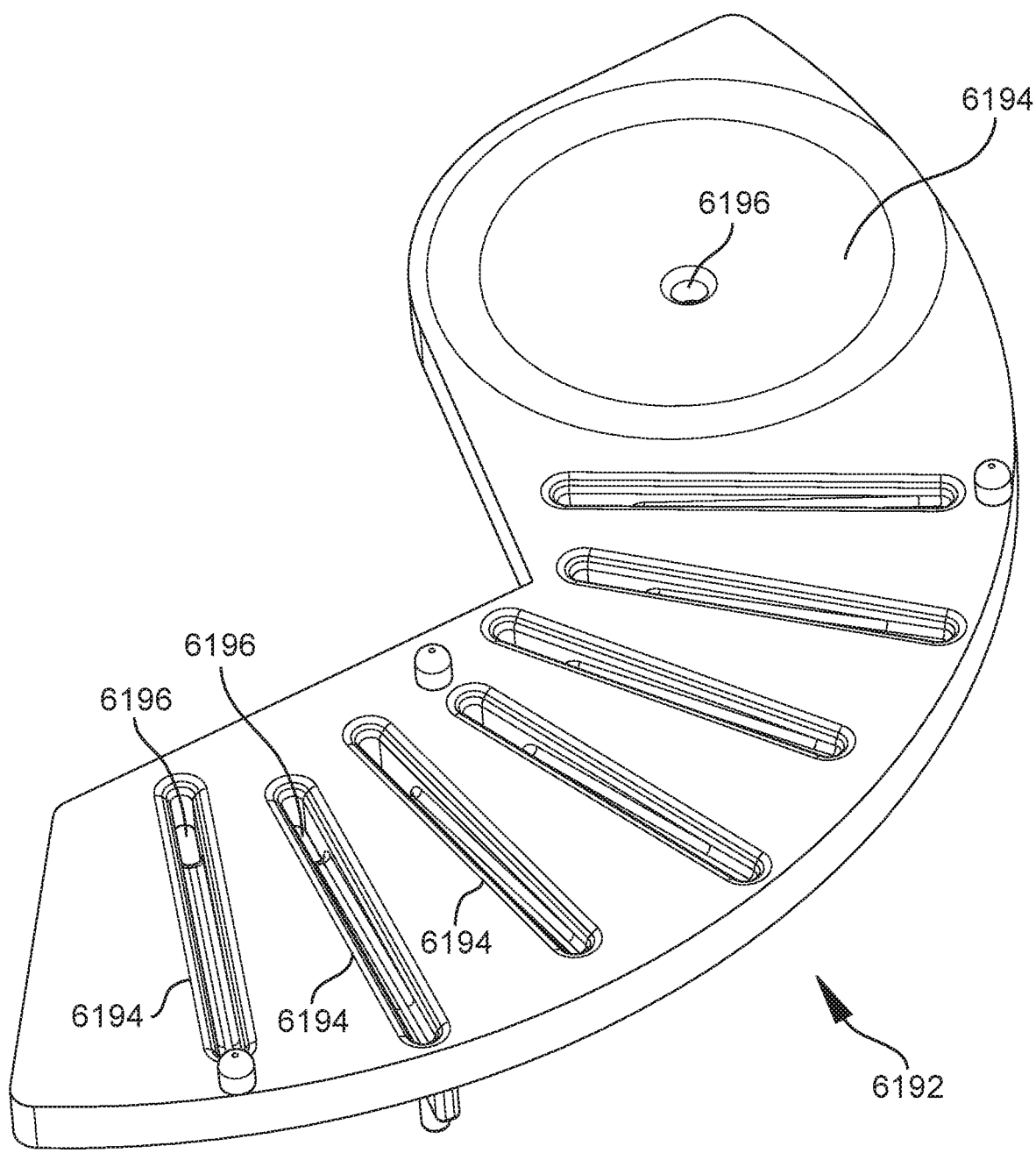
FIG. 21 depicts a view of an example drip tray.

Referring now also to FIGS. 19-21 in addition to FIG. 18, the mist eliminator assembly 6062 may also include a compressor feed channel 6176 through which vapor transits before reaching a compressor 6064. The compressor feed channel 6176 may accommodate a flow path convoluter 6178 or vane pack. The flow path convoluter 6178 or vane pack may split the incoming vapor into a number of discreet flow channels 6180. Each of the flow channels 6180 may include at least one flow redirection feature(s) 6182. Again, these redirection features 6182 may serve to help eliminate any liquid phase water droplets which are advancing through the mist eliminator assembly 6062.

As best shown in FIG. 19, the flow path convoluter 6178 may include a number of individual plate members 6184 which are held together by connector shafts 6186. The plate members 6184 are arranged in a nested or layered arrangement with progressively smaller plate members 6184 being placed more proximally toward the center of the steam chest 6072. The flow channels 6180 are defined by the gap between each adjacent plate member 6186 of the flow path convoluter 6178. In some embodiments, each flow path 6180 may be defined by equal sized gaps. The gaps, may be less than 1 cm, for example, approximately 4.5 mm in some specific embodiments. Each of the individual plates 6184 includes a number of angled segments 6188 which make up the redirection features 6182. As best shown in FIG. 18 the flow path convoluter 6178 may also have a stepped region 6190 which compliments and may abut against the wall of the compressor feed channel 6176.

Referring now to FIG. 21, a drip tray 6192 may form one of the walls of the compressor feed channel 6176. A drip tray 6192 may catch and direct any liquid phase water droplets removed by the flow path convoluter 6178. The drip tray 6192 may include a number of recessed features 6194 which liquid will tend to flow into. The recessed features 6194 may include a drain 6196 at their most recessed portion to allow liquid to exit the compressor feed channel 6176. In the example shown, two types of recesses 6194 may be included. Some of the recesses are depicted as troughs which include a grade that deepens the trough as proximity to the drain 6196 increases. The troughs may generally be aligned with flow redirection features 6182 of a flow path convoluter 6178 when the flow path convoluter 6178 is installed within the compressor feed channel 6176. A funnel type recess may also be included in the drip tray 6192. The funnel type recess may be shaped as a conic frustum whose drain 6196 forms an opening in the frustum. The funnel type recess may be disposed at a location downstream of the flow path convoluter 6178 when the flow path convoluter 6178 is installed within the compressor feed channel 6176.

Referring now primarily to FIG. 22, the third stratum 6170C of the mist elimination assembly 6062 may include a berm member 6198. The berm member 6198 may project from the third stratum 6170C to the drip tray 6192. As shown, the berm member 6198 is shaped as a segment of a spiral. The berm member 6198 also includes a hooked portion 6200 which is roughly perpendicular to the portion of the berm member 6198 from which it extends. The berm member 6198 is disposed such that all drains 6196 of the drip tray 6192 are on a first side of the berm member 6198. Liquid passing through the drains 6196 to the surface of the third stratum 6170C may flow along the surface of the third stratum 6170C and be redirected by the berm member 6198. As the berm member 6198 is shaped as a segment of a spiral and the surface of the third stratum 6170C is sloped, the berm member 6198 may redirect liquid along a down sloping path toward an end 6202 of the berm member 6198. This end 6202 may be positioned adjacent an opening 6172 along the periphery of the third stratum 6170C.

Figure 23:
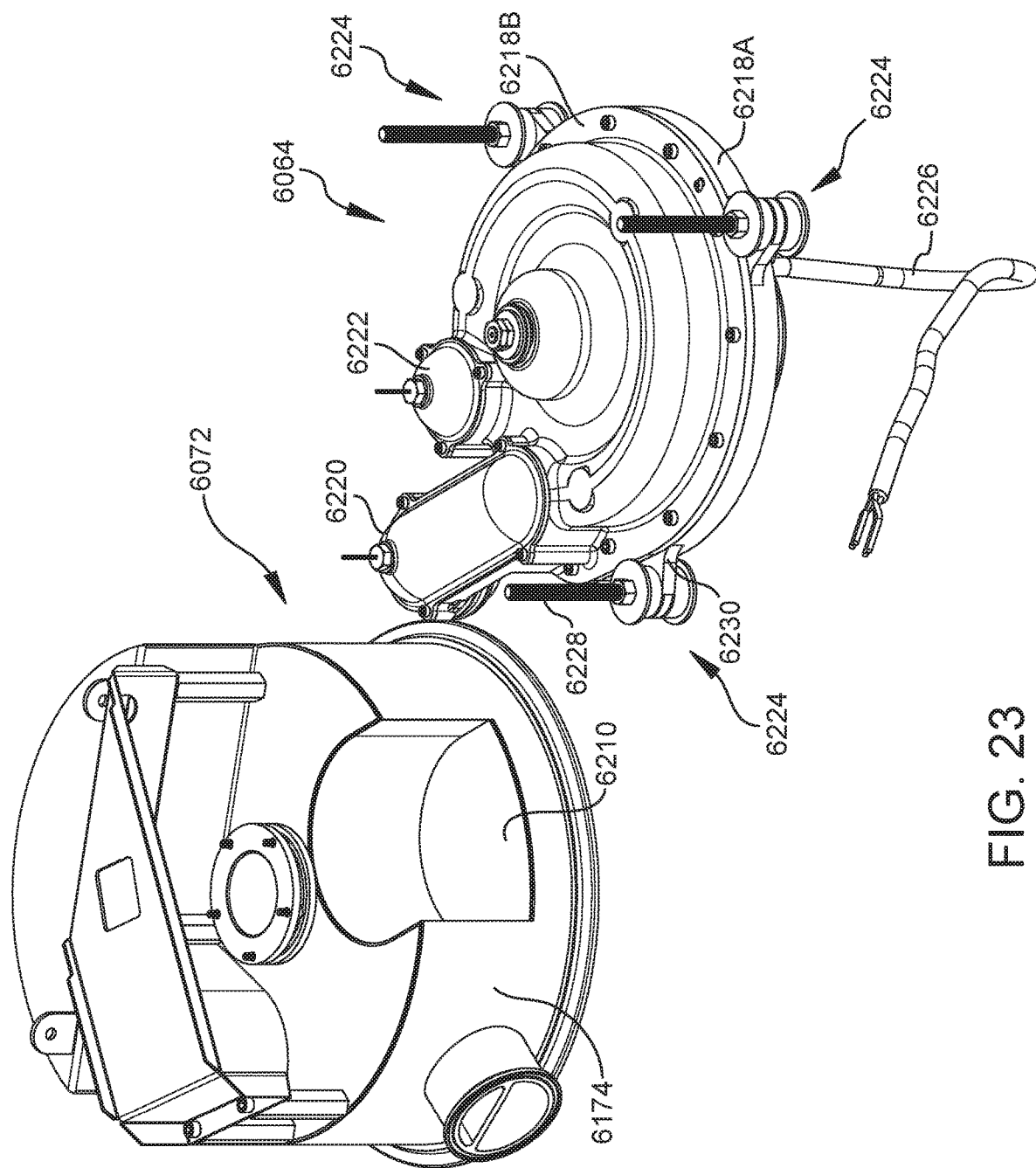
FIG. 23 depicts an example compressor exploded away from an example steam chest.
Figure 24:
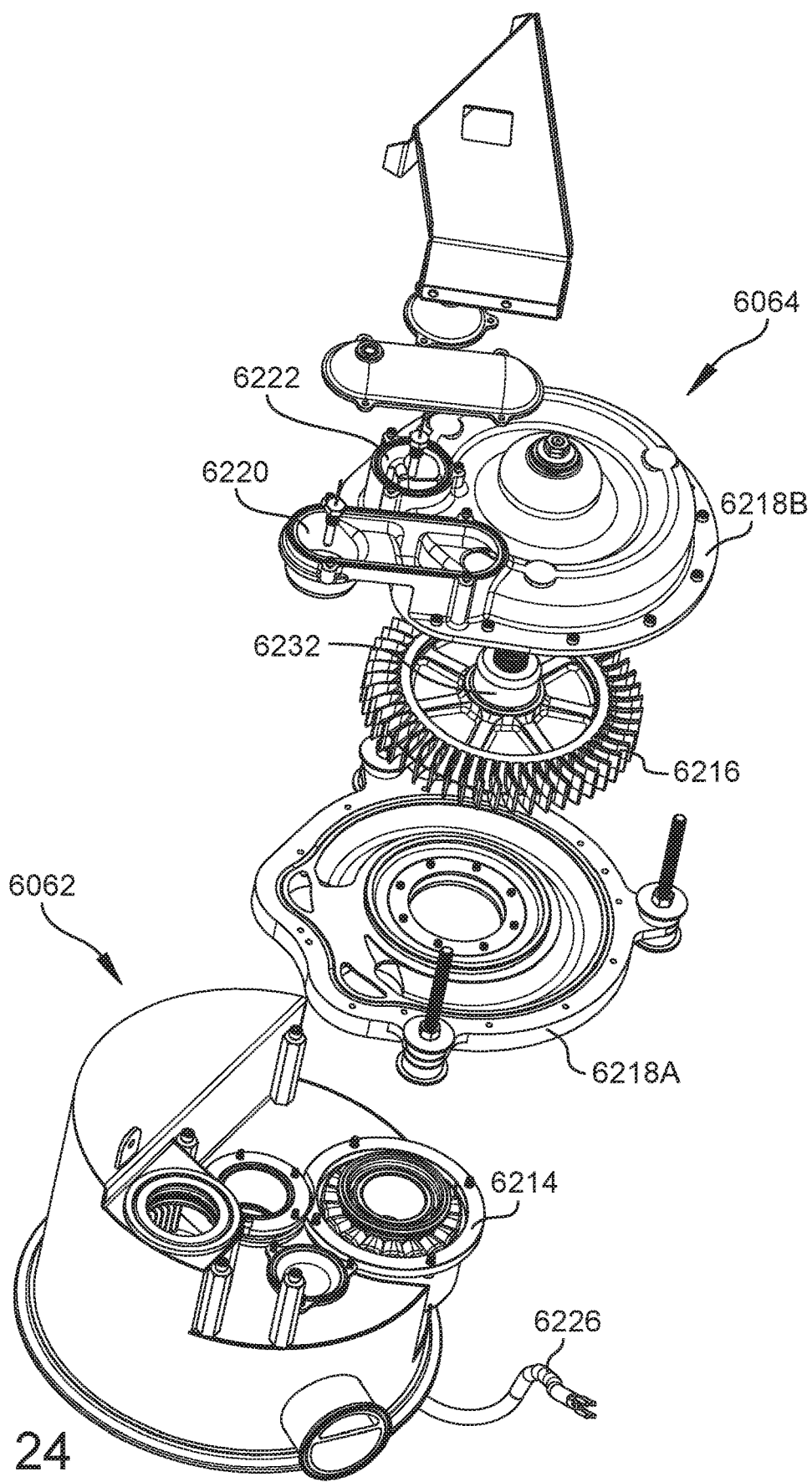
FIG. 24 depicts an exploded view of an example compressor.
Figure 25:
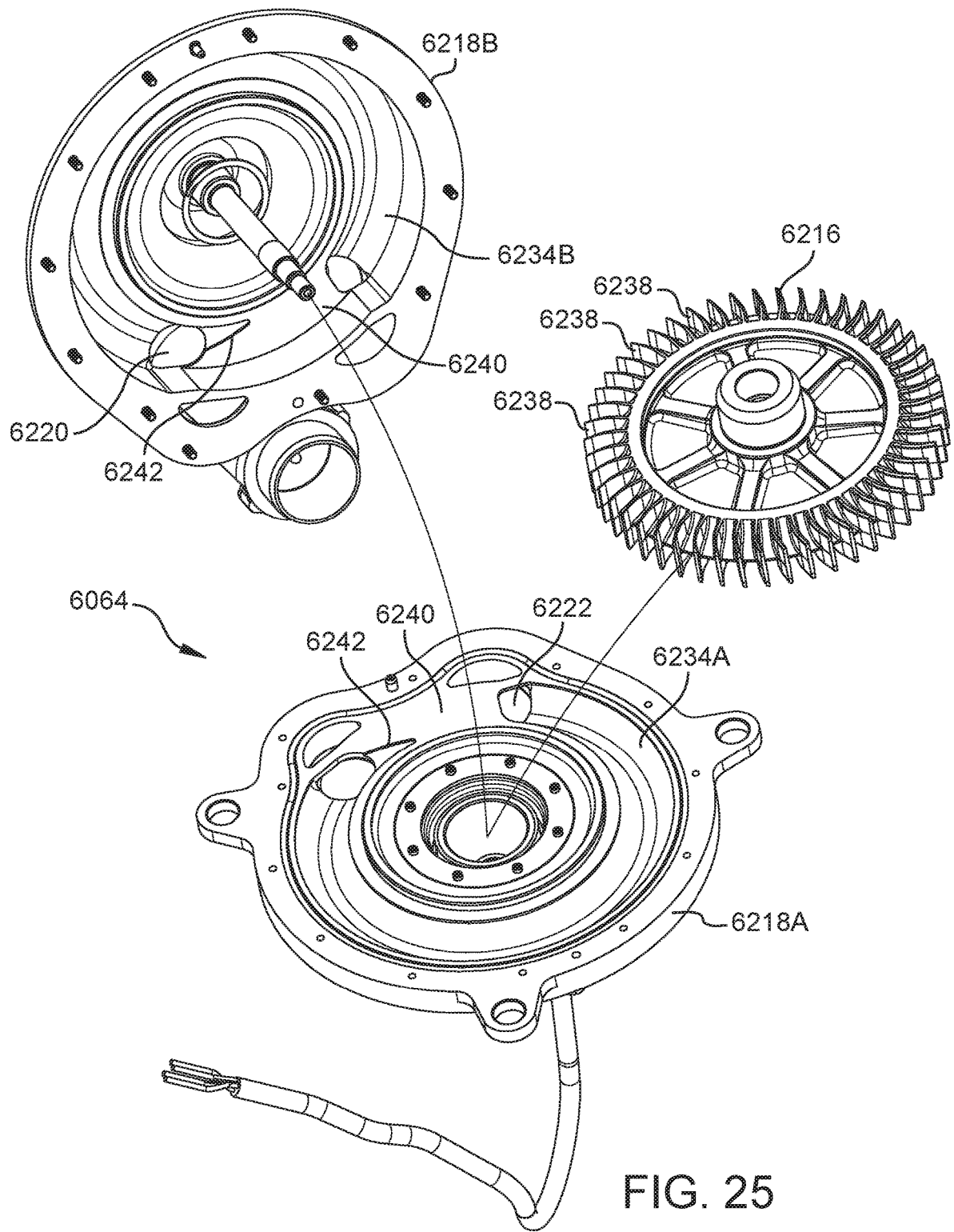
FIG. 25 depicts another exploded view of an example compressor.

Referring now primarily to FIGS. 23 and 24, after passing through the mist eliminator assembly 6062, vapor may be compressed by a compressor 6064. The compressor 6064 may be an impeller type compressor 6064, though other compressor varieties may be used in alternative embodiments. The compressor 6064 in the example embodiment is mounted in an off-center location with respect to the longitudinal axis of the steam chest 6072. The steam chest 6072 includes a receiving well 6210 which is recessed into the side wall 6174 of the steam chest 6072. This receiving well 6210 protrudes into the interior volume of the steam chest 6072. The various strata 6170A-C of the mist eliminator assembly 6062 may include well accommodating voids 6212 (see, e.g., FIG. 22) which accept the receiving well 6210. A motor 6214 may seat within the receiving well 6210. The motor 6214 may, for example, be or be similar to any of those described elsewhere herein. The motor 6214 may receive power via a motor power cable 6226.

The motor 6214 may drive an impeller 6216 which is mounted within a compressor housing 6218A, B. The impeller 6216 is attached to an impeller rotor assembly 6232 which may be caused to rotate via operation of the motor 6214. The impeller 6216 shown may be a single stage design, but multistage designs such as any of those described herein may alternatively be used. As the compressor 6064 is mounted in an off-center location, the rotation axis of the impeller 6216 may also be off-center to the longitudinal axis of the steam chest 6074. The rotation axis of the impeller 6216 may pass through the steam chest 6074 and run parallel to the longitudinal axis of the steam chest 6074.

Vapor may enter the compressor housing 6218A, B through an inlet 6220, be compressed by the rotating impeller 6216, and exit the compressor 6064 through an outlet 6222 at an increased pressure and temperature. The temperature of vapor entering the compressor 6064 at the inlet 6220 may be sensed by an inlet temperature sensor 6066. Likewise, the temperature of compressed vapor exiting the compressor 6062 through the outlet 6222 may be sensed by an outlet temperature sensor 6068. These temperature sensors 6066, 6068 may be thermistors, thermocouples, or any other suitable temperature sensor.

The compressor 6064 may also include a number of mounts 6224. These mounts 6224 may include a fastener 6228 which extends though a mounting projection 6230 included on a portion of the compressor housing 6218A, B. The fasteners 6228 may couple into a portion of the housing 6102 (see, e.g., FIG. 5). This may allow for the compressor 6064 and any attached components to remain in place within the housing 6102 when other components of the purifier 6010 are removed. As further described later herein, the evaporator 6060, condenser 6076, sump 6052, and potentially other components may be removed during maintenance. The mounts 6224 may allow for the compressor 6064 and any attached components (e.g. the steam chest 6072) to remain robustly suspended from the housing 6102 without other support. The mounts 6224 may include elastomeric elements allowing the mounts 6224 to be isolation mounts. In some embodiments, the elastomeric elements may be the series 60011 mounts available from Era Industrial Sales of 80 Modular Ave, Commack, N.Y.

Referring now to FIGS. 25-28, the impeller 6216 may be captured between a first and second compressor housing portion 6218A, B. The first and second compressor housing portions 6218A, B may each include a compression duct recess 6234A, B (best shown in FIG. 25). When the compressor 6064 is assembled, these recesses may cooperate to form a compression duct 6236. The vanes 6238 of the impeller 6238 may be disposed and travel within the compression duct 6236 during operation. Additionally, the compression duct 6236 may form a portion of the flow path of the vapor entering the compressor 6064 thus allowing compression of the vapor by rotation of the impeller 6216. As shown, the compression duct 6236 is generally torriodal in shape.

Interrupting the torriodal shape of the compression duct 6236 may be a reduced clearance segment 6240 of the compression duct recesses 6234A, B positioned between the inlet 6220 and outlet 6222 of the compressor 6064. The reduced clearance segment 6240 may help isolate the high pressure section of the compressor 6064 (near the outlet

6222) from the low pressure section of the compressor 6064 (near the inlet 6220). The reduced clearance segment 6240 acts as a stripper plate and blocks an amount of the high pressure vapor from passing back toward the inlet 6220 from the area near the outlet 6222. In some embodiments, substantially only the vapor between the impeller blades 6238 may be able to pass between the inlet 6220 and outlet 6222 regions. Decompression channels 6242 formed by recesses in the reduced clearance segment 6240 may be included adjacent the inlet 6220. These decompression channels 6242 may allow for high pressure vapor to expand to a lower pressure to minimize its impact on incoming low pressure vapor from the mist eliminator assembly 6062. In the example, the decompression channels 6242 are substantially wedge shaped. The distance between the two housing sections 6218A, B at the location of the decompression channel 6242 may be about 5-35% greater (e.g. at or about 9 or 10% greater) than the distance between the two housing sections 6218A, B at the reduced clearance segment 6240.

Referring now also to FIGS. 29-31, cross-sectional views of the inlet 6220 and outlet 6222 to the compressor 6064 taken at the indicated lines in FIG. 29 are depicted. The inlet 6220 (FIG. 30) may be formed from flow channels provided in the first and second compressor housing portion 6218A, B as well as a first and second cover member 6244 A, B. The first cover member 6244A may be attached to the first compressor housing portion 6218A. The first cover member 6244A seals the inlet 6220 from the external environment and may be coupled to the first compressor housing portion 6218A via fasteners or any other suitable coupling. A gasket member 6246 may be included to help aid in establishing a suitable seal. The first cover member 6244A may be shaped as a shallow dish or cup.

The second cover member 6244B may be attached to the second compressor housing portion 6218B via fasteners or any other suitable coupling. The second cover member 6244B may form a seal between the interior of the inlet 6220 and the external environment. A gasket member 6248 may be included to aid in establishing a suitable seal. The gasket members 6246, 6248 and other gasket members described herein may be o-rings (shown), planar gaskets, form in place gaskets or any other compressible or elastomeric member. The second cover member 6244B may be shaped as an elongated dome or stadium shape. The second cover member 6244B may also include a port 6250. The port 6250 may allow for installation of an inlet vapor temperature sensor 6066.

The inlet 6220 may also include a dividing body 6252 which splits the incoming low pressure vapor flow into a plurality of flow paths. In the example shown, the dividing body 6252 is a bifurcating body which divides the incoming vapor into first and second streams. A first stream created by the dividing body 6252 may lead to a first side 6254A of the impeller 6216. The second stream may lead to a second side 6254B of the impeller 6216. The dividing body 6252 may also form part of the wall of the compression duct 6236. In the example embodiment, the dividing body 6252 includes a portion of the reduced clearance segment 6240 of the compression duct 6236.

The outlet 6222 may be formed via flow channels in the first and second compressor housing portions 6218A, B as well as a cover member 6256 and a condenser inlet coupler 6258. The cover member 6256 may be attached via fasteners or another suitable coupling to the second compressor housing portion 6218B. The cover member 6256 may form a seal between the interior of the outlet 6222 and the external environment. A gasket member 6260 may be included to aid in establishing a suitable seal. The cover member 6256 may include a port 6264. The port 6264 may allow for installation of an outlet vapor temperature sensor 6068. As shown, the cover member 6256 may be generally dome shaped.

Similarly to the inlet 6220, the outlet 6222 may include a dividing body 6266. The dividing body 6266 may combine the exiting high pressure vapor flow from a plurality of flow paths into a single flow path. In the example shown, the dividing body 6266 is a bifurcating body which combines the outgoing vapor into a single stream. A first stream created by the dividing body 6252 may lead from the first side 6254A of the impeller 6216 toward the condenser inlet coupler 6258. The second stream may lead from a second side 6254B of the impeller 6216 to the condenser inlet coupler 6258. Both streams may be combined at the condenser inlet coupler 6258. The dividing body 6266 may be shaped such that the first and second streams are combined before reaching the condenser inlet coupler 6258. The dividing body 6266 may also form part of the wall of the compression duct 6236. In the example embodiment, the dividing body 6266 includes a portion of the reduced clearance segment 6240 of the compression duct 6236.

While the compressor 6064 may be mounted in an off-center position with respect to the purifier 6010, the compressed high temperature vapor may exit the compressor 6064 substantially in line with the axis of the purifier 6010. After exiting the compressor 6064, the compressed vapor may follow a substantially straight line path into the condenser 6076. To facilitate this, the condenser inlet coupler 6258 may have a center point which is substantially in line with the axis of the purifier 6010. Such a straight line flow path into the condenser 6076 may help to minimize flow losses in the fluid exiting the compressor 6064.

Figure 32:
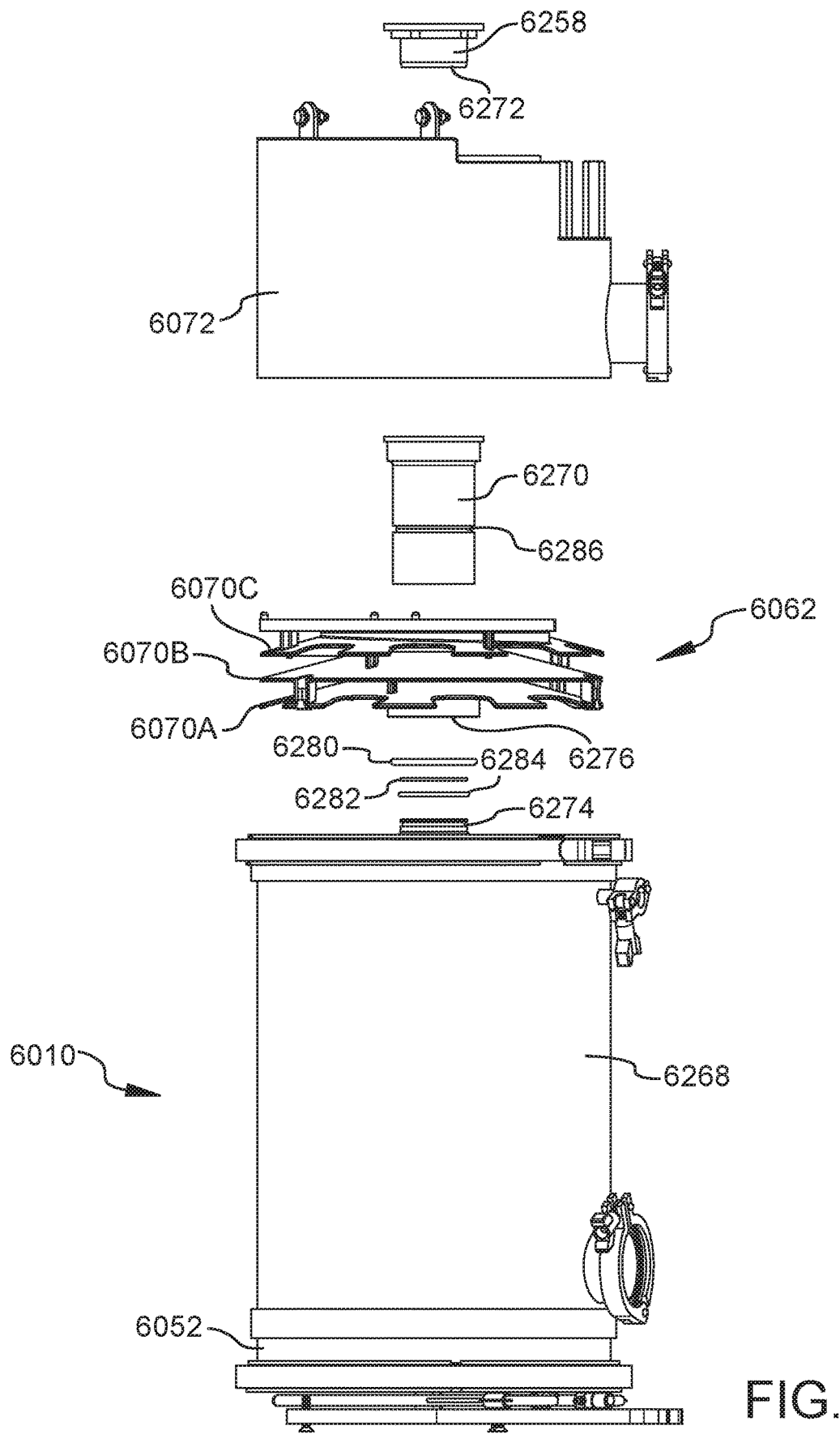
FIG. 32 depicts a view of an example purifier with a steam chest, mist eliminator, and condenser inlet coupler exploded away.

Referring now to FIG. 32, an exploded view of various components of a purifier 6010 is shown. As shown, the condenser inlet coupler 6258 may attach through the wall of the steam chest 6072 to an intermediate conduit 6270. The condenser inlet coupler 6258 may include a rounded or chamfered edge 6272 to facilitate mating of the condenser inlet coupler 6258 to the intermediate conduit 6270. To aid in creating a seal at the interface of the condenser inlet coupler 6258 and the intermediate conduit 6270, a gasket member may be included. The gasket member may be an o-ring or torriodal ring shaped elastomeric or compliant member.

One or more stratum 6070A-C of the mist elimination assembly 6062 may include a sleeve projection 6276 which is sized to accept a portion of the intermediate conduit 6270. The intermediate conduit 6270 may include an indented region 6286 in its exterior surface. The indented region 6286 may be shaped complimentarily to a gasket member 6280 which may seat into the indented region 6286. When assembled, the gasket member 6280 may be compressed between an interior face of the sleeve projection 6276 and the exterior face of the intermediate conduit 6270. This compression may prevent liquid in the lower portion of the steam chest 6072 from passing between the interior of the sleeve projection 6276 and exterior of the intermediate conduit 6270 and into the mist eliminator assembly 6062. The gasket member 6280 may also aid in positionally locating the mist elimination assembly 6062.

The intermediate conduit 6270 may seat and seal against an end of the condenser inlet 6274. This seal may inhibit any flow from the steam chest, which may contain concentrated blowdown, into the condenser inlet 6274. As shown, at least one gasket member 6282, 6284 may be included to help create a robust seal between intermediate conduit 6270 and the condenser inlet 6274. In the example embodiment a number of gasket members 6282, 6284 are included to create redundant seals. When assembled, high pressure compressed vapor from the compressor 6064 may pass through the condenser inlet coupler 6258, the intermediate conduit 6270, and condenser inlet 6274 along a straight line path formed by these components before entering the evaporator-condenser housing 6268.

Figure 33:
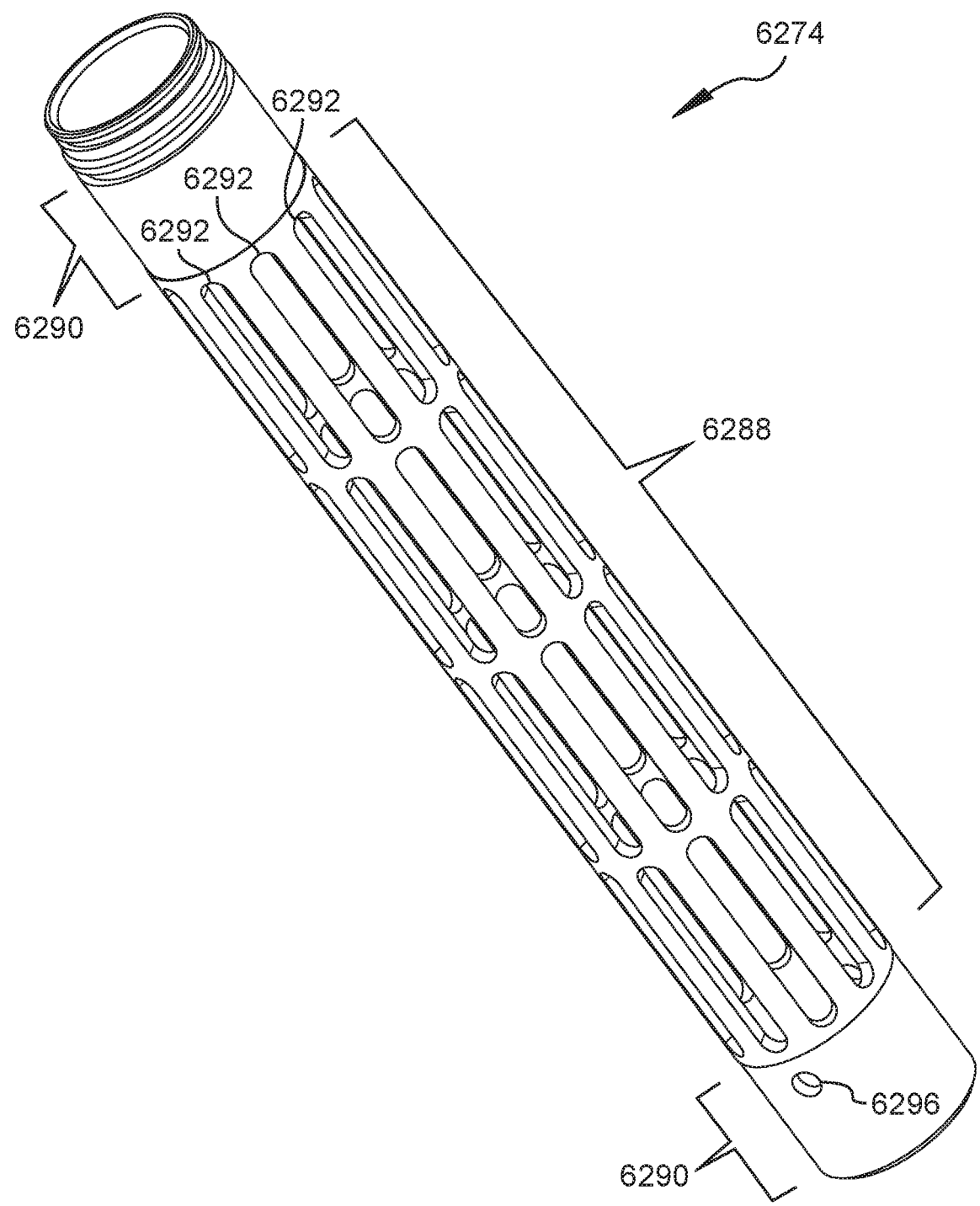
FIG. 33 depicts a perspective view of an example condenser inlet including fenestrations.
Figure 34:
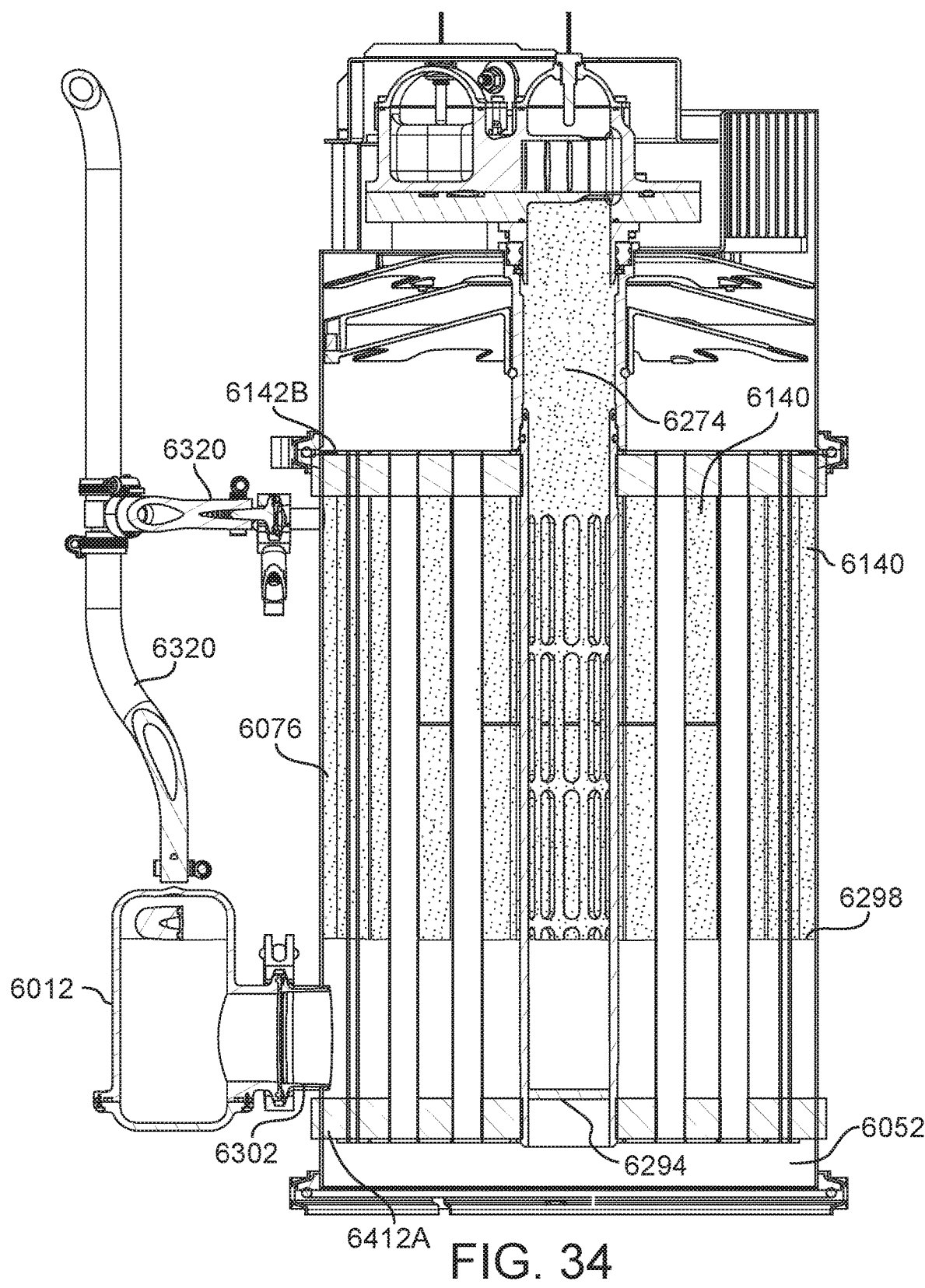
FIG. 34 depicts a cross sectional view of an example purifier showing high pressure vapor within the purifier.

Referring now to FIG. 33-34, the condenser inlet 6274 may extend through the second tube sheet 6142B to the first tube sheet 6142A. The tube sheets 6142A, B, which may be made of a compressible material, may form a seal around the exterior of sealing segment 6290 portions of the condenser inlet 6274. The portions of the condenser inlet 6274 which seal against the tube sheets 6142A, B may be smooth, solid lengths of tubing. As the condenser inlet 6274 is hollow, an interior plug 6294 may be placed within the condenser inlet 6274 near the first tube sheet 6142A. This plug 6294 may create a seal preventing fluid communication between the condenser 6076 and sump 6052. The plug 6294 may be a disc which is welded or otherwise coupled into the condenser inlet 6274. Additionally, at least one drain port 6296 may be included adjacent the plug 6294 to encourage draining of product process stream 6298 from the condenser inlet 6274. Alternatively, the condenser inlet 6274 may only extend through the second tube sheet 6142B and extend a small distance if at all into the interior volume of the condenser 6076. In such embodiments, the first tube sheet 6142A may include a solid section in place of the void which seals around the sealing segment 6290 of the condenser inlet 6274.

The condenser inlet 6274 may include a fenestrated segment 6288 as well. The fenestrated segment 6288 may be included between the sealing segments 6290 of the condenser inlet 6274. This fenestrated segment 6288 may include a number of fenestrations 6292. The fenestrations 6292 may act as vapor flow diffusers and help to create a uniform distribution of high pressure vapor (shown as stippling) entering the condenser 6076. The fenestrations 6292 may be any shape including, but not limited to, circular, round, ovoid, elliptical, polygonal, and star shaped. In the example, the fenestrations 6292 are elongate rectangles with rounded corners. The fenestrations 6292 may be included in a number of sets disposed at different locations about the fenestrated segment 6288. In the example shown, there are four sets which are spaced evenly from one another. Within each set, the fenestrations 6292 may also be placed at substantially even angular intervals from one another. Fenestrations 6292 may, for example be placed every 30-60° (e.g. every 45°).

Figure 35:
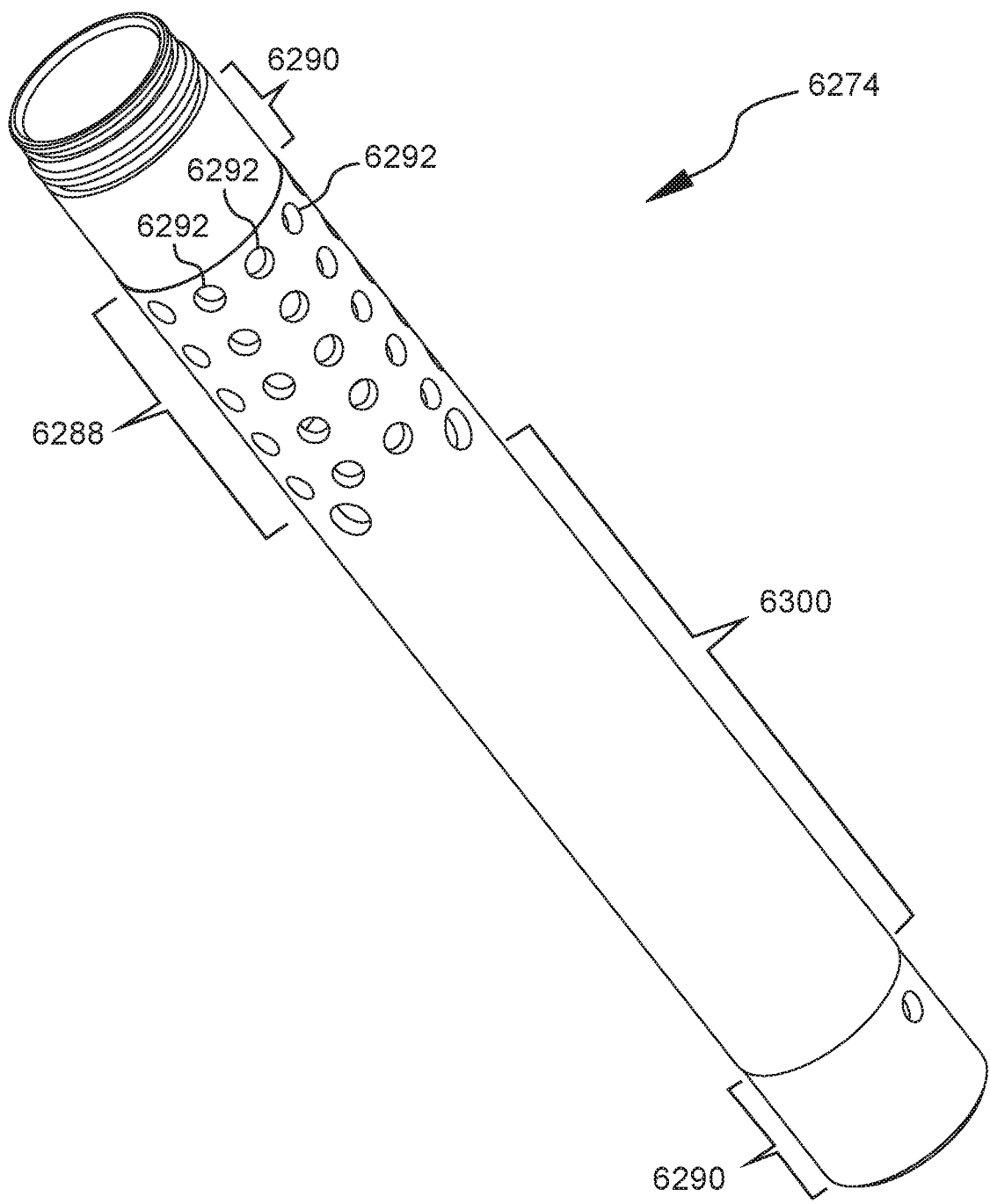
FIG. 35 depicts a perspective view of another example condenser inlet.

An alternative condenser inlet 6274 is depicted in FIG. 35. As shown, the condenser inlet 6274 includes a fenestrated region 6288 and sealing regions 6290. The fenestrations 6292 are round and roughly circular in this example. Additionally, the condenser inlet 6274 includes a solid span 6300 which is devoid of fenestrations 6292. The solid span 6300 may be positioned within the condenser 6076 when the purifier 6010 is assembled. The fenestrated section 6288 is located on a portion of the compressor inlet 6274 proximal the compressor 6064. Thus the fenestrated section 6288 may be located such that it is the first portion of the condenser inlet 6274 within the condenser 6076 to receive high pressure steam from the compressor 6064. At the transition from the fenestrated region 6288 and solid span 6300 a plug 6294 (see, e.g. FIG. 33) may be included.

Figure 36:
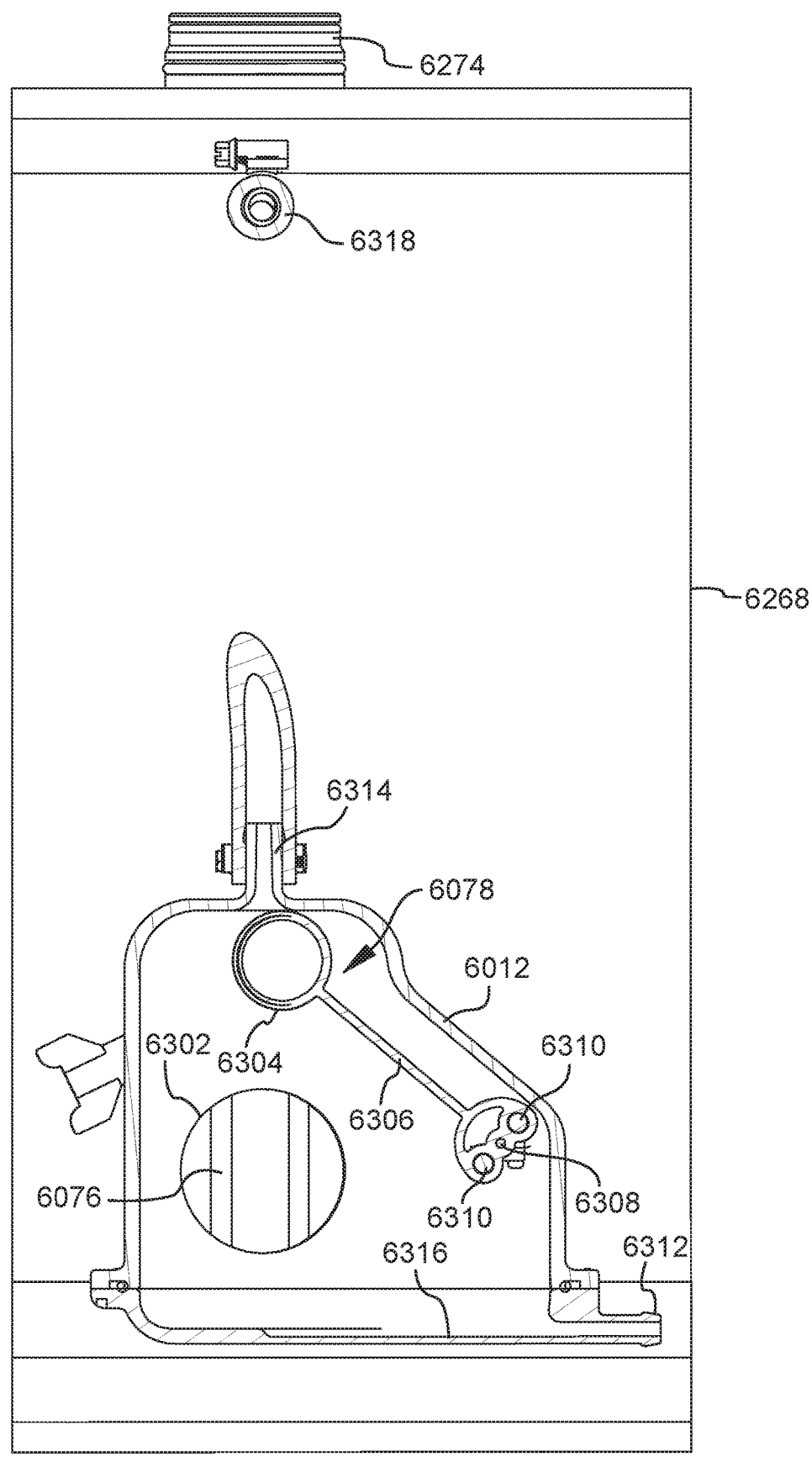
FIG. 36 depicts a side view of an evaporator condenser of an example purifier with a portion of a product reservoir cut away.

Referring primarily to FIGS. 34 and 36 as the high pressure and temperature vapor entering the condenser 6076 begins to condense, a product process stream 6298 may begin to collect at the bottom of the condenser 6076. Additionally, the latent heat of condensation may be transferred to the evaporator tubes 6140 aiding in the evaporation of new incoming source water. A product reservoir 6012 may be included and may be attached to the evaporator-condenser housing 6268. The product reservoir 6012 may be attached to the evaporator condenser housing 6268 via a product reservoir inlet 6302. The product reservoir inlet 6302 may be disposed adjacent a product accumulation surface such that the product process stream 6298 may begin to fill the product reservoir 6012 shortly after or as the product water begins to collect. In the example, the product accumulation surface is the first tube sheet 6142A.

As shown, a product level sensor 6078 may be included within the product reservoir 6012. The product level sensor 6078 may be a float type sensor and include a float 6304 coupled to an arm 6306 which displaces about a pivot point 6308. Similarly to the blowdown level sensor 6074 (see, e.g., FIG. 16), the product level sensor 6078 may include a number of magnets 6310. As the level of liquid within the product reservoir 6012 rises and falls, the arm 6306 may rotate about the pivot point 6308 as the float 6304 is displaced. The position of the magnets 6310 may be tracked by a Hall Effect sensor 6322 (see, e.g., FIG. 38) to determine the level of liquid within the product reservoir 6012.

The product reservoir 6012 is disposed such that the product level sensor 6078 may directly sense a liquid level not only within the product reservoir 6012 but also within the condenser 6076. To facilitate this, the product level sensor 6078 may be disposed such that the sweep range of the float 6304 may pass above the product reservoir inlet 6302. Thus, the condenser 6076 may also double as a product stream reservoir whose volume may be monitored via the product level sensor 6078. As such, the product reservoir 6012 may be described as an auxiliary product reservoir. In certain embodiments, the sweep range of the float 6304 may be selected such that the product level sensor 6078 may measure a volume of product in the condenser 6076 up to 4-10 L (e.g. 6 or 6.5 L).

The product reservoir 6012 may include a product outlet 6312 from which the product process stream may exit the product reservoir 6012. This outlet 6312 may be connected to a product flow conduit leading to the product heat exchanger 6008A as described elsewhere herein. The example outlet 6312 is located in line with the bottom interior surface 6316 of the product reservoir 6012. The product reservoir 6012 may also include a venting port 6314. The venting port 6314 may allow for gases to be displaced out of the product reservoir 6012 as high pressure vapor from the compressor 6064 condenses within the condenser 6076 and begins to fill the product reservoir 6012. A condenser vent 6318 may also be included to relieve excess pressure, volatiles, and non-condensable gasses from the condenser 6076 as needed. Both the vent port 6314 and condenser vent 6318 may be attached to a vent flow path 6320.

Figure 37:
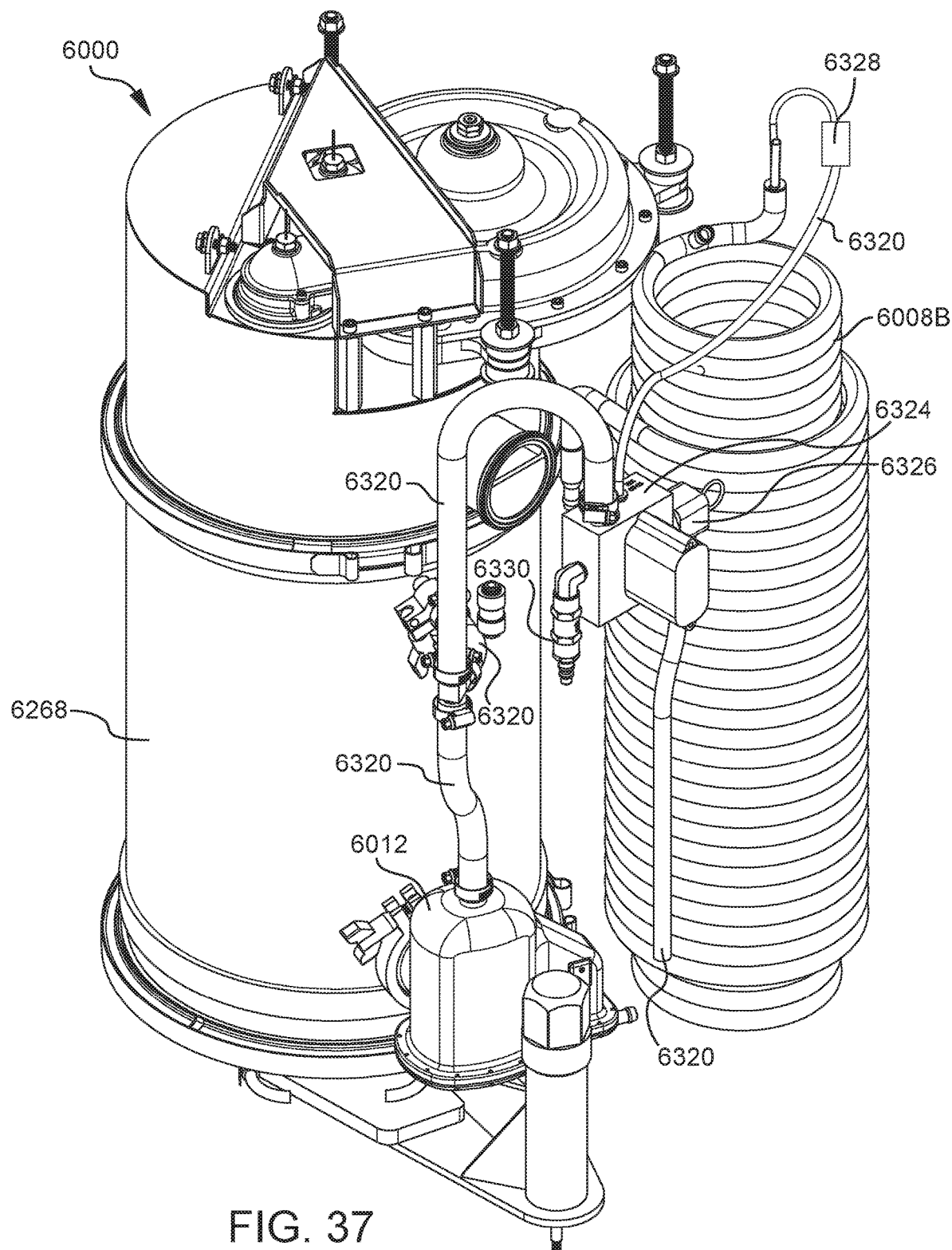
FIG. 37 depicts a perspective view of an example purifier including a number of venting flow paths.

Referring now to FIG. 37, a perspective view of a system 6000 is shown. Fluid lines other than the vent flow paths 6320 have been hidden in FIG. 37 for sake of clarity. Venting gases from the evaporator-condenser housing 6268 and the product reservoir 6012 may travel along the vent flow paths 6320 to a pressure relief assembly 6324. The pressure relief assembly 6324 may include a pressure relief valve 6326. The pressure relief valve 6326 may be a failsafe valve which opens in the event of an over pressure condition forming in the purifier 6010. In the event the pressure relief valve 6326 is forced open, venting gas may vent via a vent flow path 6320 attached to the pressure relief valve 6326 outlet. The pressure relief valve 6326 may be set to open at a predetermined pressure which may in some specific examples be at or about 15 psig. The pressure relief assembly 6324 may also include a vacuum break 6330. The vacuum break 6330 may allow for the purifier 6010 to equalize with ambient pressure during cool down. The vacuum break 6330 may, for example, include a check valve which allows the purifier 6010 to hold pressure during operation, but draw in ambient air if the interior of the purifier 6010 is below ambient.

From the pressure relief assembly 6324, gases may travel to a vent flow path 6320 which runs through the blowdown heat exchanger 6008B. In some embodiments, a vent valve 6328 may be included to control the flow of gases to the blowdown heat exchanger 6008B. The gases may run through the blowdown heat exchanger 6008B in countercurrent fashion to source water entering the system 6000. These gases may transfer thermal energy to the incoming source water, warming the source water. The cooling of these gases may allow for some of these gases to condense as they pass through the heat exchanger 6008B making them easier to dispose of.

Figure 38:
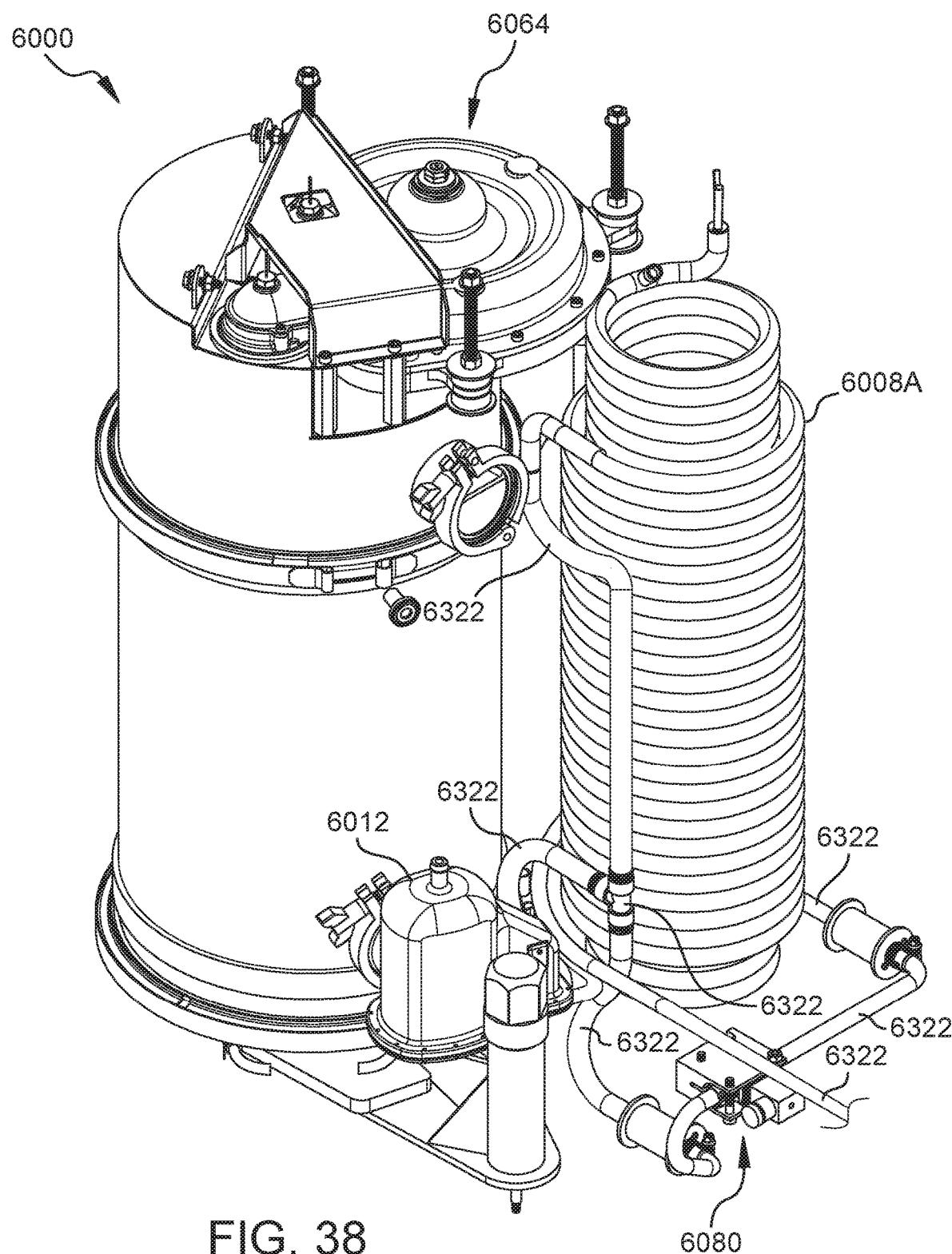
FIG. 38 depicts a perspective view of an example purifier including a number of product flow paths.
Figure 39:
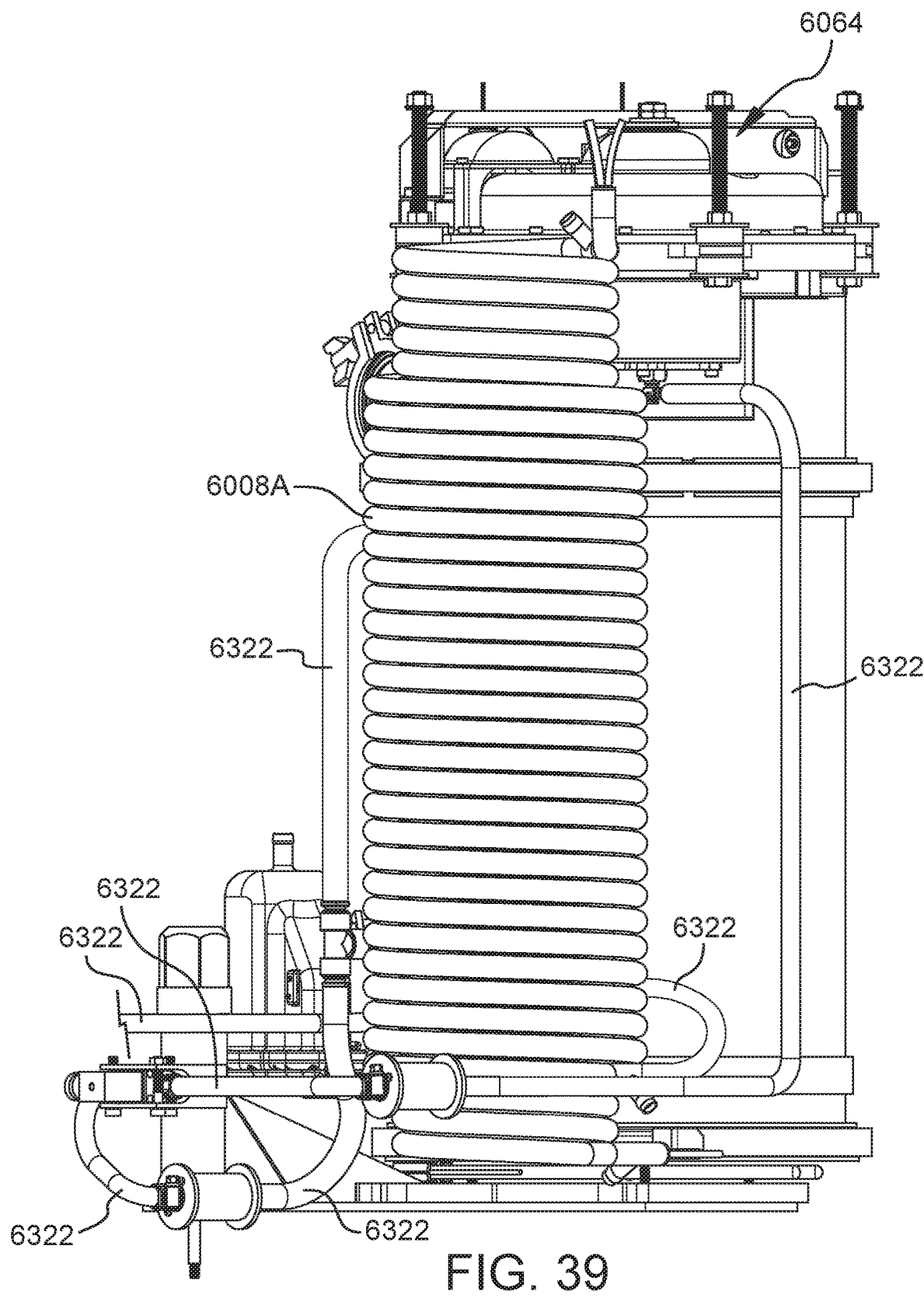
FIG. 39 depicts a side view of an example purifier including a number of product flow paths.

Referring now to FIGS. 38 and 39 two perspective views detailing product flow paths 6322 an example system 6000 are shown. Only the product flow paths 6322 and not those of source water or other process streams are shown in FIGS. 38 and 39 for sake of clarity. As shown, product water leaving the product reservoir 6012 may flow to both the product heat exchanger 6008A and a bearing feed pump 6080. In the example embodiment a branch fitting 6332 is included to split the product flow for this purpose. Product water flowing through the heat exchanger 6008A, may exit the heat exchanger 6008A at reduced temperature after transferring heat to the incoming source water. The cooled product water may flow out of the product heat exchanger through a product flow path 6322. The bearing feed pump 6080 may pump a portion of the product water leaving the product reservoir 6012 to the compressor 6064. The bearing feed pump 6080 may be a solenoid pump. As described elsewhere herein, the product water may be used to lubricate an impeller bearing.

Figure 40:
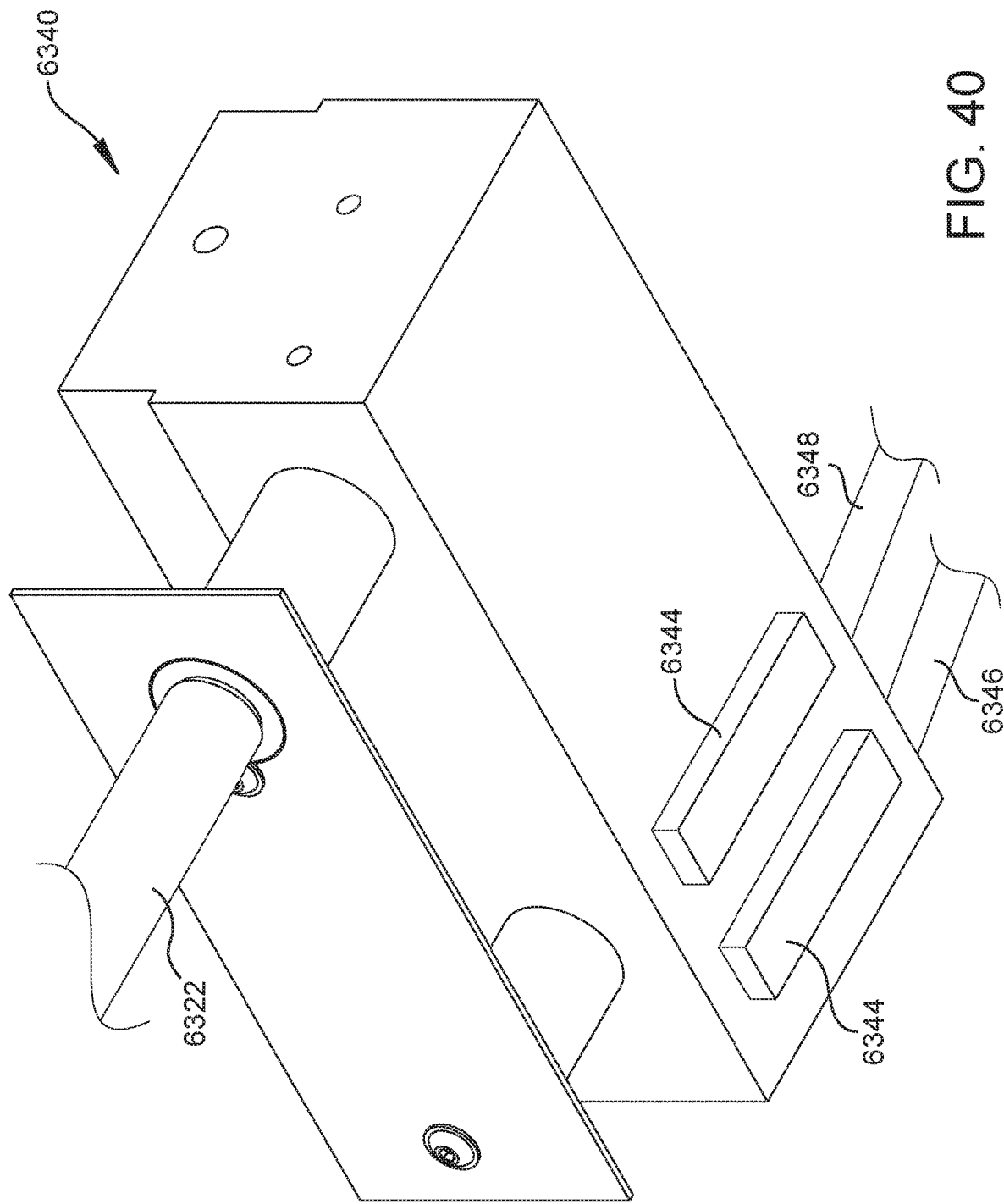
FIGS. 40 and 41 depicts an example sensing manifold.
Figure 41:
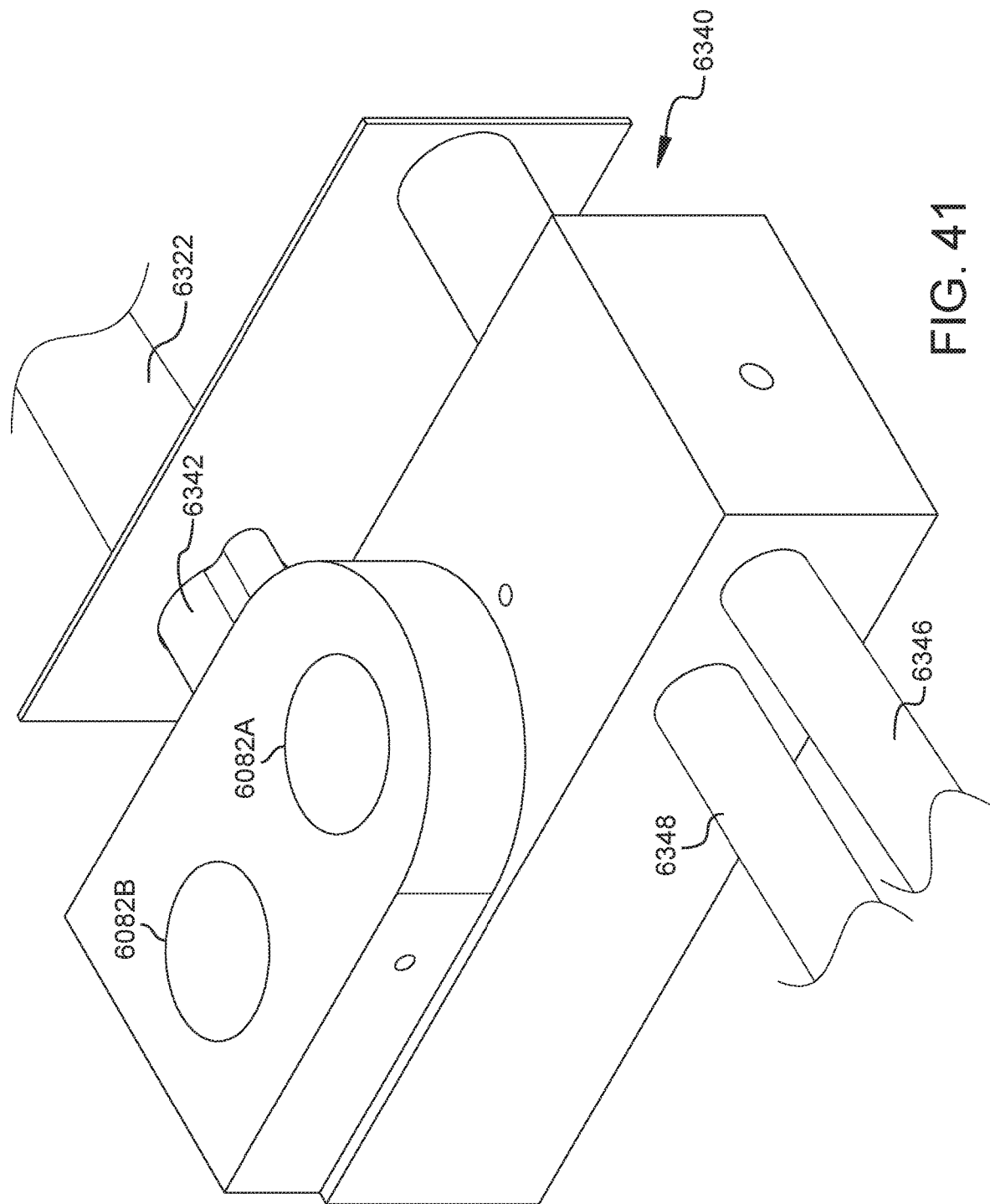

Referring now primarily to FIGS. 40-41, the cooled product process stream exiting the product heat exchanger 6008A may proceed to a sensing manifold 6340. Product may flow into the sensing manifold at an inlet port 6342 and flow along an interior flow path in communication with one or more sensors 6082A, 6082B. In the example embodiment, two sensors 6082A, 6082B are shown, however, other embodiments may include additional sensors. In some embodiments, redundant sets of identical sensors 6082A, 6082B may be included. The at least one sensor 6082A, 6082B may be a conductivity sensor or conductivity and temperature sensor. Other sensor types which may provide a data signal related to water quality such as turbidity, pH, Redox Potential, TDS, analyte sensors, TOC, etc. may also be included.

The sensing manifold 6340 may also include a valve or valves 6344 which may be operated by a controller 6034 (see, e.g., FIG. 2) to direct the product process stream based on data provided from the at least one sensor 6082A, 6082B. If the water quality (e.g. conductivity value) is outside of a threshold value, a valve leading to a drain flow path 6346 may be opened. If the water quality (e.g. conductivity) is in compliance with a predetermined threshold value, the controller 6034 (see, e.g., FIG. 2) may actuate the valve or valves 6084, 6086 to direct the product process steam to a medical system flow path 6348. The valves 6084, 6086 may also be actuated by the controller 6034 based on signals the controller 6034 receives from a medical system 6004 (see, e.g. FIG. 2).

Figure 42:
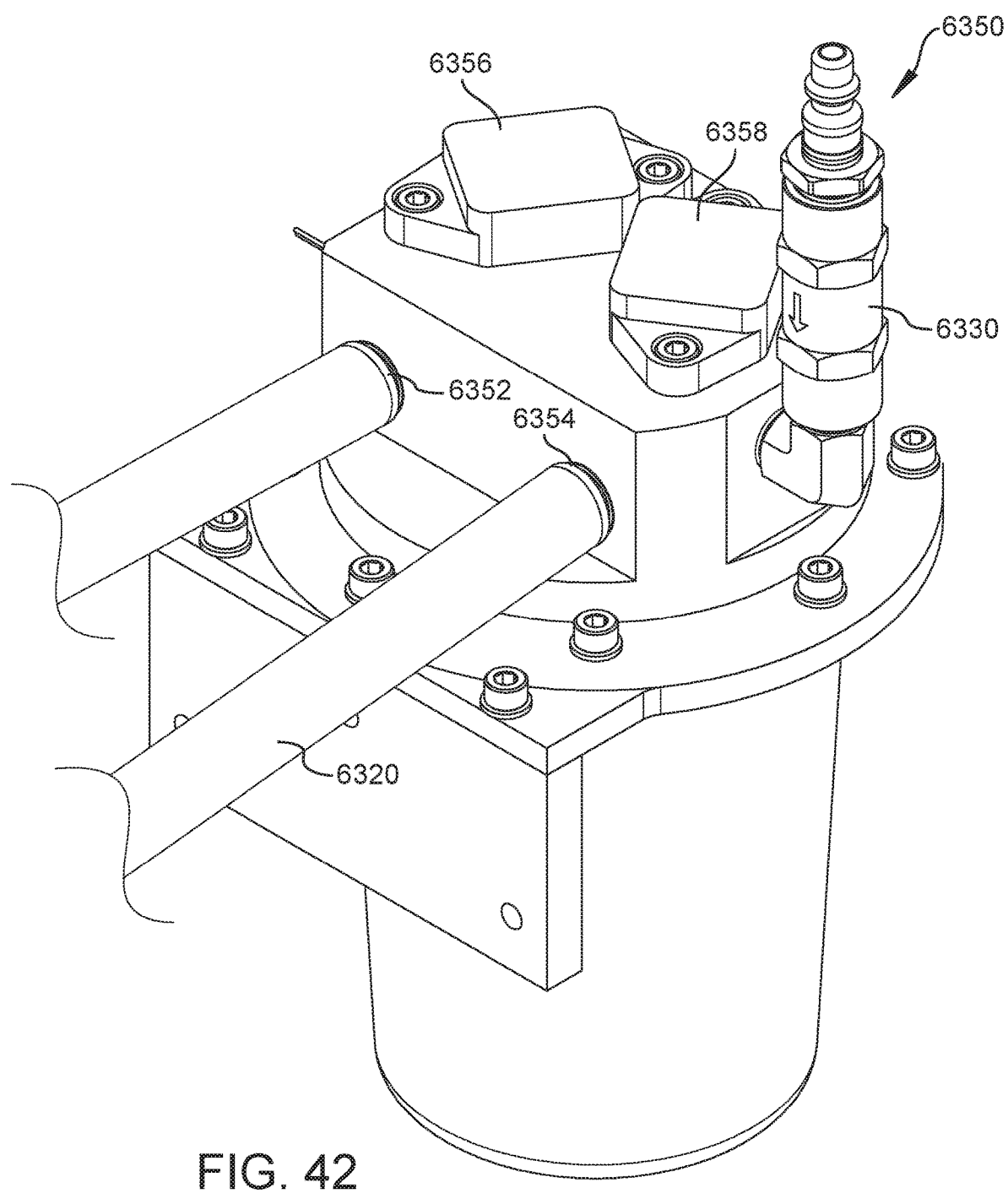
FIGS. 42 and 43 depict perspective views of an example mixing can.
Figure 43:
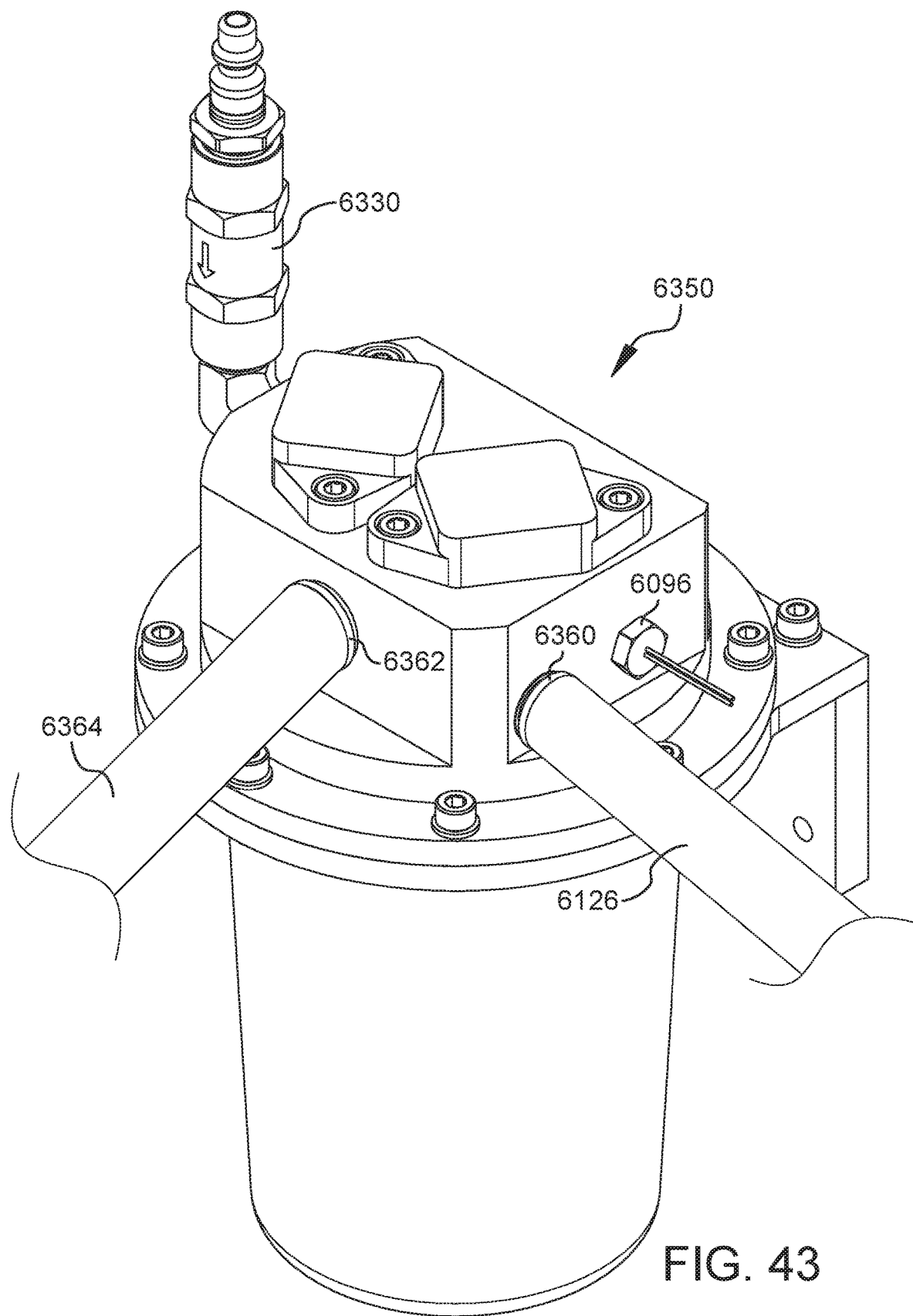

Referring now primarily to FIGS. 42-43, the cooled vent and blowdown stream exiting the blowdown heat exchanger 6008B may travel to a mixing can 6350. In some embodiments, the vent stream may not be routed through the blowdown heat exchanger 6008B and instead be routed directly to the mixing can 6350. As shown, the mixing can 6350 includes a port 6352 to which a blowdown flow conduit 6162 is attached. The Mixing can 6350 also includes a port 6354 to which a vent flow path 6320 is attached. Inflow to the mixing can 6350 may be controlled by valves 6356, 6358 which respectively control communication from the blowdown port 6352 and steam port 6354 to an interior volume of the mixing can 6350. An additional port 6360 coupled to a source fluid line 6126 may also be included. After mixing, fluid may exit the mixing can 6350 via an outlet port 6362 which may be coupled to a drain conduit 6364.

A mixing can 6350 may be used to combine a number of process streams from the purifier. The vent stream, for example, may be mixed with the cooled blowdown stream to ensure that any hot gas which may have made it through the blow down heat exchanger 6008B is quenched to a relatively low temperature. As shown, the mixing can 6350 also includes at least one sensor 6096 which in the example embodiment may be a temperature sensor. A controller 6034 (see, e.g., FIG. 2) may monitor data from the sensor 6096 and determine if the temperature within the interior volume of the mixing can 6350 is below a predefined threshold. If the interior of the mixing can 6350 is too hot, cool source water may enter the mixing can through the source shunt port 6360. A shunt valve 6100 (see, e.g., FIG. 2) may be included upstream of the mixing can 6350 (or attached to the mixing can in some embodiments) to control the flow of source water into the mixing can 6350. In the example embodiment, the mixing can 6350 also includes a vacuum break 6330. The vacuum break 6330 may be included on the mixing can 6350 instead of on the pressure relief assembly 6324 as previously described.

Figure 44:
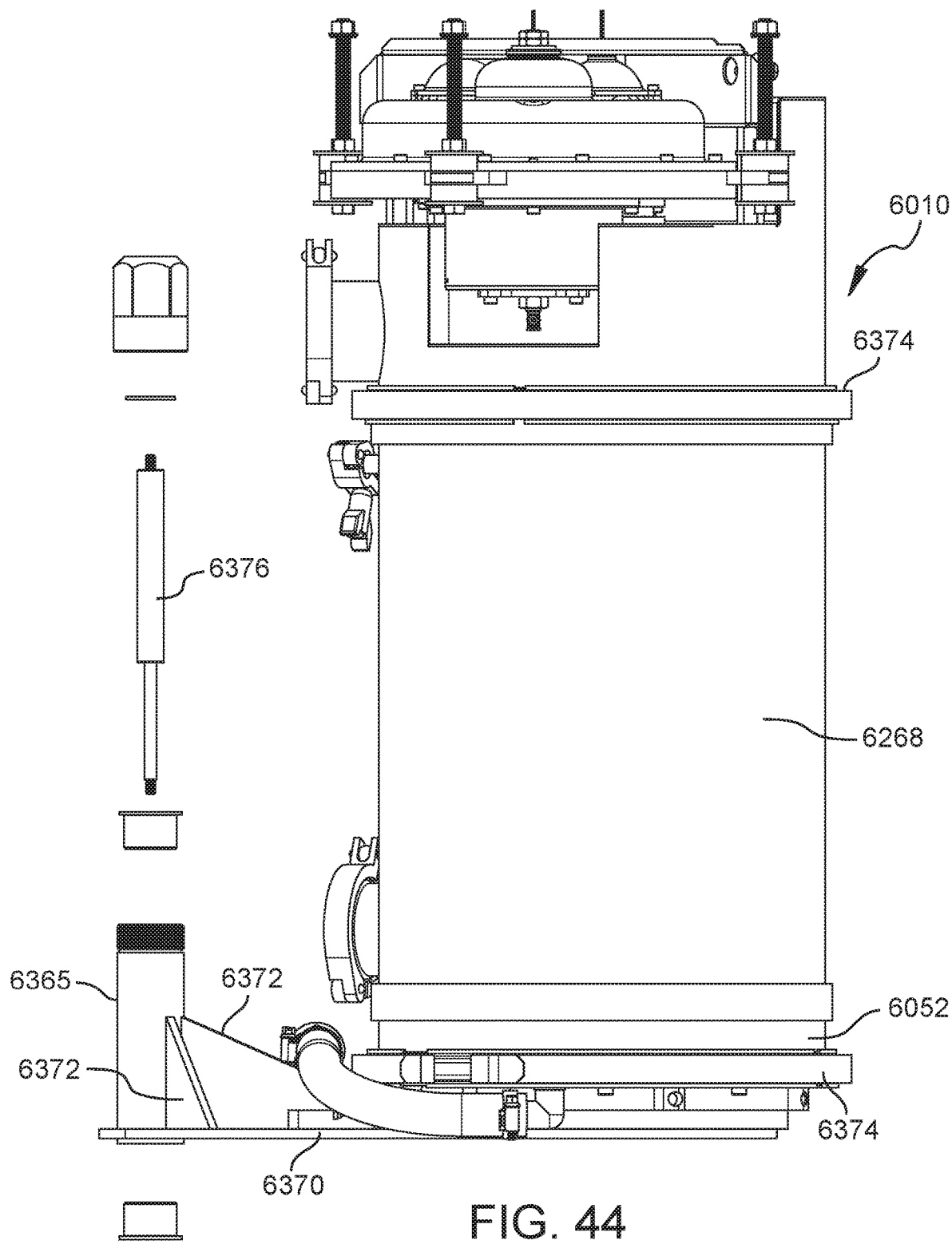
FIG. 44 depicts a side view of an example purifier with a pivot of an example support plate for the purifier exploded apart.

In some embodiments, and referring now primarily to FIG. 44, a portion of the purifier 6010 may be attached to a pivot 6365. The pivot 6365 may allow the attached portion of the purifier 6010 to be easily removed from the purifier 6010 for cleaning, replacement, to provide easy access to other portions of the purifier 6010 or for other maintenance purposes. A pivot 6365 may, for example, allow for the evaporator-condenser housing 6268 to be removed for inspection or a clean out of place operation such as a descaling procedure. In the example, both the evaporator-condenser housing 6268 and sump 6052 are arranged for removal via rotation about the pivot 6365.

As shown in FIG. 44, the pivot 6365 is attached to a support plate 6370. The support plate 6370 may extend under the sump 6052 to support the removable components. In some embodiments, the support plate 6370 may also be fastened to the sump 6052 to aid in retaining and positioning of the removable components on the support plate 6370. Support members 6372 may be included to reinforce the support plate 6370 depending on the material of the support plate 6370 and weight of the removable components.

Figure 45:
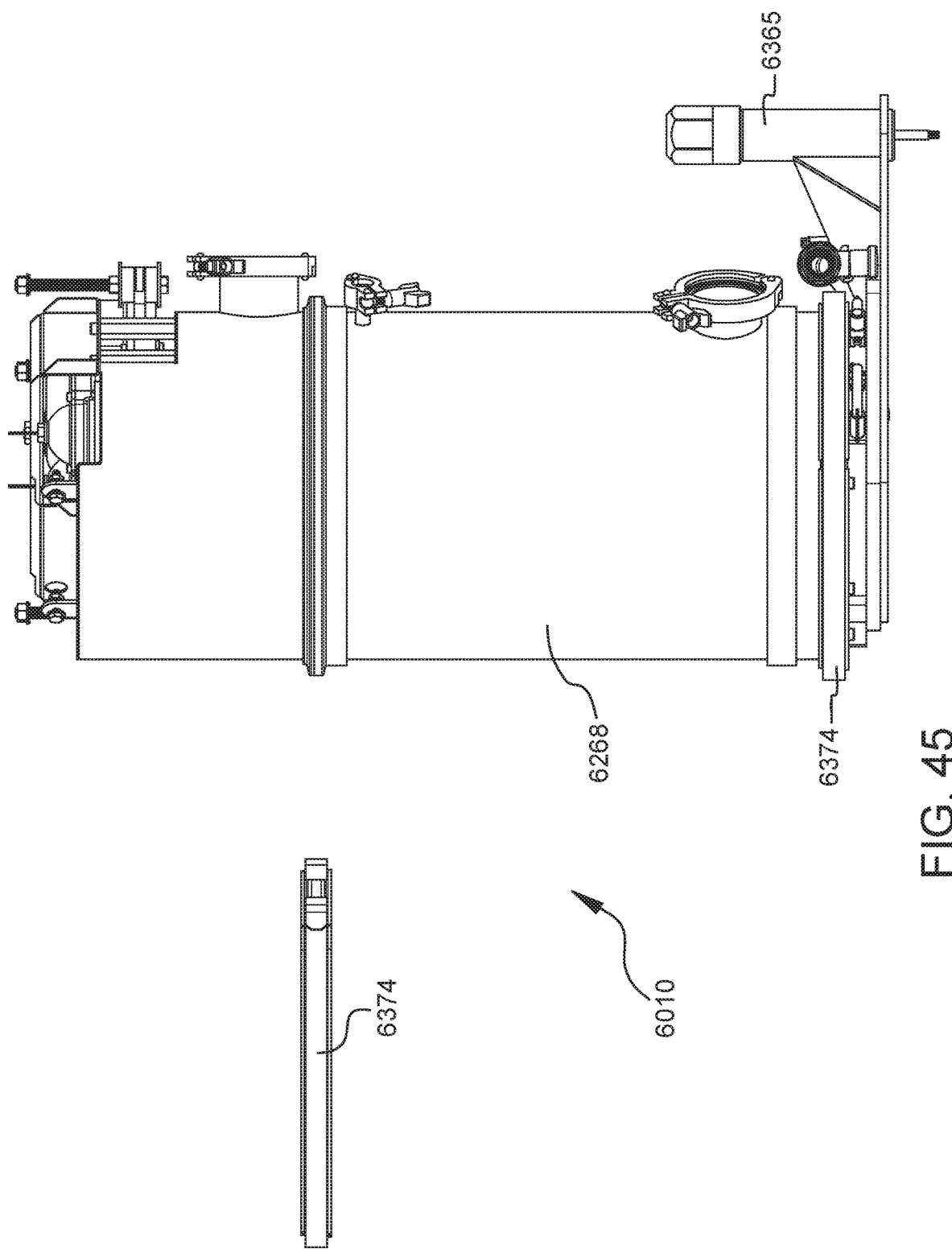
FIG. 45 depicts a side view of an example purifier with a fastener coupling first and second sections of the purifier removed.
Figure 46:
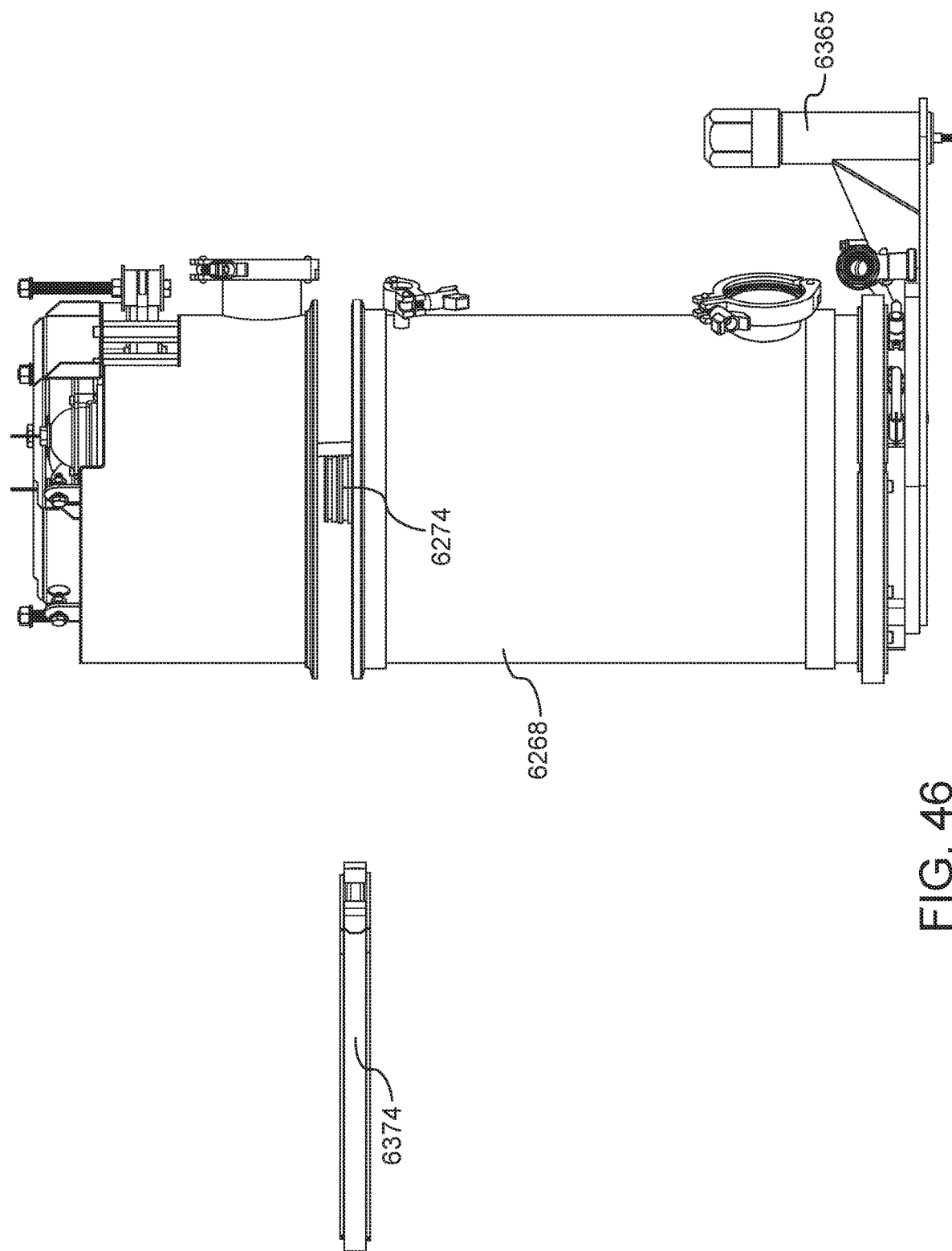
FIG. 46 depicts a side view of an example purifier with a fastener coupling first and second section of the purifier removed and the first section displaced away from the second along a displacement path.

The purifier 6010 may be provided in a number of sections (e.g. a first and second) which are coupled to one another via fasteners in a first state. The fasteners may include at least one clamp. In the example embodiment, the fasteners are shown as band clamps 6374. Referring now also to FIGS. 45-46, once, in a second state, the band clamp 6374 which couples the evaporator-condenser housing 6268 to the steam chest 6072 is removed the full weight of the evaporator-condenser housing 6268, sump 6052, and any attached components may be supported by the pivot 6365. As shown best in the exploded view of FIG. 44, a bias member 6376 may be included in the pivot 6365. As a result of the band clamp 6374 being removed, the bias member 6376 may be caused to transition to an energy storing state such as a compressed state (best shown in FIG. 46). When the bias member 6376 is in the compressed state, the pivot 6365 and removable components may be displaced away from the steam chest 6072. The amount of displacement may be chosen to provide clearance for the top of the condenser inlet 6274 as the removable components are swung away from the rest of the purifier 6010. The displacement path of the support plate 6370 and the attached components may linear, though need not be in all embodiments. Specifically, the displacement path may be along or parallel to the axis of the pivot 6365. In the exemplary embodiment the bias member 6376 may be a corrosion resistant gas spring. Other types of bias members 6376 may also be used such as coil springs, spring washers, disc springs, compressible elastomer, air bladders, or any other suitable bias member.

Figure 47:
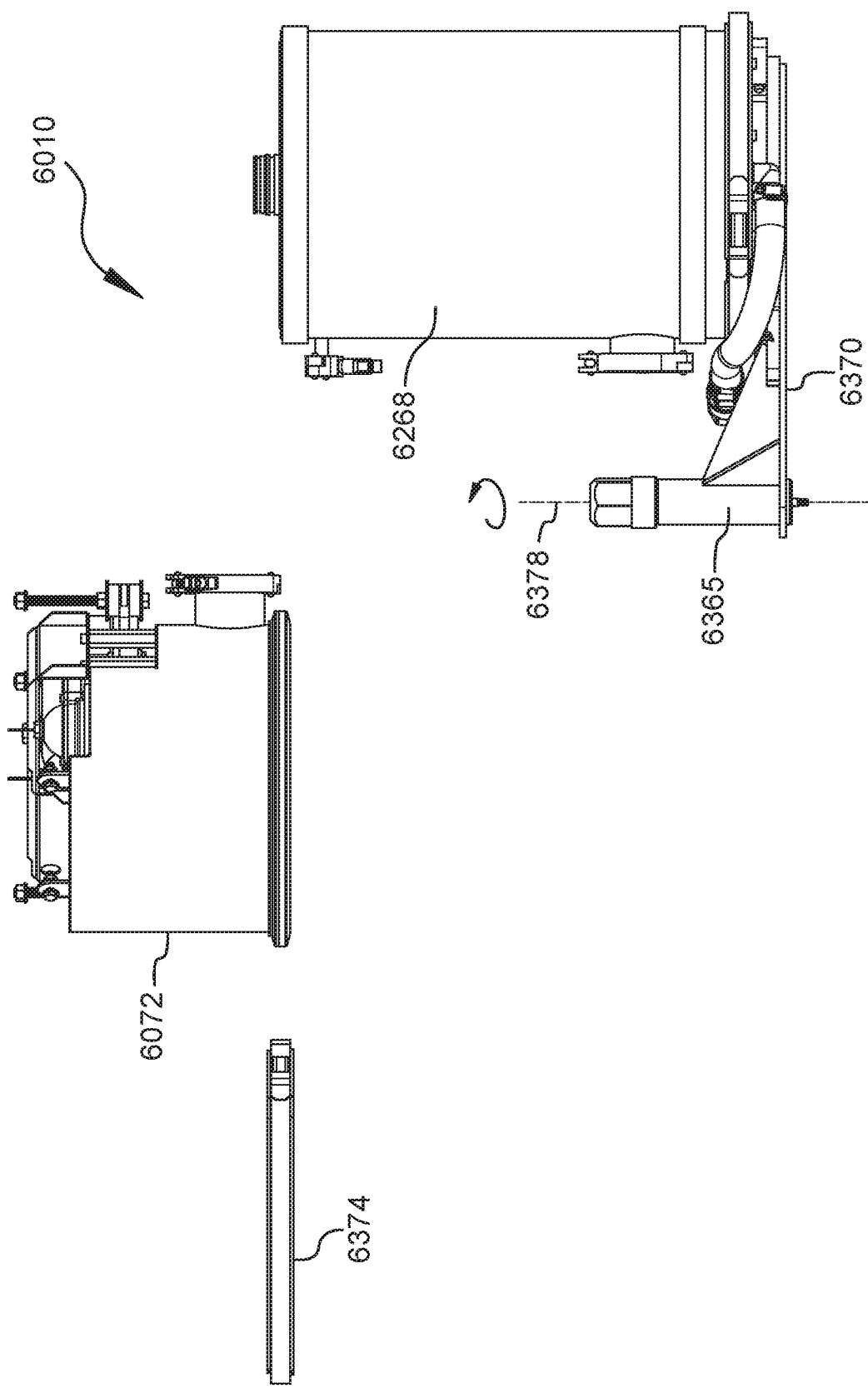
FIG. 47 depicts a side view of an example purifier with a fastener coupling first and second section of the purifier removed and the first section displaced away from the second about an arcuate path defined by the pivot.

Once the bias member 6376 has transitioned to a compressed state or energy storing state, and referring now also to FIG. 47, the removable components (the sump 6052 and evaporator-condenser housing 6268 in the example) may be rotated about the axis 6378 of the pivot 6365. Thus, the removable components may be swung away from the rest of the purifier 6010 and detached from the pivot plate 6370. If these components are to be removed for out of place cleaning, a spare, replacement set of components may be placed onto the pivot plate 6370 and swung back into place minimizing downtime. After being swung back into place, the bias member 6376 may aid in reassembly as the bias member 6376 will help lift the replacement set of components into position.

Figure 48:
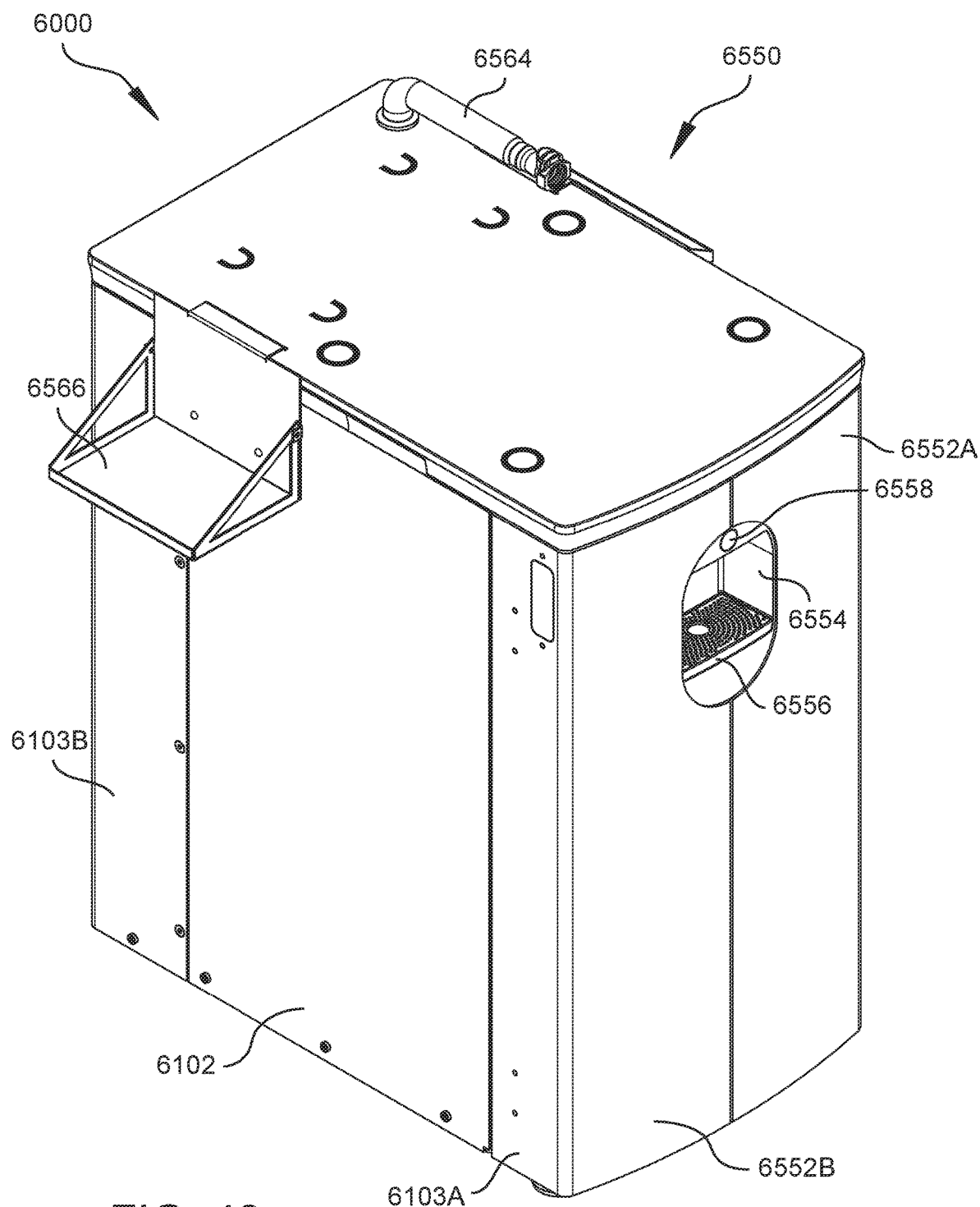
FIG. 48 depicts a front perspective view of an example system similar to that shown in FIG. 3.
Figure 49:
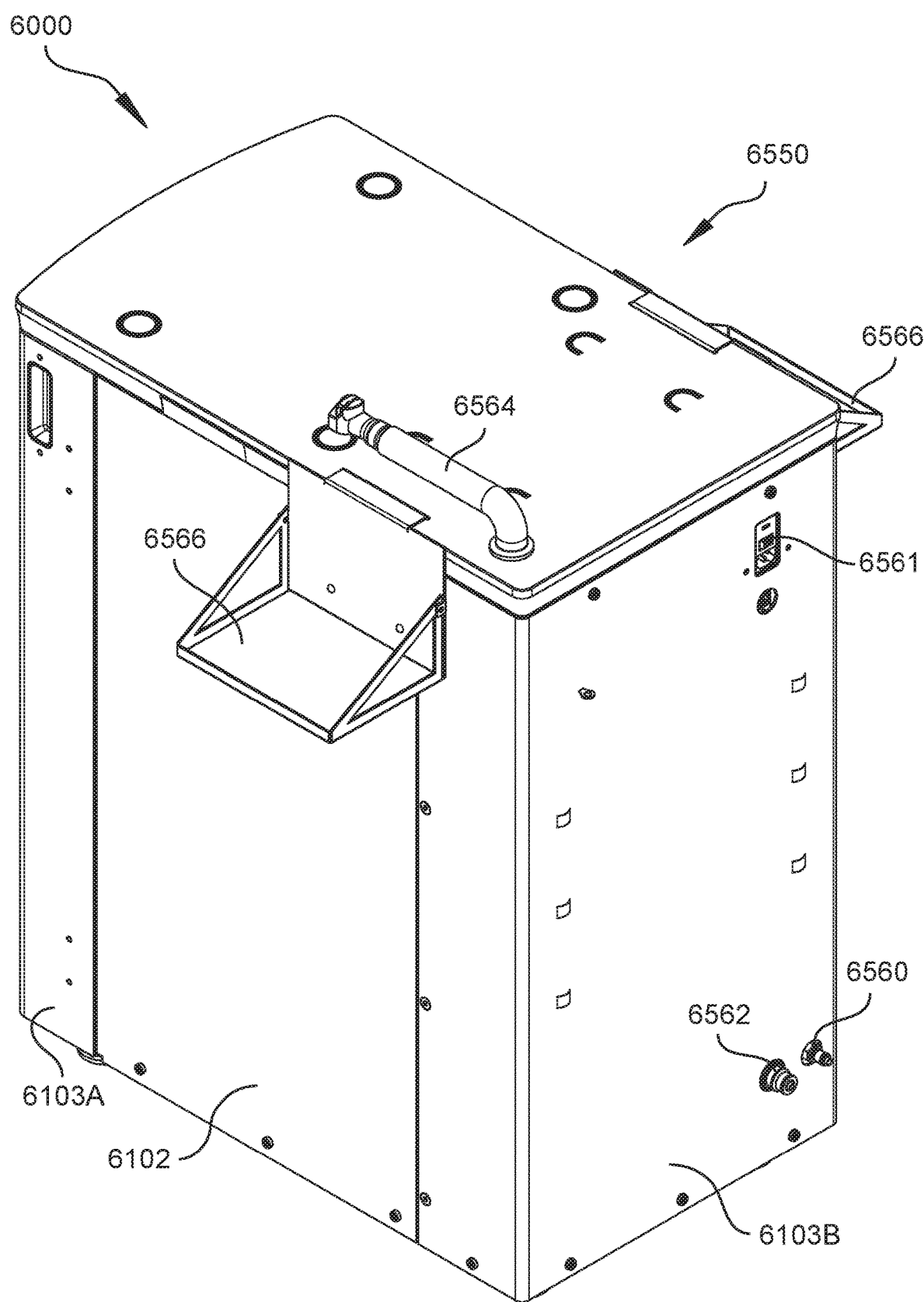
FIG. 49 depicts a rear perspective view of the example system shown in FIG. 48.

Referring now to FIGS. 48-49, an example system 6000 similar to that shown representationally in FIG. 3 is depicted. As shown, the system 6000 includes an enclosure 6550. The enclosure 6550 is roughly rectangular in shape. As shown, the front for the enclosure 6550 includes two doors 6552A, 6552B. Additionally, a sampling recess 6554 is included in the front of the enclosure 6550. The sampling recess 6554 may include a perforated tray 6556 upon which a cup, glass, or similar vessel may rest while water is dispensed from the sampling port 6038 (see, e.g., FIG. 3) of the system 6000. Any spilt sample fluid may collect in a catch basin provided under the perforated tray 6556. LEDs or similar lighting may be included to illuminate the sampling recess 6554. In the example embodiment, a sample may be dispensed via the depression of a button 6558 which may, in some embodiments, be backlit.

The rear of the enclosure 6550 may include an opening through which a source connector 6560 for a source fluid line extends. A drain connector 6562 may extend through the back of the enclosure 6550 as well. Each of the source connector 6560 and drain connector 6562 may be quick-connect fitting depending on the embodiment. Power and data connections 6561 may also be provided through the rear of the enclosure 6550.

The top of enclosure 6550 may be generally flat and include an outlet line 6564 for purified water. As shown, this outlet line 6564 may be insulated to help maintain temperature within the line and protect against contact with a user when very hot. A medical system 6004 or other point of use system or device may be disposed on top of the enclosure 6550 and placed into fluid communication with the outlet line 6564. In some embodiments, the medical system 6004 or other system or device may be affixed (e.g. bolted, clamped, or otherwise mechanically retained). Alternatively, such a system or device may passively rest on top of the enclosure 6550. Shelving 6566, platforms, receptacles, or similar structures may be coupled to the enclosure 6550 for storage. In some embodiments, the shelving 6566 or receptacles may hold components utilized by a medical system 6004 or other device during use (e.g. acid reservoir and bicarbonate reservoir for a hemodialysis machine).

Figure 50:
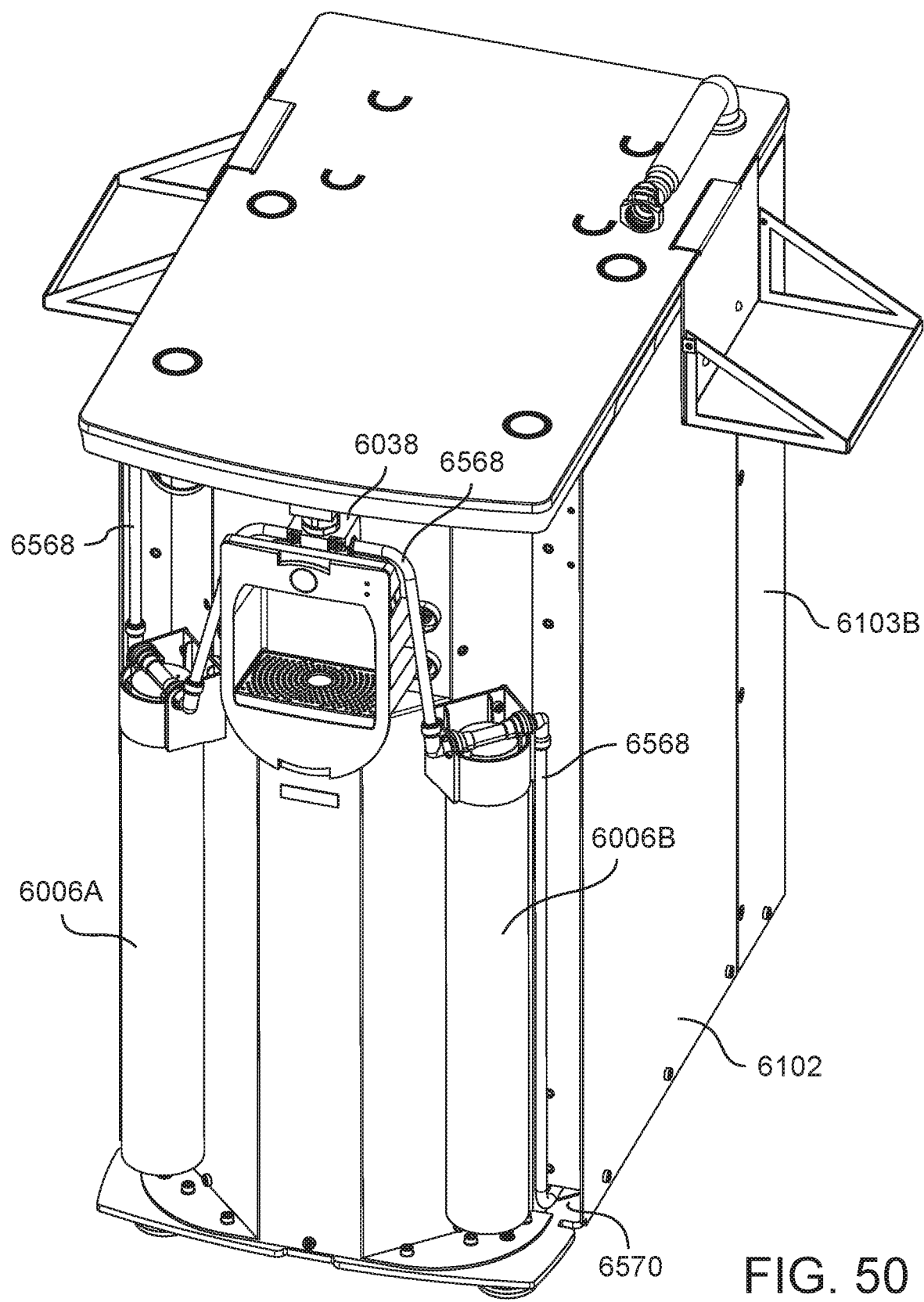
FIG. 50 depicts a front perspective view of an example system with a portion of an enclosure of the example system removed.

The enclosure 6550 may include a number of interior compartments which may be insulated from one another. For example, the enclosure 6550 may include a hot section housing 6102 where high temperature components of the system 6000 are housed insulated from the rest of the system 6000. The other compartments of the enclosure 6550 may be cool section housings 6103A, B which remain relatively cool in comparison to the hot section housing 6103. The purifier 6010 (see, e.g. FIG. 52) and heat exchangers 6008A, B (see, e.g., FIG. 52) may be included in the hot section housing 6102. In some embodiments, the purifier 6010 and heat exchangers 6008A, B may have a foot print of less than 200 in$^2$ (e.g. less than 180 in$^2$). The height of the purifier 6010 may be less than 30 inches (e.g. 26.5 inches or less). Referring now also to FIG. 50 a front view of the enclosure 6550 is depicted with the doors 6552A, B removed. As shown, a first filter 6006A and second filter 6006B may be included behind the doors 6552A, B. The sampling port 6038 may be disposed intermediate the two filters 6006A, B such that the sample is representative of the filtering ability of only the first filter 6006A. In other embodiments, additional sampling ports 6038 may be included and there may be an ability to collect a sample downstream of both the first and second filter 6006A, B. The filters 6006A, B may be identical and may be 5-6 L activated carbon filters in certain embodiments. The filters 6006A, B may be placed behind doors 6552A, B to simplify replacement of the filters 6006A, B after they have fulfilled a predetermined usage life or the controller 6034 determines that the filters 6006A, B need to be replaced. The filtration source lines 6568 may be routed through cool section channels 6570 from cool section housing 6103B to cool section housing 6103A. The channels 6570 may be routed under or over portion of the hot section housing 6102 compartment.

Figure 51:
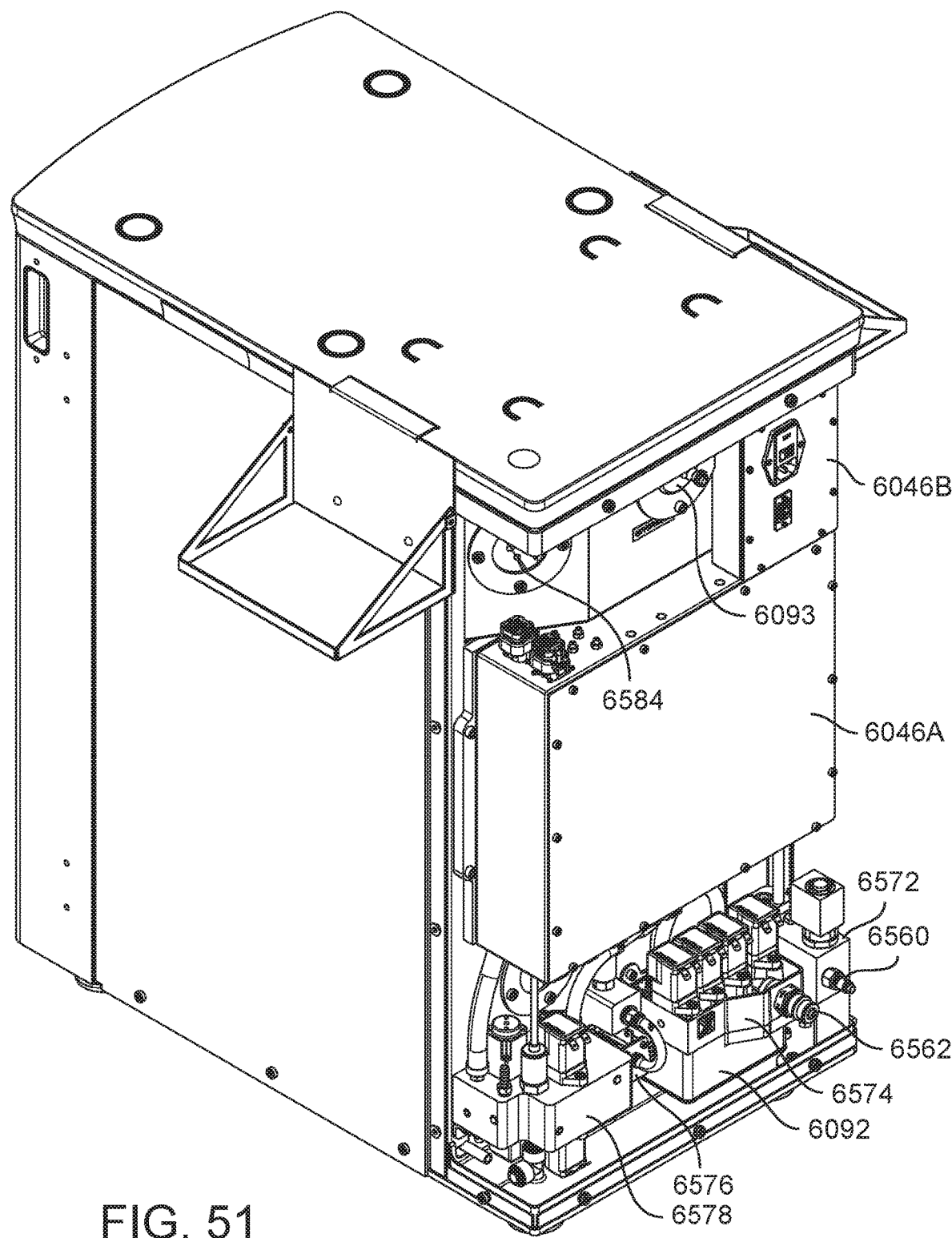
FIG. 51 depicts a rear perspective view of an example system with a portion of an enclosure of the example system removed.

Referring now also to FIG. 51, a rear perspective view of the system 6000 is shown with the rear panel of the enclosure 6550 removed. As shown, various manifolds 6572, 6574, 6576, 6578 as well as the mixing reservoir 6092 may be included in cool section housing 6103B. In other embodiments, all of the manifolds 6572, 6574, 6576, 6578 may be combined into a single unitary manifold. The manifolds 6572, 6574, 6576, 6578 are described in greater detail later in the specification. A catch basin 6587 may be included beneath the manifolds 6572, 6574, 6576, 6578 and may include a leak sensor (not shown). The electronics for the system 6000 may also be included in the cool section housing 6103B. In the example embodiment, the electronics are divided into a first and second electronics housing 6046A, B. In other embodiments, a single housing may be used. Various data and power cabling may be fed through pass-through 6580 in portions of insulating material 6584 disposed in the walls of the hot section housing 6102. The portion of insulating material 6584 may be insulating foam or elastomer material which is compressible in certain embodiments. The portions of insulating material 6584 in the example embodiment are depicted as plug like structures which are disposed in openings to the hot section housing 6102 from the interior of the cool section housing 6103. These portions of insulating material 6584 may be in a compressed state against the walls of the openings in the hot section housing 6102. Additionally, the pass-throughs 6580 may be compressed around any cabling (not shown) extending therethrough. This may help to establish a tight seal between the hot section housing 6102 and the cool section housing 6103B. A line leading to air filter 6093 may also pass through a wall of the hot section housing 6102 to reach the air filter 6093.

Figure 52:
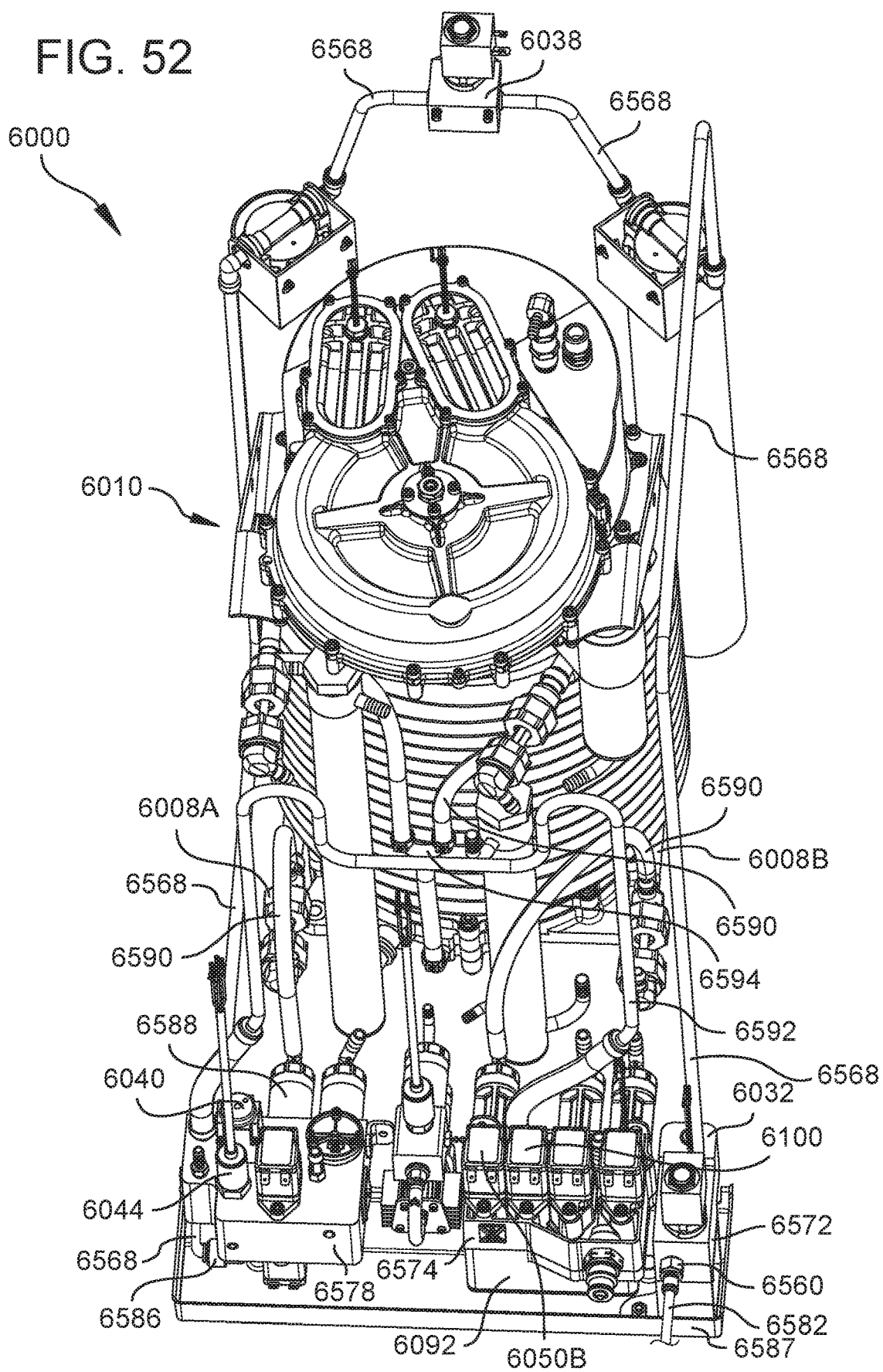
FIG. 52 depicts a perspective view of portions of an example purifier including a number of source fluid flow paths.
Figure 53:
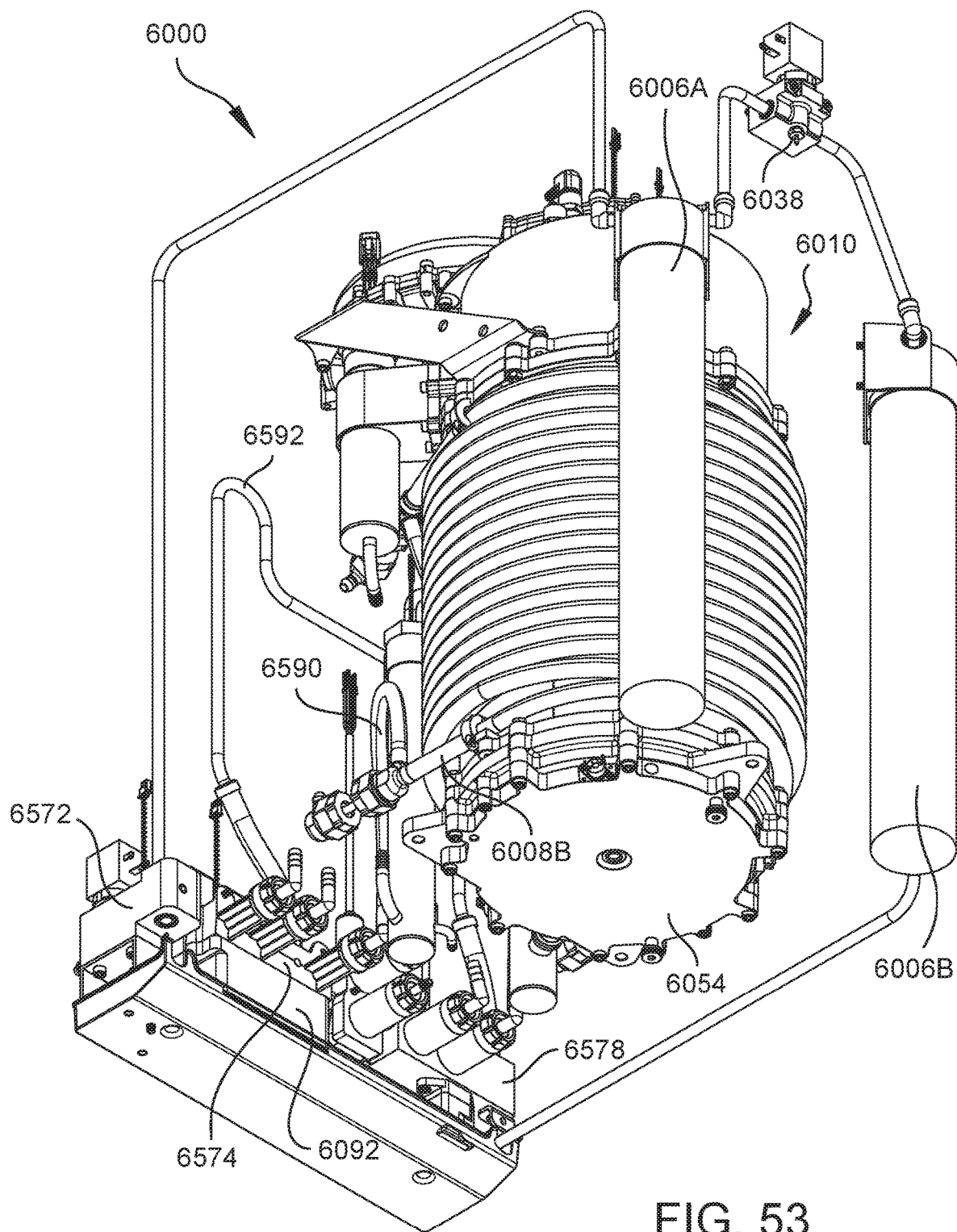
FIG. 53 depicts a perspective view of portions of an example purifier including a number of source fluid flow paths.
Figure 54:
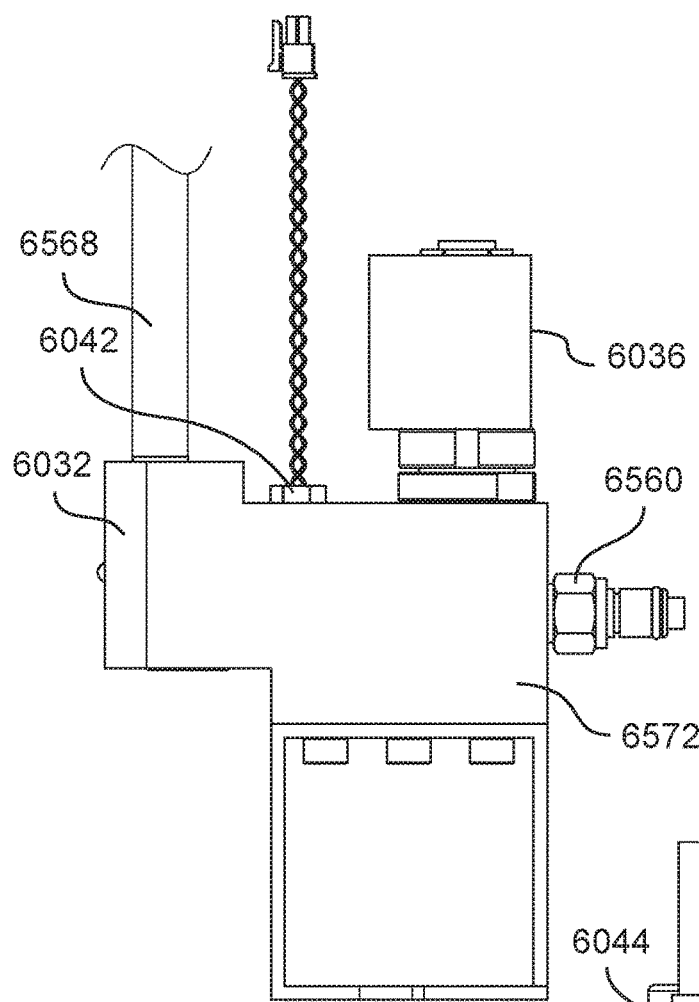
FIG. 54 depicts a side view of an example source inlet manifold.

Referring now to FIGS. 52 and 53, perspective views of the system 6000 are shown with the enclosure 6550 removed. For sake of clarity, only source water carrying fluid lines are shown in FIGS. 52-53. Source water may enter the system 6000 at a source connector 6560 through a source connection line 6582. In the example embodiment, and referring now also to FIG. 54, the source connector 6560 is included on an inlet manifold 6572. The inlet manifold 6572 may also include a flow control valve 6032, a check valve 6030 (see, e.g., FIG. 3), and one or more sensors. In the exemplary embodiment, a temperature sensor 6042 and pressure sensor 6036 are included on the inlet manifold 6572. In other embodiments additional sensors which sense different characteristics of the incoming source water or sensors providing redundancy for those shown may be included.

Figure 55:
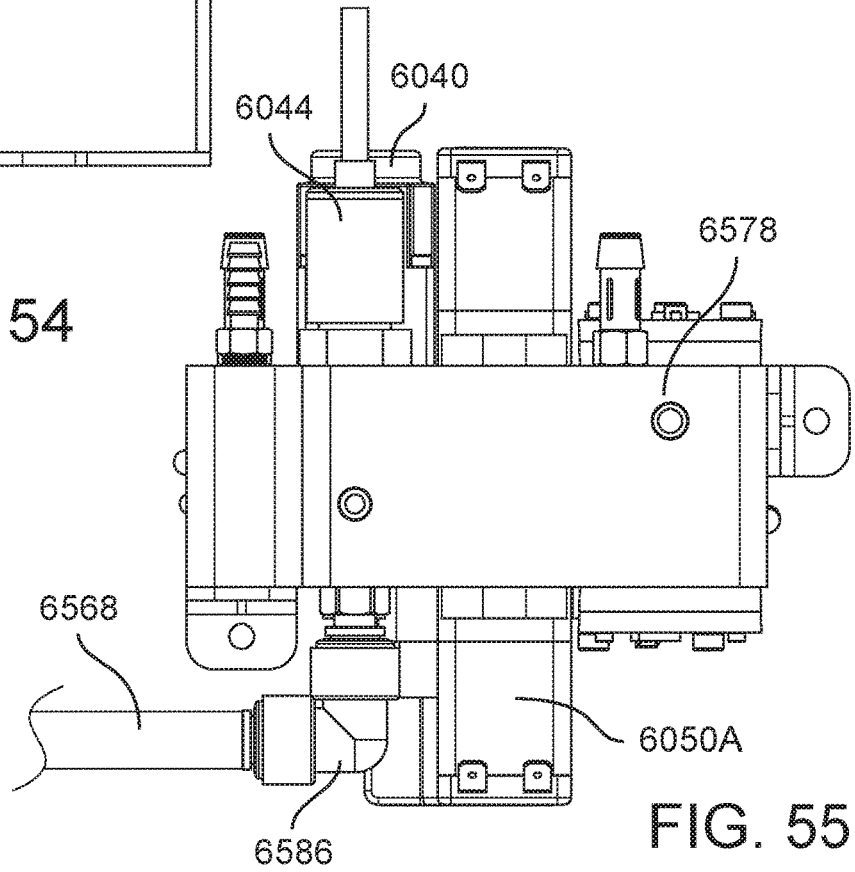
FIG. 55 depicts a side view of an example product heat exchanger manifold.

From the source manifold 6572, the source fluid may flow through the filters 6006A, B and may be sampled through sampling port 6038 depending on the system 6000 mode or state 6000. After filtration, source water may flow to a filtered source fluid connector 6568 included on a product heat exchanger manifold 6578. Referring now also to FIG. 55, the product heat exchanger manifold 6578 may include a pressure regulator 6040 which may control the source water pressure to a predefined value (e.g. 10-30 psig). A post filtration pressure sensor 6044 may also be included in the product heat exchanger manifold 6578. Readings from pressure sensor 6036 (see FIG. 54) and pressure sensor 6044 may be compared by the controller 6034 to determine a pressure drop through the filters 6006A, B. This pressure drop may be compared against a predetermined range of expected values. This may allow the controller 6034 to detect a clogged filter or detect a scenario in which the pressure drop is unexpectedly low or high. From the product heat exchanger manifold 6578, the source fluid may flow to the product heat exchanger 6008A, through a source line 6590. A source proportioning control valve 6050A for source water flow to the product heat exchanger 6006A may also be disposed in the product heat exchanger manifold 6578.

The flow path leading to the blowdown heat exchanger 6008B may extend to an electronics housing 6046A (see, e.g. FIG. 51) of the system 6000 such that the source flow may serve to cool the electronics housing 6046A. Alternatively or additionally, source water en route to the product heat exchanger 6008A may be routed into heat exchange relationship with the electronics of the electronics housing 6046A. In the example depicted in FIGS. 52 and 53, the electronics cooling line 6592 is routed in a path which doubles back upon itself at two locations before connecting to the blowdown heat exchanger manifold 6574. The source fluid may flow from the blowdown heat exchanger manifold 6574 to the blowdown heat exchanger through a source line 6590 based on the operation of a source proportioning control valve 6050B disposed in the blowdown heat exchanger manifold 6574. A source divert valve 6100 may also be included in the blowdown heat exchanger manifold 6574 to allow source water to flow into a mixing reservoir 6092 which, in the example embodiment, is directly attached to the blowdown heat exchanger manifold 6574.

As the source water passes through the heat exchangers 6008A, B, it may be heated by various process streams of the purifier 6010 which are at a high temperature relative to the incoming source water. In turn, the various process streams may be cooled. After source fluid is passed through the heat exchangers 6008A, B, it may be joined into a single stream at a flow joiner 6594 (e.g. Y-fitting, T-Fitting, U-Fitting, or the like) and be plumbed into the sump 6054 of the purifier 6010. The sump 6054 may be a metal cast component in some embodiments.

Figure 56:
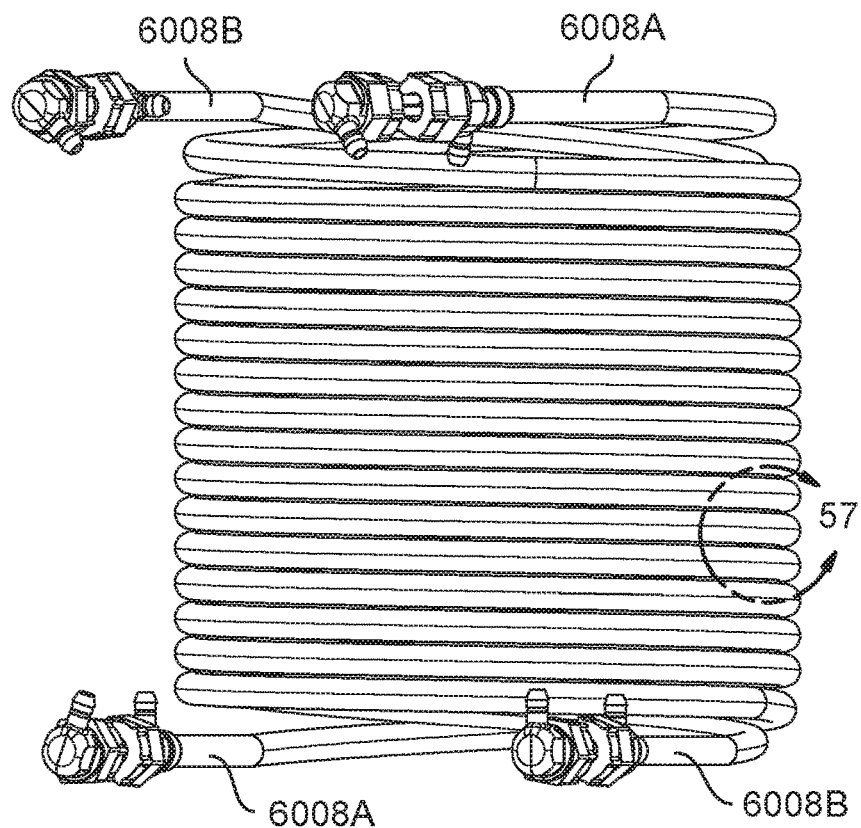
FIG. 56 depicts views of exemplary heat exchangers.

Referring now also to FIG. 56, a view of the exemplary heat exchangers 6008A, B is shown. The heat exchangers 6008A, B may each be arranged as helices of tubing through which the source water and various process streams of the system 6000 may flow. The helices formed by each of the heat exchangers 6008A, B may have substantially constant radii and pitch. At the ends of the heat exchangers 6008A, B the pitch may become greater as shown. The heat exchangers 6008A, B may be arranged in concentric fashion with one of the heat exchangers 6008A, B having a smaller radius and being positioned inside of the other. In the exemplary embodiment depicted in FIG. 56, the blowdown heat exchanger 6008B is positioned inside the product heat exchanger 6008A. Each of the heat exchangers 6008A, B may be disposed around the purifier 6010 to increase compactness of the system 6000. The length of the fluid pathways in the product and blowdown heat exchangers 6008A, B may be substantially equal. In some embodiments, the helices of the heat exchangers may be formed using the exterior surface of the purifier 6010 as a form. In such embodiments, the heat exchangers 6008A, B may touch the sidewalls of the purifier 6010.

Figure 57:
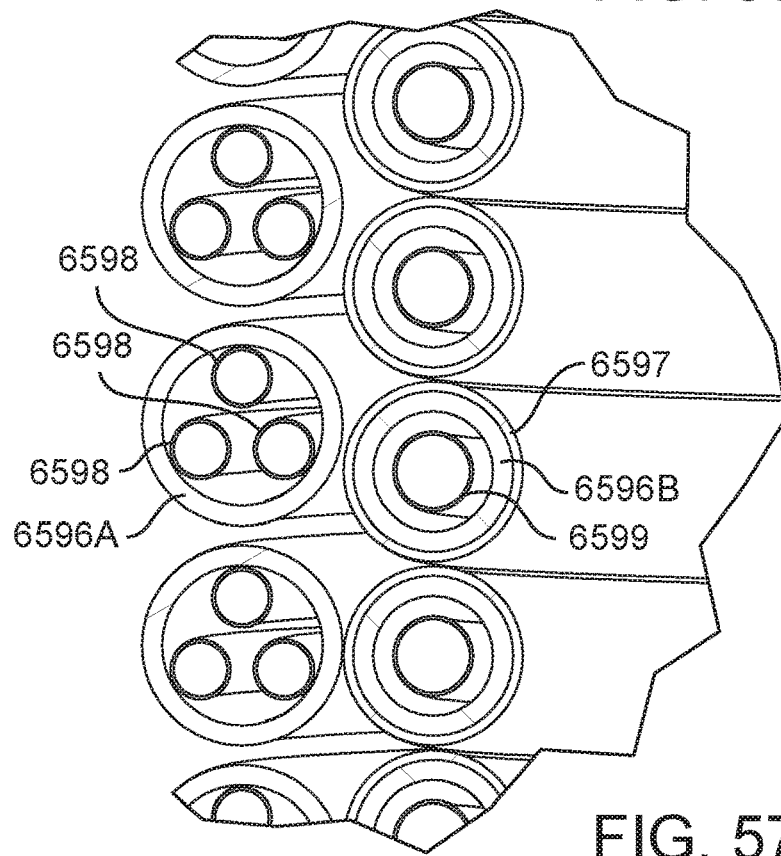
FIG. 57 depicts a cross-sectional view of a portion of the exemplary heat exchangers 6008 in FIG. 56.

A cross-sectional view of a portion of the exemplary heat exchangers 6008A, B is shown in FIG. 57. As shown, each heat exchanger 6008A, B includes a large diameter source flow conduit 6596A, B which forms the exterior surface of the heat exchangers 6008A, B. Within the source flow conduits 6596A, B are conduits in which process streams from the water purifier 6010 are carried. The product water heat exchanger 6008A in the exemplary embodiment includes three product flow conduit 6598 positioned within its source flow conduit 6596A. The example blowdown heat exchanger 6008B includes a single interior flow conduit 6599 within its source flow conduit 6596B. This interior flow conduit 6599 may carry a concentrate or blowdown process stream from the purifier 6010. In some embodiments, additional flow conduits may be included therein. Where the heat exchangers 6008A, B are concentric and nested on inside the other, the innermost heat exchanger may include a layer of insulation 6597. This may help to prevent transfer of heat to/from the purifier 6010. In other embodiments, both heat exchangers 6008A, B may include a layer of insulation 6597.

Figure 65:
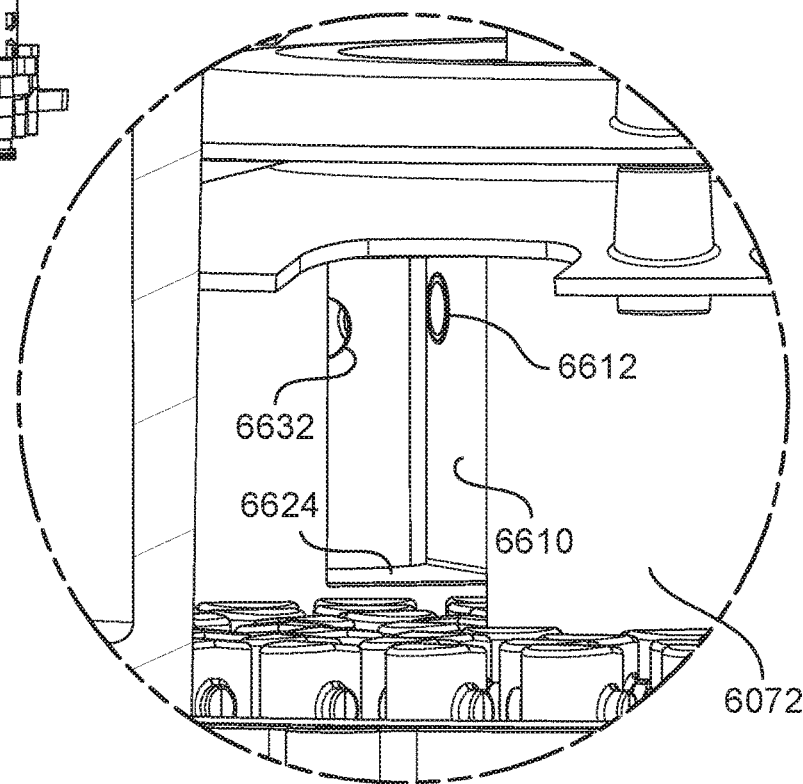
FIG. 65 depicts an enlarged detailed view of the indicated region of FIG. 64.

Referring primarily to FIG. 59, a cross section of an example purifier 6010 taken at line 59-59 of FIG. 58, after source water passes into the sump 6052 the water may begin to fill a number of evaporator tubes 6140 as well as an evaporator reservoir 6015. The evaporator reservoir 6015 may be disposed laterally to the evaporator 6060 and may have a cylindrical shape. In the example embodiment, the evaporator reservoir 6015 is greater in height than the evaporator 6060. The evaporator reservoir 6015 may be in fluid communication with the sump 6052 through evaporator reservoir inlet 6604 extending to the sump 6052. In the example, the evaporator reservoir inlet 6604 is positioned at a first end portion of the evaporator reservoir 6015. The evaporator reservoir inlet 6604 may connect to the sump 6052 at a point where source water may begin to pass into the evaporator reservoir 6015 shortly after it begins being introduced into the sump 6052. This may allow the fluid level in the evaporator reservoir 6015 to be substantially even with the level of fluid in the evaporator 6060. An opposing second end of the evaporator reservoir 6015 may include a vent port which is attached to a venting pathway in fluid communication with the steam chest 6072 via a port 6612 (see, e.g., FIG. 65) of a blowdown reservoir 6014.

The evaporator reservoir 6015 may include a level sensor 6073 which measures a liquid level in the evaporator 6060 based on displacement of a float 6606 within the evaporator reservoir 6015. Displacement of the float 6606 may displace a potentiometer wiper in certain embodiments. In other embodiments, the float 6606 may include one or more magnet whose displacement is tracked by a Hall Effect sensor array. Alternatively, the sensor may be an XM-XT (e.g. XM-700) series sensor available from Gems Sensors Inc. of One Cowles Road, Plainville, Conn. Any other suitable sensor may be used as well.

The evaporator reservoir 6015 may be disposed such that a portion of the interior volume of the evaporator reservoir 6015 is even with any points in a controllable range or an expected range of evaporator 6060 liquid level values at least during a certain state(s) or mode(s) of operation of the purifier 6010 (e.g. a filling state or draining state). The displacement range of the float 6606 may be chosen to accommodate sensing over this range. In some embodiments, the displacement range of the float 6606 may only be a portion of the extent of the evaporator reservoir 6015. For example, the displacement range of the float 6606 may only be about half (40%-60%) of the extent or height of the evaporator reservoir 6015. In the example embodiment, the displacement range is roughly limited to the top half of the evaporator reservoir 6015. In certain embodiments, the displacement range may extend from a top end portion of the evaporator reservoir 6015 at least to a midpoint of the evaporator reservoir 6015, but not be greater than 70% of the extent of the evaporator reservoir 6015. In some embodiments, the controller 6034 may receive a data signal from the level sensor 6073 in the form of a percent of float 6606 displacement along the float's 6606 entire displacement range.

During purified water producing modes or states, steam bubbles may be present in the evaporator tubes 6140 and a significant amount of splashing due to vigorous boiling may typically occur. As a result, there may not be a clear or discernible liquid level in the evaporator 6060 of the purifier 6010. Instead, the liquid level may be non-uniform and highly dynamic. In such states, the evaporator level sensor 6073 may not measure the liquid level in the evaporator 6060. Instead, the evaporator level sensor 6073 may be used to monitor other characteristics which may be useful in controlling operation of the system 6000. For example, data related to the height of a relatively calm water column which may be present in the evaporator reservoir 6015 may be output by the evaporator level sensor 6073. During operation, the evaporator level sensor 6073 may operate similar to a manometer. The height of the water column read by the evaporator level sensor 6073 may vary depending at least in part based on the pressure of vapor present in the evaporator 6060 and steam chest 6072. The height of the water column read by the evaporator level sensor 6073 may also vary depending at least in part based on an average phase change location of fluid in the evaporator tubes 6140. In some embodiments, the water column height output from the evaporator level sensor 6073 may be monitored during production of purified water. In the event that the water column begins to displace from a target location, the controller 6034 of the system 6000 may increase power to at least one of the heater 6054 and compressor 6064 perhaps in proportion to the rate at which the water column is displacing. Alternatively or additionally, the controller 6034 may decrease the amount of source water brought into the purifier 6010 by lowering the duty cycle of any source flow proportioning valves 6050A, B. Again, this duty cycle alteration may be done in proportion to the rate of displacement of the water column level. During production of purified water, the water column may be at 50-60% of the height of the evaporator 6060. In embodiments, where the displacement range of the evaporator level sensor 6073 is limited to the top half of the evaporator reservoir 6015, the controller may target a float 6606 displacement of about 10% from the bottom of its displacement range.

Figure 60:
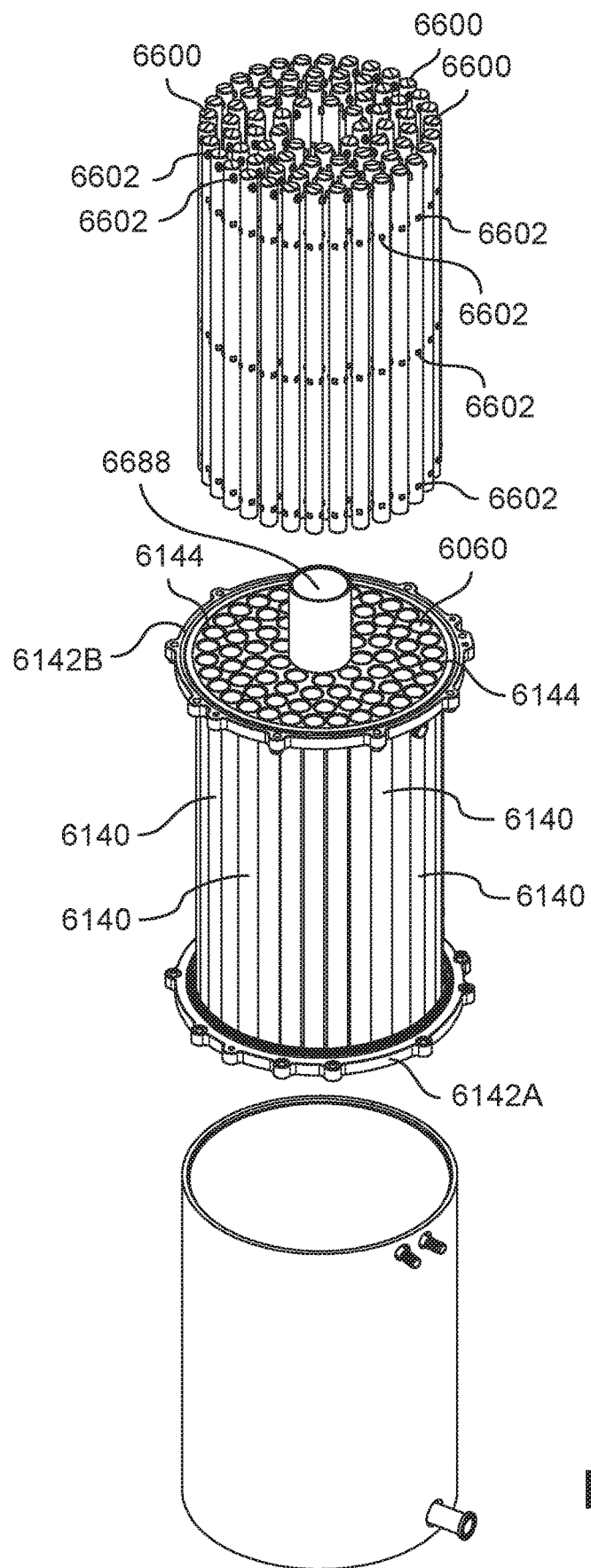
FIG. 60 depicts an exploded view of an example evaporator condenser of a purifier.
Figure 63:
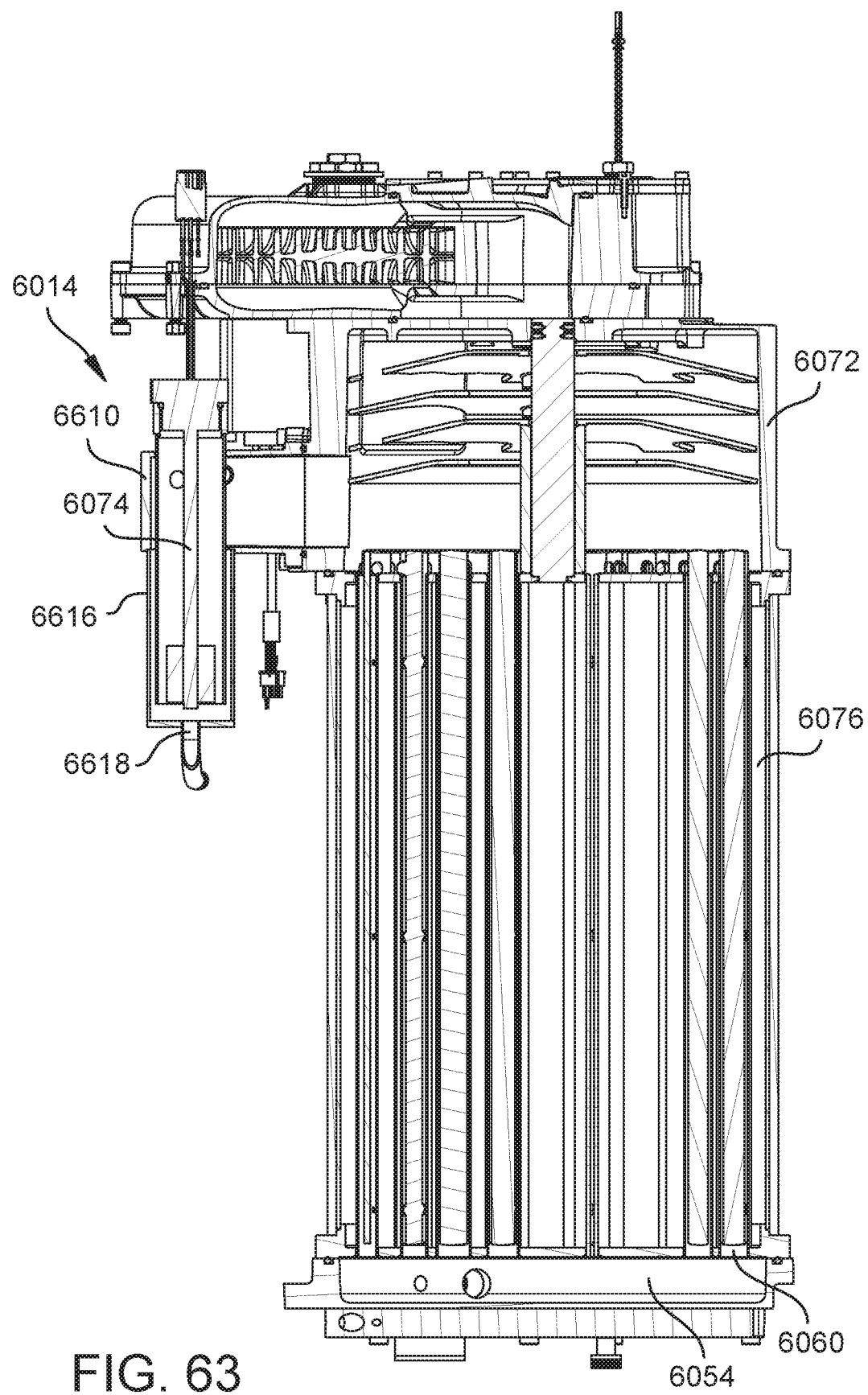
FIG. 63 depicts a cross sectional view extending through a blowdown reservoir and blowdown reservoir level sensor of a purifier taken at the indicated plane of FIG. 58.
Figure 64:
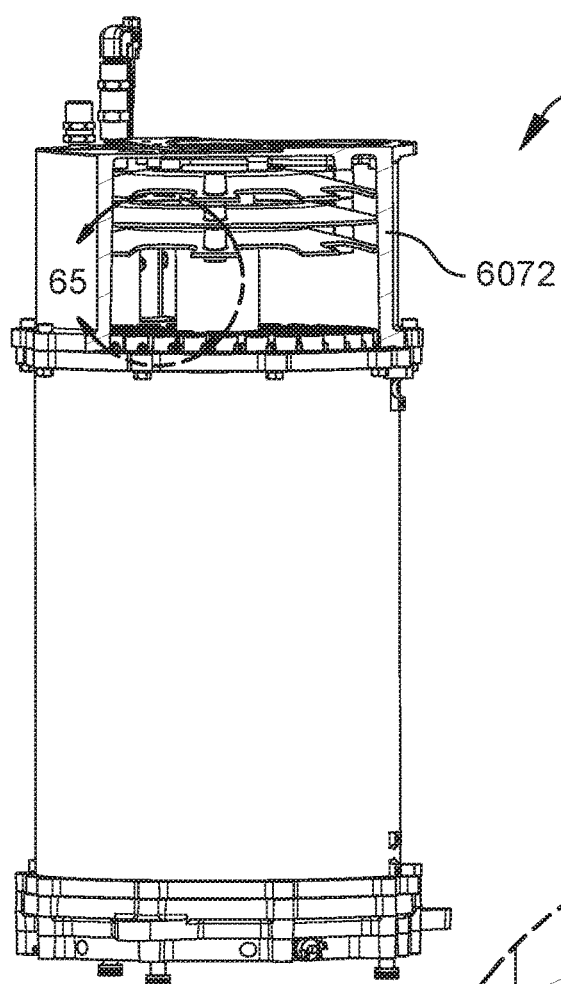
FIG. 64 depicts a view of portions of an example purifier with a portion of a steam chest of the example purifier cut away.

The evaporator tubes 6140 and referring now primarily to FIG. 60 may extend through the condenser 6076 from the sump 6052 volume to the steam chest 6072 volume. A first and second tube sheet 6142A, B may include receiving orifices 6144 for accepting the ends of each of the evaporator tubes 6140. The tube sheets 6142A, B may hold the evaporator tubes 6140 in a generally evenly spaced pattern within the condenser 6076 volume. In the example embodiment, the tube sheets 6142A, B may be constructed from a metal material which is brazed into connection with the evaporator tubes 6140 preventing fluid communication between the evaporator tubes 6140 and the interior volume of the condenser 6076. The second tube sheet 6142B may form the bottom wall of the steam chest 6072. Use of metal tube sheets 6142A, B may help to increase the compactness of the purifier 6010.

In the example embodiment, less than 80 (specifically 76) evaporator tubes 6140 are included. In other embodiments, a greater or lesser number of evaporator tubes 6140 may be included. Each evaporator tube 6140 may have a substantially equal diameter which is between 6-12% (e.g. ~8%) of the diameter of the condenser 6072. In some embodiments, the evaporator tubes 6140 may not all be of equal diameter. The evaporator tubes 6140 may take up between 35 and 65% (e.g. ~49.5%) of the interior volume of the condenser 6076. The material from which the evaporator tubes 6140 are constructed may vary depending on the embodiment; however, a material with a high thermal conductivity may be used. The material used may be any of those described elsewhere herein. In embodiments where the evaporator tubes 6140 are brazed onto the tube sheets 6142A, B, the materials chosen for the evaporator tubes 6140 and tubes sheets 6142A, B may be any suitable material amenable to such a brazing operation. Stainless steel may be used in certain embodiments. In some embodiments, and as shown in FIG. 60, a sleeve 6688 providing part of the pathway from a compressor 6064 (see, e.g., FIG. 3) to the condenser 6076 also be brazed into place on one of the tube sheets 6142A, B.

The evaporator tubes 6140 may include a filler element which fills a proportion of the cross sectional area of each of (or potentially only some) the evaporator tubes 6140. In the example embodiment, the filler element is depicted as a substantially cylindrical rod 6600 which includes a number of nubs or other protuberances 6602 on the exterior of the rod 6600. These nubs 6602 may aid in centering the rods 6600 within the evaporator tubes 6140. This may encourage a thin layer or film of source fluid (a thin annulus in the example) to be present between exterior of the filler element and the interior surface of the evaporator tube 6140 within which the filler element is disposed.

Referring now primarily to FIGS. 61 and 62, a nub 6602 disposed at an end of the rod 6600 may rest on the tube sheet 6142B defining the bottom of the steam chest 6072. This nub 6602 may keep the bottom of the rod 6602 suspend above the bottom surface of the sump 6052. Also shown in FIG. 61, a layer of insulation 6605 may be included in some embodiments. The layer of insulation 6605 may be placed around the condenser 6076. The layer of insulation 6605 may insulate the purifier 6010 from heat exchange with the heat exchangers 6008A, B in embodiments where the heat exchangers 6008A, B are wrapped directly around the exterior of the purifier 6010 when wound into their respective helices. Other embodiments may be similarly insulated.

Referring now primarily to FIGS. 63-66, as heat from heating element 6054 (see, e.g., FIG. 3) and condensing vapor in the condenser 6076 evaporates the source water, a blowdown process stream or concentrate may be generated. The blowdown process stream may fill or be splashed about via vigorous boiling into a portion of the steam chest 6072 volume. As shown, a blowdown or concentrate reservoir 6014 may be attached to the side of the steam chest 6072. In the example embodiment, the long axis of the blowdown reservoir extends alongside, but not through the evaporator 6060. An enclosed sluiceway 6610 may extend from the steam chest 6072 and form a first portion 6624 of an inflow path 6614 to the blowdown reservoir 6014. This sluiceway 6610 may be a cast part. Sluiceway 6610 may be coupled to an enclosure 6616 which defines a portion of the interior volume of the blowdown reservoir 6014. In the example embodiment, the enclosure 6616 is a substantially cylindrical body or can type structure which extends downward from the sluiceway 6610. An outlet port 6618 may be included in the bottom of the blowdown reservoir 6014 such that blowdown fluid may be emptied from the purifier 6010 as governed by a controller 6034 (see, e.g., 100A-B).

Figure 66:
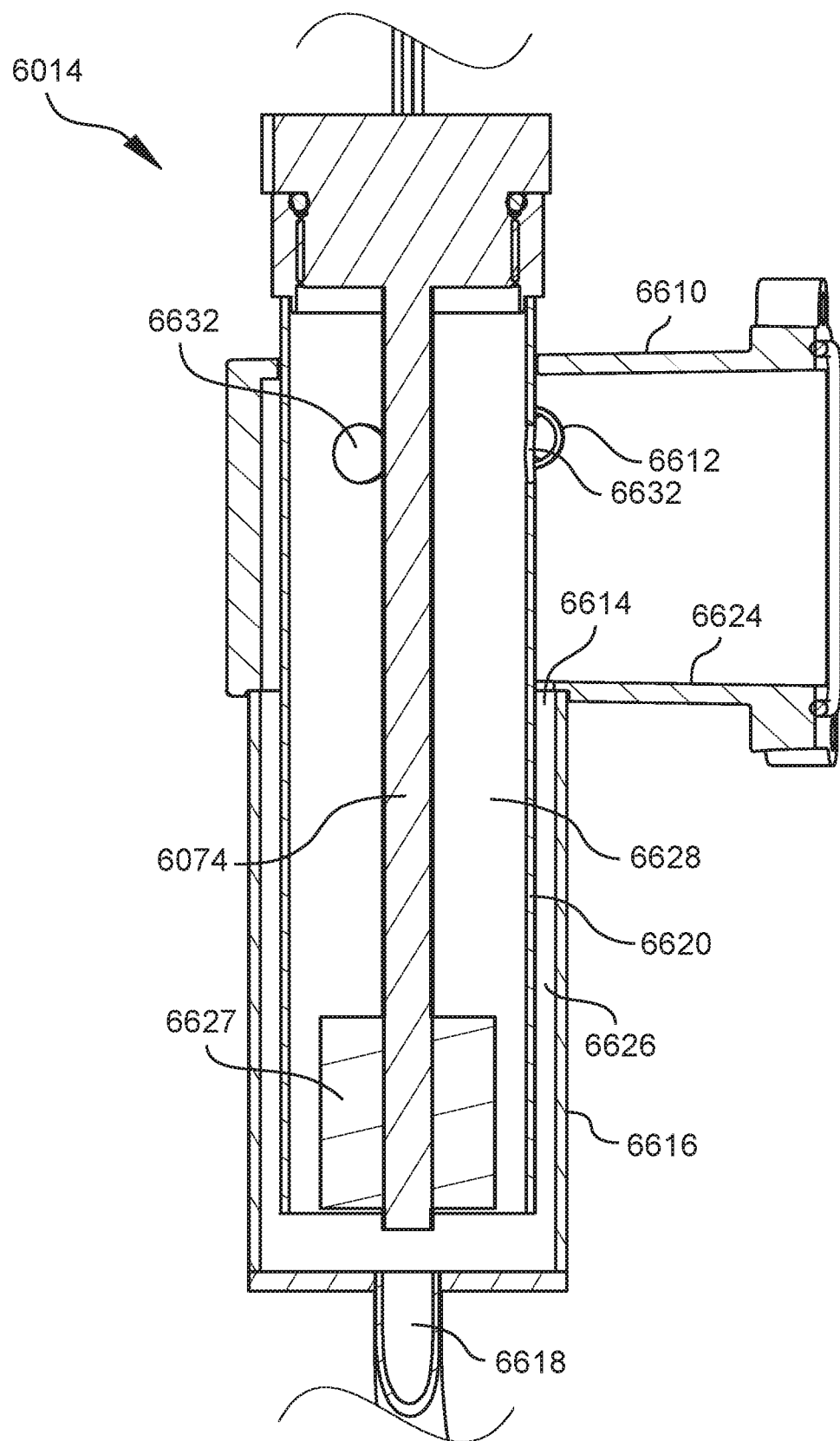
FIG. 66 depicts a cross sectional view of an example blowdown reservoir and blowdown level sensor.

As best shown in FIG. 66, the blowdown reservoir 6014 includes an insert 6620 in the example embodiment. The insert 6620 in the example embodiment is a sleeve which is generally cylindrical. The insert 6620 may be inserted through the top of the enclosed sluiceway 6610 and coupled thereto. The insert 6620 may have a similar cross sectional shape to that of the enclosure 6616, but be smaller in size so as to allow the insert 6620 to be nested inside the enclosure 6616. When assembled, there may be a gap between the interior wall of the enclosure 6616 and the exterior of the insert 6620. The insert 620 may also be disposed substantially concentrically with an axis of the enclosure 6616. In the example shown, the insert 6620 is a tube. The gap may form a second portion 6626 of the inflow path 6614 to the blowdown reservoir 6014. Thus the wall of the insert 6620 may act as an obstruction which shelters a portion 6628 of the blowdown reservoir 6014 and provides a barrier against effects of splashing and other violent liquid motion in the steam chest 6072. The insert 6620 may include an opening 6630 to allow for flow of liquid from the inflow path 6614 to the sheltered portion 6628. In the example, the bottom of the tube shaped insert 6620 is open, however, in other embodiments, the insert 6620 may include fenestrations, a mesh section, or grated section instead. A level sensor 6074, such as any of those described elsewhere herein may be placed in the sheltered portion 6628 of the blowdown reservoir 6014. This may allow the level sensor 6074 to sense a level of blowdown present in the steam chest 6072 which is substantially unadulterated by momentary disturbances introduced from violent or energetic boiling. In some embodiments, the controller 6034 may receive a data signal from the level sensor 6074 in the form of a percent of float displacement along its entire displacement range. In some examples, a one percent displacement may be equivalent to a change in volume of 1-2 ml (e.g. 1.86 ml) within the blowdown reservoir 6014.

The insert 6620 includes various vent ports 6632 which may allow for gas to be displaced as the liquid level in the blowdown reservoir 6014 changes or as evaporation occurs. The vent ports 6632 may be located near or above the expected liquid level range during certain states of operation of the purifier 6010. For example, the vent ports 6632 may be above the expected range of liquid levels during production of purified water. These vent ports 6632 may allow for gas to be displaced in or out of the sheltered portion 6628 as the float 6627 of the sensor 6074 displaces. A port 6612 may also be included in the wall of the enclosed sluiceway 6610 and allow for connection to the evaporator reservoir 6015 via a venting conduit. This may allow for gas to be displaced in and out of the evaporator reservoir 6015 as needed.

Figure 67:
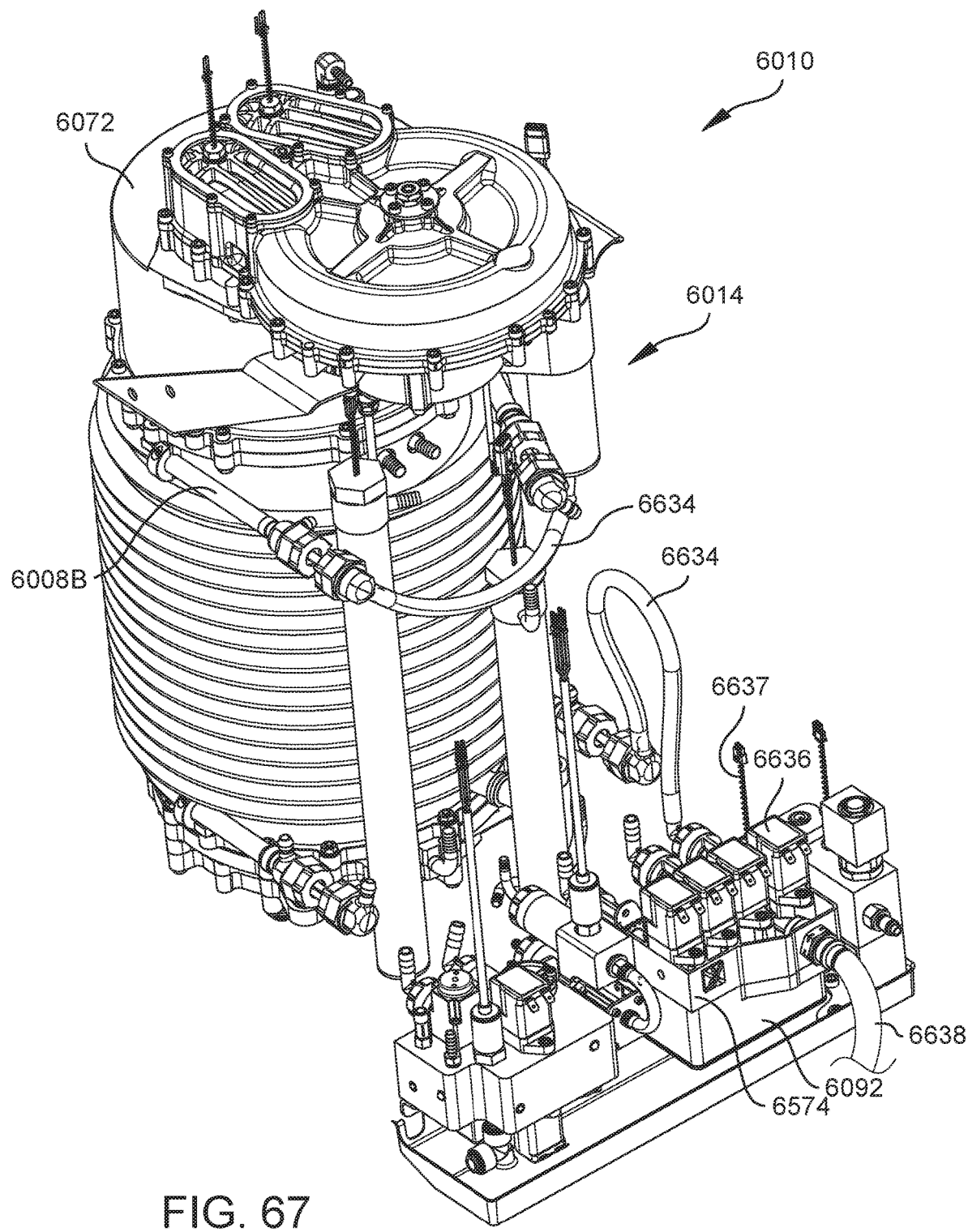
FIG. 67 depicts a perspective view of portions of an example purifier including a number of blowdown flow paths.

Referring now to FIG. 67, a perspective view of the purifier 6010 is shown. Only blowdown flow conduits 6634 are shown in FIG. 67 for sake of clarity. As shown, the blowdown reservoir 6014 may be attached to a blowdown flow conduit 6634 which serves as an outlet to the blowdown reservoir 6014. The outlet may establish a flow path from the blowdown reservoir 6014 to the blowdown heat exchanger 6008B. A blowdown reservoir valve 6636 may also be included to control the purging of the blowdown process stream from the purifier 6010. In the example embodiment, the blowdown reservoir valve 6636 is included in the blowdown heat exchanger manifold 6574. The blowdown reservoir valve 6636 may be operated by a controller 6034 (see, e.g., FIG. 3) to maintain a flow of concentrate out of the purifier 6010. Data from the blowdown level sensor 6074 may be used to inform actuation of the blowdown reservoir valve 6636. As the rate of blowdown accumulation may be monitored via the blowdown level sensor 6074, the level of concentrate within the system 6000 may be controlled via alteration of the duty cycle of the blowdown reservoir valve 6636. As blowdown exits the blowdown heat exchanger 6008B, the blowdown may flow into a mixing reservoir 6092 coupled to the blowdown heat exchanger manifold 6574. A drain line 6638 may be attached to the mixing reservoir 6092 to allow waste streams to be purged out of the system 6000.

Figure 68:
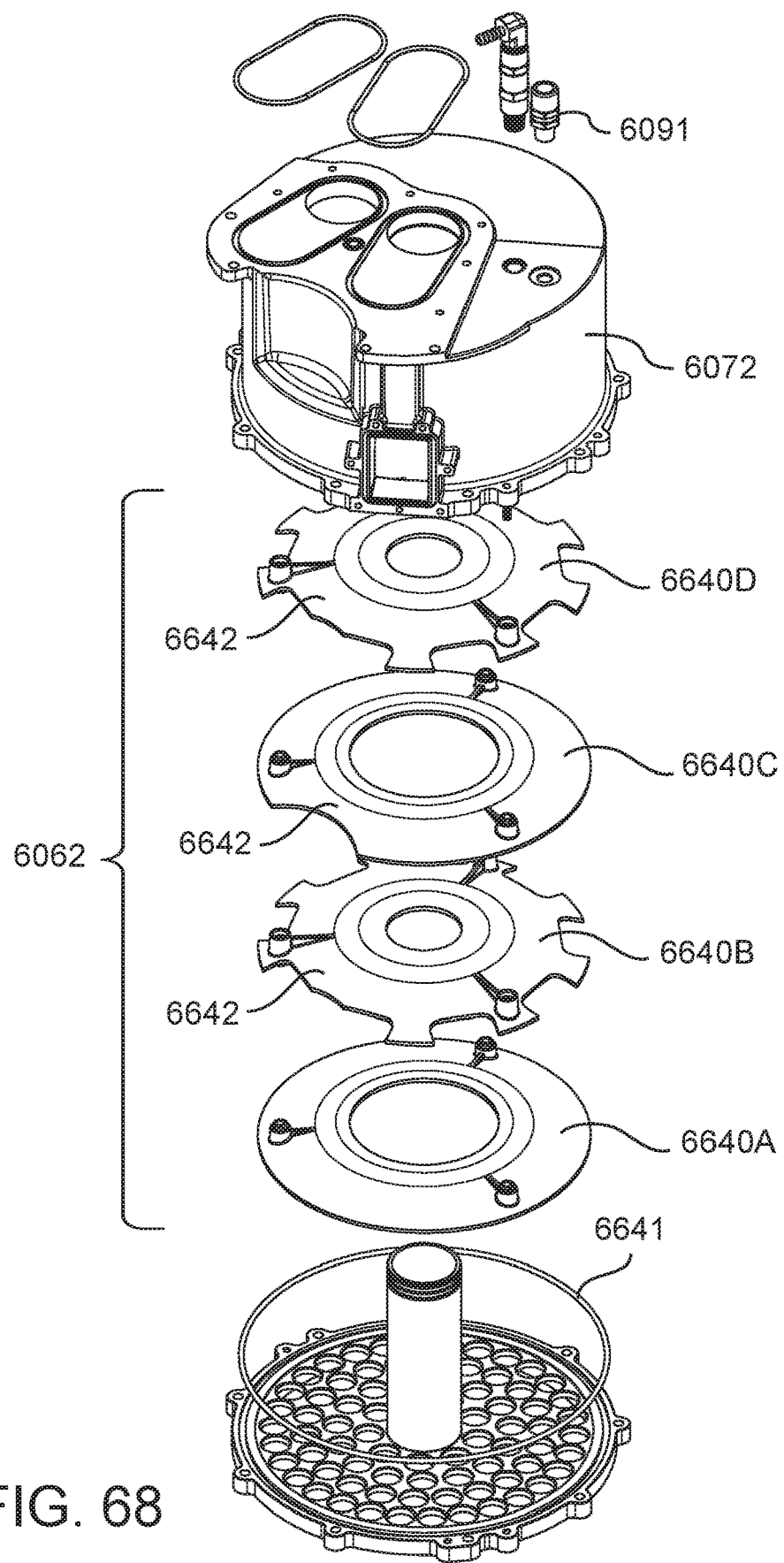
FIG. 68 depicts an exploded view of an example steam chest.
Figure 69:
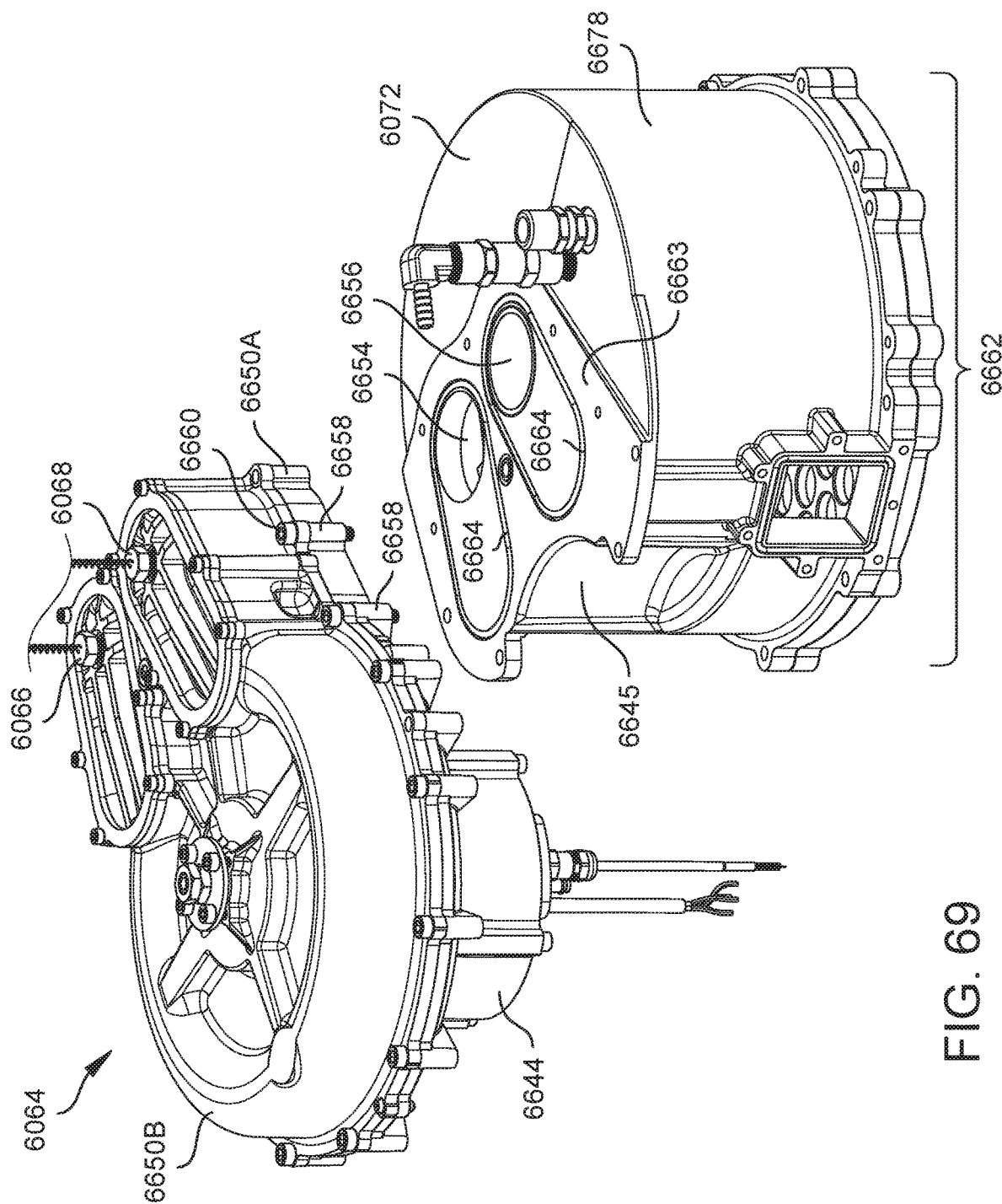
FIG. 69 depicts an example steam chest and compressor, the compressor being exploded away from steam chest.
Figure 70:
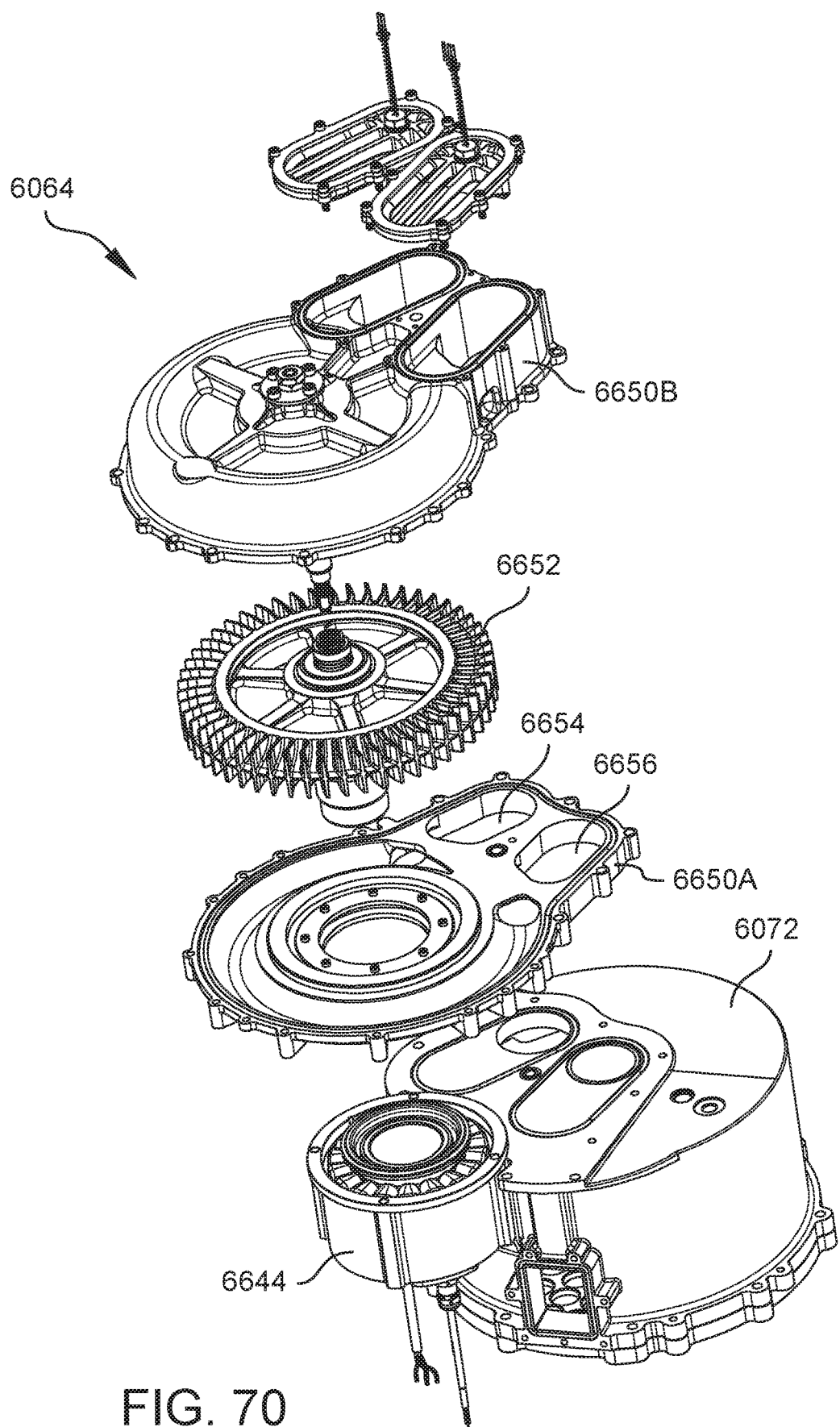
FIG. 70 depicts an example compressor and steam chest, the compressor being exploded apart.
Figure 71:
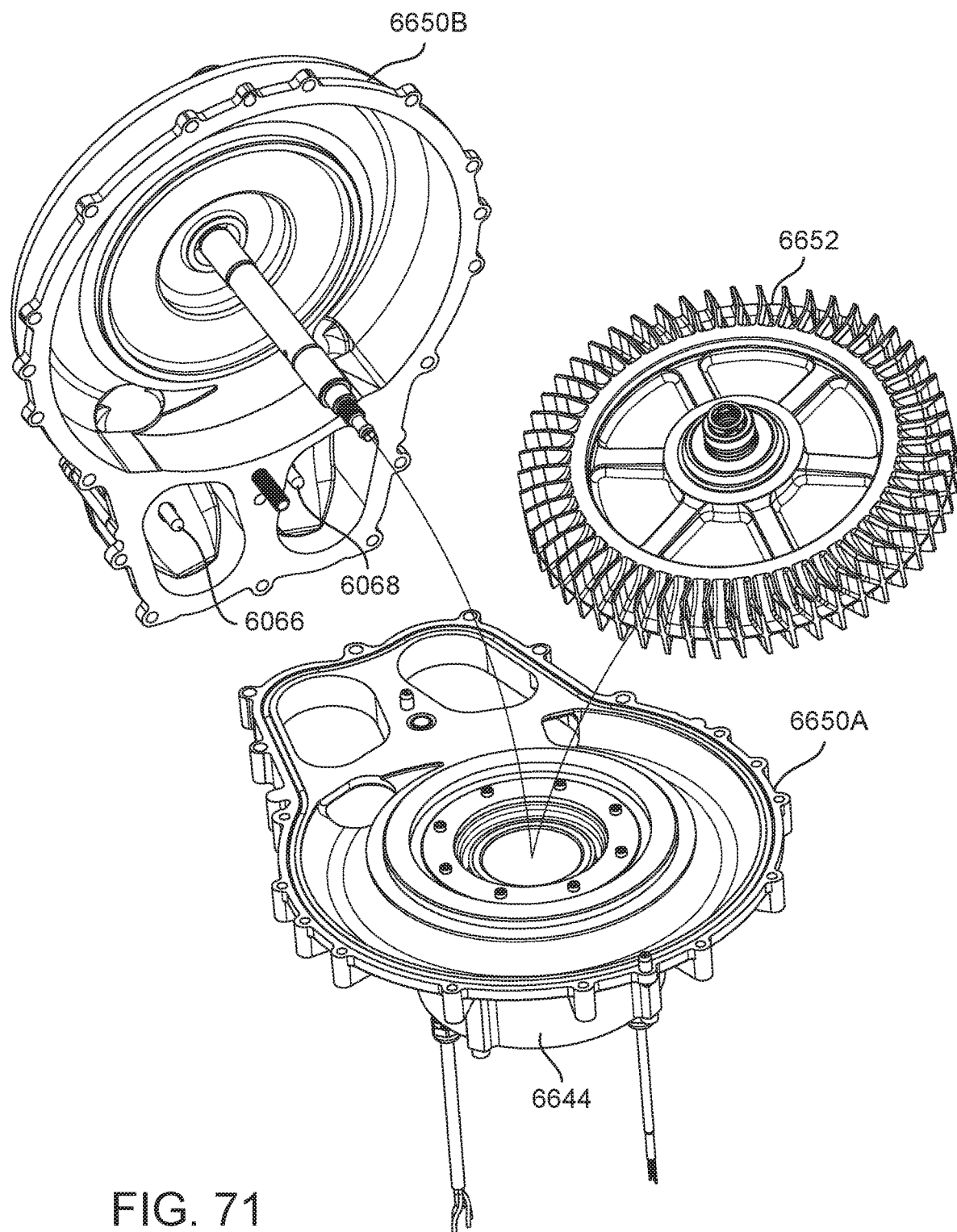
FIG. 71 depicts an exploded view of an example compressor.

Referring now also to FIG. 68, an exploded view of an exemplary steam chest 6072 is shown. A gasket 6641 may be included to help establish a fluid tight seal between the steam chest and the tube sheet 6142 B forming a bottom of the steam chest 6072 volume. The steam chest 6072 may include a mist eliminator assembly 6062. In the example shown in FIG. 68, the mist eliminator assembly 6062 includes four strata 6640A-D which redirect the flow of vapor as it proceeds toward the compressor 6064 similarly to as described in relation to FIG. 18. An over-pressure relief valve 6091 is included in the top of the steam chest 6072 in the example embodiment and may open in the event pressure in the purifier 6010 rises above a predefined threshold.

Referring now primarily to FIG. 69-74, after passing through the mist eliminator assembly 6062, vapor may be compressed by a compressor 6064. The compressor 6064 may be an impeller type compressor 6064, though other compressor varieties may be used in alternative embodiments. The compressor 6064 in the example embodiment is mounted in an off-center location with respect to the longitudinal axis of the steam chest 6072. The steam chest 6072 includes a receiving well 6646 for the compressor 6064 motor 6644. The receiving well 6646 may be recessed into the side wall 6648 of the steam chest 6072. The example receiving well 6646 protrudes into the interior volume of the steam chest 6072. One or more of the various strata 6640A-D of the mist eliminator assembly 6062 may include well accommodating voids 6642 (see, e.g., FIG. 68) which accept the receiving well 6646. The motor 6214 may, for example, be or be similar to any of those described elsewhere herein.

The motor 6214 may drive an impeller 6652 which is mounted within a compressor housing 6650A, B. The compressor housing 6650A, B may be a cast part in certain embodiments. The impeller 6652 may be any design described herein including a single stage design (shown) or a multistage design. Vapor may enter the compressor housing 6650A, B through an inlet 6654, be compressed by the rotating impeller 6652, and exit the compressor 6064 through an outlet 6656 at an increased pressure and temperature. The temperature of vapor entering the compressor 6064 at the inlet 6654 may be sensed by an inlet temperature sensor 6066. Likewise, the temperature of compressed vapor exiting the compressor 6064 through the outlet 6656 may be sensed by an outlet temperature sensor 6068.

In some embodiments, the bearing for the motor 6644 may be applied via a coating process (e.g. plasma coating). The coating may be applied over an undercut region. This coating may also be applied to the end races. The coating may for example be a chromium oxide coating.

The compressor 6064 may also include a number of mounting points 6658. These mount points 6658 may accommodate fasteners 6660 which extends though the mounting points 6658. The fasteners 6660 may couple the compressor 6064 to at least one bracket 6662 which extends from another portion of the purifier 6010 and aids in supporting the weight of the compressor 6064. Two brackets 6662 are included in the example embodiment. The fasteners 6660 may also couple the compressor 6064 to a surface 6663 of the steam chest 6072.

Referring now primarily to FIG. 74, one or more gasket 6664 may be compressed between this surface 6663 of the steam chest 6072 and the compressor housing 6650A to establish a fluid tight seal between the components. The one or more gasket 6664 may also allow for an exterior surface of the steam chest 6074 to provide part of the inlet 6654 and/or outlet 6656 flow paths to and from the compressor 6064. In the example embodiment shown in FIG. 74, the bottom of the inlet 6654 and outlet 6656 flow paths to the compressor 6064 are formed by the top exterior surface 6663 of the steam chest 6072.

Referring now also to FIGS. 75-77, cross-sectional views of the inlet 6654 and outlet 6656 to the compressor 6064 taken at the indicated lines in FIG. 75 are depicted. The inlet 6654 (FIG. 76) may be formed from flow channels provided in the first and second compressor housing portion 6650A, B, a cover member 6666, and the top exterior surface 6663 of the steam chest 6072 as mentioned above. Similarly to as described in relation to FIG. 30, the incoming low pressure vapor flow may be split (e.g. bifurcated as shown) into a plurality of flow paths by a dividing body 6674. The cover member 6666 may be attached to the second compressor housing portion 6650B. The cover member 6666 may seal the inlet 6654 from the external environment and may be coupled to the second compressor housing portion 6650B via fasteners or any other suitable coupling. A gasket member 6670 may be included to help aid in establishing a suitable seal. The cover member 6660 may be shaped as a curved ramp as shown in the cross section in FIG. 76. This shape may help to gently redirect vapor exiting the steam chest 6072 into the compression duct 6672 of the compressor 6064 and may help limit the amount of turbulence in the flow entering the compressor 6064 from the steam chest 6072. A port 6680 may be included in the cover member 6660 to allow for introduction of a temperature sensor 6066 into the low pressure vapor inlet 6654 flow path.

The outlet 6656 (FIG. 77) may be formed via flow channels in the first and second compressor housing portions 6650A, B, a second cover member 6676 and the top exterior surface 6663 of the steam chest 6072 as mentioned above. Similarly to as described in relation to FIG. 31, the ejected high pressure vapor flow may be combined as it passes a dividing body 6684 from a plurality of flow paths into a single flow path.

The second cover member 6676 may be attached via fasteners or another suitable coupling to the second compressor housing portion 6650B. The second cover member 6676 may form a seal between the interior of the outlet 6656 and the external environment. A gasket member 6678 may be included to aid in establishing a suitable seal. The second cover member 6676 may be shaped as a curved ramp similarly to cover member 6660. This shape may help to gently redirect vapor exiting the compression duct 6672 into a condenser inlet 6686 (see, e.g., FIG. 78) and may help limit turbulence. The cover member 6676 may include a port 6682. The port 6682 may allow for installation of an outlet vapor temperature sensor 6068.

While the compressor 6064 may be mounted in an off-center position with respect to the purifier 6010, the compressed high temperature vapor may exit the compressor 6064 substantially in line with the axis of the purifier 6010. After exiting the compressor 6064, the compressed vapor may follow a substantially straight line path into the condenser 6076. To facilitate this, the condenser inlet 6686 extending from the compressor outlet 6656 may have a center point which is substantially in line with the axis of the purifier 6010. Such a straight line flow path into the condenser 6076 may help to minimize flow losses in the fluid exiting the compressor 6064.

Figure 78:
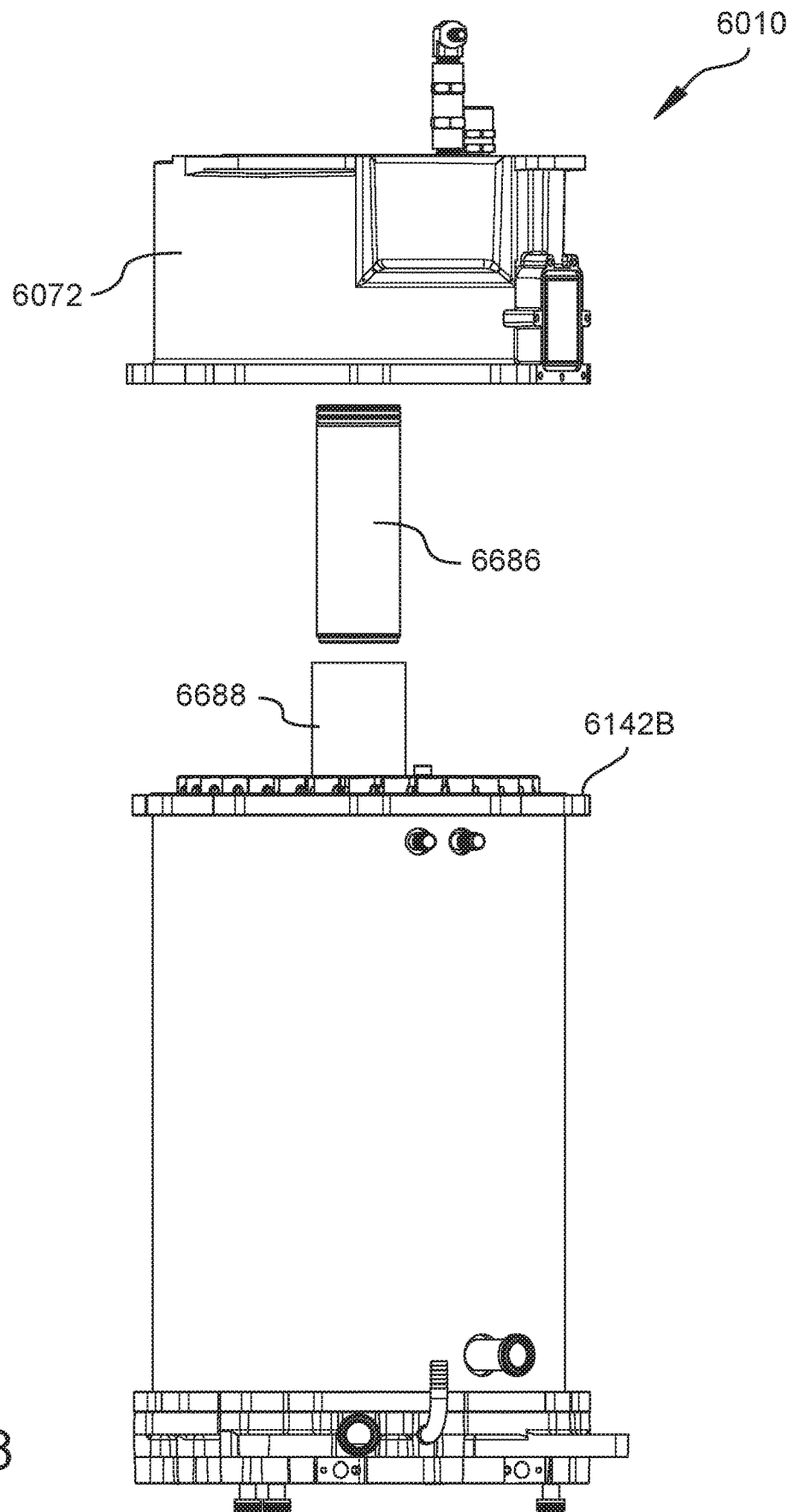
FIG. 78 depicts an exploded view of an example evaporator condenser and steam chest, the steam chest being exploded away from the evaporator condenser.

Referring now to FIG. 78, an exploded view of various components of a purifier 6010 is shown. As shown, the condenser inlet 6686 may extend through the wall of the steam chest 6072. The condenser inlet 6686 may include a sleeve 6688 which projection from the tube sheet 6142B. The sleeve 6688 may be brazed, welded, integrally formed with, or otherwise coupled to the tube sheet 6142B. To aid in creating a seal at the interface of the sleeve 6688 and other portion of the condenser inlet 6686, a gasket member or members may be included. This seal may inhibit any flow of concentrated blowdown from the steam chest 6072, into the condenser inlet 6686 or condenser 6076. When assembled, high pressure compressed vapor from the compressor 6064 may pass through the condenser inlet 6686 to the condenser 6076 along a straight line path.

Figure 79:
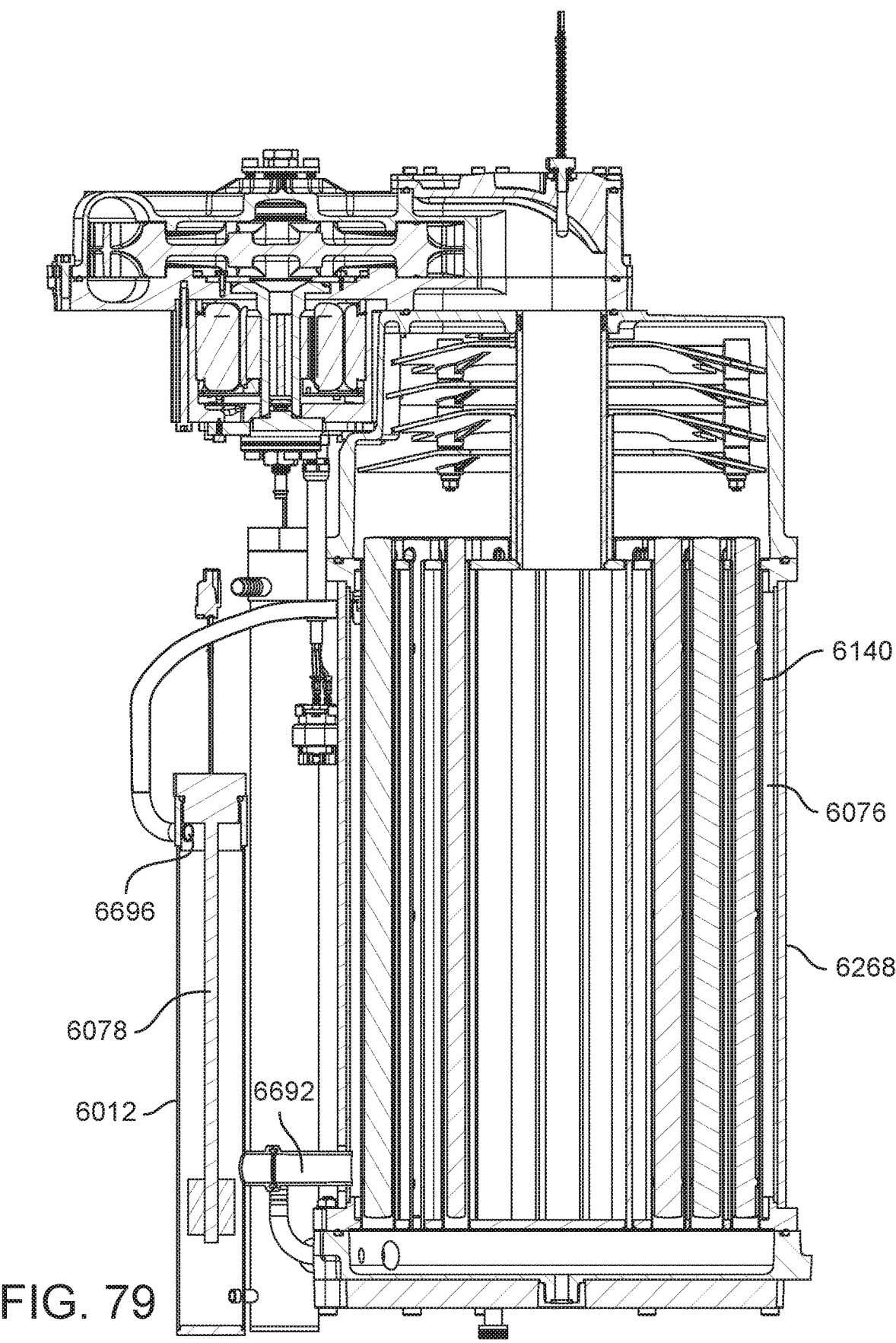
FIG. 79 depicts a cross sectional view of an example purifier, the cross sectional view extending through a midplane of a product reservoir and product reservoir level sensor of the example purifier.

Referring now primarily to FIG. 79, as the high pressure and temperature vapor entering the condenser 6076 begins to condense, a product process stream may begin to collect at the bottom of the condenser 6076. Additionally, the latent heat of condensation may be transferred to the evaporator tubes 6140 aiding in the evaporation of new incoming source water. A product reservoir 6012 may be included and may be attached to the evaporator-condenser housing 6268. The product reservoir 6012 may be attached to the evaporator-condenser housing 6268 via a product reservoir inlet 6692. The product reservoir inlet 6692 may be disposed adjacent a product accumulation surface such that the product process stream 6690 may begin to fill the product reservoir 6012 shortly after or as the product water begins to collect in the condenser 6076. In the example, the product accumulation surface is the first tube sheet 6142A.

As shown, a product level sensor 6078 may be included within the product reservoir 6012. The product level sensor 6078 may be any suitable sensor described herein. The product reservoir 6012 is disposed such that the product level sensor 6078 may directly sense a liquid level not only within the product reservoir 6012 but also within the condenser 6076. Thus, the condenser 6076 may double as a product stream reservoir whose volume may be monitored via the product level sensor 6078. As such, the product reservoir 6012 may be described as an auxiliary product reservoir. In certain embodiments, the product level sensor 6078 may measure a volume of product in the condenser 6076 up to 4 L. In some embodiments, the controller 6034 may receive a data signal from the level sensor 6078 in the form of a percent of float displacement along its entire displacement range. In some examples, a one percent displacement may be equivalent to a change of volume in the evaporator and evaporator reservoir of 40-50 ml (e.g. 43 ml).

The product reservoir 6012 may include a product outlet 6694 (best shown in FIG. 82) from which the product process stream may exit the product reservoir 6012. This outlet 6694 may be connected to a product flow conduit leading to the product heat exchanger 6008A as described elsewhere herein. The example outlet 6694 is adjacent the bottom interior surface 6316 of the product reservoir 6012. The product reservoir 6012 may also include a venting port 6696. The venting port 6696 may allow for gases to be displaced out of the product reservoir 6012 as condensed liquid within the condenser 6076 begins to fill the product reservoir 6012. In the example embodiment, the vent port 6696 is plumbed back into the condenser 6076.

Figure 80:
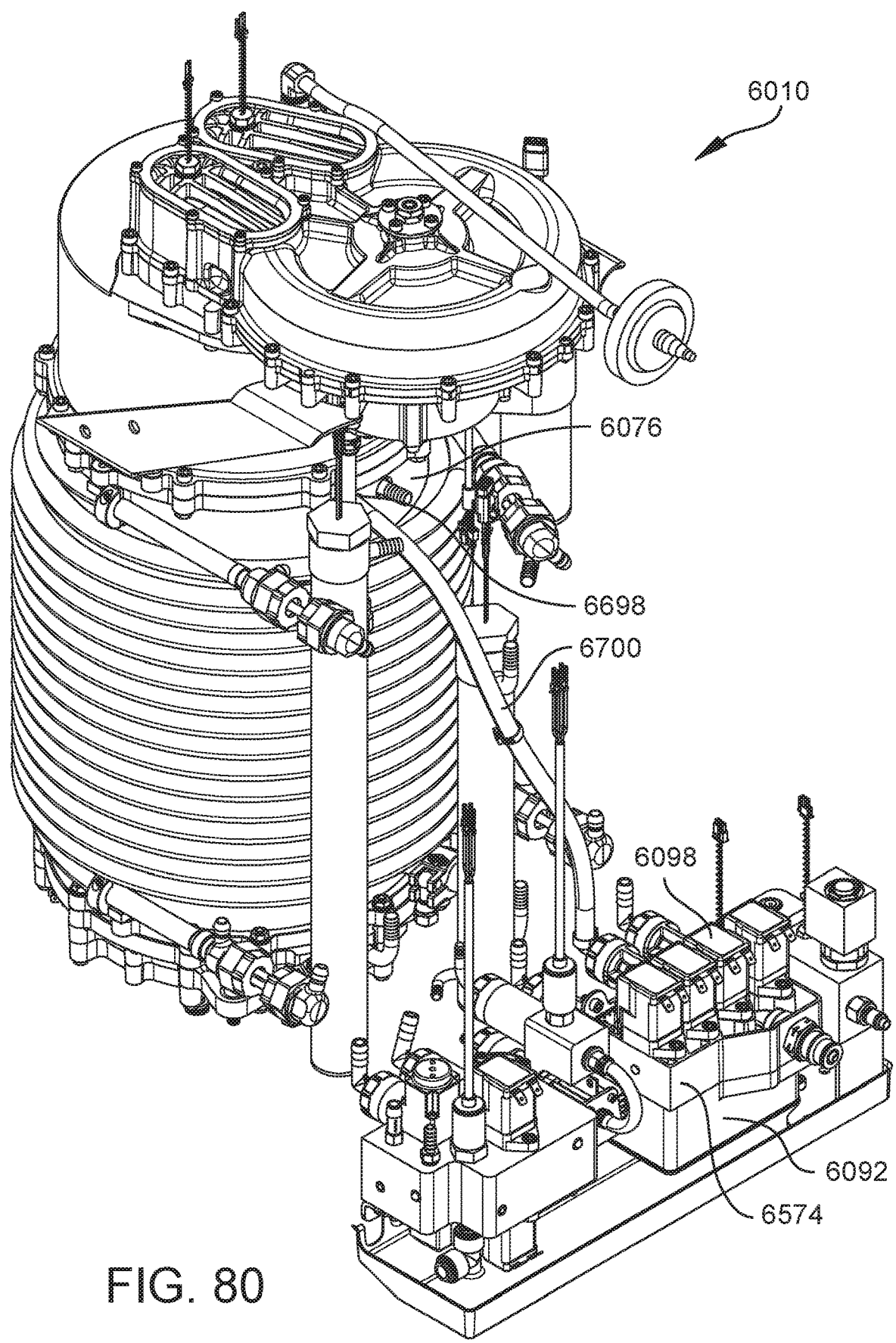
FIG. 80 depicts a perspective view of portions of an example purifier including a number of venting flow paths.

Referring now to FIG. 80, a perspective view of a system 6000 is shown. Fluid lines other than the vent flow paths 6700 have been hidden in FIG. 80 for sake of clarity. As shown, a condenser vent 6698 may be included in the condenser 6076 to relieve excess pressure, volatiles, and non-condensable gasses from the condenser 6076 as needed. Venting gases from the condenser 6076 may travel along vent flow paths 6700 to a venting valve 6098. The venting valve 6098 may be included on the blowdown heat exchanger manifold 6574. In some embodiments, the duty cycle of the venting valve 6098 may be determined based on the low pressure steam temperature as indicated by data from a compressor inlet temperature sensor 6066 (see, e.g., FIG. 76). A current low pressure steam temperature may be compared to a target low pressure steam temperature. The target may be at or around 112° C. A P, PI, or PID controller may be fed the difference between these two values and provide a duty cycle command as an output. This output may be limited to a mode or state specific minimum duty cycle and a mode or state specific maximum duty cycle (e.g. 100%). Alternatively, the venting valve 6098 may be operated on a fixed duty cycle (e.g. a duty cycle less than 15 or 20%). The venting valve 6098 duty cycle may be a preset parameter for various states or modes of the system 6000. During a water production state, the duty cycle may be set or have a mode or state specific minimum of 8-12% (e.g. 10%). When in a high temperature production state, the duty cycle may be lower. For example, the duty cycle of the venting valve 6098 may be set at or have a mode or state specific minimum of 3-7% (e.g. 5%). In the event that the venting valve 6098 duty cycle remains at or above predetermined threshold (e.g. 100%) for more than a certain period of time (e.g. a number of minutes, such as five minutes), an error may be generated by the controller 6034.

To cool hot gases vented from the condenser 6076, the blowdown heat exchanger manifold 6574 may direct gas to a mixing reservoir 6092 after passing through the venting valve 6098. The mixing reservoir 6092 may be any of those described herein, but in the example embodiment is directly attached to the blowdown heat exchanger manifold 6574. The mixing reservoir 6092 may have a tray like shape as shown. Alternatively, any other suitable shape could be used.

Figure 81:
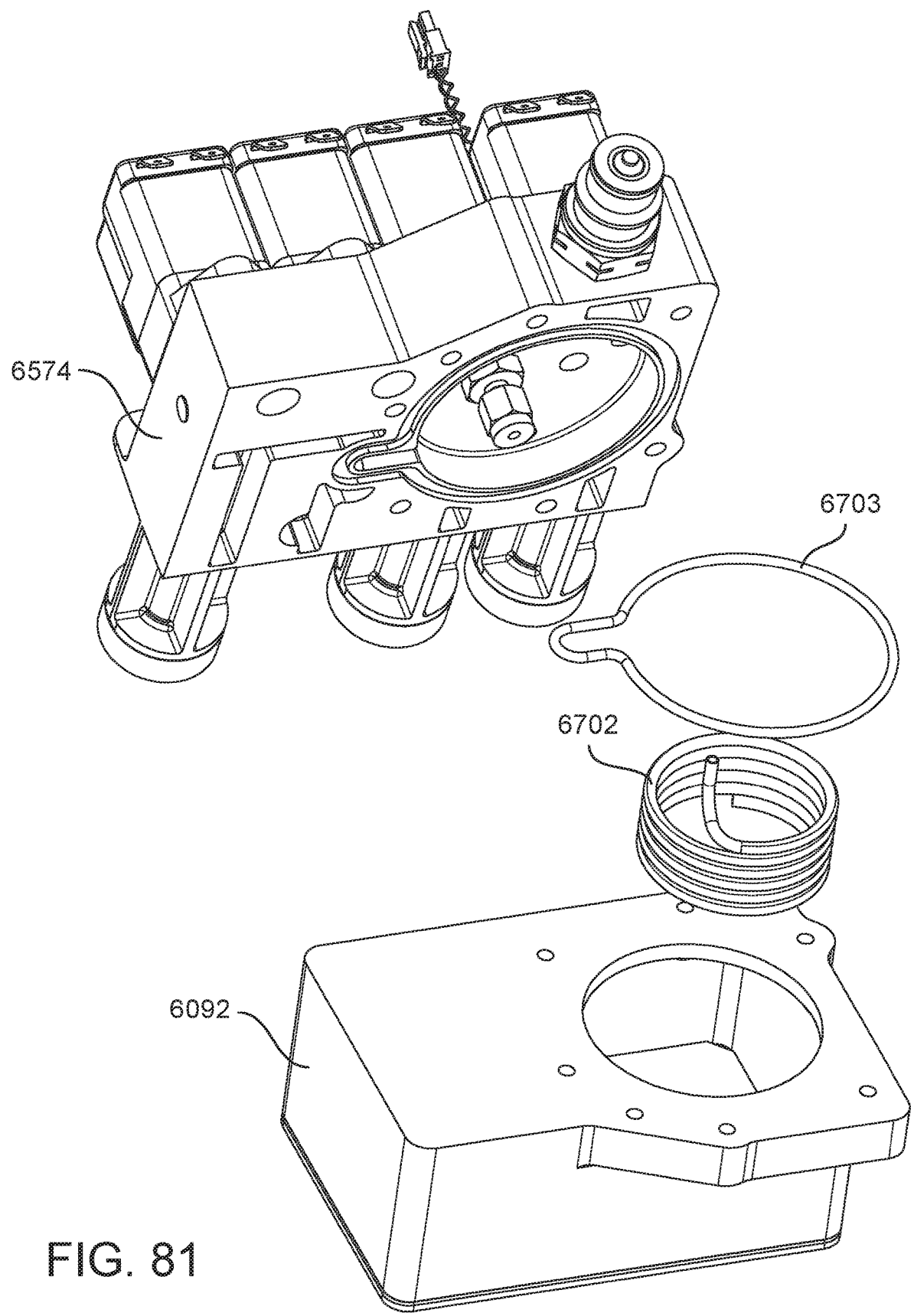
FIG. 81 depicts an exploded view of an example mixing reservoir and blowdown heat exchanger manifold.

Referring now also to FIG. 81, which shows an exploded view of the blowdown heat exchanger manifold 6574 and mixing reservoir 6092 assembly, a venting heat exchanger 6702 may be included. The venting heat exchanger 6702 may be disposed in the interior volume of the mixing reservoir 6092 when fully assembled. In the example embodiment, the venting heat exchanger 6702 is a helical coil which defines a flow path for gases vented from the condenser 6076. In some embodiments the venting heat exchanger 6702 may include a plate type heat exchanger. In such embodiments, a wall (e.g. bottom wall) of the mixing reservoir 6092 may be formed at least partially from the venting heat exchanger 6702. During operation, the mixing reservoir 6092 may contain a volume of liquid sufficient to at least partially submerge the venting heat exchanger 6702. As venting gases pass through the venting heat exchanger 6702 they may enter a heat exchange relation with the submerging liquid. This may help to cool down or condense in flowing gases before the vented process stream proceeds out of the venting heat exchanger 6702 into the main interior volume of the mixing reservoir 6092. The venting heat exchanger 6702 may be constructed from a material having a high thermal conductivity to facilitate this heat transfer.

The blowdown manifold 6574 may be attached to the mixing can 6092 in any suitable manner. In the example embodiment, the blowdown manifold 6574 is attached to the mixing can 6092 via fasteners (not shown). A gasket 6703 may be sandwiched between the mixing can 6092 and blowdown manifold 6574 when assembled to help establish a fluid tight seal.

Figure 82:
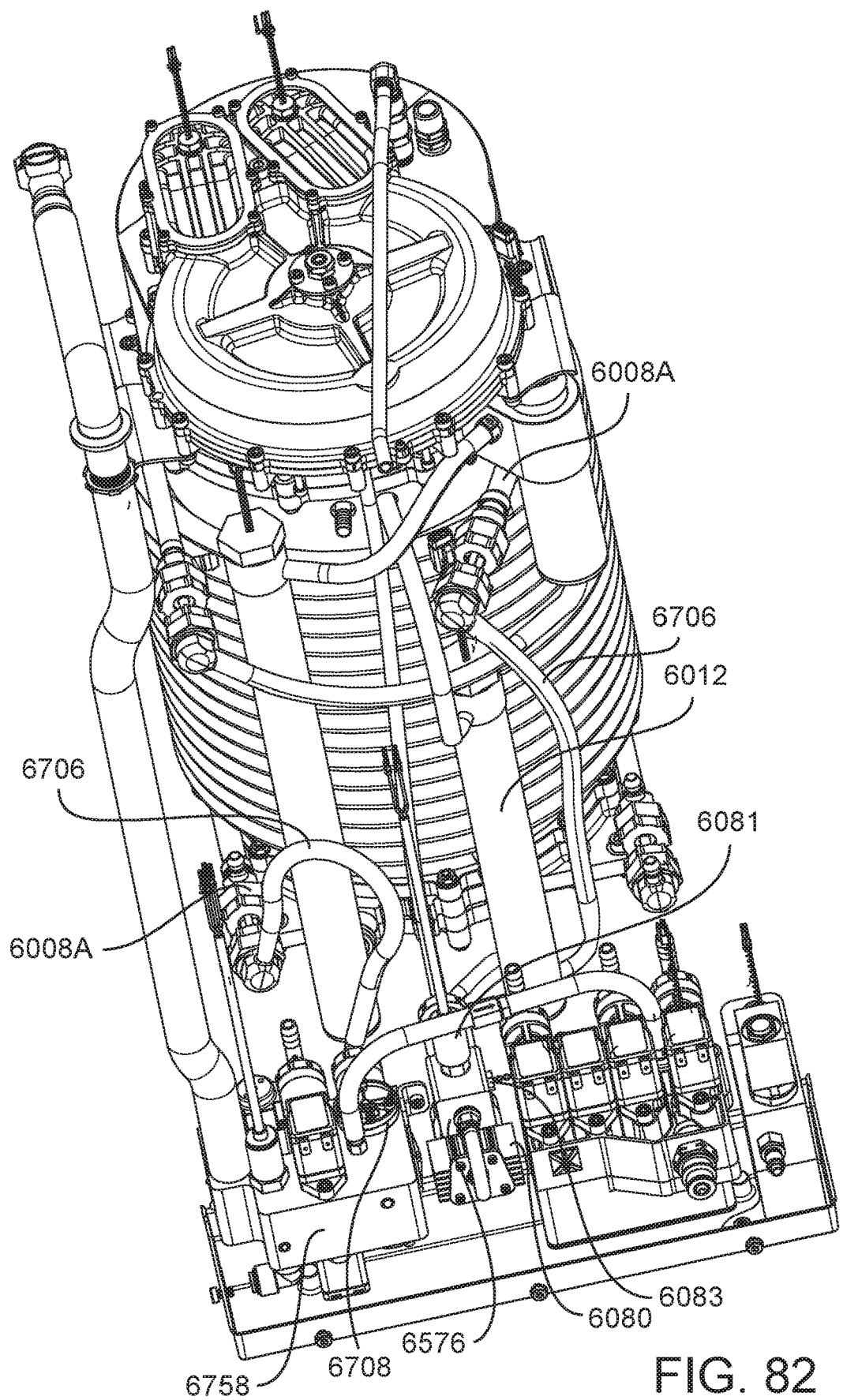
FIG. 82 depicts a perspective view of portions of an example purifier including a number of product flow paths.

Referring now to FIG. 82 a perspective view detailing product flow paths 6706 of an example system 6000 are shown. Only the product flow paths 6322 and not those of source water or other process streams are shown in FIG. 82 for sake of clarity. As shown, product water leaving the product reservoir 6012 may flow to both the product heat exchanger 6008A and a bearing feed pump 6080. Individual dedicated outlets may be included on the product reservoir 6012 for directing water to the product heat exchanger 6008A and bearing feed pump 6080 may be included. The bearing feed pump 6080 may pump a portion of the product water leaving the product reservoir 6012 to the compressor 6064. The bearing feed pump 6080 may be a solenoid pump, diaphragm pump, or any other suitable pump. As described elsewhere herein, the product water may be used to lubricate an impeller bearing. In the example embodiment the bearing feed pump 6080 is included in bearing feed manifold 6576 which may include a pressure sensor 6081 and temperature 6083. Data from these sensors may be monitored by a controller 6034 to verify proper function of the bearing feed pump 6080 (see, e.g. FIG. 115).

After passing through the heat exchanger 6008A, product water may exit at reduced temperature after transferring heat to the incoming source water. The cooled product water may flow out of the product heat exchanger 6608A through a product flow path 6706 to a product heat exchanger manifold 6578.

Figure 83:
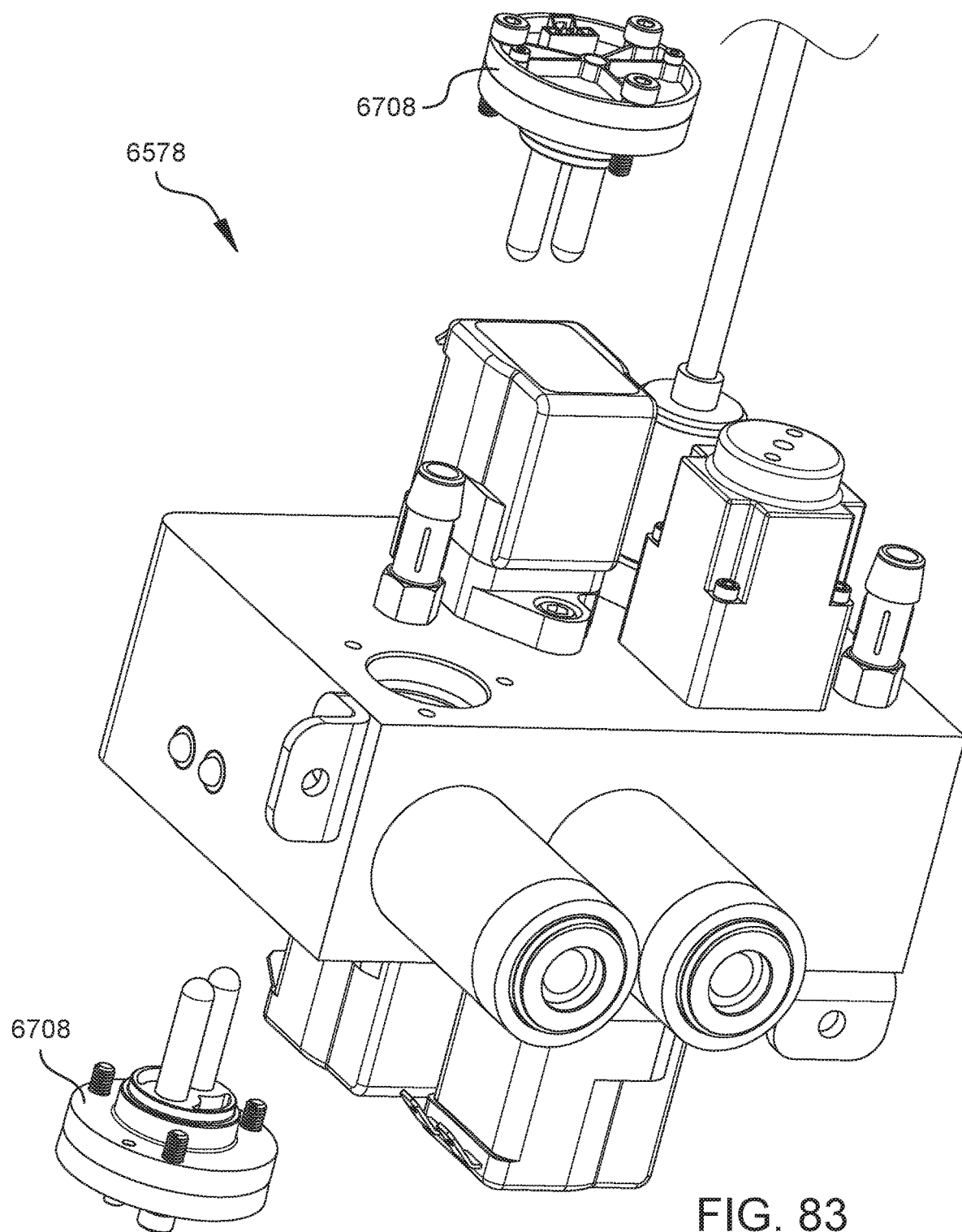
FIG. 83 depicts an exploded view of an example product heat exchanger manifold.

Referring now also to FIG. 83, once in the product heat exchanger manifold 6578, the product water may pass one or more sensors 6082A-D. In the example embodiment, the sensors 6082A-D are included in a sensor assembly 6708 which is coupled into the product heat exchanger manifold 6578. The sensors 6082A-D may be redundant pairs of conductivity sensor and temperature sensors. Other sensor types which may provide a data signal related to water quality such as turbidity, pH, redox potential, TDS, analyte sensors, TOC, etc. may also be included.

The product heat exchanger manifold 6340 may also include a valve or valves 6344 which may be operated by a controller 6034 (see, e.g., FIG. 3) to direct the product process stream based on data provided from the at least one sensor 6082A-D. If the water quality (e.g. conductivity value or temperature) is outside of a threshold value, a diverter valve 6084 leading to the mixing reservoir 6092 may be opened. In the example embodiment, a divert line 6708 is included to connect the product heat exchanger manifold 6578 to the mixing reservoir 6092 via the blowdown heat exchanger manifold 6574. The diverter valve 6084 may also be operated by the controller 6034 to maintain a target level of fluid in the condenser 6076. This level may be preset (potentially for each of a number of different operational modes) or may be altered in conjunction with an anticipated demand determined by a device (e.g. medical system 6004) at a point of use. A PID or PI control loop may be used based on readings from the product level sensor 6078 to set a duty cycle for the diverter valve 6084. In the event the product level as indicated by data from the product level sensor 6078 is above a certain first percent (e.g. 40-60% and 50% in some examples) a notification may be generated by the controller 6034. In the event the product level as indicated by data from the product level sensor 6078 is above a certain second percent (e.g. 80-95% and 90% in some examples) an error or alarm may be generated by the controller 6034.

If the water quality (e.g. conductivity or temperature) is in compliance with a predetermined threshold value, the controller 6034 (see, e.g., FIG. 3) may actuate a point of use valve 6086 to direct the product process steam to an outlet flow path 6564 which may be a flow path to a medical system 6004 (see, e.g. FIG. 3). The valves 6084, 6086 may also be actuated by the controller 6034 based on signals the controller 6034 receives from a medical system 6004.

Any of the systems 6000 described herein may operate in a number of different modes. These modes may govern operation of the device at a high level. In each of these modes, the controller 6034 may control the system 6000 differently depending on what the mode is designed to accomplish. For example, some modes may be used by the controller 6034 to establish or maintain prerequisite conditions for a next mode before the controller 6034 transitions to that mode. Other modes may keep the system 6000 in a ready state (e.g. filled and up to temperature) where purified water may be produced with relatively little delay. At a lower level, the controller 6034 may, for example, operate the system 6000 in at least one state for each mode and may transition the system 6000 through a number of states in each mode. During a typical use of the system 6000, the controller 6034 may pass between a number of modes. Certain transitions between specific modes may, however, be prohibited. A number of example modes and exemplary allowed transitions are shown in table 1 as follows:

TABLE 1

| To: | Idle | Normal | Hot | Fail Safe | Override | Standby | Sample | Disinfect | Replace prep |
|---|---|---|---|---|---|---|---|---|---|
| From Idle | False | True | False | True | True | True | True | False | True |
| From Normal | True | False | True | True | False | True | False | False | False |
| From Hot | True | False | False | True | False | True | False | True | False |
| From Fail Safe | False | False | False | False | False | False | False | False | False |
| From Override | True | False | False | True | False | False | False | False | False |
| From Standby | True | True | False | True | False | False | True | False | True |
| From Sample | True | True | False | True | False | True | False | False | False |
| From Flush | True | False | False | True | False | True | False | False | False |
| From Disinfect | True | False | False | True | False | True | False | False | False |
| From Replace Prep | True | False | False | True | False | False | False | False | False |

Depending on the embodiment, a medical system 6004 which serves as a point of use for the system 6000 may generally control mode switching. Any other point of use device such as systems which are not medical systems or perhaps those for producing water for drinking or other domestic consumption purposes may have similar control. The medical system 6004 may make determinations as to which mode of system 6000 operation may be needed and instruct the controller 6034 to orchestrate the switch when needed by the medical system 6004. The medical system 6004 may query the controller 6034 for information from the system 6000 in order to make mode switching determinations. The controller 6034 may also or instead provide information to the medical system 6004 on a predefined basis. The controller 6034 of the system 6000 may transition the system 6000 to a failsafe mode without instruction from the medical system 6004 (though the medical system 6004 may also command the system 6000 into failsafe mode as well). The controller 6034 of the system 6000 may switch between states within a mode depending on certain operating characteristics or parameters. State switching determinations may be made be the controller 6034 without direct instruction from the medical system 6004.

Some modes, such as an override mode (where included in the embodiment) may only be accessible via a technician or similar maintenance personnel. This mode may allow for manual control of various valves, control set points or targets, and other parameters via a technician interface. The technician interface may, for example, be a laptop, PC, tablet, smart phone, or the user interface of a point of use device. A technician may require one or more of a particular piece of hardware, password, encoded key, or the like to access the override mode.

Figure 84A:
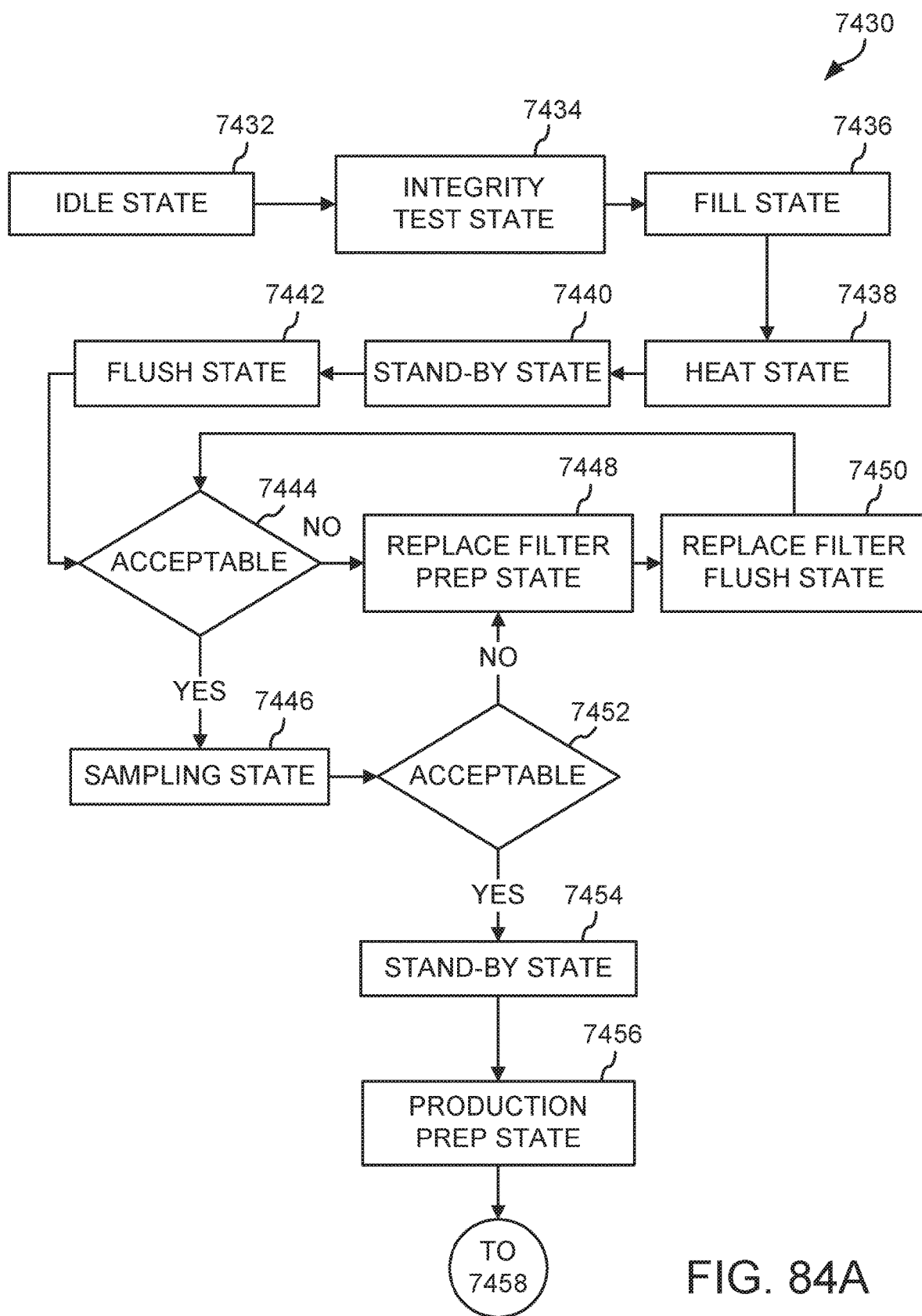
FIGS. 84A-B depict a flow diagram detailing a number of state changes which may occur during operation of an example system.
Figure 84B:
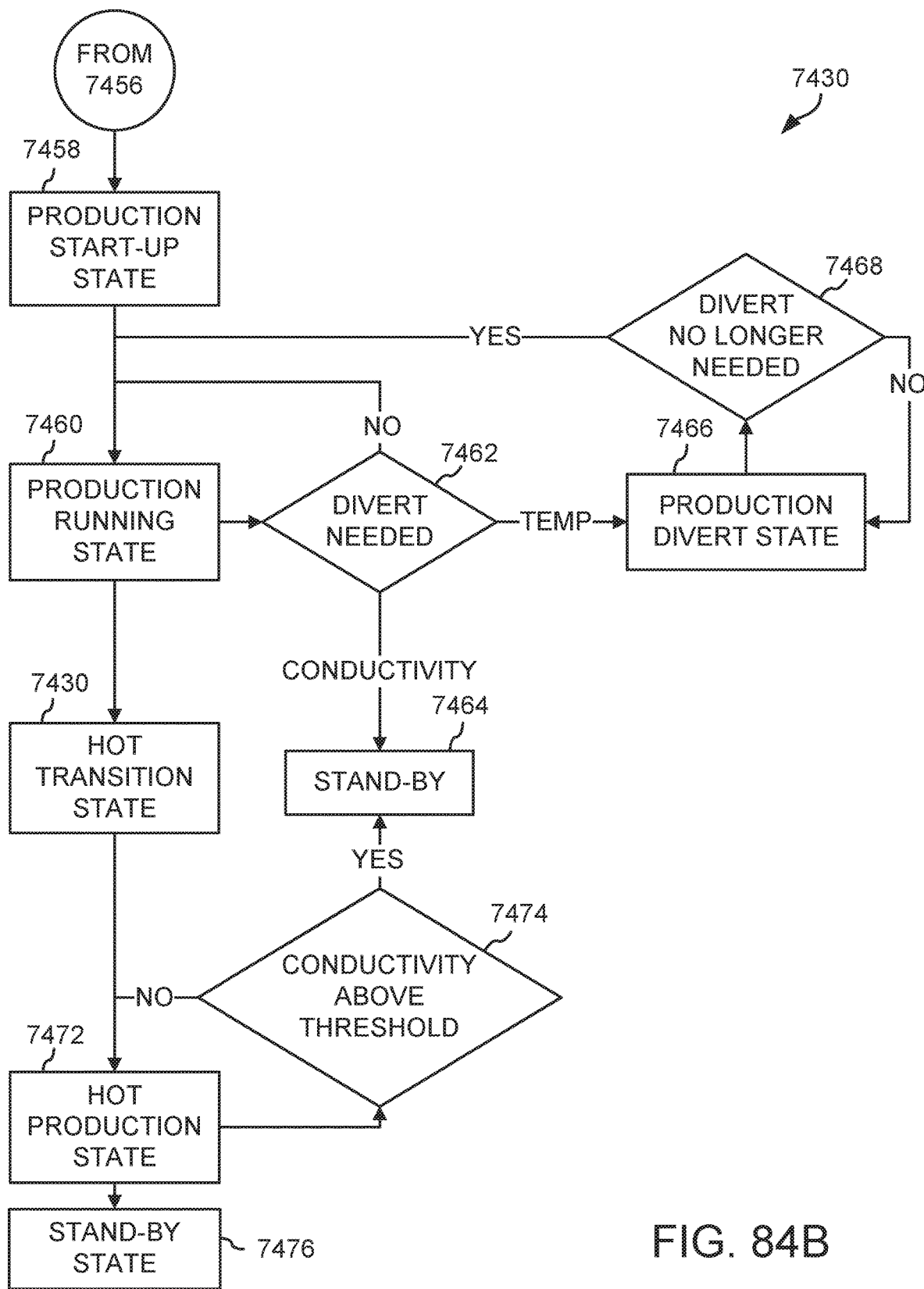

Referring now to FIGS. 84A-84B, a flow diagram 7430 depicting various operating states during a typical use of an embodiment of the system 6000 is shown. As shown, an idle state may be entered in block 7432. In the idle state, the controller 6034 may close all valves and disable any control loops, level controllers, stop the motor, etc. A command may be sent to each valve to close individually. The idle state may be used in an idle mode which may be a starting mode for the system 6000 upon power-on. The system 6000 may also be able to transition to idle mode from any other mode save fail safe mode. In some embodiments, the idle state may be utilized when the system 6000 is in either the idle mode or failsafe mode. The idle state may, however, not be exitable in failsafe mode. A service call may need to be rendered before use of the device is again allowed.

In some embodiments, a point of use device may command a transition to stand-by mode upon receipt of a communication for the system 6000 that the system has been powered on and is in idle mode. The stand-by mode may bring the system 6000 to a point where the system 6000 is ready to quickly produce purified water. This may include filling the purifier 6010 of the system 6000 and heating the fluid contained in the purifier 6010. If the purifier 6010 is properly filled and heated, the stand-by mode may maintain the system 6000 at this fill level and temperature.

Upon receipt of the command to enter stand-by mode, the controller 6034 may transition the system 6000 to a stand-by state. The stand-by state of the stand-by mode may be used to maintain the purifier 6010 fill level and temperature. The stand-by state is described in greater detail with relation to FIG. 98. The stand-by state may be exited if one of the fill level or temperature is outside of respective limits.

In alternate embodiments, and as shown, in some embodiments, the controller 6034 may transition from idle state to an integrity test state in block 7434. In various embodiments, the integrity test state may test various components of the system 6000 to ensure that the components are operating as expected. The integrity test state is described in greater detail and with relation to FIG. 85.

In the example flow diagram 7340, the controller 6034 transitions the system 6000 to a fill state in block 7436. The purifier 6010 may be filled in the fill state. The fill state is described in greater detail with relation to FIGS. 86 and 87. The controller 6034 may then transition the system 6000 into a heat state in block 7438. The heat state may heat fluid in the purifier 6010 to a temperature set point. The heat state is described in greater detail in relation to FIG. 88. A transition back to the stand-by state may be made in block 7440 once the temperature has reached the set point.

After the medical system 6004 (or other point of use device) receives a communication indicating the system 6000 is being maintained at a fill level and temperature in stand-by state, the medical system 6004 may command the system 6000 to transition into a flush mode. A flush state may be used in this mode. In the example, the flush state is entered in block 7442. In the flush state source water may flow into the system 6000 and through any filters 6006A, B of the system 6000. This may be done before a water sample is taken to ensure that the integrity of the filters is suitable. It may also serve to ensure that the any water which may be taken in a subsequent water sample is more representative of the filtration abilities of the filters 6006A, B. The flush mode is described in greater detail with respect to FIG. 89. Certain characteristics of interest related to the filters 6006A, B may be monitored in the flush state. If, in block 7444, the characteristics of interest are deemed acceptable, a sampling state may be entered in block 7446. If, in block 7444, they are not acceptable, a filter replacement preparation state may be entered in block 7448.

Depending on the embodiment, data collected during this monitoring may be communicated to the medical system 6004 (or other point of use device) and the medical system 6004 may make the acceptability determination. In other embodiments, the controller 6034 of the system 6000 may make a pass/fail determination based on the data collected during this monitoring. The pass/fail determination may be communicated to the medical system 6004. If the filters are deemed acceptable, the medical system 6004 may command a mode transition into a sampling mode. This may provoke the entry into the sampling state in block 7446. If the filters are not acceptable, the medical system 6004 may command a mode transition into a replacement preparation mode. This may prompt entry into the filter replacement preparation state and this state may be entered in block 7448.

In the replacement preparation mode the filters 6006A, B and lines to and from the filters 6006A, B may be depressurized so that the filters 6006A, B may be detached with minimal water spillage. This may occur in a filter replacement preparation state which is described in greater detail in relation to FIG. 91. New filters may be installed and a replacement filter flush state may be entered in block 7450. This state is further described in relation to FIG. 91. Characteristics of interest related to the filters 6006A, B may be monitored in the replacement flush state and may be required to conform with acceptability criteria before the sampling state can be entered.

In the sampling state, the controller 6034 may operate a sampling port 6038 to dispense a sample of filtered water for testing. If, in block 7452, the test is acceptable, stand-by state may be entered in block 7454. If, in block 7452, the test is unacceptable, the replacement filter preparation state may be entered in block 7448. In certain examples, the test may be performed manually (e.g. with one or more test strip) and the results may be input directly to a user interface of the medical system 6004. The transition into the replacement filter preparation state or stand-by state may be in response to a command from the medical system 6004 to enter one of the replacement preparation mode or stand-by mode. This command may be generated based on whether the testing was acceptable or unacceptable.

When the medical system 6004 is ready (e.g. start-up testing completed, required user interactions received), the medical system 6004 may command the system 6000 into a normal water production mode. In the normal water production mode, the controller 6034 may bring the system 6000 through a number of states. Initially, the controller 6034 may enter a production preparation state in block 7456. In this state, the controller 6034 may prepare to start the compressor 6064. This may include running a bearing feed pump 6080 for a period of time. The production preparation state is further described in relation to FIG. 92. The controller 6034 may then enter a production start-up state in block 7458 during which the compressor 6064 is brought up to operating speed. The production start up state is further described in relation to FIG. 93. The controller 6034 may then enter a production running state in block 7460. This state is further described in relation to FIG. 94.

Certain characteristics of interest related to the purified water produced by the system 6000 may be monitored in the production running state. If, in block 7462, it is determined a diversion of product water from the point of use is needed, the controller 6034 may transition the system 6000 into a stand-by state in block 7464 or production divert state in block 7466. The transition to a stand-by state in block 7464 may occur if the conductivity of the product water rises above a predetermined threshold (e.g. 10 μS). The transition to the production divert state in block 7466 may occur if the temperature of the product water rises above a predefined threshold. In the divert state, product water may be routed to a drain 6018 of the system 6000 and prevented from passing to the point of use device. The divert state is further described in relation to FIG. 94. If, in block 7468, diversion is no longer needed (e.g. temperature is back within limits), the controller 6034 may return the system 6000 to the production running state in block 7460.

The controller 6034 may stay in the normal water production state until receipt of a command from the medical system 6004 (or other point of use device) to change mode. The medical system 6004 may, for example, command a mode change after completing a therapy. Where components of the medical system 6004 are reusable, the medical system 6004 may command a mode change to a hot water production mode. This mode may provide hot water to the medical system 6004 which the medical system 6004 may use to disinfect itself. Upon receiving a command to enter the hot water production mode, the controller 6034 of the system 6000 may enter a hot transition state in block 7470. In this state, the controller 6034 may slew the motor speed toward its hot operating speed and may transition between a normal production control loop and a hot water production control loop. This state is further described in relation to FIG. 95. The controller 6034 may transition the system 6000 into a hot production state in block 7472. In this state, hot purified water may be produced and provided to the medical system (or other point of use device). The hot production state is further described in relation to FIG. 96. If, in block 7474, the conductivity of the product water rises above a threshold, the controller 6034 may transition the system 6000 into a stand-by state in block 7464. In some embodiments, a divert state may be entered if the temperature is below a threshold. Where the medical system 6004 includes a heater, however, such an entry into a divert state may not be necessary.

The hot water production states may also be used in a self disinfect mode for the system 6000. This mode may be entered by the system 6000 automatically after the medical system 6004 indicates the hot water mode is not needed. Alternatively, the medical system 6004 may command the system 6000 into the self disinfect mode. In this mode, the hot water production states may be used to run hot water through various lines of the system 6000. This mode is further described in relation to FIG. 97.

Once hot water production is no longer needed, the system 6000 may be commanded into the stand-by mode. The controller 6034 may maintain the system 6000 such that it is ready to produce purified water quickly when it is next needed. This may also help to increase the efficiency of the system 6000 as a significant amount of energy may be required to bring the system 6000 up to operation temperatures from a cold start up.

Figure 85:
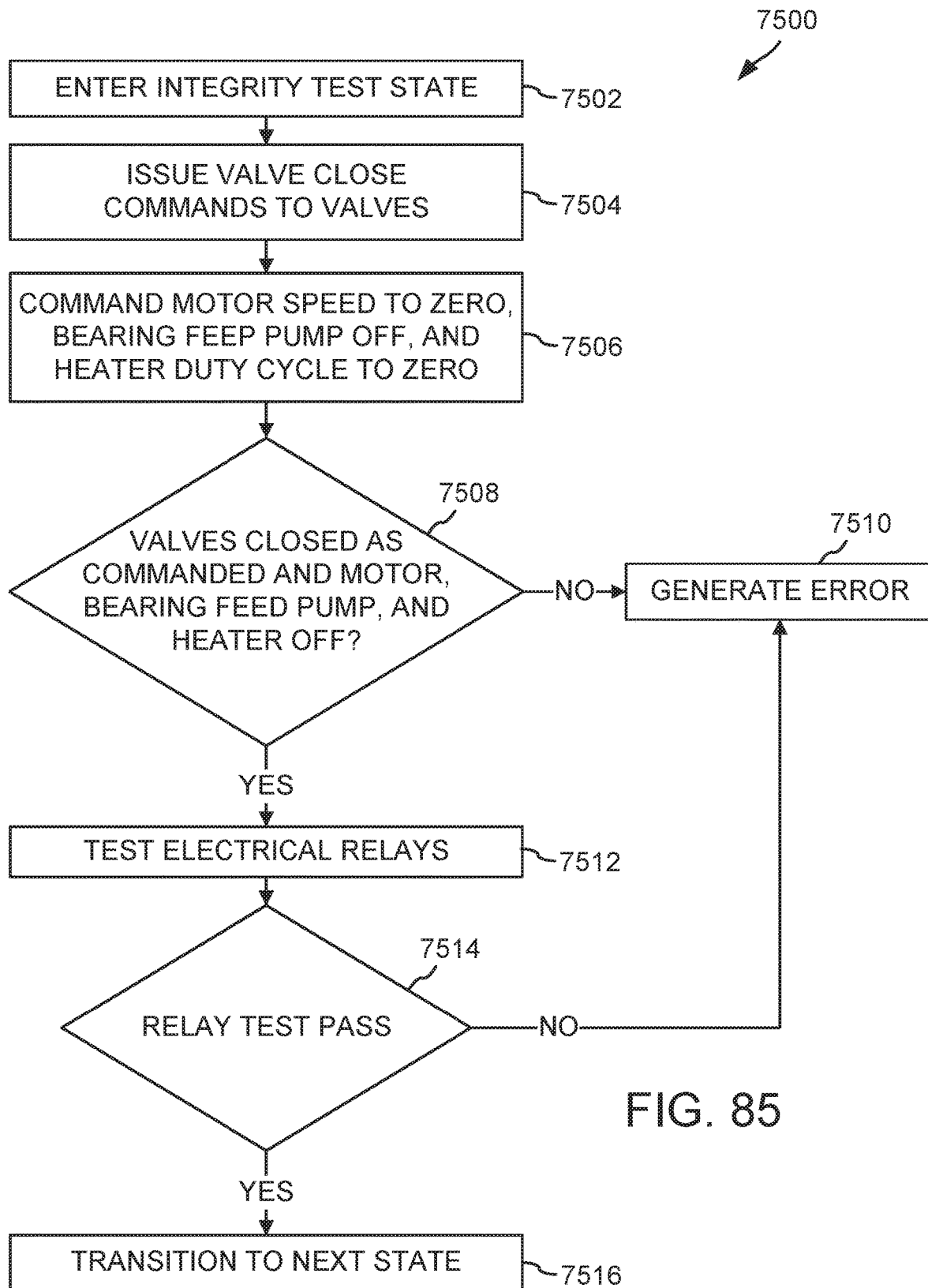
FIG. 85 depicts a flowchart depicting a number of example actions which may be used in an integrity testing state.

Referring now to FIG. 85, a flowchart 7500 depicting a number of example actions which may be executed in an integrity testing state is shown. The integrity test state may be entered in block 7502. In the integrity testing state, the controller 6034 may issue commands to each valve included in the system 6000 to transition to a closed state in block 7504. In block 7506, the controller 6034 may command the motor speed to zero, the bearing feed pump to an off state, and the heater duty cycle to zero. If, in block 7508, one or more valve did not close as commanded and/or if the motor, bearing feed pump, and heater were not off as commanded, an error may be generated in block 7510. If, in block 7508, the all of the valves closed as commanded and the motor, bearing feed pump, and heater were all off as commanded, the controller 6034 may command a test of various electrical relays of the system 6000 in block 7512. Relays tested may be those on an AC high voltage bus of the system 6000. These relays may be commanded to a particular state and a voltage reading from the bus may be taken to verify the relays changed state as commanded. If, in block 7514, the relay test does not pass, an error may be generated in block 7510. If the relay test passes in block 7514, the controller 6034 may transition the system 6000 to a next state in block 7516. This state may, for example, be a fill state in certain embodiments.

It should be noted that the integrity test state may be entered each time the system 6000 is powered on, but may also be entered before beginning to provide water to a point of use device (e.g. a medical system 6004) each time the point of use device commands the system 6000 out of a stand-by state, for example. Where the point of use device is a medical system 6004 such as a dialysis system, the system 6000 may progress through the integrity test state before providing water for each individual therapy performed by the medical system 6004.

In the context of a dialysis system, therapies may typically be performed on a relatively consistent basis. The system 6000 may operate in stand-by mode for some amount of time when the patient is, for example, at work or going about their day during their waking hours. By remaining in stand-by state, the system 6000 may quickly be ready to produce water for use in a therapy when needed. As therapies may generally be started when a patient readies for bed, the controller 6034 may command the system 6000 to enter the integrity testing state based on a preprogrammed schedule which ensures system 6000 integrity has been verified shortly before a therapy is likely to begin or scheduled to begin. Alternatively or additionally, the integrity test state may be entered after a self disinfect state is completed in some embodiments.

Figure 86:
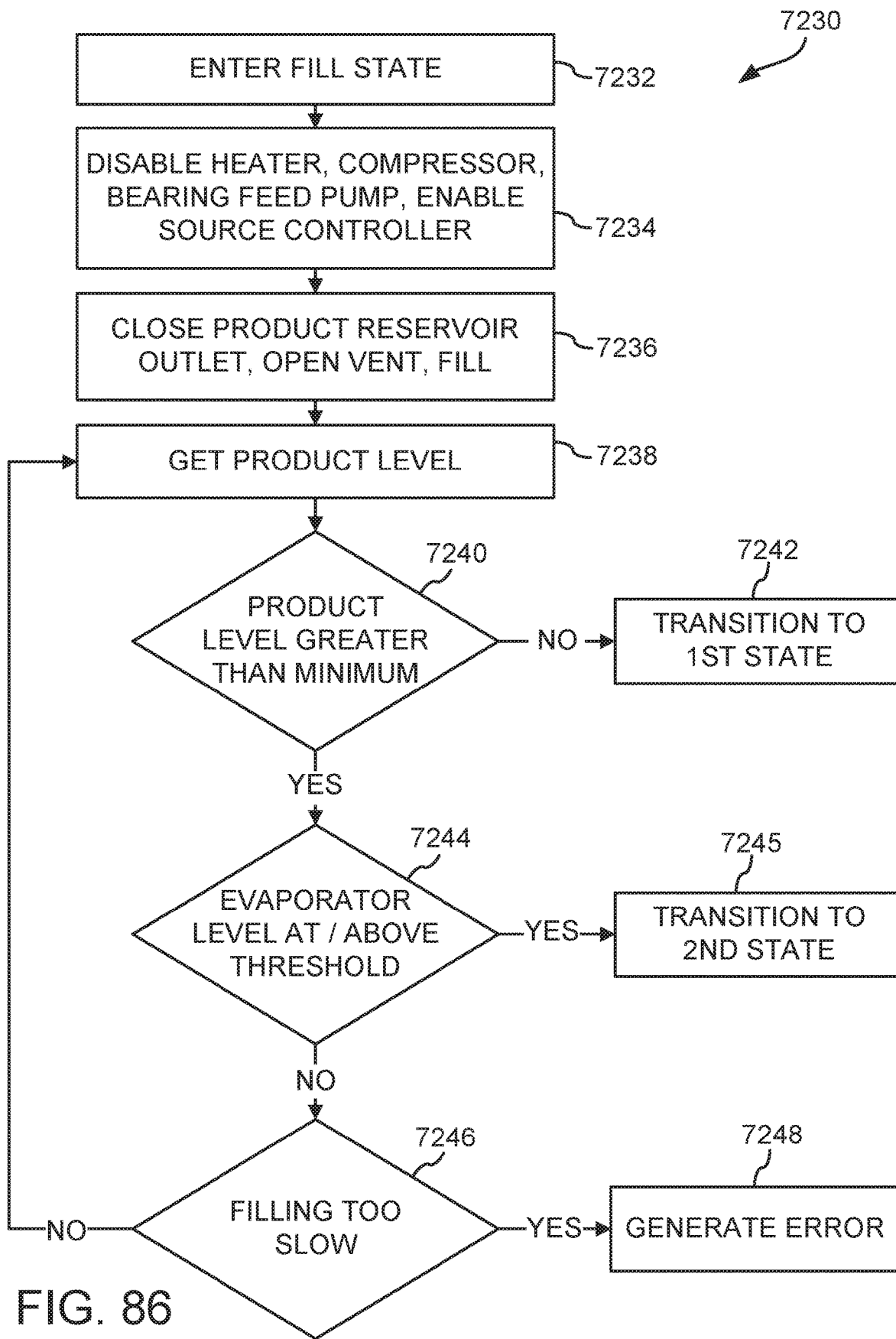
FIG. 86 depicts a flowchart detailing a number of example actions which may be used in a fill state of a system.

Referring now to FIG. 86, a flowchart 7230 depicting a number of example actions which may be executed in a fill state is shown. The fill state may be entered in block 7232. In the fill state, a source valve controller such as those described in relation to FIG. 100 or 101A-101C may be enabled. Other controllers, for example, a heater controller, compressor motor controller, and bearing feed pump controller may be disabled. The product reservoir outlet valve may be closed and a vent valve 6098 (see, e.g., FIG. 3) may be opened in block 7236. The source valve controller may fill the purifier 6010 in block 7236 as well (e.g. as described in relation to FIG. 87).

In block 7238, the controller 6034 may receive a data signal from the product reservoir level sensor 6078 (see, e.g., FIG. 3) indicative of the liquid level in the product reservoir 6012 (see, e.g., FIG. 3). If, in block 7240, the product level is less than a minimum value, the controller 6034 may transition the system 6000 to a first state (e.g. stand-by state) in block 7242. The minimum level may be a level of 5-15% (e.g. 10%) and may ensure the bearing feed pump 6080 (see, e.g., FIG. 3) has an ample supply of fluid to lubricate the compressor 6064 (see, e.g., FIG. 3) bearing. If, in block 7240, the product level is greater than the minimum value, the controller 6034 may transition the system 6000 to a second state (block 7245) if, in block 7244, the evaporator 6060 (see, e.g., FIG. 3) level is at or above a threshold (e.g. 50% or 55%) in block 7244. The second state may be a heating state. If, in block 7244, the evaporator 6060 is not above the threshold and the purifier 6010 is filling too slowly in block 7246, an error may be generated at block 7248. For example, if a timer of 5-10 minutes (e.g. 5 minutes) elapses the error may be generated.

Figure 87:
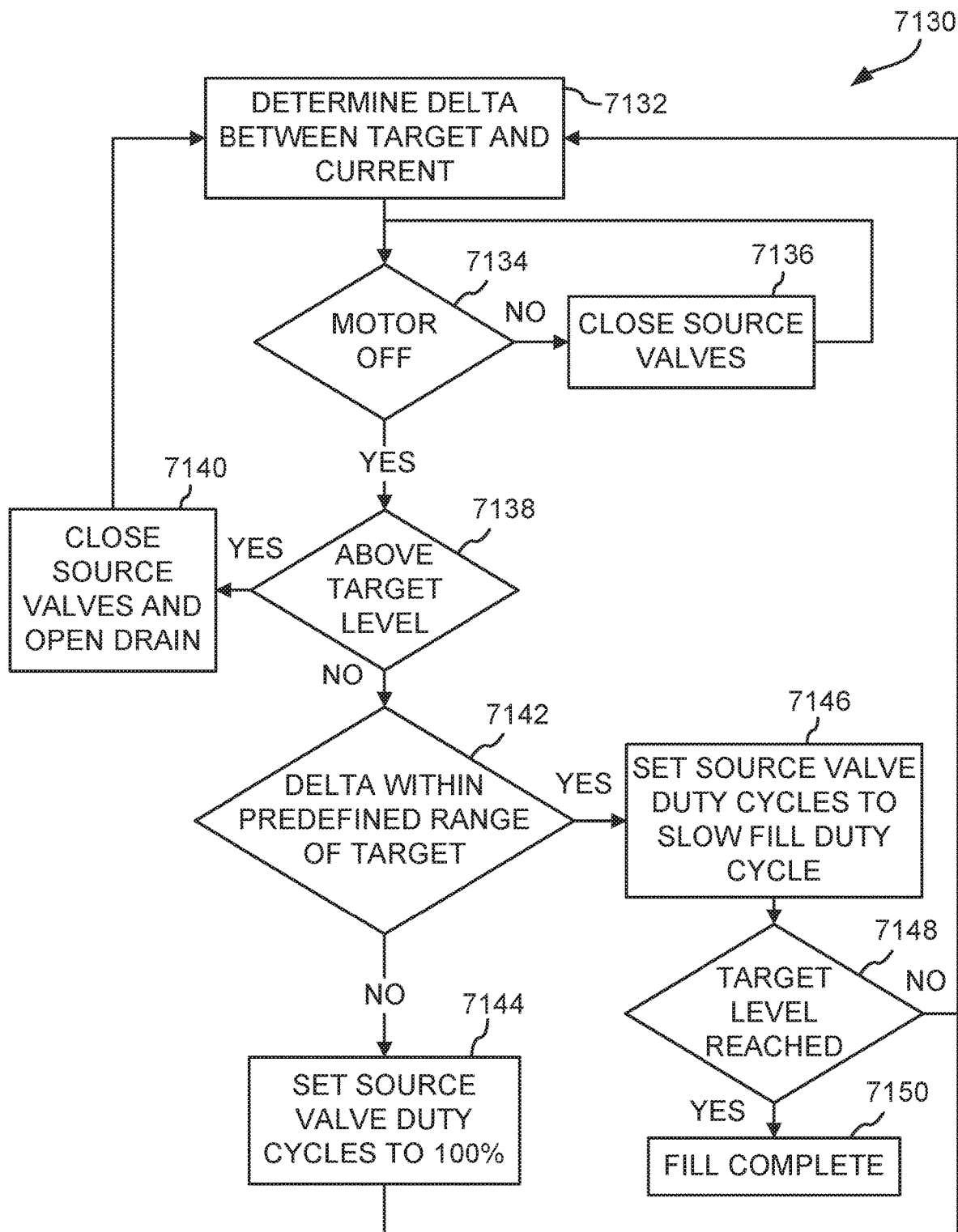
FIG. 87 depicts a flowchart detailing a number of example actions which may be used during a fill of a purifier.

Referring now to FIG. 87, an example flowchart 7130 detailing a number of actions which may be executed to fill an evaporator 6060 (see, e.g., FIG. 3) of a purifier 6010 (see, e.g. FIG. 3) is shown. This may occur, for example, during a fill state of a production mode or stand-by mode of system 6000 operation. The controller 6034 (see, e.g., FIG. 3) of the system 6000 may control the source proportioning valves 6050A, B (see, e.g., FIG. 3) during a fill state such that the evaporator 6060 is filled quickly while mitigating potential for overshoot.

As shown, the controller 6034 may determine a delta between a current fill level of the evaporator 6060 and a target level in block 7132. The current level may be sensed via an evaporator level sensor 6073 (see, e.g., FIG. 3) which is in data communication with the controller 6034. The target level may be a predefined value. If, in block 7134, the compressor motor of the purifier 6010 is running, the controller 6034 may command the source proportioning valves 6050A, B closed in block 7136. The controller 6034 may wait for the motor to stop or slow down to a relatively low speed before filling the evaporator 6060. The source proportioning valves 6050A, B may be closed in block 7140 if the current level is above the target level in block 7138. The evaporator may also be drained in block 7138 and a new delta between the target and current value may be determined in block 7132.

If the motor is off in block 7134, and the evaporator level is below the target in block 7138, the controller 6034 may fill the evaporator 6060. If, in block 7142, the delta determined in block 7132 is not within a predetermined range of the target, the duty cycle for the source proportioning valves 6050A, B may be set to 100% in block 7144. This may allow the evaporator 6060 to be filled as rapidly as possible. If, in block 7146, the delta from block 7132 is within a predefined range of the target, the duty cycle for the source valves may be set to a slow fill duty cycle value in block 7146. In some embodiments, the range of block 7142 may be inclusive of values within 25% of the target level or 20% of the target level. The slow fill duty cycle may be around 20-35% (e.g. 25%). This may help to prevent any overshoot of the target level. Once, in block 7148, the target level has been reached, the fill may complete in block 7150.

Figure 88:
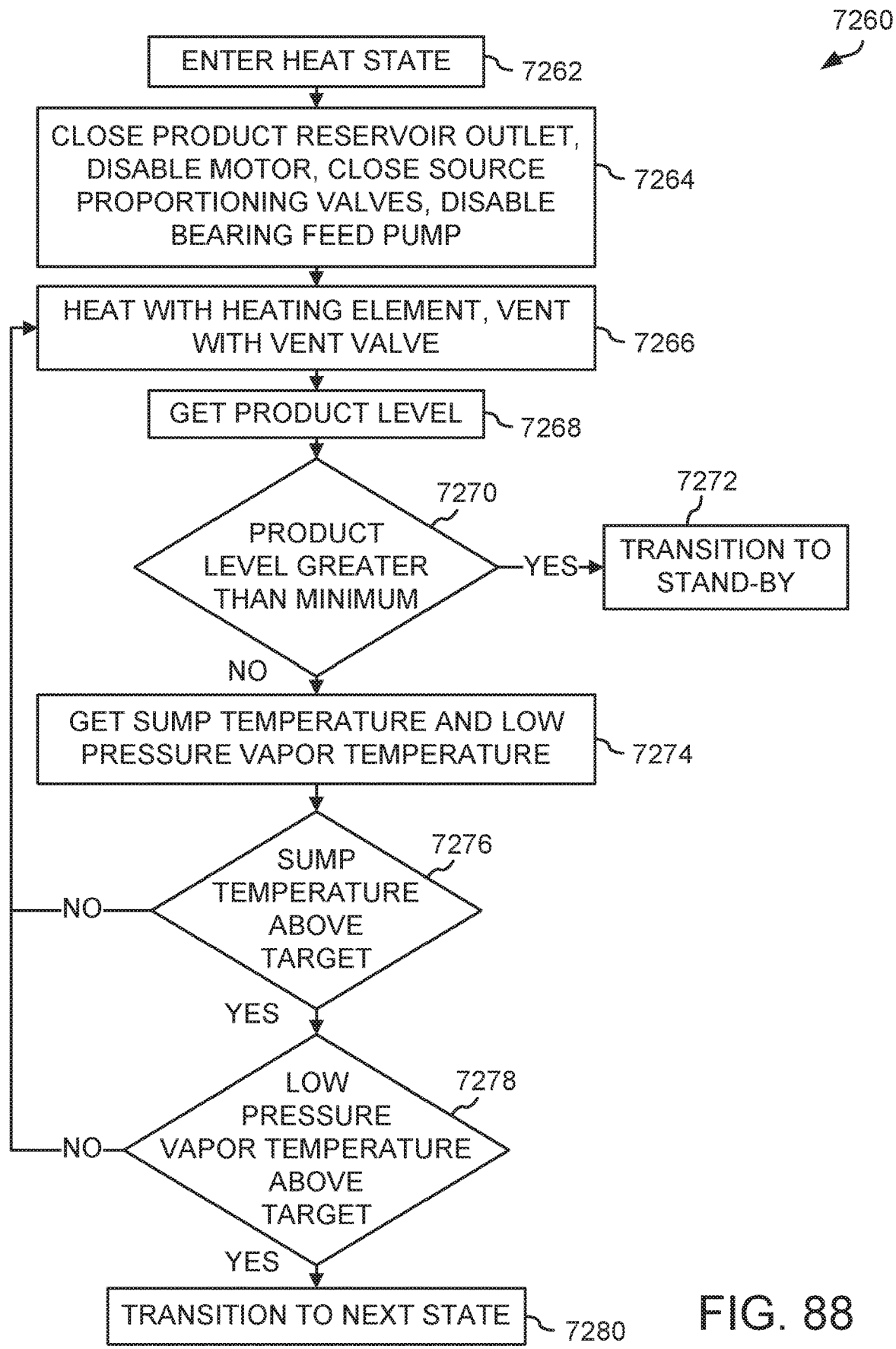
FIG. 88 depicts a flowchart detailing a number of example actions which may be used in a heat state of a system.

Referring now primarily to the example flowchart 7260 in FIG. 88, the controller 6034 (see, e.g., FIG. 3) may also prepare the purifier 6010 (see, e.g., FIG. 3) for water purification by getting fluid in the purifier 6010 up to a temperature or temperature range. In some embodiments, multiple temperature targets may be used. For example, a target low pressure vapor temperature and target sump temperature may be used. The controller 6034 may, for example, heat the fluid in the evaporator 6060 (see, e.g., FIG. 3) to a point at which the purifier 6010 can be transitioned into a purified water production state.

As shown, the heat state may be entered in block 7262. In the heat state, the controller 6034 may, in block 7264, close outlets to the purifier 6010 and close inlets to the purifier 6010. The compressor 6064 (see, e.g., FIG. 3) and bearing feed pump 6080 (see, e.g., FIG. 3) may be disabled in block 7264 as well. The fluid in the purifier 6010 may then be heated by the heating element 6054 (see, e.g., FIG. 3) to a temperature target in block 7266. The controller 6034 may also vent the purifier 6010 by actuating a vent valve 6098 (see, e.g., FIG. 3) in block 7266. The venting valve 6098 may be actuated to achieve or maintain a vapor temperature set point. The controller 6034 may govern actuation of the vent valve 6098 as described elsewhere herein (see, e.g., description of FIG. 80).

The controller 6034 may receive a product level measurement from a product level sensor 6078 in block 7268. If, in block 7270 the product level is below a minimum, the controller 6034 may transition the system 6000 into a standby state in block 7272. The minimum may be 7-15% (e.g. 10%) in certain embodiments. Otherwise the controller 6034 may receive a sump temperature value and a low pressure vapor temperature value in block 7274. These may be respectively received via a data signal from a sump temperature sensor 6059 (see, e.g., FIG. 3) and low pressure vapor temperature sensor 6066 (see, e.g., FIG. 3). If one or both of these values is not above a respective target in blocks 7276 and 7278, the controller 6034 may return to block 7264 and continue heating and venting. If the sump temperature and low pressure vapor temperatures are above respective minimum values, the controller 6034 may transition the system 6000 to a next state. This state may, for example, be a stand-by state.

Figure 89:
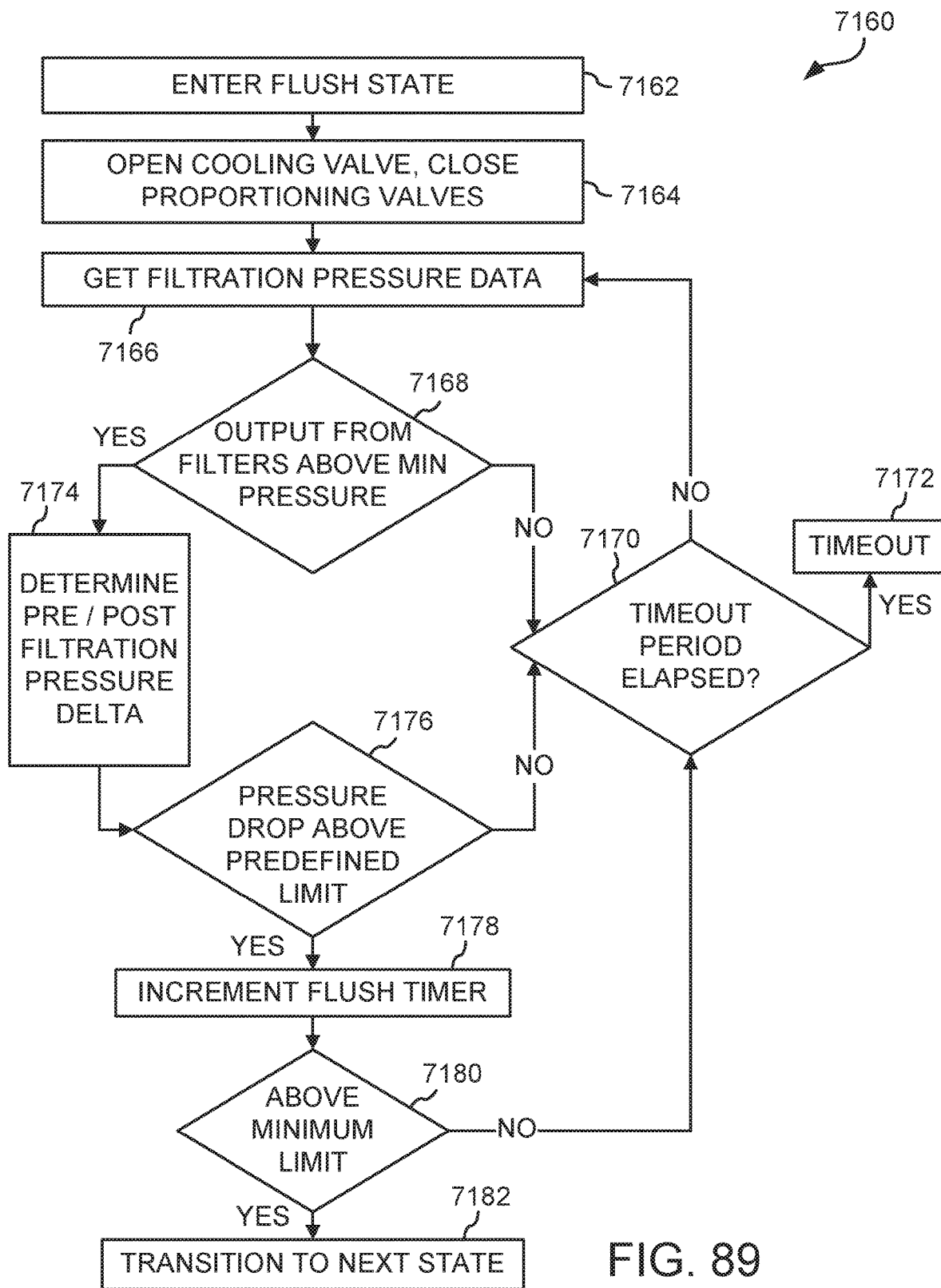
FIG. 89 depicts a flowchart detailing a number of example actions which may be used to flush filters of a system.

Referring now primarily to the exemplary flowchart 7160 in FIG. 89, a flush state may be used in the flush mode. Upon entry to the flush state in block 7162, a cooling valve 6100 (see, e.g. FIG. 3) may be opened and source proportioning valves 6050A, B (see, e.g. FIG. 3) to the heat exchangers 6008A, B (see, e.g. FIG. 3) may be closed in block 7164. The cooling valve 6100 may be operated at 100% duty cycle during flushing. In block 7166, the controller 6034 (see, e.g., FIG. 3) may receive filtration data from various sensors monitoring the filters 6006A, B. For example, data from pre and post filtration pressure transducers 6036, 6044 may be received. If, in block 7168 the post filtration pressure is below a minimum pressure (e.g. 10 psi or more) the controller 6034 may continue monitoring the filtration data in block 7166 unless, in block 7170, a timeout period has elapsed. If the timeout period has elapsed, the controller 6034 may generate a timeout error in block 7172. The timeout period may be 7-15 minutes (e.g. 10 minutes). In some embodiments, if a timeout error is generated in block 7172, the filters 6006A, B may need to be replaced.

If, in block 7168, the post filtration pressure is above a minimum pressure the controller 6034 may determine a pressure drop between the pre-filtration pressure sensor 6036 measurement and the post-filtration pressure sensor 6044 measurement in block 7174. If, in block 7176, the pressure drop is below a predefined limit, the controller 6034 may continue monitoring the filtration data in block 7166 unless, in block 7170, a timeout period has elapsed. A timeout error may be generated in block 7172 if the timeout period has elapsed. If, in block 7176, the pressure drop is larger than the predefined limit, a flushing timer may be incremented in block 7178. The predefined limit for the pressure drop may be at least 1 psi.

If, in block 7180, the flushing timer has not been incremented above its minimum limit (e.g. 5 minutes), the controller 6034 may continue monitoring the filtration data in block 7166 unless, in block 7170, a timeout period has elapsed. A timeout error may be generated in block 7172 if the timeout period has elapsed. Though not shown, in the event that the post-filtration pressure value or pressure drop between pre and post filtration sensors 6036, 6044 falls below their respective minimums, the flushing timer may be reset to zero. If, in block 7180, the flushing timer has been incremented above a minimum value, the controller 6034 may transition the system 6000 to a next mode or state in block 7182. Alternatively, the controller 6034 may notify a point of use device (e.g. medical system 6004 of FIG. 3) and the point of use device may direct the controller 6034 to transition the system 6000 to another mode or state. The next mode may be a sampling mode.

Figure 90:
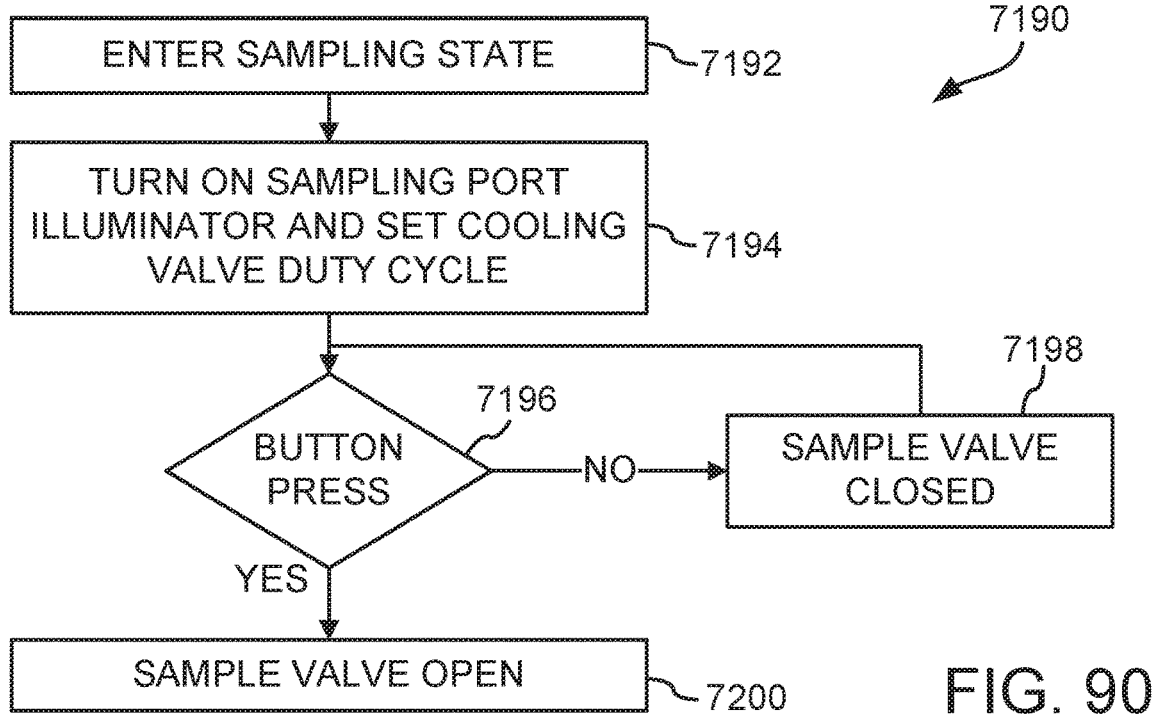
FIG. 90 depicts a flowchart detailing a number of example actions which may be used to dispense a water sample.

A sampling state may be used in the sampling mode. In the sampling state, and referring now to the example flowchart 7190 shown in FIG. 90, the controller 6034 may dispense a sample for manual testing. This may again be used to determine the suitability of the filters 6006A, B. In other embodiments, a digital testing meter may be used and the testing may not be manual. As shown, the sampling state may be entered in block 7192. The cooling valve 6100 (see, e.g., FIG. 3) duty cycle may be set to a sampling duty cycle (e.g. 50%) in block 7194. If provided, a sampling port 6038 (see, e.g. FIG. 3) illuminator may be powered in block 7194 as well. If, in block 7196, a depression of the sampling button is not detected, the sampling valve may remain closed in block 7198. If, in block 7196, a sampling button is depressed the sampling valve may be opened in block 7200. In some embodiments, the sampling valve may be commanded closed by the controller 6034 if the sampling button remains depressed for more than a predefined period of time. For example, the controller 6034 may close the sampling valve after 5 seconds.

Figure 91:
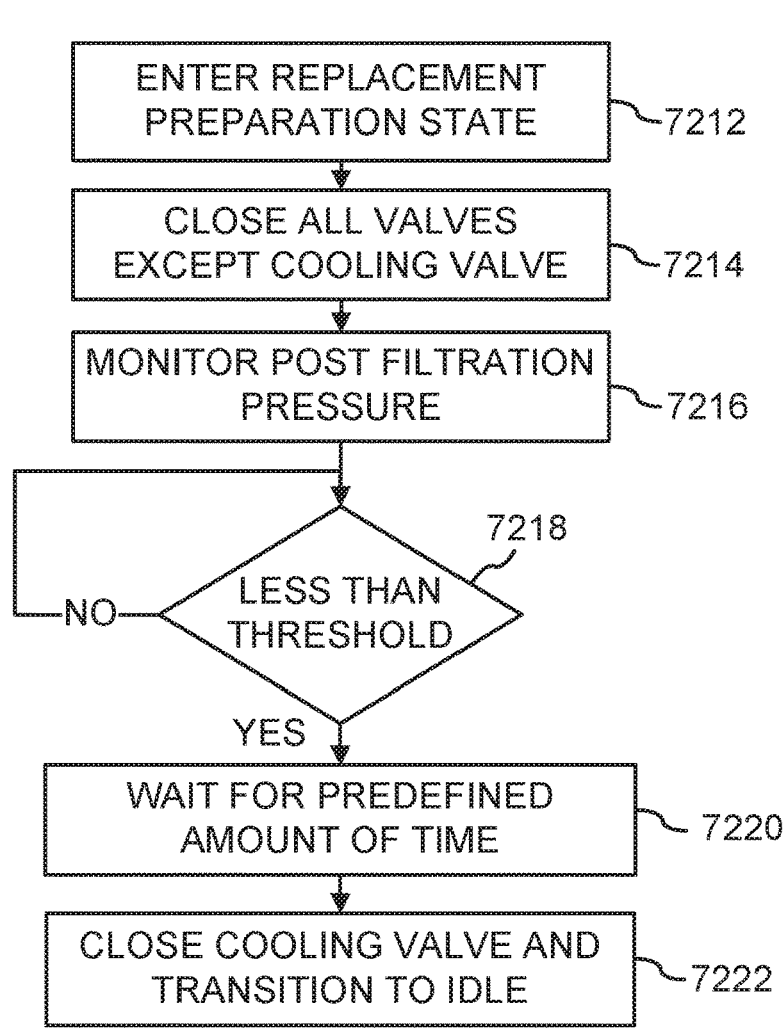
FIG. 91 depicts a flowchart detailing a number of example actions which may be used to prepare a system for filter replacement.

Referring now primarily to exemplary flowchart 7210 in FIG. 91, in the event that the filters 6006A, B (see, e.g., FIG. 3) should be replaced, the controller 6034 (see, e.g., FIG. 3) may transition the system 6000 into a filter replacement preparation state. The filters 6006A, B may be required to be replaced in the event that a water sample from the filtration arrangement fails a quality test (e.g. chlorine or chloramines testing). The filters 6006A, B may also be required to be replaced in the event that the pressure drop through the filters 6006A, B is out of a predefined range or the post filtration pressure measured downstream of the filters 6006A, B is too low. In some embodiments, the filters 6006A, B may require replacement based on a usage characteristic. For example, volume filtered, time filtering source water, time since install, etc. In certain embodiments, the controller 6034 may be commanded into a replacement mode by an attached point of use device (e.g. medical system 6004 of FIG. 3) in the event a quality test fails or other characteristics of interest related to the filters 6006A, B indicate replacement may be necessary.

When in a replacement mode, the controller 6034 may progress through a replacement preparation state and a replacement flush state. As shown in FIG. 91, a filter replacement preparation state may be entered in block 7212. All valves except for a cooling valve 6100 (see, e.g., FIG. 3) may be closed in block 7214. This may allow any water pressure in system 6000 to be released to the drain 6018 (see, e.g., FIG. 3) of the system 6000. The controller 6034 may monitor post filtration pressure data in block 7216. Once, in block 7218, the post filtration pressure is below a threshold value, the controller 6034 may wait a predefined amount of time (e.g. 10 seconds) in block 7220. If the pressure rises above the threshold during the wait period, the wait period may reset from zero once the pressure again falls below the threshold. The cooling valve may be closed in block 7222. The controller 6034 may also transition the system 6000 to idle in block 7222. A user may then decouple the used filters from the system 6000 and install a new set of filters before the next use.

Once the new filters 6006A, B have been installed, the controller 6034 may transition the system 6000 to a new filter flush state. In some examples, completion of installation of the new filters 6006A, B may be indicated via a user interface of the point of user device. The controller 6034 may transition the system 6000 to the new filter flush state upon receipt of a communication from a point of use device that the user has indicated new filters have been installed. The new filter flush state may be similar to the flush state described in relation to FIG. 89. The timeout period may be greater for the new filter flush state. In some embodiments, the timeout period may be 20 minutes or double that of the normal flush timeout period. Additionally, the filters 6006A, B may be flushed for a greater period of time during a new filter flush. In some embodiments, the minimum limit used in block 7178 for a new filter flush may be 15 minutes or 3 times that used in a normal flush. After flushing, the controller 6034 or point of use device may require the system 6000 collect another water sample to ensure that the new filters 6006A, B are suitable.

Once the filters 6006A, B have been deemed suitable, the controller 6034 (see, e.g., FIG. 3) may begin preparing the purifier 6010 (see, e.g., FIG. 3) for water purification. In some embodiments, a point of use device (e.g. medical system 6004 of FIG. 3) may direct the controller 6034 to transition the system 6000 to a normal purified water production mode once the filters 6006A, B have passed any checks. The normal purified water production mode may produce product water at a temperature around 30-40° C. (e.g. 37° C.). In other embodiments the normal purified water production temperature may be lower. For example, where the point of use device (e.g. medical system 6004 of FIG. 3) includes a heater, the target temperature may be lower than a temperature at which the point of use device will be using the water. In some examples, the target temperature may be 20-30° C. (e.g. 25° C.). The controller 6034 may alternatively prepare the system 6000 for production of purified water by transitioning the system 6000 into a stand-by mode. This may help to minimize the amount of time needed to begin production of purified water 6010 once a point of use device or system commands a mode change into a normal purified water production mode. This preparation may, for example, include maintaining a temperature and fill level of the purifier 6010 to a point at which the purifier 6010 can be transitioned into a purified water production state.

Figure 92:
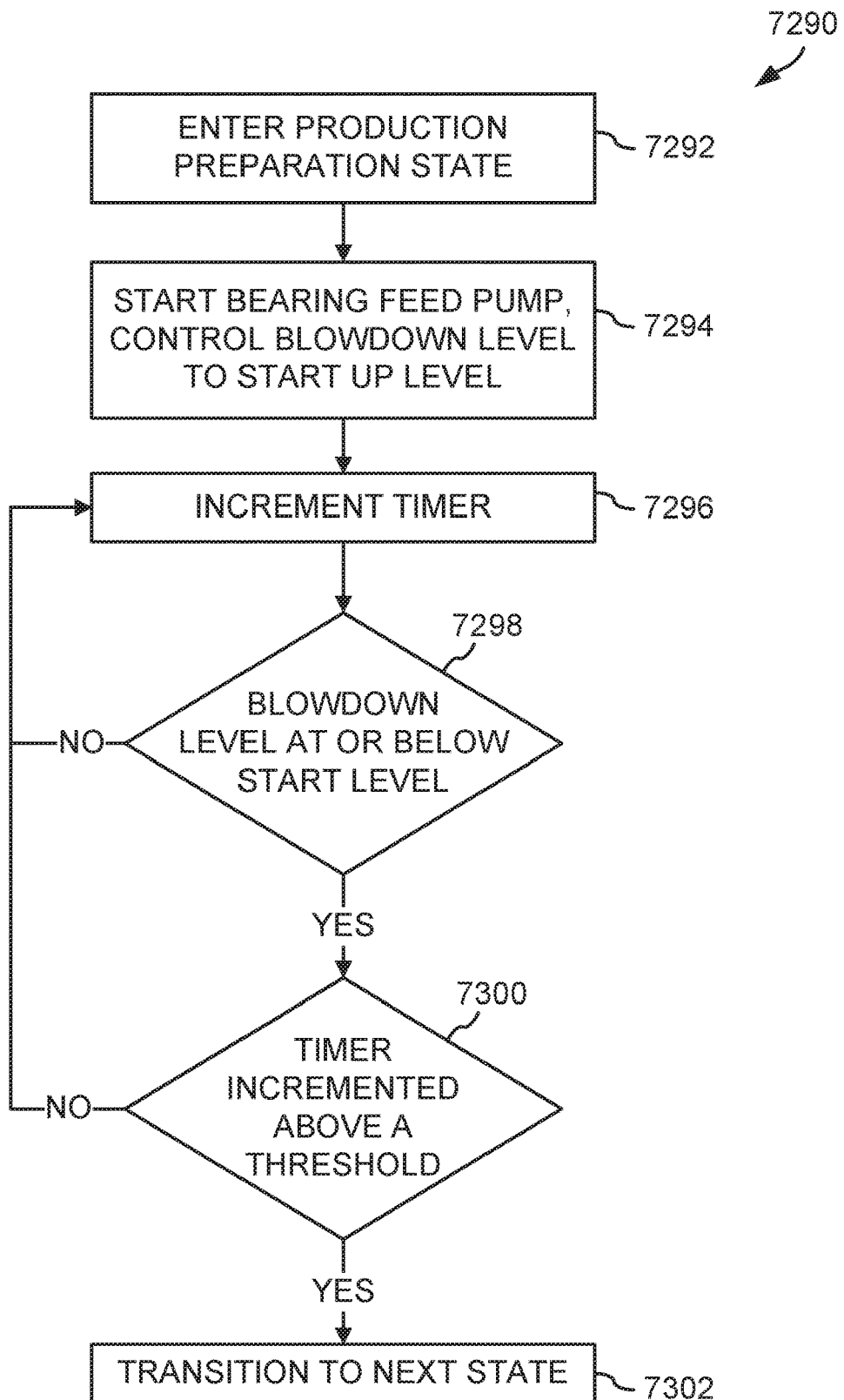
FIG. 92 depicts a flowchart detailing a number of example actions which may be used in a production preparation state of a system.

Referring now primarily to the example flowchart 7290 in FIG. 92, the controller 6034 (see, e.g., FIG. 3) may also prepare the purifier 6010 (see, e.g., FIG. 3) for water purification by starting the bearing feed pump and controlling the blowdown level to a starting fill percent. As shown, in block 7292, the controller 6034 may transition the system 6000 to a production preparation state. The bearing feed pump may be commanded to run by the controller 6034 in block 7294. The blowdown level may also be controlled to a starting level in block 7294. The motor may remain off and the product outlet valve may remain closed in the production preparation state. Venting of the purifier 6010 may continue as needed to maintain a target vapor temperature in the purifier 6010. A timer may be incremented in block 7296. This timer may be required to accumulate past a predefined amount of time which is sufficient to lubricate a bearing for the compressor 6064 (see, e.g., FIG. 3) motor. This may be, for example, 15 seconds to 1 minute (e.g. 30 seconds). If, in block 7298, the blowdown level is at or below a predefined level (e.g. 35%) and the timer has accumulated past the predefined threshold in block 7300, the controller 6034 may transition the system 6000 to the next state. In some embodiments, the controller 6034 may generate an error (not shown) if the timer accumulates past a certain value (e.g. 5 minutes). The next state may be a production start-up state.

Figure 93:
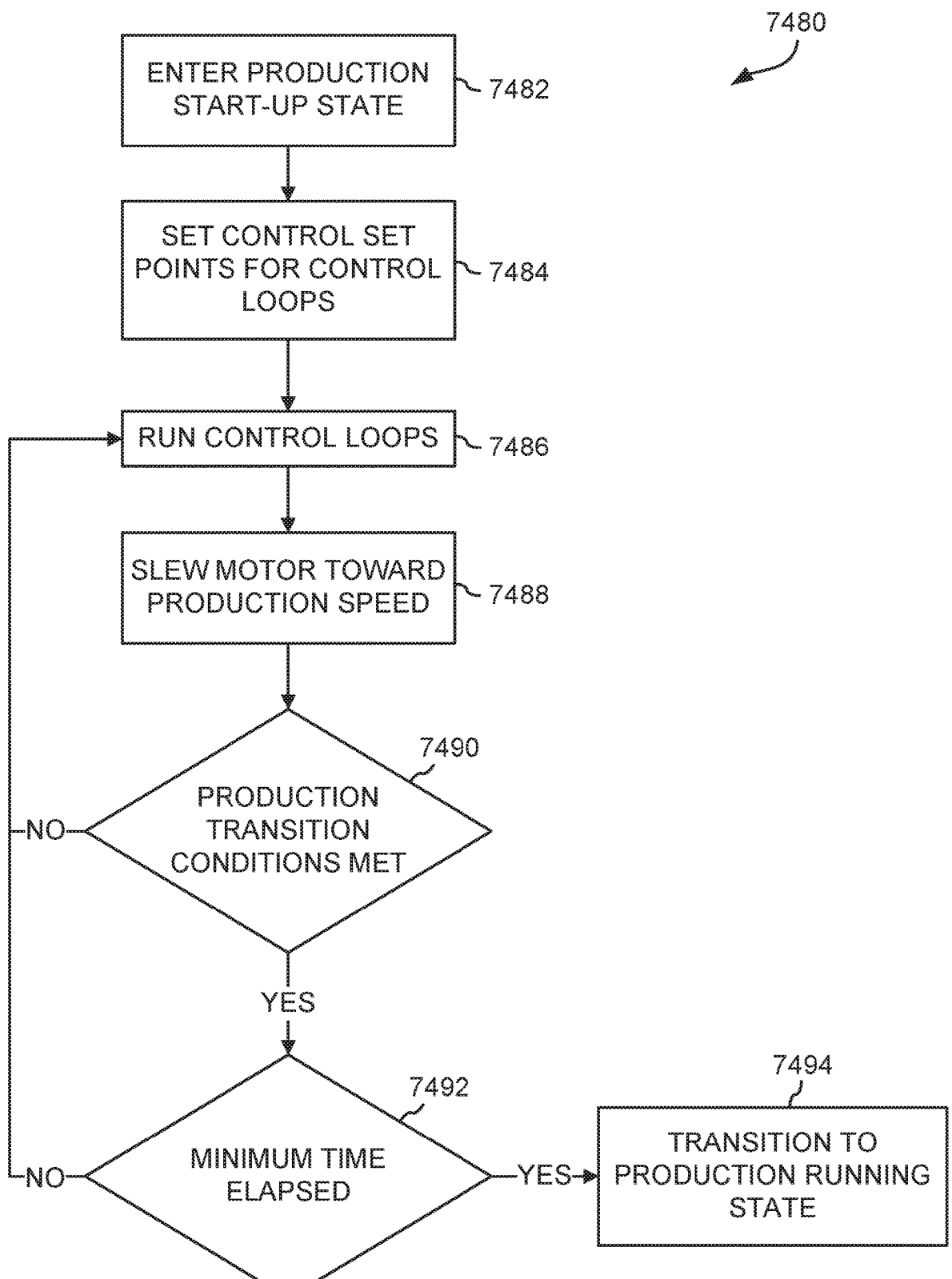
FIG. 93 depicts a flowchart detailing a number of example actions which may be used in a production start up state of a system.

In the production start-up state, and referring now primarily to the flowchart 7480 of FIG. 93, the compressor 6064 (see, e.g., FIG. 3) may be brought up to speed and set points for various control loops of the system 6000 may be set. Any product water produced may be diverted to drain 6018 (see, e.g., FIG. 3) and prevented from being in fluid communication with the point of use device or system in this state. Additionally, the production start-up state may monitor various operating characteristics of interest for conformance with predefined criteria. The controller 6034 may not allow transition to production running state until the operating characteristics of interest are in conformance with their predefined criteria.

As shown, the production start-up state may be entered in block 7482. In block 7484, control set points for various control loops of the system 6000 may be set. The control loops may be run in block 7486. The compressor motor may be slewed toward its operating speed in block 7488. If, in block 7490, the production transition conditions have not been met, the controller 6034 may return to block 7486. Otherwise, the controller 6034 may check if a minimum time for which the transition conditions have been satisfied has elapsed in block 7492. If this time has elapsed, the controller 6034 may transition the system to a production running state in block 7494. Otherwise, the controller 6034 may return to block 7486.

The production transition conditions may include criteria related to the temperature and/or conductivity of product water exiting product heat exchanger 6008A (e.g. as read by sensors 6082A-D of FIG. 3). For example, the temperature may be required to be less than a few degrees (e.g. 2° C.) above the temperature set point for the production running state. The conditions may also include a criterion related to the temperature delta between the source water entering the system and the purified product water entering and/or exiting the product heat exchanger 6008A. These conditions may also include a criterion related to the compressor 6064 speed. For example, the compressor speed may be required to be greater than a minimum production running speed. The conditions may also include criteria related to the blowdown level or rate and the product level. Additionally, there may be a timer during which all criteria must be satisfied in order for the controller 6034 to deem the production conditions met. Individual timers for each criterion or sub sets of criteria may also be used.

In some examples, the production start-up state may also be entered prior to entering a hot water production state. Similar criteria may be imposed before a transition into hot water production state is allowed though the values for each particular criterion may differ if the system 6000 is to transition into a hot water production state.

Figure 94:
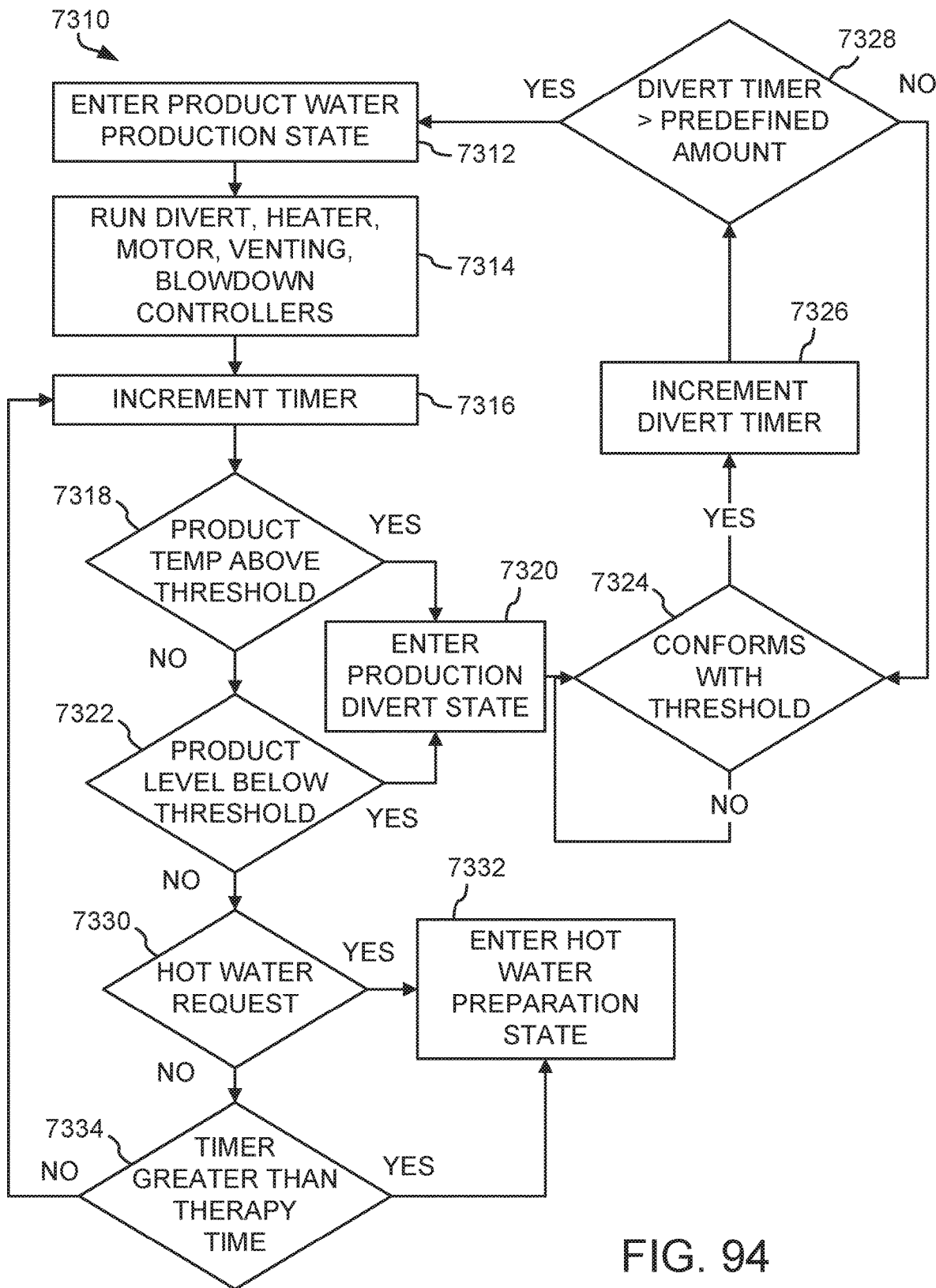
FIG. 94 depicts a flowchart detailing a number of example actions which may be used in a water production state of a system.

Referring now primarily to the example flowchart 7310 in FIG. 94, after preparations (e.g. in production preparation state and production start-up state) have been completed, the controller 6034 (see, e.g., FIG. 3) may transition the system 6000 into a purified water production state or production running state. As shown, the production running state may be entered in block 7312. In block 7314, the controller 6034 may run various control loops of the system 6000. For example, a divert controller may be run in block 7314. The divert controller may divert water produced by the system 6000 as described elsewhere herein (see, e.g., FIGS. 83 and 122). The controller 6034 may also run a venting controller in block 7314. The venting controller may vent vapors from the purifier 6010 as described elsewhere herein (see, e.g., FIG. 80). The controller 6034 may also run a heater controller in block 7314. The heater may be controlled as described elsewhere herein (see, e.g., FIGS. 117-119). The controller 6034 may further run a motor controller in block 7314. The motor may be controlled as described elsewhere herein (see, e.g., FIGS. 109-116). The controller 6034 may also run a blowdown controller and incoming source water splitting controller in block 7314. This may be accomplished as described elsewhere herein (see, e.g., FIG. 100-101C). A timer may also be incremented in block 7316.

If, in block 7318, the product temperature leaving the product heat exchanger 6008A (see, e.g., FIG. 3) rises above a threshold, the controller 6034 may transition the system 6000 to a product water divert state in block 7320. This threshold may be around body temperature (e.g. 37° C.) in certain examples. Similarly, if a conductivity threshold for the product water is breached (not shown), the product divert state may be entered in block 7320. In some embodiments, a breach of a conductivity threshold may provoke a transition to stand-by state. The temperature and conductivity may be sensed by sensors 6082A-D (see, e.g., FIG. 3). The product water divert state may also be entered in block 7320, if, in block 7322, the product level falls below a threshold value. This value may, for example, be 20% and may be measured by a product level sensor 6078 (see, e.g., FIG. 3). Once, in block 7324, any sensor readings and the product level conform with their respective thresholds a divert timer may be incremented in block 7326. This divert timer may be required to increment passed a predefined value before the divert state is exited and product water may be produced for dispensation to a point of use in communication with the system 6000. If, in block 7328, the divert timer has not yet incremented passed the predefined amount, the controller may return to block 7324. Once the divert timer has incremented beyond the predefined amount, the controller 6034 may transition the system 6000 back to the water production state in block 7312.

When in the water production state, the controller 6034 may transition the system 6000 into a hot water production preparation state in block 7332, if, in block 7330, a hot water mode request is received (e.g. from a point of use device) by the controller 6034. If the product temperature and product level are in conformance with their respective thresholds in blocks 7318, 7322, and no hot water request has been received in block 7330, purified water may continue to be produced. In other embodiments, the transition to a hot water production preparation state may be automatic. These transitions may be based on a time accumulation of the timer incremented in block 7316. The hot water production preparation state may be entered in block 7332 if, in block 7334, the timer has accumulated greater than an expected usage time. Where the system 6000 is providing purified water for a medical system 6004 (see, e.g., FIG. 3), the expected usage time may be a therapy time. The therapy time may be communicated from the medical system 6004 to the controller 6034 of the system 6000 and updated if a change is made. Once the timer has incremented above the therapy time, for example, the controller 6034 may transition the system 6000 into a hot water production preparation state 7332. If, in block 7334, the timer has not incremented above the threshold, the controller 6034 may return to block 7316 and continue producing purified water.

Figure 95:
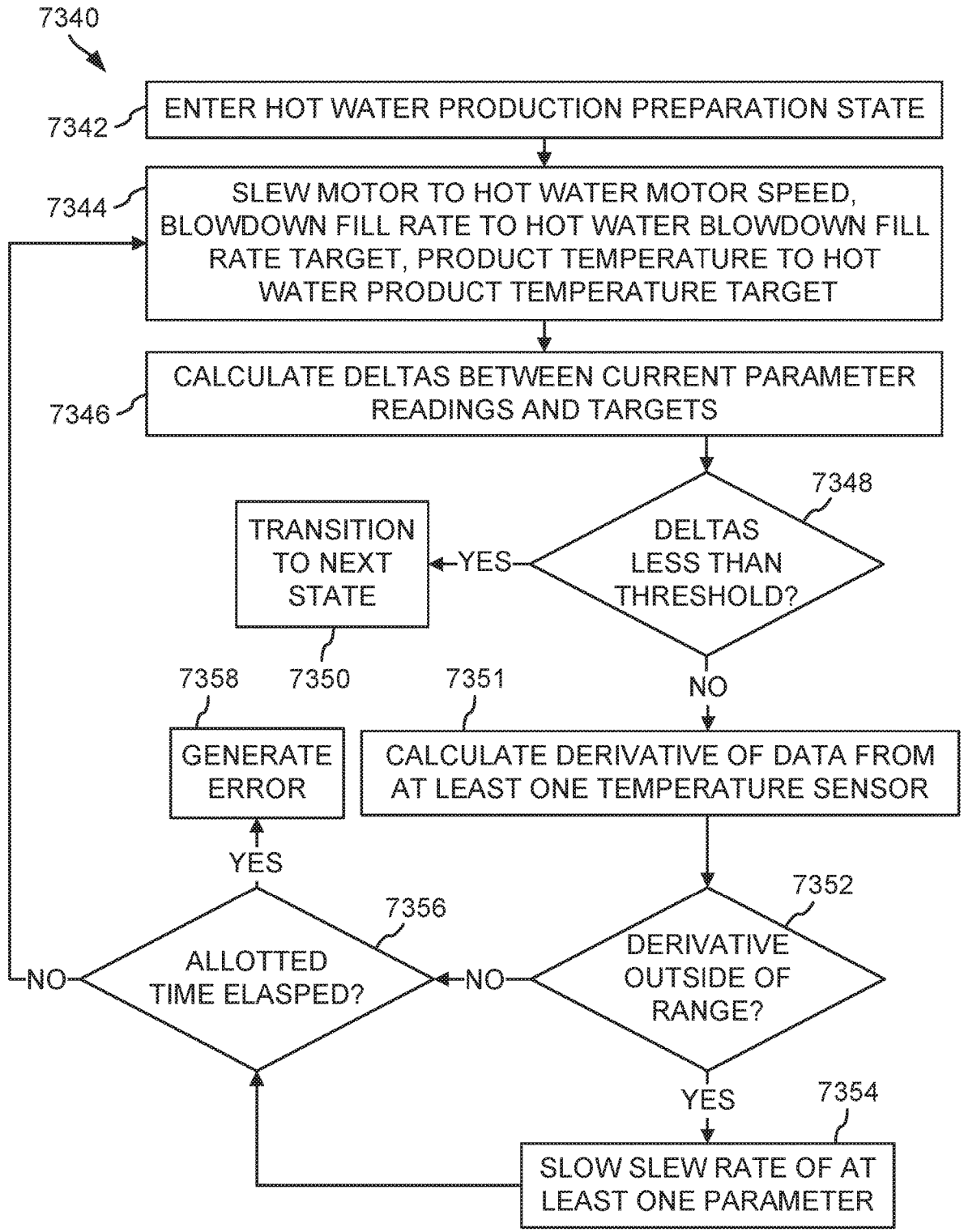
FIG. 95 depicts a flowchart detailing a number of example actions which may be used in a hot water production preparation state of a system.

Referring now primarily to the example flowchart 7340 in FIG. 95, in a hot water production preparation state, set points for a number of different parameters of the system 6000 may be altered to hot production set points over some period of time. The period of time may be a predefined period of time such as 10-20 minutes (e.g. 15 minutes). In some embodiments, each set point may be altered to its respective hot production set point over a (perhaps predefined) period of time specific to that set point. Among other parameter values, the speed of the compressor 6064 (see, e.g. FIG. 3) motor may, for example, be altered to a hot water production speed over some period of time. In certain embodiments, the hot water production speed may be slower than the speed used in normal purified water production state.

As shown, in block 7342, the controller 6034 may transition the system 6000 into the hot water production preparation state. The controller may, in block 7344, slew the set points toward respective hot water production set points. As mentioned above, the motor speed may be slew toward a hot water production motor speed. Additionally, a blowdown reservoir fill rate may be slewed toward a hot water production blowdown reservoir fill rate. A product temperature set point may be slewed toward a hot water production temperature set point. To determine the slew rate, the period of time mentioned above may be converted into a number of frames which will occur over the period. A delta between the normal production set points and the hot water production set points may be determined. This delta may then be divided by the number of frames to yield a slew increment for each frame. In block 7346, a difference between the current parameter values and the hot water production set points may be determined. If, in block 7348, the deltas for each set point are less than thresholds predetermined for each of the respective parameters, the controller 6034 may transition to the next state in block 7350. This may be a hot water production state.

If, in block 7348, the difference for each is greater than a threshold set for each respective parameter, the controller 6034 calculates a derivative based on data received from at least one temperature sensor in the system 6000 in block 7351. For example, the controller 6034 may calculate a derivative based on data received from a low pressure steam temperature sensor 6066 in block 7351. This derivative value may allow for a determination of whether the system 6000 is cooling off or increasing in temperature at an undesirable rate. If, in block 7352, the derivative is outside of a range, the controller 6034 may adjust (e.g. lower) the slew rate of at least one parameter in block 7354. For example, the slew rate of the product temperature set point may be lowered. The slew rates may be limited to be within a range which is predefined for each set point. If the derivative value is in an allowable range in block 7352 or if a slew rate has been adjusted in block 7354, the controller 6034 may check if a timer for the hot water production preparation state has elapsed. If, in block 7356, the timer has not elapsed, the controller 6034 may continue to slew the parameter set points toward their respective hot water production state targets in block 7344. If the timer has elapsed in block 7356, an error may be generated in block 7358.

In certain embodiments, the hot water production state may be used by a number of modes. For example, the hot water production state may be used to provide hot water to a point of use device or system (e.g. medical system 6004 of FIG. 3) in communication with the system 6000. The hot water production state may also be used in a self disinfect mode. In this mode, high temperature water may be passed from the purifier 6010 through various flow paths of the system 6000 for predefined period of time. In certain examples, the self disinfect mode may only flow hot water through lines which are in direct communication with purified product water carrying lines via a valve. In particular, the self disinfect mode may flow hot water though the divert line and to the drain 6018.

Figure 96:
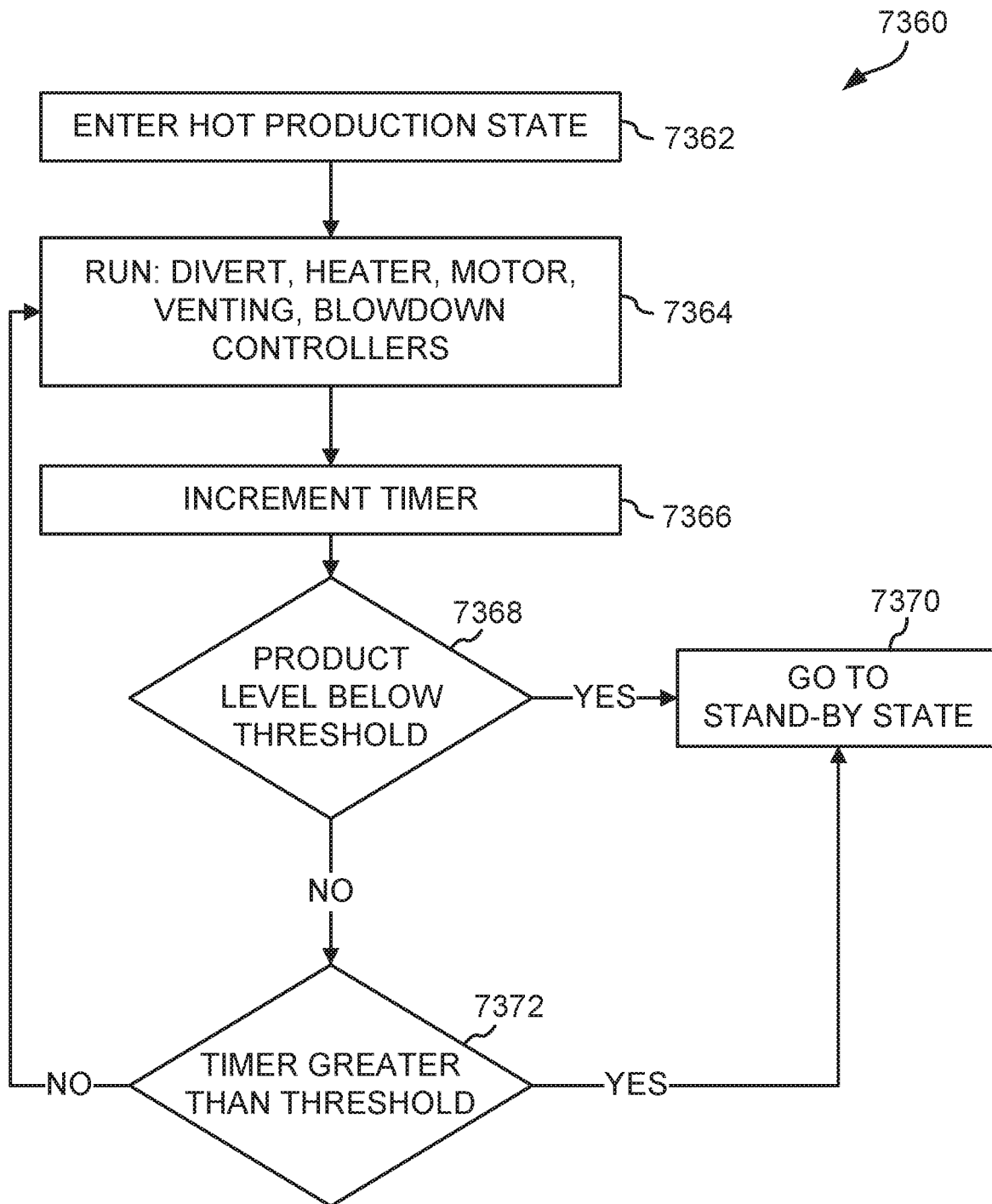
FIG. 96 depicts a flowchart detailing a number of example actions which may be used in a hot water production state of a system.

Referring now primarily to the example flowchart 7360 in FIG. 96, in a point of use hot water mode, a hot water production state may be entered in block 7362. The controller 6034 (see, e.g., FIG. 3), may run a number of controllers in block 7364. These controllers may be the same as those described above with respect to block 7314 of FIG. 94, however, different target set points, gains, feed forwards, etc. may be used.

In block 7366 a timer may be incremented. If, in block 7368, the product level falls below a minimum value, the controller 6034 may transition the system 6000 to a stand-by state. Otherwise, the controller 6034 may continue producing hot water for the point of use device or system until, in block 7372, the timer increments above a threshold (e.g. 25-40 minutes). Once the timer has incremented above the threshold, the controller 6034 may transition the device to a stand-by state. In other embodiments, the controller 6034 may transition the system 6000 to a stand-by state when the controller 6034 receives a communication from the point of use device or system that it has completed its disinfect operation.

Figure 97:
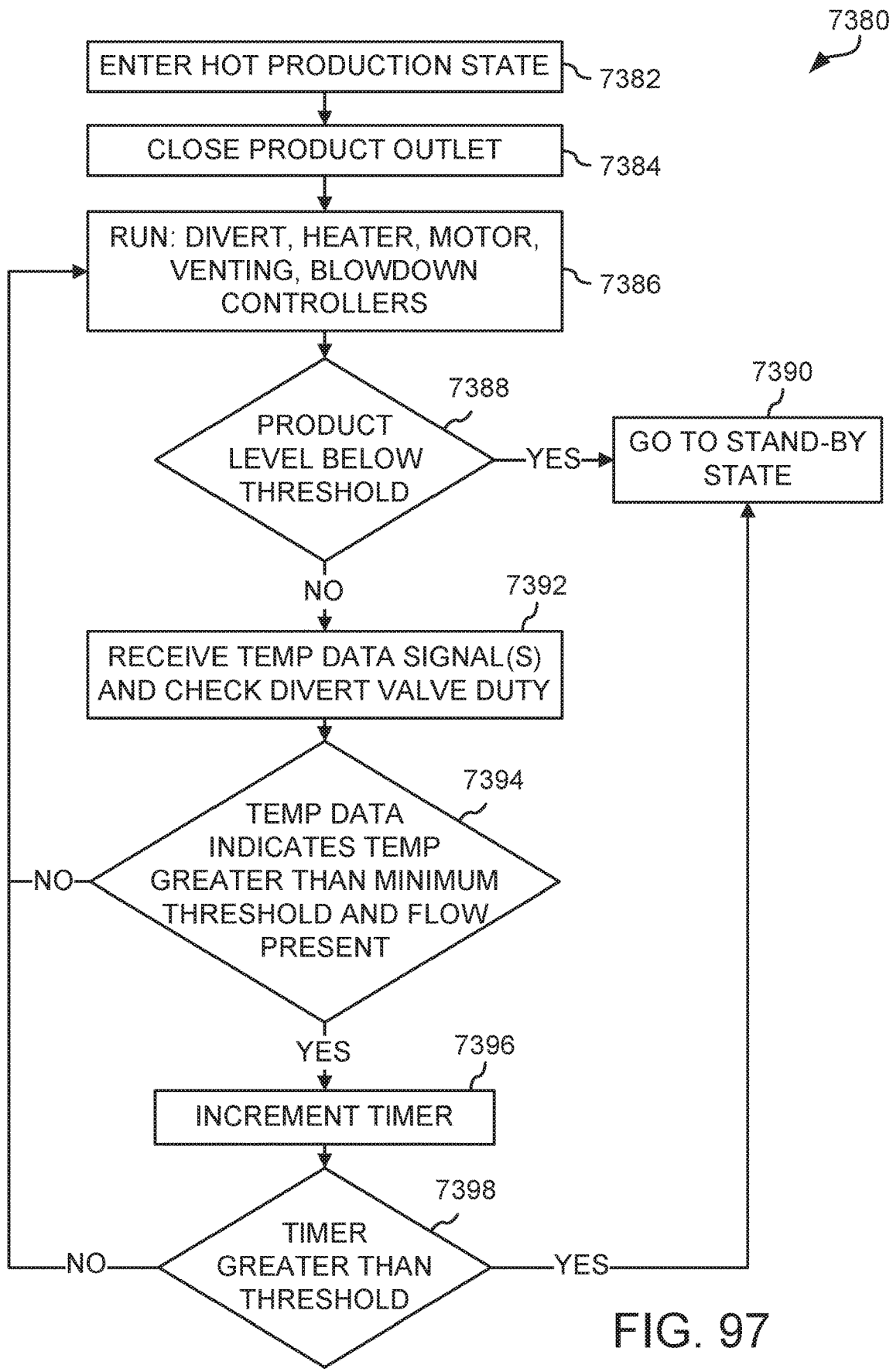
FIG. 97 depicts a flowchart detailing a number of example actions which may be used in a hot water production state of a system when the system is in a self disinfection mode.

In the self disinfect mode, and referring now primarily to the example flowchart 7380 in FIG. 97, the hot production state may be entered in block 7382. The outlet to the point of use device or system may be closed in block 7384. Hot water produced by the system 6000 may be directed to the drain 6018 by the controller 6034. This may be done as self disinfects, if performed, may typically occur after a point of use device or system has conducted its own disinfect operation. Consequentially, any lines to the point of use device should already have been disinfected by the hot water output to the point of use device or system.

The controller 6034 (see, e.g., FIG. 3), may run a number of controllers in block 7386. These controllers may be the same as those described above with respect to block 7314 of FIG. 94, however, different target set points, gains, feed forwards, etc. may be used. If, in block 7388, the product level falls below a threshold, the controller 6034 may transition the system 6000 to a stand-by mode in block 7390. Otherwise, the controller 6034 may, in block 7392, receive temperature data signals from one or more product temperature sensor (e.g. 6082A-D of FIG. 3) and check a diverter valve (e.g. 6084 of FIG. 3) duty cycle. If, in block 7394, the temperature data signal(s) indicate that the product temperature is above a threshold and a minimum amount of flow is present, a timer may be incremented in block 7396. If not, the controller 6034 may return to block 7386. The minimum temperature may be 80° C. in certain embodiments. The minimum temperature may also be defined as 10-20° C. less than the purified product water target temperature for the hot water production state. The duty cycle of the diverter valve 6084 (see, e.g., FIG. 3) may be required to be at least a certain value (e.g. 10-20%) for the controller 6034 to conclude that the minimum amount of flow is present. Once the timer has incremented above a threshold (e.g. 25-40 minutes), the controller 6034 may transition the system 6000 into a stand-by state in block 7390.

The hot water production state may also have a timeout of, for instance, an hour or more after which the controller 6034 may transition the system 6000 to stand-by. This timeout may be used regardless of whether the system 6000 is in the self disinfect mode or the point of use hot water production mode.

Figure 98:
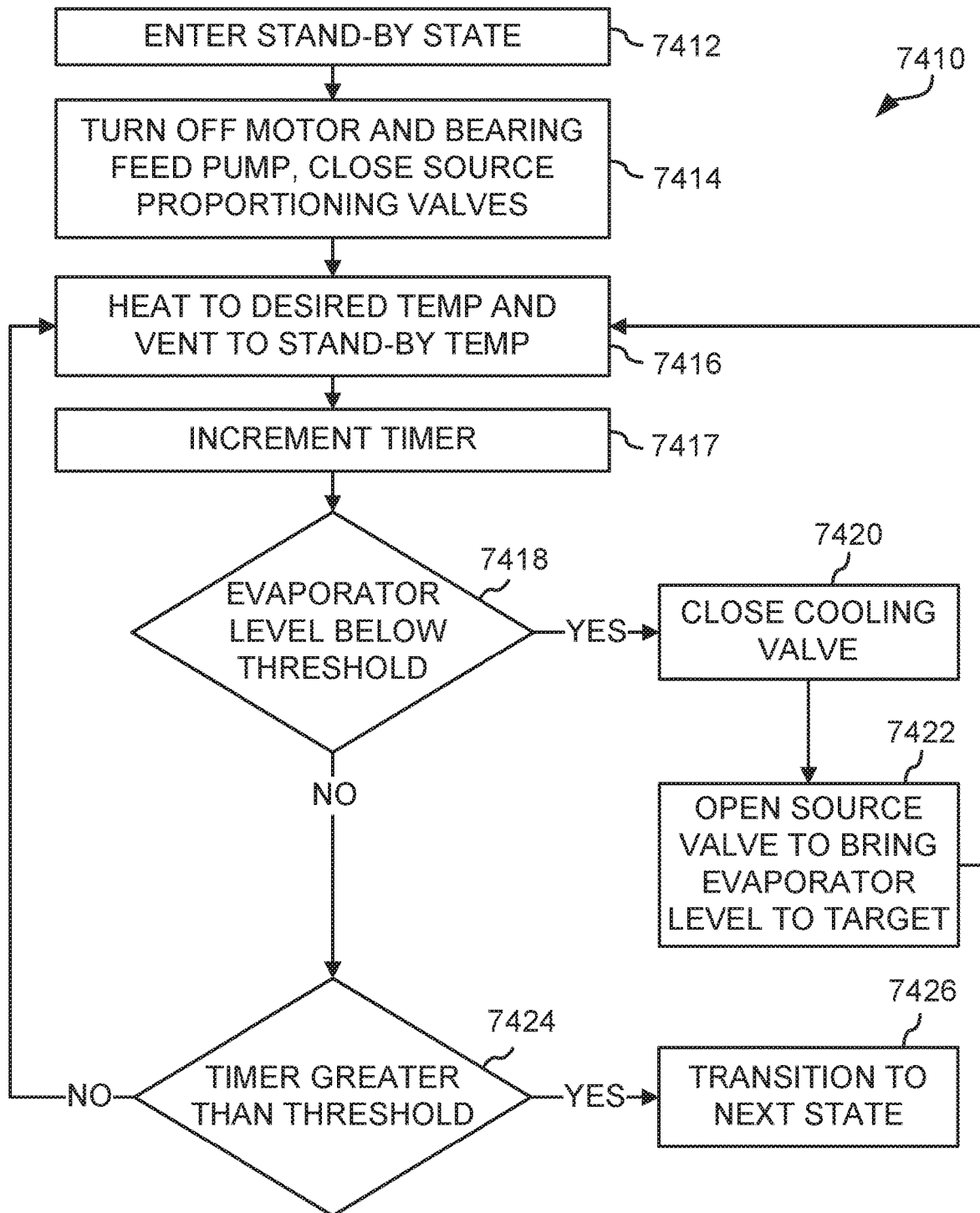
FIG. 98 depicts a flowchart detailing a number of example actions which may be used in stand-by state of a system.

Referring now primarily to the example flowchart 7410 in FIG. 98, in a stand-by state, the system 6000 may be kept up to temperature and ready to transition to production of purified water. Thus, the amount of time needed to begin purified water production may be minimized. The stand-by state may also be an intermediary state which the controller 6034 transitions the system 6000 into while waiting for a mode or state command from a point of use device or system (e.g. medical system 6004 of FIG. 3).

As shown in FIG. 98, the stand-by state may be entered in block 7412. In the stand-by state, the compressor 6064 (see, e.g., FIG. 3) motor may be turned off, and the bearing feed pump may not be run. These may be turned off or disabled in block 7414. Additionally, the source proportioning valves 6050A, B (see, e.g., FIG. 3) to the purifier 6010 may typically be closed to maintain the water level in the purifier 6010. This may also be done in block 7414. In block 7416, the controller 6034 may control the heater to keep the water in the purifier 6010 at or within range of a target temperature (e.g. 111° C.). The controller 6034 may also control the vent valve to maintain a low pressure vapor temperature target. A timer may be incremented in block 7417.

If, in block 7418, the evaporator level is below a threshold, a cooling valve gating source flow to the electronics box 6046 may be closed. In block 7422, the source proportioning valves 6050A, B to the purifier 6010 may be opened to bring the evaporator level up to the target level. This may be done, for example, as described in relation to FIG. 86. If, the evaporator is not below the threshold in block 7418, the controller 6034 may transition the system 6000 to a next state in block 7426 if, in block 7424, the timer has been incremented above a threshold. Otherwise, the controller may return to block 7416.

The threshold for the timer may be a predefined amount of downtime between two therapies in embodiments where the point of use device is a medical system 6004 (see, e.g., FIG. 3). In other embodiments, the controller 6034 may not automatically transition the system 6000 based on a timer and instead the controller 6034 may do so upon receipt of a mode change request from the point of use device or system. The next state may be a normal purified water production state.

Figure 99:
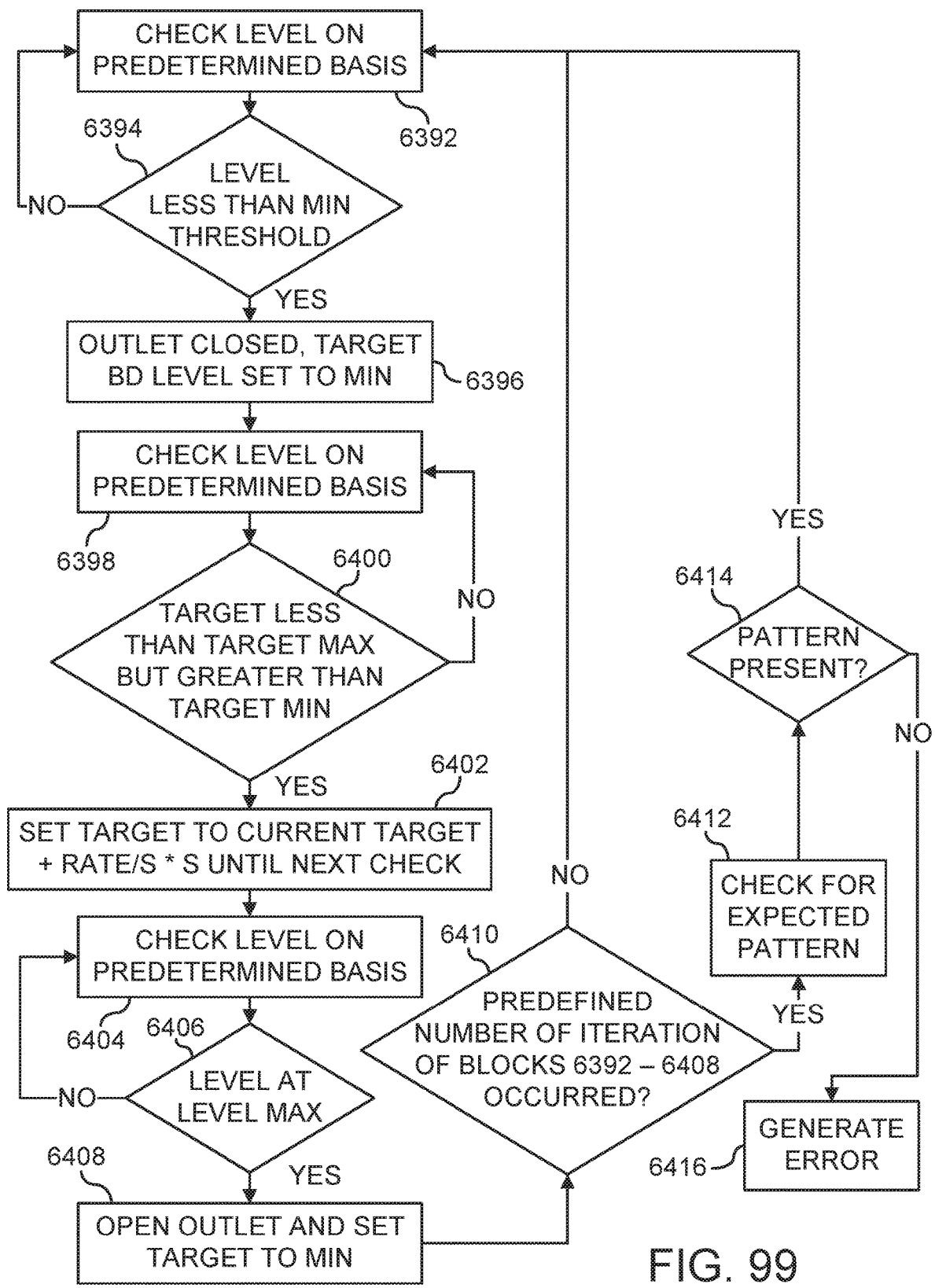
FIG. 99 depicts a flowchart detailing a number of example actions which may be used to control a liquid level in a purifier.

Referring now to FIG. 99, an example flowchart 6390 detailing a number of actions which may be executed to control a liquid level within a system 6000 is depicted. According to the flowchart 6390, the liquid level may be controlled such that it is deliberately changed over time in a pre-prescribed manner. By monitoring for this deliberate manipulation of the level in the output from a level sensing assembly monitoring the liquid level, a flow assessment may be performed. If the deliberate alteration is not reflected in data collected from the level sensing assembly, it may be deduced that a blockage, pumping issue, valve actuation issue, or similar condition may be present and an error may be generated. The liquid level may additionally be controlled to a specific level setting if desired by departing from the deliberate manipulation of the liquid level. In some embodiments, a controller 6034 (see, e.g., FIG. 2) may switch between a deliberate level alteration mode and a liquid level maintaining mode based on a predefined basis.

The volume containing the liquid level to be maintained may be in fluid communication with a reservoir including a level sensing assembly. The reservoir including the level sensing assembly may be fluidly connected to and laterally disposed with regards to a liquid volume to be controlled. The reservoir including the level sensing assembly may be disposed such that a portion of the reservoir is even with any points in a controllable range or an expected range of liquid level values at least during certain first states of operation of the purifier 6010. In some embodiments, the reservoir with the level sensing assembly may be laterally disposed but possess an inlet above the expected range of liquid level values during certain second states of operation of the purifier 6010. During the second states, liquid in the volume to which the reservoir in which the level sensing assembly is disposed may be boiling or splashing out of its expected range and into the inlet.

In some embodiments, the liquid level sensor may control the level in two volumes which are fluidically connected. For example, the liquid level sensor may directly control a liquid volume in a first volume where the sensor is located and may indirectly control a liquid level (e.g. to an acceptable or expected operational level range and not necessarily a precise volumetric level) in a second volume which is fluidically in communication with the first volume. The first volume may include at least some points (e.g. the inlet from the second volume to the first volume) which are above the acceptable operational level range of liquid in the second volume. In certain operational states, e.g. the first states described above, the expected range may differ such that the liquid level in the second volume rises to at least to the inlet of the first volume. In such scenarios, the liquid level sensor may directly control both the first and second volume's liquid levels. This may occur when a purifier 6010 is initially filled after start-up for example.

In specific examples, the liquid level to be measured may be the liquid level in an evaporator 6060 of a purifier 6010. The liquid level sensing assembly may be located in the blowdown reservoir (see, e.g., FIGS. 12-16, 63, 66). Alternatively, the liquid level to be controlled may be the liquid level in a condenser 6076 of a purifier 6010. The level sensing assembly may be located in a product reservoir 6012

(see, e.g., FIG. 37). In other embodiments, the level sensing assembly may be located in an evaporator reservoir (see, e.g., FIG. 59). In embodiments where the liquid level sensor measures two liquid levels, one directly and a second indirectly, the liquid level sensed directly may be the level in the blowdown reservoir 6014 (see, e.g. FIG. 2). The level in the steam chest 6072 (see, e.g., FIG. 2) may be sensed indirectly via the liquid level sensed in the blowdown reservoir 6014.

For purposes of example, the flowchart 6390 will be described as if the sensed level starts above a minimum threshold and an outlet to the reservoir is open to lower the liquid level. As shown, a controller 6034 (see, e.g. FIG. 2) of the system 6000 may check, in block 6392, the level indicated by the level sensing assembly on a predetermined basis. This may be a periodic preset basis (e.g. a fixed time based interval) or perhaps additionally or alternatively in response to the occurrence of a predefined event or events (e.g. valve actuations such as source valve actuations). In block 6394, the controller 6034 may determine whether the level is less than (or less than or equal to in some examples) a minimum level threshold. The thresholds described in relation to FIG. 99 are described as percentages of a maximum liquid level of the expected range or controllable range of liquid levels though need not be in all embodiments. The minimum level or threshold may be a value between 40-50% (e.g. 47.5%) in some specific embodiments. In certain other embodiments the minimum level value may be between 30-40% (e.g. 35%).

When the level is at or below the minimum threshold, an outlet valve from the reservoir containing the level sensing assembly may be actuated to a closed state by the controller 6034 in block 6396. The controller 6034 may also set a target level in block 6396. The target level may be set to the minimum level, for example. The controller 6034 may check the level on a predetermined basis in block 6398.

If the target is equal to or greater than the minimum target, but less than a maximum target in block 6400, the target may be adjusted by the controller 6034 in block 6402. The maximum target may be between 90% and 100% (e.g. 95%) of the reservoir volume in certain examples. In the example, the target is adjusted upward according to a formula. The specific formula shown sets the new target equal to:

$$Target_{current} * t * rate$$

Where $Target_{current}$ is the current target value, "t" is an amount of time until the next level sensing assembly level check, and rate is a desired amount of liquid to transfer to the reservoir containing the level sensing assembly per unit time. This rate may be preset, or may vary depending on the current state the system 6000 is in (e.g. standby, water production, disinfect, etc.). In the context of a blowdown reservoir, the rate may be a concentrate production rate which may be varied by altering the duty cycle of one or more source input valves. The rate may thus determine an amount of source fluid entering the source input of the purifier 6010. A fluid input control loop (see, e.g., FIG. 100-101C) executed by the controller 6034 may govern actuation of these valves.

The controller 6034 may check the level from the level sensor assembly on a predetermined basis in block 6404. If, in block 6406, the level is greater than or equal to a maximum level, an outlet valve to the reservoir may be opened and the target may be adjusted down in block 6408. In the example, the target level is set by the controller 6034 to the minimum level in block 6408. The maximum level used may be equal to or below the maximum target level. The maximum level may be between 50-60% (e.g. 52.5%) or between 45-55% (e.g. 50%). Alternatively, the maximum level may be between 4 and 20 percentage points greater than the minimum threshold.

If, in block 6410, the blocks 6392-6408 of the flowchart 6390 have not been repeated a predefined number of times, the flowchart 6390 may then return to block 6392 and repeat. This repetition may establish a periodic rise and fall in the level of the liquid being controlled. This periodic rise and fall may create a waveform which is generally sawtooth in nature when plotted over time. The period and shape of this waveform, in the context of a blowdown reservoir 6014, may be dependent on the concentrate production rate created by the fluid input command. In some embodiments, the predefined number of iterations may be a single iteration. If in block 6410, the blocks 6392-6408 have been repeated at least the predefined number of times, the controller 6034 may check for an expected pattern (e.g. a sawtooth-like rise and fall) in block 6412. Assuming the waveform is present, the shape and period of the waveform may also be checked against an expected nominal waveform for the current operating parameters (e.g. concentrate production). The nominal waveforms may be empirically determined. If in block 6414, the pattern is detected as expected, the flowchart 6390 may return to block 6392 and repeat. If in block 6414, it is determined that the pattern is absent, the controller 6034 may generate an error in block 6416.

In some embodiments, additional logic may be employed to prevent, for example, the blowdown reservoir 6014 from draining in certain scenarios. The controller 6034 may, for example, prohibit opening of the drain valve if the blowdown reservoir 6014 fill level is less than a certain amount. If the blowdown reservoir 6014 is empty or nearly empty, the drain valve for the blowdown reservoir 6014 may be prohibited from opening. Additionally, the controller 6034 may prevent the drain valve for the blowdown reservoir 6014 from opening if the pressure within the steam chest 6072 (e.g. as determined from the signal from sensor 6066 of FIG. 2) is below a predetermined value. Likewise, if the pressure is above the predetermined value and the level in the blowdown reservoir 6014 is above a predefined limit (e.g. the reservoir is flooded), the controller 6034 may override the control loop and actuate the drain valve for the blowdown reservoir 6014 to the open position.

The controller 6034 may also track an amount of time which the drain valve, for example, to the blowdown reservoir 6014 has been in the open position. In the event that the drain valve to the blowdown reservoir 6014 has remained open for greater than a predefined period of time, an error may be generated in block 6416. The predefined amount of time may, for example, be between 2 and 7 minutes (e.g. 5 minutes). The controller 6034 may also generate a notification if the reservoir has been draining for more than a second predefined amount of time. The second predetermined amount of time may be less than the first. In some embodiments, the second predetermined amount of time may be between 1-3 minutes (e.g. 2 minutes).

The controller 6034 may also track the amount of time taken for a reservoir such as the blowdown reservoir 6014 to fill. For example, if the drain valve for the blowdown reservoir 6014 is closed and the level in the blowdown reservoir 6014 is below the target level for more than a predetermined time limit, an error may be generated in block 6416. The predefined amount of filling time may, for example be between 5 and 15 minutes (e.g. 10 minutes). Alternatively, the predefined amount of filling time may be at least twice the first predefined amount of draining time.

The controller 6034 may only monitor for this excess filling time when the system 6000 is in certain operational states. For example, during a start-up state for hot water production (e.g. for disinfection of a medical system 6004), the controller 6034 may not generate an error if the predefined amount of fill time is exceeded. Alternatively, a second predefined amount of fill time greater than the first predefined amount of fill time may be employed in such operational states. In the event the blowdown reservoir level sensor 6074 returns a value greater than a predetermined value designated as a maximum fill level, the controller 6034 may actuate source valves providing fluid the purifier 6010 to the closed state.

Figure 100:
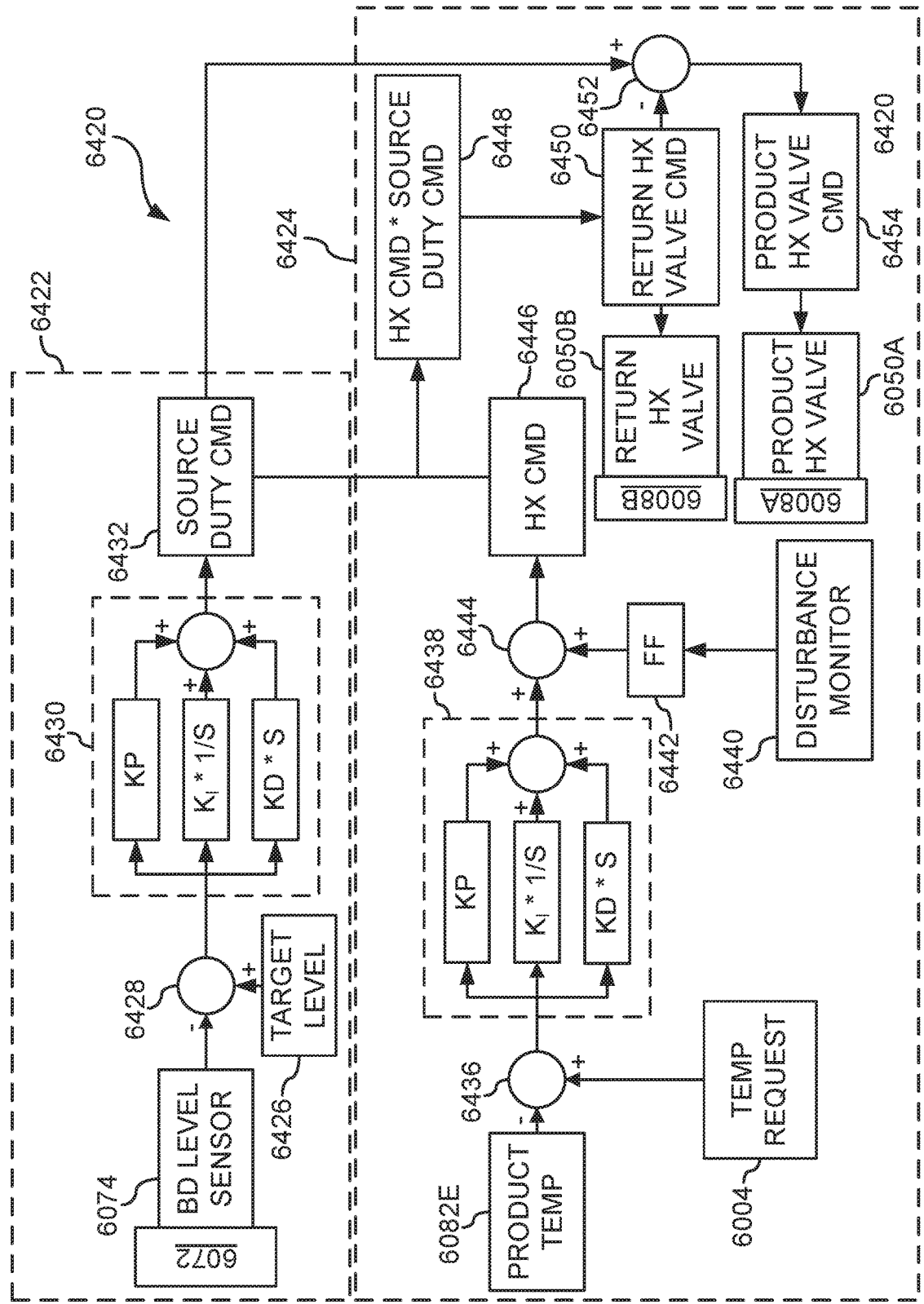
FIG. 100 depicts an example product temperature control diagram.
Figure 101A:
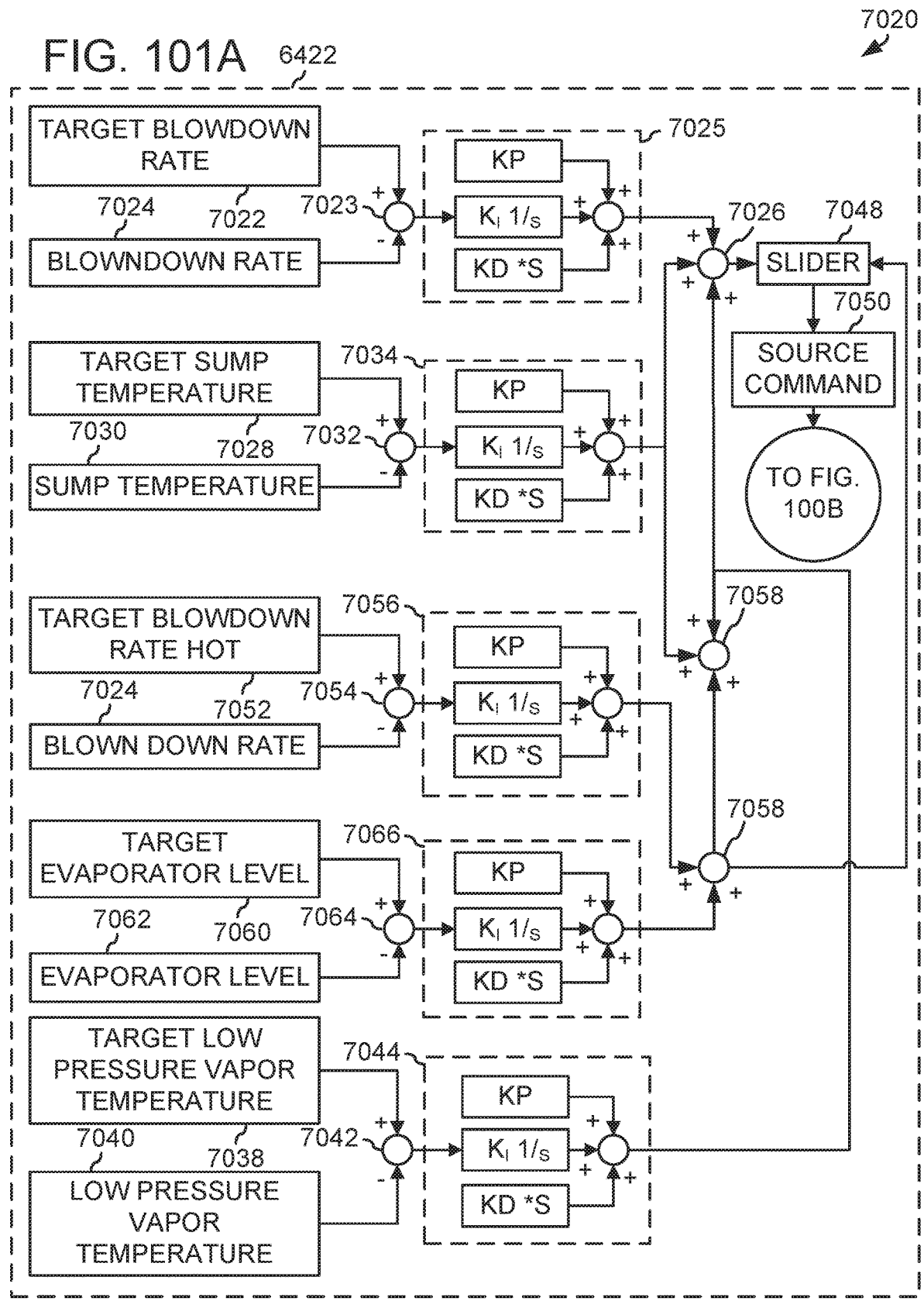
FIGS. 101A-B depict another example product temperature control diagram.
Figure 101B:
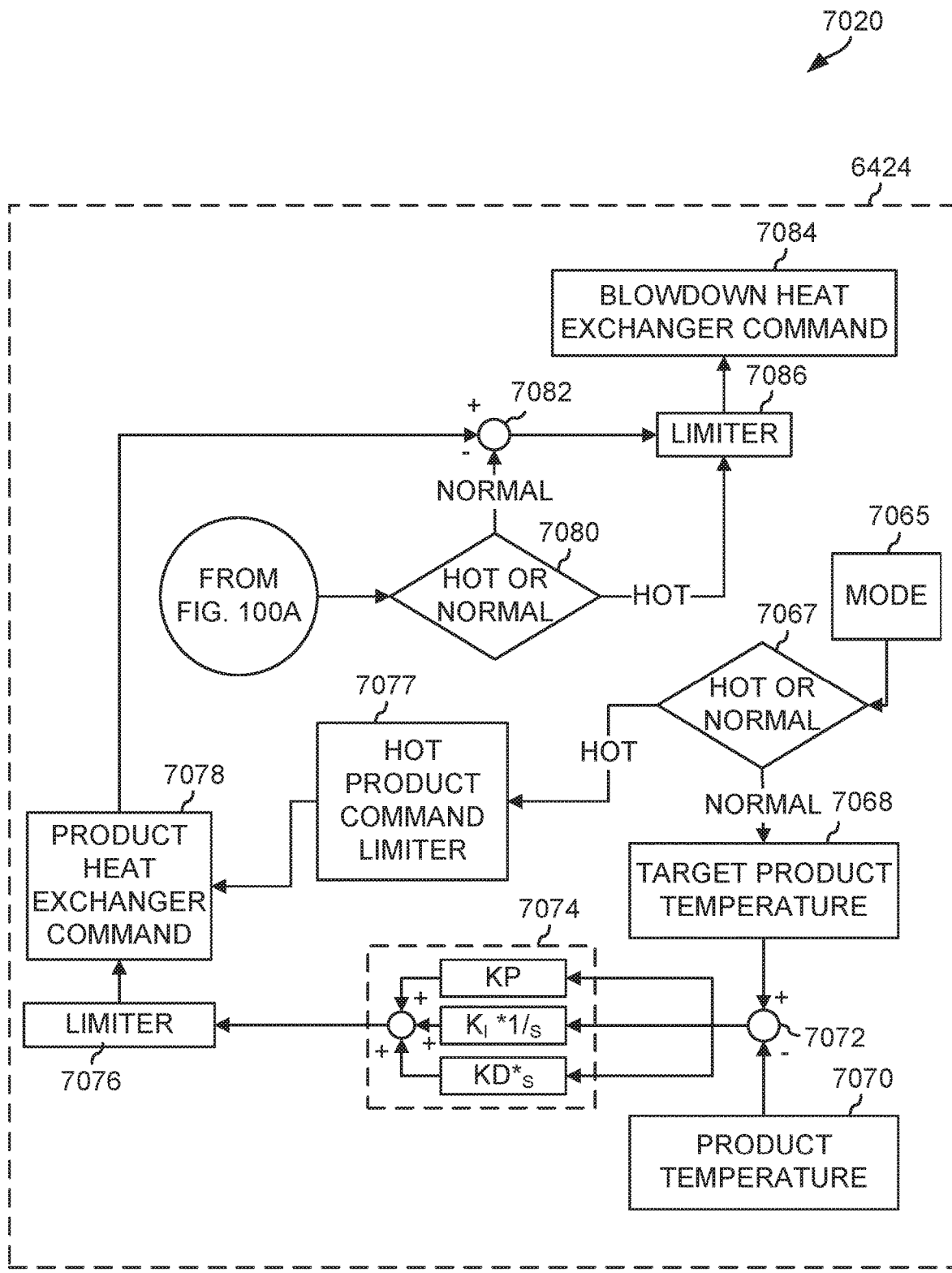
Figure 101C:
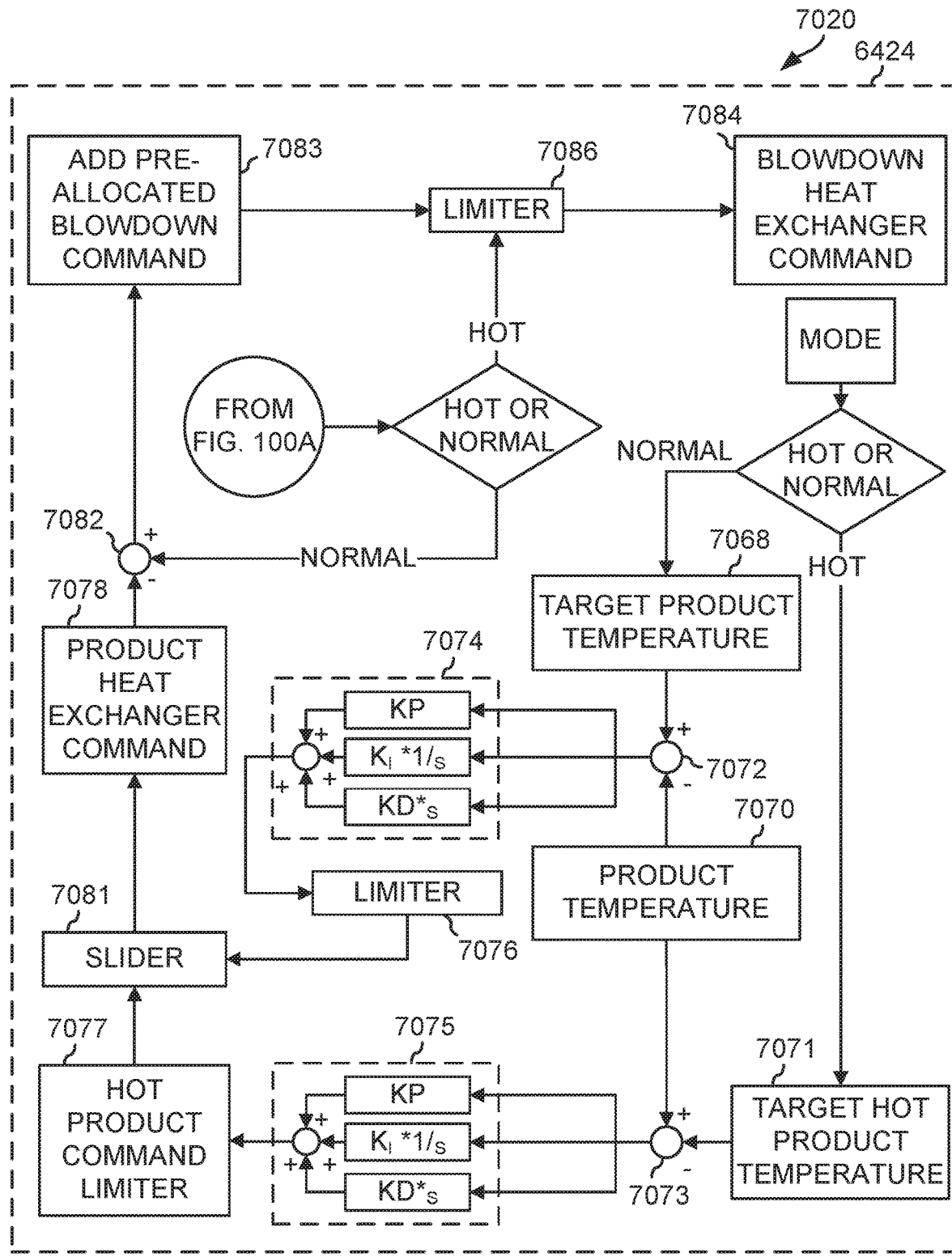
FIG. 101C depicts an alternative temperature control diagram to the portion of a control diagram presented in FIG. 101B where both product and blowdown temperature are controlled.

Referring now to FIGS. 100-101C a number of control diagrams 6420, 7020 detailing example control systems are shown. These control systems may be used to control the temperature of one or more process stream within a system 6000 to a respective target temperature or temperature range by altering a flow of input source fluid through a plurality of process stream heat exchangers 6008A, B (see, e.g. FIG. 3). A controller 6034 (see, e.g., FIG. 2) may collect temperature data on at least one process stream exiting the plurality of heat exchangers 6008A, B and use the data to divide a mass flow or total amount of incoming source liquid between the heat exchangers 6008A, B. As the input source fluid is cooler than the output streams of the purifier 6010, increasing the amount of input source fluid flowing through a heat exchanger 6008A, B will lower the temperature of the process stream exiting the heat exchanger 6008A, B.

These control diagrams 6420, 7020 may for example be implemented in a system 6000 (see, e.g. FIG. 3) producing purified product water for a destination system such as a medical system 6004. The destination system may generate a temperature request which is provided as the target temperature or temperature range for the product process stream output from the system 6000 or this target temperature may be determined by the controller 6034 depending on, for example a temperature measurement of the incoming source fluid (see, e.g. FIG. 127). The product water may be controlled to a target temperature or temperature range by altering the flow of source water through a product and blowdown heat exchanger 6008A, B (see, e.g. FIGS. 6-9 or FIGS. 56 and 57). In some examples, the temperature of the blowdown exiting the purifier 6010 may also be controlled to a target temperature in the same manner allowing for heat to be efficiently recovered by the system 6000 and lowering overall power consumption.

The control diagrams 6420, 7020 shown each include a fluid input control system or loop 6422 and a flow splitting control system or loop 6424. The fluid input control loop 6422 may control an overall amount of source water passing through the heat exchangers 6008A, B and entering the purifier 6010. To do this, the fluid input control loop 6422 may govern the total or cumulative amount of time the source input valves are in an open state for a given interval. The flow splitting control system or loop 6424 may control the proportion of the source water directed through each of the heat exchangers 6008A, B. In other words, the flow splitting control loop 6424 may control the proportion of the total amount of open state time (output by the fluid input control loop 6422) that each of the individual source input valves is to be allocated.

Referring specifically to the fluid input control loop 6422 in FIG. 100, the set point may be established based at least in part on a target blowdown level within a steam chest 6072 of the purifier 6010. A target level calculator 6426 may determine the target blowdown level similarly to as described above in relation to FIG. 99 or below as described in relation to FIG. 104. This target level may be passed to a summer 6428. A current blowdown level, as determined from data provided from a blowdown level sensor 6074 may also be provided to the summer 6428. Summers described herein, including summer 6428, combine their various inputs into an output; use of the word "summer" anywhere herein shall not be construed to mean addition only must be performed.

At the summer 6428, a difference between the current blowdown level and target blowdown level may be found. This output or error value may be passed to a PID controller 6430 which outputs a source duty cycle command 6432. The source duty cycle command 6432 may govern the overall or total flow of source fluid into the system 6000. It should be noted that the gains used for the proportional, integral, and derivative terms of the PID controller 6430 may vary depending on the embodiment, and at least one may potentially be set to zero (e.g. the derivative term).

In some embodiments, the fluid input control loop 6422 may also receive data from a heater control loop (not shown in FIG. 100). For example, the fluid control loop 6422 may receive the duty cycle command issued for the heating element 6054. Depending on the heating element duty cycle command, the fluid control loop 6422 may adjust its output. If the heating element duty cycle is above a predetermined threshold, the source duty command 6432 may be attenuated. For example, when the heating element duty cycle is above a predetermined threshold (e.g. 100% duty cycle), the source duty cycle command 6432 may be set to zero or a fraction of the source duty command 6432 generated from the fluid input control loop 6422. This may help to avoid quenching the evaporator 6060 of the purifier 6010. Alternatively or additionally, the compressor speed may be incremented upward as the heater duty cycle command gets larger.

Referring to the flow splitting control system 6424, a set point may be established based at least in part on a temperature request provided from a medical system 6004. This temperature request may vary depending on an operating mode or state of the medical system 6004. The medical system 6004 may have a first, low temperature operating mode and a second, high temperature operating mode. The low temperature mode may be a therapy mode which generates a temperature request at around or somewhat below (e.g. 20-30° C.) normal human body temperature. The high temperature mode may be a disinfection mode which generates a temperature request at a temperature sufficient to cause disinfection of targeted components of the medical system 6004. The high temperature mode may also be used for self-disinfection of the system 6000. The disinfection mode temperature request may depend on the intended contact time of the delivered product water and may be at least, for example, 60° C. but below boiling point (e.g. 96° C.). Alternatively, the destination system may set a production mode for the system 6000 instead of sending a specific temperature set point. The system 6000 may control the temperature to a set point or range defined for that mode. The system 6000 may also control the temperature to a set point or range defined for a state which is used by the controller 6034 in that particular mode. Various modes and states are described in greater depth elsewhere herein. The same source 6002 (see, e.g. FIG. 3) may be used in the low temperature and the high temperature mode. This source may be a non-temperature controlled fluid source. In certain embodiments, the system 6000 may optionally also draw from a hot water source (e.g. residential hot water tank) particularly in the high temperature mode.

The temperature request along with a product or condensate output temperature determined from data provided by a product output sensor 6082E may be passed to a summer 6436 where the difference between the two is determined. The summer 6436 output may then be passed to a temperature PID controller 6438 to generate an output. It should be noted that the gains associated with proportional, integral, and derivative terms of the PID controller 6438 may vary depending on the embodiment. As with the source PID controller 6430 (and all other PID controllers describe herein), at least one of the gains for this PID controller may be set to zero (e.g. the derivative term).

At least one disturbance monitor 6440 may also be included in some embodiments. The disturbance monitor may provide data related to the monitored disturbance to a feed forward controller 6442. The feed forward controller 6442 may generate a disturbance compensation output which is passed to a summer 6444. Where multiple disturbances are monitored, each disturbance may be associated with its own feed forward controller. The multiple compensation outputs from the plurality of feed forward controllers may be combined in a feed forward summer (not shown) before a combined compensation output is provided to summer 6444. Alternatively, the feed forward controller 6442 may be based off of rough estimate of what the heat exchanger command should be. This rough estimate may be empirically determined. In such cases, the feed forward controller 6442 may allow the flow splitting control system 6424 to more rapidly make adjustments to reach the target temperature under certain conditions. For example, such a feed forward term may help get the flow splitting control system 6424 to achieve the desired temperature set point quickly upon start-up.

At the summer 6444, the output of the temperature PID controller 6438 and the disturbance compensation output may be added together to generate a heat exchanger command 6446. The heat exchanger (HX) command 6446 may then be used to compute the amount of incoming source water which will flow through each of the heat exchangers 6008A, B. In the example embodiment, the heat exchanger command 6446 may be multiplied by the source duty cycle command 6432 in a product generator 6448. The resulting product may be used as the blowdown heat exchanger command 6450 (referred to as return HX in FIG. 100). The blowdown heat exchanger command 6450 may also be subtracted from the original source duty command in summer 6452 to yield the product heat exchanger command 6454. The blowdown and product heat exchanger commands 6450, 6454 may be used to respectively control a blowdown portioning valve 6050B and product portioning valve 6050A. Through this proportioning, the temperature of the product water generated for the medical system 6004 and exiting the product heat exchanger 6008A may be controlled to the temperature request. When no product water is flowing through the product heat exchanger, all source water may be routed through the blowdown heat exchanger. Alternatively, in some embodiments, a small fraction of the source water may continue to flow through the product heat exchanger 6008A.

Referring now to the example control diagrams 7020 shown in FIGS. 101A-C, a fluid input control loop 6422 may be a multimodal control loop. In such embodiments, the fluid input control loop 6422 may output multiple provisional values for a source duty cycle command. These values may then be used to determine a single source duty cycle command 7050. This single source duty cycle command 7050 may be a hybrid command composed based off two or more of the provisional values. Where such a hybrid command is used, the contributions of the provisional commands to the single source duty cycle command may be weighted. For example, 30% of a first provisional command may be added to 70% of a second provisional command to arrive at the single source duty cycle command 7050. The percentages may be altered during operation, based on operational state or mode changes, sensor data, communications from a point of use system, etc. A controller 6034 of the system 6000 may also use one of the provisional commands as the single source duty cycle command 7050 with any other provisional commands having no effect on the single source duty cycle command 7050. In other words, 100% of one provisional command and zero percent of any other commands may be added together to generate the single source duty cycle command 7050.

In certain embodiments, the number of provisional source command duty cycles may be equal to the number of modes or states in which a purifier 6010 may generate purified water. For example, the controller 6034 may generate purified water in a hot mode (e.g. for disinfection of a medical system 6004 or the system 6000 itself) and a normal mode. In such embodiments and as shown in FIG. 101A, the fluid input control loop 6422 may output a provisional value for each of these production modes. Though two are described in relation to FIG. 101A, a greater number of provisional commands may be generated for other embodiments.

As shown, the set point or source duty cycle command 7050 for the fluid input control loop 6422 may be established based in part on a target blowdown rate from the purifier 6010. A target rate calculator 7022 may determine the target blowdown rate (further described in relation to FIG. 104). In other embodiments, the target rate may be a predefined value. This target rate may be passed to a summer 7023. A current blowdown rate 7024, as determined from data provided from a blowdown level sensor 6074 may also be provided to the summer 7023 (further described in relation to FIGS. 102-103). At the summer 7023, a difference between the current blowdown rate 7024 and target blowdown rate may be found. This output or error value may be passed to a PID controller 7025 which outputs a first provisional source duty command to a summer 7026. It should be noted that the gains used for the proportional, integral, and derivative terms of the PID controller 7025 may vary depending on the embodiment, and at least one may potentially be set to zero (e.g. the derivative term).

In some embodiments, the PID controller 7025 may alter its output value based on a feed forward term before passing the first provisional duty cycle command to the summer 7026. This feed forward term may be based off an amount of source duty cycle command pre-allocated to recover heat from the blowdown passing through the blowdown heat exchanger 6008B. For example, the pre-allocated source duty cycle command for the source blowdown proportioning valve 6050B may be subtracted from the output value of the PID controller 7025 and the result may be passed to summer 7026. In some embodiments, a minimum amount of incoming source water may be required to flow through the blowdown heat exchanger 6008B and the blowdown temperature may be controlled to a predefined range (see, e.g. FIG. 130) by altering an amount of source water flowing through the blowdown heat exchanger 6008B. The feed forward term may pre-allocate a portion of the source duty cycle command generated by the PID controller 7025 to ensure the minimum amount of source flow through the blowdown heat exchanger 6008B and allot an amount of duty cycle to achieve control to the desired temperature. Where an electronics box 6064 (see, e.g. FIG. 3) may be cooled by incoming source water directed to the blowdown heat exchanger 6008B (see, e.g. FIG. 129) the feed forward term may similarly pre-allocate a portion of the incoming source water for this purpose.

In certain embodiments, and as shown in FIG. 101A, the fluid input control loop 6422 may also generate a second provisional source duty cycle command. This second provisional source duty cycle command may be based in part on a target blowdown rate for hot water production. A target hot water production blowdown rate calculator 7052 may determine the target rate. Alternatively, the target blowdown rate for this mode may be a predefined value. This target rate may be passed to a summer 7054. The current blowdown rate 7024, may also be provided to the summer 7054. At the summer 7054, a difference between the current blowdown rate and the target may be found. This output or error value may be passed to a hot production PID controller 7056 which provides an output to summer 7058. It should be noted that the gains used for the proportional, integral, and derivative terms of the hot production PID controller 7056 may vary depending on the embodiment, and at least one may potentially be set to zero (e.g. the derivative term).

The second provisional source duty cycle command may also be based in part on a target level for the evaporator in hot water production. The evaporator target level 7060 may be a predefined value in certain embodiments. This target level may be passed to a summer 7064. A current evaporator level 7062, as determined from data provided from an evaporator level sensor 6073 (see, e.g., FIG. 3) may also be provided to the summer 7064. At the summer 7064, a difference between the current evaporator level 7062 and the target level 7060 may be found. This output or error value may be passed to an evaporator controller 7066 which provides an output to summer 7058. The summer 7058 may combine the output of the evaporator controller 7066 and the hot production PID controller 7056 into the second provisional source duty cycle command. This command may be passed to summer 7036.

In some embodiments, the evaporator controller 7066 may be a PID controller. It should be noted that the gains used for the proportional, integral, and derivative terms of the evaporator control 7066 may vary depending on the embodiment, and at least one may potentially be set to zero. The evaporator controller 7066 may be predominantly a derivative controller. In some embodiments, the evaporator controller 7066 may be a PD controller with the gain on the P term being significantly smaller (e.g. 1-2 or more orders of magnitude) than the D term gain. A target level for the evaporator level may also be used as just described for the generation of the first provisional source duty cycle command as well (not shown).

In some embodiments, the fluid input control loop 6422 may also receive data from a heater control loop. For example, the fluid control loop 6422 may receive the target sump temperature 7028 and current sump temperature 7030 and feed them to a summer 7032 which determines a delta between these values. Depending on the values of the target sump temperature 7028, current sump temperature 7030, and/or the delta, the fluid control loop 6422 may adjust its output. The determination of whether to apply an adjustment may be made by the controller 6034 as described in relation to FIG. 105A, B for example. If an adjustment is to be made, a sump adjuster controller 7034 may generate an adjustment output based on an input from the summer 7032. The sump adjuster controller 7034 may be a PID loop. Depending on the embodiment, the gains on one or more of the terms for the PID loop may be set to zero. For example, the sump adjuster controller 7034 may have the integral and derivative term gains set to zero. In such embodiments, the sump adjuster controller 7034 may behave as a P controller. The output from the sump adjuster controller 7034 may be provided to two summers 7036, 7026.

Additionally, in some embodiments, the fluid input control loop 6422 may also receive data from a compressor motor control loop. For example, the fluid control loop 6422 may receive the target low pressure vapor temperature 7038 and current low pressure vapor temperature 7040. These values may be fed to a summer 7042 which determines a delta between the values. Depending on the values of the target low pressure vapor temperature 7038, current low pressure vapor temperature 7040, and/or the delta, the fluid control loop 6422 may adjust its output. The determination of whether to apply an adjustment may be made by the controller 6034 as described in relation to FIG. 105A, B for example. If an adjustment is to be made, a low pressure vapor adjuster controller 7044 may generate an adjustment output based on an input from the summer 7042. The low pressure vapor adjuster controller 7044 may be a PID loop. Depending on the embodiment, the gains on one or more of the terms for the PID loop may be set to zero. For example, the low pressure vapor adjuster controller 7044 may have the integral and derivative term gains set to zero. In such embodiments, the low pressure vapor adjuster controller 7044 may behave as a P controller. The output from the low pressure vapor adjuster controller 7044 may be provided to two summers 7036, 7026. Any adjustments from the sump adjuster controller 7034 and low pressure vapor adjuster controller 7044 may be used to alter the first and second provisional duty cycle commands at summers 7026 and 7036 respectively. After any adjustment, the provisional duty cycle commands may be provided to a slider 7048.

The slider 7048 may allow the source duty cycle command 7050 output from the source input control loop 6422 to be a hybrid between different provisional source commands generated by the source input control loop 6422. The slider 7048 may also allow for one of the provisional source duty cycle commands to be ignored. For example, when the system 6000 is in a hot purified water production mode or state, the first provisional source duty cycle command may have little if any impact on the source duty cycle command 7050. Likewise, when the system 6000 is in a normal purified water production mode or state, the second provisional source duty cycle command may have little if any impact on the source duty cycle command 7050. During a transition between two modes or state, the slider 7048 may slowly adjust the command from purely or predominately one of the provisional duty cycle commands to purely or predominately the other of the provisional duty cycle commands. The adjustment may be based off a predefined increment amount per frame for example. A similar slider 7018 (see FIG. 101C) may be used for provisional source proportioning commands to the product heat exchanger 6008A.

Using the example of a provisional source command for the hot mode or state and a provisional source command for a normal mode or state, the controller 6034 may determine a hot fraction and normal fraction for the slider 7048 to use. The provisional source commands may then be multiplied by their respective fractions and subsequently added together to determine the source duty cycle command 7050. When in the normal mode, the hot mode fraction may be zero. When in the hot mode, the normal mode fraction may be zero. During transition from one mode to the other, the new mode fraction may be incremented according to a slew rate limit and the old mode fraction may decremented according to that limit. This may continue until the new mode fraction has been incremented to 100% and the old mode fraction has been decremented to 0% in some examples.

Referring to the flow splitting control system 6424, a set point may be established based at least in part on a temperature request or production mode setting provided from a point of use system such as a medical system 6004. This temperature request or production mode setting may vary depending on an operating mode or state of the medical system 6004. The controller 6034 of the system 6000 may determine a target temperature 7068 from the temperature request or production mode setting 7065. The target temperature may also be determined as described in relation to FIG. 127 in certain examples.

If, at block 7069, the system 6000 is currently in a normal water production mode, the target temperature 7068 along with a product or condensate output temperature 7070 determined from data provided by a product output sensor (e.g. one or more of sensors 6082A-D of FIG. 3) may be passed to a summer 7072 where the difference between the two is determined. The summer 7072 output may then be passed to a temperature PID controller 7074 to generate an output. It should be noted that the gains associated with proportional, integral, and derivative terms of the temperature PID controller 7074 may vary depending on the embodiment. At least one of the gains for the temperature PID controller 7074 may be set to zero (e.g. the derivative term).

The output of the temperature PID controller 7074 may be limited to a minimum and maximum value at a limiter 7076 to generate a product heat exchanger command 7078. If, in block 7080, the system 6000 is in normal production mode or state, the product heat exchanger command may be subtracted from the total source duty cycle command 7050 at summer 7082. The remaining portion of the source duty cycle command 7050 or commanded source flow may be allocated to the blowdown heat exchanger command 7084. The output of summer 7082 may be limited by a limiter 7086 to a minimum and maximum value before being set as the blowdown heat exchanger command 7084.

In some embodiments, as shown in FIG. 101C, some amount of source duty cycle command may be pre-allocated for the blowdown heat exchanger 6008B. This may allow for greater heat recovery and more efficient cooling of an electronics box 6046 in the system 6000 among other things. Further description is provided above and in relation to FIG. 130. This pre-allocated command may be added to the output of summer 7082 in block 7083. The output of block 7083 may be limited by a limiter 7086 to a minimum and maximum value before being set as the blowdown heat exchanger command 7084.

If the system 6000 is in a hot water production mode or state, the entire source command duty cycle 7050 or commanded source flow may be allocated (after limiting by a limiter 7086) to the blowdown heat exchanger command 7084. The product heat exchanger command 7078 may be independent of the source input control loop 6422. The limiter 7077 for the product heat exchanger command 7078 in the hot production mode or state may limit the product heat exchanger command to a low value (e.g. less than 5% and in some embodiments a 2% duty cycle) so that added incoming source fluid (in addition to that called for by the source input control loop 6422) does not have a problematic effect on blowdown rate control.

In some embodiments and as shown in FIG. 101C, a target temperature 7071 along with a product or condensate output temperature 7070 may be passed to a summer 7073 where the difference between the two is determined. The summer 7073 output may then be passed to a hot temperature PID controller 7075 to generate an output. It should be noted that the gains associated with proportional, integral, and derivative terms of the hot temperature PID controller 7075 may vary depending on the embodiment. At least one of the gains for the hot temperature PID controller 7075 may be set to zero (e.g. the derivative term). The limiter 7077 for the product heat exchanger command 7078 in the hot production mode or state may limit the product heat exchanger command similarly to as described above. A slider 7081 like that described in relation to FIG. 101A may be used to facilitate a smooth transition of the product heat exchanger command 7082 as the system 6000 shifts from a normal temperature water production state to a hot water temperature production state.

The blowdown and product heat exchanger commands 7078, 7084 may be used to respectively control a blowdown portioning valve 6050B and product portioning valve 6050A (see, e.g. FIG. 3). Through this proportioning, the temperature of the product water generated for the medical system 6004 and exiting the product heat exchanger 6008A may be controlled to the temperature target.

Figure 102:
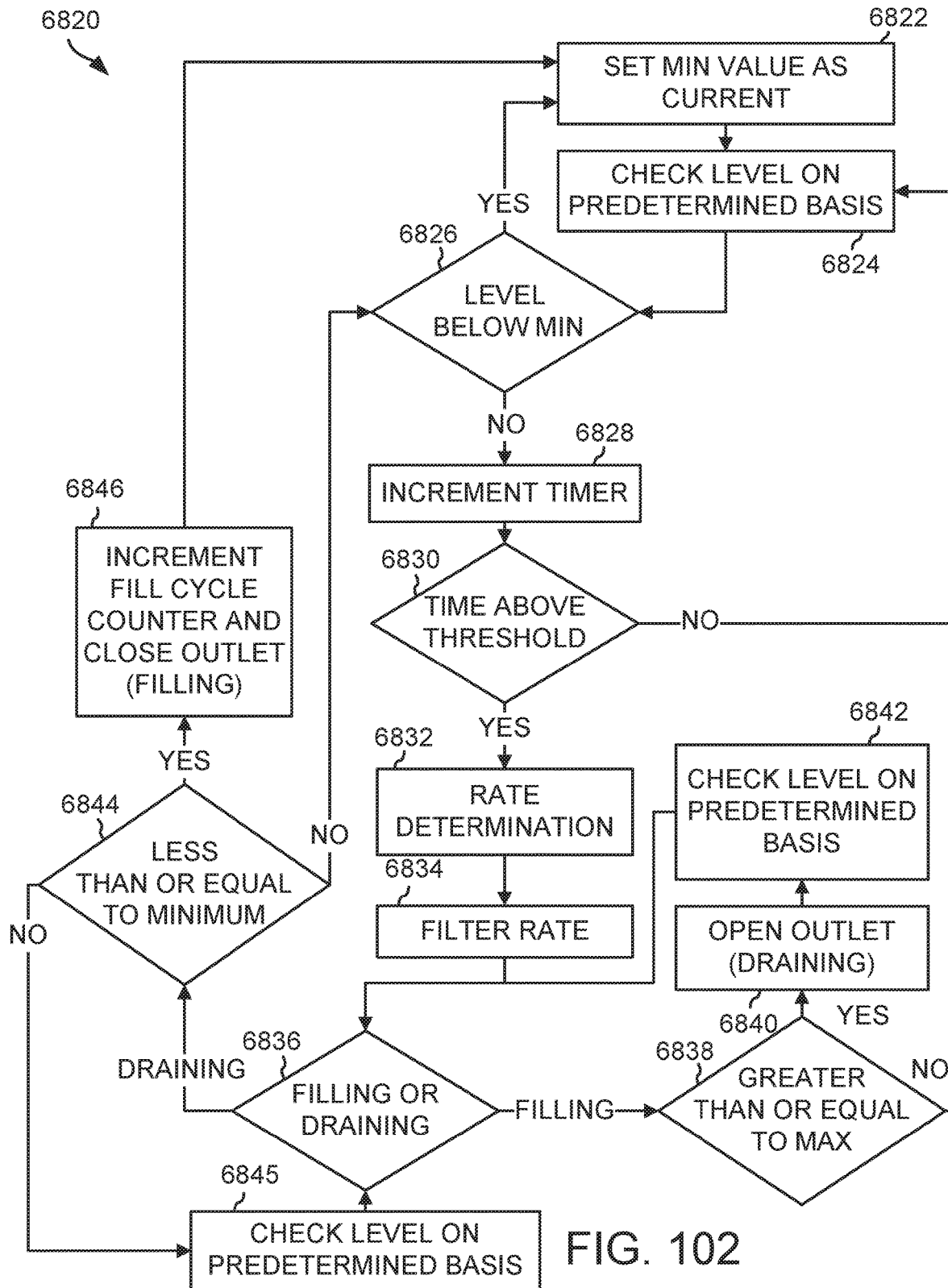
FIG. 102 depicts a flowchart detailing a number of example actions which may be used to determine a fill rate of a reservoir.

Referring now to FIG. 102, a flowchart 6820 detailing a number of example actions which may be executed to determine a fill rate of a reservoir and control an outlet valve to the reservoir is depicted. In certain embodiments, the reservoir may be the blowdown reservoir 6014 (see, e.g., FIG. 3) of the system 6000. The flowchart 6820 will be described as if the sensed reservoir level starts at a minimum level after the reservoir has just finished draining.

As shown, in block 6822, the controller 6034 (see, e.g. FIG. 3) may set a minimum level value as the current level value. The level value may be read from a reservoir level sensor, such as a blowdown level sensor 6074 if the reservoir is the blowdown reservoir 6014. In block 6824, the controller 6034 may check the liquid level in the reservoir. This may be done on a predetermined basis, for example, every second or every number of seconds. If, in block 6826, the liquid level is below the minimum set in block 6822, the flowchart 6820 may return to block 6822 and set the minimum as the current level. If, in block 6826, the level is above the minimum level, a timer may be incremented in block 6828. If, in block 6830, the timer has not been incremented above a threshold the controller 6034 may continue checking the liquid level and return to block 6824. If, in block 6830, the timer has been incremented above a threshold, the controller 6034 may determine a fill rate of the reservoir in block 6832. Depending on the embodiment, the threshold may be predefined and be at or around 0.025-2 seconds (e.g. 0.5 seconds). The rate determination may be made by determining a delta between a value related to the preceding liquid level and the current liquid level in the reservoir. This delta may then be converted into a rate using the time elapsed since the preceding liquid level value was collected. The fill rate value may be prohibited from falling below zero. In the event the fill rate value would be less than zero, the fill rate value may be reset to zero. The fill rate may be passed to a filter in block 6834. The filter may be a low pass filter.

If in block 6836, the reservoir is filling, and if, in block 6838, the fill level of the reservoir is greater than or equal to a maximum fill value, the outlet valve of the reservoir may be opened in block 6840. The reservoir may then be drained. The incoming source valves may be closed if the outlet to the reservoir is open. If the system is generating hot water, the valve controlling flow of incoming source water to the purifier 6010 through the product heat exchanger may not be commanded closed. Instead, the valve may be opened at a low duty cycle which may be less than 10% (e.g. 2% or 5% or less). The maximum fill value may be the same as the maximum threshold described above in relation to FIG. 99. As the reservoir drains, the level of the reservoir may be checked on a predetermined basis in block 6842.

If, in block 6836, the reservoir is draining and if, in block 6844, the reservoir level is above a minimum level, the level of the reservoir may be checked on a predetermined basis in block 6845. If, in block 6836, the reservoir is draining and if, in block 6844, the reservoir level is below or at the minimum level, the outlet valve may be closed in block 6846. The reservoir may then begin filling. The minimum level may be set at any of the values for the minimum threshold described in relation to FIG. 99. A fill cycle counter may also be incremented in block 6846. This fill cycle counter may track the number of fill and drain iterations which have occurred. The controller 6034 may require that this counter has reached at least a certain number of counts before any water produced by the system 6000 is allowed to proceed to a point of use. Additionally, control logic such as that described in relation to FIG. 101A-C may not be used until the counter has accumulated a certain number of counts.

In some embodiments, during the filling and draining of the reservoir, the outlet valve may be commanded closed by the controller 6034 if the reservoir level is depleted below a near empty threshold (e.g. 5-10%). This may prevent steam and hot vapors from exiting the purifier 6010 through the outlet of the reservoir. Additionally, in some embodiments, the outlet may be commanded closed by the controller 6034 if the pressure in the purifier 6010 drops below a predefined value. This may be determined by the controller 6034 by analyzing a data signal from a pressure sensor. Alternatively, this may be determined by analyzing a temperature data signal received from, for example, the low pressure steam temperature sensor 6066. In such embodiments, the temperature below which the outlet may be closed may be 104° C. In some examples, the controller 6034 may monitor the total time that the reservoir is filling or draining. If the time elapsed while the reservoir is either filling or draining exceeds a threshold, an error may be generated. In some embodiments, a notification may be generated after a first threshold is exceed and an error may be generated after a second threshold which is greater than the first is exceeded. The notification may be displayed on a user interface of a point of use device in some embodiments. Operation may be allowed to continue after the notification is generated.

Figure 103:
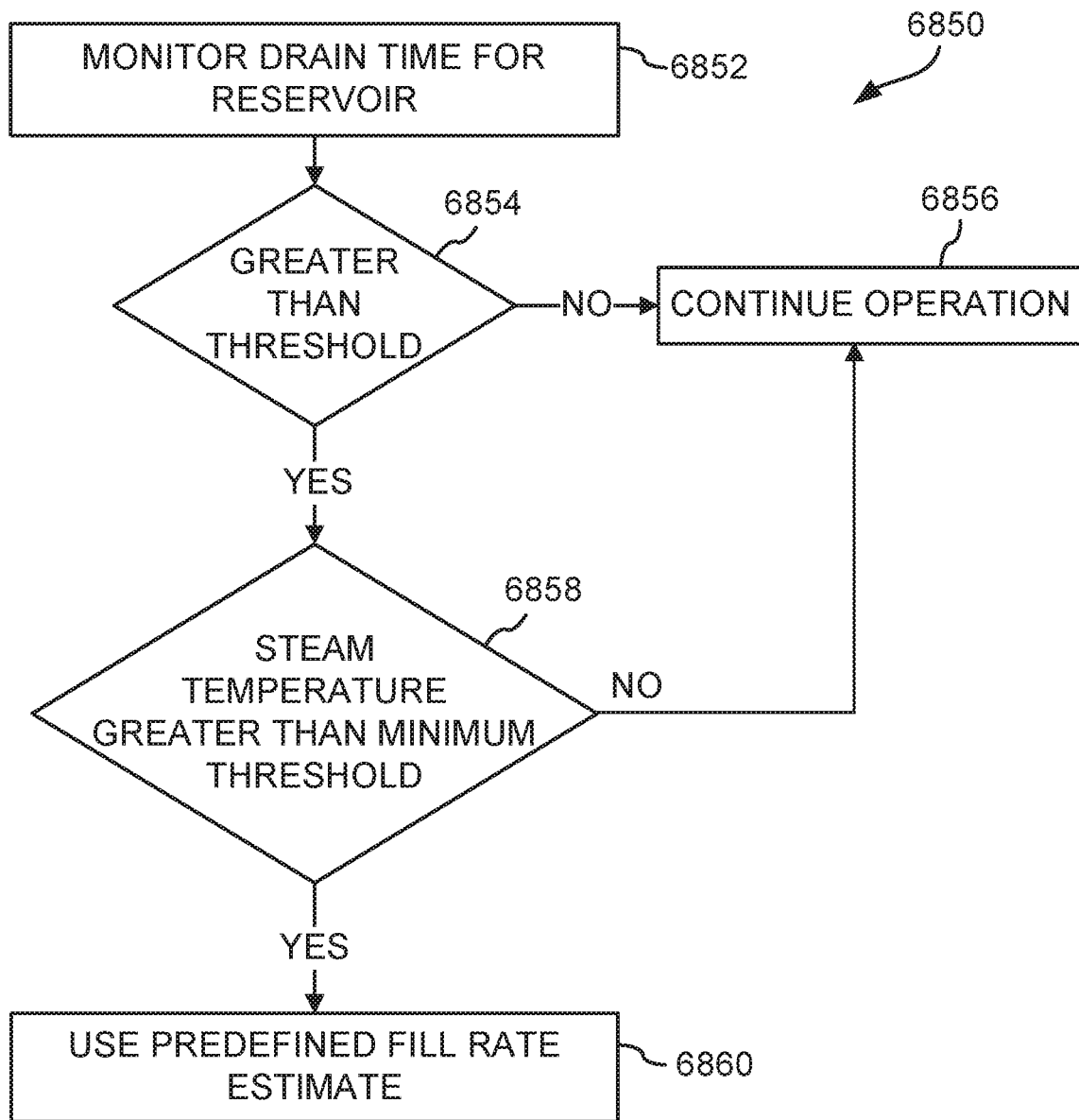
FIG. 103 depicts a flowchart detailing a number of example actions which may be used to update a fill rate determination with a fill rate estimate.

In certain embodiments, and referring now primarily to the example flowchart 6850 in FIG. 103, the fill rate value may be adjusted under certain circumstances. For example, if the controller 6034 (see, e.g., FIG. 3) determines that draining is taking longer than expected and sensor data indicates that there should be sufficient pressure within the purifier 6010 (see, e.g., FIG. 3) to drive fluid from the reservoir, the fill rate may be adjusted. For example, the controller 6034 may adjust the fill rate to a high value at which the reservoir would not be capable of draining.

As shown, the controller 6034 of the system 6000 may monitor the time that the reservoir is draining in block 6852. If, in block 6854, the timer is below a threshold, the operation of the system 6000 may continue as normal in block 6856. If, in block 6854, the timer has incremented above the threshold, the operation of the system 6000 may continue as normal in block 6856 if a steam temperature reading is below a minimum threshold (e.g. 104° C.) in block 6858. If, in block 6858, the steam temperature is above the minimum threshold, the fill rate may be adjusted in block 6860. The fill rate may be adjusted to a fill rate estimate at which the reservoir may not be capable of draining. This fill rate may be predefined and may be mode or state specific in certain embodiments. For example, in a normal mode, the fill rate estimate may be set at 250 ml a minute. In a hot product water production mode, the fill rate estimate may be set at 25-35% of the fill rate estimate for normal operation (e.g. 80 ml a minute). The fill rate estimate may vary depending on the embodiment and may be empirically determined. In some embodiments, the predefined fill rate estimate in block 6860 may be the output of an equation. For example, the predefined fill rate estimated may be computed as a product of the target fill rate and an estimating factor which is greater than one. The estimating factor may have a value between 1.25-1.75 (e.g. 1.5) in certain examples.

Figure 104:
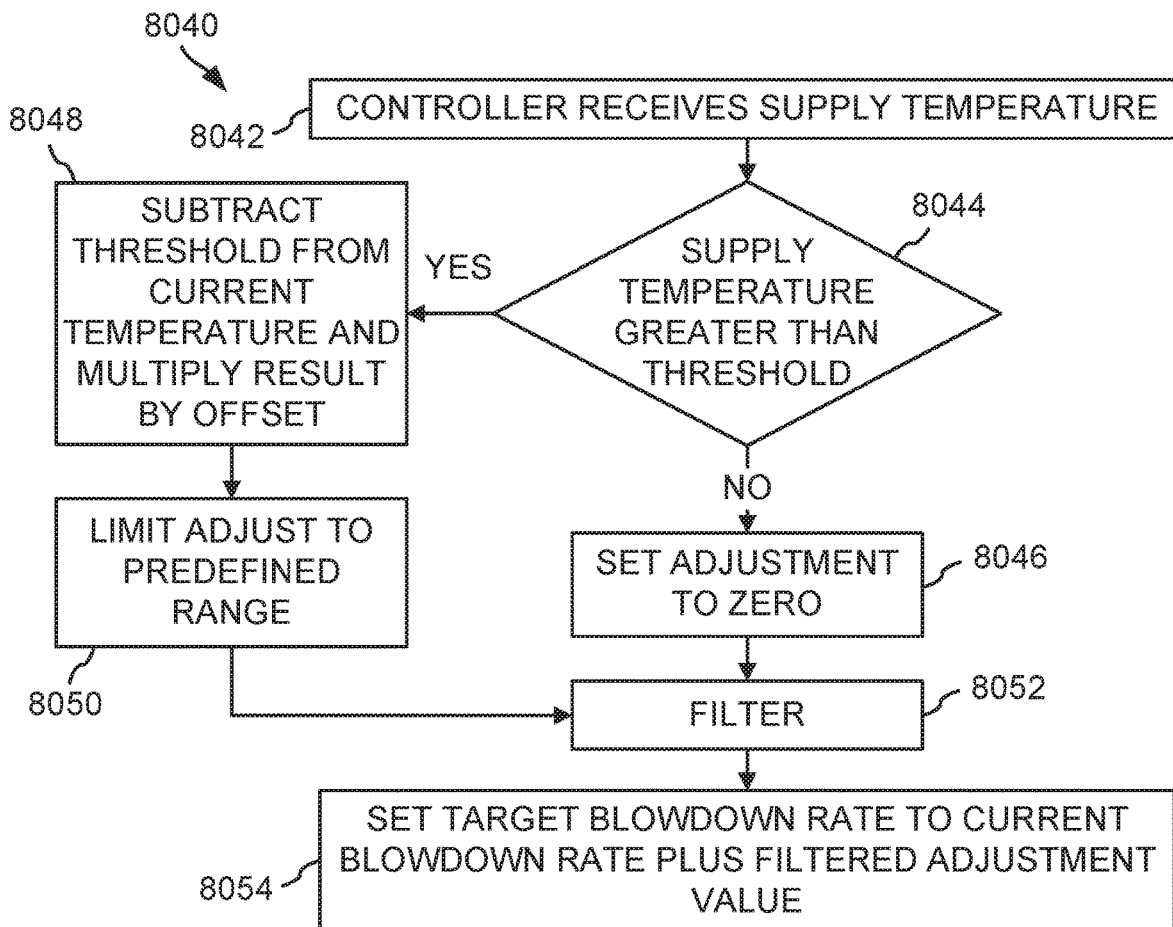
FIG. 104 depicts a flowchart detailing a number of example actions which may be used to adjust a target blowdown rate value.

Referring now to FIG. 104, a flowchart 8040 detailing a number of example actions which may be executed to adjust a target blowdown rate value is depicted. In certain examples, each mode or state of the system 6000 may have a nominal blowdown rate target setting. The blowdown rate target may be adjusted during operation based on other measured parameters from various sensors included in the system 6000. For example, in some embodiments, the target blowdown rate may be adjusted based on the temperature of source water entering the system 6000 as read by a source water product temperature sensor 6042 (see, e.g. FIG. 3).

As shown, in block 8042, the controller 6034 (see, e.g., FIG. 3) may receive a source or supply water temperature from at least one source water product temperature sensor 6042. If, in block 8044, the source water temperature is not above a predefined threshold, an adjustment value for the blowdown rate target may be set to zero in block 8046. The predefined threshold may be between 22-26° C. in certain examples (e.g. 24° C.). If, in block 8044, the source water temperature is above the predefined threshold an adjustment to the blowdown rate target may be determined in block 8048. To determine the adjustment, the threshold value may be subtracted from the current temperature value read in block 8042 and the result may be multiplied by an offset factor. In some embodiments, the offset factor may be between in a range of 15-35 mL/min (e.g. 25 mL/min). Thus, the blowdown rate target may be increased by a certain amount for every degree above the threshold temperature value. The adjustment to the blowdown rate target may be limited in block 8050. For example, the adjustment may be limited to being positive value no greater than 50 mL/min. The adjustment value determined in block 8050 or block 8046 may be filter (e.g. in a low pass filter) in block 8052. In block 8054, the target blowdown rate may be set to the current blowdown rate plus the filtered adjustment value determined in block 8052.

Figure 105A:
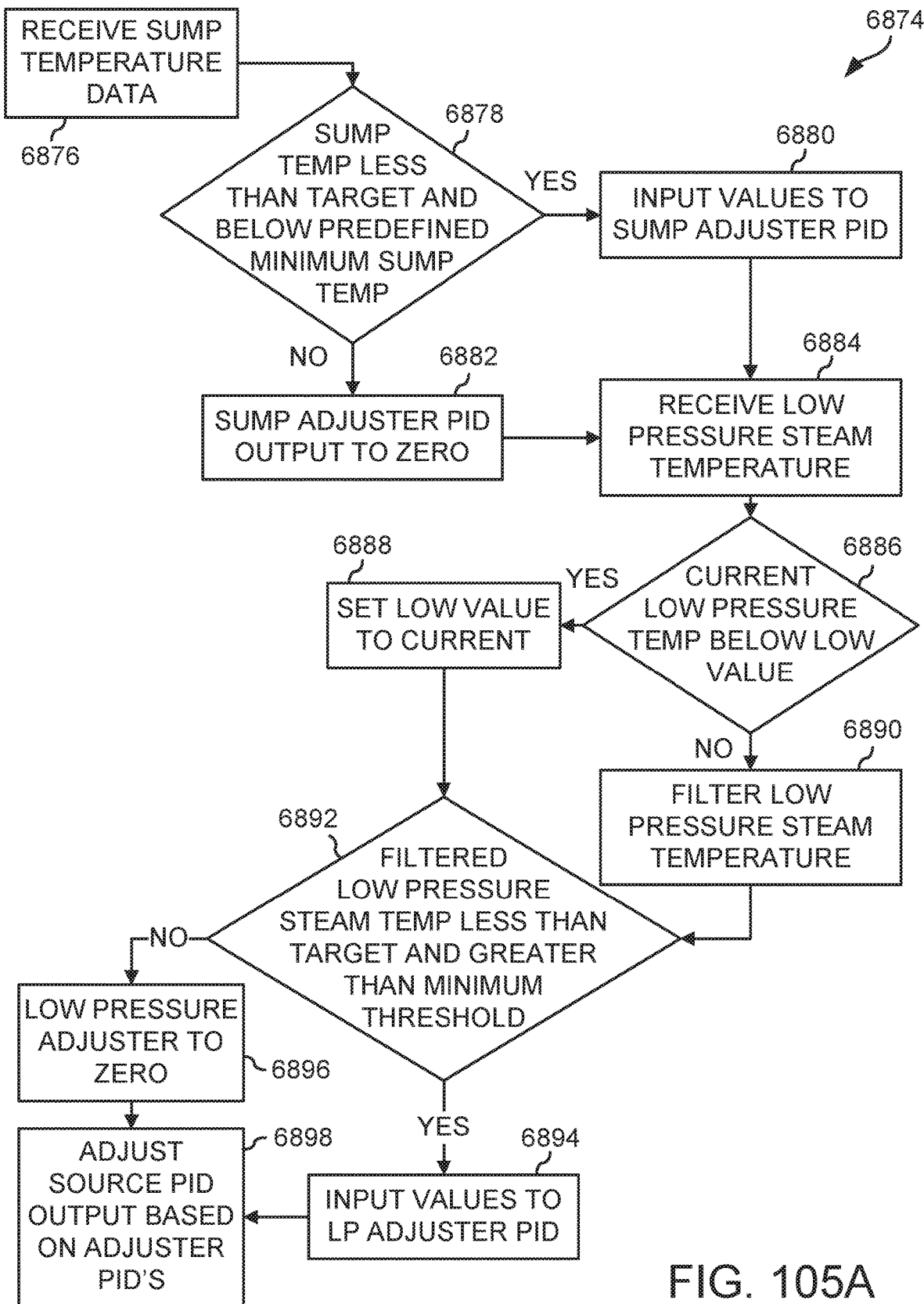
FIG. 105A depicts a flowchart detailing a number of example actions which may be used adjust source proportioning valve commands.

Referring now to FIG. 105A, a flowchart 6874 depicting a number of example actions which may be executed to adjust the output of a source PID loop (e.g. 6430 of FIG. 100 or 7025, 7058 of FIGS. 101A-C) is shown. The adjustment may be made based on the status (e.g. temperature, pressure, etc.) in various portions of the system 6000. For example, an adjustment may be made based on the sump temperature. An adjustment may additionally or alternatively be based on a temperature of low pressure steam in the purifier 6010. In the flowchart 6874 depicted in FIG. 105A, an adjuster based on the sump temperature and an adjuster based on the low pressure steam temperature are shown.

As shown, the controller 6034 may receive a sump 6050 temperature data signal from sump temperature sensor 6058 (see, e.g. FIG. 3) in block 6876. If, in block 6878, the sump temperature value is less than the target temperature and below a minimum sump temperature threshold, a sump adjuster PID loop (see, e.g., 7034 of FIGS. 101A-C) may be run in block 6880. As inputs, the sump adjuster PID may be fed the current sump temperature and the target sump temperature. If, in block 6878, the sump temperature value is either greater than the target or greater than the minimum sump temperature threshold, the sump adjuster PID output may be set to zero in block 6882. The minimum sump temperature may vary between embodiments and may be mode or state specific within embodiments. For example, the minimum sump temperature may be between 85-95° C. (e.g. 90° C.) when producing purified water and between 75-85° C. (e.g. 80° C.) when producing hot purified water. In some examples, the target sump temperature may be a static value. This value may be mode or state specific. For example, the target sump temperature may be between 100-110° C. (e.g. 105° C.) when producing purified water and between 100-105° C. (e.g. 100° C.) when producing hot purified water.

A current low pressure steam temperature may be received by the controller 6034 in block 6884 from, for example, a low pressure steam temperature sensor 6066 (see, e.g., FIG. 3). If, in block 6886, this temperature value is above a low value, the temperature value may be fed through a filter in block 6890. This may generate a filtered low pressure vapor temperature value. In certain embodiments, a low pass filter may be used. If, in block 6886, the current temperature value is below the low value, the controller 6034 may reset the low value to the current value in block 6888. The low value may be historical low value, for example, the lowest low pressure steam temperature value previously measured during production or a preceding period of production. If the low value is reset, the filtered value may also be set to the current value. Such an arrangement may allow the filter to filter out noise, but not obscure drops in temperature which may need to be reacted to quickly for optimal results.

Figure 105B:
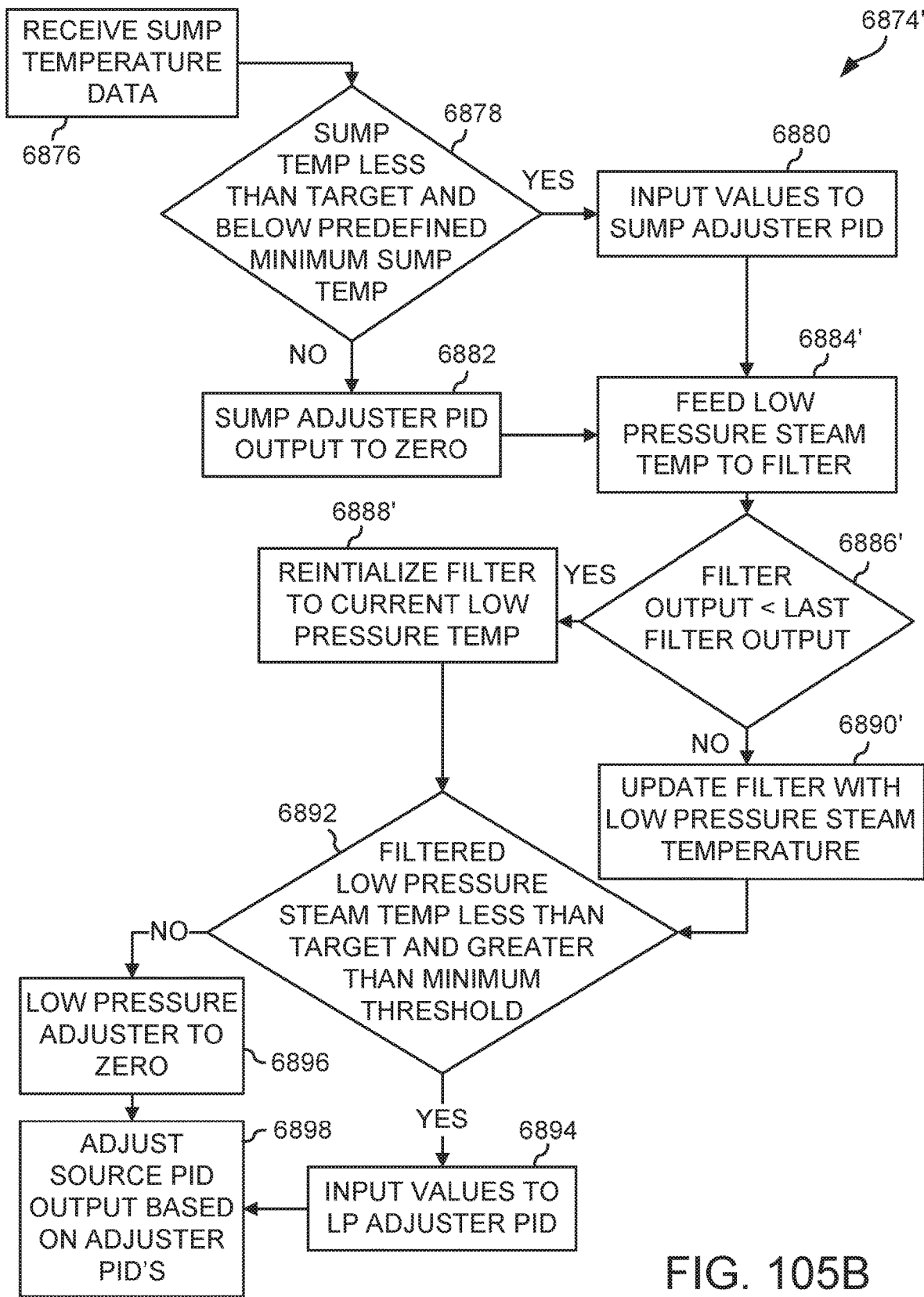
FIG. 105B depicts a flowchart detailing a number of example actions which may be used adjust source proportioning valve commands.

In some embodiments and as shown in the flowchart 6874' of FIG. 105B, the low pressure steam temperature received in block 6884' may be filtered in, for example a low pass filter. Block 6886' may check that filtered low pressure steam value to see if it is below the last output from the filter. If, in block 6886', this temperature value is below the last filter output value, the low pass filter may be reinitialized to the current low pressure steam temperature value in block 6888'. Otherwise the low pass filter may be updated with the new low pressure steam temperature value in block 6890'.

Referring again primarily to FIG. 105A, if, in block 6892, the filtered low pressure steam value is less than a target value and greater than a minimum threshold, a low pressure steam adjuster PID loop (see, e.g., 7042 of FIGS. 101A-C) may be run in block 6894. As inputs, the low pressure steam adjuster PID may be fed the filtered low value and the target low pressure steam temperature value. If, in block 6892, the filtered low value is above the target value or below the minimum value, the low pressure steam adjuster output may be set to zero in block 6896. The minimum threshold may be a static value which may or may not be mode or state specific. For example, the minimum threshold may be a temperature of 104° C. In some examples, the target may vary between embodiments and may be mode or state specific within embodiments. For example, the target low pressure steam temperature may be between 104-112° C. (e.g. 108° C.) when producing purified water and between 101-107° C. (e.g. 104° C.) when producing hot purified water. After determining the output of the adjusters, the output of the source PID loop (e.g. 6430 of FIG. 100 or 7025, 7058 of FIGS. 101A-C) may be altered, in block 6898, based on the output of the adjuster PID loops.

Figure 106A:
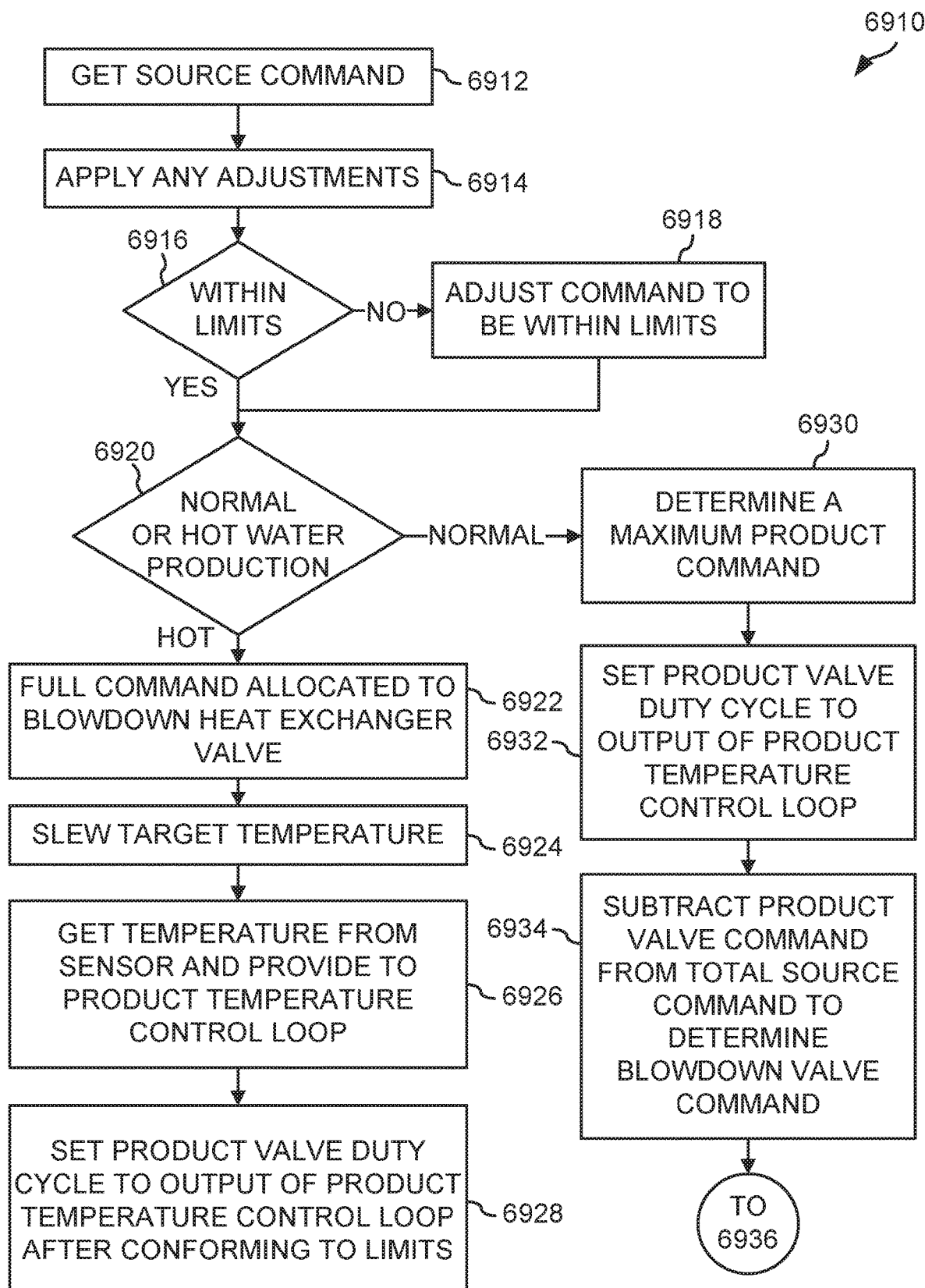
FIGS. 106A-B depict a flowchart detailing a number of example actions which may be used to determine source proportioning valve commands.
Figure 106B:
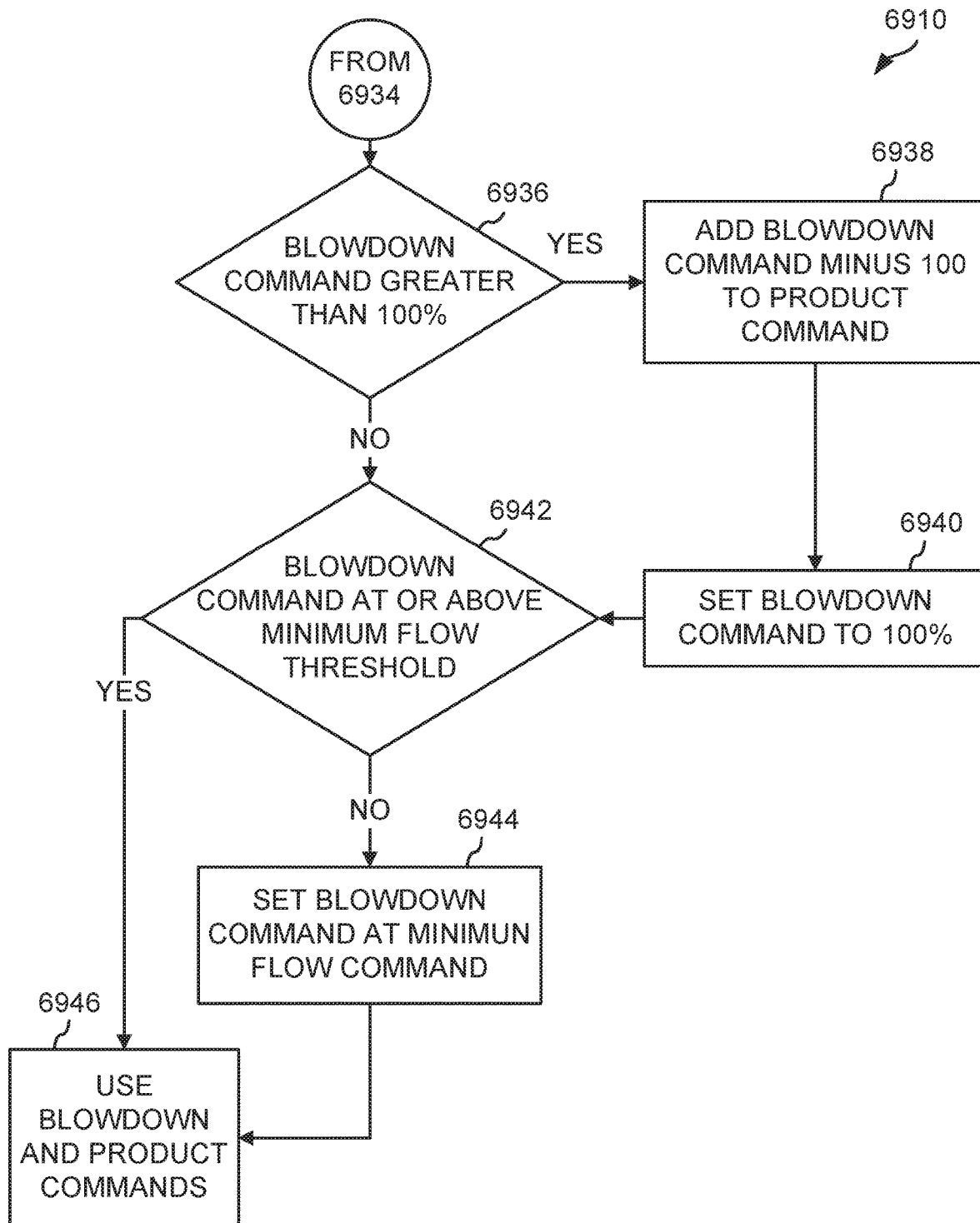

Referring now to FIGS. 106A and 106B, a flowchart 6910 depicting a number of example actions which may be executed to determine how to split flow of incoming source water between a plurality of heat exchangers. Flow of incoming source water may, for example, be split between a product heat exchanger and a blowdown heat exchanger. The flow may be split so as to ensure that the product water has been cooled to a desired set point. The splitting of incoming flow may be determined differently depending on the desired set point. For example, during normal production the split may be calculated in a first manner, and during production of hot product water (e.g. for disinfection of a medical system 6004), flow may be split in a second manner.

As shown, a source command may be determined by a controller 6034 (see, e.g., FIG. 3) in block 6912. The source command may be a duty cycle value which may be allocated between the valves controlling the flow of source water into the blowdown and product heat exchangers. The source command may be determined as described in relation to FIGS. 100-101C for example. Any adjustments may be applied to the source command in block 6914. The adjustments may be determined as described elsewhere herein, for example, as described in relation to FIGS. 105A-B and FIGS. 101A-C.

If, in block 6916, the source command is not within limits after any optional adjustment, the source command may be constrained to be in conformance with the limits in block 6918. For example, the source command may be set to the closest limit value. In certain embodiments, the source command may be limited to be between zero and a number greater than 100%. The maximum limit may be 200% or may be equal to 100% multiplied by the number of source flow proportioning valves 6050A, B (see, e.g., FIG. 3) or the number of heat exchangers (see, e.g. 6008A-C of FIG. 4). The minimum value may also be a number greater than zero in some embodiments. For example, the minimum value may be between 5-15% (e.g. 10%).

After the source command has been conformed to any limits in block 6918, or if, in block 6916, the source command is within limits, the manner in which incoming source flow is split between heat exchangers may be mode or state specific. If, in block 6920, the system is producing hot water, the controller 6034 may set the blowdown heat exchanger valve command to the entirety of the source duty cycle command in block 6922. The value may be limited to 100% if above. The controller 6034 may then apply a slew limit to the product water target temperature in block 6924. This may cause the current target temperature to be slowly altered to a target temperature set point of the hot water production mode. The controller 6034 may receive a temperature data signal from a temperature sensor (e.g. one of sensors 6082A-D of FIG. 3) indicating the current product water temperature in block 6926. This may be fed to a control loop (e.g. 7074 of FIGS. 101A-C) and the product valve duty cycle may be set to the output of this control loop in block 6928. In some embodiments, the duty cycle may have a limit, e.g. may be prevented from being more than 10% (e.g. constrained to 5% or less).

If, in block 6920, the system 6000 is not in a hot water production mode, a maximum product command may be determined by the processor 6034 in block 6930. The product valve duty cycle may be determined via a control loop (e.g. 7074 of FIGS. 101A-C). The product valve duty cycle may be set to the output of this control loop in block 6932. The product valve duty cycle command may be subtracted from the source command in block 6934 to determine the blowdown valve duty cycle command. If, in block 6936, the blowdown command is greater than 100%, the product valve command may be increased in block 6938 and the blowdown command may be set to 100% in block 6940. In the example embodiment, the product command may be increased by an amount equal to the blowdown command minus 100%. If, in block 6942, the blowdown command is below a minimum threshold, the blowdown command may be set to the minimum threshold in block 6944. This threshold may be a predefined duty cycle which may be set to less than 10% (e.g. 5%). Alternatively, the threshold may be a calculated value which is determined based on the source command. For example, the blowdown command may be set at a value of at least some percentage (e.g. 10%) of the total source command. In some embodiments, the threshold may be set as the greatest of a number of values. In such examples, the values may be the predefined duty cycle or the percentage of the total source command. In the event that there is a switch between any of the number of values (e.g. from predefined minimum duty cycle to minimum percentage of total command) the command to the blowdown heat exchange valve may be slewed over time to prevent a stepwise transition. This may ensure that excess heat is not dumped out of the system 6000 when blowdown is removed from the purifier 6010. By implementing limiting to ensure a minimum flow of source is present in the blowdown heat exchanger 6008B (see, e.g. FIG. 3), more heat may be recovered causing the system 6000 to operate with greater efficiency. Additionally, limiting flow through the blowdown heat exchanger 6008B may allow for use of this flow to be used from cooling an electronics box 6046 (see, e.g. FIG. 3) of the system 6000 (described in greater detail in relation to FIG. 129) The product and blowdown valve duty cycle commands may be used by the controller 6034 to spilt flow between the heat exchangers of the system 6000 in block 6946.

Figure 107:
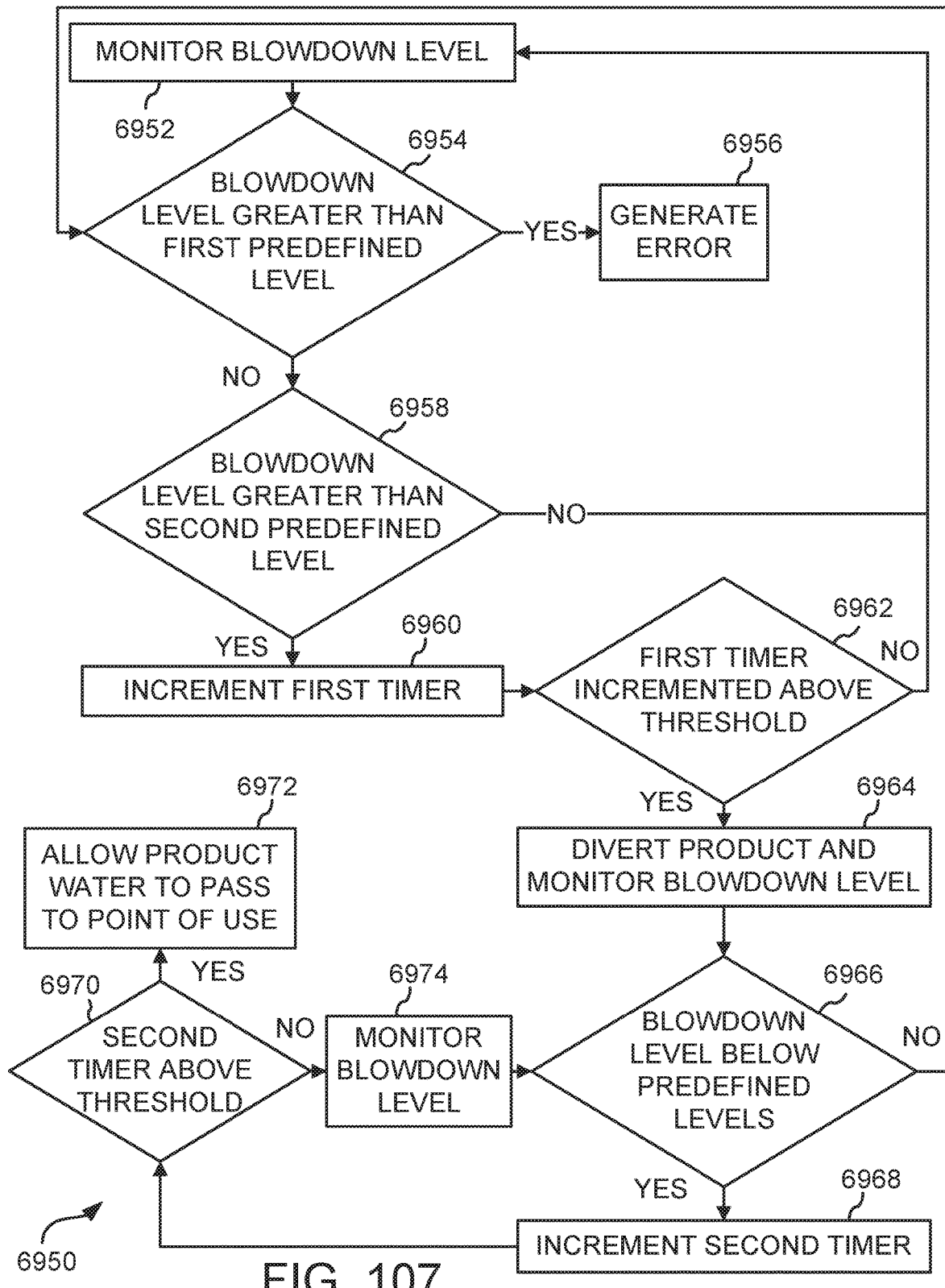
FIG. 107 depicts a flowchart detailing a number of example actions which may be used to divert product water.

Referring now to the flowchart 6950 in FIG. 107, in some embodiments, the controller 6034 (see, e.g., FIG. 3) may prevent product water generated by the purifier 6010 from passing to a point of use (e.g. a medical system 6004) under certain circumstances. For example, if the level of the blowdown reservoir increases above a threshold for too long, the processor 6034 may divert product water generated by the purifier 6010 to drain 6018 for a period of time or until a predefined volume of product water has been diverted. This may serve to flush the condenser 6076 of the purifier 6010 in the event that any liquid in the steam chest 6072 may have passed into the condenser 6076. In the flowchart 6950, a timer is used during such a flush. The processor 6034 may also generate an error if the level in the reservoir becomes too high.

As shown, the processor 6034 of the system 6000 may monitor the blowdown level in block 6952. If, in block 6954, the blowdown level breaches a first predefined level, an error may be generated in block 6956. Otherwise, if the blowdown level increases above a predefined second level in block 6958, a first timer may be incremented in block 6960. The second predefined level may be lower than the first predefined level. In some embodiments, the first predefined level may be at or above 80% (e.g. 90%) and the second predefined level may be at or above 65% (e.g. 70%). If, in block 6962, the first timer has been incremented above a predefined threshold, product water from the purifier 6010 may be diverted to a drain 6018 in block 6964. Otherwise the controller 6034 may return to block 6952. The predefined threshold for the first timer may be greater than three minutes (e.g. five minutes). If, in block 6966, the blowdown level falls below the first and second predefined levels, a second timer may be incremented in block 6968. Otherwise the controller 6034 may return to block 6954. The first timer may be reset to zero if the blowdown level falls below the first and second predefined levels. If, in block 6970, the second timer has incremented above a threshold for the second timer, the processor 6034 may allow product water to pass to a point of use such as a medical system 6004 in block 6972. The threshold for the second timer may be at or about 5 minutes. In some embodiments the threshold for the first timer and the threshold for the second timer may be equal.

If, in block 6970, the second timer is below the threshold, the processor may continue monitoring the blowdown level in block 6974 and incrementing the second timer in block 6968. If, however, the blowdown level increases above one of the predefined levels in block 6966 an error may be generated in block 6956 or the first timer may be incremented in block 6960 depending on which predefined level has been exceeded. The second timer may also be reset to zero.

Figure 108:
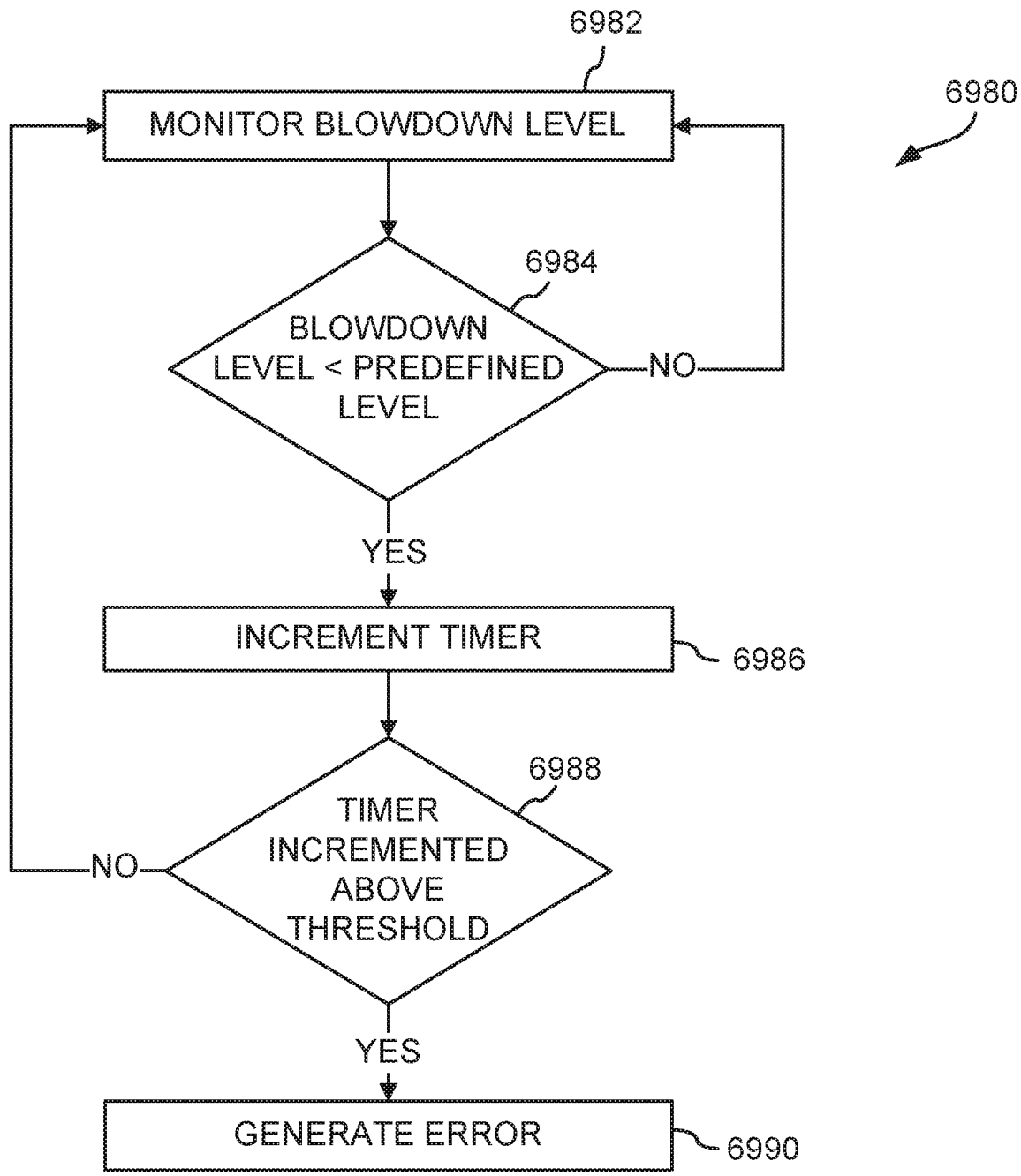
FIG. 108 depicts a flowchart detailing a number of example actions which may be used to monitor for errors during operation of a system.

Referring now to the flowchart 6980 depicted in FIG. 108, the controller 6034 may also monitor for scenarios in which the blowdown level is too low for a prolonged period of time. This may allow the controller to identify a fault condition which prevents the purifier 6010 from generating blowdown. As shown, in block 6982, the controller may monitor the blowdown level. If, in block 6984, the blowdown level is less than a predefined level, a timer may be incremented in block 6986. The predefined level may be a level of or less than 5-15% (e.g. 10%). If, in block 6988, the timer has incremented above a threshold, an error may be generated in block 6990. The threshold may be set above three minutes (e.g. 5 minutes) in certain embodiments. If, in block 6988, the timer has not incremented above the threshold, the controller 6034 may continue monitoring the blowdown level in block 6982. In the event that the blowdown level rises above the predefined level at block 6984, the timer may be reset to zero.

Figure 109:
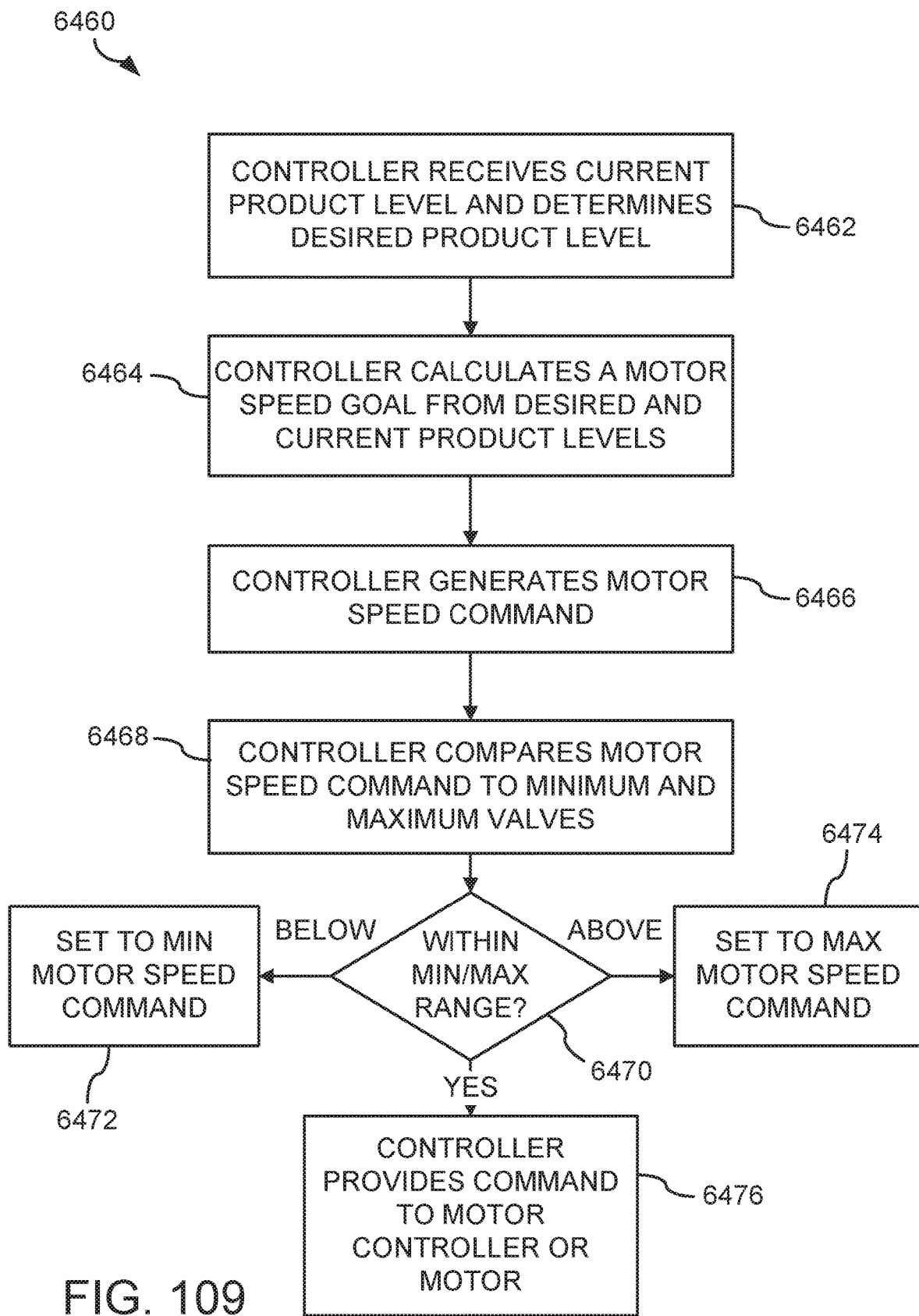
FIG. 109 depicts a flowchart detailing number of example actions which may be used to control a liquid level in a purifier.

Referring now to FIG. 109, an example flowchart 6460 detailing a number of actions which may be executed to control a liquid level within a system 6000 is shown. The liquid may be a first liquid which is within a reservoir in heat transfer and fluid communication with second liquid. The first liquid level may be a condensate formed from condensing vapor evaporated away from the second liquid. The first liquid level may thus be adjusted by controlling an amount of evaporation of the second liquid. According to the flowchart 6460, the evaporation may be adjusted via operation of a compressor 6064. The compressor 6064 may serve to increase the pressure and temperature of vapor passing from the evaporating second liquid into the reservoir storing the first liquid. The amount of temperature increase created via the compressor 6064 may serve to alter the amount of heat transfer into the second liquid from the reservoir containing the first liquid. The increase in heat transfer may alter the amount of evaporation of the second liquid and thus lead to more condensate formation and a change in the first liquid level.

The first liquid may be a purified water process stream in a condenser 6076 (see, e.g. FIG. 2) of a purifier 6010 (see, e.g., FIG. 2). The second liquid may be unpurified source water contained in an evaporator 6060 (see, e.g., FIG. 2) of the purifier 6010. The purified water level within the condenser 6076 may be depleted by opening an outlet valve to a point of use or a quality sensing system intermediate the condenser 6076 and point of use. Purified water may be consumed at the point of use faster than the purifier 6010 is capable of producing it. A controller 6034 (see, e.g., FIG. 2) may be used to ensure that a desired reserve level of purified water is available to compensate for such periods of increased demand.

In block 6462, the controller 6034 may receive a current product level or purified water level and determine a desired product level. The current product level may be provided from a product level sensor assembly 6078 (see, e.g. FIG. 36). The desired product level may be a calculated or preset value which may be determined in any suitable fashion. In some embodiments, the desired product level may be determined based off a current rate of product water usage for example. From these values, the controller 6034 may calculate a motor speed goal in block 6464. The motor speed goal may be the output of a control loop (e.g. a PID, or PI loop) which utilizes the desired product level and current product level as a set point and feedback respectively.

In some embodiments, at least one feed forward input may be provided to adjust the motor speed goal. The source duty cycle command (see, e.g., FIGS. 100-101A-C) and/or heating element duty cycle command may be used as a feed forward input. The feed forward term may cause the compressor speed goal to be adjusted proportional to the feed forward input provided. For example, if the heating element duty cycle is above a predetermined threshold (e.g. at 90% or 100%) the compressor speed goal may be increased to a predetermined value or by a predetermined amount. This may help to heat fluid in the evaporator 6060 as hotter, high pressure steam will be generated by the compressor 6064. This steam will then transfer heat to the evaporator 6060 as it condenses. In some embodiments, the compressor speed goal may be increased by a predetermined amount or to a predetermined value if the source valve duty cycle command 6432 is above a predefined threshold. Again, this may help to cause more heat transfer into the fluid in the evaporator 6060. An increase in the compressor speed goal may also be generated when both the heating element duty cycle and the source valve duty cycle are in a predetermined relationship with one another. For example, the compressor speed goal may be increased as described above if the combined duty cycles of the heating element and source valve are above a predetermined value (e.g. 180-190%).

The controller 6034 may then generate a motor speed command in block 6466. This command may be determined by incrementing the last commanded motor speed toward the motor speed goal by an amount. In some embodiments, the current motor speed, instead of the last commanded motor speed, may be incremented toward the motor speed goal. The amount may be limited to a certain increment limit which serves to limit the acceleration and deceleration of the motor. This slew rate limiting may cause the motor speed to ramp up to the goal. The increment limit may limit the increment to be less than or equal to around 5-10 rpm/sec for any single adjustment. The controller 6034 may also compare the motor speed command, in block 6468 to minimum and maximum speed command values. The minimum value, in some specific embodiments may be around 1500-2500 rpm (e.g. 2000 rpm). The maximum value may differ depending on at least one motor related parameter as, for example, described later in the specification. Though the maximum value may differ depending on various operational factors, this variation may be limited to no more than a predefined hard limit or cap defined as an rpm value.

If, in block 6470, the motor speed command is below the range defined by the minimum and maximum values, the motor speed command may be set to the minimum value in block 6472. If it is above the range, it may be set to the maximum value in block 6474. The motor speed command may then be supplied to the motor or to a separate motor controller tasked with low level control of motor operation and interfacing with the motor hardware in block 6476. Motor speed commands may be periodically generated on a predetermined time interval. Thus, the motor speed command may be updated each time the interval elapses.

Figure 110:
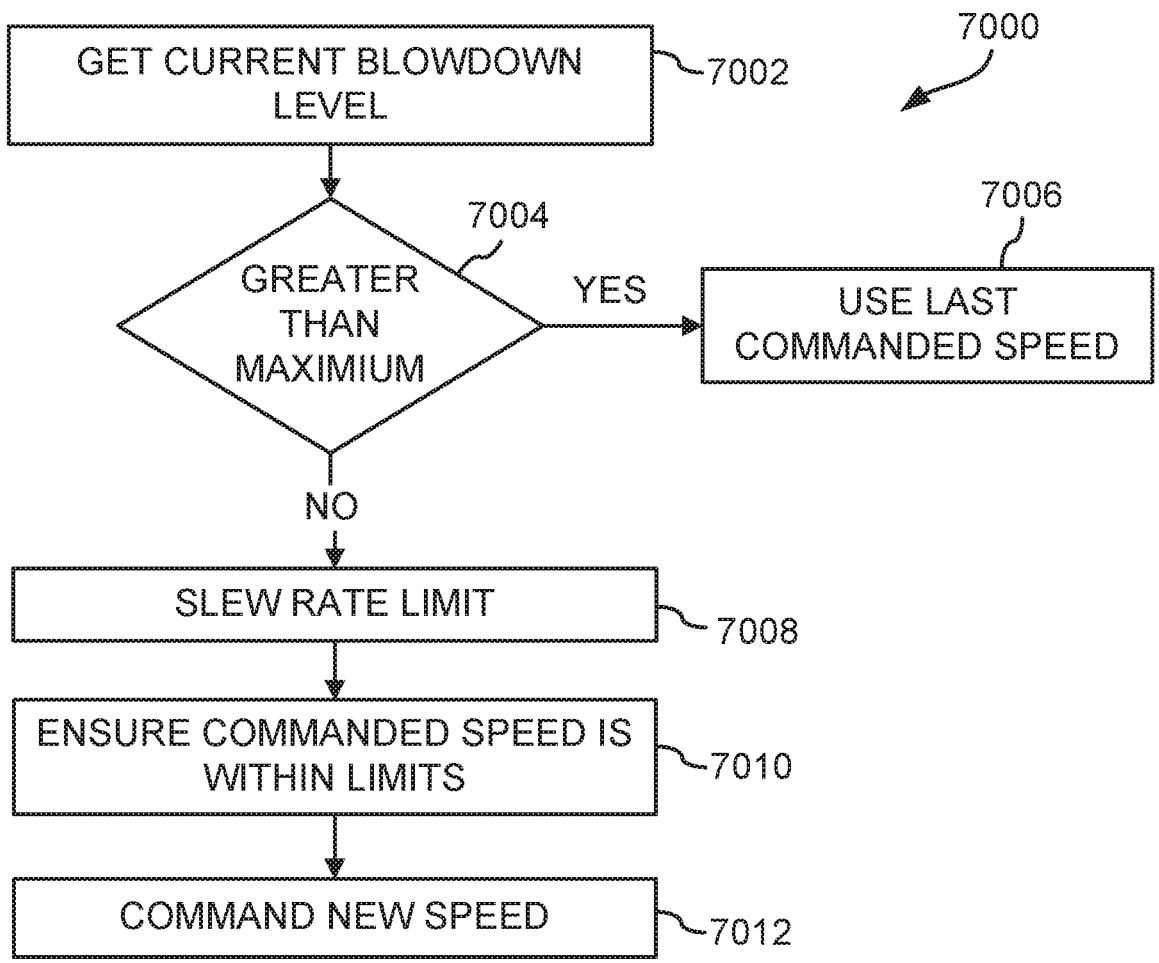
FIG. 110 depicts a flowchart detailing a number of example actions which may be used to control a motor of a compressor.

In certain embodiments, and referring now to the flowchart 7000 in FIG. 110, the motor speed command may be based off of a predefined motor speed command which is mode or state specific. For example, the motor speed command may generally be set at a nominal value defined for each mode where the compressor 6064 (see, e.g. FIG. 3) is used. The nominal values may be chosen such that they achieve good level control based upon an expected blowdown rate and product usage rate. The motor speed command may be ramped toward the nominal value defined for the mode or state after the system 6000 has entered that mode state. This may occur in a manner similar to the slew rate limiting described above. Additionally, the motor speed command may be altered from the defined nominal value based on limits for the command which may be calculated periodically during operation of the system 6000. As shown in the flowchart 7000 in FIG. 110, the controller 6034 may receive a blowdown level value in block 7002. If, in block 7004, the blowdown level is greater than a predetermined threshold, the last motor speed command may be used in block 7006. In some embodiments, the motor speed command may be decremented instead. The predetermined threshold may be a blowdown level value of 65-80% (e.g. 75%) in certain embodiments. This may help to avoid causing source water in the purifier 6010 (see, e.g., FIG. 3) to boil more vigorously in the event that the water level is high.

If, in block 7004, the blowdown level value is below the predetermined threshold, a slew rate limited motor speed command may be determined in block 7008. The controller 6034 (see, e.g., FIG. 3) may, for example, adjust the motor speed command by an increment limit toward the nominal motor speed defined for the mode or state the system 6000 is currently in. In certain embodiments, the increment limit may be between 5-10 rpm/sec (e.g. 8 rpm/sec). The nominal motor speed may be set at 4500 rpm for normal product water production. For hot water production, the nominal motor speed may be set below the nominal motor speed for normal product water production. For example, the nominal motor speed may be set at between 2200 rpm-3700 rpm (e.g. 3500 rpm) for hot product water production. The hot product water production nominal motor speed may be 50-80% of the normal product water production nominal motor speed.

In block 7010, the controller 6034 may ensure that the motor speed command is within any motor speed command limits. Such limits are described elsewhere in the specification. In block 7012, a new motor speed command may be generated The nominal motor speed for hot water production may be a calibrated value in some embodiments. Likewise, in some embodiments, the nominal motor speed for normal temperature water production may also be a calibrated value. Calibrated values may be determined during manufacture and may be based on the specific purifier 6010. A hot water production nominal motor speed value may, for example, be determined by bringing the system 6000 into a hot water production state and collecting data as the motor speed for the compressor 6064 is altered through a range. Alternatively, the controller 6034 may allocated an amount of time for the motor control loop to settle onto an ideal value. The particular value chosen for the nominal hot water production motor speed may be a speed which is optimal for that particular purifier 6010. This value may be chosen based on any or any combination of a number of characteristics. For example, the value for the nominal hot water production motor speed may be a value which generates a product water output temperature (e.g. as sensed by sensors 6082A-D of FIG. 3) above a particular threshold (e.g. 96° C.). The value may be a value at which the low pressure vapor has a temperature of at least some threshold value (e.g. 108° C.). The value may also be a value at which a temperature such as the product water output temperature or a temperature of a vapor stream is relatively stable. The value may also be a value at which the level readings from any level sensors in the purifier 6010 are relatively stable. The value may be chosen based on a relationship between a temperature reading from the low pressure vapor sensor 6064 (see, e.g. FIG. 3) and the high pressure vapor pressure sensor 6068 (see, e.g. FIG. 3). For example, a delta between these values may be required to be greater than a certain amount. These values may also be required to be relatively stable. The vapor pressure values may also be required to be high enough to drive fluid out of the purifier 6010 during operation. The nominal motor speed value for hot water production may also be chosen based on an output amount of product water. The value may, for example, be a value at which at least a certain amount of product water per unit time is produced.

Figure 111:
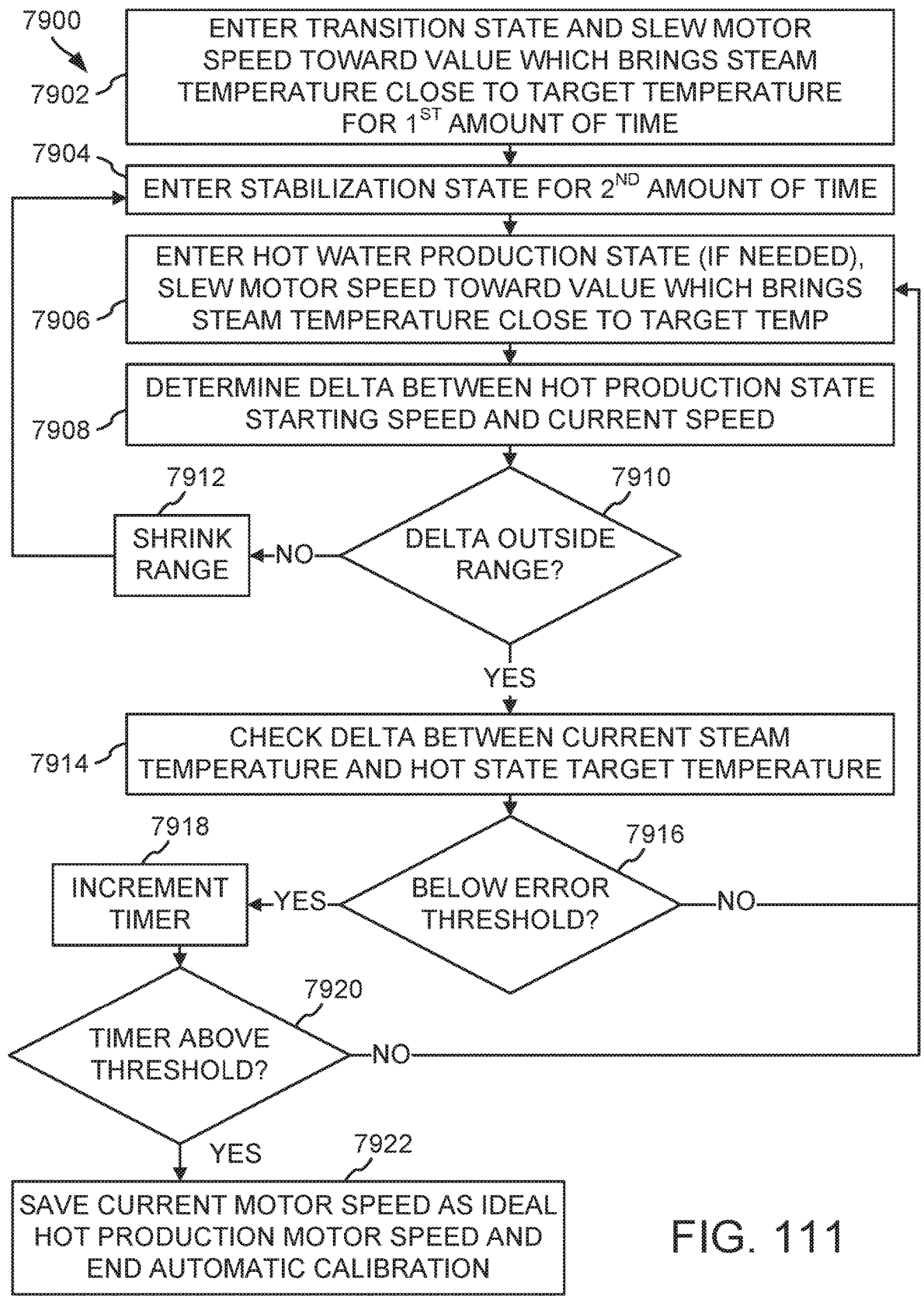
FIG. 111 depicts a flowchart detailing a number example actions which may be used to automatically calibrate a nominal motor speed value.

Referring now also to FIG. 111, a flowchart 7900 detailing example actions which may be used to automatically calibrate a nominal motor speed value. In the example embodiment, the automatic calibration is described in relation to a hot water production motor speed, though automatic calibration of motor speed values for other operational states of the system 6000 may be determined in a similar manner. As shown, in block 7902, the motor controller operating on the controller 6034 may enter a transition state from normal water production to hot water production. This may for example occur when the system 6000 enters the hot water production preparation state (further described in relation to FIG. 95). As shown in block 7902, once in transition state, the motor speed may be slewed by toward a value which brings a measured steam temperature toward a target for that steam temperature. The steam temperature may be the low pressure steam temperature as measured by a low pressure steam temperature sensor 6066 (see, e.g. FIG. 3). This slewing of the motor speed may continue until a predetermined amount of time has elapsed. The transition state is further described in relation to FIG. 112. In block 7904, the motor controller may enter a stabilization state for an amount of time. This may ensure that the steam temperature is held at a relatively stable value before proceeding into the next motor controller state. The stabilization state if further described in relation to FIG. 112.

In block 7906, the motor controller may enter a hot water production state. This may for example occur when the system 6000 enters a hot water production state (further described in relation to FIG. 96 for example). As shown, in block 7906, the motor speed may again be slewed toward a value which brings the measured steam temperature toward a target for that steam temperature. Further description is provided in FIG. 113 for example. To hone in on the ideal motor speed value for the hot production state, a binary type search may be conducted. In block 7908, the controller 6034 may determine a delta between the current speed and the hot production state starting motor speed. If, in block 7910, the delta is outside of a range, the controller 6034 may shrink the range used by the motor controller in block 7912 and re-enter the stabilization state in block 7904. This may help to ensure that the motor speed has been consistently around the value to be chosen as the ideal calibrated value for hot water production. In some embodiments, the range may defined by bounds of a minimum and maximum allowed value. When the range is shrunk in block 7912, the value of the bound opposite the bound which was exceeded may be shrunk. For example, the bound exceeded may be multiplied by −0.5 (or some other negative fraction) and the product may be set as the new opposing bound. Further description is provided in relation to FIG. 114.

If, in block 7910, the delta is within the range, the controller 6034 may determine a difference between the current steam temperature and the target steam temperature for the hot production state in block 7914. If, in block 7916, the delta is not below a threshold, the flowchart 7900 may return to block 7906 and the motor speed controller may slew the motor speed based on the delta. If, in block 7916, the delta is below the threshold a timer may be incremented in block 7918. If, in block 7920, the timer has been incremented above a threshold, the current motor speed may be saved as the ideal calibrated hot water production motor speed value in block 7922. If, in block 7920, the timer is not above the threshold, the flowchart 7900 may return to block 7906 and the motor speed controller may slew the motor speed based on the delta. In the event that that the delta rises above the threshold in block 7916, the timer may be reset to zero.

Figure 112:
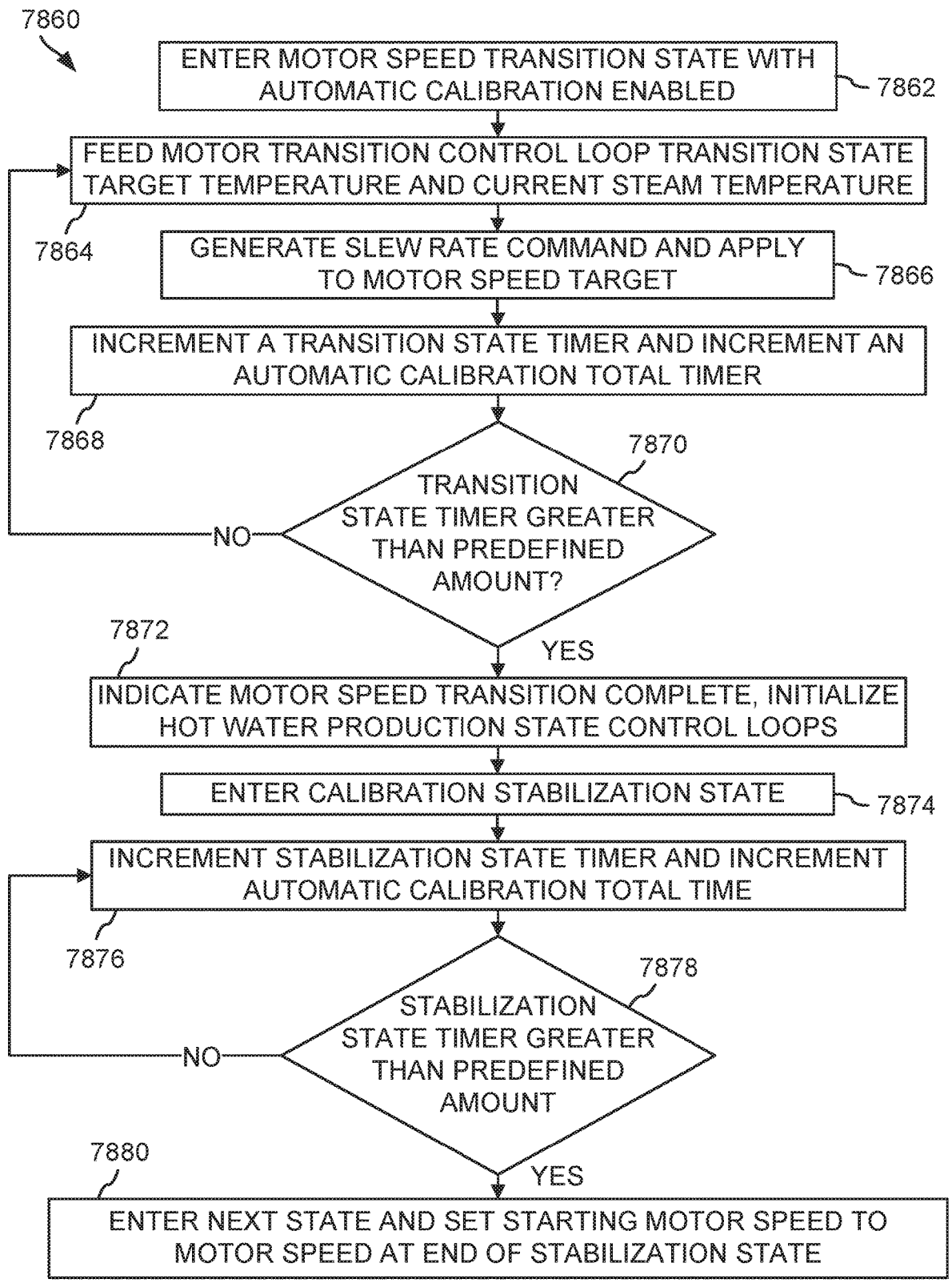
FIG. 112 depicts a flowchart depicting a number of example actions which may be used in automatic calibration for a motor speed set point

Referring now also to FIG. 112, a flowchart 6860 depicting a number of example actions which may be used in automatic calibration for a motor speed set point is depicted. The example flowchart 6860 is described in the context of calibrating a motor speed value for use during a hot water production state. As shown, in block 7862 the motor controller may enter a motor speed transition state with automatic calibration enabled. Typically, this may occur the first time the system 6000 is run (perhaps during manufacturing before release to a consumer). In some embodiments, automatic calibration may be performed after a certain number of running hours are accumulated by the system 6000. Thus, the motor speed set point may be adjusted to account for differences which may be introduced as the system 6000 ages.

In block 7864, the motor controller may receive a current steam temperature and a target stream temperature for the transition state. The steam temperature may be the low pressure steam temperature as measured by a low pressure steam temperature sensor 6066 (see, e.g. FIG. 3). The target steam temperature may be between 107-110° C. 9 (e.g. 108.5° C.) in certain examples. In block 7866, the controller 6034 may generate a slew rate command and apply this command to the motor speed. In block 7868, a transition state timer and an automatic calibration total time may be incremented. If, in block 7870, the transition state timer is not above a threshold, the controller 6034 may return to block 7864. The transition state time threshold may be a predefined amount of time which is greater than a typical transition state time when automatic calibration is not enabled. In some embodiments, the transition state timer may be 100-150 minutes (e.g. 130 minutes) or 6-7 times (e.g. 6.5 times) that of the typical transition state time.

If, in block 7870, the transition state timer has elapsed, the controller 6034 may indicate that the transition state has completed and at least one hot water production state controller may be initialized in block 7872. In block 7874, the motor controller may enter a calibration stabilization state. In block 7876, a stabilization state timer may be incremented and the automatic calibration total time may be incremented. Once, in block 7878, the stabilization state timer has increased above a predetermined threshold, the motor controller may enter a next state in block 7880. The motor speed at the conclusion of the stabilization state may also be saved as the starting motor speed value for the next state in block 7880. The next state may be a hot water production state.

Figure 113:
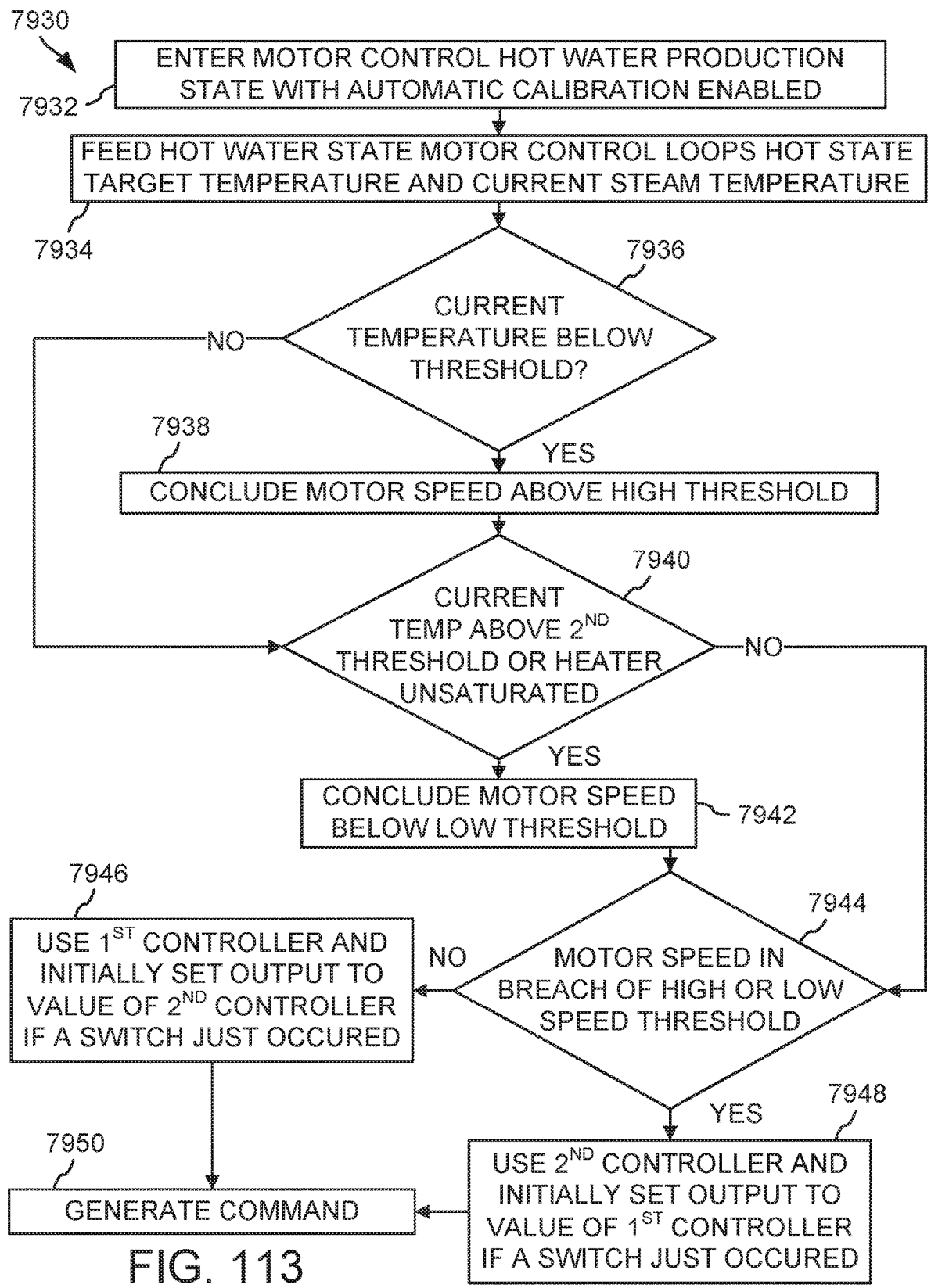
FIG. 113 depicts a flowchart depicting a number of example actions which may be used in automatic calibration for a motor speed set point FIG. 114 a flowchart 7960 depicting a number of example actions which may be used in automatic calibration for a motor speed set point

Referring now to FIG. 113, a flowchart 7930 depicting a number of example actions which may be used in automatic calibration for a motor speed set point is depicted. The example flowchart 7930 is described in the context of calibrating a motor speed value for use during a hot water production state. As shown, in block 7932, the motor controller may enter a hot water production state with automatic calibration enabled. This may occur when the system 6000 enters the hot water production state further described in relation to FIG. 96. In block 7934, at least one hot water state motor controller may be provided a current steam temperature and a target hot water production state temperature. The steam temperature may be the low pressure steam temperature as measured by a low pressure steam temperature sensor 6066 (see, e.g. FIG. 3).

If, in block 7936, the current temperature is below a threshold, the controller 6034 may conclude that the motor speed is too high in block 7938. If, in block 7940, the current temperature is above a second threshold or the heater command is saturated, the controller 6034 may conclude that the motor speed is too low in block 7942. In some embodiments, the heater command may be determined to be saturated in the event that the heater command is above a predefined duty cycle (e.g. 90%). Alternatively or additionally, the heater command may be determined to be saturated if the heater command is at a duty cycle which leaves the system 6000 at a system power draw threshold.

If, in block 7944, the current temperature is not in breach of the first or second threshold in block 7936 and 7940, the output of a first controller may be used to determine a commanded motor speed in block 7946. If, in block 7944, the current temperature is in breach of the first or second threshold in block 7936 and 7940, the output of a second controller may be used to determine a commanded motor speed in block 7946. The command may be generated in block 7950. The first control loop and second control loop may be PID or PI controllers which have different gains. Additionally, the initial output of the first and second controllers may be filtered differently. For example, the first control loop may be low pass filtered have its gains set so as to be less aggressive. Thus, the first control loop may be slower or less reactive than the second control loop. As shown in FIG. 113, in the event that a switch between control loops occurs, the control loop may be set so that its initial output is at or near the output of the previous control loop. This may help to avoid a large stepwise change in the command generated in block 7950. In certain examples, the value of one of the terms, e.g. the integrator term, may be initially set at the value of the integrator term of the other control loop when the switch occurs.

Figure 114:
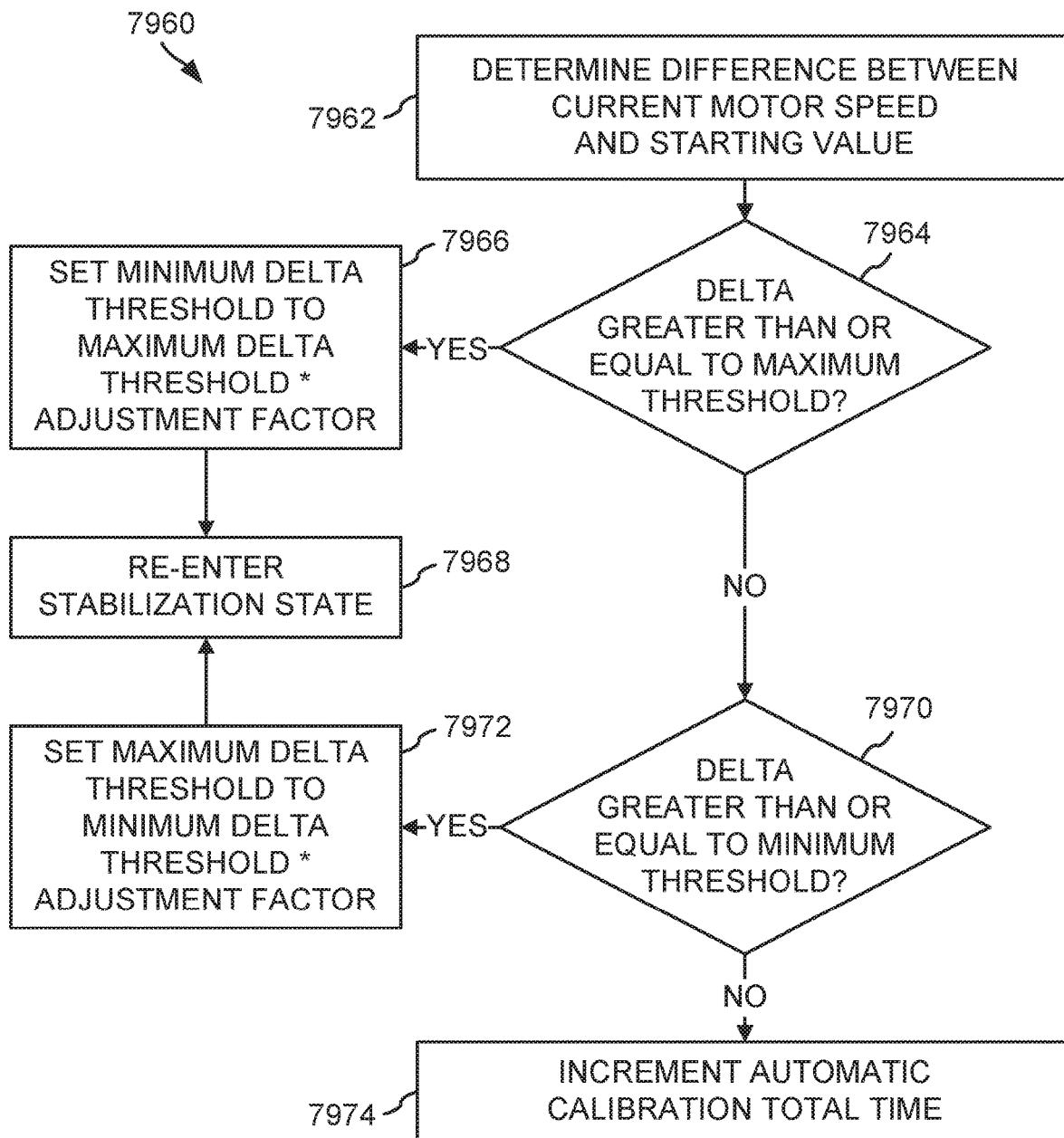

Referring now also to FIG. 114, a flowchart 7960 depicting a number of example actions which may be used in automatic calibration for a motor speed set point is depicted. The example flowchart 7960 is described in the context of calibrating a motor speed value for use during a hot water production state. As mentioned above in relation to FIG. 111, in the hot water production state during automatic calibration (see FIG. 112), the controller 6034 may monitor an amount of change in the motor speed since entry to the hot water state. If this delta increases beyond a certain point, the controller 6034 may exit the hot water production state and re-enter a stabilization state. This may help to ensure that the controller 6034 does not mistake an overshoot or undershoot peak as an ideal speed for the motor in the hot water production state.

As shown, in block 7962, the controller may determine a difference between the current motor speed and the motor speed upon entry to the state. If, in block 7964, the difference is greater than or equal to a maximum threshold, an opposing minimum threshold value may be reduced in block 7966. As shown, in block 7966 the minimum difference threshold may be reduced by the product of the current maximum difference threshold and a predefined adjustment factor. This adjustment factor may be a negative fraction such as −0.5. The stabilization state may be re-entered in block 7968. If, in block 7970, the difference value from block 7962 is less than or equal to a minimum threshold, the maximum difference threshold may be reduced in block 7972. As shown, in block 7972 the maximum difference threshold may be reduced by the product of the current minimum difference threshold and a predefined adjustment factor. This adjustment factor may be a negative fraction such as −0.5. The stabilization state may be re-entered in block 7968. If, in blocks 7964 and 7970, the delta is within the bounds of the maximum and minimum threshold, the automatic calibration total time may be incremented in block 7974.

As described in relation to FIG. 111, the controller 6034 may continue to adjust the motor speed until the steam temperature is close to the target value for a period of time. Once the steam temperature is stable and close to the target value, the current motor speed may be saved as the ideal calibrated motor speed value to be used in the future when the system 6000 enters the hot water production state.

Figure 115:
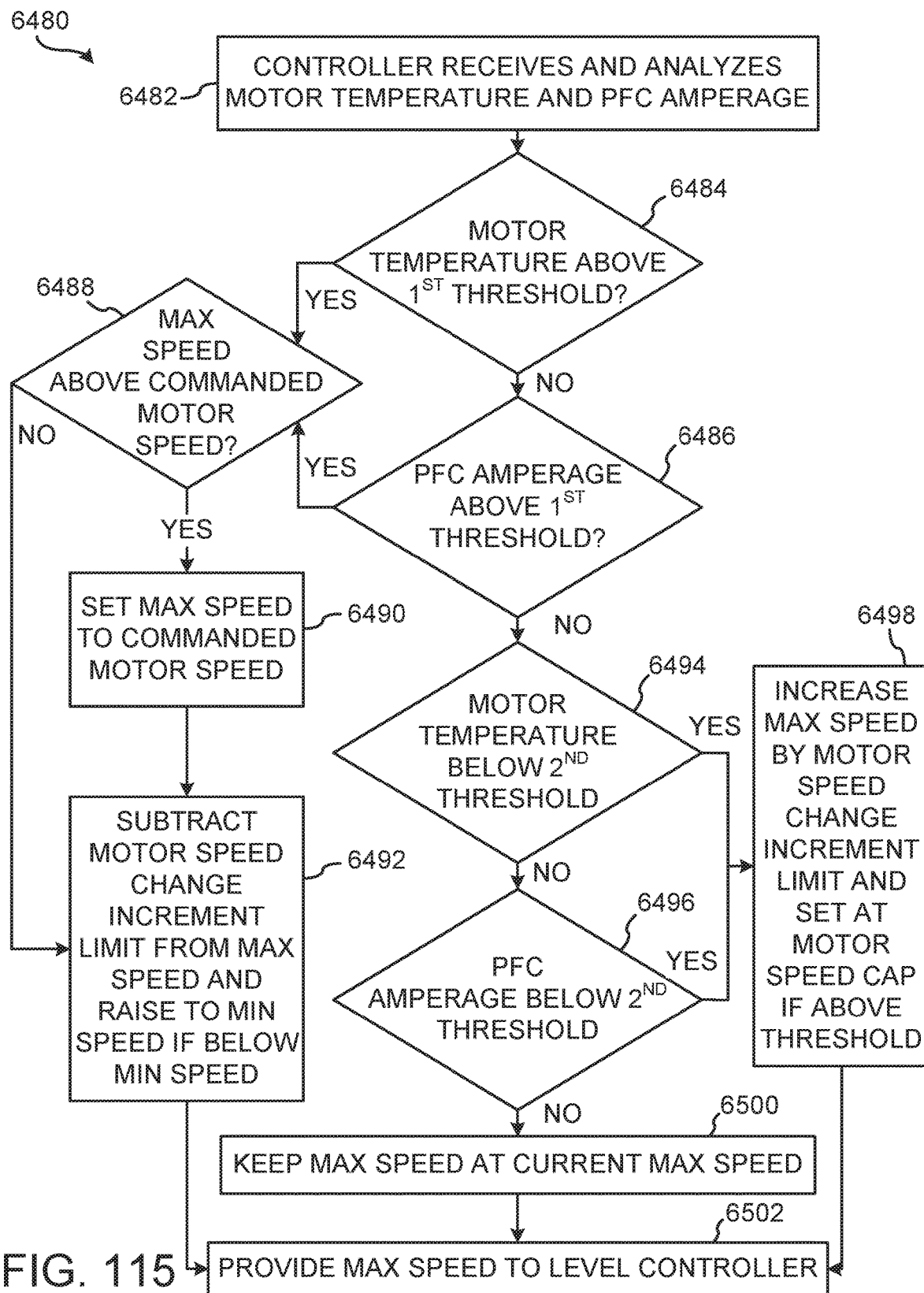
FIG. 115 depicts a flowchart detailing a number of example actions which may be used to control a liquid level within a purifier.

Referring now also to the flowchart 6480 shown in FIG. 115, a maximum motor speed value may be calculated each time a new motor speed command is generated. The controller 6034, in block 6482, may receive a data signal indicative of at least one motor parameter. In the example flowchart 6480, the parameters listed are the motor temperature and the power factor correction current. In some embodiments, only temperature may be used and the max speed value may not be determined or adjusted based off power factor correction current. The parameters may be respectively generated by a motor temperature sensor (e.g. thermistor or thermocouple) power factor correction current monitoring circuitry associated with the motor. The controller may check, in block 6484, if the motor temperature is above a threshold. The controller 6034 may also check, in block 6486, if the power factor correction current is above a threshold. In the event that either is above their predefined thresholds, the controller 6034 may check if, in block 6488, the current max speed value is above the motor speed command. The max speed may be set to the commanded motor speed in block 6490 if the max speed value is above the motor speed command. After adjusting the max speed value in block 6490 or if the max speed was not above the motor speed command, the max speed value may be lowered in block 6492. To lower the max speed, the max speed may be decremented down by an amount. In various examples, the amount may be the increment limit described above in relation to FIG. 109 or 110. Alternatively, the amount may be less than the increment limit. In certain examples, the amount may be 5 rpm/sec. In the event the max speed value falls below the minimum speed, the max speed may be set equal to the minimum speed value. As shown, the max speed may be adjusted in block 6492, if, for example, decrementing causes the max speed value to fall below the minimum speed value.

The max speed value may also be increased in certain scenarios. For example, if the motor temperature is below a second threshold in block 6494 or if the power factor correction current is below a second threshold in block 6496, the max speed may be increased in block 6498. The max speed value may be increased by the increment limit described above in relation to FIGS. 109 and 110. Alternatively, the max speed may be increased by an amount less than the increment limit. In certain examples, the amount may be 5 rpm/sec. The second temperature threshold or power factor correction threshold may be the same as or different than the respective first thresholds described above. There may also be a motor speed cap which prevents the max speed value from exceeding a predefined value. In the event the increment would cause the max speed value to be over the cap, the max speed value may be adjusted to the cap. The cap may be around 4500-6500 rpm (e.g. 5000 rpm) in some embodiments. The cap may be about 2-3 times as large (e.g. 2.5×) as the minimum speed value.

If the current motor temperature and power factor correction current are between their respective first and second thresholds the max speed may be maintained without change in block 6500. In block 6502, the max speed may be provided to a controller such as that described above in relation to FIG. 100. Thus, the max speed value may be dynamically adjusted during operation of the system if desired.

Figure 116:
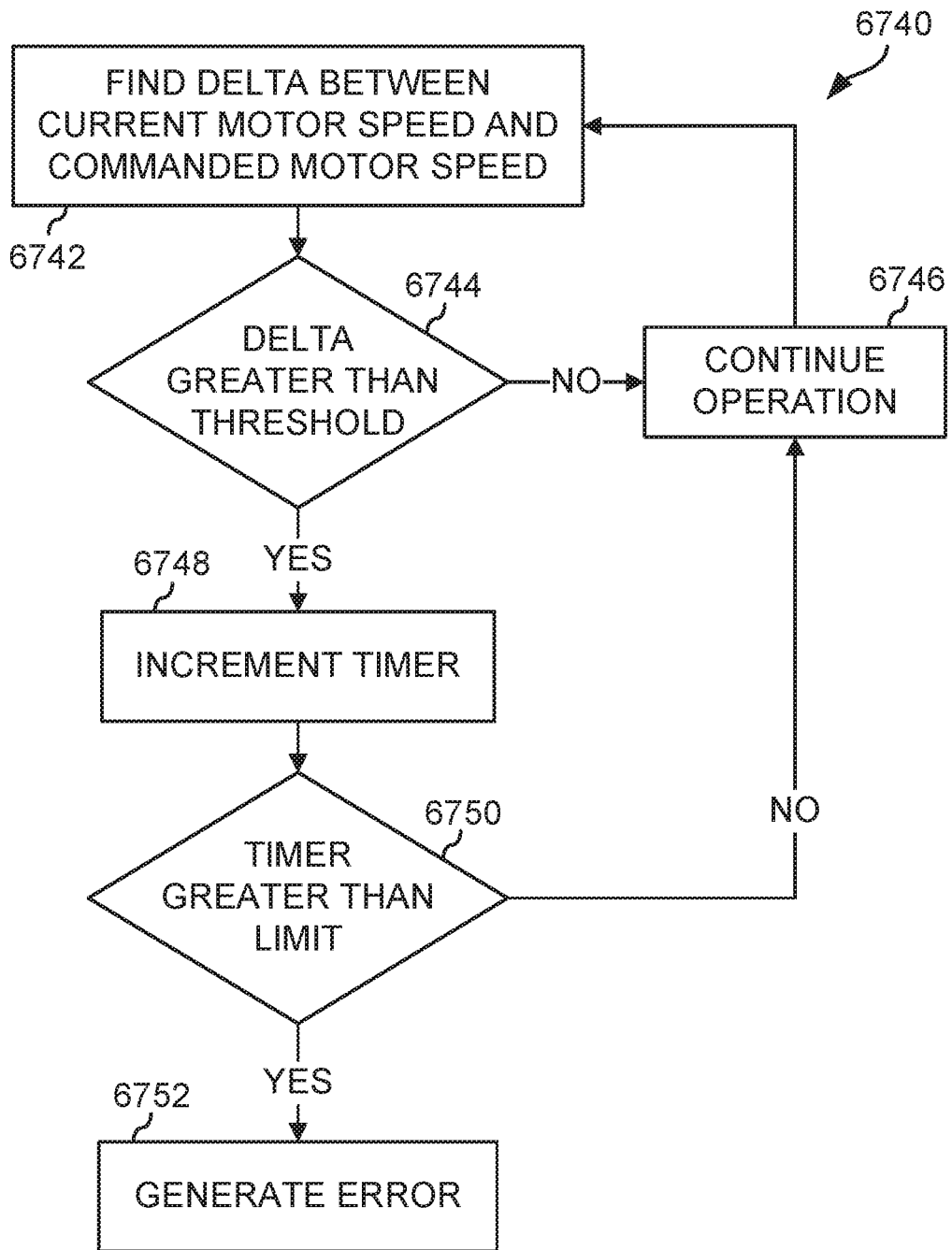
FIG. 116 depicts a flowchart detailing a number of example actions which may be used to monitor for errors during operation of a system.

Referring now to FIG. 116, a controller 6034 (see, e.g., FIG. 3) of the system 6000 may also monitor the compressor motor for atypical operation and may generate a fault condition if warranted. As shown in the flowchart 6740 of FIG. 116, the controller 6034 may determine a delta between the current motor speed and the commanded motor speed in block 6742. If, in block 6744, this delta is below a predefined threshold the controller 6034 may, in block 6746, continue commanding normal operation of the motor as described elsewhere herein. The controller 6034 may continue to monitor for atypical motor operation throughout operation. If, in block 6744, the delta is above the threshold a timer may be incremented in block 6748. In certain embodiments, the threshold may be set at 400-600 rpm (e.g. 500 rpm). If, in block 6750, the timer is incremented above a predetermined limit, an error may be generated in block 6752. The motor may also be disabled and commanded to stop. The timer limit may be less than one minute (e.g. 30 seconds). If, in block 6750, the timer has not breached the limit, operation may continue normally in block 6746. If the delta falls below the threshold after exceeding the threshold, any accumulated time for the timer may be reset to zero. In some embodiments, if the delta has risen above the threshold, the delta may be required to fall below the threshold for a period of time before the timer is reset.

Figure 117:
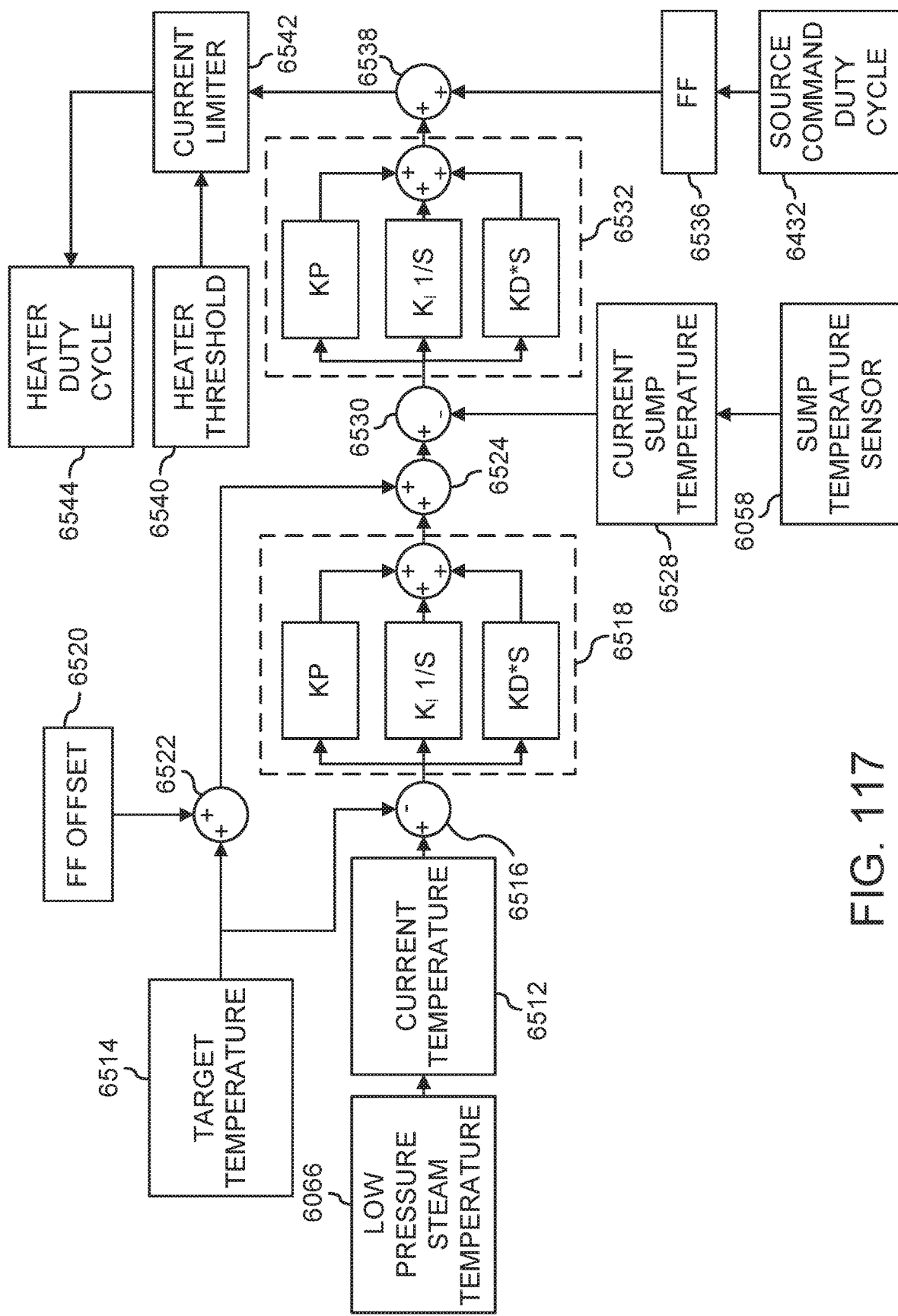
FIG. 117 depicts an example heater control diagram.

Referring now to FIG. 117 an example a control diagram 6510 detailing an example control system is shown. The control system may be a cascade control system and may be used to generate a command 6544 which governs operation of an at least one heating element 6054 of a purifier 6010. Multiple control loops may be used to generate the command. A first control loop, for example, may indirectly control the heating element 6054 while a second control loop may output a heater duty cycle command directly. In such embodiments, the first control loop may generate a set point for the second control loop.

The command may be calculated to get fluid in the purifier 6010 to a target temperature or temperature range (e.g. 102-116° C.) while conforming to various control limits (e.g. power or other electrical limitations) imposed upon the command 6544. A controller 6034 (see, e.g., FIG. 2) may collect temperature data on at least one fluid as well as the temperature of a second fluid adjacent the heating element 6054 in the sump 6052. This data may be used, in conjunction with temperature set points of the first and second fluid to generate the command 6544. The exemplary control diagram 6510 in FIG. 117 is also equipped to help quickly react to various disturbances which can rapidly alter temperature within the purifier 6010.

As shown, a temperature reading 6512 of a first process stream may be taken by temperature sensor 6066 in communication with that process stream. In the example, the temperature sensor is a low pressure vapor sensor 6066 which monitors the temperature of vapor entering the compressor 6064. The temperature reading 6512 may be combined with a target temperature value 6514 in summer 6516. Again, as previously mentioned, use of the word "summer" anywhere herein shall not be construed to mean addition only must be performed, only that various inputs are combined into an output. The output of summer 6516 may be feed to a control loop for the first fluid temperature 6518. In the example embodiment, the first fluid temperature control loop 6518 is depicted as a PID control loop which provides an output to summer 6524. In various embodiments, at least one of the gain values in the first fluid temperature control loop 6518 may be set to zero (e.g. $K_D$). In some embodiments, at least one gain (e.g. $K_i$) of the first fluid temperature control loop 6518 may be altered depending on a set of predefined criteria. For example, the altered gain may be decreased (e.g. set to zero) in the event that the output of another control loop becomes saturated. The target temperature 6512 may be a predefined value in certain embodiments and may be mode or state specific. For example, the target temperatures during normal purified water production and hot purified water production respectively may be 108° C. and 104° C. The target temperatures during hot purified water production may be less than, but at least 95% of the target temperature in the normal purified water production state.

The target temperature 6512 may also be combined with an offset 6520 in summer 6522. This offset 6520 may be a predetermined value, for instance −1 to −10° C. (e.g. −4° C.). The offset 6520 may serve to start the control system off in an initial state which reaches any target set points provided more quickly than it would solely under governance of the control loops 6518, 6538. The output of summer 6522 may be combined with the output of the first temperature control loop 6518 in summer 6524.

The current temperature 6528 of the second fluid may be sensed by a temperature sensor 6058 and combined with the output of summer 6524 in summer 6530. The second fluid may be source fluid which has been received in the sump 6052 of a purifier. The output of summer 6530 may be fed to a second fluid control loop 6532 which may control the temperature of fluid in the sump 6052. As such, the first fluid temperature control loop 6518 may act as an outer control loop and the second fluid temperature control loop 6532 may act as an inner control loop. Similarly to the first fluid temperature control loop 6518, the second fluid temperature control loop may be a PID control loop. At least one of the gains in the second fluid control loop 6532 may be set to zero (e.g. $K_D$). The output of the second fluid temperature control loop 6532 may be a provisional heater command duty cycle.

At least one disturbance monitor may also be included in some embodiments. The disturbance monitor may provide data related to the monitored disturbance to a feed forward controller 6536. The feed forward controller 6536 may generate a disturbance compensation output which is passed to a summer 6538. Where multiple disturbances are monitored, each disturbance may be associated with its own feed forward controller. The multiple compensation outputs from the plurality of feed forward controllers may be combined in feed forward summer (not shown) before a combined compensation output is provided to summer 6538. In the example shown in FIG. 117, the disturbance is the source command duty cycle 6432 (see, e.g. FIG. 100). As the source command duty cycle 6432 increases a greater volume of relatively cool source fluid may enter the sump 6052 cooling the overall temperature. The feed forward controller 6536 may serve to preemptively adjust the provisional heater command output to compensate for an increased volume of cool source water entering the purifier 6010. If, for example, the source command duty cycle 6432 is large (e.g. 100%) the feed forward controller 6536 may create an output which increases the provisional duty cycle command for the heating element 6054.

Before providing the feed forward adjusted heater command duty cycle from summer 6538 to the at least one heating element 6054, the output of summer 6538 may be checked against one or more threshold 6540. If the output of summer 6538 would cause breach of one of the thresholds, then the heater duty cycle may again be adjusted. The controller 6034 may check the power factor correction current and determine if it is above a predefined limit. In the event it is above the predefined limit, the feed forward adjusted duty cycle command may be altered in current limiter 6542. For example, the command may be altered to the last commanded heater duty cycle 6544. Alternatively, the command from summer 6538 may be checked against a maximum heater power limit. This limit may be dynamic and may be set not exceed a maximum system 6000 power. The limit may be determined based at least partially off of an amount of power being allocated to the motor of the compressor 6064 (see, e.g. FIG. 3). The maximum heater 6054 (see, e.g., FIG. 3) power limit may, for instance, be calculated by subtracting the power allocated for the compressor 6064 motor from a predefined power value (e.g. the maximum total power) for the system 6000. This maximum total power may be at or around 1150 Watts. In some embodiments, the maximum heater 6054 power limit may be expressed in terms of a heater duty cycle. A relationship between heater duty cycle percent and wattage may be used to perform the conversion. This relationship may be empirically determined. Where a duty cycle limit is used, the duty cycle may be limited to a maximum value such as 90%.

After alteration, or if the output of summer 6538 is not above the threshold 6540, a final heater duty cycle command 6544 may be generated. This command may be provided to the heating element 6054.

Figure 118:
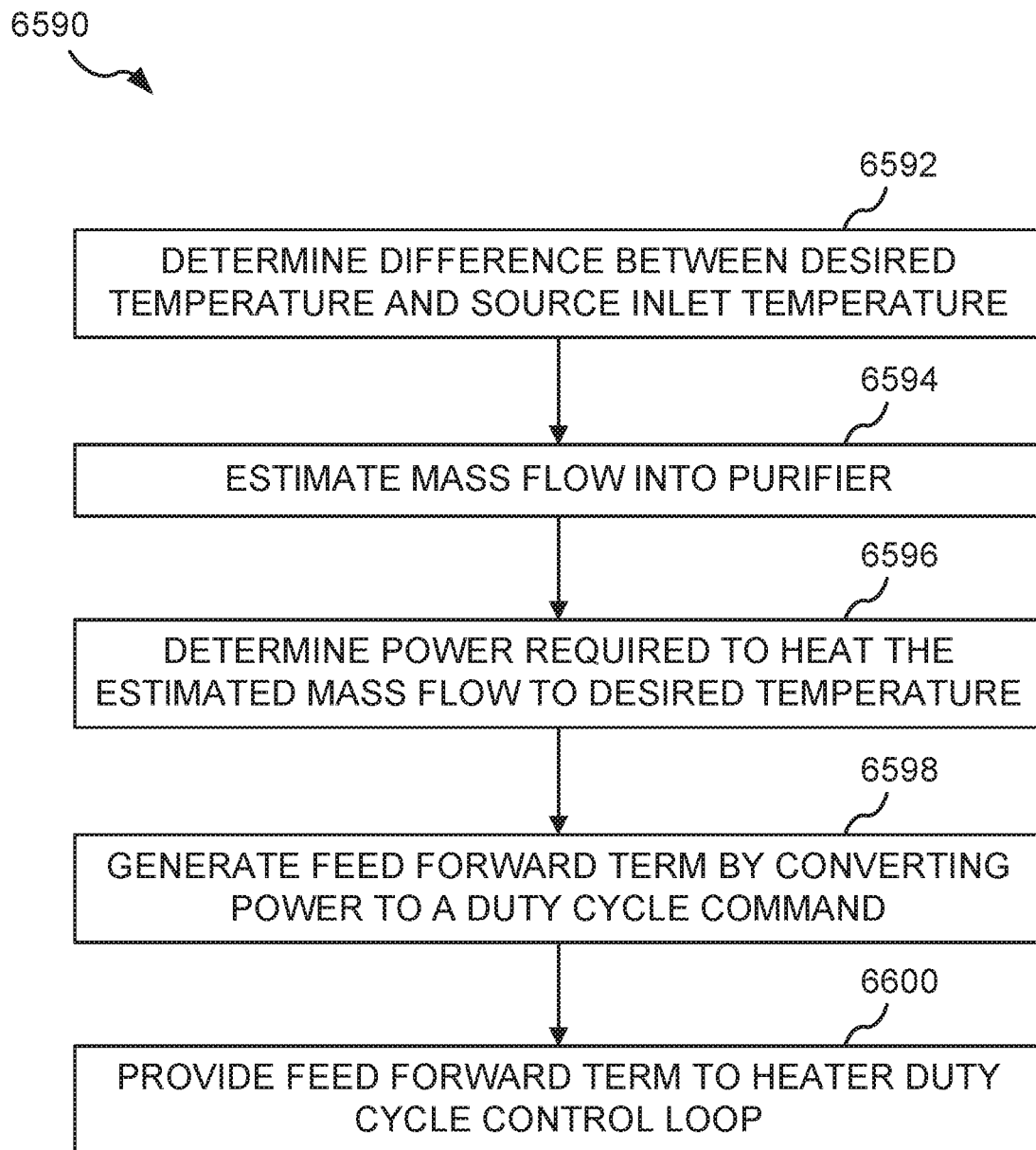
FIG. 118 depicts a flowchart detailing a number of example actions which may be used determine a feed forward command for a compressor motor controller.

Referring now to FIG. 118, a flowchart 6590 depicting a number of example actions which may be executed to generate a feed forward command is depicted. As shown, in block 6592 a controller may determine a difference between a desired temperature and the source inlet temperature. The desired temperature may, for example, be the target temperature 6514 described in relation to FIG. 117 or may be otherwise generated by another control loop of the system 6000. For example, it may be the output from the first fluid temperature control loop 6518 or from summer 6524 of FIG. 117. The source inlet temperature may be provided by a temperature sensor monitoring the fluid stream entering the purifier 6010. In alternative embodiments, a reading of the fluid temperature in the sump 6052 may be used. An estimated mass flow entering the purifier 6010 may also be determined in block 6594. A sensor may be employed to monitor the mass flow. Alternatively, the mass flow may be estimated by empirically determining a relationship between source inlet valve duty cycle and volume of water entering the purifier. For example, a number of mL per unit time per percent duty cycle may be empirically determined. This value may then be used in block 6594 as an estimate of mass flow into the purifier 6010. In block 6596, a controller 6034 may determine an amount of power required to heat the estimated mass flow into the purifier 6010 to the desired temperature. The estimated mass flow, thermodynamic characteristics (e.g. specific heat of water, heat of vaporization, etc.), and the delta between the source or sump temperature and desired temperature may be used to calculate the power required in block 6596. The power requirement calculated in block 6596 may be used to determine a corresponding heater duty cycle which will act as the feed forward term in block 6598. A relationship between heater duty cycle percent and wattage may be used to perform the conversion. The feed forward term may be sent to the heating element controller in block 6600. In some embodiments, the feed forward term may be limited to between a minimum and maximum value defined for the feed forward term before being sent to the heating element controller in block 6600. In certain embodiments, the feed forward term may be limited to between 0% and 90%.

Figure 119:
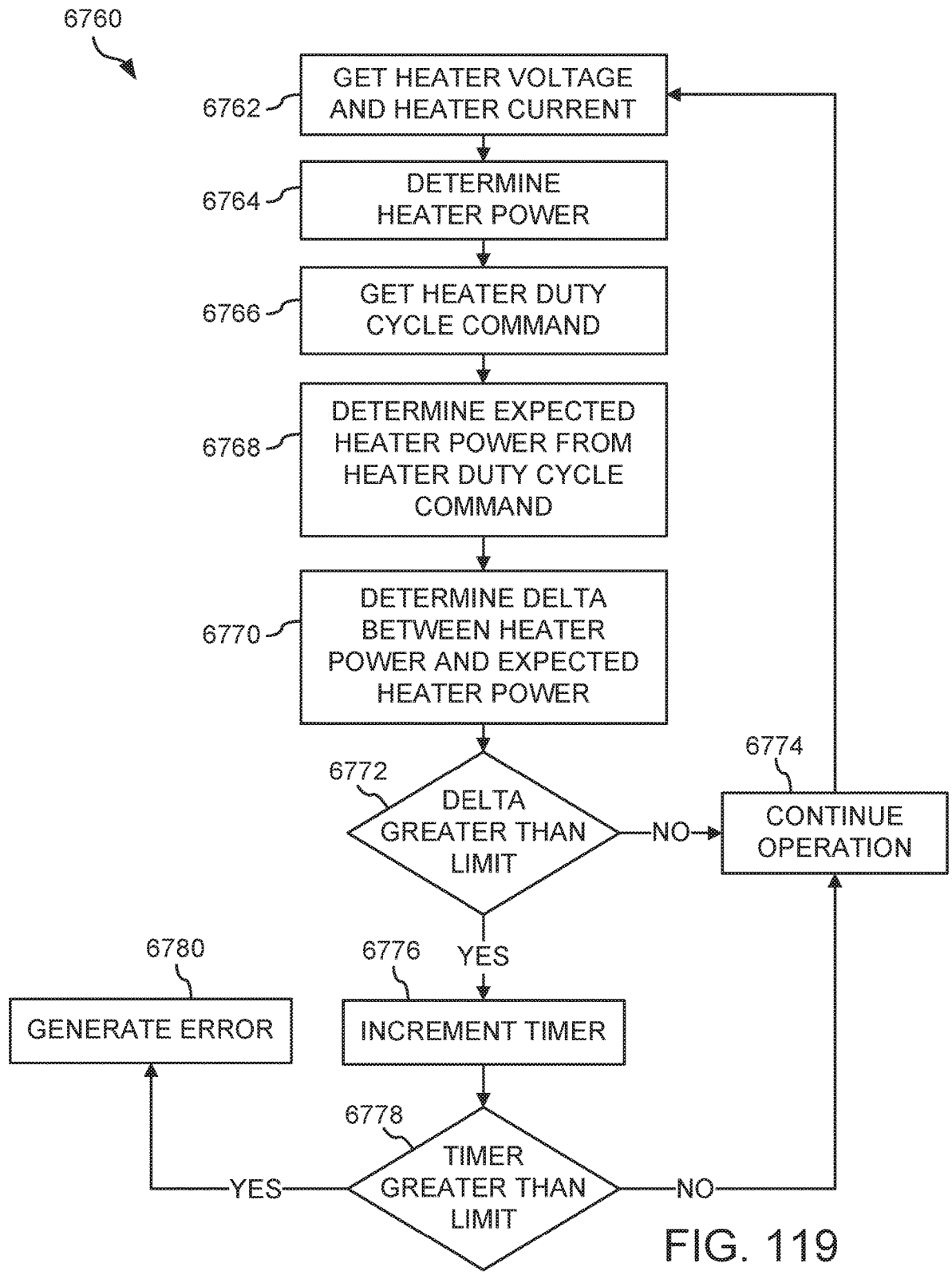
FIG. 119 depicts a flowchart detailing a number of example actions which may be used to monitor for errors during operation of a system.

Referring now to FIG. 119, a controller 6034 of the system 6000 may also monitor the heater 6054 for atypical operation and may generate a fault condition if warranted. As shown in the flowchart 6760 depicted in FIG. 119, the controller 6034 (see, e.g., FIG. 3) may determine the current heater voltage and the heater current in block 6762. In block 6764, the controller 6034 may determine a current heater power. The controller 6034 may get the current heater duty cycle command in block 6766. The expected heater power may be determined, in block 6768, from the current heater duty cycle command. A delta between the current heater power and the expected power may be calculated in block 6770. If, in block 6772, the delta is below a predefined threshold, the controller 6034 may, in block 6774, continue commanding normal operation of the heater 6054 as described elsewhere herein. The controller 6034 may continue to monitor for atypical heater operation throughout operation. If, in block 6772, the delta is above the predefined threshold, a timer may be incremented in block 6776. If, in block 6778, the timer has been incremented above a preset timer limit, an error may be generated in block 6780. Otherwise, operation of the heater 6054 may continue normally in block 6774. If the delta falls below the threshold after exceeding the threshold, any accumulated time for the timer may be reset to zero. In some embodiments, if the delta has risen above the threshold, the delta may be required to fall below the threshold for a period of time before the timer is reset.

Figure 120:
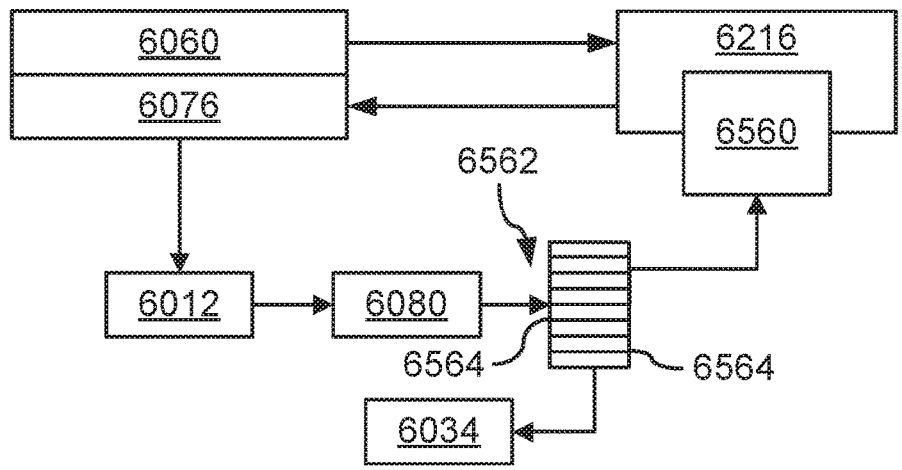
FIG. 120 depicts a block diagram of a system including a bearing feed flow sensor.

Referring now to FIG. 120, a representational block diagram of a system 6000 including a bearing feed flow sensor 6562 is depicted. The bearing feed flow sensor 6562 may generate data which indicates that fluid is indeed flowing to an impeller bearing 6560 for an impeller 6216 of the water purifier 6010. As described elsewhere herein, the fluid source for the bearing feed may be a purified water reservoir 6012 attached to a condenser 6076 of the water purifier 6010. The bearing feed flow sensor 6562 may also indicate that the flow rate of fluid to the impeller bearing 6560 is within an acceptable predefined range (e.g. around 1 gram/sec). As shown, the bearing feed flow sensor 6562 is positioned downstream of the bearing feed pump 6080. A bearing feed flow sensor 6562 may additionally or instead be disposed upstream of the bearing feed pump 6080 depending on the embodiment. Any suitable flow sensor may be used as a bearing feed flow sensor 6562, however, in the exemplary embodiment, the bearing feed flow sensor 6562 is depicted as a thermal sensor. In certain embodiments, the bearing feed flow sensor 6562 may include a thermal sensor and a pressure sensor. Where a thermal sensor is used, the thermal sensor (e.g. a thermocouple or thermistor) may be an inline probe which provides a signal representative of bearing feed flow temperature to a controller 6034 of the system 6000. The bearing feed flow sensor 6562 and/or pump 6080 may include heat dissipating features 6564 such as fins or similar protrusions which help to rapidly dissipate heat.

Figure 121:
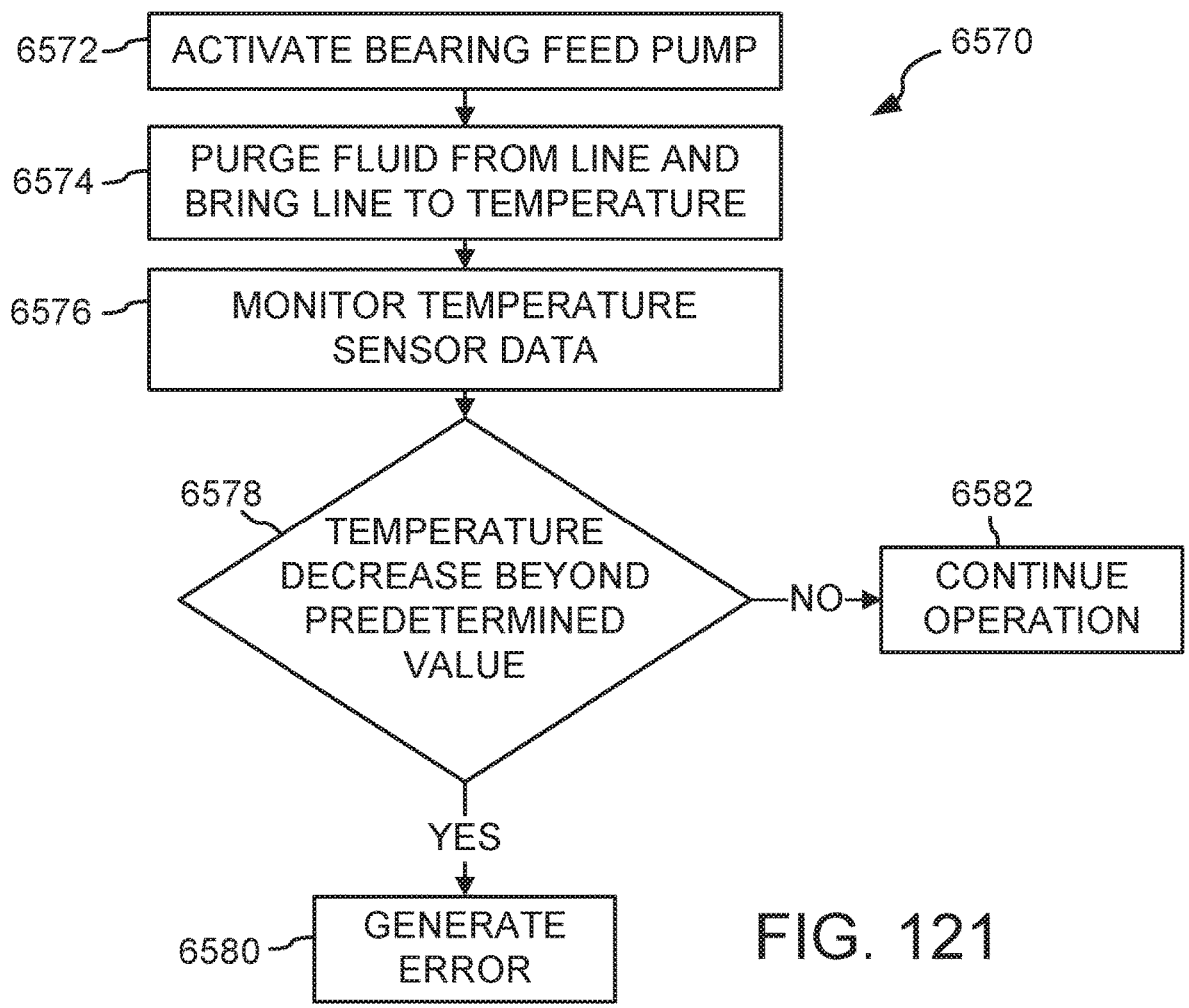
FIG. 121 depicts a flowchart detailing an number of example actions which may be used to monitor for flow from a bearing feed pump.

Referring now to FIG. 121, where the bearing feed flow sensor 6562 is a thermal sensor, the temperature data generated by the sensor may indicate presence or absence of fluid flow and/or whether the rate of bearing feed flow is acceptable. As shown in the flowchart 6570 of FIG. 121, the bearing feed pump may be activated in block 6572. Any pre-existing fluid in the bearing feed conduit may be purged and the conduit may be brought up to the temperature of the purified water in block 6574. The bearing feed flow sensor 6562 may monitor the temperature of the bearing feed stream and provide data representative of the temperature to a controller 6034 (see, e.g., FIG. 2) in block 6576.

In the event the bearing feed pump 6080 is not properly functioning, an occlusion occurs, or the bearing feed pump 6080 is unable to draw fluid from the product reservoir 6012, the temperature in the bearing feed conduit may begin to drop. The drop may be relatively significant and in some embodiments may be greater than 1° C. every five seconds. If, in block 6578, the temperature indicated by the bearing feed flow sensor 6562 drops beyond a predefined value an error may be generated in block 6580. If, in block 6578, temperature does not drop below this value, operation may continue in block 6582 as the data indicates flow in the bearing feed conduit is as expected.

The predefined temperature value may be a static value in some embodiments. In other embodiments, the temperature value used to generate an error may be calculated based off of another temperature measurement in the system 6000. For example, the controller 6034 may use a low pressure steam temperature (e.g. from temperature sensor 6066) to determine the error temperature value. The error temperature value may be set at 25-35° C. (e.g. 30° C.) less than the low pressure steam temperature. The delta between these two temperatures may be tracked by a controller 6034 to determine if the bearing feed pump 6080 is operating as expected.

In some embodiments, the temperature value itself may not be used to determine whether an error exists. Instead, the temperature signal may be further analyzed to potentially offer a faster detection of an abnormal flow condition in the bearing feed conduit. In such embodiments, the temperature signal may be differentiated and rate of change may be used instead of the temperature value. If the rate of change is greater than a predefined rate, the controller 6034 may generate an error in block 6580.

Figure 122:
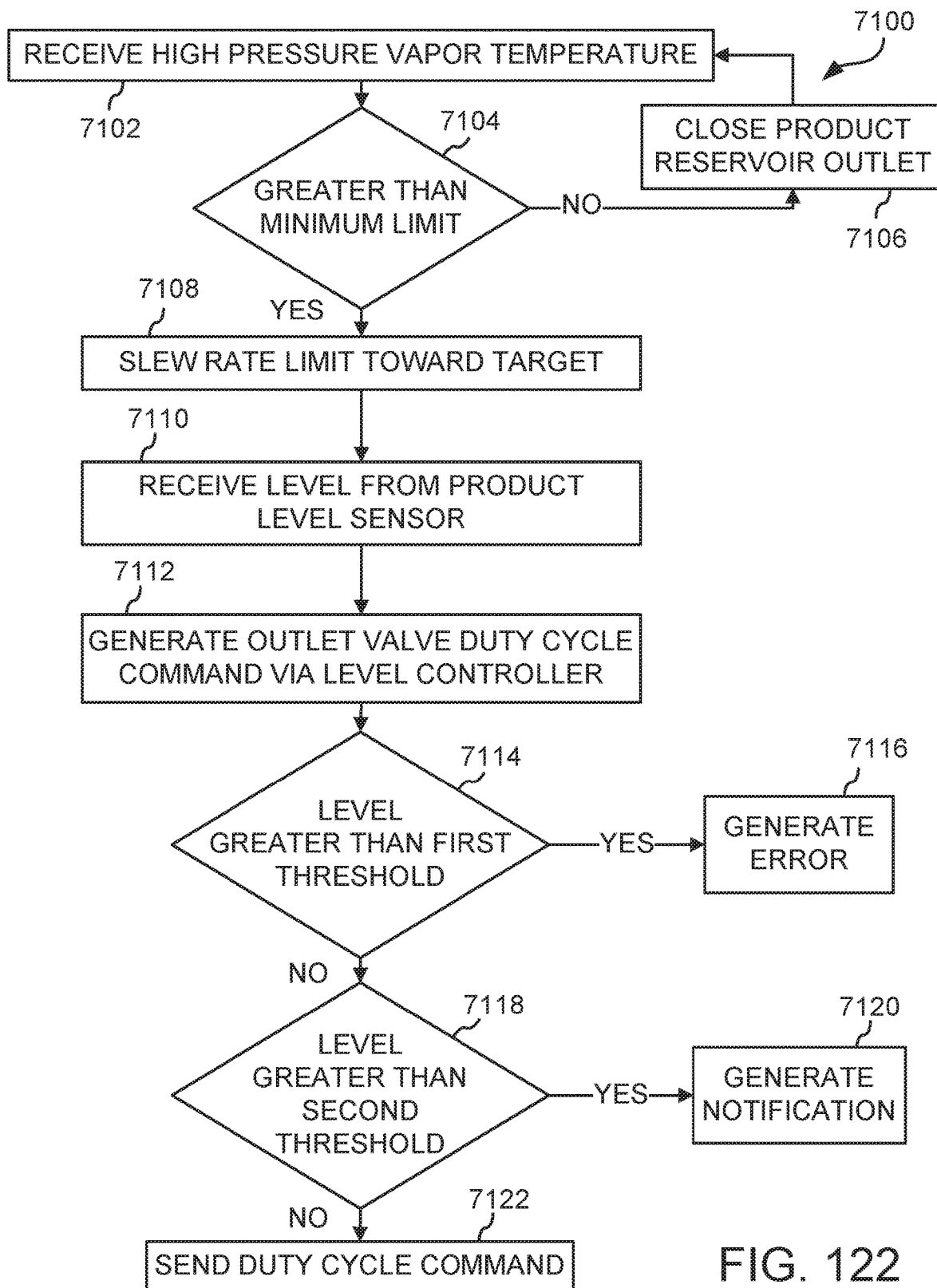
FIG. 122 depicts a flowchart detailing a number of example actions which may be used to determine a product reservoir outlet valve command.

Referring now to FIG. 122 a flowchart 7100 depicting a number of example actions which may be executed to control a level of product in the condenser 6076 (see, e.g., FIG. 3) of a purifier 6010 (see, e.g., FIG. 3). In certain embodiments, the level may be measured via a product reservoir level sensor 6078 in a product reservoir 6012 fluidly connected to the condenser 6076. The controller 6034 (see, e.g., FIG. 3) may, as described elsewhere herein, maintain a volume of product water in the condenser 6076 such that the condenser 6076 serves as a reservoir. This may allow for product water to be used at a point of use at a rate faster that it can be produced by the purifier 6010. The amount maintained in the purifier 6010 may be chosen based off of expected demands and shifts in demand of an attached point of use device or system. Further description is provided in relation to FIG. 83.

As shown, a controller 6034 of the system 6000 may receive a high pressure vapor temperature in block 7102. This reading may be supplied via a high pressure vapor temperature sensor 6068 (see, e.g., FIG. 3). If in block 7104, the high pressure vapor temperature is below a minimum limit (e.g. 104° C.), a product reservoir outlet may be closed in block 7106. In some embodiments, the product reservoir outlet may be a diverter valve 6084 (see, e.g., FIG. 3) which is opened to divert product water to a drain destination 6018 (see, e.g., FIG. 3) or other reservoir in order to maintain a desired level in the product reservoir 6012. If, in block 7104, the high pressure vapor temperature is below the minimum limit, additional product reservoir outlet valves such as a valve leading to a point of use device (e.g. medical system 6004) may also be closed. This may aid in a build-up of pressure which may be leveraged to drive flow of product water out of the condenser 6076 and product reservoir 6012. If, in block 7104, the high pressure vapor temperature is greater than the minimum limit, the controller 6034 may slew rate limit a current target product level toward a predefined volume storage goal in block 7108. The predefined volume storage goal may be a level of 30% in the product reservoir 6012. In some embodiments, this may maintain a buffer volume of 1-2 liters in the condenser 6076 and product reservoir 6012 which a point of use device of system (e.g. medical device 6004 of FIG. 3) may draw from during periods of high purified water usage.

The controller 6034 may receive a level from the product reservoir level sensor 6078 in block 7110. In block 7112, a level controller may determine a product reservoir outlet (e.g. diverter valve 6084 of FIG. 3) valve duty cycle command. The level controller may be a PID controller which uses a delta between the current level and current target level to generate an output. In such embodiments, one or more of the gains of the PID controller may be set to zero (e.g. that of the derivative term). The controller 6034 may command the outlet valve to operate at the duty cycle determined in block 7122 unless the level in the product reservoir 6012 is determined to be too high in block 7114, and 7118. If in block 7114, the level is above a first threshold an error may be generated 7116. The first threshold may between 80-95% (e.g. 90%) in some embodiments. If, in block 7118, the level is greater than a second threshold, a notification may be generated in block 7120. The second threshold may be less than the first threshold. In some examples, the second threshold may be 45-65% (e.g. 50%). In some embodiments, the controller 6034 may stop operation of the system 6000 in the event that the first threshold is breached. The controller 6034 may allow the system 6000 to continue operating in the event that the second threshold is breached.

In some embodiments, the outlet valve duty cycle command generated in block 7112 may be dependent upon at least one sensor value. For example, in some embodiments the outlet valve duty cycle may be dependent upon values from sensors such as the product level sensor 6078 (see, e.g. FIG. 3) or product temperature sensors (e.g. 6082A-D of FIG. 3). When these sensors indicate that a point of use device (e.g. medical system 6004 of FIG. 3) is currently drawing product water from the product reservoir 6012, the outlet valve duty cycle command may be altered. This may help to ensure that the product reservoir 6012 and condenser 6076 (see, e.g., FIG. 3) contain a relatively large reserve volume of distillate for use in the point of use device. Additionally, this may help to ensure that a large increase in mass flow of hot water through the product heat exchanger 6008A does not spike the product temperature beyond a desired level. Typically, the outlet valve duty cycle command may be decreased (e.g. set to a minimal value or perhaps zero). In some examples, upon a determination that the point of use device is no long consuming water from the system 6000, the level controller may be restored based on its original output before being decreased.

Figure 123:
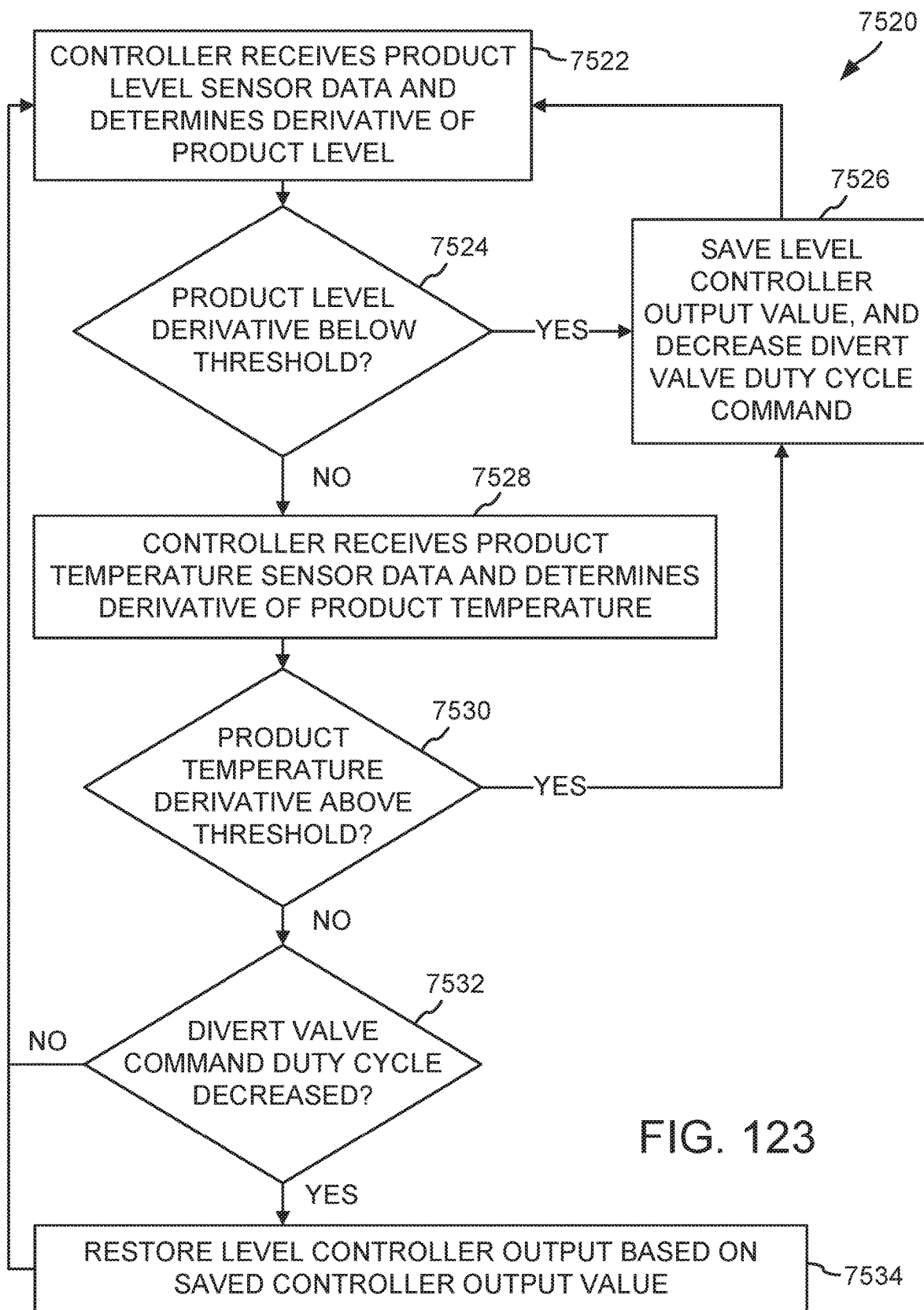
FIG. 123 depicts a flowchart detailing a number of example actions which may be used to adjust a product reservoir outlet valve duty cycle based on data from a product level sensor and product temperature sensor.

Referring now also to FIG. 123, a flowchart 7520 detailing a number of example actions which may be executed to adjust a product reservoir outlet valve duty cycle based on data from a product level sensor 6078 (see, e.g. FIG. 3) and product temperature sensor (e.g. 6082A-D of FIG. 3) is shown. Though data from both the product level sensor 6078 and product temperature sensor 6082A-D are used in the example, other embodiments may adjust the product reservoir valve duty cycle using readings from only one of the product level sensor 6078 and product temperature sensor 6082A-D.

As shown, the controller 6034 may receive data from the product level sensor 6078 and find a derivative using the data in block 7522. If, in block 7524, the derivative of the product level is below a threshold (e.g. negative or negative beyond a predefined magnitude) the outlet valve duty cycle may be decreased in block 7526. Such a negative derivative of the product level may indicate product water is being drawn into the point of use device. Alternatively, the point of use device may send a communication to the system 6000 indicating it is drawing product water. In such examples, a derivative may optionally still be computed and checked, for example, to add a double checking redundancy to the system 6000. When the outlet valve duty cycle is decreased, the output of the level controller may be saved as shown in block 7526.

In block 7528, the controller 6034 may receive data from each of the product temperature sensors (e.g. 6082A-D of FIG. 3) and find at least one derivative value using this data. A derivative of the product temperature as sensed by each individual product temperature sensor 6082A-D may be calculated. In other embodiments, the temperatures from each product temperature sensor 6082A-D may be averaged and a single derivative may be computed based on these averages. If, in block 7530, the product temperature derivative is above a threshold (e.g. above some positive value) the outlet valve duty cycle may be decreased in block 7526. As above, the outlet valve output of the level controller may be saved when the duty cycle is decreased in block 7526. Where derivatives are individually taken for each temperature sensor (e.g. 6082A-D of FIG. 3) if any of the derivatives breach the threshold the flowchart 7520 may proceed to block 7526.

In some embodiments, an integral of the data from these sensors and/or of the calculated derivative values may also be taken and if in breach of a threshold a decrease in outlet valve duty cycle may be commanded. The output of the level controller may be saved in such instances as well. This may ensure that slow changes due to a point of use device consuming water from the system 6000 are captured. For example, an integral of the data from the product temperature sensors (e.g. 6082A-D of FIG. 3) may be taken. An integral of the product temperature as sensed by each individual product temperature sensor may be calculated. In other embodiments, the temperatures from each product temperature sensor may be averaged and a integral may be computed based on these averages.

The controller 6034 may continue to monitor the sensor data derivatives (and optionally integrals) in blocks 7522-7530 after reducing the duty cycle in block 7526. If, in block 7532, the product reservoir outlet valve duty cycle command is in a decreased state, and the sensor output derivatives are not in breach of their thresholds in blocks 7524 and 7530, the level controller output may be restored based on its saved value in block 7534. The controller 6034 may then continue determining the outlet valve duty cycle command as described above in relation to FIG. 122.

Figure 124:
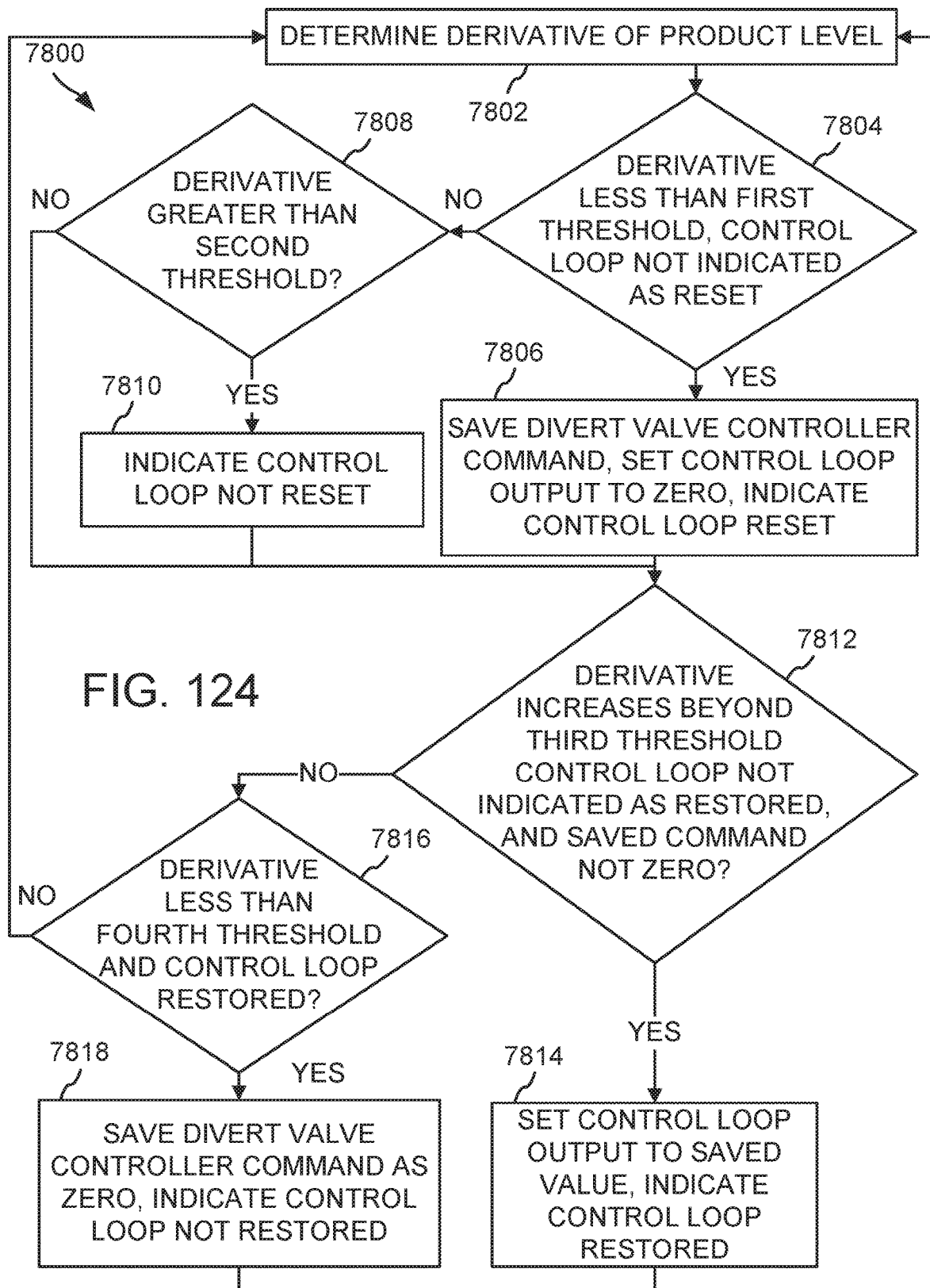
FIG. 124 depicts a flowchart detailing a number of example actions which may be used to adjust a product reservoir outlet valve duty cycle based on data from a product level sensor.

Referring now also to FIG. 124, a flowchart 7800 detailing a number of example actions which may be executed to adjust a product reservoir outlet valve duty cycle based on data from a product level sensor 6078 (see, e.g. FIG. 3) is depicted. In block 7802, the controller 6034 may find a derivate of the product level based on data received from a product level sensor 6078. If, in block 7804, the derivative is less than a threshold and the control loop has not been indicated as reset, the controller 6034 may proceed to block 7806. In block 7806, the divert valve control loop command may be saved and the control loop output may be decreased. The controller 6034 may also indicate (e.g. by setting a flag) that the control loop has been reset in block 7806. In the example, the control loop output is decreased to zero. In certain embodiments, an output of a term such as the I term of the control loop may be decreased (e.g. to zero). The output of the control loop may be subjected to limiting (e.g. the control loop may be prohibited from commanding a negative duty cycle) such that terms of the control loop with negative outputs will have no effect.

If, in block 7804, the derivative is above the threshold and the control loop is indicated as being reset and if, in block 7808, the derivate is greater than a second threshold, the controller 6034 may proceed to block 7810. The second threshold may be zero in certain examples. In block 7810, the controller 6034 may indicate that the control loop has not been reset 7810. Thus, if the derivative of the product level drops below the first threshold again, the control loop may again be reset.

If, in block 7812, the derivative of the product level increases beyond a third threshold, the control loop hasn't already been restored, and the saved control loop output is not zero, the controller 6034 may proceed to block 7814. The third threshold may be set as some positive value. In block 7814, the controller 6034 may reset the control loop to the saved output value from block 7806. Additionally, the controller 6034 may indicate the control loop has been restored in block 7814. In embodiments where output of a term such as the I term of the control loop is decreased in block 7806, the control loop may be reset to the saved output value from block 7806 less the current contribution from another term or terms of the loop.

If, in block 7812, the derivative of the product level is below the third threshold, the control loop has been restored, or the saved command is zero, and if, in block 7816, the product level derivative is less than a fourth threshold, the controller 6034 may proceed to block 7818. The fourth threshold may be zero in some embodiments. In block 7818, the controller 6034 may save the control loop output value as zero and indicate (e.g. by setting a flag) that the control loop has not been restored. This may allow the control loop to be restored again if when the derivative of the product level increases back to the third threshold.

Referring now also to FIG. 125, a flowchart 7830 detailing a number of example actions which may be executed to adjust a product reservoir outlet valve duty cycle based on data from one or more product temperature sensor 6082A-D (see, e.g. FIG. 3) is depicted. In block 7832, the controller 6034 may find a derivate of the product level based on data received from the product temperature sensor(s) 6082A-D. As mentioned elsewhere, in embodiments where data from multiple product temperature sensors 6082A-D is used a derivative of the product temperature as sensed by each individual product temperature sensor 6082A-D may be calculated. In other embodiments, the temperatures from each product temperature sensor 6082A-D may be averaged and a single derivative may be computed based on these averages. Also in block 7832, an integral may be calculated based off any derivative values determined by the controller 6034.

If, in block 7834, the derivative and/or integral is above respective thresholds for each, the control loop has not been indicated as reset, and the product level temperature is above a predefined value, the controller 6034 may proceed to block 7836. In block 7836, the divert valve control loop command may be saved and the control loop output may be decreased. The controller 6034 may also indicate (e.g. by setting a flag) that the control loop has been reset in block 7806. In the example, the control loop output is decreased to zero. In certain embodiments, an output of a term such as the I term of the control loop may be decreased (e.g. to zero). The output of the control loop may be subjected to limiting (e.g. the control loop may be prohibited from commanding a negative duty cycle) such that terms of the control loop with negative outputs will have no effect.

As mentioned above, the controller 6034 may only proceed to block 7836 in the event that the product water temperature is greater than a predefined amount. This may prevent the adjusting the product outlet duty cycle command unless the product temperature gets close to a particular temperature. For example, where the point of use device is a medical system 6004 (see, e.g., FIG. 3) the system 6000 may be designed to avoid outputting water greater than body temperature (37° C.) for example. In such instances, the predefined temperature threshold may be below this temperature (e.g. 30° C.).

Referring again to FIG. 125, if, in block 7834, the derivative and/or integral is below the threshold and the control loop is indicated as being reset and if, in block 7838, the derivate is less than a second threshold, the controller 6034 may proceed to block 7840. The second threshold may be zero in certain examples. In some embodiments, the individual derivatives determined from each product temperature sensor 6082A-D may all be required to be less than the threshold in order for the controller 6034 to proceed to block 7840. In block 7840, the controller 6034 may indicate that the control loop has not been reset 7810. Thus, if the derivative or integral thereof for the product temperature rises above their first thresholds again, the control loop may again be reset.

If, in block 7842, the derivative of the product temperature decreases beyond a third threshold, the control loop hasn't already been restored, and the saved control loop output is not zero, the controller 6034 may proceed to block 7844. The third threshold may be set as some negative value. In some embodiments, if any of the individual derivatives determined from each product temperature sensor 6082A-D are less than the threshold, the controller 6034 may proceed to block 7844. In block 7844, the controller 6034 may reset the control loop to the saved output value from block 7836. Additionally, the controller 6034 may indicate the control loop has been restored in block 7844. In embodiments where output of a term such as the I term of the control loop is decreased in block 7836, the control loop may be reset to the saved output value from block 7836 less the current contribution from another term or terms of the loop.

If, in block 7842, the derivative of the product temperature is above the third threshold, the control loop has been restored, or the saved command is zero, and if, in block 7846, the product temperature derivative is less than a fourth threshold, the controller 6034 may proceed to block 7848. The fourth threshold may be zero in some embodiments. In block 7848, the controller 6034 may save the control loop output value as zero and indicate (e.g. by setting a flag) that the control loop has not been restored. This may allow the control loop to be restored again when the derivative of the product level decreases back below the third threshold.

Figure 126:
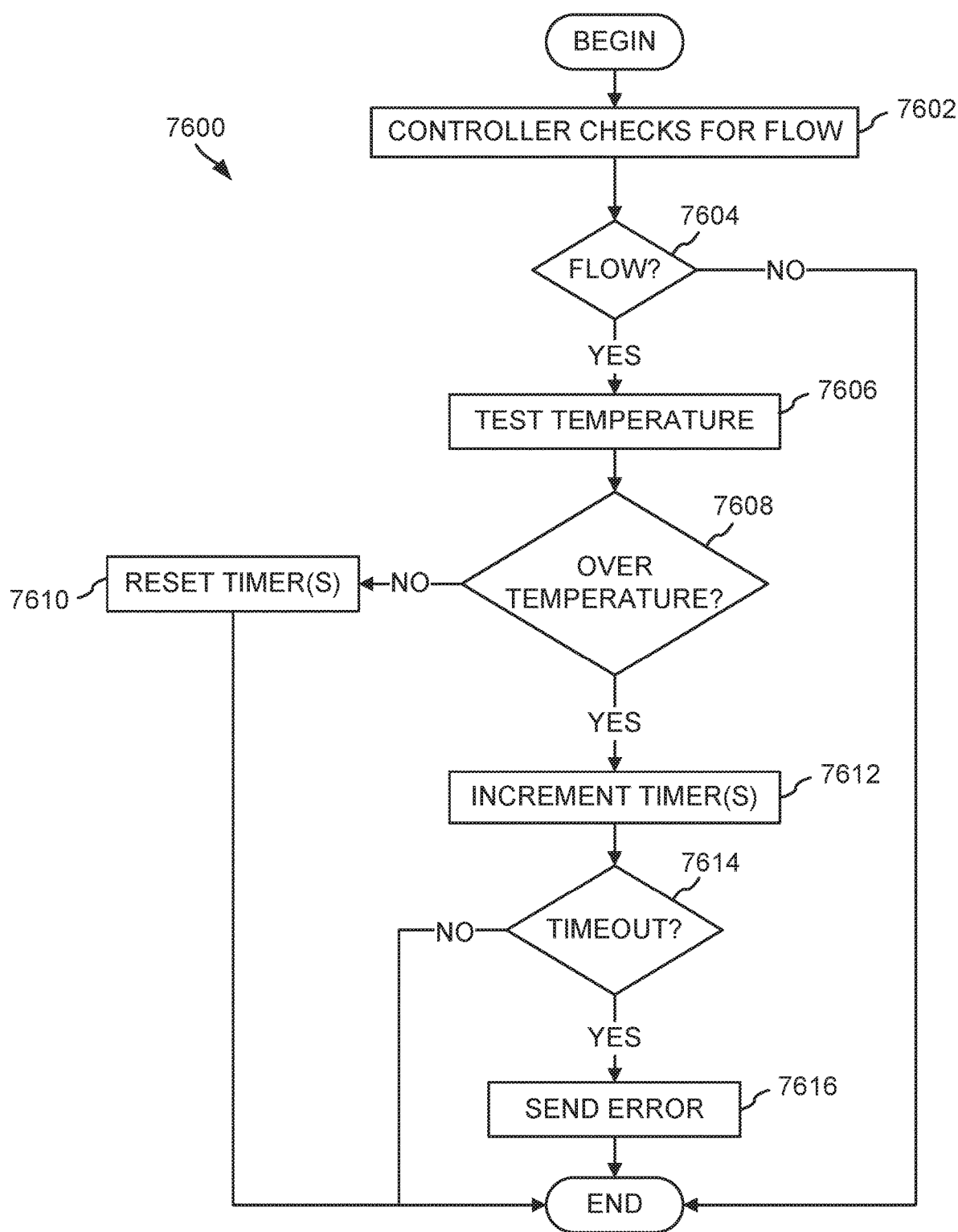
FIG. 126 depicts a flowchart depicting a number of example actions which may be used to determine the presence of an abnormal source water temperature within a system.

Referring now also to FIG. 126, a flowchart 7600 depicting a number of example actions which may be executed to determine the presence of an abnormal source water temperature within a system 6000 is shown. Detection of abnormal source temperature may be desired for several reasons. Among other things, such detection may allow the controller 6034 to react in the event that the incoming source water has a temperature which may be make it difficult to achieve a target temperature of one of the process streams exiting the heat exchangers 6008A, B. For example, as the incoming source water temperature increases, the amount of cooling possible for the process streams in each of the heat exchangers 6008A, B may decrease. In various embodiments, an abnormal source water temperature may be detected by monitoring the temperature of source water entering the system 6000 with a source water temperature sensor 6036 (see, e.g. FIG. 3). A controller 6034 of the system 6000 may receive the data signals from the temperature sensor 6036 and check the measured temperature against one or more thresholds. In the event that that the temperature exceeds a threshold for more than a predefined period of time, a notification or an error may be generated by the controller 6034. Though described in relation to the incoming source water, temperature parameters on other process streams (such as any of those described herein) may also be similarly monitored for abnormal temperatures predefined for each stream.

As shown in block 7602, a controller 6034 may monitor for existence of a flow of source water into the system 6000. Monitoring for flow in block 7602 may include, but is not limited to, reading one or more sensor, reading one or more variable, or checking one or more current command output with the controller 6034. For example, in certain embodiments, the controller 6034 may check the duty cycle on the source proportioning valves 6050A, B to the heat exchangers 6008A, B and perhaps the diverter valve 6100 (see, e.g. FIG. 3). If any of these duty cycles are greater than zero, the controller 6034 may conclude that flow of source water into the system 6000 is occurring. If, in block 7604, flow of source water into the system 6000 exists, the temperature of the source water may be obtained from a source water temperature sensor 6036 (see, e.g. FIG. 3) by the controller 6034 in block 7606. Also in block 7606, the temperature of the water source may be compared with a first temperature threshold and second temperature threshold. The first and second temperature threshold may be determined based on characteristics of a point of use device and characteristics of the heat exchangers 6008A, B. For example, where the point of use device is a medical system 6004 (see, e.g., FIG. 3) such as a dialysis machine, the temperature thresholds may be set to be less than body temperature (e.g. 30° C. and 35° C.). If, in block 7606, the temperature of the source water does not exceed any threshold, a timer, which may be associated each threshold, may be set to zero in block 7608. If, in block 7606, the temperature of the water source exceeds the first or second threshold, a timer, associated with each exceeded threshold, may be incremented in block 7610. If, in block 7612, the timer exceeds a timeout threshold predefined for each timer an error may be generated in block 7614. For example, the timeout threshold for one of the first and second temperature thresholds may be set to five seconds. If the associated timer exceeds five seconds, an error may be generated. The error generated may depend on the particular temperature threshold exceeded. For example, an error generated for a breach of the first threshold may be an over temperature notification which may cause a user interface on a point of use device to display an associated screen or screen flow. An error generated for a breach of the second temperature threshold (which may be set higher than the first temperature threshold) may be an over temperature error which may cause the controller 6034 to transition the system 6000 out of a water production state or cause diversion of product water produced by the system 6000 out of a diverter valve 6084.

Figure 127:
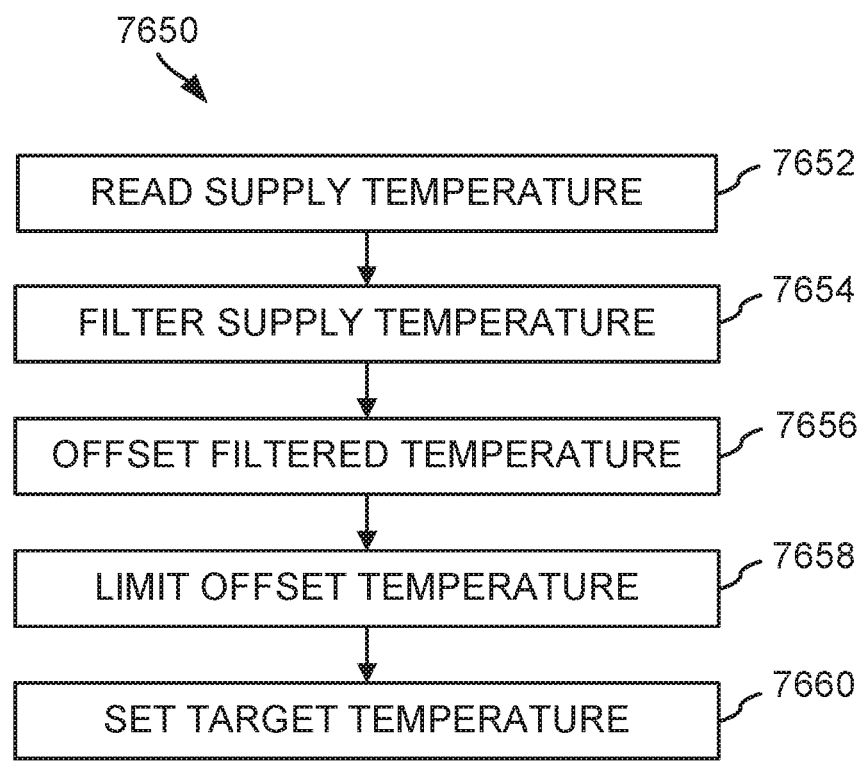
FIG. 127 depicts a flowchart depicting a number of example actions which may be used to adjust a temperature set point of a process stream.

Referring now also to FIG. 127, a flowchart 7650 depicting a number of example actions which may be executed to adjust a temperature set point of a process stream is shown. In various embodiments, adjusting the temperature set point may include measuring the temperature of incoming source water to the system 6000 and setting a desired temperature of a process stream within the system 6000 based on the source water temperature. In some embodiments, an offset may be applied to the source water temperature to arrive at a temperature set point for the process stream. It may be desired to set the target temperature of, for example, the product water exiting the product heat exchanger 6008A based on the temperature of the source water entering the system 6000.

In block 7652, the temperature of a water source may be obtained. Obtaining the temperature of the water source in block 7652 may include reading an output from one or more sensor such as a source water temperature sensor 6036 (see, e.g. FIG. 3). In block 7654, the temperature of the water source may be filtered to generate a filtered temperature. Filtering the temperature of the water source in block 7654 may be achieved by passing the temperature through a filter such as a low-pass filter. In block 7656, the filtered temperature may be adjusted using an offset value. In certain examples, the offset may be between 7-15° C. (e.g. 10° C.). The offset may be added to the filtered temperature from block 7654 to arrive an offset adjusted temperature. In block 7658, the offset adjusted temperature may be limited to a desired range. The desired range may for example be approximately 20° C. through approximately 25° C. In block 7660, a target temperature for the product process stream may be set as the limited temperature output from block 7658.

Figure 128:
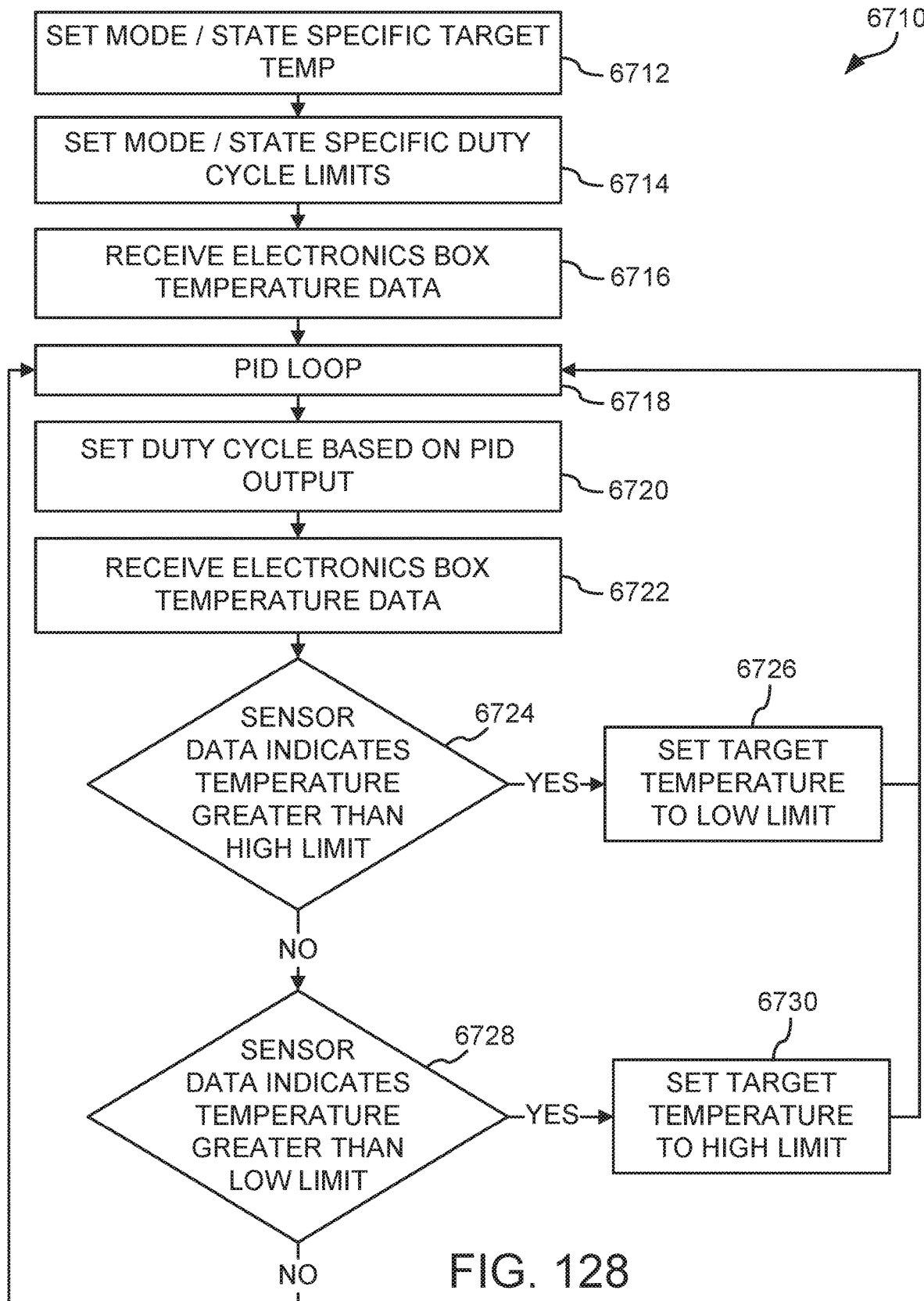

Referring now also to FIG. 128, a flowchart 6710 depicting a number of example actions which may be executed to control cooling of an electronics housing (see, e.g. 6046A, B of FIG. 51) of a system 6000 is shown. In block 6712, a target temperature for the electronics housing may be selected. Depending on the embodiment, a system 6000 may operate in a number of different modes and/or states. Mode or state specific cooling schemes for a filter (see, e.g. 6006A, B of FIG. 3) flushing mode, filter flushing states, water production mode, states used in a water production mode, stand-by mode, a stand-by state, and/or any other modes or states described herein may, for instance, be defined. Cooling of electronics in the system 6000 may be controlled differently depending on the mode or state. For example, a number of predefined target temperatures may be defined, with each being associated with an operating mode or state of the system 6000. A first mode or state and second mode or state (e.g. flushing state and water production running state) may have a set point of 45° C. though these set points may be different from one another in alternative embodiments. A third mode or state may have a set target range of 40-45° C. The third mode or state may be a mode or state where source water is not being directed into the purifier 6010 on a regular basis (e.g. stand-by mode/state, heating mode/state, etc.)

In block 6714, duty cycle limits on a valve controlling source water flow through a source line in heat exchange relationship with the electronics housing may be set. These limits may be predefined depending on the mode or state in which the system 6000 is in. In certain embodiments, the valve may be the source divert valve 6100 (see, e.g., FIG. 3). In a first mode or state (e.g. flushing mode or state) a maximum limit of 100% and a minimum limit of 50% may be used. In a second mode or state (e.g. production running state such as a hot water production state), a maximum limit of 25% and a minimum limit of 0% may be used. In a third mode or state (e.g. a stand-by mode or state) a maximum limit of 100% and a minimum limit of 0% may be used. This may allow for sporadic cooling when needed and help prevent excessive usage of source water when the system 6000 is not purifying water.

Data from an electronics temperature sensor (see, e.g., 6048 of FIG. 3) may be received by a controller 6034 (see, e.g. FIG. 3) of the system 6000 in block 6716. In block 6718, a delta between the target temperature and the temperature indicated by the electronics temperature sensor may be input to a PID loop run by the controller 6034. In some embodiments, the gains on one of the terms (e.g. the derivative term) may be set to zero. The output of the loop may be used to set or command a duty cycle for the valve controlling source fluid flow through the electronics housing in block 6720. The gains of the terms of the PID loop may also be mode or state specific and set depending on which mode or state the system 6000 is in.

In modes or embodiments where the target temperature is defined by a range, the controller 6034 may switch the target temperature between values in the range (e.g. the bounds of the range) based upon certain criteria. As shown, in block 6722, data from an electronics temperature sensor 6048 (see, e.g., FIG. 3) may be received by the controller 6034. If, in block 6724, the sensor data indicates that the current temperature of the electronics housing is greater than a high temperature limit, the target temperature value may be set to a low temperature limit in block 6726. The high temperature limit may be at or above 45° C. The low temperature limit may be below the high temperature limit, for example, at or below 40° C. If instead, in block 6728, the sensor data indicates that the current temperature of the electronics housing is less than the low temperature limit, the target temperature value may be set to the high temperature limit in block 6730. After resetting the target temperature or if the temperature is between the high and low temperature limits, the flowchart 6710 may return to block 6718. In some embodiments, the PID loop may be reinitialized in the event that the target temperature has been adjusted. Blocks 6722, 6724, 6728, 6730 may not be used in embodiments or modes/states which do not define the target temperature as a range.

In some embodiments, control of cooling of an electronics housing (see, e.g. 6046A, B of FIG. 51) of a system 6000 may be accomplished by controlling the duty cycle of a plurality of valves. As described in greater detail above, source water flowing to both the source divert valve 6100 and a source proportioning control valve 6050B which gates flow into a blowdown heat exchanger 6008B. Alteration of the duty cycle of both valves 6100, 6050B may be used to control the temperature of the electronics housing 6046. Controlling the electronics housing temperature 6046 which both valves may increase efficiency of the system 6000 and limit consumption of water which is used for cooling purposes and then directed to drain 6018. Thus, a greater proportion of the source water entering the system 6000 may be converted into purified product water. Such multi valve temperature control may be used in modes or states in which the system 6000 is producing water. In some embodiments, this type of control may be utilized when the mode or state entered in block 6712 is a normal temperature water production mode or state.

Figure 129:
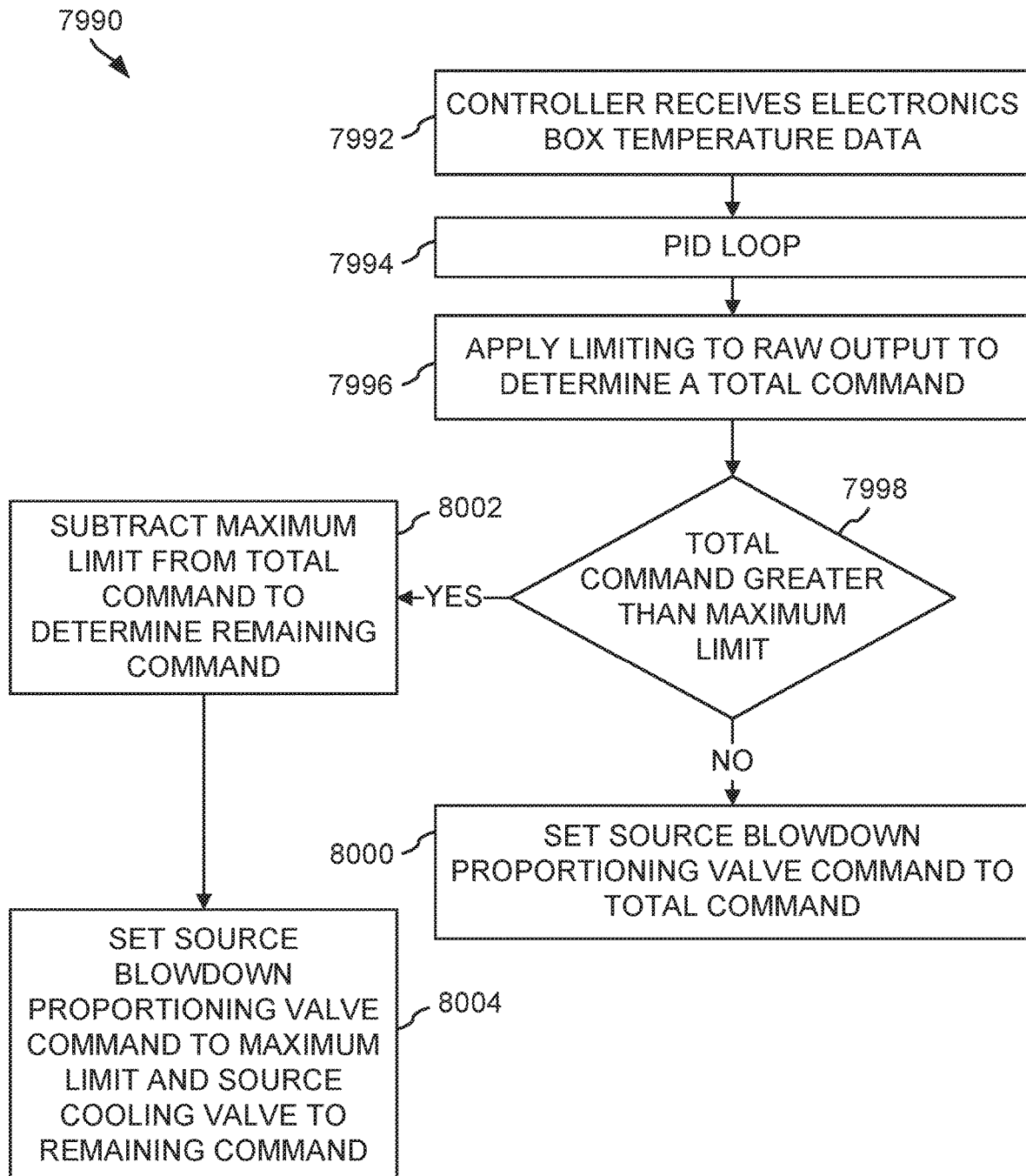

Referring now to FIG. 129, a flowchart 7990 depicting a number of example actions which may be executed to control cooling of an electronics housing (see, e.g. 6046A, B of FIG. 51) of a system 6000 is shown. In block 7992, the controller may receive temperature data from the electronics box 6046 (see, e.g. FIG. 3). This data may be collected by at least one electronics temperature sensor 6048 (see, e.g. FIG. 3). The temperature data may be feed into a PID loop run by the controller 6034 in block 7994. This PID loop may be similar to that described in relation to block 6718 of FIG. 128. In block 7996, the output of the PID loop may be subjected to limiting and a total cooling duty cycle command may be generated. For example, the raw output command of the PID loop may be limited to being less than a predetermined duty cycle command. In some embodiments, output may be limited to being less than 15-30% (e.g. 20%). If, in block 7998, the total command was not greater than a maximum limit, the source proportion valve 6050B for the blowdown heat exchanger 6008B may be set to operate at a duty cycle equal to the total command (which will be the same as the raw PID loop output) in block 8000. In this case, all water used for cooling of the electronics box 6046 may also be used in purification within the purifier 6010. The maximum limit for the total command may be a predefined duty cycle which may be 10-20% (e.g. 15%) in some examples. If, in block 7998, the total command value was greater than the maximum limit, a difference between the maximum limit and the total output may be determined in block 8002. In block 8004, the duty cycle command for the source proportion valve 6050B for the blowdown heat exchanger 6008B may be set to the maximum limit. Also in block 8004, the source cooling valve 6100 (see, e.g. FIG. 3) duty cycle may be set to the difference determined in block 8002. In some embodiments, the remaining command value may also be limited. For example, this command may be limited to no more than a 10% duty cycle command in some embodiments.

Figure 130:
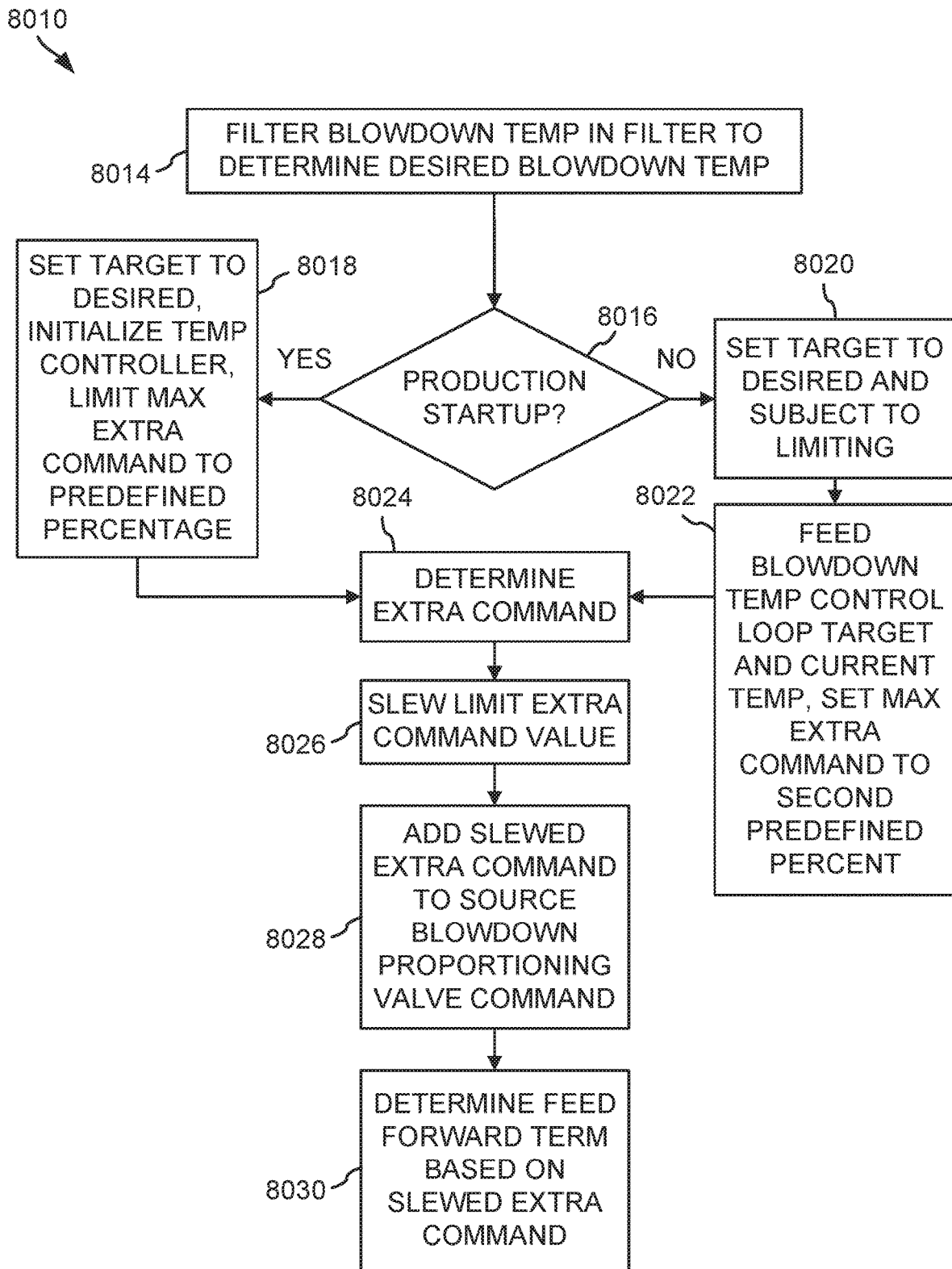

Referring now also to FIG. 130, a flowchart 8010 depicting a number of example actions which may be executed to control the temperature of a blowdown process stream output from a heat exchanger 6008B (see, e.g. FIG. 3) is shown. The temperature of the blowdown process stream may be altered by adjusting an amount of source water which passes through the blowdown heat exchanger 6008B before entering the purifier 6010. Control of the temperature of the blowdown process stream may be desirable for a number of reasons. Among others, controlling the temperature of the blowdown process stream may allow for more heat to be recovered within the system 6000. In certain embodiments and depending on the operating mode or state of the system 6000, the amount of heat recovery may be sufficient to allow the purifier 6010 to operate with minimal or no power being consumed by the heater 6054 (see, e.g. FIG. 3) included in the purifier 6010. In certain examples, the amount of heat recovery may be sufficient to allow the heater 6054 to typically operate at a zero percent duty cycle (e.g. a large majority of the time), but may operate for brief periods at duty cycles of 5% or less. Input of energy by a compressor 6064 (see, e.g. FIG. 3) may be adequate to maintain desired operating temperatures within the purifier 6010. Thus the temperature of the blowdown process stream may be controlled to keep the heater 6054 at a minimal or zero percent duty cycle. This may increase the efficiency of the system 6000. Depending on the embodiment, the temperature of the blowdown process stream output from the blowdown heat exchanger 6008B may only be controlled in certain operating modes or states of the system 6000. For example, the temperature of the blowdown process stream may only be controlled in production states which are non-hot water production states.

As shown in FIG. 130, the blowdown temperature may be received and passed through a filter by a controller 6034 in block 8014. The filter may be a filter low pass filter and may determine a historic average blowdown temperature value. This value may be set as a desired blowdown temperature value. If, in block 8016, the system 6000 is in a production start-up state, the target blowdown temperature may be set to the desired temperature value. A blowdown temperature control loop may be initialized and an extra source valve command cap may be determined in block 8018 as well. This cap may be a predefined additional duty cycle percent which may be added to the blowdown heat exchange source proportioning valve 6050B when the system 6000 is in a start-up state. In certain embodiments, the cap may be set at 5-15% (e.g. 10%). This may prevent the blowdown temperature control loop from significantly affecting the system 6000 during start-up.

If, in block 8016, the system 6000 is not in a production start-up state, in block 8020 the target temperature for the blowdown process stream exiting the blowdown heat exchanger 6008B may be set to the desired temperature determined in block 8014. The target temperature value may also be limited to conform to a predefined range in block 8020. The predefined range may limit the target blowdown temperature to a range of 45-75° C. in certain embodiments. In block 8022, the blowdown temperature target may be fed to a blowdown temperature control loop along with a current (perhaps low pass filtered) value of the temperature of blowdown exiting the blowdown heat exchanger 6008B. The blowdown temperature control loop may include a PID controller which outputs a blowdown valve duty cycle command. It should be noted that the gains used for the proportional, integral, and derivative terms of the blowdown temperature control loop may vary depending on the embodiment, and at least one may potentially be set to zero (e.g. the derivative term). An extra source valve command cap may be determined in block 8022 as well. This cap may be a predefined additional duty cycle percent which may be added to the blowdown heat exchanger source proportioning valve 6050B when the system 6000 is in a water production state. In certain embodiments, the cap may be set at 20-30% (e.g. 25%).

An extra source valve command value may be determined by the controller 6034 in block 8024. For example, the controller 6034 may use the output from the blowdown temperature control loop as the extra source valve command value in block 8024. In other embodiments, the extra source valve command may combine the output from the blowdown temperature control loop with a second value determined by the controller 6034. In embodiments in which the source water flowing to the blowdown heat exchanger 6008B is used for cooling of an electronics box 6046 of the system 6000 (see, e.g. FIG. 129), a cooling duty cycle contribution may be added to the output of the blowdown temperature control loop. In block 8024, the extra source valve command may also be limited to the extra source valve command cap set in block 8018 or 8022 depending on the state the system 6000 is in. In block 8026, the extra source valve command value may be slew limited to yield a slew limited extra source valve command value. In block 8028, the slewed extra source command value may be added to the blowdown proportioning valve command. In block 8030, a feed forward term may be generated using the slewed extra command value. This feed forward term may be employed to adjust the total source valve command 7050 (described in greater detail with respect to FIG. 101A-C). For example, the feed forward term may cause the slewed extra source valve command value to be removed from the total source valve command 7050 so as to allocate that removed portion of source proportioning valve opening time specifically for control of the blowdown temperature.

The system 6000 may communicate with a point of use device or system (e.g. medical device 6004 of FIG. 3) via any suitable communication scheme. The system 6000 and point of use device may, for example, communicate via and electromagnetic or acoustic communications link such as radio frequency, IR, ultrasonic, etc. Example communication protocols may include Bluetooth, Zigbee, Z-Wave, WiFi, ULE, 802.11.15.4, ANT, NFC, EPCGen2, etc. Communication may also be wired. For example, the system 6000 and point of use device may be in hardwired data communication with one another. An Ethernet or similar cable, fiber optic cable, or other light guide type cabling may be used for instance. Communications sent via the communications link may be encrypted.

The communications link may be used to, among other things, update software, transfer logging data, coordinate operation of the system 6000 and point of use device. In some embodiments, the medical system 6004 may provide the user interface for the system 6000 and the communications link may facilitate this. Exchange of information between the system 6000 and medical system 6004 may occur based on inputs to the user interface of the medical system 6004.

Software updates may, for example, be downloaded to the point of use device (e.g. via the cloud) and conveyed to the system 6000 via the communications link. During operation, logging data may be provided from the system 6000 to the point of use device on a predetermined schedule. This logging data may be provided as part of a status message. In certain embodiments, a status message may be sent more frequently than the logging data. The logging data may be sent with every five status messages for example and status messages may be sent five times every second. In some embodiments, if an error condition is tripped logging data may be sent with the next status message. This may be done without regard for when a last message with status data was sent.

The status message may contain various information which may aid in coordination of the system 6000 with the operation of a point of use device. Status messages may contain a system 6000 identification number which may be unique to the particular system. Status messages may include usage information related to various replaceable components of the system 6000. For example, the status message may include an install date, hours used data, or the like related to the filters 6006A, B. The point of use device may require the filters 6006A, B to be replaced if the filters 6006A, B were installed 180 or more days prior. If the system 6000 determines the filters 6006A, B need replacement (see, e.g., FIG. 89) this may also be conveyed to the point of use device in the status message. In the event that the system 6000 communicates that the filters 6006A, B need replacement, the point of use device may command the system 6000 into a replacement preparation mode (see, e.g., FIG. 91). The status message may also be used to communicate to the point of use device whether the filters 6006A, B need to be flushed. The filters 6006A, B may be required to be flushed if the system 6000 has been in a stand-by or idle state for greater than a certain period of time. Alternatively, the filters may need to be flushed each time a water sample is to be taken. If the filters 6006A, B need to be flushed, the point of use device may command the system 6000 to enter a filter flush mode (see, e.g., FIG. 89).

The status message may also include a time since last self disinfect of the system 6000 and/or an indication of whether a disinfection of the system 6000 is needed. Where the point of use device is a medical system 6004 (see, e.g., FIG. 3) the medical device 6004 may not begin a therapy if the last self disinfect of the system 6000 was greater than a predetermined amount of time in the past (e.g. 72 hours) or if the system 6000 communicates that a self disinfect is needed. The medical system 6004 may command the system 6000 to perform a self disinfection in this event.

The status message may also include error information. This information may include an error code for example. The status message may also specify an error tier. For example, the status message may communicate whether the error is a low level error (notification), operating error, or failsafe condition provoking error. The point of use device may use the error level to determine what (if any) reaction should be made. For example, the point of use may continue operation if a low level error is conveyed over the communications link. The error code may be used to determine a screen or screen flow to display via the user interface of the point of use device.

The status message may also include an identifier of the mode and/or state the system 6000 is currently in. Lower level information may also be included in some embodiments. For example, the status message may also include an indication of whether the system's 6000 valve to the point of use device is closed. As discussed elsewhere herein, this valve may be closed under certain circumstances (e.g. product water temperature too cold, conductivity outside of limits, etc.). This type of status information may allow the point of use device to operate in a water conserving mode or pause therapy. It may also allow the point of use device to avoid triggering an error based on a low flow or occlusion detection in the incoming water line. The point of use device may still detect such a condition and communicate this detection to the system 6000 for added redundancy.

Where the communications link is used for logging purposes, the log data may include, but is not limited to sensor data, target set points, mode, state, on/off status of various components (e.g. compressor, bearing feed pump), valve commands, and limit values for various controller outputs. These may be collected from any of the sensors, control loops, etc. described herein.

With respect to coordination between the system 6000 and the point of use device, the point of use device may send a number of messages to the system 6000 via the communications link. A number of example messages are described in Table 2 as follows:

TABLE 2

| Message | Description |
|---|---|
| Go To Idle | Commands the system 6000 to exit the current state and enter idle mode |
| Go to Stand-by | Commands the system 6000 to exit the current state and enter stand-by mode |
| Flush Filter | Commands the system 6000 to enter a flushing mode |
| Start Filter Replacement | Commands the system 6000 to enter a filter replacement preparation mode |
| Filter Replacement Done | Sent, for example, upon receipt of user input on point of use device user interface indicating the user has completed installation of replacement filters. Commands the system 6000 to perform a replacement filter flush. |
| Start Sampling | Commands the system 6000 to enter a sampling mode. |
| Sampling Passed | Sent, for example, upon receipt of user input on point of use device user interface indicating that the water sample is acceptable. Commands system 6000 to enter normal water production mode. |
| Sampling Failed | Sent, for example, upon receipt of user input on point of use device user interface indicating that the water sample is unacceptable. Commands system 6000 to enter stand-by mode. Indicates system 6000 may need to replace filters. |
| Start Normal Water Production | Commands system 6000 to enter normal production mode |
| Start Hot Production | Commands system 6000 to enter hot production mode |
| Start Self Disinfect | Commands system 6000 to enter self disinfect mode |
| Status | Commands system 6000 to provide a status message to point of use device |
| Software Update | Commands system 6000 to enter software update mode |
| Time Sync | Commands system 6000 to synchronize its real time clock |
| Error Acknowledgement | Indicates acknowledgement that an error communicated in a status message has been received. May clear error from status messages generated over a predefined subsequent period of time. |

The system 6000 may also send the point of use device a number of messages via the communications link. A number of example messages are described in Table 3 as follows:

TABLE 3

| Message | Description |
|---|---|
| Idle Pending | May be sent to indicate that the controller 6034 of the system 6000 is transitioning the system into idle state. This message may also indicate that the valve gating flow to the point of use device is in a closed state. |
| Idle | May be sent to indicate that the system 6000 has transitioned to idle state. This message may also indicate that the valve gating flow to the point of use device is in a closed state. |
| Standy-by Pending | May be sent to indicate that the controller 6034 of the system 6000 is transitioning the system into stand-by state. This message may also indicate that the valve gating flow to the point of use device is in a closed state. |
| Stand-by | May be sent to indicate that the system 6000 has transitioned to stand-by state. This message may also indicate that the valve gating flow to the point of use device is in a closed state. |
| Filter Flushing | May be sent to indicate that the controller 6034 is in filter flush state. This message may also indicate that the valve gating flow to the point of use device is in a closed state. |
| Filter Replacement Preparation | May be sent to indicate that the controller 6034 is in filter replacement preparation state. This message may also indicate that the valve gating flow to the point of use device is in a closed state. |
| Sample Pending | May be sent to indicate that the controller 6034 of the system 6000 is transitioning the system into sampling state. This message may also indicate that the valve gating flow to the point of use device is in a closed state. |

TABLE 3-continued

| Message | Description |
|---|---|
| Sample Available | May be sent to indicate that the system 6000 is ready to dispense a sample upon depression of a sampling button. This message may also indicate that the valve gating flow to the point of use device is in a closed state. |
| Sample Complete | May be sent to indicate that the system 6000 has dispensed a sample. This message may also indicate that the valve gating flow to the point of use device is in a closed state. |
| Normal Water Production Pending | May be sent to indicate that the system is in the normal water production mode and is not in the production running state. This message may also indicate that the valve gating flow to the point of use device is in a closed state. |
| Normal Water Production | May be sent to indicate that the system is in the normal water production mode and is in the production running state. This message may also indicate that the valve gating flow to the point of use device is in an open state. |
| Hot Water Production Pending | May be sent to indicate that the system is in the hot water production mode and is not in the hot production running state. This message may also indicate that the valve gating flow to the point of use device is in a closed state. |
| Hot Water Production | May be sent to indicate that the system is in the hot water production mode and is in the hot production running state. This message may also indicate that the valve gating flow to the point of use device is in an open state. |
| Self-Disinfect | May be sent to indicate that the system is in the self-disinfect mode and is in the hot production running state. This message may also indicate that the valve gating flow to the point of use device is in a closed state. |
| Failsafe | May be sent to indicate that the system 6000 has transitioned to a failsafe state. This message may also indicate that the valve gating flow to the point of use device is in a closed state. |

The messages sent between the system 6000 and a point of use device or system over the communications link may serve to guide the system 6000 through, for example, the various operational states described in relation to FIGS. 84A-B.

Various alternatives and modifications can be devised by those skilled in the art without departing from the disclosure. Accordingly, the present disclosure is intended to embrace all such alternatives, modifications and variances. Additionally, while several embodiments of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. And, those skilled in the art will envision other modifications within the scope and spirit of the claims appended hereto. Other elements, steps, methods and techniques that are insubstantially different from those described above and/or in the appended claims are also intended to be within the scope of the disclosure.

The embodiments shown in drawings are presented only to demonstrate certain examples of the disclosure. And, the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

Furthermore, the terms "first", "second", "third" and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the embodiments of the disclosure described herein are capable of operation in other sequences and/or arrangements than are described or illustrated herein.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A water vapor distillation system for providing distillate at a controlled temperature, the water vapor distillation system comprising:
    a water vapor distillation device configured to receive source water from a fluid source and produce distillate, the device comprising:
        a compressor receiving source water vapor and producing compressed vapor, the compressor being supported on bearings lubricated with condensed compressed vapor;
        a purifier comprising:
            an evaporator that receives source water, the evaporator transforms source water to source water vapor and concentrate a steam chest fluidly connected to the evaporator and to the compressor;

a condenser fluidly connected to the compressor, the condenser transforming compressed vapor into distillate;

a concentrate reservoir and a concentrate level sensor;

a source flow path that extends from the fluid source and branches into at least a first branching source path and a second branching source path;

a concentrate flow path fluidly connected to the steam chest and comprising a concentrate output;

a distillate flow path fluidly connected to the condenser and comprising a distillate output;

at least one source proportioning valve on one of the first and second branching source paths;

a first heat exchanger comprising at least a portion of the distillate flow path;

a second heat exchanger including at least a portion of the concentrate flow path and a portion of the second branching source path;

a distillate sensor assembly in communication with the distillate flow path and located downstream the first heat exchanger, the distillate sensor assembly configured to generating a distillate temperature measurement;

a control system for controlling said water vapor distillation system comprising:

a concentrate controller programmed to control a concentrate valve;

a source flow controller programmed to control a source flow valve; and a concentrate level sensor in communication with a concentrate controller and a source flow controller, said concentrate level sensor sends signals related to said concentrate level to said concentrate controller and said source flow controller indicative of said concentrate level, wherein said source flow controller programmed to actuate said source flow valve based at least on said concentrate level sensor signals, and wherein said concentrate controller programmed to actuate said concentrate valve based at least on said concentrate level sensor signals, whereby said concentrate level is maintained using said concentrate level sensor signals as input; and a controller configured to control the at least one source proportioning valve, the controller configured to:

determine a total source proportioning valve duty cycle based on a concentrate accumulation rate calculated from a level measurement output of the concentrate level sensor and a target concentrate accumulation rate;

control the volume of source water received by the water vapor distillation device based on the total source proportioning valve duty cycle;

receive the distillate temperature measurement;

determine the difference between a first target temperature and the distillate temperature measurement; and split the source water from the fluid source between the first heat exchanger and the second heat exchanger using the at least one source proportioning valve in a first operating mode based on the difference between the first target temperature and the distillate temperature measurement.

2. The system of claim 1, wherein the water vapor distillation device further comprising:

an evaporator reservoir in fluid communication with the evaporator; and an evaporator level sensor disposed in the evaporator reservoir, wherein the evaporator level sensor in communication with the controller, and wherein the evaporator level sensor sends data signals to the controller that provide a level of a water column in the evaporator reservoir;

wherein in the second mode, the controller configured to determine the total source proportioning valve duty cycle based, at least in part, on the evaporator level data signal indicative of the level of a water column in the evaporator reservoir.

3. The system of claim 1, wherein the first target temperature is at least 20° C., but no greater than 25° C.

4. The system of claim 1, wherein the system further comprises a source fluid temperature sensor in communication with the controller, wherein the source fluid temperature sensor provides the controller data related to the source fluid temperature measurement, wherein the controller is configured to determine the first target temperature based, at least in part, on the source fluid temperature measurement received from the source fluid temperature sensor.

5. The system of claim 1, wherein the system further comprises a concentrate sensor assembly in communication with the concentrate flow path downstream of the portion of the concentrate flow path included in the second heat exchanger and configured to generate a concentrate temperature measurement.

6. The system of claim 5, wherein the controller is configured to open at least one source proportioning valve gating source water to the second heat exchanger based at least in part upon a difference between a third target temperature and the concentrate temperature measurement.

7. The system of claim 6, wherein the third target temperature is a historic average of the concentrate temperature.

8. The system of claim 1, wherein the controller is configured to open at least one source proportioning valve gating source water to the second heat exchanger based at least in part upon a minimum limit.

9. The system of claim 8, wherein the minimum limit is the greater of a predefined duty cycle or a predefined percentage of the combined duty cycle for all of the source proportioning valves.

10. The system of claim 1, wherein the controller is disposed in an electronics box in heat transfer relationship to the flow path from the source water leading to the second heat exchange.

11. The system of claim 10, wherein the controller is configured to determine an electronics box cooling duty cycle command and open at least one source proportioning valve gating source water to the second heat exchanger based, at least in part, on an electronics box cooling duty cycle command.

12. The system of claim 1, wherein the distillate sensor assembly comprising redundant temperature sensors.

13. The system of claim 1, wherein the distillate sensor assembly comprising redundant temperature sensors and redundant conductivity sensors.

14. The system of claim 1, wherein the first and second heat exchanger are helical and formed by winding the heat exchangers around the exterior of the distillation device.

15. A water vapor distillation system for providing distillate at a controlled temperature, the water vapor distillation system comprising:

a water vapor distillation device configured to receive source water from a fluid source and produce distillate, the device comprising:
  a compressor receiving source water vapor and producing compressed vapor, the compressor being supported on bearings lubricated with condensed compressed vapor;
  a purifier comprising:
    an evaporator that receives source water, the evaporator transforms source water to source water vapor and concentrate
    a steam chest fluidly connected to the evaporator and to the compressor;
    a condenser fluidly connected to the compressor, the condenser transforming compressed vapor into distillate;
  a concentrate reservoir and a concentrate level sensor;
  a source flow path that extends from the fluid source and branches into at least a first branching source path and a second branching source path;
  a concentrate flow path fluidly connected to the steam chest and comprising a concentrate output;
  a distillate flow path fluidly connected to the condenser and comprising a distillate output;
  at least one source proportioning valve on one of the first and second branching source paths;
  a first heat exchanger comprising at least a portion of the distillate flow path;
  a second heat exchanger including at least a portion of the concentrate flow path and a portion of the second branching source path;
  a distillate sensor assembly in communication with the distillate flow path and located downstream the first heat exchanger, the distillate sensor assembly configured to generating a distillate temperature measurement;
  a control system for controlling said water vapor distillation system comprising:
    a concentrate controller programmed to control a concentrate valve;
    a source flow controller programmed to control a source flow valve; and
    a concentrate level sensor in communication with a concentrate controller and a source flow controller, said concentrate level sensor sends signals related to said concentrate level to said concentrate controller and said source flow controller indicative of said concentrate level,
  wherein said source flow controller programmed to actuate said source flow valve based at least on said concentrate level sensor signals, and
  wherein said concentrate controller programmed to actuate said concentrate valve based at least on said concentrate level sensor signals,
  whereby said concentrate level is maintained using said concentrate level sensor signals as input; and
  a controller configured to control the at least one source proportioning valve, the controller configured to:
  determine a total source proportioning valve duty cycle based on a concentrate accumulation rate calculated from a level measurement output of the concentrate level sensor and a target concentrate accumulation rate;
  control the volume of source water received by the water vapor distillation device based on the total source proportioning valve duty cycle;
  receive the distillate temperature measurement;
  determine the difference between a first target temperature and the distillate temperature measurement;
  split the source water from the fluid between the first heat exchanger and the second heat exchanger using the at least one source proportioning valve in a first operating mode based on the difference between the first target temperature and the distillate temperature measurement; and
  to control the at least one source proportioning valve in a second operating mode to allocate all of the total source proportioning valve duty cycle to at least one source proportioning valve that gates flow of source water to the second heat exchanger and open the at least one source proportioning valve that is gating flow of source water to the first heat exchanger at added duty cycle which is no greater than a predefined limit.

16. The system of claim 15, wherein the predefined limit is selected from a list consisting of 5%, 2%, less than 2%, and zero.

17. The system of claim 15, wherein the first operating mode is a low temperature distillate production state and the second operating mode is a hot temperature distillate production state.

18. The system of claim 15, wherein the controller is configured to open the at least one source proportioning valve gating source water to the first heat exchanger based upon a second target temperature and a difference between the second target temperature and the concentrate temperature in the second operating state.

19. The system of claim 18, wherein the second target temperature is at least 65° C. hotter than the first target temperature.

20. The system of claim 18, wherein the second target temperature is at least 50° C. hotter than the first target temperature.

21. The system of claim 18, wherein the second target temperature is greater than 95° C. and less than 100° C.

22. The system of claim 18, wherein the second target temperature is 96° C.

23. A method of a water vapor distillation system providing distillate at a controlled temperature, the method comprising:
  providing a water vapor distillation device configured to receive a volume of source water from a fluid source and produce distillate, the device comprising:
    a compressor receiving source water vapor and producing compressed vapor, the compressor being supported on bearings lubricated with condensed compressed vapor;
    a purifier comprising:
      an evaporator that receives source water, the evaporator transforms source water to source water vapor and concentrate;
      a steam chest fluidly connected to the evaporator and to the compressor;
      a condenser fluidly connected to the compressor, the condenser transforming compressed vapor into distillate
    a concentrate reservoir and a concentrate level sensor;
    a source flow path that extends from the fluid source and branches into a first branching source path and a second branching source path;
    a concentrate flow path fluidly connected to the steam chest and comprising a concentrate output;
    a distillate flow path fluidly connected to the condenser and comprising a distillate output;
    a first source proportioning valve on one of the first and second branching source paths;

a first heat exchanger comprising at least a portion of the distillate flow path and a portion of the first branching source path;

a second heat exchanger including at least a portion of the concentrate flow path and a portion of the second branching source path;

a distillate sensor assembly in communication with the distillate flow path and located downstream the first heat exchanger, the distillate sensor assembly configured to generate a distillate temperature measurement;

a control system for controlling said water vapor distillation system comprising:

a concentrate controller programmed to control a concentrate valve;

a source flow controller programmed to control a source flow valve; and a concentrate level sensor in communication with a concentrate controller and a source flow controller, said concentrate level sensor sends signals related to said concentrate level to said concentrate controller and said source flow controller indicative of said concentrate level, wherein said source flow controller programmed to actuate said source flow valve based at least on said concentrate level sensor signals, and wherein said concentrate controller programmed to actuate said concentrate valve based at least on said concentrate level sensor signals, whereby said concentrate level is maintained using said concentrate level sensor signals as input; and determining a total source proportioning valve duty cycle based on a concentrate accumulation rate calculated from a level measurement output of the concentrate level sensor and a target concentrate accumulation rate;

controlling the volume of source water received by the water vapor distillation device based on the total source proportioning valve duty cycle receiving the distillate temperature measurement;

determining the difference between a first target temperature and the distillate temperature measurement; and splitting the source water from the fluid source between the first heat exchanger and the second heat exchanger using the first source proportioning valve in a first operating mode and based on the difference between the first target temperature and the distillate temperature measurement.

24. A method of a water vapor distillation system providing distillate at a controlled temperature, the method comprising:

providing a water vapor distillation device configured to receive a volume of source water from a fluid source and produce distillate, the device comprising:

a compressor receiving source water vapor and producing compressed vapor, the compressor being supported on bearings lubricated with condensed compressed vapor;

a purifier comprising:

an evaporator that receives source water, the evaporator transforms source water to source water vapor and concentrate;

a steam chest fluidly connected to the evaporator and to the compressor;

a condenser fluidly connected to the compressor, the condenser transforming compressed vapor into distillate a concentrate reservoir and a concentrate level sensor;

a source flow path that extends from the fluid source and branches into a first branching source path and a second branching source path;

a concentrate flow path fluidly connected to the steam chest and comprising a concentrate output;

a distillate flow path fluidly connected to the condenser and comprising a distillate output;

a first source proportioning valve on one of the first and second branching source paths;

a first heat exchanger comprising at least a portion of the distillate flow path and a portion of the first branching source path;

a second heat exchanger including at least a portion of the concentrate flow path and a portion of the second branching source path;

a distillate sensor assembly in communication with the distillate flow path and located downstream the first heat exchanger, the distillate sensor assembly configured to generate a distillate temperature measurement;

a control system for controlling said water vapor distillation system and maintain the concentrate level comprising:

a concentrate controller programmed to control a concentrate valve; and a source flow controller programmed to control a source flow valve, sending a signal related to concentrate controller and a source flow controller indicative of concentrate level;

actuating the source flow valve based at least on the concentrate level sensor signals; and actuating the concentrate valve based at least on the concentrate level sensor signals;

determining a total source proportioning valve duty cycle based on a concentrate accumulation rate calculated from a level measurement output of the concentrate level sensor and a target concentrate accumulation rate;

controlling the volume of source water received by the water vapor distillation device based on the total source proportioning valve duty cycle receiving the distillate temperature measurement;

determining the difference between a first target temperature and the distillate temperature measurement;

splitting the source water from the fluid source between the first heat exchanger and the second heat exchanger using the first source proportioning valve in a first operating mode and based on the difference between the first target temperature and the distillate temperature measurement; and controlling the first and second source proportioning valves in a second operating mode to allocate all of the total source proportioning valve duty cycle to the second source proportioning valve that gates flow of source water to the second heat exchanger and open the first source proportioning valve that is gating flow of source water to the first heat exchanger at added duty cycle which is no greater than a predefined limit.

* * * * *